US005467427A

United States Patent [19]

Kothari et al.

[11] Patent Number: 5,467,427

[45] Date of Patent: Nov. 14, 1995

[54] MEMORY CAPACITY NEURAL NETWORK

[75] Inventors: Suraj C. Kothari; Heekuck Oh, both of Ames, Iowa

[73] Assignee: Iowa State University Research Foundation, Ames, Iowa

[21] Appl. No.: 254,499

[22] Filed: Jun. 6, 1994

Related U.S. Application Data

[63] Continuation of Ser. No. 792,018, Nov. 13, 1991, abandoned.

[51] Int. Cl.$^{6}$ .................................................... G06F 15/18

[52] U.S. Cl. ............................ 395/23; 382/156; 395/20; 395/21

[58] Field of Search ............................... 395/21, 23, -25, 395/27, 11; 382/10, 15

[56] References Cited

U.S. PATENT DOCUMENTS

| | | | |
|---|---|---|---|
| 4,897,811 | 1/1990 | Scofield | 395/21 |
| 4,918,618 | 4/1990 | Tomlinson, Jr. | 395/21 |
| 5,010,512 | 4/1991 | Hartstein et al. | 395/24 |
| 5,014,219 | 5/1991 | White | 395/23 |
| 5,058,034 | 10/1991 | Murphy et al. . | |
| 5,058,180 | 10/1991 | Khan . | |
| 5,063,531 | 11/1991 | Kawai et al. | 395/25 |
| 5,087,826 | 2/1992 | Holler et al. | 395/24 |
| 5,091,864 | 2/1992 | Baji et al. . | |
| 5,093,803 | 3/1992 | Howard et al. | 395/27 |
| 5,161,014 | 11/1992 | Pearson et al. . | |
| 5,170,463 | 12/1992 | Fuyimoto et al. | 395/24 |
| 5,214,746 | 5/1993 | Fogel et al. | 395/11 |
| 5,239,594 | 8/1993 | Yoda | 395/11 |
| 5,247,584 | 9/1993 | Krogmann | 395/11 |

OTHER PUBLICATIONS

Yeou–Fang Wang, J. Cruz & J. Mulligan, Jr., Guaranteed Recall of All Training Pairs for Bidirectional Associative Memory, IEEE Transactions on Neural Networks, vol. 2, No. 6, Nov. 1991, pp. 559–567.

S. Fahlman, Faster Learning Variations on Back–Propagation: An Empirical Study, Proceedings of 1988 Connectionist Models Summer School, pp. 38–51.

B. Kosko, Constructing an Associative Memory, Byte, Sep. 1987, pp. 137–144.

B. Kosko, Adaptive Bidirectional Associative Memories, Applied Optics, vol. 26, No. 23, Dec. 1, 1987, pp. 4947–4952.

K. Haines & R. Hecht–Nielson, A. BAM with Increased Information Storage Capacity, Second Int'l. Joint Conf. on Neural Networks, 1988, pp. I–181–I–190.

B. Kosko, Feedback Stability and Unsupervised Learning, Second Int'l. Joint Conf. on Neural Networks, 1988, I–141–I–152.

F. Crick & G. Mitchison, The Function of Dream Sleep, Nature, Jul. 1983, pp. 111–114.

G. Weisbuch & F. Fogelman–Soulie, Scaling Laws for the Attractors of Hopfield Networks, Le Journal de Physique–Lettres 46, Jul. 15, 1985, pp. L–623–L–630.

J. Hopfield, D. Feinstein & R. Palmer, "Unlearning" Has a Stabilizing Effect in Collective Memories, Nature, vol. 304, Jul. 14, 1983, pp. 158–159.

A. Wong, Recognition of General Patterns Using Neural Networks, Biological Cybernetics 58, 1988, pp. 361–372.

L. Personnaz, I. Guyon & G. Dreyfus, Information Storage and Retrievel in Spin–Glass Like Neural Networks, Le Jounral de Physique–Lettres 46, Apr. 15, 1985, pp. L–359–L–365.

(List continued on next page.)

*Primary Examiner*—David K. Moore
*Assistant Examiner*—Tariq Hafiz
*Attorney, Agent, or Firm*—Pravel, Hewitt, Kimball & Krieger

[57] ABSTRACT

Hopfield and BAM neural network training or learning rules allowing memorization of a greater number of patterns. Successive over-relaxation is used in the learning rules based on the training patterns and the output vectors. Neural networks trained in this manner can better serve as the neural networks in a variety of pattern recognition and element correlation systems.

18 Claims, 11 Drawing Sheets

OTHER PUBLICATIONS

S. Agmon, The Relaxation Method for Linear Inequalaities, Canadian Journal of Mathematics, vol. 6, No. 3, 1954, pp. 382–392.

T. Motzkin & I. Schoenberg, The Relaxation Method for Linear Inequalities, Canadian Journal of Mathematics, vol. 6, No. 3, 1954, pp. 393–404.

B. Kosko, Bidirectional Associative Memories, IEEE Transactions on Systems, Man and Cybernetics, vol. 18, No. 1, Jan./Feb./ 1988, pp. 49–60.

M. Hassoun, Dynamic Heteroassociative Neural Memories, Neural Networks, vol. 2, 1989, pp. 275–287.

S. Fahlman & C. Lebiere, The Cascade–Correlation Learning Architecture, Carnegie Mellon University, CMU–CS–90–100, Feb. 14, 1990, pp. 1–11.

Yeou–Fang Wang, J. Cruz & J. Mulligan, Jr., Two Coding Strategies for Bidirectional Associative Memory, IEEE Transactions on Neural Networks, vol. 1, No. 1, Mar. 1990, pp. 81–92.

S. Venkatesh, Epsilon Capacity of Neural Networks, Amer. Inst. of Physics, 0094–243X/86/1510440–6, 1986, pp. 440–445.

D. Kleinfeld & D. Pendergraft, "Unlearning" Increases the Storage Capacity of Content Addressable Memories, Biophysical Journal, vol. 51, Jan. 1987, pp. 47–53.

D. Amit, H. Gutfreund, & H. Sompolinsky, Storing Infinite Numbers of Patterns in a Spin–Glass Model of Neural Networks, Physical Review Letters, Sep. 30, 1985, pp. 1530–1533.

I. Kanter & H. Sompolinsky, Associative Recall of Memory without Errors, Physical Review, Jan. 1, 1987, pp. 380–392.

E. Garnder, Maximum Storage Capacity in Neural Networks, Europhysics Letter, Aug. 15, 1987, pp. 481–485.

T. Cover, Geometrical and Statistical Properties of Systems of Linear Inequalities with Applications in Pattern Recognition, IEEE Transactions on Electronic Computers, vol. EC–14, 1965, pp. 326–334.

D. Wallace, Memory and Learning in a Class of Neural Network Models, Lattice Gauge Theory, Plenum Press, pp. 313–330.

A. Bruce, et al, Learning and Memory Properties in Fully Connected Networks, AIP Conference Proceedings, Neural Networks for Computing, 1986, pp. 65–70.

B. Forrest, Content–Addressability and Learning in Neural Networks, J. Physics A.: Math. Gen. 21, 1988, pp. 245–255.

E. Gardner, The Space of Interactions in Neural Network Models, J. Physics A: Math. Gen. 21, 1988, pp. 257–270.

R. McEliece, et al., The Capacity of the Hopfield Associative Memory, IEEE Transactions on Information Theory, vol. IT–33 No. 4, Jul., 1987, pp. 461–482.

SOR

Perceptron

MEMORY CAPACITY NEURAL NETWORK

This is a continuation of application Ser. No. 07/792,018 filed on Nov. 13, 1991, now abandoned.

BACKGROUND OF THE INVENTION

1. Field of the Invention

The invention relates to neural networks used for pattern recognition, and more particularly to Hopfield and BAM networks having improved memory capacity.

2. Description of the Related Art

Conventional digital computer systems have become extremely capable. They have large memory and storage capacities and very high speeds. However, there are many areas where conventional computing techniques do not provide satisfactory solutions. Even the great speeds of modern parallel processing systems are insufficient. One of these areas is pattern recognition.

A new class of computing devices, called neural networks, has developed. One area where neural networks have shown a major advantage over conventional computing techniques is pattern recognition. The devices are called neural networks because their operation is based on the operation and organization of neurons. In general, the output of one neuron is connected to the input of many other neurons, with a weighting factor being applied to each input. The weighted inputs are then summed and commonly provided to threshold comparison logic, to indicate on or off. An output is then provided and this may continue to the next level or may be the final output.

Neural networks can be implemented in specific circuits, a hardware implementation, or may be implemented in a computer program or software techniques. Numerous neural networks have been developed. The most common network involves an input layer, a hidden layer and an output layer, with various connections from layer to layer and feedback if desired. Each neuron in each layer performs the input weighting, summing and thresholding functions. Another network class is the bi-directional associative memory (BAM), which includes a further variation, the Hopfield network. A BAM is a two layer network, with the neurons of one layer receiving all the outputs of the other layer, but none from its own layer. In a Hopfield network, there is only one layer of neurons, each receiving the outputs from all the neurons, including itself.

As noted above, the inputs are provided to a weighting system. One difficulty in the use of neural networks is the development of the weights. This typically requires a learning technique and certain learning rules. By far the most common and fundamental learning rule is Hebb's Rule:

$$\Delta W_{ij}=A_iO_j$$

where $\Delta W_{ij}$ is the weight change for the neuron j to neuron i link, $A_i$ is the activation value for neuron i and $O_j$ is the output of neuron j.

One major problem with Hebbian learning is that it typically results in a very small storage capacity, given the number of neurons. Thus Hebbian learning is very inefficient of neurons. Other improved learning techniques for BAMs and Hopfield networks still have the problem of small storage capacity, in view of the number of neurons.

With this very low storage density, use of BAM and Hopfield networks has been limited. While the primary use of such networks is pattern and character recognition, the very limited capacity of BAM and Hopfield networks has limited their use. If the memory capacity were increased, without overly sacrificing differentiation, then application of these two networks could greatly increase.

SUMMARY OF THE INVENTION

A system according to the present invention can readily use BAM and Hopfield neural networks for pattern recognition. An input pattern is provided to the system, with an output provided after an iteration period, if necessary. One major area of improvement is that a much greater number of patterns can be memorized for a given number of neurons. Indeed, for BAM networks the number of patterns memorized can equal the number of neurons in the smaller layer, while for Hopfield networks the number of patterns exceeds the number of neurons.

This greater storage capability is developed by an iterative learning technique. The technique can generally be referred to as successive over-relation. For use with a BAM the following rules are applied.

$$\Delta W_{ji}=-\frac{1+\lambda}{1+n}\,[S_{Y_j}^{(k)}-\xi Y_j^{(k)}]X_i^{(k)}$$

$$\Delta\theta_{Y_j}=+\frac{1+\lambda}{1+n}\,[S_{Y_j}^{(k)}-\xi Y_j^{(k)}]$$

$$\text{if } S_{Y_j^{(k)}}\,Y_j<\xi$$

$$\text{where } S_{Y_j}^{(k)}=\sum_{i=1}^{n}W_{ij}X_i^{(k)}-\theta_{Y_j}$$

$$\Delta W_{ji}=-\frac{1+\lambda}{1+m}\,[S_{X_i}^{(k)}-\xi X_i^{(k)}]Y_j^{(k)}$$

$$\Delta\theta_{X_i}=+\frac{1+\lambda}{1+m}\,[S_{X_i}^{(k)}-\xi X_i^{(k)}]$$

$$\text{if } S_{X_i^{(k)}}\,X_{i^{(k)}}<\xi$$

$$\text{where } S_{X_i}^{(k)}=\sum_{j=1}^{m}W_{ij}Y_j^{(k)}-\theta_{X_i}$$

where $\Delta W_{ji}$ is the weight change for the jth neuron based on the ith input, $\lambda$ is an over-relaxation factor between 0 and 1, n and m are the number of neurons in the X and Y layers, $\Delta\theta_{Yj}$ and $\Delta\theta_{Xi}$ are the threshold value changes for the particular neuron, $S_{Xi}$ and $S_{Yj}$ are the net inputs to the ith and jth neuron in the respective layer, $\xi$ is a normalizing constant having a positive value, and $X^{(k)}$ are the k training vectors.

Similarly, the following learning rules for a Hopfield network are applied.

$$\Delta W_{ij}=-\frac{1+\lambda}{n}\,[S_i^{(k)}-\xi X_i^{(k)}]X_j^{(k)}$$

$$\text{if } S_{i^{(k)}}\,X_{i^{(k)}}<\xi$$

$$\Delta\theta_i=+\frac{1+\lambda}{n}\,[S_i^{(k)}-\xi X_i^{(k)}]$$

$$\text{if } S_{i^{(k)}}\,X_{i^{(k)}}<\xi$$

$$\text{where } S_i^{(k)}=\sum_{j=1}^{n}W_{ij}X_j^{(k)}-\theta_i,$$

$W_{ij}=W_{ji}$ and $W_{ii}=0$, and $\theta$ refers to the threshold level used in the threshold function.

The learning and training patterns are provided to the network with an initially random weighting and thresholding system. The net or thresholded but not normalized output of the network is then calculated. These output values are then utilized in the learning rules above and new weights and thresholds determined. The training patterns are again provided and a new net output is developed, which again is used in the learning rules. This process then continues until there is no sign change between any of the elements of the net output and the training pattern, for each training pattern. The training is complete and the network has memorized the training patterns.

After the training process is complete, live or true data inputs from a variety of sources can be provided to the network. A normalized output is then developed by the neurons of the network. This normalized output is then provided as the next input in a recognition iterative process, which occurs until a stable output develops, which is the network output. In the case of a Hopfield network, the output will be the exact pattern if a training pattern has been provided and the memory limits have not been exceeded, or will be what the network thinks is the closest pattern in all other cases. In the case of a BAM network, the output will be the exact associated element of the training pair if a training pattern has been provided and the memory limits have not been exceeded, or will be what the network thinks is the closest associated element in other cases.

With these learning rules, BAM networks have been developed capable of memorizing a number of patterns equal to the number of neurons in the smaller layer and Hopfield networks have been developed capable of memorizing a number of patterns well in excess of the number of neurons, for example 93 patterns in a 49 neuron network. This allows much greater pattern recognition accuracy than previous BAM and Hopfield networks, and therefore networks which are more useful in pattern recognition systems.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENTS

Figure 1:
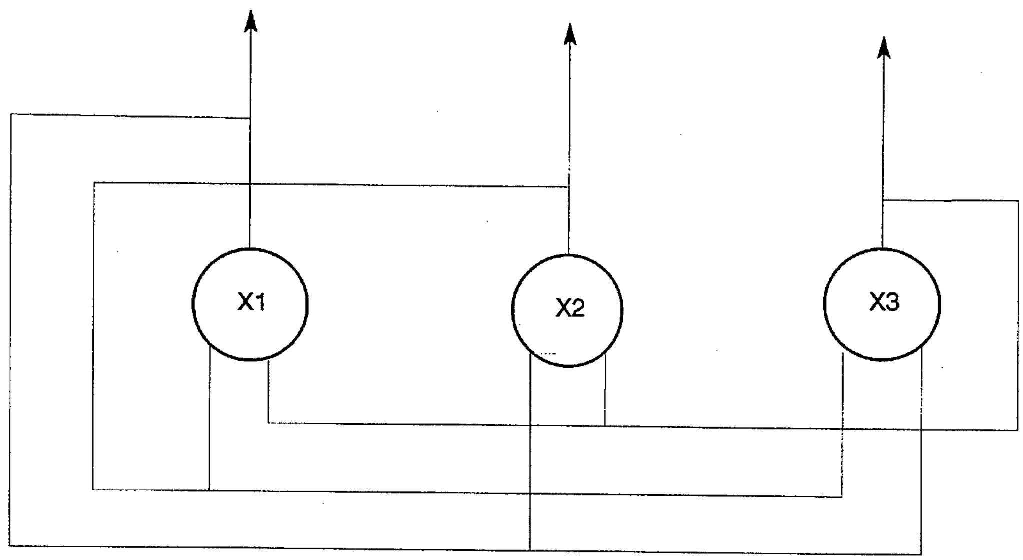
FIG. 1 illustrates the configuration of a Hopfield network.

Referring now to FIG. 1, a Hopfield network H is generally shown. As shown in the illustration, in a Hopfield network H the output of each neuron X is connected to the input of every neuron. This is shown, for example, by the output of neuron $X_1$ being connected to the inputs of neurons $X_1$, $X_2$ and $X_3$ for the network H. Similarly, the output of neuron $X_2$ is connected to the inputs of each of the three neurons and so on. Contained inside each neuron is a weighting network to weigh the particular inputs to form a sum, which is then thresholded and normalized according to a conventional threshold and normalization technique. For example, a common threshold and normalization technique converts any numbers or sums which are positive to a value 1 and any sums which are negative to a value 0. Another common threshold and normalization technique converts positive sums to a value 1 and negative sums to a value −1.

Figure 2:
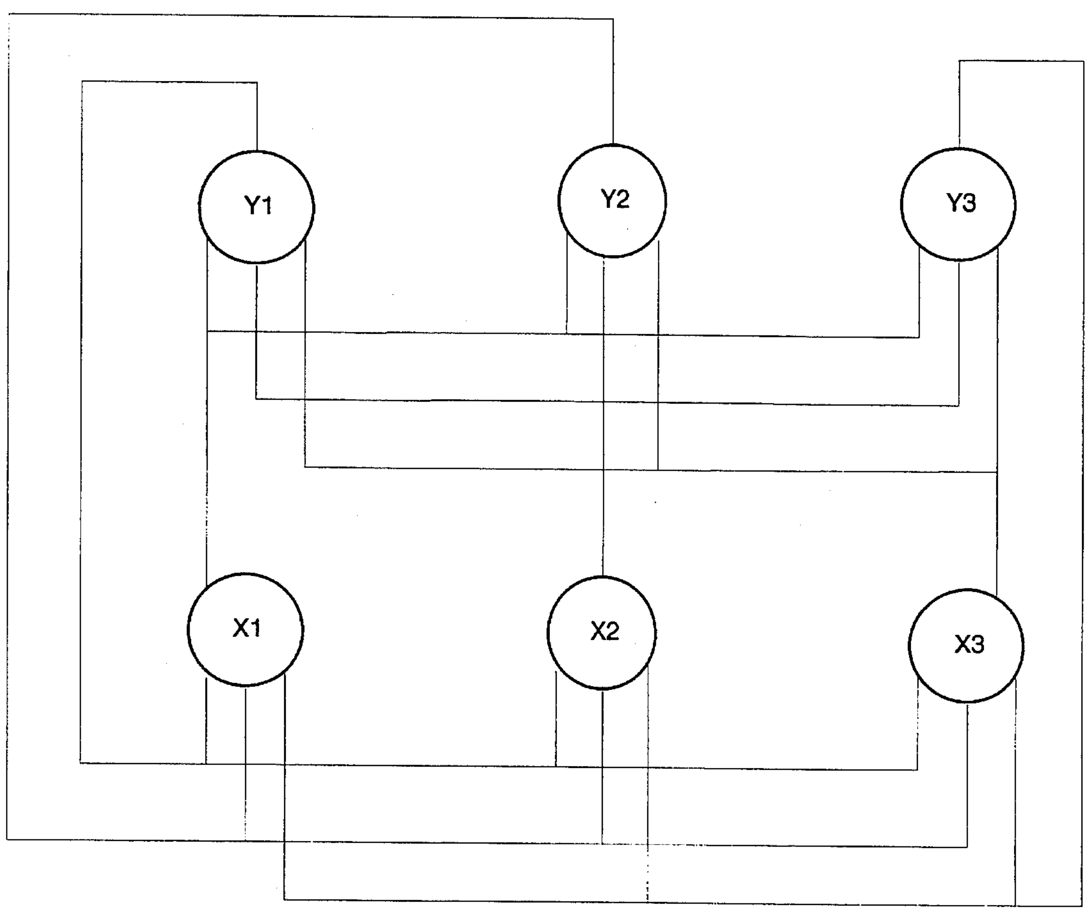
FIG. 2 illustrates the configuration of a BAM network.

FIG. 2 illustrates a simple bidirectional associative memory or BAM B. In a BAM B as illustrated, there are two layers, rows or vectors of neurons X and Y. The output of each X neuron is connected to the input of every Y neuron and not connected to any of the inputs of the X neurons. Similarly, the output of each Y neuron is connected to the input of each and all X neurons but none of the Y neurons. While a Hopfield network H is preferably thought of as a CAM or content addressable memory, which on providing an input preferably provides the similar or closest related output, a BAM B utilizes pairs of values such that when an input is provided at one set of neurons, the other set of neurons produces as an output the associated pair with which it was trained, or the closest value.

Figure 3:
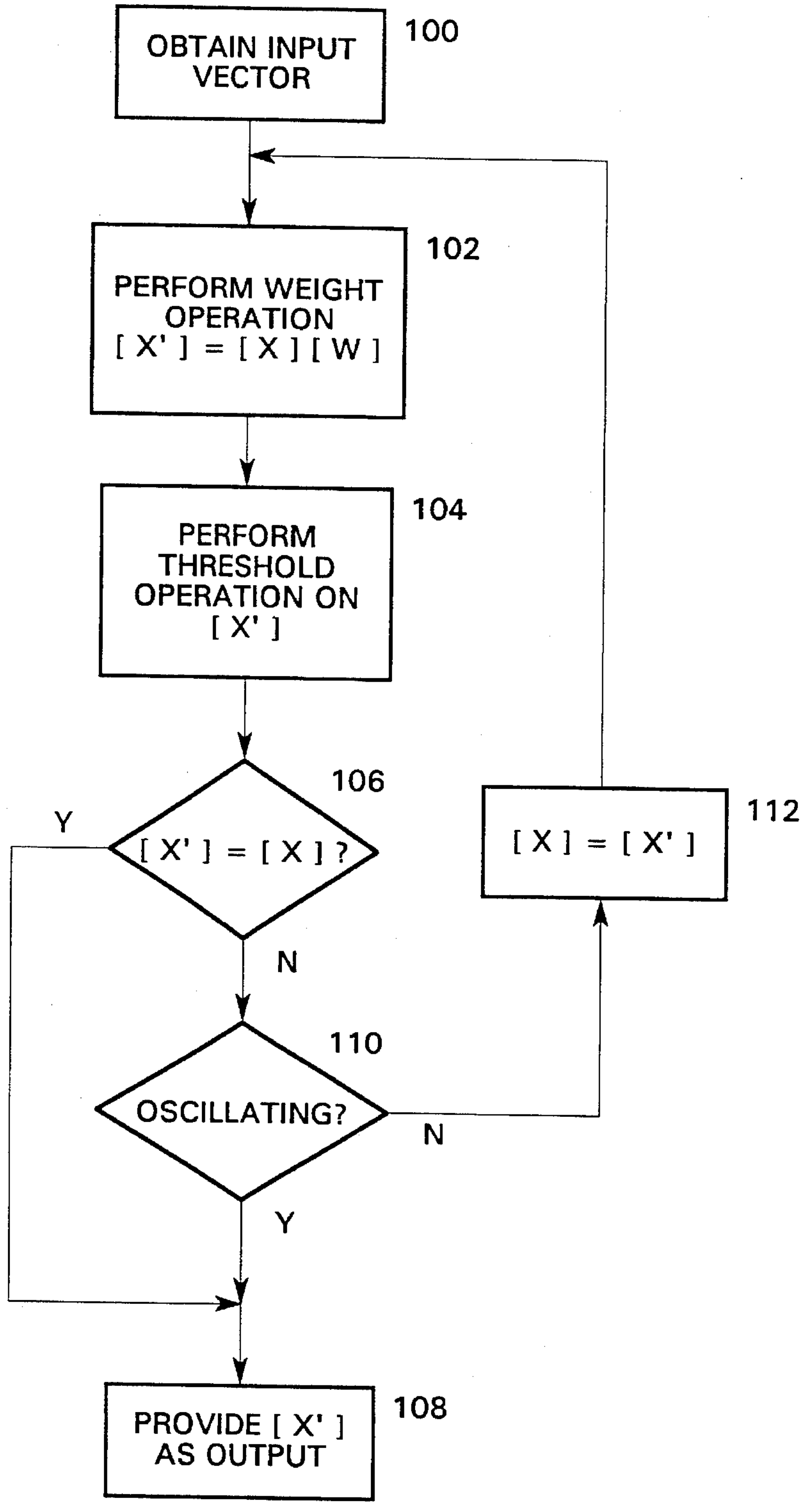
FIG. 3 is a flowchart of the normal operations of a Hopfield network.

FIG. 3 illustrates the normal operation of a Hopfield network. At step 100 the input vector is obtained. In this detailed description the discussion will generally involve vectors and matrices, these being the conventional techniques for operating synchronous Hopfield or BAM neural networks. It is understood that asynchronous operation could also utilize the techniques according to the present invention. After the input vector is obtained, control proceeds to step 102, where the weighting operation is performed. In the case of a Hopfield network H, this is performed by multiplying the input vector X times the weighting matrix W to produce an output vector X'. In this case the input vector is referred to as X and the output vector is referred to as X' because the operation to develop an output is generally an iterative operation. The weighting matrix W is generally a square matrix having a 0 major diagonal and equal values across the major diagonal.

After the output vector X' is developed, control proceeds to step 104, where a threshold and normalize function is performed on the output vector X'. As previously stated, a conventional thresholding and normalizing operation for a Hopfield network H is used in the preferred embodiment. In the preferred embodiment the operation takes all values which are positive and assigns them a value of 1 and takes all values which are less than 0 and assigns them a value of −1. Control then proceeds to step 106, to determine if the output vector X' is equal to the input vector X. This would be an indication that the solution has converged and iteration is no longer necessary. If so, control proceeds to step 108 and the X' vector is provided as the output. If they are not equal, control proceeds to step 110 to determine if the output vector X' is oscillating. If so, it is considered effectively stable and control proceeds to step 108. If not, control proceeds from step 110 to step 112, where the input vector X is made equal to the previous output vector X' so that the next pass through the process can occur. Control then proceeds to step 102 to perform the weighting operation and the loop continues.

Figure 4:
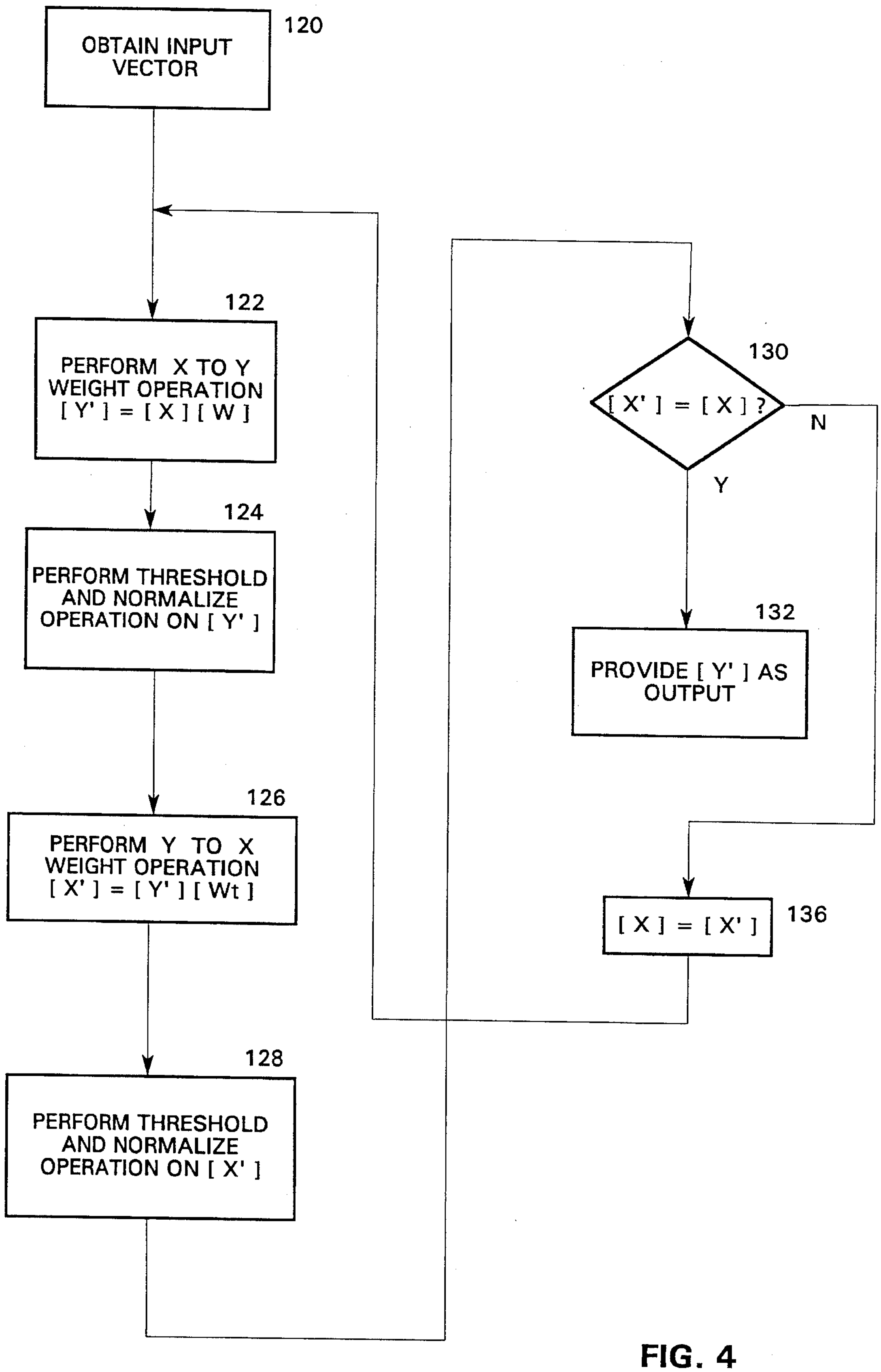
FIG. 4 is a flowchart of the normal operations of a BAM network.

Normal operation of a BAM B is illustrated in FIG. 4. In step 120 the input vector, in this case referred to as an X vector, is obtained. Control proceeds to step 122, where the X to Y weighting operation is performed. This is performed by multiplying the input vector X times the weighting matrix W to produce the output vector Y'. Control then proceeds to step 124 where a thresholding and normalizing operation is performed on the output vector Y'. Control proceeds to step 126, where the Y to X weighting operation is performed. This is performed by multiplying the Y' vector times the transpose of the weighting matrix $W^T$ to produce the X' vector. In step 128 the X' vector is thresheld and normalized and control proceeds to step 130. In step 130 a determination is made as to whether the input vector X is equal to output vector X'. If so, this is an indication that the result has converged and is stable and control proceeds to step 132, where the Y' vector is provided as the output. If not, control proceeds to step 136, where the X vector is made equal to the X' vector, that is the input is made equal to the output. This has been normal operation for conventional Hopfield and BAM networks according to the present invention.

Figure 5A:
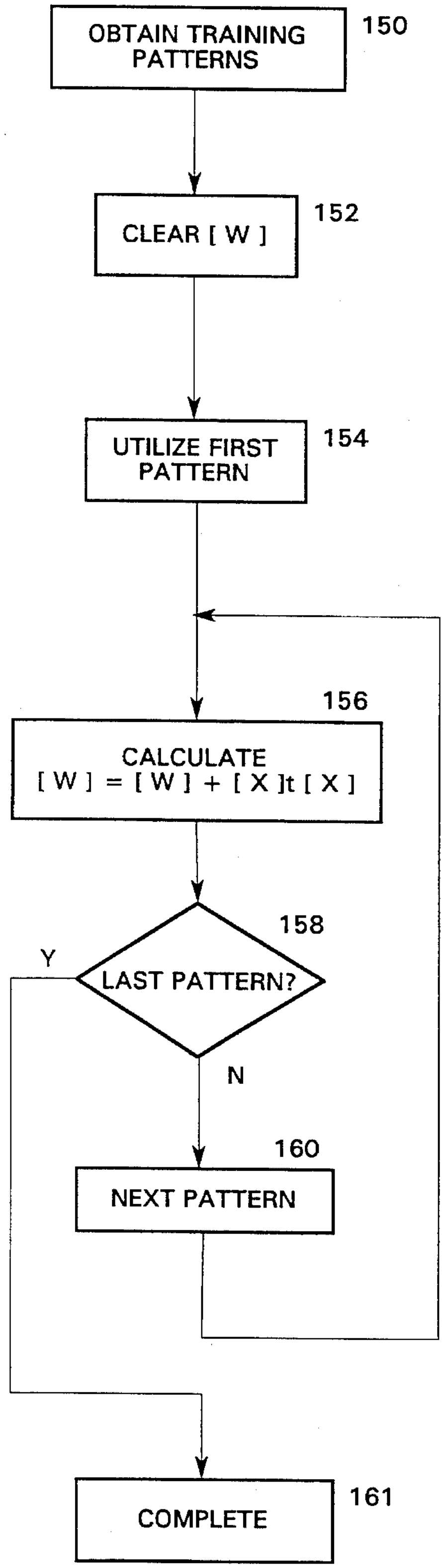
FIG. 5A and 5B are flowcharts of Hebbian learning for Hopfield and BAM networks.

It is necessary to develop the weight matrix W through some sort of training process. In FIG. 5A the training process for the Hebbian rule in a Hopfield network H is shown. The Hebbian network weighting rule is generally shown by the equation: $W=\Sigma X^T X$. This is shown in FIG. 5A where the initial training patterns or vectors are obtained in step 150. In step 152 the weight matrix W is cleared to 0. In step 154 the first training pattern is utilized a vector X. That particular training pattern's input to the weighting matrix W is determined in step 156 where the weight matrix W is added to the result of multiplying the transpose of the input vector X times the input vector or pattern X. This provides that input for that particular training pattern. Control proceeds to step 158 to determine if this was the last pattern. If not, control proceeds to step 160, where the next pattern is utilized as X. Control then proceeds to step 156, where this next pattern is then added to the on-going sum of the weighting matrix W. If it was the last pattern in step 158, control proceeds to step 161, where it is indicated that training is complete. Thus it can be seen that Hebbian learning is simple, straightforward and very fast. However, as noted in the background, there are great problems in Hebbian learning in Hopfield networks because the storage density in terms of number of patterns that can be perfectly recognized versus the number of neurons is quite small.

Figure 5B:
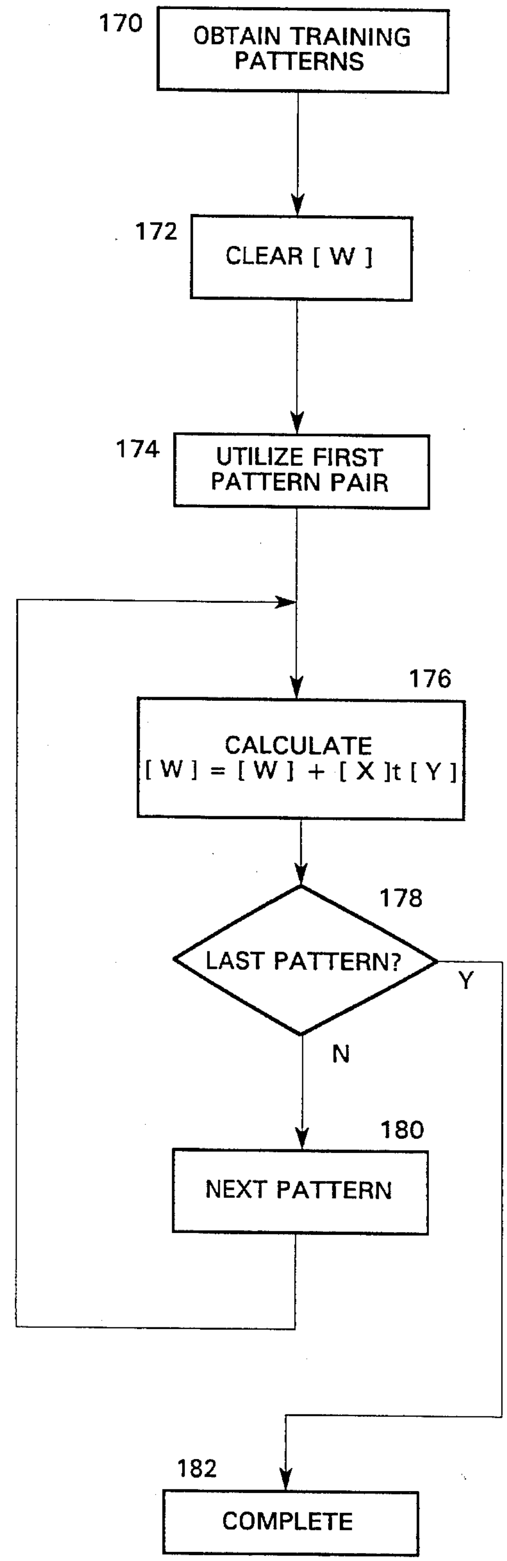

FIG. 5B shows similar training or weight matrix W development for a BAM B. At step 170 the training patterns are obtained. In step 172 the weight matrix is cleared. In step 174 the first training pattern pair, i.e. the X and Y values, are utilized as the X and Y vectors. In step 176 the transpose of the X training vector X and the Y training vector Y are multiplied and added to the existing weight matrix W to produce the new weight matrix W. Control proceeds to step 178 to determine if this was the last pattern pair. If not, control proceeds to the step 180 where the next pattern pair is utilized as X and Y vectors. Control then proceeds to step 176 to complete the summing operation. If the last pattern had been utilized, control proceeds from step 178 to step 182 to indicate that the weight matrix development operation is complete. Again, Hebbian learning is simple, straightforward and fast, but also again the storage density problems are present in a BAM.

Figure 6:
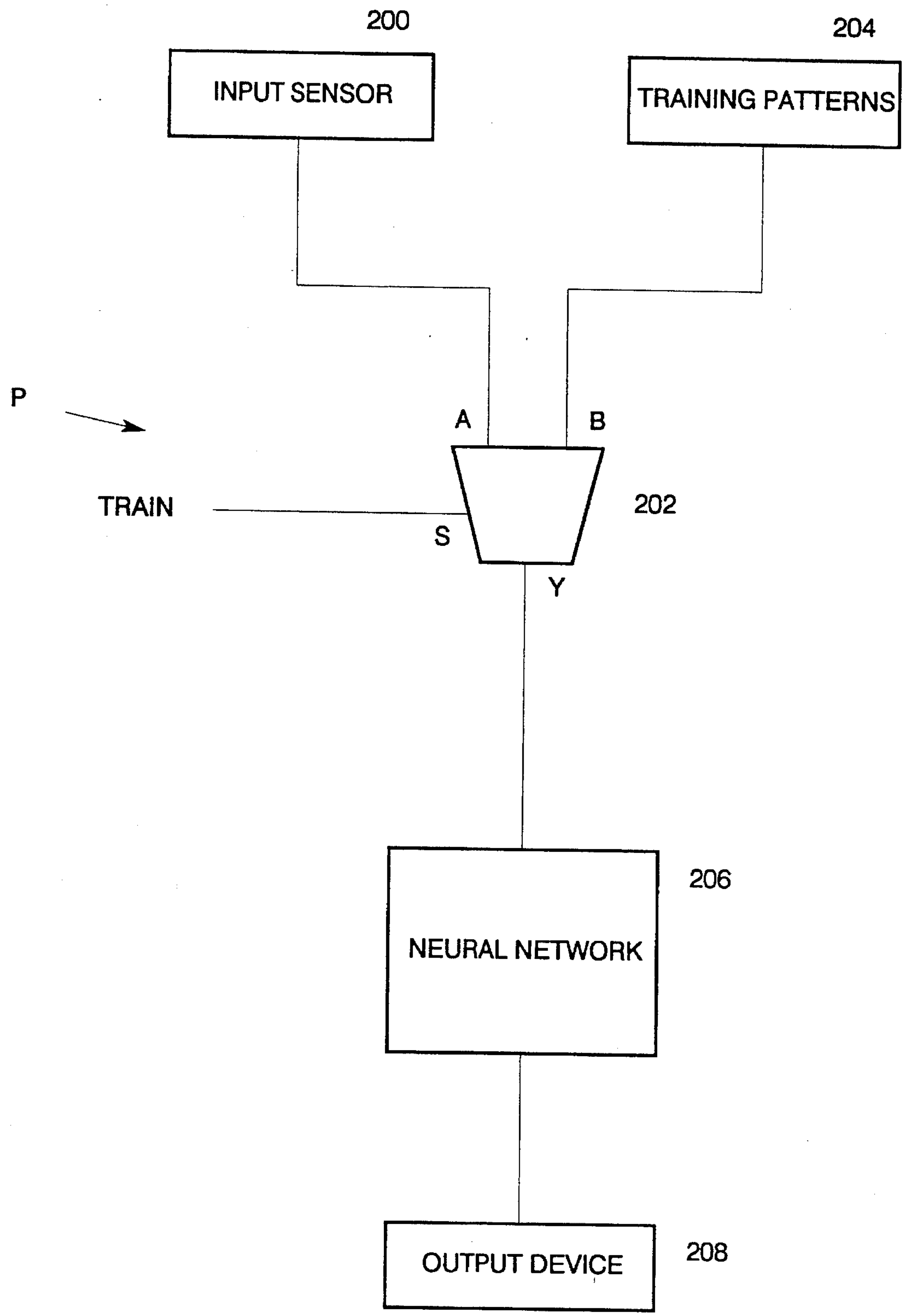
FIG. 6 is a block diagram of a pattern recognition system according to the present invention.

Shown in FIG. 6 is a pattern recognition system P incorporating neural networks according to the present invention. The pattern recognition system includes an input sensor 200 to provide the main or the data input to the pattern recognition system P. This input sensor 200 can be any of a series of input sensors commonly used, such as a video input from a camera system which has been converted to a digital format; optical character recognition values, preferably also converted into a digital or matrix format; various magnetic matrix sensors; data obtained from a keyboard input; digitized radio wave digitized data; other digitized analog data values and so on. The output of the input sensor 200 is provided to the first input of a multiplexor 202. A series of training patterns are contained in a training pattern unit 204. The output of the training pattern unit 204 is provided to the second input of the multiplexor 202. In this manner either actual operation inputs can be obtained from the input sensor 200 or training patterns can be obtained from the unit 204, depending upon whether a neural network 206 in the pattern recognition system P is in operational mode or training mode. The output of the multiplexor 202 is provided to the neural network 206 which is developed according to the present invention. An input signal referred to as TRAIN is provided to the multiplexor 202 and the neural network 206 to allow indication and selection of which values are being provided. The output of the neural network 206 is provided to an output device 208 as necessary for the particular application of the pattern recognition systems. This could be, for example, but is not limited to, a video output device to show the recognized pattern, could be a simple light in an array to indicate a pattern selection, or, in the case of a BAM, could be the graphic character representative of an ASCII character provided by the input sensor 202.

Examples other than those suggested above for Hopfield networks include situations where the filtering or association characteristics of a Hopfield network are desired, such as cleaning up noisy data or selecting items when entire data components are missing. Examples other than those suggested above for BAM networks include situations where the output is desired in a different format from the input, such as optical character recognition, where a scanner output pixel matrix is provided as the input and an ASCII character is the output; object identification, where a digitized image of the object is provided as the input and an identification code or name is the output, for example, aircraft silhouettes and aircraft name; and component silhouette input and component orientation output; or geographic boundaries input and the property or feature name output.

As an alternative to the system P shown in FIG. 6, the training patterns 204 can be provided to a neural network 206 implemented on a supercomputer to allow faster development of the weight matrix W. The final weight matrix W could be transferred to a personal computer or similar lower performance system implementing the neural network 206 and having only an input sensor 200. This is a desirable solution when the system will be used in a situation where the application data is fixed and numerous installations are desired. It also simplifies end user operations.

Figure 7:
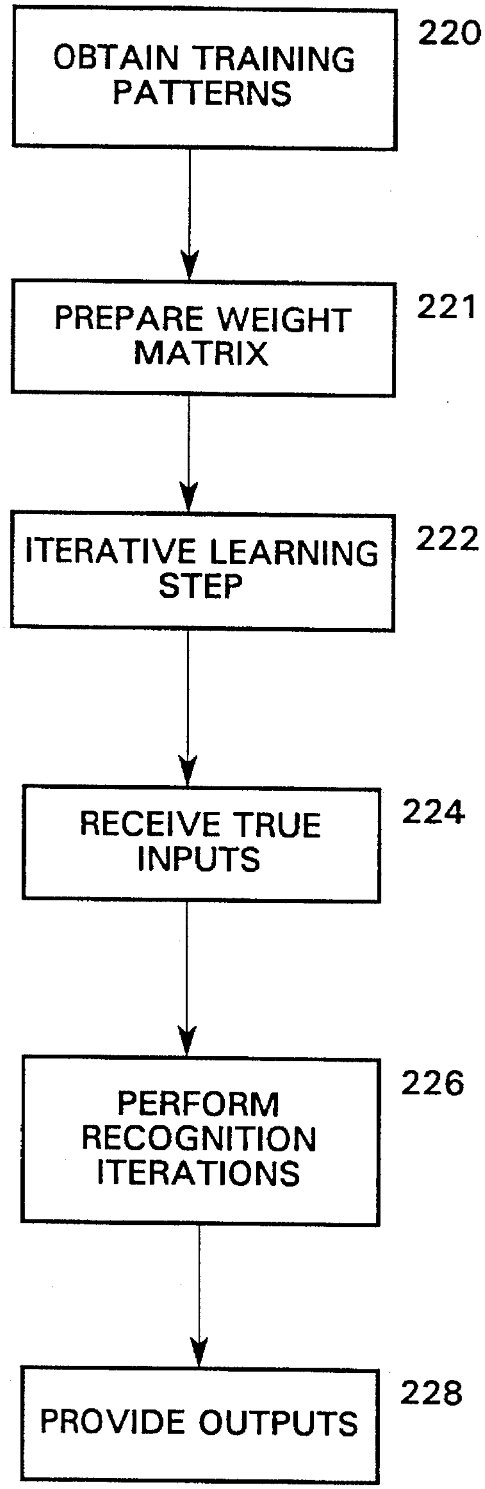
FIG. 7 is a flowchart of the basic operation of the network of FIG. 6.

The basic operation of the pattern recognition system P is shown in FIG. 7. In step 220 the neural network system 206 receives the set of training patterns from the training unit 204. In step 221 the weight matrix is prepared by the neural network 206. This typically involves randomly setting weight values in the matrix. In step 222 the iterative learning technique according to the present invention is performed by the neural network 206 to complete the development of the weight matrix. After the iterative learning step 222 is complete, the neural network 206 is ready for operation and in step 224 operational or true inputs from the input sensor 200 are received by the neural network 206. The network 206 then performs the standard iterative recognition output loop as shown in FIGS. 3 and 4 in step 226. As a result of the iterations, an output is provided in step 228 to the output device 208. Details of various of the steps are shown in the following Figures.

Figure 8:
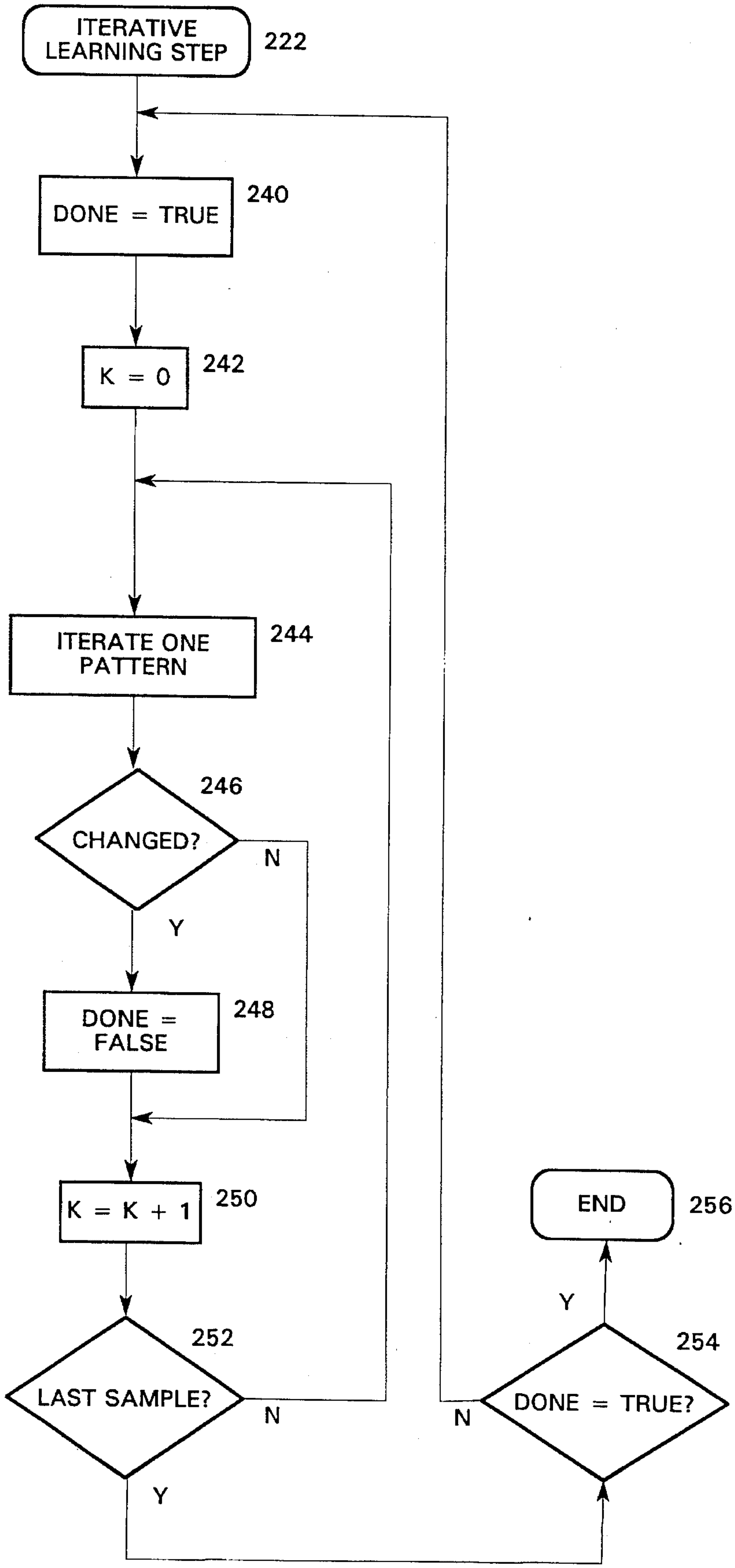
FIG. 8 is a flowchart of the iterative learning step of FIG. 7.

FIG. 8 shows the iterative learning step 222. In step 240 a value referred to as DONE is set equal to true to allow a determination if all iterations have been completed. A value referred to as k, which is used to track the number of training inputs or patterns, is set equal to 0 in step 242, In step 244 one training pattern or input is iterated. Control then proceeds to step 246 to determine if the net output, as later defined, of neurons in the network has changed from the input. This is preferably done by determining if the signs of any of the elements of the net output vector are different from the signs of the equivalent elements of the input vector. If so, control proceeds to step 248, where the DONE value is equal to false. After step 248 or if the net output vector had not changed, control proceeds to step 250 where the k value or pattern counter is incremented. Control proceeds to step 252 to determine if this was the last sample or training pattern. If not, control returns to step 244, where the next training pattern is iterated into the weight matrix. If this was the last pattern, control proceeds to step 254 to determine if the DONE value is equal to true. If it is not, this is an indication that convergence has not occurred and control returns to step 240 for another pass through the training patterns. For purposes of this description, one pass through all the training patterns is considered an epoch. If the DONE value is equal to true after a complete pass through all the training patterns, then convergence has occurred and the weighting matrix is fully developed. Control then proceeds to step 256 which is the end of the learning process and control then proceeds to step 224.

Figure 9:
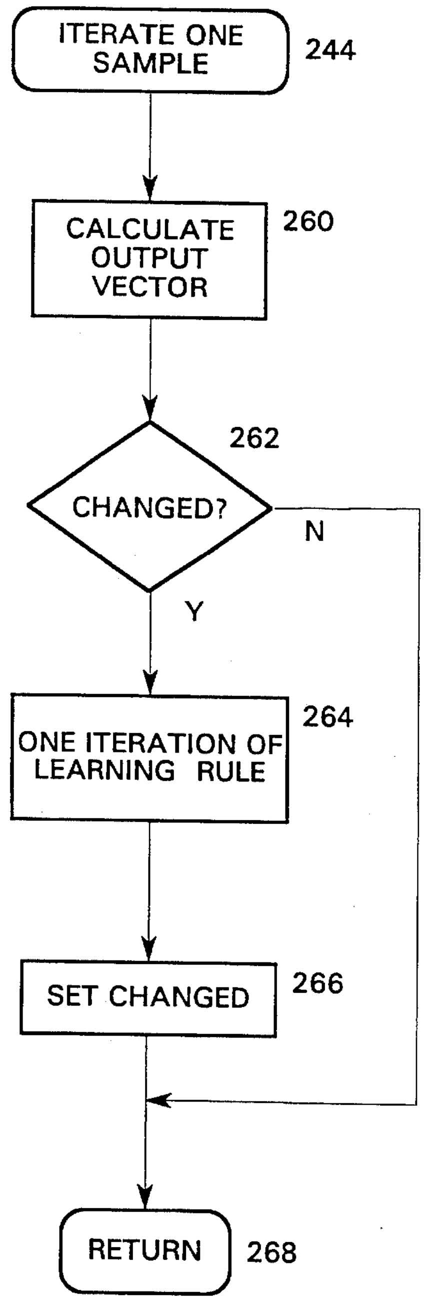
FIG. 9 is a flowchart of one iteration operation of FIG. 8.

FIG. 9 illustrates the operations of step 244 of iterating one sample. Control commences at step 260 where a net output vector is calculated. The input for determining this net output vector is the particular training pattern provided and being utilized in that particular pass through the iterative learning process of step 222. Control proceeds to step 262 to determine if the signs of the elements of the net output vector are not equal to signs of the elements of the input vector. If they are different, this is an indication that the learning has not been completed and so control proceeds to step 264, where an iteration is accomplished according to the learning rules which are explained shortly hereafter. After completing the training iteration, control proceeds to step 266 where a value is set to indicate that a change has occurred. Control then proceeds to step 268, which is a return to step 246 to determine if the change had occurred. If there was no sign change between the elements of the output and input vectors in step 262, control proceeds directly to step 268.

The learning rules according to the present invention utilize a technique referred to as successive over-relaxation. Two factors are used in over-relaxation, the over-relaxation factor λ and the normalizing constant ξ. The over-relaxation factor λ must be between 0 and 1. As a general trend, the greater the over-relaxation factor λ, the fewer iterations necessary. This is noted as only a general trend and is not true in all instances. The normalization constant ξ must be positive and is used to globally increase the magnitude of each weight and threshold value.

The iteration or learning rule of a Hopfield network according to the present invention is as follows:

$$\Delta W_{ij} = -\frac{1+\lambda}{n}\,[S_i^{(k)} - \xi X_i^{(k)}]X_j^{(k)}$$

$$\text{if } S_{i^{(k)}}\, X_{i^{(k)}} < \xi$$

$$\Delta\theta_i = +\frac{1+\lambda}{n}\,[S_i^{(k)} - \xi X_i^{(k)}]$$

$$\text{if } S_{i^{(k)}}\, X_{i^{(k)}} < \xi$$

$$\text{where } S_i^{(k)} = \sum_{j=1}^{n} W_{ij}X_j^{(k)} - \theta_i,$$

W is the weighting matrix, so $\Delta W_{ij}$ is the change in the value of the ith row and jth column or the ith neuron based on the jth neuron. λ is an over-relaxation factor having a value between 0 and 1. ξ is a normalizing constant having a positive value. θ is the threshold matrix, the preferred embodiment using a continuous threshold value, so $\Delta\theta_i$ is change in the ith threshold vector. $S_i$ is the net output of the ith neuron, which output has been thresheld but not normalized. N is the number of neurons in the Hopfield network.

For a BAM network B the iterative training or learning rule is shown below:

$$\Delta W_{ji} = -\frac{1+\lambda}{1+n}\,[S_{Y_j}^{(k)} - \xi Y_j^{(k)}]X_i^{(k)}$$

$$\Delta\theta_{Y_j} = +\frac{1+\lambda}{1+n}\,[S_{Y_j}^{(k)} - \xi Y_j^{(k)}]$$

$$\text{if } S^{(k)YJ}\, Y_{j^{(k)}} < \xi$$

$$\text{where } S_{Y_j}^{(k)} = \sum_{i=1}^{n} W_{ij}X_i^{(k)} - \theta_{Y_i}$$

$$\Delta W_{ji} = -\frac{1+\lambda}{1+m}\,[S_{X_i}^{(k)} - \xi X_i^{(k)}]Y_j^{(k)}$$

$$\Delta\theta_{X_i} = +\frac{1+\lambda}{1+m}\,[S_{X_i}^{(k)} - \xi X_i^{(k)}]$$

$$\text{if } S_{X_i^{(k)}}\, X_{i^{(k)}} < \xi$$

$$\text{where } S_{X_i}^{(k)} = \sum_{j=1}^{m} W_{ij}Y_j^{(k)} - \theta_{X_i}$$

W is the weight matrix, so $\Delta W_{ji}$ is the change in value of the jth row and ith column. For the X to Y training this represents the jth Y neuron based on the ith X neuron. For Y to X training, this represents the ith X neuron based on the jth Y neuron. λ is the over-relaxation factor, again having a value between 0 and 1. ξ is the normalizing constant having a positive value. N and m are the number of X and Y layer neurons, respectively. $S_{X_i}$ and $S_{Y_j}$ are the net outputs of the Y and X layer neurons, which outputs have been thresheld but not normalized. To fully do an iteration of a BAM network B, first the weighting matrix W changes as a result of the X to Y output are developed based on the X training input. Then the Y training pattern or input is used in the Y to X transfer so that a second set of changes is made to the weighting matrix W. This back and forth operation is shown in the two $\Delta W_{ji}$ equations, first for the X to Y direction and then the Y to X direction. Thus the BAM network iterative training can be considered as the training of two single layers in a neural network, this being the more general format of training according to the present invention. Therefore training according to the present invention can be utilized to develop the weights for any single layer in a neural network by properly specifying the input and output vectors and properly changing the $\Delta W_{ij}$, $\Delta\theta$ and S equations.

Figure 10:
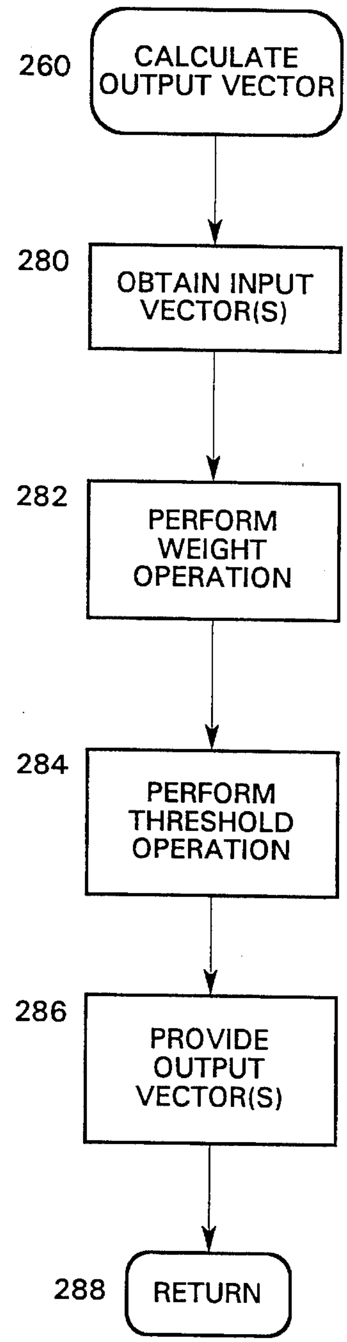
FIG. 10 is a flowchart of the net output operation of FIG. 9.

FIG. 10 is a flowchart of the calculate net output vector step 260 which is used to develop the net output vectors used to determine if the iterative process is stable and used in the above iteration rules. Control proceeds to step 280, where the particular input pattern or training set vector, or vectors in the case of a BAM, is obtained. Control proceeds to step 282, where the appropriate weighting operation is performed as shown in FIGS. 3 or 4. Control then proceeds to step 284, where a thresholding operation but not an activation or normalization function is performed. For Hopfield networks this indicates that the thresholds are subtracted from the particular X vectors as shown below:

$$S_i^{(k)} = \sum_{j=1}^{n} W_{ij}X_j^{(k)} - \theta_i$$

For BAM networks the operation is shown below:

$$S_{X_i}^{(k)} = \sum_{j=1}^{m} W_{ij}Y_j - \theta_{X_i}$$

$$S_{Y_j}^{(k)} = \sum_{i=1}^{n} W_{ij}X_i - \theta_{Y_i}$$

After performing the threshold operation in step 284, control proceeds to step 286, where the output vectors are stored and to step 288 where operation returns to step 266.

A series of tests are shown in Appendix 1 to illustrate simple examples of the operation of a pattern recognition system P according to the present invention. Contained in Appendix 1 are a series of input and output patterns and intermediate weight matrix illustrations to show the training process by illustrating the changes in the weight matrix over the various training patterns and epochs. Also shown is the memory capacity and noise robustness of a neural network trained according to the present invention in comparison to a Hebbian trained network. In example A the exemplar or training patterns are shown under heading I. In Example A the training patterns are 5 different 3×3 or nine location patterns, using nine neurons. Heading II shows the memory capacity of a Hebbian trained network and an iteratively trained network according to the present invention. As can be seen, the Hebbian trained network has not memorized many of the patterns while the iteratively trained network has memorized all of the patterns. It is noted that the complete number of iterations necessary to develop the final output are shown to indicate that the training pattern according to the present invention allows direct output of the training inputs in one iteration, wherein the Hebbian learning technique may take several iterations. Heading III is an illustration of random 10% noise applied to the training patterns, with the resulting iterations and final outputs as shown. Following the input and output drawings is the Hebbian weight matrix developed according to FIG. 5. Shown on the following pages of Example A are the various iterations of the weight matrix W through each pattern for each epoch, which epochs are indicated as the numbers 1, 2 and 3. Therefore the final value on the last page of Example A is the final weight matrix for the trained network of Example A and would be compared to the Hebbian weight matrix to see the various differences.

Examples B and C of Appendix 1 show other 3×3 or 9 neuron examples with five training patterns and show similar results as Example A. Example D is a slightly more complicated example which uses 49 neurons which receive an input value conventionally organized as a 7×7 matrix. One neuron was dedicated to each pixel in the 7×7 array. The training set was based on patterns from the IBM PC CGA font. Example D shows the training patterns being the 10 decimal digits. It is noted that all 10 digits were perfectly memorized in a Hopfield network trained according to the present invention, in contrast to the Hebbian trained network which could memorize only 3 of the 10 digits.

Example E is just the Sections I, II and III patterns for a network trained in the entire 93 characters in the CGA character set. These 93 characters were stored in 49 neurons when training according to the present invention was utilized. In Example E the various weight matrix outputs have been deleted for the sake of brevity.

A series of simulation tests were performed for both the Hopfield and the BAM networks. The table below illustrates the results of 500 trials in a Hopfield network:

TABLE 1

| | | | learning epochs | | | |
|---|---|---|---|---|---|---|
| type | patterns | neurons | min | max | avg. | std. dev. |
| digit | 10 | 49 | 3 | 5 | 3.54 | 0.55 |
| upper case | 26 | 49 | 4 | 8 | 5.20 | 0.70 |
| lower case | 26 | 49 | 4 | 8 | 5.06 | 0.57 |
| special | 31 | 49 | 5 | 9 | 6.75 | 0.89 |
| all of them | 93 | 49 | 9 | 15 | 11.46 | 1.14 |

In Table 1 the CGA character fonts were the basic training patterns. Table 2 below illustrates the number epochs for random patterns. As indicated, the number of random patterns equaled the number of neurons. The epoch values were developed from over 100 trials.

TABLE 2

| | | | learning epochs | | | |
|---|---|---|---|---|---|---|
| type | patterns | neurons | min | max | avg. | std. dev. |
| random | 50 | 50 | 6 | 9 | 7.02 | 0.77 |
| random | 100 | 100 | 6 | 8 | 6.95 | 0.50 |

TABLE 2-continued

| | | | learning epochs | | | |
|---|---|---|---|---|---|---|
| type | patterns | neurons | min | max | avg. | std. dev. |
| random | 150 | 150 | 6 | 8 | 7.02 | 0.55 |
| random | 200 | 200 | 6 | 9 | 7.12 | 0.41 |
| random | 250 | 250 | 6 | 8 | 7.17 | 0.40 |
| random | 300 | 300 | 7 | 8 | 7.15 | 0.36 |

Figure 11:
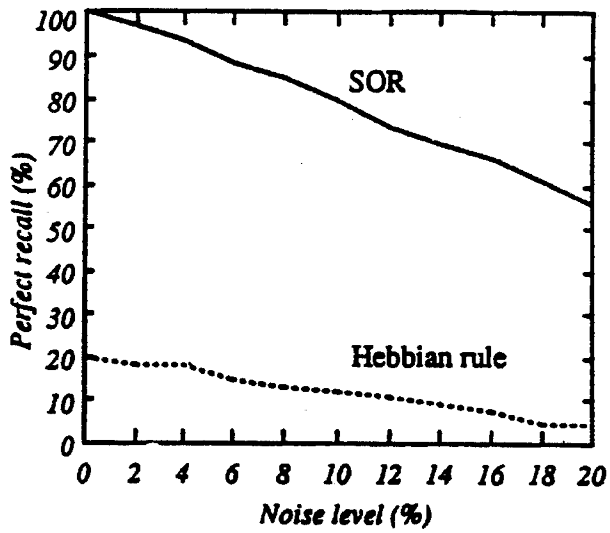
FIGS. 11–14 are graphs of various tests performed on neural networks according to the present invention.
Figure 12:
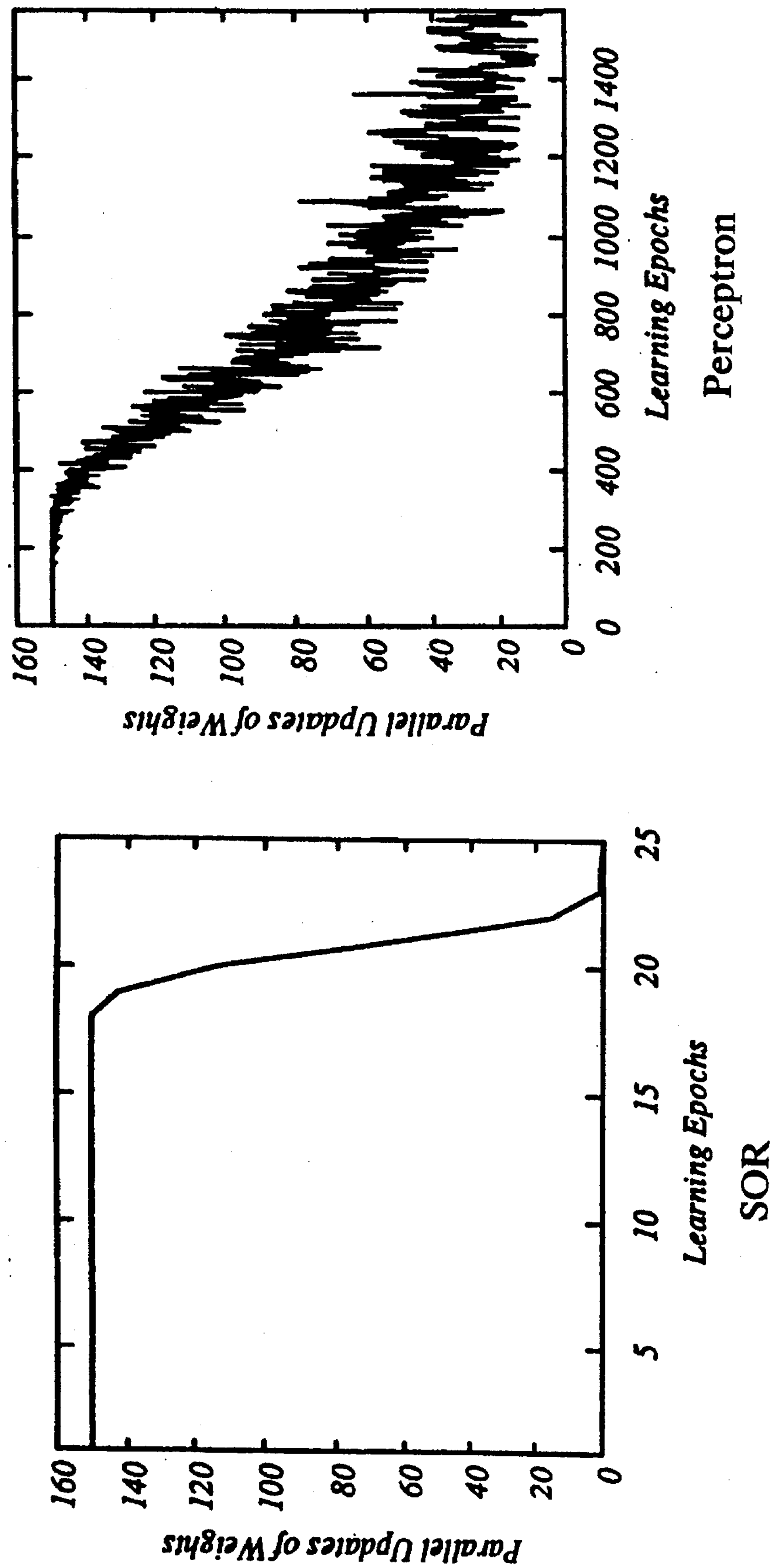

Certain tests were performed where 150 patterns were stored in 100 neurons. An average of approximately 20 epochs was needed. However, to store 300 patterns in 200 neurons required an average of only approximately 12 epochs. FIG. 11 is a graph illustrating noise level and recall of a Hopfield network of 49 neurons and the 10 CGA digits for both Hebbian and the present successive over-relaxation (SOR) training. As can be seen, the network trained according to the present invention successfully recalls more values than the Hebbian trained network at any noise level. FIG. 12 illustrates the epochs required for storing 150 patterns in a 100 neuron Hopfield network using present invention SOR learning and perceptron learning. As illustrated, the present invention training requires appreciably fewer iterations or epochs to converge.

Similarly, tests were performed for a BAM network using various numbers of neurons and various training techniques. Table 3 below illustrates one series of tests.

TABLE 3

| Neurons | Training Patterns | Kosko's Method | Multiple Training | Present Meth-od | Learning Epochs avg. | std dev |
|---|---|---|---|---|---|---|
| 100–100 | 50 | 8 | 11 | 50 | 6.77 | 0.0255 |
| 145–145 | 50 | 11 | 14 | 50 | 5.70 | 0.61 |
| 200–200 | 100 | 12 | 18 | 100 | 7.51 | 0.67 |
| 225–225 | 100 | 14 | 20 | 100 | 7.00 | 0.76 |

Between 200 neurons, split evenly in X and Y layers, and 450 neurons, also evenly split, were used with 50 to 100 patterns. A first training method was Hebbian learning as proposed by B. Kosko. A second training method was the multiple training proposed by P. Simpson in Bidirectional Associative Memory System, General Dynamics Electronics Division, Technical Report GDE-ISG-PKS-02, 1988 and Y. Wang, et al. in Two Coding Strategies for Bidirectional Associative Memory, IEEE Trans. on Neural Networks, Vol. 1 No. 1, March 1990, pgs. 81–91. The third method was training according to the present invention. As seen, only the present method stored all the patterns.

Table 4 below illustrates a comparison between the present method and perceptron learning.

TABLE 4

| Neurons | Training Patterns | Present Method avg. | std. dev. | Perception Method avg. | std. dev. |
|---|---|---|---|---|---|
| 50–50 | 50 | 18.05 | 2.35 | 217.50 | 53.18 |
| 100–100 | 100 | 20.51 | 1.59 | 459.51 | 88.54 |
| 150–150 | 150 | 20.54 | 1.42 | 645.11 | 94.03 |
| 200–200 | 200 | 21.54 | 1.27 | 948.93 | 185.87 |

Figure 13:
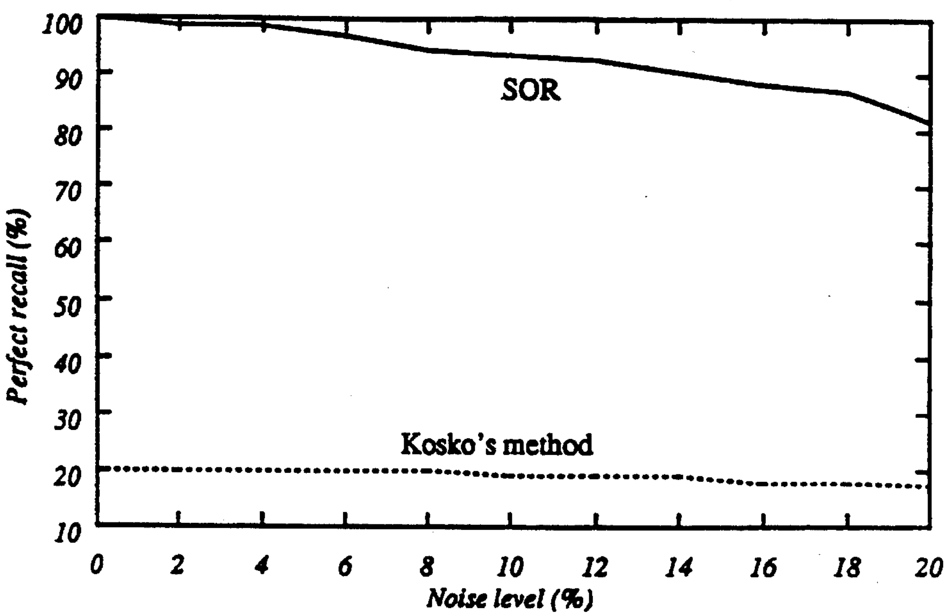
Figure 14:
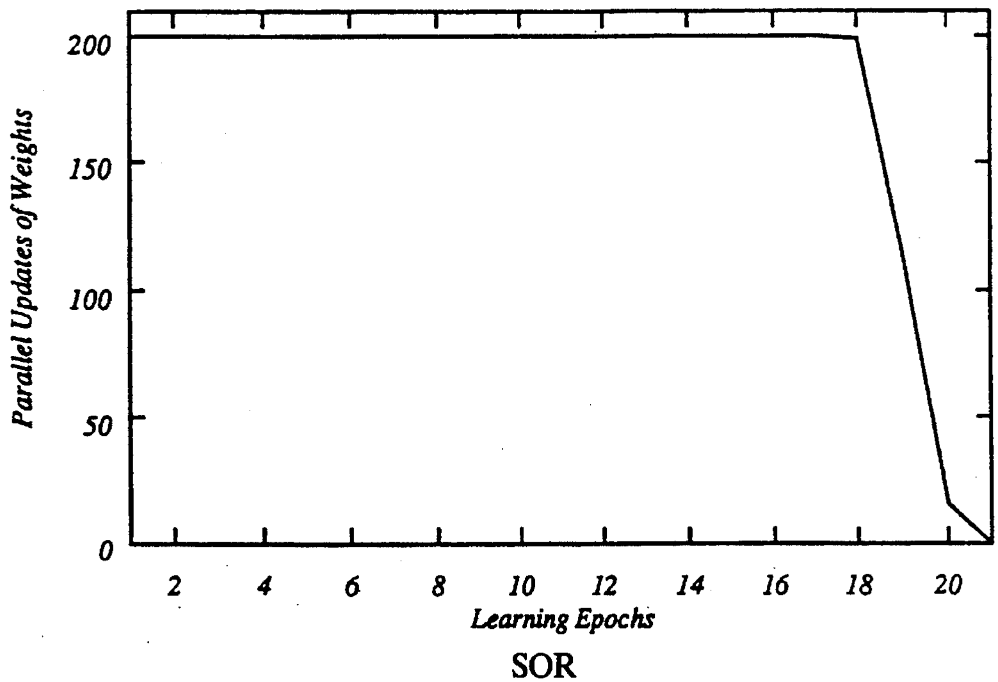
Figure 14:
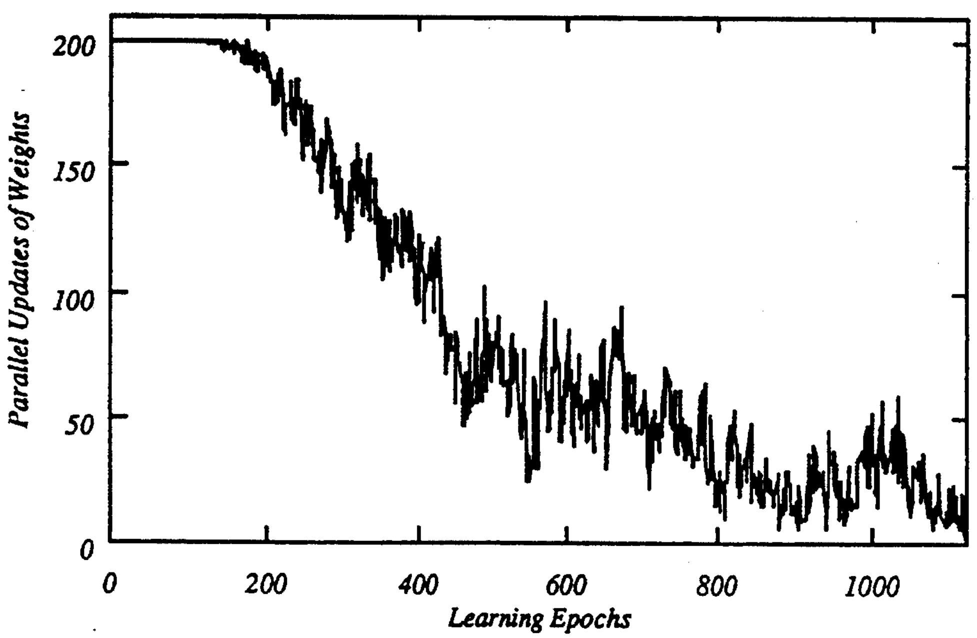

As can be seen the present method, required significantly fewer iterations or epochs. FIGS. 13 and 14 shows graphs for a BAM similar to FIGS. 11 and 12. FIG. 13 illustrates storage of the 5 CGA vowel pairs in a 49—49 network, while FIG. 14 illustrates 200 patterns in a 200—200 network.

Therefore a pattern recognition system P according to the present invention, and utilizing a neural network having learning capabilities as shown, has greatly increased memory capacity and a higher correlation on noisy inputs.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

EXHIBIT A

I. Examplar Patterns

```
<examplar 1>
X.X
.X.
..X

<examplar 2>
XXX
...
.X.

<examplar 3>
..X
X.X
..X

<examplar 4>
..X
.X.
X..

<examplar 5>
X.X
.X.
..X
```

II. Memory Capacity

```
<examplar 1> ( O : Hebb; X : Iter )
O.O  O.O
.O.  .O.
..O  ..O

X.X  X.X
.X.  .X.
..X  ..X

<examplar 2> ( O : Hebb; X : Iter )
OOO  OOO  OOO
...  .O.  .O.
.O.  .O.  .O.

XXX  XXX
...  ...
.X.  .X.
```

```
<examplar 3> ( O : Hebb; X : Iter )
..O  ..O  ..O
O.O  OOO  OOO
..O  ..O  ..O

..X  ..X
X.X  X.X
..X  ..X
```

```
<examplar 4> ( O : Hebb; X : Iter )
..O  O.O  O.O  O.O
.O.  .O.  .O.  .O.
O..  O.O  ..O  ..O

..X  ..X
.X.  .X.
X..  X..
```

```
<examplar 5> ( O : Hebb; X : Iter )
O.O  O.O
.O.  .O.
..O  ..O

X.X  X.X
.X.  .X.
..X  ..X
```

III. Noise Robustness

```
<examplar 1> ( O : Hebb; X : Iter )
O.O  O.O  O.O
.O.  .O.  .O.
.OO  ..O  ..O

X.X  XXX  X.X
.X.  ...  .X.
.XX  ...  .XX
```

```
<examplar 2> ( O : Hebb; X : Iter )
OO.  OOO  OO.  OO.  .O.  .O.  .O.
...  OOO  ...  OOO  O.O  O.O  O.O
.OO  .O.  OOO  .O.  OOO  OO.  OO.

XX.  XXX  XXX
...  ...  ...
.XX  .X.  .X.
```

```
<examplar 3> ( O : Hebb; X : Iter )
..O  ..O  ..O
O.O  OOO  OOO
..O  ..O  ..O

..X  ..X
X.X  X.X
..X  ..X

<examplar 4> ( O : Hebb; X : Iter )
.OO  O.O  OOO  O.O  O.O  O.O
...  .O.  .O.  .O.  .O.  .O.
O..  OO.  ...  .OO  ..O  ..O

.XX  ..X  ..X  ..X
...  .X.  ...  .X.
X..  XX.  X..  XX.

<examplar 5> ( O : Hebb; X : Iter )
O.O  O.O
.O.  .O.
..O  ..O

X.X  X.X
.X.  .X.
..X  ..X
```

| | | | | | | | | |
|---|---|---|---|---|---|---|---|---|
| 0 | 1 | 1 | -3 | 1 | -3 | -3 | 1 | 1 |
| 1 | 0 | -3 | 1 | -3 | 1 | 1 | 5 | -3 |
| 1 | -3 | 0 | -3 | 1 | -3 | -3 | -3 | 1 |
| -3 | 1 | -3 | 0 | -3 | 5 | 1 | 1 | 1 |
| 1 | -3 | 1 | -3 | 0 | -3 | 1 | -3 | 1 |
| -3 | 1 | -3 | 5 | -3 | 0 | 1 | 1 | 1 |
| -3 | 1 | -3 | 1 | 1 | 1 | 0 | 1 | -3 |
| 1 | 5 | -3 | 1 | -3 | 1 | 1 | 0 | -3 |
| 1 | -3 | 1 | 1 | 1 | 1 | -3 | -3 | 0 |

1

| | | | | | | | | |
|---|---|---|---|---|---|---|---|---|
| 0.00 | 0.24 | 0.59 | -0.06 | 1.0 | 0.42 | 0.00 | -0.23 | -0.61 |
| 0.24 | 0.00 | 0.02 | -0.60 | 0.21 | 0.72 | 0.64 | 1.15 | 0.46 |
| 0.59 | 0.02 | 0.00 | -0.43 | 0.09 | -0.89 | -0.07 | -0.42 | 0.87 |
| -0.06 | -0.60 | -0.43 | 0.00 | -1.03 | -0.23 | 0.29 | -0.29 | -0.77 |
| 1.0 | 0.21 | 0.09 | -1.03 | 0.00 | -0.36 | 0.20 | -0.78 | -0.31 |
| 0.42 | 0.72 | -0.89 | -0.23 | -0.36 | 0.00 | -0.14 | -0.45 | -0.70 |
| 0.00 | 0.64 | -0.07 | 0.29 | 0.20 | -0.14 | 0.00 | 0.82 | 0.17 |
| -0.23 | 1.15 | -0.42 | -0.29 | -0.78 | -0.45 | 0.82 | 0.00 | -0.96 |
| -0.61 | 0.46 | 0.87 | -0.77 | -0.31 | -0.70 | 0.17 | -0.96 | 0.00 |

1

| | | | | | | | | |
|---|---|---|---|---|---|---|---|---|
| 0.00 | 0.36 | 0.63 | -0.17 | 0.59 | 0.22 | -0.12 | -0.23 | -0.80 |
| 0.36 | 0.00 | 0.19 | -0.83 | -0.32 | 0.40 | 0.40 | 1.27 | 0.15 |
| 0.63 | 0.19 | 0.00 | -0.58 | -0.35 | -1.12 | -0.23 | -0.38 | 0.64 |
| -0.17 | -0.83 | -0.58 | 0.00 | -0.51 | 0.07 | 0.52 | -0.40 | -0.47 |
| 0.59 | -0.32 | -0.35 | -0.51 | 0.00 | 0.24 | 0.72 | -1.18 | 0.29 |
| 0.22 | 0.40 | -1.12 | 0.07 | 0.24 | 0.00 | 0.17 | -0.64 | -0.31 |
| -0.12 | 0.40 | -0.23 | 0.52 | 0.72 | 0.17 | 0.00 | 0.70 | 0.48 |
| -0.23 | 1.27 | -0.38 | -0.40 | -1.18 | -0.64 | 0.70 | 0.00 | -1.15 |
| -0.80 | 0.15 | 0.64 | -0.47 | 0.29 | -0.31 | 0.48 | -1.15 | 0.00 |

1

| | | | | | | | | |
|---|---|---|---|---|---|---|---|---|
| 0.00 | 0.36 | 0.28 | -0.17 | 0.59 | -0.30 | -0.12 | -0.23 | -0.80 |
| 0.36 | 0.00 | -0.17 | -0.83 | -0.32 | -0.12 | 0.40 | 1.27 | 0.15 |
| 0.28 | -0.17 | 0.00 | -0.23 | -0.71 | -0.24 | -0.58 | -0.73 | 0.99 |
| -0.17 | -0.83 | -0.23 | 0.00 | -0.51 | 0.59 | 0.52 | -0.40 | -0.47 |
| 0.59 | -0.32 | -0.71 | -0.51 | 0.00 | -0.28 | 0.72 | -1.18 | 0.29 |
| -0.30 | -0.12 | -0.24 | 0.59 | -0.28 | 0.00 | -0.35 | -1.16 | 0.21 |
| -0.12 | 0.40 | -0.58 | 0.52 | 0.72 | -0.35 | 0.00 | 0.70 | 0.48 |
| -0.23 | 1.27 | -0.73 | -0.40 | -1.18 | -1.16 | 0.70 | 0.00 | -1.15 |
| -0.80 | 0.15 | 0.99 | -0.47 | 0.29 | 0.21 | 0.48 | -1.15 | 0.00 |

1

| | | | | | | | | |
|---|---|---|---|---|---|---|---|---|
| 0.00 | 0.87 | -0.57 | 0.58 | 0.08 | 0.21 | -1.08 | 0.29 | 0.38 |
| 0.87 | 0.00 | -0.51 | -0.60 | -0.32 | -0.12 | -0.05 | 1.27 | 0.82 |
| -0.57 | -0.51 | 0.00 | -0.80 | -0.37 | -0.58 | 0.20 | -1.07 | -0.01 |
| 0.58 | -0.60 | -0.80 | 0.00 | -0.75 | 0.82 | -0.16 | -0.17 | 0.43 |
| 0.08 | -0.32 | -0.37 | -0.75 | 0.00 | -0.28 | 1.17 | -1.18 | -0.38 |
| 0.21 | -0.12 | -0.58 | 0.82 | -0.28 | 0.00 | -0.80 | -1.16 | 0.88 |
| -1.08 | -0.05 | 0.20 | -0.16 | 1.17 | -0.80 | 0.00 | 0.25 | -0.63 |
| 0.29 | 1.27 | -1.07 | -0.17 | -1.18 | -1.16 | 0.25 | 0.00 | -0.48 |
| 0.38 | 0.82 | -0.01 | 0.43 | -0.38 | 0.88 | -0.63 | -0.48 | 0.00 |

1

| | | | | | | | | |
|---|---|---|---|---|---|---|---|---|
| 0.00 | 0.60 | -0.33 | 0.34 | 0.32 | -0.34 | -1.41 | 0.04 | 1.16 |
| 0.60 | 0.00 | -0.53 | -0.57 | -0.34 | 0.22 | 0.07 | 1.30 | 0.25 |
| -0.33 | -0.53 | 0.00 | -0.80 | -0.37 | -0.90 | 0.11 | -1.07 | 0.53 |
| 0.34 | -0.57 | -0.80 | 0.00 | -0.75 | 1.14 | -0.07 | -0.17 | -0.11 |
| 0.32 | -0.34 | -0.37 | -0.75 | 0.00 | -0.60 | 1.08 | -1.18 | 0.16 |
| -0.34 | 0.22 | -0.90 | 1.14 | -0.60 | 0.00 | -0.39 | -0.85 | 0.02 |
| -1.41 | 0.07 | 0.11 | -0.07 | 1.08 | -0.39 | 0.00 | 0.34 | -1.26 |
| 0.04 | 1.30 | -1.07 | -0.17 | -1.18 | -0.85 | 0.34 | 0.00 | -1.02 |
| 1.16 | 0.25 | 0.53 | -0.11 | 0.16 | 0.02 | -1.26 | -1.02 | 0.00 |

2

| | | | | | | | | |
|---|---|---|---|---|---|---|---|---|
| 0.00 | 0.60 | -0.33 | 0.34 | 0.32 | -0.34 | -1.41 | 0.04 | 1.16 |
| 0.60 | 0.00 | -0.53 | -0.57 | -0.34 | 0.22 | 0.07 | 1.30 | 0.25 |
| -0.33 | -0.53 | 0.00 | -0.80 | -0.37 | -0.90 | 0.11 | -1.07 | 0.53 |
| 0.34 | -0.57 | -0.80 | 0.00 | -0.75 | 1.14 | -0.07 | -0.17 | -0.11 |
| 0.32 | -0.34 | -0.37 | -0.75 | 0.00 | -0.60 | 1.08 | -1.18 | 0.16 |
| -0.34 | 0.22 | -0.90 | 1.14 | -0.60 | 0.00 | -0.39 | -0.85 | 0.02 |
| -1.41 | 0.07 | 0.11 | -0.07 | 1.08 | -0.39 | 0.00 | 0.34 | -1.26 |
| 0.04 | 1.30 | -1.07 | -0.17 | -1.18 | -0.85 | 0.34 | 0.00 | -1.02 |
| 1.16 | 0.25 | 0.53 | -0.11 | 0.16 | 0.02 | -1.26 | -1.02 | 0.00 |

2

| | | | | | | | | |
|---|---|---|---|---|---|---|---|---|
| 0.00 | 0.60 | -0.21 | 0.34 | 0.32 | -0.34 | -1.41 | 0.04 | 0.88 |
| 0.60 | 0.00 | -0.41 | -0.57 | -0.34 | 0.22 | 0.07 | 1.30 | -0.03 |
| -0.21 | -0.41 | 0.00 | -0.92 | -0.49 | -1.02 | -0.01 | -0.95 | 0.13 |
| 0.34 | -0.57 | -0.92 | 0.00 | -0.75 | 1.14 | -0.07 | -0.17 | 0.17 |
| 0.32 | -0.34 | -0.49 | -0.75 | 0.00 | -0.60 | 1.08 | -1.18 | 0.43 |
| -0.34 | 0.22 | -1.02 | 1.14 | -0.60 | 0.00 | -0.39 | -0.85 | 0.30 |
| -1.41 | 0.07 | -0.01 | -0.07 | 1.08 | -0.39 | 0.00 | 0.34 | -0.98 |
| 0.04 | 1.30 | -0.95 | -0.17 | -1.18 | -0.85 | 0.34 | 0.00 | -1.30 |
| 0.88 | -0.03 | 0.13 | 0.17 | 0.43 | 0.30 | -0.98 | -1.30 | 0.00 |

2

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

2

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

2

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

3

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

3

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

3

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

3

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

3

| | | | | | | | | |
|---|---|---|---|---|---|---|---|---|
| 0.00 | 0.90 | -0.50 | 0.04 | 0.62 | -0.64 | -1.12 | 0.34 | 0.59 |
| 0.90 | 0.00 | -0.41 | -0.57 | -0.34 | 0.22 | 0.07 | 1.30 | -0.03 |
| -0.50 | -0.41 | 0.00 | -0.92 | -0.49 | -1.02 | -0.01 | -0.95 | 0.13 |
| 0.04 | -0.57 | -0.92 | 0.00 | -0.75 | 1.14 | -0.07 | -0.17 | 0.17 |
| 0.62 | -0.34 | -0.49 | -0.75 | 0.00 | -0.60 | 1.08 | -1.18 | 0.43 |
| -0.64 | 0.22 | -1.02 | 1.14 | -0.60 | 0.00 | -0.39 | -0.85 | 0.30 |
| -1.12 | 0.07 | -0.01 | -0.07 | 1.08 | -0.39 | 0.00 | 0.34 | -0.98 |
| 0.34 | 1.30 | -0.95 | -0.17 | -1.18 | -0.85 | 0.34 | 0.00 | -1.30 |
| 0.59 | -0.03 | 0.13 | 0.17 | 0.43 | 0.30 | -0.98 | -1.30 | 0.00 |

EXHIBIT B

I. Examplar Patterns

```
<examplar 1>
X..
X.X
...

<examplar 2>
..X
X.X
...

<examplar 3>
...
XXX
...

<examplar 4>
..X
.X.
X..

<examplar 5>
X.X
...
X.X
```

II. Memory Capacity

```
<examplar 1> ( O : Hebb; X : Iter )
O..  ...  ...  ...
O.O  O.O  OOO  OOO
...  ...  ...  ...

X..  X..
X.X  X.X
...  ...

<examplar 2> ( O : Hebb; X : Iter )
..O  ...  ...  ...
O.O  O.O  OOO  OOO
...  ...  ...  ...

..X  ..X
X.X  X.X
...  ...
```

```
<examplar 3> ( O : Hebb; X : Iter )
...   ...
OOO   OOO
...   ...

...   ...
XXX   XXX
...   ...

<examplar 4> ( O : Hebb; X : Iter )
..O   ..O   OOO   OOO
.O.   .O.   .O.   .O.
O..   O.O   OOO   OOO

..X   ..X
.X.   .X.
X..   X..

<examplar 5> ( O : Hebb; X : Iter )
O.O   OOO   OOO   OOO
...   ...   .O.   .O.
O.O   OOO   OOO   OOO

X.X   X.X
...   ...
X.X   X.X
```

III. Noise Robustness

```
<examplar 1> ( O : Hebb; X : Iter )
O..   O..   ...   ...   ...
O.O   O.O   O.O   OOO   OOO
..O   ...   ...   ...   ...

X..   XX.   X..   .X.   X..   .X.
X.X   X..   XXX   X.X   XXX   X.X
..X   ...   .XX   ...   .X.   ...

<examplar 2> ( O : Hebb; X : Iter )
..O   ...   ...   ...
O.O   O.O   OOO   OOO
...   ...   ...   ...

..X   ..X
X.X   X.X
...   ...
```

```
<examplar 3> ( O : Hebb; X : Iter )
...  ..O  ...  ...  ...
O.O  OOO  O.O  OOO  OOO
O..  ...  ...  ...  ...

...  X.X  ...  X.X  ...
X.X  XXX  X..  .XX  X..
X..  ...  X..  ...  X..

<examplar 4> ( O : Hebb; X : Iter )
..O  ..O  ...  ...
.OO  OO.  OOO  OOO
O..  ...  ...  ...

..X  ..X  ..X
.XX  .X.  .X.
X..  X..  X..

<examplar 5> ( O : Hebb; X : Iter )
O.O  OOO  OOO  OOO
...  ...  .O.  .O.
O.O  OOO  OOO  OOO

X.X  X.X
...  ...
X.X  X.X
```

| | | | | | | | | |
|---|---|---|---|---|---|---|---|---|
| 0 | 1 | -1 | -1 | -3 | -1 | 1 | 1 | 3 |
| 1 | 0 | -1 | -1 | 1 | -1 | 1 | 5 | 3 |
| -1 | -1 | 0 | -3 | -1 | -3 | 3 | -1 | 1 |
| -1 | -1 | -3 | 0 | -1 | 5 | -5 | -1 | -3 |
| -3 | 1 | -1 | -1 | 0 | -1 | 1 | 1 | -1 |
| -1 | -1 | -3 | 5 | -1 | 0 | -5 | -1 | -3 |
| 1 | 1 | 3 | -5 | 1 | -5 | 0 | 1 | 3 |
| 1 | 5 | -1 | -1 | 1 | -1 | 1 | 0 | 3 |
| 3 | 3 | 1 | -3 | -1 | -3 | 3 | 3 | 0 |

1

| | | | | | | | | |
|---|---|---|---|---|---|---|---|---|
| 0.00 | -0.34 | -0.07 | 1.34 | -0.75 | 0.28 | -0.38 | -0.76 | -0.50 |
| -0.34 | 0.00 | 0.21 | -0.63 | 1.82 | -0.35 | 0.95 | 0.59 | 0.64 |
| -0.07 | 0.21 | 0.00 | -0.41 | 0.16 | -1.21 | 0.86 | 0.50 | 0.51 |
| 1.34 | -0.63 | -0.41 | 0.00 | -0.29 | 1.26 | 0.26 | -0.64 | -0.89 |
| -0.75 | 1.82 | 0.16 | -0.29 | 0.00 | 0.11 | 0.26 | 0.11 | 0.41 |
| 0.28 | -0.35 | -1.21 | 1.26 | 0.11 | 0.00 | 0.09 | -0.20 | -1.33 |
| -0.38 | 0.95 | 0.86 | 0.26 | 0.26 | 0.09 | 0.00 | 0.85 | -0.34 |
| -0.76 | 0.59 | 0.50 | -0.64 | 0.11 | -0.20 | 0.85 | 0.00 | 0.95 |
| -0.50 | 0.64 | 0.51 | -0.89 | 0.41 | -1.33 | -0.34 | 0.95 | 0.00 |

1

| | | | | | | | | |
|---|---|---|---|---|---|---|---|---|
| 0.00 | 0.61 | -2.01 | 0.39 | 0.20 | -0.67 | 0.58 | 0.19 | 0.45 |
| 0.61 | 0.00 | -0.78 | -0.63 | 1.82 | -0.35 | 0.95 | 0.59 | 0.64 |
| -2.01 | -0.78 | 0.00 | 0.58 | -0.83 | -0.22 | -0.13 | -0.49 | -0.48 |
| 0.39 | -0.63 | 0.58 | 0.00 | -0.29 | 1.26 | 0.26 | -0.64 | -0.89 |
| 0.20 | 1.82 | -0.83 | -0.29 | 0.00 | 0.11 | 0.26 | 0.11 | 0.41 |
| -0.67 | -0.35 | -0.22 | 1.26 | 0.11 | 0.00 | 0.09 | -0.20 | -1.33 |
| 0.58 | 0.95 | -0.13 | 0.26 | 0.26 | 0.09 | 0.00 | 0.85 | -0.34 |
| 0.19 | 0.59 | -0.49 | -0.64 | 0.11 | -0.20 | 0.85 | 0.00 | 0.95 |
| 0.45 | 0.64 | -0.48 | -0.89 | 0.41 | -1.33 | -0.34 | 0.95 | 0.00 |

1

| | | | | | | | | |
|---|---|---|---|---|---|---|---|---|
| 0.00 | 0.61 | -1.22 | 0.39 | -0.51 | -0.67 | 0.58 | 0.19 | 0.45 |
| 0.61 | 0.00 | 0.01 | -0.63 | 1.11 | -0.35 | 0.95 | 0.59 | 0.64 |
| -1.22 | 0.01 | 0.00 | -0.21 | -2.33 | -1.0 | 0.65 | 0.30 | 0.30 |
| 0.39 | -0.63 | -0.21 | 0.00 | 0.42 | 1.26 | 0.26 | -0.64 | -0.89 |
| -0.51 | 1.11 | -2.33 | 0.42 | 0.00 | 0.82 | -0.45 | -0.60 | -0.30 |
| -0.67 | -0.35 | -1.0 | 1.26 | 0.82 | 0.00 | 0.09 | -0.20 | -1.33 |
| 0.58 | 0.95 | 0.65 | 0.26 | -0.45 | 0.09 | 0.00 | 0.85 | -0.34 |
| 0.19 | 0.59 | 0.30 | -0.64 | -0.60 | -0.20 | 0.85 | 0.00 | 0.95 |
| 0.45 | 0.64 | 0.30 | -0.89 | -0.30 | -1.33 | -0.34 | 0.95 | 0.00 |

1

| | | | | | | | | |
|---|---|---|---|---|---|---|---|---|
| 0.00 | 0.94 | -1.34 | 0.60 | -1.40 | -0.57 | -0.14 | 0.19 | 0.45 |
| 0.94 | 0.00 | -0.44 | -0.08 | -0.11 | 0.09 | -0.1 | 0.92 | 0.97 |
| -1.34 | -0.44 | 0.00 | -0.53 | -1.32 | -1.21 | 1.48 | 0.19 | 0.19 |
| 0.60 | -0.08 | -0.53 | 0.00 | -0.69 | 1.58 | -0.67 | -0.42 | -0.67 |
| -1.40 | -0.11 | -1.32 | -0.69 | 0.00 | -0.17 | 1.15 | -1.49 | -1.19 |
| -0.57 | 0.09 | -1.21 | 1.58 | -0.17 | 0.00 | -0.73 | -0.1 | -1.23 |
| -0.14 | -0.1 | 1.48 | -0.67 | 1.15 | -0.73 | 0.00 | 0.13 | -1.05 |
| 0.19 | 0.92 | 0.19 | -0.42 | -1.49 | -0.1 | 0.13 | 0.00 | 0.95 |
| 0.45 | 0.97 | 0.19 | -0.67 | -1.19 | -1.23 | -1.05 | 0.95 | 0.00 |

1

| | | | | | | | | |
|---|---|---|---|---|---|---|---|---|
| 0.00 | 0.45 | -0.97 | 0.24 | -1.83 | -0.93 | 0.22 | -0.81 | 0.81 |
| 0.45 | 0.00 | -0.56 | 0.04 | 0.07 | 0.21 | -0.22 | 1.68 | 0.84 |
| -0.97 | -0.56 | 0.00 | -0.53 | -1.38 | -1.21 | 1.48 | -0.44 | 0.19 |
| 0.24 | 0.04 | -0.53 | 0.00 | -0.63 | 1.58 | -0.67 | 0.21 | -0.67 |
| -1.83 | 0.07 | -1.38 | -0.63 | 0.00 | -0.11 | 1.09 | -0.80 | -1.25 |
| -0.93 | 0.21 | -1.21 | 1.58 | -0.11 | 0.00 | -0.73 | 0.53 | -1.23 |
| 0.22 | -0.22 | 1.48 | -0.67 | 1.09 | -0.73 | 0.00 | -0.50 | -1.05 |
| -0.81 | 1.68 | -0.44 | 0.21 | -0.80 | 0.53 | -0.50 | 0.00 | 0.32 |
| 0.81 | 0.84 | 0.19 | -0.67 | -1.25 | -1.23 | -1.05 | 0.32 | 0.00 |

2

| | | | | | | | | |
|---|---|---|---|---|---|---|---|---|
| 0.00 | 0.45 | -0.97 | 0.24 | -1.88 | -0.93 | 0.22 | -0.81 | 0.81 |
| 0.45 | 0.00 | -0.56 | 0.04 | 0.12 | 0.21 | -0.22 | 1.68 | 0.84 |
| -0.97 | -0.56 | 0.00 | -0.53 | -1.34 | -1.21 | 1.48 | -0.44 | 0.19 |
| 0.24 | 0.04 | -0.53 | 0.00 | -0.67 | 1.58 | -0.67 | 0.21 | -0.67 |
| -1.88 | 0.12 | -1.34 | -0.67 | 0.00 | -0.16 | 1.14 | -0.75 | -1.20 |
| -0.93 | 0.21 | -1.21 | 1.58 | -0.16 | 0.00 | -0.73 | 0.53 | -1.23 |
| 0.22 | -0.22 | 1.48 | -0.67 | 1.14 | -0.73 | 0.00 | -0.50 | -1.05 |
| -0.81 | 1.68 | -0.44 | 0.21 | -0.75 | 0.53 | -0.50 | 0.00 | 0.32 |
| 0.81 | 0.84 | 0.19 | -0.67 | -1.20 | -1.23 | -1.05 | 0.32 | 0.00 |

2

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

2

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

2

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

2

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

3

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

3

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

3

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

3

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

3

| | | | | | | | | |
|---|---|---|---|---|---|---|---|---|
| 0.00 | 0.45 | -1.12 | 0.24 | -1.69 | -0.93 | 0.27 | -0.77 | 0.81 |
| 0.45 | 0.00 | -0.71 | 0.04 | 0.30 | 0.21 | -0.18 | 1.71 | 0.84 |
| -1.12 | -0.71 | 0.00 | -0.39 | -1.67 | -1.07 | 1.29 | -0.62 | 0.05 |
| 0.24 | 0.04 | -0.39 | 0.00 | -0.86 | 1.58 | -0.71 | 0.17 | -0.67 |
| -1.69 | 0.30 | -1.67 | -0.86 | 0.00 | -0.35 | 1.37 | -0.53 | -1.02 |
| -0.93 | 0.21 | -1.07 | 1.58 | -0.35 | 0.00 | -0.77 | 0.50 | -1.23 |
| 0.27 | -0.18 | 1.29 | -0.71 | 1.37 | -0.77 | 0.00 | -0.42 | -1.01 |
| -0.77 | 1.71 | -0.62 | 0.17 | -0.53 | 0.50 | -0.42 | 0.00 | 0.35 |
| 0.81 | 0.84 | 0.05 | -0.67 | -1.02 | -1.23 | -1.01 | 0.35 | 0.00 |

EXHIBIT C

I. Examplar Patterns

```
<examplar 1>
...
.X.
X..

<examplar 2>
..X
X.X
.X.

<examplar 3>
.X.
...
.X.

<examplar 4>
X.X
...
..X

<examplar 5>
...
.X.
.X.
```

II. Memory Capacity

```
<examplar 1> ( O : Hebb; X : Iter )
...  ...  ...  ...
.O.  .O.  .O.  .O.
O..  OO.  .O.  .O.

...  ...
.X.  .X.
X..  X..

<examplar 2> ( O : Hebb; X : Iter )
..O  .OO  .OO
O.O  O.O  O.O
.O.  .O.  .O.

..X  ..X
X.X  X.X
.X.  .X.
```

<examplar 3> ( O : Hebb; X : Iter )

```
.O.  ...  ...
...  .O.  .O.
.O.  .O.  .O.

.X.  .X.
...  ...
.X.  .X.
```

<examplar 4> ( O : Hebb; X : Iter )

```
O.O  O.O
...  ...
..O  ..O

X.X  X.X
...  ...
..X  ..X
```

<examplar 5> ( O : Hebb; X : Iter )

```
...  ...
.O.  .O.
.O.  .O.

...  ...
.X.  .X.
.X.  .X.
```

III. Noise Robustness

<examplar 1> ( O : Hebb; X : Iter )

```
...  ...  ...
...  .O.  .O.
O..  .O.  .O.

...  .XX  X..  .XX  X..  .XX
...  .X.  ...  .X.  ...  .X.
X..  ...  XX.  ..X  X..  ..X
```

<examplar 2> ( O : Hebb; X : Iter )

```
.OO  OOO  OOO
O.O  O.O  O.O
OO.  .OO  .OO

.XX  .X.  XXX  ...  XXX  ...
X.X  X.X  X.X  X.X  XXX  X.X
XX.  .XX  .X.  .XX  .X.  .XX
```

```
<examplar 3> ( O : Hebb; X : Iter )
.OO  O..  .O.  ...  ...  ...
...  .O.  .O.  .O.  .O.  .O.
O..  .OO  O..  OO.  .O.  .O.

.XX  ...  XXX  ...
...  ...  .X.  ...
X..  ..X  XX.  ..X

<examplar 4> ( O : Hebb; X : Iter )
..O  O.O  ...  .O.  ...  ...
...  ...  ...  .O.  .O.  .O.
..O  .O.  .OO  .O.  .O.  .O.

..X  X.X  X.X  X.X
...  ...  ...  ...
..X  ...  ..X  ..X

<examplar 5> ( O : Hebb; X : Iter )
...  ...  ...  ...
OO.  .O.  .O.  .O.
O..  OO.  .O.  .O.

...  ...  ...
XX.  .X.  .X.
X..  X..  X..
```

| | | | | | | | | |
|---|---|---|---|---|---|---|---|---|
| 0 | 1 | 3 | 1 | -1 | 1 | 1 | -3 | 5 |
| 1 | 0 | -1 | 1 | -1 | 1 | 1 | 1 | 1 |
| 3 | -1 | 0 | 3 | -3 | 3 | -1 | -1 | 3 |
| 1 | 1 | 3 | 0 | -1 | 5 | 1 | 1 | 1 |
| -1 | -1 | -3 | -1 | 0 | -1 | 3 | -1 | -1 |
| 1 | 1 | 3 | 5 | -1 | 0 | 1 | 1 | 1 |
| 1 | 1 | -1 | 1 | 3 | 1 | 0 | -3 | 1 |
| -3 | 1 | -1 | 1 | -1 | 1 | -3 | 0 | -3 |
| 5 | 1 | 3 | 1 | -1 | 1 | 1 | -3 | 0 |

1

| | | | | | | | | |
|---|---|---|---|---|---|---|---|---|
| 0.00 | -0.10 | -0.52 | 0.87 | -0.24 | 0.26 | -0.79 | -0.24 | 0.53 |
| -0.10 | 0.00 | 0.79 | 0.27 | -0.14 | -0.16 | 0.05 | 0.1 | 0.80 |
| -0.52 | 0.79 | 0.00 | -0.53 | -0.05 | 1.03 | -0.30 | -0.27 | -0.1 |
| 0.87 | 0.27 | -0.53 | 0.00 | -0.02 | -0.20 | -0.22 | 0.42 | 0.90 |
| -0.24 | -0.14 | -0.05 | -0.02 | 0.00 | 0.34 | 0.33 | 0.50 | -0.89 |
| 0.26 | -0.16 | 1.03 | -0.20 | 0.34 | 0.00 | -0.86 | 0.49 | 0.58 |
| -0.79 | 0.05 | -0.30 | -0.22 | 0.33 | -0.86 | 0.00 | 0.72 | 0.07 |
| -0.24 | 0.1 | -0.27 | 0.42 | 0.50 | 0.49 | 0.72 | 0.00 | 0.57 |
| 0.53 | 0.80 | -0.1 | 0.90 | -0.89 | 0.58 | 0.07 | 0.57 | 0.00 |

1

| | | | | | | | | |
|---|---|---|---|---|---|---|---|---|
| 0.00 | 0.39 | -0.83 | 0.28 | 0.38 | -0.05 | -0.48 | -0.94 | 1.27 |
| 0.39 | 0.00 | 0.62 | -0.17 | 0.33 | -0.33 | 0.23 | -0.46 | 1.40 |
| -0.83 | 0.62 | 0.00 | -0.26 | -0.35 | 1.03 | -0.30 | 0.12 | -0.52 |
| 0.28 | -0.17 | -0.26 | 0.00 | -0.60 | 0.07 | -0.49 | 1.08 | 0.21 |
| 0.38 | 0.33 | -0.35 | -0.60 | 0.00 | 0.04 | 0.63 | -0.18 | -0.16 |
| -0.05 | -0.33 | 1.03 | 0.07 | 0.04 | 0.00 | -0.86 | 0.87 | 0.15 |
| -0.48 | 0.23 | -0.30 | -0.49 | 0.63 | -0.86 | 0.00 | 0.34 | 0.49 |
| -0.94 | -0.46 | 0.12 | 1.08 | -0.18 | 0.87 | 0.34 | 0.00 | -0.24 |
| 1.27 | 1.40 | -0.52 | 0.21 | -0.16 | 0.15 | 0.49 | -0.24 | 0.00 |

1

| | | | | | | | | |
|---|---|---|---|---|---|---|---|---|
| 0.00 | -0.22 | -0.36 | 0.91 | 0.38 | -0.05 | -0.27 | -1.35 | 1.27 |
| -0.22 | 0.00 | -0.46 | -1.41 | -0.27 | -0.94 | -0.59 | 0.55 | 0.80 |
| -0.36 | -0.46 | 0.00 | 0.84 | 0.12 | 1.50 | 0.39 | -0.76 | -0.05 |
| 0.91 | -1.41 | 0.84 | 0.00 | 0.03 | 0.70 | 0.35 | 0.04 | 0.84 |
| 0.38 | -0.27 | 0.12 | 0.03 | 0.00 | 0.04 | 0.84 | -0.59 | -0.16 |
| -0.05 | -0.94 | 1.50 | 0.70 | 0.04 | 0.00 | -0.65 | 0.46 | 0.15 |
| -0.27 | -0.59 | 0.39 | 0.35 | 0.84 | -0.65 | 0.00 | -0.28 | 0.70 |
| -1.35 | 0.55 | -0.76 | 0.04 | -0.59 | 0.46 | -0.28 | 0.00 | -0.64 |
| 1.27 | 0.80 | -0.05 | 0.84 | -0.16 | 0.15 | 0.70 | -0.64 | 0.00 |

1

| | | | | | | | | |
|---|---|---|---|---|---|---|---|---|
| 0.00 | -0.98 | 0.15 | 0.17 | 0.38 | -0.46 | -0.34 | -1.35 | 1.38 |
| -0.98 | 0.00 | -1.74 | 0.11 | 0.50 | 0.23 | 0.26 | 1.32 | -0.08 |
| 0.15 | -1.74 | 0.00 | -0.42 | -0.39 | 0.58 | -0.21 | -1.28 | 0.58 |
| 0.17 | 0.11 | -0.42 | 0.00 | 0.78 | 1.85 | 1.18 | 0.79 | -0.02 |
| 0.38 | 0.50 | -0.39 | 0.78 | 0.00 | 0.44 | 0.92 | -0.59 | -0.28 |
| -0.46 | 0.23 | 0.58 | 1.85 | 0.44 | 0.00 | -0.17 | 0.87 | -0.36 |
| -0.34 | 0.26 | -0.21 | 1.18 | 0.92 | -0.17 | 0.00 | -0.20 | 0.51 |
| -1.35 | 1.32 | -1.28 | 0.79 | -0.59 | 0.87 | -0.20 | 0.00 | -0.75 |
| 1.38 | -0.08 | 0.58 | -0.02 | -0.28 | -0.36 | 0.51 | -0.75 | 0.00 |

1

| | | | | | | | | |
|---|---|---|---|---|---|---|---|---|
| 0.00 | -0.12 | 0.15 | 0.17 | -0.41 | -0.46 | -0.34 | -1.35 | 1.38 |
| -0.12 | 0.00 | -0.87 | 0.98 | -1.16 | 1.10 | 1.13 | 0.45 | 0.79 |
| 0.15 | -0.87 | 0.00 | -0.42 | -1.18 | 0.58 | -0.21 | -1.28 | 0.58 |
| 0.17 | 0.98 | -0.42 | 0.00 | -0.00 | 1.85 | 1.18 | 0.79 | -0.02 |
| -0.41 | -1.16 | -1.18 | -0.00 | 0.00 | -0.35 | 0.14 | 0.20 | -1.06 |
| -0.46 | 1.10 | 0.58 | 1.85 | -0.35 | 0.00 | -0.17 | 0.87 | -0.36 |
| -0.34 | 1.13 | -0.21 | 1.18 | 0.14 | -0.17 | 0.00 | -0.20 | 0.51 |
| -1.35 | 0.45 | -1.28 | 0.79 | 0.20 | 0.87 | -0.20 | 0.00 | -0.75 |
| 1.38 | 0.79 | 0.58 | -0.02 | -1.06 | -0.36 | 0.51 | -0.75 | 0.00 |

2

| | | | | | | | | |
|---|---|---|---|---|---|---|---|---|
| 0.00 | -0.12 | 0.19 | 0.17 | -0.41 | -0.46 | -0.94 | -1.04 | 1.38 |
| -0.12 | 0.00 | -0.84 | 0.98 | -1.16 | 1.10 | 0.53 | 0.76 | 0.79 |
| 0.19 | -0.84 | 0.00 | -0.38 | -1.22 | 0.62 | -0.84 | -0.93 | 0.62 |
| 0.17 | 0.98 | -0.38 | 0.00 | -0.00 | 1.85 | 0.58 | 1.10 | -0.02 |
| -0.41 | -1.16 | -1.22 | -0.00 | 0.00 | -0.35 | 0.73 | -0.11 | -1.06 |
| -0.46 | 1.10 | 0.62 | 1.85 | -0.35 | 0.00 | -0.76 | 1.17 | -0.36 |
| -0.94 | 0.53 | -0.84 | 0.58 | 0.73 | -0.76 | 0.00 | -1.10 | -0.08 |
| -1.04 | 0.76 | -0.93 | 1.10 | -0.11 | 1.17 | -1.10 | 0.00 | -0.45 |
| 1.38 | 0.79 | 0.62 | -0.02 | -1.06 | -0.36 | -0.08 | -0.45 | 0.00 |

2

| | | | | | | | | |
|---|---|---|---|---|---|---|---|---|
| 0.00 | 0.13 | 0.19 | 0.17 | -0.32 | -0.46 | -0.94 | -1.04 | 1.38 |
| 0.13 | 0.00 | -1.08 | 0.73 | -0.82 | 0.86 | 0.78 | 0.51 | 1.04 |
| 0.19 | -1.08 | 0.00 | -0.38 | -1.31 | 0.62 | -0.84 | -0.93 | 0.62 |
| 0.17 | 0.73 | -0.38 | 0.00 | -0.09 | 1.85 | 0.58 | 1.10 | -0.02 |
| -0.32 | -0.82 | -1.31 | -0.09 | 0.00 | -0.43 | 0.82 | -0.20 | -0.97 |
| -0.46 | 0.86 | 0.62 | 1.85 | -0.43 | 0.00 | -0.76 | 1.17 | -0.36 |
| -0.94 | 0.78 | -0.84 | 0.58 | 0.82 | -0.76 | 0.00 | -1.10 | -0.08 |
| -1.04 | 0.51 | -0.93 | 1.10 | -0.20 | 1.17 | -1.10 | 0.00 | -0.45 |
| 1.38 | 1.04 | 0.62 | -0.02 | -0.97 | -0.36 | -0.08 | -0.45 | 0.00 |

2

| | | | | | | | | |
|---|---|---|---|---|---|---|---|---|
| 0.00 | -0.36 | 0.19 | 0.17 | -0.02 | -0.23 | -0.80 | -1.04 | 1.44 |
| -0.36 | 0.00 | -1.58 | 0.23 | -1.61 | 0.13 | 0.15 | 1.00 | 0.48 |
| 0.19 | -1.58 | 0.00 | -0.38 | -1.01 | 0.85 | -0.71 | -0.93 | 0.67 |
| 0.17 | 0.23 | -0.38 | 0.00 | 0.20 | 2.08 | 0.72 | 1.10 | 0.04 |
| -0.02 | -1.61 | -1.01 | 0.20 | 0.00 | 0.09 | 1.25 | -0.50 | -0.62 |
| -0.23 | 0.13 | 0.85 | 2.08 | 0.09 | 0.00 | -0.39 | 0.94 | -0.07 |
| -0.80 | 0.15 | -0.71 | 0.72 | 1.25 | -0.39 | 0.00 | -1.24 | 0.11 |
| -1.04 | 1.00 | -0.93 | 1.10 | -0.50 | 0.94 | -1.24 | 0.00 | -0.50 |
| 1.44 | 0.48 | 0.67 | 0.04 | -0.62 | -0.07 | 0.11 | -0.50 | 0.00 |

2

| | | | | | | | | |
|---|---|---|---|---|---|---|---|---|
| 0.00 | -0.36 | 0.19 | 0.17 | -0.02 | -0.23 | -0.80 | -1.04 | 1.44 |
| -0.36 | 0.00 | -1.58 | 0.23 | -1.61 | 0.13 | 0.15 | 1.00 | 0.48 |
| 0.19 | -1.58 | 0.00 | -0.38 | -1.01 | 0.85 | -0.71 | -0.93 | 0.67 |
| 0.17 | 0.23 | -0.38 | 0.00 | 0.20 | 2.08 | 0.72 | 1.10 | 0.04 |
| -0.02 | -1.61 | -1.01 | 0.20 | 0.00 | 0.09 | 1.25 | -0.50 | -0.62 |
| -0.23 | 0.13 | 0.85 | 2.08 | 0.09 | 0.00 | -0.39 | 0.94 | -0.07 |
| -0.80 | 0.15 | -0.71 | 0.72 | 1.25 | -0.39 | 0.00 | -1.24 | 0.11 |
| -1.04 | 1.00 | -0.93 | 1.10 | -0.50 | 0.94 | -1.24 | 0.00 | -0.50 |
| 1.44 | 0.48 | 0.67 | 0.04 | -0.62 | -0.07 | 0.11 | -0.50 | 0.00 |

2

| | | | | | | | | |
|---|---|---|---|---|---|---|---|---|
| 0.00 | -0.36 | 0.19 | 0.17 | -0.02 | -0.23 | -0.69 | -1.07 | 1.44 |
| -0.36 | 0.00 | -1.58 | 0.23 | -1.61 | 0.13 | 0.27 | 0.97 | 0.48 |
| 0.19 | -1.58 | 0.00 | -0.38 | -1.01 | 0.85 | -0.59 | -0.96 | 0.67 |
| 0.17 | 0.23 | -0.38 | 0.00 | 0.20 | 2.08 | 0.83 | 1.07 | 0.04 |
| -0.02 | -1.61 | -1.01 | 0.20 | 0.00 | 0.09 | 1.14 | -0.46 | -0.62 |
| -0.23 | 0.13 | 0.85 | 2.08 | 0.09 | 0.00 | -0.28 | 0.91 | -0.07 |
| -0.69 | 0.27 | -0.59 | 0.83 | 1.14 | -0.28 | 0.00 | -1.38 | 0.23 |
| -1.07 | 0.97 | -0.96 | 1.07 | -0.46 | 0.91 | -1.38 | 0.00 | -0.54 |
| 1.44 | 0.48 | 0.67 | 0.04 | -0.62 | -0.07 | 0.23 | -0.54 | 0.00 |

3

| | | | | | | | | |
|---|---|---|---|---|---|---|---|---|
| 0.00 | -0.36 | 0.19 | 0.17 | -0.02 | -0.23 | -0.69 | -1.07 | 1.44 |
| -0.36 | 0.00 | -1.58 | 0.23 | -1.61 | 0.13 | 0.27 | 0.97 | 0.48 |
| 0.19 | -1.58 | 0.00 | -0.38 | -1.01 | 0.85 | -0.59 | -0.96 | 0.67 |
| 0.17 | 0.23 | -0.38 | 0.00 | 0.20 | 2.08 | 0.83 | 1.07 | 0.04 |
| -0.02 | -1.61 | -1.01 | 0.20 | 0.00 | 0.09 | 1.14 | -0.46 | -0.62 |
| -0.23 | 0.13 | 0.85 | 2.08 | 0.09 | 0.00 | -0.28 | 0.91 | -0.07 |
| -0.69 | 0.27 | -0.59 | 0.83 | 1.14 | -0.28 | 0.00 | -1.38 | 0.23 |
| -1.07 | 0.97 | -0.96 | 1.07 | -0.46 | 0.91 | -1.38 | 0.00 | -0.54 |
| 1.44 | 0.48 | 0.67 | 0.04 | -0.62 | -0.07 | 0.23 | -0.54 | 0.00 |

3

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

3

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

3

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

3

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

4

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

4

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

4

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

4

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

4

| | | | | | | | | |
|---|---|---|---|---|---|---|---|---|
| 0.00 | -0.27 | 0.19 | 0.17 | -0.02 | -0.23 | -0.69 | -1.07 | 1.44 |
| -0.27 | 0.00 | -1.68 | 0.14 | -1.51 | 0.03 | 0.36 | 0.88 | 0.58 |
| 0.19 | -1.68 | 0.00 | -0.38 | -1.01 | 0.85 | -0.59 | -0.96 | 0.67 |
| 0.17 | 0.14 | -0.38 | 0.00 | 0.20 | 2.08 | 0.83 | 1.07 | 0.04 |
| -0.02 | -1.51 | -1.01 | 0.20 | 0.00 | 0.09 | 1.14 | -0.46 | -0.62 |
| -0.23 | 0.03 | 0.85 | 2.08 | 0.09 | 0.00 | -0.28 | 0.91 | -0.07 |
| -0.69 | 0.36 | -0.59 | 0.83 | 1.14 | -0.28 | 0.00 | -1.38 | 0.23 |
| -1.07 | 0.88 | -0.96 | 1.07 | -0.46 | 0.91 | -1.38 | 0.00 | -0.54 |
| 1.44 | 0.58 | 0.67 | 0.04 | -0.62 | -0.07 | 0.23 | -0.54 | 0.00 |

EXHIBIT D

I. Examplar Patterns

```
<examplar 1>
.XXXXX.
XX...XX
XX..XXX
XX.XXXX
XXXX.XX
XXX..XX
.XXXXX.

<examplar 2>
..XX...
.XXX...
..XX...
..XX...
..XX...
..XX...
XXXXXX.

<examplar 3>
.XXXX..
XX..XX.
....XX.
..XXX..
.XX....
XX..XX.
XXXXXX.

<examplar 4>
.XXXX..
XX..XX.
....XX.
..XXX..
....XX.
XX..XX.
.XXXX..

<examplar 5>
...XXX.
..XXXX.
.XX.XX.
XX..XX.
XXXXXXX
....XX.
...XXXX

<examplar 6>
XXXXXX.
XX.....
XXXXX..
....XX.
....XX.
XX..XX.
.XXXX..

<examplar 7>
..XXX..
.XX....
XX.....
XXXXX..
XX..XX.
XX..XX.
.XXXX..
```

```
<examplar 8>
XXXXXX.
XX..XX.
....XX.
...XX..
..XX...
..XX...
..XX...

<examplar 9>
.XXXX..
XX..XX.
XX..XX.
.XXXX..
XX..XX.
XX..XX.
.XXXX..

<examplar 10>
.XXXX..
XX..XX.
XX..XX.
.XXXXX.
....XX.
...XX..
.XXX...
```

II. Memory Capacity

```
<examplar 1> ( O : Hebb; X : Iter )
.OOOOO.  .OOOOO.  .OOOO..  .OOOO..
OO...OO  OO..OO.  OO..OO.  OO..OO.
OO..OOO  OO..OO.  OO..OO.  OO..OO.
OO.OOOO  OO.OOO.  .OOOO..  .OOOO..
OOOO.OO  OOO.OO.  .O..OO.  .O..OO.
OOO..OO  OO..OO.  OO..OO.  OO..OO.
.OOOOO.  .OOOO..  .OOOO..  .OOOO..

.XXXXX.  .XXXXX.
XX...XX  XX...XX
XX..XXX  XX..XXX
XX.XXXX  XX.XXXX
XXXX.XX  XXXX.XX
XXX..XX  XXX..XX
.XXXXX.  .XXXXX.

<examplar 2> ( O : Hebb; X : Iter )
..OO...  ..OO...
.OOO...  .OOO...
..OO...  ..OO...
..OO...  ..OO...
..OO...  ..OO...
..OO...  ..OO...
OOOOOO.  OOOOOO.

..XX...  ..XX...
.XXX...  .XXX...
..XX...  ..XX...
..XX...  ..XX...
..XX...  ..XX...
..XX...  ..XX...
XXXXXX.  XXXXXX.
```

```
<examplar 3> ( O : Hebb; X : Iter )
.OOOO..  .OOOO..  .OOOO..  .OOOO..  .OOOO..
OO..OO.  OO..OO.  OO..OO.  OO..OO.  OO..OO.
....OO.  ....OO.  OO..OO.  OO..OO.  OO..OO.
..OOO..  ..OOO..  ..OOO..  .OOOO..  .OOOO..
.OO....  ....OO.  ....OO.  .O..OO.  .O..OO.
OO..OO.  OO..OO.  OO..OO.  OO..OO.  OO..OO.
OOOOOO.  .OOOO..  .OOOO..  .OOOO..  .OOOO..

.XXXX..  .XXXX..
XX..XX.  XX..XX.
....XX.  ....XX.
..XXX..  ..XXX..
.XX....  .XX....
XX..XX.  XX..XX.
XXXXXX.  XXXXXX.

<examplar 4> ( O : Hebb; X : Iter )
.OOOO..  .OOOO..  .OOOO..  .OOOO..
OO..OO.  OO..OO.  OO..OO.  OO..OO.
....OO.  OO..OO.  OO..OO.  OO..OO.
..OOO..  ..OOO..  .OOOO..  .OOOO..
....OO.  ....OO.  .O..OO.  .O..OO.
OO..OO.  OO..OO.  OO..OO.  OO..OO.
.OOOO..  .OOOO..  .OOOO..  .OOOO..

.XXXX..  .XXXX..
XX..XX.  XX..XX.
....XX.  ....XX.
..XXX..  ..XXX..
....XX.  ....XX.
XX..XX.  XX..XX.
.XXXX..  .XXXX..

<examplar 5> ( O : Hebb; X : Iter )
...OOO.  ...OOO.
..OOOO.  ..OOOO.
.OO.OO.  .OO.OO.
OO..OO.  OO..OO.
OOOOOOO  OOOOOOO
....OO.  ....OO.
...OOOO  ...OOOO

...XXX.  ...XXX.
..XXXX.  ..XXXX.
.XX.XX.  .XX.XX.
XX..XX.  XX..XX.
XXXXXXX  XXXXXXX
....XX.  ....XX.
...XXXX  ...XXXX

<examplar 6> ( O : Hebb; X : Iter )
OOOOOO.  .OOOO..  .OOOO..  .OOOO..
OO.....  OO..OO.  OO..OO.  OO..OO.
OOOOO..  OO..OO.  OO..OO.  OO..OO.
....OO.  ..OOO..  .OOOO..  .OOOO..
....OO.  ....OO.  .O..OO.  .O..OO.
OO..OO.  OO..OO.  OO..OO.  OO..OO.
.OOOO..  .OOOO..  .OOOO..  .OOOO..

XXXXXX.  XXXXXX.
XX.....  XX.....
XXXXX..  XXXXX..
....XX.  ....XX.
....XX.  ....XX.
XX..XX.  XX..XX.
.XXXX..  .XXXX..
```

```
<examplar 7> ( O : Hebb; X : Iter )
..OOO..  .OOOO..  .OOOO..  .OOOO..
.OO....  OO..OO.  OO..OO.  OO..OO.
OO.....  OO..OO.  OO..OO.  OO..OO.
OOOOO..  .OOOO..  .OOOO..  .OOOO..
OO..OO.  OO..OO.  .O..OO.  .O..OO.
OO..OO.  OO..OO.  OO..OO.  OO..OO.
.OOOO..  .OOOO..  .OOOO..  .OOOO..

..XXX..  ..XXX..
.XX....  .XX....
XX.....  XX.....
XXXXX..  XXXXX..
XX..XX.  XX..XX.
XX..XX.  XX..XX.
.XXXX..  .XXXX..

<examplar 8> ( O : Hebb; X : Iter )
OOOOOO.  .OOOO..  .OOOO..  .OOOO..  .OOOO..  .OOOO..
OO..OO.  OO..OO.  OO..OO.  OO..OO.  OO..OO.  OO..OO.
....OO.  ....OO.  ....OO.  OO..OO.  OO..OO.  OO..OO.
...OO..  ..OOO..  ..OOO..  ..OOO..  .OOOO..  .OOOO..
..OO...  ..O....  ....OO.  ....OO.  .O..OO.  .O..OO.
..OO...  ...OO..  OO..OO.  OO..OO.  OO..OO.  OO..OO.
..OO...  .OOOO..  .OOOO..  .OOOO..  .OOOO..  .OOOO..

XXXXXX.  XXXXXX.
XX..XX.  XX..XX.
....XX.  ....XX.
...XX..  ...XX..
..XX...  ..XX...
..XX...  ..XX...
..XX...  ..XX...

<examplar 9> ( O : Hebb; X : Iter )
.OOOO..  .OOOO..  .OOOO..
OO..OO.  OO..OO.  OO..OO.
OO..OO.  OO..OO.  OO..OO.
.OOOO..  .OOOO..  .OOOO..
OO..OO.  .O..OO.  .O..OO.
OO..OO.  OO..OO.  OO..OO.
.OOOO..  .OOOO..  .OOOO..

.XXXX..  .XXXX..
XX..XX.  XX..XX.
XX..XX.  XX..XX.
.XXXX..  .XXXX..
XX..XX.  XX..XX.
XX..XX.  XX..XX.
.XXXX..  .XXXX..

<examplar 10> ( O : Hebb; X : Iter )
.OOOO..  .OOOO..  .OOOO..  .OOOO..
OO..OO.  OO..OO.  OO..OO.  OO..OO.
OO..OO.  OO..OO.  OO..OO.  OO..OO.
.OOOOO.  .OOOO..  .OOOO..  .OOOO..
....OO.  ....OO.  .O..OO.  .O..OO.
...OO..  OO..OO.  OO..OO.  OO..OO.
.OOO...  .OOOO..  .OOOO..  .OOOO..

.XXXX..  .XXXX..
XX..XX.  XX..XX.
XX..XX.  XX..XX.
.XXXXX.  .XXXXX.
....XX.  ....XX.
...XX..  ...XX..
.XXX...  .XXX...
```

III. Noise Robustness

```
<examplar 1> ( O : Hebb; X : Iter )
.00000. .00000. .00000. .0000.. .0000..
000...0 00...00 00..00. 00..00. 00..00.
0000000 00..000 00..00. 00..00. 00..00.
00.0000 00.0000 00.000. .0000.. .0000..
0000.00 0000.00 000.00. .0..00. .0..00.
000...0 000..00 00..00. 00..00. 00..00.
.00000. .00000. .0000.. .0000.. .0000..

.XXXXX. .XXXXX. XXXXXX. X.XXXX. XXXX.X. X.XXXX. XXXX.X. X.XX.X. XXXX.XX X.XX.XX XXXX.XX X.XX.XX XXXX.XX X.XX.XX
XXX...X XX...XX .XXX..X X....XX .XXX..X X....XX .XXX..X X....XX .XXX..X X....XX .XXX..X X.....X .XXX..X X.....X
XXXXXXX XX....X XX.XXXX XXX...X XXXXXXX XXX...X XXXXXXX .XXXX.X XXXXXXX XXXXX.X XXXXXXX .XXXX.X XXXXXXX .XXXX.X
XX.XXXX XX.X.XX XX.XXXX XX.X.XX X..XXXX XX.X.XX X..XXXX .X.X.XX X...XXX .X.X.XX X.X.XXX .X.X.XX X.X.XXX .X.X.XX
XXXX.XX X.XXXXX XXXX.XX X.XXXXX XXXX.XX X.XXXXX X.XX.XX X..XXXX X.XX.XX X..XXXX X.XX.XX X..XXXX X.XX.XX X..XXXX
XXX...X .XXX.XX X.X..XX .XXX.X. X.X..XX .XXX.XX X.X..XX .XXX.XX X.X..XX .XXX.XX X.X..XX .XXX.XX X.X..XX .XXX.XX
.XXXXX. .XXXXX. .XXXX.. XXXXXX. .XXXX.. XXXXXX. .XXXX.. XXXXXX. .XXXX.. XXXXXX. .XXXX.. XXXXXX. .XX.X.. XXXXXX.

<examplar 2> ( O : Hebb; X : Iter )
..00... 0.0...0 0.....0 0....00 0....00 0....00
.000..0 .000... ..00..0 ..00..0 ..00..0 ..00..0
..00... ..00... ..00..0 ..00..0 ..00..0 ..00..0
..00..0 ..00... ..00..0 0....00 0....00 0....00
..00... ..00... ..00... ..00..0 0.00..0 0.00..0
..00... ..00... ..00..0 ..00..0 ..00..0 ..00..0
0.0000. 000..0. 0....00 0....00 0....00 0....00

..XX... ..XX... ..XX... ..XX..X ..XX... ..XX..X X.XX..X X.XX..X
.XXX..X .XXX... .XXX..X .XXX... .XXX..X .XXX..X ..XX..X ..XX..X
..XX... ..XX..X ..XX... ..XX..X ..XX... ..XX..X ..XX.XX ..XX.XX
..XX..X X.XX... ..XX..X X.XX... ..XX..X X.XX..X X.XX..X X.XX..X
..XX... ..XX..X ..XX... ..XX..X ..XX..X ..XX..X ..XX..X ..XX..X
..XX... ..XX... ..XX... ..XX... ..XX... ..XX.X. ..XX.X. ..XX.X.
X.XXXX. XXXXXX. XXXXXX. XXXXXX. XXXXXX. XXXXXX. XXXXXX. XXXXXX.

<examplar 3> ( O : Hebb; X : Iter )
.0000.. .0000.. .0000.. .0000..
00..000 00..00. 00..00. 00..00.
0...00. .0..00. 00..00. 00..00.
0.000.0 .0000.. .0000.. .0000..
.00.... .0..00. .0..00. .0..00.
00..00. 00..00. 00..00. 00..00.
.0..000 .0000.. .0000.. .0000..

.XXXX.. .XXXX.. .XXX..X .XXXX.. .XXX..X .XXXX.. .XXX..X
XX..XXX X...XXX XX..XXX X...XXX XX..XXX X...XXX XX..XXX
X...XX. .....XX X...XX. ....XXX X...XXX ....XXX X...XXX
X.XXX.X .XXXX.. X.XXX.X .XXX..X ..XXX.X .XXXX.X ..XXX.X
.XX.... XX..X.X .XX.... XX..X.X .XX..X. XX..X.X .XX..X.
XX..XX. XX..X.. XX..XX. XX..X.. XX..XXX XX..X.. XX..XXX
.X..XXX X.XXXX. ...XX.X XXXX.X. ...XX.X XXX..X. ...XX.X

<examplar 4> ( O : Hebb; X : Iter )
.0000.. .0000.. .0000.. .0000..
00..00. 00..00. 00..00. 00..00.
...000. 00..00. 00..00. 00..00.
..0.0.. ..000.. .0000.. .0000..
....00. ....00. .0..00. .0..00.
00..00. 00..00. 00..00. 00..00.
.0000.. .0000.. .0000.. .0000..

.XXXX.. .XXXXX. .XXXXX. .XXXXX. .XXXXX. XXXXXX. .XXXXX.
XX..XX. XX..X.. XX..X.. XX..... XX..... XX..... XX.....
...XXX. .X..X.. XX.XX.. XXXXX.. XXXX... XXXX... XXXX...
..X.X.. ..XXXX. ..X.XX. ....XX. ....XX. ....XX. ....XX.
....XX. ....XX. ....XX. ....XX. ....XX. ....XX. ....XX.
XX..XX. XX..X.. XX..XX. XX..X.. XX..XX. XX..X.. XX..XX.
.XXXX.. .XXXX.. .XXX... .XXXX.. .XXXX.. .XXXX.. .XXXX..
```

```
<examplar 5> ( 0 : Hebb; X : Iter )
..0000.  .00000.  .0000..  .0000..  .0000..
.000.0.  00..00.  00..00.  00..00.  00..00.
.0..00.  .0..00.  00..00.  00..00.  00..00.
00.000.  00.000.  .0000..  .0000..  .0000..
00000.0  0000000  00..00.  .0..00.  .0..00.
....00.  00..00.  00..00.  00..00.  00..00.
...0000  .00000.  .0000..  .0000..  .0000..

..XXXX.  ..XXX..  ..XXX..  ...XXX.  ..X.X..  ...XXX.  ..X.X..
.XXX.X.  ..XX.X.  ..X....  ..XX.X.  ..XX...  ..XX.X.  ..XX...
.X..XX.  XXX..X.  .X...X.  XXX..X.  XX...X.  .XX....  XX...X.
XX.XXX.  XXX.X..  XX..XX.  XXX.X..  X...XX.  XXX....  X...XX.
XXXXX.X  XXXXXX.  XX.XXXX  X.X.XX.  XX.XXX.  X.X..X.  XX.XXX.
....XX.  ....XX.  .X..XX.  .X..XX.  .X..XX.  XX..XX.  .X..XX.
...XXXX  ...XXX.  .X.XXXX  ...XXX.  XX.XXXX  .X.XXX.  XX.XXXX

<examplar 6> ( 0 : Hebb; X : Iter )
000000.  .0000..  .0000..  .0000..
00.....  00..00.  00..00.  00..00.
0000...  00..00.  00..00.  00..00.
....0..  ..000..  .0000..  .0000..
....00.  ....00.  .0..00.  .0..00.
00..00.  00..00.  00..00.  00..00.
.0000..  .0000..  .0000..  .0000..

XXXXXX.  .XXXXX.  XXXXXX.  .XXXXX.
XX.....  XX.....  XX.....  XX.....
XXXX...  XXXX...  XXXX...  XXXX...
....X..  ....XX.  ....XX.  ....XX.
....XX.  ....XX.  ....XX.  ....XX.
XX..XX.  XX..XX.  XX..X..  XX..XX.
.XXXX..  .XXXX..  .XXXX..  .XXXX..

<examplar 7> ( 0 : Hebb; X : Iter )
..000..  .0000..  .0000..  .0000..
.00....  00..00.  00..00.  00..00.
00.....  00..00.  00..00.  00..00.
0..00.0  .0000..  .0000..  .0000..
00..000  00..00.  .0..00.  .0..00.
.0..00.  00..00.  00..00.  00..00.
.0000..  .0000..  .0000..  .0000..

..XXX..  ..XXXX.  ..X.X..  ..XXX..  ..XXX..
.XX....  .XX....  .XX....  .XX....  .XX....
XX.....  XX.....  XX.....  XX.....  XX.....
X..XX.X  XXXX...  XXXXX..  XXXXX..  XXXXX..
XX..XXX  XX..XX.  XX..XX.  XX..XX.  XX..XX.
.X..XX.  XX..XX.  XX..XX.  XX..XX.  XX..XX.
.XXXX..  .XXXX..  .XXXX..  .XXXX..  .XXXX..

<examplar 8> ( 0 : Hebb; X : Iter )
000.00.  .0000..  .0000..  .0000..  .0000..  .0000..
00..000  00..00.  00..00.  00..00.  00..00.  00..00.
0...00.  ....00.  ....00.  00..00.  00..00.  00..00.
...00..  ..000..  ..000..  ..000..  .0000..  .0000..
...0...  ..0....  ....00.  ....00.  .0..00.  .0..00.
..00...  ..00...  00..00.  00..00.  00..00.  00..00.
..00.0.  .000...  .0000..  .0000..  .0000..  .0000..

XXX.XX.  XX.XXX.  XXXXXX.  XXXXXX.  XXXXXX.  XXXXXXX  XXXXXX.  XXXXXXX  XXXXXX.  XXXXXXX  XXXXXX.
XX..XXX  XX..XX.  XX..XX.  XX..XX.  XX..X..  XX...X.  XX..X..  XX...X.  XX.....  .X.....  XX.....
X...XX.  ....XX.  ....XX.  .XX.XX.  X...XX.  .XXXX..  XX.XXX.  XXXXX..  XXXXX..  XXXXX..  XXXXX..
...XX..  ...XXX.  ....XX.  ...XX..  ....XX.  ...XXX.  ....XX.  ....XX.  ....XX.  ....XX.  ....XX.
...X...  ..X....  ...X...  ..X..X.  ...X...  ..X..X.  ...XX.X  ..X..X.  ...X..X  ..X..X.  ...X..X
..XX...  ..XX...  ..XX...  ..XX...  ..XX...  ..XXX..  ...X...  ..XXX..  ...X...  ..XXX..  ...X...
..XX.X.  ..XX...  ..XX...  ..XX...  .XXX...  ..XX...  XXXX...  ..XX...  XXXX...  ..XX.X.  XXXX...
```

```
<examplar 9> ( O : Hebb; X : Iter )
.OOOO..  .OOOO..  .OOOO..
O...OO.  OO..OO.  OO..OO.
OO..O..  OO..OO.  OO..OO.
.OOOO..  .OOOO..  .OOOO..
OO.OOO.  .O..OO.  .O..OO.
OO..O..  OO..OO.  OO..OO.
.OOOO..  .OOOO..  .OOOO..

.XXXX..  .XXXX..  ..XXX..  .XXXX..  ..XXX..  .XXXX..
X...XX.  .X..XX.  XX...X.  .XX.X..  XX...X.  .XX.X..
XX..X..  XX..XX.  .X..X..  XX..XX.  .X.....  XX..XX.
.XXXX..  ..XXX..  .XXXX..  ..XXX..  .XXXX..  ..XXX..
XX.XXX.  XXX.XX.  XX..XX.  XX..XX.  XX..XX.  XX..XX.
XX..X..  XX..XX.  XX..X..  XX..XX.  XX..XX.  XX..XX.
.XXXX..  .XXXX..  .XXXX..  .XXXX..  .XXXX..  .XXXX..

<examplar 10> ( O : Hebb; X : Iter )
.OO.O..  .OOOO..  .OOOO..  .OOOO..
OO..OO.  OO..OO.  OO..OO.  OO..OO.
OOO.OO.  OO..OO.  OO..OO.  OO..OO.
.OOOOO.  .OOOO..  .OOOO..  .OOOO..
O..OOO.  ....OO.  .O..OO.  .O..OO.
...OO..  OO..OO.  OO..OO.  OO..OO.
.OOO...  .OOOO..  .OOOO..  .OOOO..

.XX.X..  .XXXXX.  .XX.X..  XXXXXX.  .XX.X..
XX..XX.  .X...X.  XX..XX.  .X...X.  XX..XX.
XXX.XX.  XX..XX.  XXX.XX.  .X..XX.  XXX.XX.
.XXXXX.  .XX.XX.  ..X.XX.  .XX.XX.  ..X.XX.
X..XXX.  ....XX.  X...XX.  .....X.  X...XX.
...XX..  ...XX.X  .X.XX..  .X.XX.X  .X.XX..
.XXX...  .X.X...  .XXX...  .X.X...  .XXX...
```

| | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 6 | 6 | 0 | -4 | 0 | 2 | -2 | -4 | 4 | 0 | -2 | 4 | 6 | -2 | -4 | 4 | 0 | -4 | -6 | -6 | -4 | 2 | 4 | -2 | -4 | 0 | 2 | -2 | -4 | 2 | -2 | -2 | 4 | 4 | -4 | -4 | 4 | 2 | -6 | -4 | -6 | -6 | -2 | 4 |
| 0 | -4 | 10 | 6 | -10 | -8 | 4 | 6 | -2 | 2 | 0 | -6 | -4 | 8 | 6 | -2 | -6 | -2 | 0 | 4 | 6 | 0 | -2 | -4 | -2 | -2 | -4 | 0 | 2 | -4 | 4 | 4 | -2 | -2 | 2 | 2 | -2 | -4 | 4 | 6 | 4 | 0 | -4 | -6 |
| -4 | -8 | 6 | 10 | -6 | -8 | 0 | 2 | -6 | 2 | 0 | -6 | -4 | 4 | 2 | -6 | -6 | -2 | 4 | 8 | 6 | -4 | -6 | -4 | -2 | -2 | -4 | 0 | 2 | -8 | 4 | 4 | -2 | -2 | 2 | 2 | -6 | -4 | 8 | 10 | 8 | 4 | -4 | -10 |
| -2 | -10 | 4 | 8 | -4 | -6 | 2 | 4 | -8 | 0 | 2 | -4 | -6 | 6 | 4 | -8 | -4 | 0 | 2 | 6 | 8 | -2 | -8 | -2 | 0 | 0 | -2 | 2 | 4 | -6 | 2 | 2 | -4 | -4 | 4 | 4 | -8 | -6 | 6 | 8 | 10 | 6 | -2 | -8 |
| 0 | -8 | 6 | 6 | -6 | -8 | 4 | 6 | -6 | 2 | 4 | -6 | -8 | 8 | 6 | -6 | -2 | 2 | 0 | 4 | 10 | 0 | -6 | 0 | 2 | -2 | -4 | 4 | 6 | -4 | 4 | 4 | -6 | -6 | 6 | 6 | -6 | -8 | 4 | 6 | 8 | 4 | -4 | -6 |
| 0 | 2 | 0 | -4 | 0 | 2 | -2 | 0 | 4 | 0 | 2 | 4 | 2 | 2 | 0 | 4 | 4 | 0 | -10 | -6 | 0 | 6 | 4 | 2 | 0 | 4 | 6 | -2 | 0 | 6 | -2 | -2 | 4 | 0 | -4 | 0 | 4 | -2 | -6 | -4 | -2 | -2 | 2 | 4 |
| 2 | 0 | -4 | -8 | 4 | 6 | -2 | -4 | 8 | 0 | -2 | 4 | 6 | -6 | -4 | 8 | 4 | 0 | -2 | -6 | -8 | 2 | 8 | 2 | 0 | 0 | 2 | -2 | -4 | 6 | -2 | -2 | 4 | 4 | -4 | -4 | 8 | 6 | -6 | -8 | -10 | -6 | 2 | 8 |
| 0 | -4 | 0 | 6 | -10 | -8 | 4 | 6 | -2 | 2 | 0 | -6 | -4 | 8 | 6 | -2 | -6 | -2 | 0 | 4 | 6 | 0 | -2 | -4 | -2 | -2 | -4 | 0 | 2 | -4 | 4 | 4 | -2 | -2 | 2 | 2 | -2 | -4 | 4 | 6 | 4 | 0 | -4 | -6 |
| -4 | -8 | 6 | 0 | -6 | -8 | 0 | 2 | -6 | 2 | 0 | -6 | -4 | 4 | 2 | -6 | -6 | -2 | 4 | 8 | 6 | -4 | -6 | -4 | -2 | -2 | -4 | 0 | 2 | -8 | 4 | 4 | -2 | -2 | 2 | 2 | -6 | -4 | 8 | 10 | 8 | 4 | -4 | -10 |
| 0 | 4 | -10 | -6 | 0 | 8 | -4 | -6 | 2 | -2 | 0 | 6 | 4 | -8 | -6 | 2 | 6 | 2 | 0 | -4 | -6 | 0 | 2 | 4 | 2 | 2 | 4 | 0 | -2 | 4 | -4 | -4 | 2 | 2 | -2 | -2 | 2 | 4 | -4 | -6 | -4 | 0 | 4 | 6 |
| 2 | 6 | -8 | -8 | 8 | 0 | -2 | -4 | 4 | -4 | -2 | 8 | 6 | -6 | -4 | 4 | 4 | 0 | -2 | -6 | -8 | 2 | 4 | 2 | 0 | 4 | 6 | -2 | -4 | 6 | -6 | -6 | 4 | 4 | -4 | -4 | 4 | 6 | -6 | -8 | -6 | -2 | 6 | 8 |
| -2 | -2 | 4 | 0 | -4 | -2 | 0 | 8 | -4 | -4 | -2 | -4 | -6 | 6 | 8 | -4 | -4 | 0 | 2 | 2 | 4 | -2 | -4 | -2 | 0 | 0 | -2 | 2 | 0 | -2 | -2 | -2 | -4 | 0 | 4 | 0 | -4 | -2 | -2 | 0 | 2 | -2 | -2 | 0 |
| 0 | -4 | 6 | 2 | -6 | -4 | 8 | 0 | -2 | -2 | 0 | -6 | -8 | 8 | 10 | -2 | -2 | 2 | 0 | 4 | 6 | 0 | -2 | 0 | 2 | 2 | 0 | 0 | 2 | 0 | 0 | 0 | -2 | -2 | 2 | 2 | -2 | -4 | 0 | 2 | 4 | 0 | 0 | -2 |
| 4 | 8 | -2 | -6 | 2 | 4 | -4 | -2 | 0 | 2 | 0 | 2 | 4 | -4 | -2 | 10 | 6 | 2 | -4 | -4 | -6 | 4 | 10 | 4 | 2 | 2 | 4 | -4 | -2 | 8 | 0 | 0 | 6 | 2 | -6 | -2 | 10 | 4 | -4 | -6 | -8 | -4 | 4 | 6 |
| 0 | 0 | 2 | 2 | -2 | -4 | -4 | -2 | 2 | 0 | 8 | -2 | 0 | 0 | -2 | 2 | 2 | 6 | 0 | 0 | 2 | 4 | 2 | 4 | 2 | -6 | -4 | 4 | 6 | 0 | 4 | 4 | -2 | -2 | 2 | 2 | 2 | -4 | 4 | 2 | 0 | 0 | -4 | -2 |
| 2 | -2 | 0 | 0 | 0 | -2 | -2 | 0 | 0 | 8 | 0 | 0 | -2 | 2 | 0 | 0 | 4 | 8 | -2 | -2 | 4 | 6 | 0 | 6 | 4 | -4 | -2 | 6 | 8 | 2 | 2 | 2 | -4 | -4 | 4 | 4 | 0 | -6 | 2 | 0 | 2 | 2 | -2 | 0 |
| 4 | 4 | -6 | -6 | 6 | 8 | -4 | -6 | 2 | -2 | 0 | 0 | 8 | -4 | -6 | 2 | 2 | -2 | -4 | -8 | -6 | 4 | 2 | 0 | -2 | 2 | 4 | 0 | -2 | 4 | -4 | -4 | 2 | 2 | -2 | -2 | 2 | 4 | -4 | -6 | -4 | 0 | 4 | 6 |
| 2 | 6 | -4 | -4 | 4 | 6 | -6 | -8 | 4 | 0 | -2 | 8 | 0 | -6 | -8 | 4 | 0 | -4 | -2 | -6 | -8 | 2 | 4 | -2 | -4 | 0 | 2 | -2 | -4 | 2 | -2 | -2 | 4 | 4 | -4 | -4 | 4 | 6 | -2 | -4 | -6 | -2 | 2 | 4 |
| 2 | -6 | 8 | 4 | -8 | -6 | 6 | 8 | -4 | 0 | 2 | -4 | -6 | 0 | 8 | -4 | -4 | 0 | -2 | 2 | 8 | 2 | -4 | -2 | 0 | 0 | -2 | 2 | 4 | -2 | 2 | 2 | -4 | -4 | 4 | 4 | -4 | -6 | 2 | 4 | 6 | 2 | -2 | -4 |
| 0 | -4 | 6 | 2 | -6 | -4 | 8 | 10 | -2 | -2 | 0 | -6 | -8 | 8 | 0 | -2 | -2 | 2 | 0 | 4 | 6 | 0 | -2 | 0 | 2 | 2 | 0 | 0 | 2 | 0 | 0 | 0 | -2 | -2 | 2 | 2 | -2 | -4 | 0 | 2 | 4 | 0 | 0 | -2 |
| 4 | 8 | -2 | -6 | 2 | 4 | -4 | -2 | 10 | 2 | 0 | 2 | 4 | -4 | -2 | 0 | 6 | 2 | -4 | -4 | -6 | 4 | 10 | 4 | 2 | 2 | 4 | -4 | -2 | 8 | 0 | 0 | 6 | 2 | -6 | -2 | 10 | 4 | -4 | -6 | -8 | -4 | 4 | 6 |
| 4 | 4 | -6 | -6 | 6 | 4 | -4 | -2 | 6 | 2 | 4 | 2 | 0 | -4 | -2 | 6 | 0 | 6 | -4 | -4 | -2 | 4 | 6 | 8 | 6 | 2 | 4 | 0 | 2 | 8 | 0 | 0 | 2 | -2 | -2 | 2 | 6 | 0 | -4 | -6 | -4 | 0 | 4 | 6 |
| 0 | 0 | -2 | -2 | 2 | 0 | 0 | 2 | 2 | 6 | 8 | -2 | -4 | 0 | 2 | 2 | 6 | 0 | 0 | 0 | 2 | 4 | 2 | 8 | 6 | -2 | 0 | 4 | 6 | 4 | 0 | 0 | -2 | -2 | 2 | 2 | 2 | -4 | 0 | -2 | 0 | 0 | 0 | 2 |
| 0 | -2 | 0 | 4 | 0 | -2 | 2 | 0 | -4 | 0 | -2 | -4 | -2 | -2 | 0 | -4 | -4 | 0 | 0 | 6 | 0 | -6 | -4 | -2 | 0 | -4 | -6 | 2 | 0 | -6 | 2 | 2 | -4 | 0 | 4 | 0 | -4 | 2 | 6 | 4 | 2 | 2 | -2 | -4 |
| 6 | -6 | 4 | 8 | -4 | -6 | 2 | 4 | -4 | 0 | -2 | -8 | -6 | 2 | 4 | -4 | -4 | 0 | 6 | 0 | 4 | -6 | -4 | -2 | 0 | 0 | -2 | -2 | 0 | -6 | 2 | 2 | 0 | 0 | 0 | 0 | -4 | -2 | 6 | 8 | 6 | 2 | -2 | -8 |
| 0 | -8 | 6 | 6 | -6 | -8 | 4 | 6 | -6 | 2 | 4 | -6 | -8 | 8 | 6 | -6 | -2 | 2 | 0 | 4 | 0 | 0 | -6 | 0 | 2 | -2 | -4 | 4 | 6 | -4 | 4 | 4 | -6 | -6 | 6 | 6 | -6 | -8 | 4 | 6 | 8 | 4 | -4 | -6 |
| 6 | 2 | 0 | -4 | 0 | 2 | -2 | 0 | 4 | 4 | 6 | 4 | 2 | 2 | 0 | 4 | 4 | 4 | -6 | -6 | 0 | 0 | 4 | 2 | 0 | 0 | 2 | 2 | 4 | 6 | -2 | -2 | 0 | 0 | 0 | 0 | 4 | -2 | -2 | -4 | -2 | -2 | 2 | 4 |
| 4 | 8 | -2 | -6 | 2 | 4 | -4 | -2 | 10 | 2 | 0 | 2 | 4 | -4 | -2 | 10 | 6 | 2 | -4 | -4 | -6 | 4 | 0 | 4 | 2 | 2 | 4 | -4 | -2 | 8 | 0 | 0 | 6 | 2 | -6 | -2 | 10 | 4 | -4 | -6 | -8 | -4 | 4 | 6 |
| 2 | 2 | -4 | -4 | 4 | 2 | -2 | 0 | 4 | 4 | 6 | 0 | -2 | -2 | 0 | 4 | 8 | 8 | -2 | -2 | 0 | 2 | 4 | 0 | 8 | 0 | 2 | 2 | 4 | 6 | 2 | 2 | 0 | -4 | 0 | 4 | 4 | -2 | -2 | -4 | -2 | 2 | 2 | 4 |
| 0 | 0 | -2 | -2 | 2 | 0 | 0 | 2 | 2 | 2 | 4 | -2 | -4 | 0 | 2 | 2 | 6 | 6 | 0 | 0 | 2 | 0 | 2 | 8 | 0 | 2 | 0 | 0 | 2 | 4 | 4 | 4 | -2 | -6 | 2 | 6 | 2 | 0 | 0 | -2 | 0 | 4 | 4 | 2 |
| 4 | 0 | -2 | -2 | 2 | 4 | 0 | 2 | 2 | -6 | -4 | 2 | 0 | 0 | 2 | 2 | 2 | -2 | -4 | 0 | -2 | 0 | 2 | 0 | 2 | 0 | 8 | -8 | -6 | 4 | -4 | -4 | 6 | 2 | -6 | -2 | 2 | 4 | -4 | -2 | 0 | 0 | 8 | 2 |
| 6 | 2 | -4 | -4 | 4 | 6 | -2 | 0 | 4 | -4 | -2 | 4 | 2 | -2 | 0 | 4 | 4 | 0 | -6 | -2 | -4 | 2 | 4 | 2 | 0 | 8 | 0 | -6 | -4 | 6 | -6 | -6 | 8 | 4 | -8 | -4 | 4 | 2 | -6 | -4 | -2 | -2 | 6 | 4 |
| 2 | -2 | 0 | 0 | 0 | -2 | 2 | 0 | -4 | 4 | 6 | 0 | -2 | 2 | 0 | -4 | 0 | 4 | 2 | -2 | 4 | 2 | -4 | 2 | 0 | -8 | -6 | 0 | 8 | -2 | 2 | 2 | -8 | -4 | 8 | 4 | -4 | -6 | 2 | 0 | 2 | 2 | -6 | 0 |
| 0 | -4 | 2 | 2 | -2 | -4 | 0 | 2 | -2 | 6 | 8 | -2 | -4 | 4 | 2 | -2 | 2 | 6 | 0 | 0 | 6 | 4 | -2 | 4 | 2 | -6 | -4 | 8 | 0 | 0 | 4 | 4 | -6 | -6 | 6 | 6 | -2 | -8 | 4 | 2 | 4 | 4 | -4 | -2 |
| 6 | 6 | -4 | -8 | 4 | 6 | -2 | 0 | 8 | 0 | 2 | 4 | 2 | -2 | 0 | 8 | 8 | 4 | -6 | -6 | -4 | 6 | 8 | 6 | 4 | 4 | 6 | -2 | 0 | 0 | -2 | -2 | 4 | 0 | -4 | 0 | 8 | 2 | -6 | -8 | -6 | -2 | 6 | 8 |
| 2 | -2 | 4 | 4 | -4 | -6 | -2 | 0 | 0 | 4 | 2 | -4 | -2 | 2 | 0 | 0 | 0 | 0 | 2 | 2 | 4 | -2 | 0 | 2 | 4 | -4 | -6 | 2 | 4 | -2 | 0 | 10 | -4 | -8 | 4 | 8 | 0 | -2 | 6 | 4 | 2 | 6 | -2 | -4 |
| 2 | -2 | 4 | 4 | -4 | -6 | -2 | 0 | 0 | 4 | 2 | -4 | -2 | 2 | 0 | 0 | 0 | 0 | 2 | 2 | 4 | -2 | 0 | 2 | 4 | -4 | -6 | 2 | 4 | -2 | 10 | 0 | -4 | -8 | 4 | 8 | 0 | -2 | 6 | 4 | 2 | 6 | -2 | -4 |
| 4 | 4 | -2 | -2 | 2 | 4 | -4 | -2 | 6 | -2 | -4 | 2 | 4 | -4 | -2 | 6 | 2 | -2 | -4 | 0 | -6 | 0 | 6 | 0 | -2 | 6 | 8 | -8 | -6 | 4 | -4 | -4 | 0 | 6 | -10 | -6 | 6 | 4 | -4 | -2 | -4 | -4 | 4 | 2 |
| 0 | 4 | -2 | -2 | 2 | 4 | 0 | -2 | 2 | -2 | -4 | 2 | 4 | -4 | -2 | 2 | -2 | -2 | 0 | 0 | -6 | 0 | 2 | -4 | -6 | 2 | 4 | -4 | -6 | 0 | -8 | -8 | 6 | 0 | -6 | -10 | 2 | 4 | -4 | -2 | -4 | -8 | 0 | 2 |
| 4 | -4 | 2 | 2 | -2 | -4 | 4 | 2 | -6 | 2 | 4 | -2 | -4 | 4 | 2 | -6 | -2 | 2 | 4 | 0 | 6 | 0 | -6 | 0 | 2 | -6 | -8 | 8 | 6 | -4 | 4 | 4 | -10 | -6 | 0 | 6 | -6 | -4 | 4 | 2 | 4 | 4 | -4 | -2 |
| 0 | -4 | 2 | 2 | -2 | -4 | 0 | 2 | -2 | 2 | 4 | -2 | -4 | 4 | 2 | -2 | 2 | 2 | 0 | 0 | 6 | 0 | -2 | 4 | 6 | -2 | -4 | 4 | 6 | 0 | 8 | 8 | -6 | -10 | 6 | 0 | -2 | -4 | 4 | 2 | 4 | 8 | 0 | -2 |
| 4 | 8 | -2 | -6 | 2 | 4 | -4 | -2 | 10 | 2 | 0 | 2 | 4 | -4 | -2 | 10 | 6 | 2 | -4 | -4 | -6 | 4 | 10 | 4 | 2 | 2 | 4 | -4 | -2 | 8 | 0 | 0 | 6 | 2 | -6 | -2 | 0 | 4 | -4 | -6 | -8 | -4 | 4 | 6 |
| 2 | 6 | -4 | -4 | 4 | 6 | -2 | -4 | 4 | -4 | -6 | 4 | 6 | -6 | -4 | 4 | 0 | -4 | 2 | -2 | -8 | -2 | 4 | -2 | 0 | 4 | 2 | -6 | -8 | 2 | -2 | -2 | 4 | 4 | -4 | -4 | 4 | 0 | -2 | -4 | -6 | -2 | 6 | 4 |
| 6 | -6 | 4 | 8 | -4 | -6 | -2 | 0 | -4 | 4 | 2 | -4 | -2 | 2 | 0 | -4 | -4 | 0 | 6 | 6 | 4 | -2 | -4 | -2 | 0 | -4 | -6 | 2 | 4 | -6 | 6 | 6 | -4 | -4 | 4 | 4 | -4 | -2 | 0 | 8 | 6 | 6 | -2 | -8 |
| 4 | -8 | 6 | 10 | -6 | -8 | 0 | 2 | -6 | 2 | 0 | -6 | -4 | 4 | 2 | -6 | -6 | -2 | 4 | 8 | 6 | -4 | -6 | -4 | -2 | -2 | -4 | 0 | 2 | -8 | 4 | 4 | -2 | -2 | 2 | 2 | -6 | -4 | 8 | 0 | 8 | 4 | -4 | -10 |
| 2 | -10 | 4 | 8 | -4 | -6 | 2 | 4 | -8 | 0 | 2 | -4 | -6 | 6 | 4 | -8 | -4 | 0 | 2 | 6 | 8 | -2 | -8 | -2 | 0 | 0 | -2 | 2 | 4 | -6 | 2 | 2 | -4 | -4 | 4 | 4 | -8 | -6 | 6 | 8 | 0 | 6 | -2 | -8 |
| 2 | -6 | 0 | 4 | 0 | -2 | -2 | 0 | -4 | 0 | 2 | 0 | -2 | 2 | 0 | -4 | 0 | 0 | 2 | 2 | 4 | -2 | -4 | 2 | 4 | 0 | -2 | 2 | 4 | -2 | 6 | 6 | -4 | -8 | 4 | 8 | -4 | -2 | 6 | 4 | 6 | 0 | 2 | -4 |
| 2 | 2 | -4 | -4 | 4 | 6 | -2 | 0 | 4 | -4 | -2 | 4 | 2 | -2 | 0 | 4 | 4 | 0 | -2 | -2 | -4 | 2 | 4 | 2 | 4 | 8 | 6 | -6 | -4 | 6 | -2 | -2 | 4 | 0 | -4 | 0 | 4 | 6 | -2 | -4 | -2 | 2 | 0 | 4 |
| 4 | 8 | -6 | -10 | 6 | 8 | 0 | -2 | 6 | -2 | 0 | 6 | 4 | -4 | -2 | 6 | 6 | 2 | -4 | -8 | -6 | 4 | 6 | 4 | 2 | 2 | 4 | 0 | -2 | 8 | -4 | -4 | 2 | 2 | -2 | -2 | 6 | 4 | -8 | -10 | -8 | -4 | 4 | 0 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -1.06 | -0.20 | -0.12 | -0.04 | -0.26 | 0.91 | -0.60 | 0.01 | 0.72 | 1.15 | -0.11 | 0.10 | 0.61 | -0.89 | 0.29 | 0.31 | -0.25 | 0.73 | 0.15 | -0.16 | -0.62 | -0.13 | -0.22 | 0.18 | -0.69 | 0.64 | -0.06 | 0.42 | -1.04 | -0.64 | 0.93 | 0.30 | 0.57 | 0.56 | -0.73 | 0.92 | 0.86 | 0.63 | -0.19 | -0.61 | -0.12 | -0.38 |
| 0.84 | -0.45 | -1.05 | -0.73 | -0.13 | 0.75 | 0.35 | -0.04 | 0.81 | -0.98 | -0.62 | -0.96 | -0.22 | -0.30 | 0.69 | 0.96 | 0.16 | 0.99 | 0.69 | 0.21 | 0.43 | -0.24 | 0.26 | 0.33 | 0.39 | -0.15 | 0.32 | 0.40 | -0.61 | 0.27 | -0.90 | 0.79 | -0.55 | 0.06 | -0.31 | -0.90 | 0.57 | 0.89 | 0.58 | -0.46 | 0.92 | 0.50 |
| -0.43 | 0.40 | 0.07 | -0.99 | -0.89 | 0.48 | -0.92 | -0.63 | 0.74 | 0.13 | 0.59 | 0.21 | -0.59 | 0.64 | 0.32 | 0.39 | 0.99 | 0.52 | -0.26 | -0.08 | 0.89 | 0.78 | -0.53 | 0.94 | 0.52 | -0.78 | 0.14 | 0.73 | -0.89 | -0.20 | -0.09 | 0.71 | -0.06 | 0.77 | 0.74 | -0.25 | 0.13 | 0.62 | 0.34 | 1.01 | 0.20 | 0.69 |
| 0.68 | 0.76 | -0.99 | 0.86 | 0.56 | -0.34 | 0.23 | 0.13 | 0.35 | 0.40 | 0.70 | 0.89 | 0.82 | 0.58 | 0.62 | -0.50 | -0.51 | 0.71 | 1.04 | 0.54 | 0.49 | -0.86 | -0.46 | 0.40 | 0.09 | 0.31 | -0.03 | 0.98 | 0.29 | -0.06 | 0.72 | 0.17 | 0.11 | 0.62 | 0.23 | 0.17 | -0.34 | 0.64 | 0.75 | 0.26 | -0.99 | 0.64 |
| 0.07 | 0.16 | 0.37 | 0.66 | -0.20 | 0.66 | -0.50 | 0.99 | 0.38 | 0.00 | 0.42 | -0.1 | -0.63 | -0.41 | 0.37 | 0.84 | 0.14 | 0.61 | 0.26 | -0.66 | -0.33 | -0.08 | 0.66 | -0.37 | 0.53 | 0.03 | 1.20 | -0.50 | 0.70 | 0.99 | 0.40 | 0.41 | -0.97 | 0.72 | 0.20 | -0.06 | 0.07 | -0.49 | 0.59 | -0.11 | 0.01 | 0.78 |
| 1.11 | -0.49 | 0.50 | 0.55 | 0.53 | 0.58 | -0.09 | 0.34 | 0.40 | 0.71 | 0.81 | -0.50 | 0.67 | 0.06 | 1.16 | -0.63 | -0.61 | 0.03 | 0.53 | 0.46 | -0.20 | -0.00 | 0.61 | -0.97 | 0.47 | -0.35 | -0.28 | 0.23 | -0.51 | 0.57 | 0.04 | -0.76 | 0.55 | 0.09 | -0.80 | 0.81 | -0.16 | 1.04 | 0.51 | -0.57 | 0.63 | 0.09 |
| 0.54 | -0.57 | 0.91 | 0.84 | 0.66 | -0.30 | 0.03 | 0.25 | 0.51 | 0.13 | 0.99 | 0.22 | 0.57 | -0.36 | -0.21 | -0.26 | 0.90 | -0.95 | 0.07 | -0.57 | 0.00 | 0.93 | 0.42 | -0.89 | 0.17 | 0.37 | -0.76 | 0.65 | -0.54 | 0.58 | -0.61 | 0.29 | 0.74 | 0.05 | 0.54 | 0.35 | 0.61 | 0.36 | 0.27 | 0.20 | 0.52 | 0.23 |
| 0.00 | 0.84 | 0.58 | -0.05 | 0.37 | 0.1 | -0.33 | 0.49 | 0.33 | -1.00 | 0.42 | -0.71 | 1.04 | -0.42 | 0.97 | 0.36 | 0.19 | 0.13 | -0.28 | -0.84 | -0.30 | -0.45 | 0.38 | -0.43 | -0.34 | 0.35 | 0.20 | 0.03 | 1.13 | 0.38 | 0.93 | -1.20 | 0.26 | 0.63 | 0.03 | 0.44 | -0.83 | -0.49 | 0.49 | 0.45 | 0.1 | -0.17 |
| 0.84 | 0.00 | 0.61 | 0.74 | 0.13 | 0.98 | 0.55 | -0.26 | 0.76 | 0.20 | -0.66 | 0.99 | 0.26 | -0.58 | 0.04 | 0.70 | 0.03 | 0.35 | -0.53 | -0.20 | -0.41 | 0.47 | 0.85 | -0.90 | 0.55 | 0.51 | 0.34 | 0.68 | -0.48 | -0.27 | -0.19 | -0.22 | -0.19 | -0.71 | 0.44 | 0.66 | -0.36 | 0.96 | -0.74 | -0.50 | 0.95 | 0.83 |
| 0.58 | 0.61 | 0.00 | 0.79 | -0.19 | 0.01 | -0.45 | 0.42 | -0.23 | 0.06 | 0.32 | -1.01 | -0.58 | -0.27 | -1.05 | 0.52 | 0.40 | -0.50 | -1.19 | 0.52 | -1.15 | 0.35 | 0.32 | -0.08 | 0.27 | 1.04 | 0.16 | -0.59 | -1.04 | 0.68 | 0.27 | 0.44 | -0.25 | 0.25 | 0.48 | 1.07 | -0.39 | 0.00 | 0.36 | -0.12 | -0.83 | -0.57 |
| -0.05 | 0.74 | 0.79 | 0.00 | -0.12 | 0.60 | 0.64 | -0.98 | 0.56 | -0.40 | 0.94 | -0.17 | 0.19 | -0.75 | 0.26 | -0.66 | 1.0 | 0.82 | -0.17 | 0.14 | 0.49 | -0.01 | 0.62 | -0.05 | 0.49 | 0.24 | 0.02 | -0.32 | -0.80 | 0.60 | -0.40 | 0.28 | 0.92 | 0.56 | -0.26 | 1.03 | 0.43 | 0.34 | 0.47 | 0.48 | -0.34 | 0.96 |
| 0.37 | 0.13 | -0.19 | -0.12 | 0.00 | -0.46 | 0.59 | -0.77 | -0.31 | 0.33 | -0.19 | -0.26 | -0.63 | -0.63 | -0.59 | 0.39 | -0.39 | -0.74 | 0.12 | -0.97 | 0.59 | -0.44 | 0.48 | -0.30 | -0.87 | 0.81 | -0.43 | -0.13 | 0.58 | 0.21 | 0.42 | 0.28 | 0.93 | 0.24 | 0.66 | 0.20 | -0.04 | -0.50 | 0.86 | 0.21 | -0.04 | 0.32 |
| 0.1 | 0.98 | 0.01 | 0.60 | -0.46 | 0.00 | 0.14 | 0.87 | 0.08 | -0.56 | -0.96 | 0.94 | 0.63 | 0.33 | -0.32 | 0.18 | -0.39 | -0.60 | 0.96 | 0.14 | 0.20 | 0.87 | 1.10 | -0.16 | -0.21 | -0.64 | -0.23 | 0.48 | 0.53 | 0.17 | -0.55 | -0.1 | 0.74 | 0.75 | 0.63 | 0.67 | 0.33 | -0.12 | 0.28 | 0.45 | -0.18 | 0.41 |
| -0.33 | 0.55 | -0.45 | 0.64 | 0.59 | 0.14 | 0.00 | 0.70 | -0.64 | -0.91 | 0.66 | -0.75 | 0.88 | 0.80 | -0.14 | -0.16 | -0.15 | 0.86 | -0.66 | 0.94 | 0.98 | 0.71 | -0.38 | 0.73 | -0.67 | 0.72 | -0.77 | 0.76 | 0.04 | -0.16 | 0.16 | -0.80 | -0.92 | -0.09 | -0.15 | 0.39 | 0.89 | 0.93 | -0.08 | 0.44 | 0.99 | 0.10 |
| 0.49 | -0.26 | -0.42 | -0.98 | -0.77 | 0.87 | 0.70 | 0.00 | 0.29 | -0.09 | 0.65 | 0.25 | 0.17 | 0.48 | -0.84 | 0.50 | -0.45 | -0.03 | -0.63 | -0.21 | 0.34 | 0.17 | 0.69 | 0.37 | -0.75 | -0.18 | -0.62 | 0.48 | -0.11 | -0.53 | 0.71 | 0.44 | 0.96 | -0.34 | -0.59 | 0.11 | 0.33 | 0.11 | 0.78 | 0.26 | 0.77 | -0.04 |
| 0.33 | 0.76 | -0.23 | 0.56 | -0.31 | 0.08 | -0.64 | 0.29 | 0.00 | -0.99 | 0.89 | 0.45 | 0.46 | 0.54 | 0.72 | -0.37 | -0.73 | -0.97 | -0.59 | 0.69 | 0.92 | -0.29 | 0.09 | -0.23 | 0.65 | 0.44 | 0.26 | 0.96 | -0.22 | -0.07 | 0.73 | 0.81 | -0.16 | -0.88 | 0.62 | -0.98 | 0.38 | -0.59 | 0.98 | -0.11 | 0.67 | 0.82 |
| -1.00 | -0.20 | 0.06 | -0.40 | 0.33 | -0.56 | -0.91 | -0.09 | -0.99 | 0.00 | -0.36 | 0.17 | -0.05 | 0.43 | -0.65 | -0.32 | -0.42 | -0.19 | -0.79 | 0.35 | 0.72 | -0.81 | -0.05 | -1.18 | 0.43 | -0.56 | -0.26 | 0.45 | 0.45 | -1.09 | -0.03 | 0.97 | 0.43 | 0.52 | 0.55 | 0.02 | 0.66 | -0.90 | 0.53 | 0.48 | -0.41 | 0.82 |
| 0.42 | -0.66 | 0.32 | 0.94 | -0.19 | -0.96 | 0.66 | 0.65 | 0.89 | -0.36 | 0.00 | -0.88 | -0.88 | 0.90 | 0.31 | -0.21 | 0.29 | -0.29 | 0.47 | -0.27 | 0.99 | 0.39 | -1.04 | 0.29 | -0.82 | 0.62 | -0.21 | 0.03 | 0.69 | -0.14 | -0.93 | 1.12 | 0.96 | -0.87 | -0.48 | 1.0 | -0.38 | 0.71 | -0.62 | -0.61 | -0.61 | 0.58 |
| -0.71 | 0.99 | -1.01 | -0.17 | -0.26 | 0.94 | -0.75 | 0.25 | 0.45 | 0.17 | -0.88 | 0.00 | -0.44 | 0.59 | -0.29 | 0.43 | 0.64 | 0.76 | -0.87 | -0.57 | -0.86 | 0.40 | -0.68 | 0.82 | -0.01 | -1.0 | -0.26 | 0.46 | -0.86 | -0.46 | 0.89 | -0.67 | -0.90 | 0.26 | 0.73 | -0.73 | -0.14 | 1.20 | -0.09 | -0.40 | -0.95 | -0.77 |
| 1.04 | -0.26 | -0.58 | 0.19 | -0.63 | 0.63 | 0.88 | 0.17 | 0.46 | -0.05 | -0.88 | -0.44 | 0.00 | 0.02 | 0.75 | -0.08 | -0.31 | 0.64 | 0.18 | 0.77 | -0.82 | -0.67 | -0.29 | -0.59 | 0.39 | 0.47 | 1.04 | -0.52 | -0.75 | 0.12 | 0.70 | 0.57 | 0.81 | 0.28 | -0.55 | -0.88 | 0.03 | -0.41 | 0.94 | 1.01 | -0.52 | -0.54 |
| -0.42 | -0.58 | -0.27 | -0.75 | -0.63 | 0.33 | 0.80 | 0.48 | 0.54 | 0.43 | 0.90 | 0.59 | 0.02 | 0.00 | -0.53 | -0.08 | 0.81 | 0.63 | -0.01 | 0.98 | 0.55 | 0.04 | 0.28 | 0.54 | 0.37 | 0.02 | 0.26 | 0.67 | 0.54 | 0.06 | 0.81 | -0.33 | 0.07 | 0.88 | 0.38 | -1.09 | 0.44 | -0.29 | 0.35 | -0.58 | 0.61 | 0.37 |
| 0.97 | 0.04 | -1.05 | 0.26 | -0.59 | -0.32 | -0.14 | -0.84 | 0.72 | -0.65 | 0.31 | -0.29 | 0.75 | 0.53 | 0.00 | 0.49 | 0.05 | 1.13 | -0.46 | 0.22 | 1.03 | -0.53 | 0.76 | 0.01 | -0.06 | 0.57 | -0.56 | 0.15 | -0.00 | -0.19 | 0.15 | 0.28 | -0.47 | -0.38 | -0.69 | 0.28 | -0.76 | -0.12 | 0.91 | 0.99 | 0.60 | 0.47 |
| 0.36 | 0.78 | 0.52 | -0.66 | 0.39 | 0.18 | -0.16 | 0.50 | -0.37 | -0.32 | -0.21 | 0.43 | -0.08 | -0.08 | 0.49 | 0.00 | -0.05 | -0.30 | 0.98 | 1.09 | -0.32 | -0.58 | 1.17 | 0.35 | -0.78 | 0.49 | 0.11 | -0.16 | 0.01 | -0.23 | 0.50 | 0.71 | 0.68 | 0.76 | -0.17 | -0.59 | 0.18 | 1.08 | 0.41 | 1.07 | -0.49 | 0.76 |
| 0.19 | 0.03 | -0.40 | 1.0 | -0.39 | -0.39 | -0.15 | -0.45 | -0.73 | -0.42 | 0.29 | 0.64 | -0.31 | 0.81 | 0.05 | -0.05 | 0.00 | 0.25 | 0.73 | 0.56 | -0.04 | -0.51 | 0.22 | -0.99 | -0.60 | 0.74 | -0.87 | -0.14 | -0.70 | 0.21 | 0.53 | 1.15 | 0.35 | 0.24 | 0.82 | 1.08 | -0.01 | 0.23 | 0.12 | 0.54 | 0.12 | 0.21 |
| 0.13 | 0.35 | -0.50 | 0.82 | -0.74 | -0.60 | 0.86 | -0.03 | -0.97 | -0.19 | -0.29 | 0.76 | 0.64 | 0.63 | 1.13 | -0.30 | 0.25 | 0.00 | 0.11 | -0.61 | 0.62 | 0.02 | 0.35 | -0.76 | 0.32 | 0.88 | -0.37 | -0.50 | 0.68 | 0.05 | 0.93 | 0.38 | -0.81 | 0.19 | 0.32 | 0.30 | 0.77 | 1.22 | -0.20 | 0.81 | -0.78 | -0.16 |
| -0.28 | -0.53 | -1.19 | -0.17 | 0.12 | 0.96 | -0.66 | -0.63 | -0.59 | -0.79 | 0.47 | -0.87 | 0.18 | -0.01 | -0.46 | 0.98 | 0.73 | 0.11 | 0.00 | 0.06 | -0.70 | 0.45 | 0.94 | -0.87 | -0.85 | 0.41 | 0.48 | 0.50 | 1.01 | 0.12 | 0.51 | 0.74 | -0.95 | 0.52 | 0.96 | 0.42 | -0.32 | -0.46 | -0.71 | 0.95 | 0.88 | -1.05 |
| -0.84 | -0.20 | 0.52 | 0.14 | -0.97 | 0.14 | 0.94 | -0.21 | 0.69 | 0.35 | -0.27 | -0.57 | 0.77 | 0.98 | 0.22 | 1.09 | 0.56 | -0.61 | 0.06 | 0.00 | -0.49 | 0.96 | -0.69 | 0.87 | -0.96 | 0.15 | 1.20 | 0.69 | -0.90 | -0.77 | 0.02 | 0.12 | 0.56 | 0.42 | 0.76 | -0.06 | 0.60 | -0.31 | -0.32 | 0.48 | 0.44 | -0.18 |
| -0.30 | -0.41 | -1.15 | 0.49 | 0.59 | 0.20 | 0.98 | 0.34 | 0.92 | 0.72 | 0.99 | -0.86 | -0.82 | 0.55 | 1.03 | -0.32 | -0.04 | 0.62 | -0.70 | -0.49 | 0.00 | 0.75 | 0.70 | -0.72 | 0.52 | -0.17 | -0.33 | 0.90 | -0.52 | -0.50 | -0.45 | 0.84 | -0.33 | 0.74 | 0.86 | 0.24 | 0.65 | 0.53 | 0.51 | -0.08 | -0.10 | 0.36 |
| -0.45 | 0.47 | 0.35 | -0.01 | -0.44 | 0.87 | 0.71 | 0.17 | -0.29 | -0.81 | 0.39 | 0.40 | -0.67 | 0.04 | -0.53 | -0.58 | -0.51 | 0.02 | 0.45 | 0.96 | 0.75 | 0.00 | 0.69 | 0.34 | 0.13 | 0.34 | 1.19 | -0.79 | -0.11 | 0.52 | 0.73 | -0.89 | 0.65 | -0.70 | 0.95 | -0.92 | 0.30 | -0.60 | -0.02 | 0.65 | 0.06 | -0.86 |
| 0.38 | 0.85 | 0.32 | 0.62 | 0.48 | 1.10 | -0.38 | 0.69 | 0.09 | -0.05 | -1.04 | -0.68 | -0.29 | 0.28 | 0.76 | 1.17 | 0.22 | 0.35 | 0.94 | -0.69 | 0.70 | 0.69 | 0.00 | 1.12 | -0.33 | -0.19 | -0.30 | 0.14 | 0.22 | -0.03 | 1.04 | 0.05 | 0.45 | -0.35 | -0.29 | -0.82 | -0.56 | 0.36 | 0.13 | 0.30 | 0.43 | 0.14 |
| -0.43 | -0.90 | -0.08 | -0.05 | -0.30 | -0.16 | 0.73 | 0.37 | -0.23 | -1.18 | 0.29 | 0.82 | -0.59 | 0.54 | 0.01 | 0.35 | -0.99 | -0.76 | -0.87 | 0.87 | -0.72 | 0.34 | 1.12 | 0.00 | 0.56 | 0.40 | 0.22 | 0.90 | -0.62 | 0.30 | 0.37 | -0.03 | -0.84 | -0.85 | -0.55 | 0.83 | 0.66 | -0.57 | 0.92 | -0.46 | -0.37 | -0.77 |
| -0.34 | 0.55 | 0.27 | 0.49 | -0.87 | -0.21 | -0.67 | -0.75 | 0.65 | 0.43 | -0.82 | -0.01 | 0.39 | 0.37 | -0.06 | -0.78 | -0.60 | 0.32 | -0.85 | -0.96 | 0.52 | 0.13 | -0.33 | 0.56 | 0.00 | -0.90 | 0.98 | -0.34 | 0.91 | 0.83 | -0.46 | -0.29 | -0.01 | 0.95 | -0.38 | -1.05 | -0.09 | -0.06 | 0.04 | 0.75 | -0.98 | -0.62 |
| 0.35 | 0.51 | 1.04 | 0.24 | 0.81 | -0.64 | 0.72 | -0.18 | 0.44 | -0.56 | 0.62 | -1.0 | 0.47 | 0.02 | 0.57 | 0.49 | 0.74 | 0.88 | 0.41 | 0.15 | -0.17 | 0.34 | -0.19 | 0.40 | -0.90 | 0.00 | 0.54 | -0.52 | 0.42 | -1.05 | -0.59 | -0.29 | -0.09 | -0.26 | 0.31 | -0.79 | -0.24 | 0.01 | -0.27 | 0.36 | -0.96 | 0.95 |
| 0.20 | 0.34 | 0.16 | 0.02 | -0.43 | -0.23 | -0.77 | -0.62 | 0.26 | -0.26 | -0.21 | -0.26 | 1.04 | 0.26 | -0.56 | 0.11 | -0.87 | -0.37 | 0.48 | 1.20 | -0.33 | 1.19 | -0.30 | 0.22 | 0.98 | 0.54 | 0.00 | 0.43 | 0.66 | 0.20 | -0.48 | 0.57 | -0.20 | 0.35 | 0.04 | 0.14 | 1.03 | 0.45 | -0.05 | -0.21 | 0.06 | 0.04 |
| 0.03 | 0.68 | -0.59 | -0.32 | -0.13 | 0.48 | 0.76 | 0.48 | 0.96 | 0.45 | 0.03 | 0.46 | -0.52 | 0.67 | 0.15 | -0.16 | -0.14 | -0.50 | 0.50 | 0.69 | 0.90 | -0.79 | 0.14 | 0.90 | -0.34 | -0.52 | 0.43 | 0.00 | -0.34 | -0.44 | 0.01 | -0.27 | 0.60 | 0.74 | -0.61 | 0.21 | -0.59 | 0.74 | 0.41 | 1.12 | 0.62 | -0.65 |
| 1.13 | -0.48 | -1.04 | -0.80 | 0.58 | 0.53 | 0.04 | -0.11 | -0.22 | 0.45 | 0.69 | -0.86 | -0.75 | 0.54 | -0.00 | 0.01 | -0.70 | 0.68 | 1.01 | -0.90 | -0.52 | -0.11 | 0.22 | -0.62 | 0.91 | 0.42 | 0.66 | -0.34 | 0.00 | -0.09 | 0.81 | -0.48 | -0.75 | 0.01 | -0.85 | 0.52 | 0.08 | 0.21 | 0.11 | 1.25 | 0.91 | 0.82 |
| 0.38 | -0.27 | 0.68 | 0.60 | 0.21 | 0.17 | -0.16 | -0.53 | -0.07 | -1.09 | -0.14 | -0.46 | 0.12 | 0.06 | -0.19 | -0.23 | 0.21 | 0.05 | 0.12 | -0.77 | -0.50 | 0.52 | -0.03 | 0.30 | 0.83 | -1.05 | 0.20 | -0.44 | -0.09 | 0.00 | 0.73 | -0.21 | -0.66 | -0.86 | 0.70 | -0.26 | 0.96 | 0.92 | 0.79 | -0.19 | -0.75 | -0.22 |
| 0.93 | -0.19 | 0.27 | -0.40 | 0.42 | -0.55 | 0.16 | 0.71 | 0.73 | -0.03 | -0.93 | 0.89 | 0.70 | 0.81 | 0.15 | 0.50 | 0.53 | 0.93 | 0.51 | 0.02 | -0.45 | 0.73 | 1.04 | 0.37 | -0.46 | -0.59 | -0.48 | 0.01 | 0.81 | 0.73 | 0.00 | -0.66 | 0.56 | 0.95 | 0.78 | 0.75 | -0.78 | 1.03 | 0.52 | -0.74 | -0.75 | -1.11 |
| -1.20 | -0.22 | 0.44 | 0.28 | 0.28 | -0.1 | -0.80 | 0.44 | 0.81 | 0.97 | 1.12 | -0.67 | 0.57 | -0.33 | 0.28 | 0.71 | 1.15 | 0.38 | 0.74 | 0.12 | 0.84 | -0.89 | 0.05 | -0.03 | -0.29 | -0.29 | 0.57 | -0.27 | -0.48 | -0.21 | -0.66 | 0.00 | 1.01 | -0.52 | 0.15 | -0.48 | 0.50 | 0.17 | -0.87 | 0.20 | -0.75 | -0.28 |
| 0.26 | -0.19 | -0.25 | 0.92 | 0.93 | 0.74 | -0.92 | 0.96 | -0.16 | 0.43 | 0.96 | -0.90 | 0.81 | 0.07 | -0.47 | 0.68 | 0.35 | -0.81 | -0.95 | 0.56 | -0.33 | 0.65 | 0.45 | -0.84 | -0.01 | -0.09 | -0.20 | 0.60 | -0.75 | -0.66 | 0.56 | 1.01 | 0.00 | 0.70 | 0.59 | 0.70 | 0.74 | -0.72 | -0.92 | -0.42 | -0.70 | 0.26 |
| 0.63 | -0.71 | 0.25 | 0.56 | 0.24 | 0.75 | 0.09 | 0.34 | -0.88 | 0.52 | -0.87 | 0.26 | 0.28 | 0.88 | -0.38 | 0.76 | 0.24 | 0.19 | 0.52 | 0.42 | 0.74 | -0.70 | -0.35 | -0.85 | 0.95 | -0.26 | 0.35 | 0.74 | 0.01 | -0.86 | 0.95 | -0.52 | 0.70 | 0.00 | -0.19 | 0.61 | 0.86 | 1.01 | 0.85 | 0.17 | 0.55 | -0.84 |
| 0.03 | 0.44 | 0.48 | -0.26 | 0.66 | 0.63 | -0.15 | -0.59 | 0.62 | 0.55 | -0.48 | 0.73 | -0.55 | 0.38 | -0.69 | -0.17 | 0.82 | 0.32 | 0.96 | 0.76 | 0.86 | 0.95 | -0.29 | -0.55 | -0.38 | 0.31 | 0.04 | -0.61 | -0.85 | 0.70 | 0.78 | 0.15 | 0.59 | -0.19 | 0.00 | -0.27 | 0.87 | 0.78 | -0.06 | 0.28 | 0.73 | -0.39 |
| 0.44 | 0.66 | 1.07 | 1.03 | 0.20 | 0.67 | 0.39 | 0.11 | -0.98 | 0.02 | 1.0 | -0.73 | -0.88 | -1.09 | 0.28 | -0.59 | 1.08 | 0.30 | 0.42 | -0.06 | 0.24 | -0.92 | -0.82 | 0.83 | -1.05 | -0.79 | 0.14 | 0.21 | 0.52 | -0.26 | 0.75 | -0.48 | 0.70 | 0.61 | -0.27 | 0.00 | -0.86 | 0.52 | 0.43 | 0.62 | -0.54 | -0.25 |
| -0.83 | -0.36 | -0.39 | 0.43 | -0.04 | 0.33 | 0.89 | 0.33 | 0.38 | 0.66 | -0.38 | -0.14 | 0.03 | 0.44 | -0.76 | 0.18 | -0.01 | 0.77 | -0.32 | 0.60 | 0.65 | 0.30 | -0.56 | 0.66 | -0.09 | -0.24 | 1.03 | -0.59 | 0.08 | 0.96 | -0.78 | 0.50 | 0.74 | 0.86 | 0.87 | -0.86 | 0.00 | 0.50 | 0.97 | -0.20 | -0.05 | 0.43 |
| -0.49 | 0.96 | 0.00 | 0.34 | -0.50 | -0.12 | 0.93 | 0.11 | -0.59 | -0.90 | 0.71 | 1.20 | -0.41 | -0.29 | -0.12 | 1.08 | 0.23 | 1.22 | -0.46 | -0.31 | 0.53 | -0.60 | 0.36 | -0.57 | -0.06 | 0.01 | 0.45 | 0.74 | 0.21 | 0.92 | 1.03 | 0.17 | -0.72 | 1.01 | 0.78 | 0.52 | 0.50 | 0.00 | -0.51 | 0.99 | -0.31 | 0.32 |
| 0.49 | -0.74 | 0.36 | 0.47 | 0.86 | 0.28 | -0.08 | 0.78 | 0.98 | 0.53 | 0.62 | -0.09 | 0.94 | 0.35 | 0.91 | 0.41 | 0.12 | -0.20 | -0.71 | -0.32 | 0.51 | -0.02 | 0.13 | 0.92 | 0.04 | -0.27 | -0.05 | 0.41 | 0.11 | 0.79 | 0.52 | -0.87 | -0.92 | 0.85 | -0.06 | 0.43 | 0.97 | -0.51 | 0.00 | -0.06 | 0.54 | 0.50 |
| 0.45 | -0.50 | -0.12 | 0.48 | 0.21 | 0.45 | 0.44 | 0.26 | -0.11 | 0.48 | -0.61 | -0.40 | 1.01 | -0.58 | 0.99 | 1.07 | 0.54 | 0.81 | 0.95 | 0.48 | -0.08 | 0.65 | 0.30 | -0.46 | 0.75 | 0.36 | -0.21 | 1.12 | 1.25 | -0.19 | -0.74 | 0.20 | -0.42 | 0.17 | 0.28 | 0.62 | -0.20 | 0.99 | -0.06 | 0.00 | -0.45 | -1.03 |
| 0.1 | 0.95 | -0.83 | -0.34 | -0.04 | -0.18 | 0.99 | 0.77 | 0.67 | 0.41 | -0.61 | -0.95 | -0.52 | 0.61 | 0.60 | -0.49 | 0.12 | -0.78 | 0.88 | 0.44 | -0.10 | 0.06 | 0.43 | -0.37 | -0.98 | -0.96 | 0.06 | 0.62 | 0.91 | -0.75 | -0.75 | -0.75 | -0.70 | 0.55 | 0.73 | -0.54 | -0.05 | -0.31 | 0.54 | 0.45 | 0.00 | 0.81 |
| -0.17 | 0.83 | -0.57 | 0.96 | 0.32 | 0.41 | 0.10 | -0.04 | 0.82 | 0.82 | 0.58 | -0.77 | -0.54 | 0.37 | 0.47 | 0.76 | 0.21 | -0.16 | -1.05 | -0.18 | 0.36 | -0.86 | 0.14 | 0.77 | 0.62 | 0.95 | 0.04 | -0.65 | 0.82 | -0.22 | -1.11 | -0.28 | 0.26 | -0.84 | 0.39 | 0.25 | 0.43 | 0.32 | 0.50 | -1.03 | 0.81 | 0.00 |

| | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| .64 | 0.66 | -0.83 | -0.46 | -0.36 | -0.27 | -0.03 | 1.14 | -0.30 | 0.25 | 0.96 | 0.92 | -0.52 | 0.68 | 0.84 | -0.65 | 0.55 | 0.55 | -0.48 | 0.50 | 0.30 | 0.08 | 0.30 | 0.11 | 0.01 | -0.06 | -0.93 | 0.00 | 0.17 | 0.66 | -0.67 | -0.20 | 0.37 | 0.06 | -0.33 | 0.89 | -0.36 | 0.69 | 0.36 | 0.28 | 0.66 | -0.96 | -0.82 | -0.15 |
| .84 | -0.20 | 0.04 | -0.48 | -1.05 | -0.73 | -0.13 | 0.75 | 0.42 | -0.04 | 0.81 | -0.98 | 0.79 | -0.62 | -0.22 | -0.30 | 0.71 | 0.96 | 0.16 | 0.99 | 0.69 | 0.21 | 0.51 | -0.24 | 0.26 | 0.33 | 0.39 | -0.15 | 0.32 | 0.40 | -0.48 | 0.48 | -1.23 | 0.79 | -0.55 | 0.15 | 0.17 | 0.90 | 0.31 | 0.79 | 0.34 | -0.58 | 0.46 | 0.50 |
| .38 | -0.62 | -0.43 | 0.43 | 0.07 | -0.99 | -0.89 | 0.48 | -0.99 | -0.63 | 0.74 | 0.13 | -0.42 | -0.13 | -0.59 | 0.64 | 0.30 | 0.39 | 0.99 | 0.52 | -0.26 | -0.08 | 0.82 | 0.78 | -0.53 | 0.94 | 0.52 | -0.78 | 0.14 | 0.73 | -1.01 | -0.41 | 0.24 | 0.71 | -0.06 | 0.67 | 0.60 | -0.25 | 0.39 | -0.51 | -0.1 | 1.13 | 0.67 | 0.69 |
| .98 | 0.55 | 0.68 | 0.78 | -0.99 | 0.86 | 0.56 | -0.34 | 0.16 | 0.13 | -0.35 | 0.40 | 0.87 | 0.55 | 0.82 | 0.58 | 0.60 | -0.50 | -0.51 | 0.71 | 1.04 | 0.54 | 0.41 | 0.86 | 0.46 | 0.40 | 0.09 | 0.31 | -0.03 | 0.98 | 0.16 | -0.27 | 1.05 | 0.17 | -0.13 | 0.52 | -0.36 | 0.17 | -0.08 | 0.75 | 1.0 | 0.37 | -0.53 | 0.64 |
| .56 | -0.12 | 0.07 | 0.13 | 0.37 | 0.66 | -0.20 | 0.66 | -0.43 | 0.99 | 0.38 | 0.00 | 0.25 | 0.24 | -0.63 | -0.41 | 0.39 | 0.84 | 0.14 | -0.61 | 0.26 | -0.66 | -0.25 | -0.08 | 0.66 | -0.37 | 0.53 | 0.03 | 1.20 | -0.50 | 0.82 | 1.20 | 0.07 | 0.41 | -0.97 | 0.81 | 0.34 | -0.06 | -0.19 | -0.60 | 0.35 | -0.22 | -0.45 | 0.28 |
| .00 | 0.63 | 1.11 | -0.52 | 0.50 | 0.55 | 0.53 | 0.58 | -0.03 | 0.34 | 0.40 | -0.73 | 0.64 | -0.16 | 0.67 | -0.06 | 1.17 | -0.63 | -0.61 | 0.03 | 0.53 | 0.46 | -0.12 | -0.00 | 0.61 | -0.97 | 0.47 | -0.35 | -0.28 | 0.23 | -0.38 | 0.78 | -0.29 | -0.76 | -0.55 | 0.18 | -0.66 | 0.81 | -0.42 | 0.93 | 0.27 | -0.69 | 0.17 | 0.09 |
| .63 | 0.00 | 0.56 | -0.62 | 0.89 | 0.81 | 0.69 | -0.27 | 0.12 | 0.28 | 0.53 | 0.11 | 0.79 | 0.59 | 0.60 | -0.33 | -0.17 | -0.23 | 0.87 | -0.98 | 0.1 | -0.55 | 0.11 | 0.96 | 0.45 | -0.92 | 0.14 | 0.39 | -0.74 | 0.68 | -0.39 | -0.34 | -0.96 | 0.26 | 0.77 | 0.17 | -0.37 | 0.32 | 0.32 | 0.23 | 0.01 | 0.06 | 0.03 | 0.26 |
| .11 | 0.56 | 0.00 | 0.81 | 0.58 | -0.05 | 0.37 | 0.1 | -0.26 | 0.49 | 0.33 | -1.00 | 0.24 | -0.37 | 1.04 | -0.42 | 0.99 | 0.36 | 0.19 | 0.13 | -0.28 | -0.84 | -0.22 | -0.45 | 0.38 | -0.43 | -0.34 | 0.35 | 0.20 | 0.03 | 1.26 | 0.59 | 0.61 | -1.20 | 0.26 | 0.73 | 0.17 | 0.44 | -1.09 | -0.60 | 0.24 | 0.33 | -0.37 | -0.17 |
| .52 | -0.62 | 0.81 | 0.00 | 0.63 | 0.77 | 0.10 | 0.95 | 0.45 | -0.29 | 0.73 | -0.17 | -0.46 | 0.62 | -0.29 | -0.61 | -0.01 | 0.75 | 0.06 | 0.37 | -0.56 | -0.23 | -0.52 | 0.44 | 0.82 | -0.87 | 0.58 | 0.48 | 0.31 | 0.65 | -0.64 | -0.50 | 0.16 | -0.20 | -0.22 | -0.83 | 0.27 | 0.69 | -0.07 | 1.10 | -0.47 | -0.36 | 1.44 | 0.80 |
| .50 | 0.89 | 0.58 | 0.63 | 0.00 | 0.79 | -0.19 | 0.01 | -0.51 | -0.42 | -0.23 | 0.06 | 0.49 | -1.35 | -0.58 | -0.27 | -1.07 | 0.52 | -0.40 | -0.50 | -1.19 | 0.52 | -1.23 | 0.35 | 0.32 | -0.08 | 0.27 | 1.04 | 0.16 | -0.59 | -1.17 | 0.47 | 0.59 | 0.44 | -0.25 | 0.15 | 0.34 | 1.07 | -0.13 | 0.11 | 0.60 | -0.01 | -0.37 | -0.57 |
| .55 | 0.81 | -0.05 | 0.77 | 0.79 | 0.00 | -0.12 | 0.60 | 0.57 | -0.98 | 0.56 | -0.40 | 1.12 | -0.51 | 0.19 | -0.75 | 0.24 | -0.66 | 1.0 | 0.82 | -0.17 | 0.14 | 0.41 | -0.01 | 0.62 | -0.05 | 0.49 | 0.24 | 0.02 | -0.32 | -0.93 | 0.39 | -0.08 | 0.28 | 0.92 | 0.46 | -0.40 | 1.03 | 0.69 | 0.45 | 0.71 | 0.60 | 0.12 | 0.96 |
| .53 | 0.69 | 0.37 | 0.10 | -0.19 | -0.12 | 0.00 | 0.46 | 0.66 | -0.77 | -0.31 | 0.33 | -0.36 | 0.08 | -0.63 | -0.63 | -0.57 | 0.39 | -0.39 | -0.74 | 0.12 | -0.97 | 0.67 | 0.44 | 0.48 | -0.30 | -0.87 | 0.81 | -0.43 | -0.13 | 0.71 | 0.42 | 0.09 | 0.28 | 0.93 | 0.33 | 0.79 | 0.20 | -0.30 | -0.61 | 0.62 | 0.09 | -0.51 | 0.32 |
| .58 | -0.27 | 0.1 | 0.95 | 0.01 | 0.60 | -0.46 | 0.00 | 0.21 | 0.87 | 0.00 | -0.56 | -1.13 | 1.28 | 0.63 | 0.33 | -0.30 | 0.18 | -0.39 | -0.60 | 0.96 | 0.14 | 0.28 | 0.87 | 1.10 | -0.16 | -0.21 | -0.64 | -0.23 | 0.48 | 0.66 | 0.38 | -0.08 | -0.1 | 0.74 | 0.84 | 0.77 | 0.67 | 0.07 | -0.22 | 0.04 | 0.34 | -0.65 | 0.41 |
| .03 | 0.12 | -0.26 | 0.45 | -0.51 | 0.57 | 0.66 | 0.21 | 0.00 | 0.77 | -0.57 | -0.98 | 0.42 | -0.34 | 0.94 | 0.87 | -0.05 | -0.09 | 0.22 | 0.80 | -0.59 | 1.01 | 1.13 | 0.78 | -0.32 | 0.67 | -0.74 | 0.79 | -0.70 | 0.83 | 0.24 | 0.11 | -0.23 | -0.86 | 0.85 | 0.07 | 0.06 | 0.32 | 0.56 | 0.75 | -0.39 | 0.26 | 0.46 | 0.17 |
| .34 | 0.28 | 0.49 | -0.29 | -0.42 | -0.98 | -0.77 | 0.87 | 0.77 | 0.00 | 0.29 | -0.09 | 0.48 | 0.59 | 0.17 | 0.48 | -0.82 | 0.50 | -0.45 | -0.03 | -0.63 | -0.21 | 0.41 | 0.17 | 0.69 | 0.37 | -0.75 | -0.18 | -0.62 | 0.48 | 0.02 | -0.32 | 0.38 | 0.44 | 0.96 | -0.25 | -0.45 | 0.11 | 0.06 | -0.00 | 0.64 | 0.14 | 0.30 | -0.04 |
| .40 | 0.53 | 0.33 | 0.73 | -0.23 | 0.56 | -0.31 | 0.08 | -0.57 | 0.29 | 0.00 | -0.99 | 0.71 | 0.79 | 0.46 | 0.54 | 0.74 | -0.37 | -0.73 | -0.97 | -0.59 | 0.69 | 1.00 | -0.29 | 0.09 | -0.23 | 0.65 | 0.44 | 0.26 | 0.96 | -0.09 | 0.14 | 0.41 | 0.81 | -0.16 | 0.79 | 0.76 | -0.98 | 0.12 | -0.70 | 0.74 | -0.22 | 0.20 | 0.82 |
| .73 | 0.11 | -1.00 | -0.17 | 0.06 | -0.40 | 0.33 | -0.56 | -0.98 | 0.09 | -0.99 | 0.00 | -0.19 | -0.17 | -0.05 | 0.43 | -0.67 | -0.32 | -0.42 | -0.19 | -0.79 | 0.35 | 0.64 | -0.81 | -0.05 | 1.18 | 0.43 | -0.56 | -0.26 | 0.45 | 0.32 | -1.30 | 0.29 | 0.47 | 0.43 | 0.42 | 0.41 | 0.02 | 0.92 | -0.79 | 0.77 | 0.60 | 0.06 | 0.82 |
| .64 | 0.79 | 0.24 | -0.46 | 0.49 | 1.12 | 0.36 | -1.13 | 0.42 | 0.48 | 0.71 | -0.19 | 0.00 | -1.39 | -1.06 | 0.73 | 0.11 | -0.38 | 0.46 | -0.12 | 0.30 | -0.44 | 0.74 | 0.22 | -1.21 | 0.46 | -0.65 | 0.45 | -0.38 | -0.14 | 0.39 | -0.52 | -0.44 | 1.29 | 0.79 | -1.14 | -0.79 | 1.17 | 0.05 | 1.0 | -0.21 | -0.33 | 0.03 | 0.41 |
| .16 | 0.59 | -0.37 | 0.62 | 1.35 | -0.51 | 0.08 | 1.28 | -0.34 | 0.59 | 0.79 | -0.17 | -1.39 | 0.00 | -0.10 | 0.93 | 0.07 | 0.77 | 0.30 | 0.42 | -0.52 | -0.23 | -0.44 | 0.74 | -0.34 | 0.48 | -0.35 | -0.65 | 0.08 | 0.80 | -0.39 | 0.08 | 0.23 | -1.01 | -0.56 | 0.69 | 1.21 | -1.07 | -0.74 | 0.75 | -0.67 | -0.85 | -1.76 | -0.42 |
| .67 | 0.60 | 1.04 | -0.29 | -0.58 | 0.19 | -0.63 | 0.63 | 0.94 | 0.17 | 0.46 | -0.05 | -1.06 | -0.10 | 0.00 | 0.02 | 0.77 | -0.08 | -0.31 | 0.64 | 0.18 | 0.77 | -0.74 | -0.67 | -0.29 | -0.59 | 0.39 | 0.47 | 1.04 | -0.52 | -0.62 | 0.32 | 0.37 | 0.57 | 0.81 | 0.37 | -0.41 | -0.88 | -0.23 | -0.52 | 0.70 | 0.89 | -0.99 | -0.54 |
| .06 | -0.33 | -0.42 | -0.61 | -0.27 | -0.75 | -0.63 | 0.33 | 0.87 | 0.48 | 0.54 | 0.43 | 0.73 | 0.93 | 0.02 | 0.00 | -0.51 | -0.08 | 0.81 | 0.63 | -0.01 | 0.98 | 0.62 | 0.04 | 0.28 | 0.54 | 0.37 | 0.02 | 0.26 | 0.67 | 0.67 | 0.27 | 0.49 | -0.33 | 0.07 | 0.98 | 0.52 | -1.09 | 0.17 | -0.40 | 0.11 | -0.70 | 0.15 | 0.37 |
| .17 | -0.17 | 0.99 | -0.01 | -1.07 | 0.24 | -0.57 | -0.30 | -0.05 | -0.82 | 0.74 | -0.67 | 0.11 | 0.07 | 0.77 | -0.51 | 0.00 | 0.51 | 0.04 | 1.11 | -0.44 | 0.24 | 1.13 | -0.51 | 0.78 | -0.01 | -0.08 | 0.59 | -0.54 | 0.17 | 0.15 | 0.04 | -0.19 | 0.26 | -0.45 | -0.27 | -0.54 | 0.26 | -1.04 | -0.25 | 0.65 | 0.86 | 0.11 | 0.48 |
| .63 | -0.23 | 0.36 | 0.75 | 0.52 | -0.66 | 0.39 | 0.18 | -0.09 | 0.50 | -0.37 | -0.32 | -0.38 | 0.77 | -0.08 | -0.08 | 0.51 | 0.00 | -0.05 | -0.30 | 0.98 | 1.09 | -0.24 | -0.58 | 1.17 | 0.35 | -0.78 | 0.49 | 0.11 | -0.16 | 0.14 | -0.02 | 0.17 | 0.71 | 0.68 | 0.86 | -0.04 | -0.59 | -0.08 | 0.97 | 0.17 | 0.96 | -0.95 | 0.76 |
| .61 | 0.87 | 0.19 | 0.06 | -0.40 | 1.0 | -0.39 | -0.39 | -0.22 | -0.45 | -0.73 | -0.42 | 0.46 | 0.30 | -0.31 | 0.81 | 0.04 | -0.05 | 0.00 | 0.25 | 0.73 | 0.56 | -0.12 | -0.51 | 0.22 | -0.99 | -0.60 | 0.74 | -0.87 | -0.14 | -0.83 | 0.01 | 0.86 | 1.15 | 0.35 | 0.14 | 0.68 | 1.08 | 0.26 | 0.34 | 0.36 | 0.65 | 0.59 | 0.21 |
| .03 | -0.98 | 0.13 | 0.37 | -0.50 | 0.82 | -0.74 | -0.60 | 0.80 | -0.03 | -0.97 | -0.19 | -0.12 | 0.42 | 0.64 | 0.63 | 1.11 | -0.30 | 0.25 | 0.00 | 0.11 | -0.61 | 0.54 | 0.02 | 0.35 | -0.76 | 0.32 | 0.88 | -0.37 | -0.50 | 0.56 | -0.15 | 1.25 | 0.38 | -0.81 | 0.10 | 0.18 | 0.30 | 1.03 | 1.33 | 0.04 | 0.93 | -0.32 | -0.16 |
| .53 | 0.1 | -0.28 | -0.56 | -1.19 | -0.17 | 0.12 | 0.96 | -0.59 | -0.63 | -0.59 | -0.79 | 0.30 | -0.52 | 0.18 | -0.01 | -0.44 | 0.98 | 0.73 | 0.11 | 0.00 | 0.06 | -0.62 | -0.45 | 0.94 | -0.87 | -0.85 | 0.41 | 0.48 | 0.50 | 1.14 | 0.32 | 0.19 | 0.74 | -0.95 | 0.61 | 1.09 | 0.42 | -0.58 | -0.57 | -0.95 | 0.83 | 0.41 | -1.05 |
| .46 | -0.55 | -0.84 | -0.23 | 0.52 | 0.14 | -0.97 | 0.14 | 1.01 | -0.21 | 0.69 | 0.35 | -0.44 | -0.23 | 0.77 | 0.98 | 0.24 | 1.09 | 0.56 | -0.61 | 0.06 | 0.00 | -0.41 | 0.96 | -0.69 | 0.87 | -0.96 | 0.15 | 1.20 | 0.69 | -0.77 | -0.56 | -0.31 | 0.12 | 0.56 | 0.51 | 0.90 | -0.06 | 0.34 | -0.42 | -0.57 | 0.37 | -0.02 | -0.18 |
| .12 | 0.11 | -0.22 | -0.52 | -1.23 | 0.41 | 0.67 | 0.28 | 1.13 | 0.41 | 1.00 | 0.64 | 0.74 | -0.44 | -0.74 | 0.62 | 1.13 | -0.24 | -0.12 | 0.54 | -0.62 | -0.41 | 0.00 | 0.83 | 0.78 | -0.80 | 0.44 | -0.09 | -0.26 | 0.98 | -0.31 | -0.21 | -0.86 | 0.76 | -0.25 | 0.92 | 1.07 | 0.16 | 0.31 | 0.34 | -0.19 | -0.27 | -0.65 | 0.44 |
| .00 | 0.96 | -0.45 | 0.44 | 0.35 | -0.01 | -0.44 | 0.87 | 0.78 | 0.17 | -0.29 | -0.81 | 0.22 | 0.74 | -0.67 | 0.04 | -0.51 | -0.58 | -0.51 | 0.02 | -0.45 | 0.96 | 0.83 | 0.00 | 0.69 | 0.34 | 0.13 | 0.34 | 1.19 | -0.79 | 0.01 | 0.73 | 0.41 | -0.89 | 0.65 | -0.60 | 1.09 | -0.92 | 0.04 | -0.71 | -0.26 | 0.53 | -0.41 | -0.86 |
| .61 | 0.45 | 0.38 | 0.82 | 0.32 | 0.62 | 0.48 | 1.10 | -0.32 | 0.69 | 0.09 | -0.05 | -1.21 | -0.34 | -0.29 | 0.28 | 0.78 | 1.17 | 0.22 | 0.35 | 0.94 | -0.69 | 0.78 | 0.69 | 0.00 | 1.12 | -0.33 | -0.19 | -0.30 | 0.14 | 0.35 | 0.18 | 0.71 | 0.05 | 0.45 | -0.25 | -0.16 | -0.82 | -0.82 | 0.25 | -0.11 | 0.18 | -0.03 | 0.14 |
| .97 | -0.92 | -0.43 | -0.87 | -0.08 | -0.05 | -0.30 | -0.16 | 0.67 | 0.37 | -0.23 | -1.18 | 0.46 | 0.48 | -0.59 | 0.54 | -0.01 | 0.35 | -0.99 | -0.76 | -0.87 | 0.87 | -0.80 | 0.34 | 1.12 | 0.00 | 0.56 | 0.40 | 0.22 | 0.90 | -0.75 | 0.09 | 0.69 | -0.03 | -0.84 | -0.95 | -0.68 | 0.83 | 0.93 | -0.46 | 1.16 | -0.35 | 0.10 | -0.77 |
| .47 | 0.14 | -0.34 | 0.58 | 0.27 | 0.49 | -0.87 | -0.21 | -0.74 | -0.75 | 0.65 | 0.43 | -0.65 | -0.35 | 0.39 | 0.37 | -0.08 | -0.78 | -0.60 | 0.32 | -0.85 | -0.96 | 0.44 | 0.13 | -0.33 | 0.56 | 0.00 | -0.90 | 0.98 | -0.34 | 0.78 | 0.63 | -0.14 | -0.29 | -0.01 | 0.85 | -0.52 | -1.05 | 0.17 | 0.05 | 0.28 | 0.86 | -0.51 | -0.62 |
| .35 | 0.39 | 0.35 | 0.48 | 1.04 | 0.24 | 0.81 | -0.64 | 0.79 | -0.18 | 0.44 | -0.56 | 0.45 | -0.65 | 0.47 | 0.02 | 0.59 | 0.49 | 0.74 | 0.88 | 0.41 | 0.15 | -0.09 | 0.34 | -0.19 | 0.40 | -0.90 | 0.00 | 0.54 | -0.52 | 0.55 | -0.85 | -0.92 | -0.29 | -0.09 | 0.16 | 0.44 | -0.79 | -0.50 | -0.1 | -0.52 | 0.24 | -1.42 | 0.95 |
| .28 | -0.74 | 0.20 | 0.31 | 0.16 | 0.02 | -0.43 | -0.23 | -0.70 | -0.62 | 0.26 | -0.26 | -0.38 | 0.08 | 1.04 | 0.26 | -0.54 | 0.11 | -0.87 | -0.37 | 0.48 | 1.20 | -0.26 | 1.19 | -0.30 | 0.22 | 0.98 | 0.54 | 0.00 | 0.43 | 0.79 | 0.41 | -0.81 | 0.57 | -0.20 | 0.44 | 0.18 | 0.14 | 0.77 | 0.34 | -0.29 | -0.32 | -0.40 | 0.04 |
| .23 | 0.68 | 0.03 | 0.65 | -0.59 | -0.32 | 0.13 | 0.48 | 0.83 | 0.48 | 0.96 | 0.45 | -0.14 | 0.80 | -0.52 | 0.67 | 0.17 | -0.16 | -0.14 | -0.50 | 0.50 | 0.69 | 0.98 | -0.79 | 0.14 | 0.90 | -0.34 | -0.52 | 0.43 | 0.00 | -0.21 | -0.23 | -0.31 | -0.27 | 0.60 | 0.83 | -0.47 | 0.21 | -0.86 | 0.63 | 0.17 | 1.01 | 0.16 | -0.65 |
| .38 | -0.39 | 1.26 | -0.64 | 1.17 | -0.93 | 0.71 | 0.66 | 0.24 | 0.02 | -0.09 | 0.32 | 0.39 | -0.39 | -0.62 | 0.67 | 0.15 | 0.14 | -0.83 | 0.56 | 1.14 | -0.77 | -0.31 | 0.01 | 0.35 | -0.75 | 0.78 | 0.55 | 0.79 | -0.21 | 0.00 | 0.24 | 0.36 | -0.61 | -0.62 | 0.24 | -0.58 | 0.40 | -0.31 | -0.03 | -0.26 | 1.00 | 0.31 | 0.95 |
| .78 | -0.34 | 0.59 | -0.50 | 0.47 | 0.39 | 0.42 | 0.38 | 0.11 | -0.32 | 0.14 | -1.30 | -0.52 | 0.08 | 0.32 | 0.27 | 0.04 | -0.07 | 0.01 | -0.15 | 0.32 | -0.56 | -0.21 | 0.73 | 0.18 | 0.09 | 0.63 | -0.85 | 0.41 | -0.23 | 0.24 | 0.00 | 0.20 | -0.42 | -0.45 | -0.56 | 1.04 | -0.47 | 0.49 | 0.61 | 0.34 | -0.52 | -1.43 | -0.01 |
| .29 | -0.96 | 0.61 | 0.16 | 0.59 | -0.08 | 0.09 | -0.88 | -0.23 | 0.38 | 0.41 | 0.29 | -0.44 | 0.23 | 0.37 | 0.49 | -0.19 | 0.17 | 0.86 | 1.25 | 0.19 | -0.31 | 0.86 | 0.41 | 0.71 | 0.69 | -0.14 | -0.92 | -0.81 | -0.31 | 0.36 | 0.20 | 0.00 | -0.34 | 0.23 | 0.53 | 0.32 | 1.07 | 0.20 | 1.46 | 1.09 | -0.30 | 0.03 | -1.43 |
| .76 | 0.26 | -1.20 | -0.20 | 0.44 | 0.28 | 0.28 | -0.1 | -0.86 | 0.44 | 0.81 | 0.97 | 1.29 | -1.01 | 0.57 | -0.33 | 0.26 | 0.71 | 1.15 | 0.38 | 0.74 | 0.12 | 0.76 | -0.89 | 0.05 | -0.03 | -0.29 | -0.29 | 0.57 | -0.27 | -0.61 | -0.42 | -0.34 | 0.00 | 1.01 | 0.61 | 0.02 | -0.48 | 0.76 | 0.28 | -0.63 | 0.31 | -0.28 | -0.28 |
| .55 | 0.77 | 0.26 | -0.22 | -0.25 | 0.92 | 0.93 | 0.74 | -0.85 | 0.96 | -0.16 | 0.43 | 0.79 | -0.56 | 0.81 | 0.07 | -0.45 | 0.68 | 0.35 | -0.81 | -0.95 | 0.56 | -0.25 | 0.65 | 0.45 | -0.84 | -0.01 | -0.09 | -0.20 | 0.60 | -0.62 | -0.45 | 0.23 | 1.01 | 0.00 | 0.79 | 0.73 | 0.70 | 0.48 | -0.83 | -1.16 | -0.54 | -1.16 | 0.26 |
| .18 | 0.17 | 0.73 | -0.83 | 0.15 | 0.46 | 0.33 | 0.84 | 0.07 | -0.25 | -0.79 | 0.42 | -1.14 | 0.69 | 0.37 | 0.98 | -0.27 | 0.86 | 0.14 | 0.10 | 0.61 | 0.51 | 0.97 | -0.60 | -0.25 | -0.95 | 0.85 | -0.16 | 0.44 | 0.83 | 0.24 | -0.56 | 0.53 | -0.61 | 0.79 | 0.00 | 0.04 | 0.52 | 0.51 | 0.81 | 0.51 | -0.04 | -0.01 | -0.74 |
| .66 | -0.37 | 0.17 | 0.27 | 0.34 | -0.40 | 0.79 | 0.77 | 0.06 | -0.45 | 0.76 | 0.41 | -0.79 | 1.21 | -0.41 | 0.52 | -0.54 | -0.04 | 0.68 | 0.18 | 1.09 | 0.90 | 1.07 | 1.09 | -0.16 | -0.68 | -0.52 | 0.44 | 0.18 | -0.47 | -0.58 | 1.04 | 0.32 | 0.02 | 0.73 | 0.04 | 0.00 | -0.41 | 0.48 | 0.54 | -0.44 | 0.03 | 0.13 | -0.25 |
| .81 | 0.32 | 0.44 | 0.69 | 1.07 | 1.03 | 0.20 | 0.67 | 0.32 | 0.11 | -0.98 | 0.02 | 1.17 | -1.07 | -0.88 | -1.09 | 0.26 | -0.59 | 1.08 | 0.30 | 0.42 | -0.06 | 0.16 | -0.92 | -0.82 | 0.83 | -1.05 | -0.79 | 0.14 | 0.21 | 0.40 | -0.47 | 1.07 | -0.48 | 0.70 | 0.52 | -0.41 | 0.00 | -0.60 | 0.63 | 0.67 | 0.73 | -0.07 | -0.25 |
| .42 | 0.32 | -1.09 | -0.07 | -0.13 | 0.69 | -0.30 | 0.07 | 0.56 | 0.06 | 0.12 | 0.92 | 0.05 | -0.74 | -0.23 | 0.17 | -1.04 | -0.08 | 0.26 | 1.03 | -0.58 | 0.34 | 0.31 | 0.04 | -0.82 | 0.93 | 0.17 | -0.50 | 0.77 | -0.86 | -0.31 | 0.49 | -0.20 | 0.76 | 0.48 | 0.51 | 0.48 | -0.60 | 0.00 | 0.87 | 1.47 | 0.18 | 0.68 | 0.17 |
| .93 | 0.23 | -0.60 | 1.10 | 0.11 | 0.45 | -0.61 | -0.22 | 0.75 | -0.00 | -0.70 | -0.79 | 1.0 | 0.75 | -0.52 | -0.40 | -0.25 | 0.97 | 0.34 | 1.33 | -0.57 | -0.42 | 0.34 | -0.71 | 0.25 | -0.46 | 0.05 | -0.1 | 0.34 | 0.63 | -0.03 | 0.61 | 1.46 | 0.28 | -0.83 | 0.81 | 0.54 | 0.63 | 0.87 | 0.00 | -0.16 | 1.22 | 0.26 | 0.21 |
| .27 | 0.01 | 0.24 | -0.47 | 0.60 | 0.71 | 0.62 | 0.04 | -0.39 | 0.54 | 0.74 | 0.77 | -0.21 | -0.67 | 0.70 | 0.11 | 0.65 | 0.17 | 0.36 | 0.04 | -0.95 | -0.57 | 0.19 | -0.26 | -0.11 | 1.16 | 0.28 | -0.52 | -0.29 | 0.17 | -0.26 | 0.34 | 1.09 | -0.63 | -1.16 | 0.51 | -0.44 | 0.67 | 1.47 | -0.16 | 0.00 | 0.29 | 1.25 | 0.26 |
| .69 | 0.06 | 0.33 | -0.36 | -0.01 | 0.60 | 0.09 | 0.34 | 0.26 | 0.14 | -0.22 | 0.60 | -0.33 | -0.85 | 0.89 | -0.70 | 0.86 | 0.96 | 0.66 | 0.93 | 0.83 | 0.37 | -0.27 | 0.53 | 0.18 | -0.35 | 0.86 | 0.24 | -0.32 | 1.01 | 1.00 | -0.52 | -0.30 | 0.31 | -0.54 | -0.04 | 0.03 | 0.73 | 0.18 | 1.22 | 0.29 | 0.00 | 0.13 | -1.14 |
| .17 | 0.03 | -0.37 | 1.44 | -0.37 | 0.12 | -0.51 | -0.65 | 0.46 | 0.30 | 0.20 | 0.06 | 0.03 | -1.76 | -0.99 | 0.15 | 0.11 | -0.95 | 0.59 | -0.32 | 0.41 | -0.02 | -0.65 | -0.41 | -0.03 | 0.10 | -0.51 | -1.42 | -0.40 | 0.16 | 0.31 | -1.43 | 0.03 | -0.28 | -1.16 | -0.01 | 0.13 | -0.07 | 0.68 | 0.26 | 1.25 | 0.13 | 0.00 | 0.34 |
| .09 | 0.26 | -0.17 | 0.80 | -0.57 | 0.96 | 0.32 | 0.41 | 0.17 | -0.04 | 0.82 | 0.82 | 0.41 | -0.42 | -0.54 | 0.37 | 0.48 | 0.76 | 0.21 | -0.16 | -1.05 | -0.18 | 0.44 | -0.86 | 0.14 | -0.77 | -0.62 | 0.95 | 0.04 | -0.65 | 0.95 | -0.01 | -1.43 | -0.28 | 0.26 | -0.74 | -0.25 | -0.25 | 0.17 | 0.21 | 0.26 | -1.14 | 0.34 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.83 | -0.46 | -0.36 | -0.13 | -0.03 | 1.14 | -0.30 | 0.37 | 0.96 | 0.92 | -0.52 | 0.57 | 0.70 | -0.65 | 0.67 | 0.81 | -0.48 | 0.50 | 0.38 | 0.00 | -0.30 | 0.11 | 0.03 | 0.17 | -0.73 | 0.88 | 0.23 | 0.74 | -0.67 | -0.21 | 0.90 | 0.06 | -0.75 | 0.09 | -0.17 | 0.69 | 0.34 | 0.24 | -0.66 | -0.96 | -0.82 | -0.15 |
| 0.84 | -0.40 | -1.05 | -0.87 | -0.13 | 0.75 | 0.42 | 0.16 | 0.81 | -0.98 | -0.79 | -0.51 | -0.08 | -0.30 | 0.59 | 0.70 | 0.16 | 0.99 | 0.69 | 0.21 | 0.51 | 0.23 | 0.30 | 0.44 | 0.19 | 0.15 | 0.26 | -0.47 | -0.48 | 0.50 | -1.76 | 0.79 | -0.14 | 0.15 | 0.36 | 0.90 | 0.33 | 0.83 | 0.34 | -0.58 | 0.46 | 0.50 |
| 0.43 | 0.43 | 0.07 | -1.13 | -0.89 | 0.48 | -0.99 | -0.75 | 0.74 | 0.13 | -0.42 | -0.02 | -0.35 | 0.64 | 0.18 | 0.12 | 0.99 | 0.52 | -0.26 | -0.08 | 0.82 | 0.78 | -0.49 | 1.05 | 0.72 | -0.78 | 0.08 | 0.65 | -1.01 | -0.40 | -0.29 | 0.71 | 0.35 | 0.67 | 0.41 | -0.25 | 0.41 | 0.46 | 0.1 | 1.13 | 0.67 | 0.69 |
| 0.68 | 0.78 | -0.99 | 0.72 | 0.56 | -0.34 | 0.16 | 0.01 | -0.35 | 0.40 | 0.87 | 0.66 | 0.97 | 0.58 | 0.49 | -0.76 | -0.51 | 0.71 | 1.04 | 0.54 | 0.41 | 0.86 | -0.42 | 0.51 | -0.11 | 0.31 | -0.09 | 0.91 | 0.16 | -0.25 | 0.52 | 0.17 | 0.28 | 0.52 | -0.55 | 0.17 | 0.06 | 0.80 | 1.0 | 0.37 | -0.53 | 0.64 |
| 0.28 | 0.33 | 0.17 | 0.33 | -0.00 | 0.86 | -0.63 | 0.66 | 0.18 | -0.20 | 0.05 | 0.55 | -0.29 | -0.61 | 0.07 | 0.38 | 0.35 | 0.41 | 0.47 | -0.86 | -0.45 | 0.28 | 0.90 | -0.05 | 0.13 | -0.17 | 0.94 | -0.78 | 1.03 | 1.41 | -0.66 | 0.21 | -0.36 | 1.01 | -0.05 | 0.14 | 0.03 | 0.36 | 0.56 | -0.02 | -0.25 | 0.08 |
| 1.02 | -0.61 | 0.59 | 0.78 | 0.44 | 0.50 | 0.06 | 0.55 | 0.49 | -0.64 | 0.73 | -0.36 | 0.44 | 0.03 | 1.38 | -0.28 | -0.70 | -0.06 | 0.44 | -0.55 | -0.03 | 0.09 | 0.48 | -1.17 | 0.76 | -0.26 | -0.14 | 0.39 | -0.47 | 0.67 | 0.33 | 0.67 | 1.05 | 0.09 | -0.38 | 0.72 | -0.53 | 0.79 | 0.18 | -0.78 | 0.08 | 0.18 |
| 0.56 | -0.62 | 0.89 | 0.95 | 0.69 | -0.27 | 0.12 | 0.40 | 0.53 | 0.11 | 0.79 | 0.48 | 0.46 | -0.33 | 0.05 | 0.03 | 0.87 | -0.98 | 0.1 | -0.55 | 0.21 | 0.96 | 0.41 | 1.03 | 0.34 | 0.39 | -0.68 | 0.76 | 0.39 | -0.35 | -0.43 | 0.26 | 0.36 | 0.17 | -0.19 | 0.32 | 0.30 | 0.18 | 0.01 | 0.06 | 0.03 | 0.26 |
| 0.00 | 0.81 | 0.58 | -0.18 | 0.37 | 0.1 | -0.26 | 0.37 | 0.33 | -1.00 | 0.24 | -0.26 | 1.18 | -0.42 | 0.87 | 0.09 | 0.19 | 0.13 | -0.28 | -0.84 | -0.22 | -0.45 | 0.42 | -0.32 | -0.54 | 0.35 | 0.14 | -0.05 | 1.26 | 0.60 | 0.08 | 1.20 | 0.67 | 0.73 | -0.02 | 0.44 | -1.07 | -0.56 | 0.24 | 0.33 | -0.37 | -0.17 |
| 0.81 | 0.00 | 0.63 | 0.64 | 0.10 | 0.95 | 0.45 | -0.41 | 0.73 | -0.17 | 0.46 | 0.73 | -0.15 | -0.61 | -0.13 | 0.49 | 0.06 | 0.37 | -0.56 | -0.23 | -0.52 | 0.44 | 0.86 | -0.76 | 0.38 | 0.48 | 0.25 | 0.57 | 0.64 | -0.49 | -0.37 | -0.20 | 0.19 | -0.83 | 0.08 | 0.69 | -0.05 | 1.14 | -0.47 | -0.36 | 1.44 | 0.80 |
| 0.58 | 0.63 | 0.00 | 0.93 | -0.19 | 0.01 | -0.51 | -0.29 | -0.23 | 0.06 | 0.49 | -1.46 | -0.73 | -0.27 | -0.95 | 0.78 | -0.40 | -0.50 | -1.19 | 0.52 | 1.23 | 0.35 | 0.28 | -0.19 | 0.47 | 1.04 | 0.22 | -0.52 | -1.17 | 0.46 | 1.12 | 0.44 | -0.66 | 0.15 | 0.53 | 1.07 | -0.15 | 0.07 | 0.60 | -0.01 | -0.37 | -0.57 |
| -0.18 | 0.64 | 0.93 | 0.00 | -0.26 | 0.47 | 0.71 | -0.72 | 0.70 | -0.26 | 1.25 | -0.76 | -0.09 | -0.61 | 0.49 | -0.26 | 0.86 | 0.69 | -0.31 | 0.28 | 0.54 | 0.13 | 0.45 | -0.30 | 0.83 | 0.38 | 0.21 | -0.11 | -1.06 | 0.24 | 0.59 | 0.42 | 0.37 | 0.33 | -0.07 | 0.89 | 0.54 | 0.27 | 0.57 | 0.46 | -0.01 | 1.10 |
| 0.37 | 0.10 | -0.19 | -0.26 | 0.00 | -0.46 | 0.66 | -0.89 | -0.31 | 0.33 | -0.36 | 0.19 | -0.49 | -0.63 | -0.69 | 0.12 | -0.39 | -0.74 | 0.12 | -0.97 | 0.67 | -0.44 | 0.52 | -0.19 | -1.07 | 0.81 | -0.48 | -0.20 | 0.71 | 0.43 | -0.44 | 0.28 | 1.34 | 0.33 | 0.61 | 0.20 | 0.28 | 0.56 | 0.62 | 0.09 | -0.51 | 0.32 |
| 0.1 | 0.95 | 0.01 | 0.47 | -0.46 | 0.00 | 0.21 | 0.75 | 0.08 | -0.56 | -1.13 | 1.39 | 0.77 | 0.33 | -0.42 | -0.09 | -0.39 | -0.60 | 0.96 | 0.14 | 0.28 | 0.87 | 1.14 | -0.05 | -0.41 | -0.64 | -0.29 | 0.40 | 0.66 | 0.39 | -1.41 | -0.1 | 1.15 | 0.84 | 0.58 | 0.67 | 0.09 | -0.18 | 0.04 | 0.34 | -0.65 | 0.41 |
| -0.26 | 0.45 | -0.51 | 0.71 | 0.66 | 0.21 | 0.00 | 0.89 | -0.57 | -0.98 | 0.42 | -0.45 | 0.80 | 0.87 | 0.07 | 0.17 | -0.22 | 0.80 | -0.59 | 1.01 | 1.13 | 0.78 | -0.36 | 0.55 | -0.54 | 0.79 | -0.65 | 0.91 | 0.24 | 0.1 | 0.30 | -0.86 | -1.27 | 0.07 | 0.25 | 0.32 | 0.54 | 0.71 | -0.39 | 0.26 | 0.46 | 0.17 |
| 0.37 | -0.41 | -0.29 | -0.72 | -0.89 | 0.75 | 0.89 | 0.00 | 0.41 | 0.03 | 0.60 | 0.36 | -0.09 | 0.60 | -0.58 | 0.89 | -0.57 | -0.15 | -0.75 | -0.08 | 0.54 | 0.29 | 0.53 | 0.14 | -0.43 | -0.06 | -0.44 | 0.68 | -0.11 | -0.46 | 1.04 | 0.56 | 0.42 | -0.37 | -0.14 | -0.01 | -0.08 | -0.17 | 0.42 | 0.02 | 0.18 | 0.08 |
| 0.33 | 0.73 | -0.23 | 0.70 | -0.31 | 0.08 | -0.57 | 0.41 | 0.00 | -0.99 | 0.71 | 0.68 | 0.32 | 0.54 | 0.86 | -0.11 | -0.73 | -0.97 | -0.59 | 0.69 | 1.00 | -0.29 | 0.05 | -0.35 | 0.85 | 0.44 | 0.32 | 1.04 | -0.09 | 0.12 | 0.94 | 0.81 | -0.57 | -0.79 | 0.94 | -0.98 | 0.10 | -0.74 | 0.74 | -0.22 | 0.20 | 0.82 |
| -1.00 | -0.17 | 0.06 | -0.26 | 0.33 | -0.56 | -0.98 | 0.03 | -0.99 | 0.00 | -0.19 | -0.28 | -0.19 | 0.43 | -0.55 | -0.06 | -0.42 | -0.19 | 0.79 | 0.35 | 0.64 | -0.81 | -0.09 | -1.29 | 0.63 | -0.56 | -0.20 | 0.53 | 0.32 | -1.31 | 0.82 | 0.97 | 0.02 | 0.42 | 0.60 | 0.02 | 0.90 | -0.84 | 0.77 | 0.60 | 0.06 | 0.82 |
| 0.24 | -0.46 | 0.49 | 1.25 | -0.36 | -1.13 | 0.42 | 0.60 | 0.71 | -0.19 | 0.00 | -1.50 | -1.20 | 0.73 | 0.23 | -0.12 | 0.46 | -0.12 | 0.30 | -0.44 | 0.74 | 0.22 | -1.25 | 0.35 | -0.45 | 0.45 | -0.32 | -0.06 | 0.39 | -0.53 | 0.09 | 1.29 | 0.38 | -1.14 | -0.60 | 1.17 | 0.03 | 0.95 | -0.21 | -0.33 | 0.03 | 0.41 |
| -0.26 | 0.73 | -1.46 | -0.76 | 0.19 | 1.39 | -0.45 | 0.36 | 0.68 | -0.28 | -1.50 | 0.00 | 0.15 | 0.82 | -0.16 | 0.40 | 0.41 | 0.53 | -0.42 | -0.33 | -0.55 | 0.63 | -0.20 | 0.70 | -0.66 | -0.76 | -0.09 | 0.61 | -0.28 | 0.21 | -0.41 | -1.12 | -0.04 | 0.80 | 0.92 | -0.96 | -0.62 | 0.90 | -0.57 | -0.74 | -1.65 | -0.53 |
| 1.18 | -0.15 | -0.73 | -0.09 | -0.49 | 0.77 | 0.80 | -0.09 | 0.32 | -0.19 | -1.20 | 0.15 | 0.00 | -0.13 | 0.51 | -0.48 | -0.17 | 0.78 | 0.62 | 0.62 | -0.88 | -0.81 | -0.11 | -0.34 | 0.04 | 0.33 | 0.84 | -0.74 | -0.48 | 0.48 | -0.30 | 0.43 | 1.37 | 0.51 | -0.74 | -0.73 | -0.07 | -0.33 | 0.84 | 1.04 | -0.84 | -0.68 |
| -0.42 | -0.61 | -0.27 | -0.61 | -0.63 | 0.33 | 0.87 | 0.60 | 0.54 | 0.43 | 0.73 | 0.82 | -0.13 | 0.00 | 0.81 | 0.18 | [illegible] | [illegible] | 0.90 | 0.98 | 0.62 | 0.04 | 0.24 | 0.43 | 0.57 | 0.02 | 0.32 | 0.75 | 0.67 | 0.26 | 1.02 | -0.33 | -0.34 | 0.98 | 0.70 | -1.09 | 0.15 | -0.45 | 0.11 | -0.70 | 0.15 | 0.37 |
| 0.87 | -0.13 | -0.95 | 0.49 | -0.69 | -0.42 | 0.07 | -0.58 | 0.86 | -0.55 | 0.23 | -0.16 | 0.51 | 0.81 | 0.00 | [illegible] | [illegible] | [illegible] | 0.56 | 0.36 | 1.24 | -0.39 | 0.62 | -0.23 | 0.24 | 0.71 | -0.36 | 0.37 | 0.03 | -0.1 | 0.46 | 0.38 | -0.98 | -0.39 | -0.23 | 0.14 | -1.18 | -0.41 | 0.53 | 0.74 | -0.00 | 0.60 |
| 0.09 | 0.49 | 0.78 | -0.26 | 0.12 | -0.09 | 0.17 | 0.89 | -0.11 | -0.06 | -0.12 | 0.40 | -0.48 | 0.18 | [illegible] | 0.00 | [illegible] | [illegible] | [illegible] | [illegible] | 0.02 | -0.32 | 0.87 | -0.03 | -0.32 | 0.76 | 0.44 | 0.18 | -0.13 | -0.30 | 0.96 | 0.97 | 0.01 | 0.59 | 0.41 | -0.86 | -0.37 | 0.67 | -0.09 | 0.70 | -1.22 | 1.02 |
| 0.19 | 0.06 | -0.40 | 0.86 | -0.39 | -0.39 | -0.22 | -0.57 | -0.73 | -0.42 | 0.46 | 0.41 | -0.17 | [illegible] | [illegible] | [illegible] | 0.00 | [illegible] | [illegible] | [illegible] | -0.12 | -0.51 | 0.26 | -0.87 | -0.80 | 0.74 | -0.93 | -0.21 | -0.83 | 0.02 | 0.33 | 1.15 | 0.76 | 0.14 | 0.49 | 1.08 | 0.28 | 0.38 | 0.36 | 0.66 | 0.59 | 0.21 |
| 0.13 | 0.37 | -0.50 | 0.69 | -0.74 | -0.60 | 0.80 | -0.15 | -0.97 | -0.19 | -0.12 | 0.53 | 0.78 | [illegible] | [illegible] | [illegible] | [illegible] | 0.00 | [illegible] | [illegible] | 0.54 | 0.02 | 0.39 | -0.65 | 0.12 | 0.88 | -0.42 | -0.58 | 0.56 | -0.14 | 0.72 | 0.38 | -0.40 | 0.10 | -0.01 | 0.30 | 1.05 | 1.38 | 0.04 | 0.93 | -0.32 | -0.16 |
| -0.28 | -0.56 | -1.19 | -0.31 | 0.12 | 0.96 | -0.59 | -0.75 | -0.59 | 0.79 | 0.30 | -0.42 | 0.62 | 0.90 | 0.56 | [illegible] | [illegible] | [illegible] | 0.00 | [illegible] | -0.62 | -0.45 | 0.98 | 0.76 | -1.05 | 0.41 | 0.42 | 0.43 | 1.14 | 0.34 | -0.34 | 0.74 | -0.54 | 0.61 | 0.90 | 0.42 | -0.56 | -0.52 | -0.95 | 0.83 | 0.41 | -1.05 |
| -0.84 | -0.23 | 0.52 | 0.28 | -0.97 | 0.14 | 1.01 | -0.08 | 0.69 | 0.35 | -0.44 | -0.33 | 0.62 | 0.98 | 0.36 | [illegible] | [illegible] | [illegible] | [illegible] | 0.00 | -0.41 | 0.96 | -0.73 | 0.76 | -0.76 | 0.15 | 1.26 | 0.77 | -0.77 | -0.58 | 0.22 | 0.12 | 0.15 | 0.51 | 1.09 | -0.06 | 0.32 | -0.47 | -0.57 | 0.37 | -0.02 | -0.18 |
| -0.22 | -0.52 | -1.23 | 0.54 | 0.67 | 0.28 | 1.13 | 0.54 | 1.00 | 0.64 | 0.74 | -0.55 | -0.88 | 0.62 | 1.24 | 0.02 | -0.12 | 0.54 | -0.62 | -0.41 | 0.00 | 0.83 | 0.74 | -0.91 | 0.64 | -0.09 | -0.20 | 1.06 | -0.31 | -0.22 | -0.33 | 0.76 | -0.66 | 0.92 | 1.26 | 0.16 | 0.29 | 0.30 | 0.19 | -0.27 | -0.65 | 0.44 |
| -0.45 | 0.44 | 0.35 | 0.13 | -0.44 | 0.87 | 0.78 | 0.29 | -0.29 | -0.81 | 0.22 | 0.63 | -0.81 | 0.04 | -0.39 | -0.32 | -0.51 | 0.02 | -0.45 | 0.96 | 0.83 | 0.00 | 0.65 | 0.23 | 0.33 | 0.34 | 1.25 | -0.72 | 0.01 | 0.71 | 0.94 | -0.89 | 0.24 | -0.60 | 1.28 | -0.92 | 0.02 | -0.76 | -0.26 | 0.53 | -0.41 | -0.06 |
| 0.42 | 0.86 | 0.28 | 0.45 | 0.52 | 1.14 | -0.36 | 0.53 | 0.05 | -0.09 | -1.25 | -0.20 | -0.11 | 0.24 | 0.62 | 0.87 | 0.26 | 0.39 | 0.98 | -0.73 | 0.74 | 0.65 | 0.00 | 1.27 | -0.57 | -0.23 | -0.40 | 0.02 | 0.39 | 0.24 | 0.15 | 0.01 | 0.90 | -0.21 | -0.39 | -0.78 | -0.76 | 0.34 | -0.07 | 0.22 | 0.01 | 0.10 |
| -0.32 | -0.76 | -0.19 | -0.30 | -0.19 | -0.05 | 0.55 | 0.14 | -0.35 | -1.29 | 0.35 | 0.70 | -0.34 | 0.43 | -0.23 | -0.03 | -0.87 | -0.65 | 0.76 | 0.76 | -0.91 | 0.23 | 1.27 | 0.00 | 0.25 | 0.29 | 0.05 | 0.71 | -0.64 | 0.22 | 0.05 | -0.14 | -0.32 | -0.84 | -0.98 | 0.94 | 1.06 | -0.30 | 1.27 | -0.24 | 0.21 | -0.08 |
| -0.54 | 0.38 | 0.47 | 0.83 | -1.07 | -0.41 | -0.54 | -0.43 | 0.85 | 0.63 | -0.45 | -0.66 | 0.04 | 0.57 | 0.24 | -0.32 | -0.80 | 0.12 | -1.05 | -0.76 | 0.64 | 0.33 | -0.57 | 0.25 | 0.00 | -0.69 | 1.24 | -0.06 | 0.58 | 0.41 | 0.59 | -0.09 | -0.62 | 0.65 | -0.13 | -1.25 | -0.05 | -0.20 | 0.08 | 0.66 | -0.71 | -0.42 |
| 0.35 | 0.48 | 1.04 | 0.38 | 0.81 | -0.64 | 0.79 | -0.06 | 0.44 | -0.56 | 0.45 | -0.76 | 0.33 | 0.02 | 0.71 | 0.76 | 0.74 | 0.88 | 0.41 | 0.15 | -0.09 | 0.34 | -0.23 | 0.29 | -0.69 | 0.00 | 0.60 | -0.45 | 0.55 | -0.86 | -0.39 | -0.29 | -0.50 | -0.16 | 0.63 | -0.79 | -0.52 | -0.14 | -0.52 | 0.24 | -1.42 | 0.95 |
| 0.14 | 0.25 | 0.22 | 0.21 | -0.48 | -0.29 | -0.65 | -0.44 | 0.32 | -0.20 | -0.32 | -0.09 | 0.84 | 0.32 | -0.36 | 0.44 | -0.93 | -0.42 | 0.42 | 1.26 | -0.20 | 1.25 | -0.40 | 0.05 | 1.24 | 0.60 | 0.00 | 0.57 | 0.73 | 0.33 | -0.22 | 0.63 | -0.67 | 0.38 | 0.43 | 0.08 | 0.69 | 0.24 | -0.35 | -0.38 | -0.46 | 0.1 |
| -0.05 | 0.57 | -0.52 | -0.11 | -0.20 | 0.40 | 0.91 | 0.68 | 1.04 | 0.53 | -0.06 | 0.61 | -0.74 | 0.75 | 0.37 | 0.18 | -0.21 | -0.58 | 0.43 | 0.77 | 1.06 | -0.72 | 0.02 | 0.71 | -0.06 | -0.45 | 0.57 | 0.00 | -0.29 | -0.32 | 0.30 | -0.20 | 0.12 | 0.76 | -0.21 | 0.14 | -0.95 | 0.51 | 0.09 | 0.93 | 0.08 | -0.57 |
| 1.26 | -0.64 | -1.17 | -1.06 | 0.71 | 0.66 | 0.24 | -0.11 | -0.09 | 0.32 | 0.39 | -0.28 | -0.48 | 0.67 | 0.03 | -0.13 | -0.83 | 0.56 | 1.14 | -0.77 | -0.31 | 0.01 | 0.39 | -0.64 | 0.58 | 0.55 | 0.73 | -0.29 | 0.00 | 0.26 | -0.17 | -0.61 | -0.21 | 0.24 | -0.77 | 0.40 | -0.29 | 0.02 | -0.26 | 1.00 | 0.31 | 0.95 |
| 0.60 | -0.49 | 0.46 | 0.24 | 0.43 | 0.39 | 0.1 | -0.46 | 0.12 | -1.31 | -0.53 | 0.21 | 0.48 | 0.26 | -0.1 | -0.30 | 0.02 | -0.14 | 0.34 | -0.58 | -0.22 | 0.71 | 0.24 | 0.22 | 0.41 | -0.86 | 0.33 | -0.32 | 0.26 | 0.00 | -0.34 | -0.44 | -0.02 | -0.54 | 0.84 | -0.46 | 0.53 | 0.67 | 0.36 | -0.50 | -1.41 | -0.02 |
| 0.08 | -0.37 | 1.12 | 0.59 | -0.44 | 1.41 | 0.30 | 1.04 | 0.94 | 0.82 | 0.09 | -0.41 | -0.30 | 1.02 | 0.46 | 0.96 | 0.33 | 0.72 | -0.34 | 0.22 | -0.33 | 0.94 | 0.15 | 0.05 | 0.59 | -0.39 | -0.22 | 0.30 | -0.17 | -0.34 | 0.00 | 0.19 | -0.71 | 0.00 | 1.04 | 0.54 | -0.75 | 0.89 | 0.56 | -0.83 | -0.49 | -0.90 |
| -1.20 | -0.20 | 0.44 | 0.42 | 0.28 | -0.1 | -0.86 | 0.56 | 0.81 | 0.97 | 1.29 | -1.12 | 0.43 | -0.33 | 0.38 | 0.97 | 1.15 | 0.38 | 0.74 | 0.12 | 0.76 | -0.89 | 0.01 | -0.14 | -0.09 | -0.29 | 0.63 | -0.20 | -0.61 | -0.44 | 0.19 | 0.00 | 0.60 | -0.61 | 0.21 | -0.48 | 0.74 | 0.23 | -0.63 | 0.31 | -0.28 | -0.28 |
| 0.67 | 0.19 | -0.66 | 0.37 | 1.34 | 1.15 | -1.27 | 0.42 | 0.57 | 0.02 | 0.38 | -0.04 | 1.37 | -0.34 | -0.98 | 0.01 | 0.76 | -0.40 | -0.54 | 0.15 | -0.66 | 0.24 | 0.90 | -0.32 | -0.62 | -0.50 | -0.67 | 0.12 | -0.21 | -0.02 | -0.71 | 0.60 | 0.00 | 1.20 | 0.13 | 1.12 | 0.91 | -0.38 | -0.75 | -0.13 | -0.75 | -0.15 |
| 0.73 | -0.83 | 0.15 | 0.33 | 0.33 | 0.84 | 0.07 | -0.37 | -0.79 | 0.42 | -1.14 | 0.80 | 0.51 | 0.98 | -0.39 | 0.59 | 0.14 | 0.10 | 0.61 | 0.51 | 0.92 | -0.60 | -0.21 | -0.84 | 0.65 | -0.16 | 0.38 | 0.76 | 0.24 | -0.54 | 0.00 | -0.61 | 1.20 | 0.00 | -0.15 | 0.52 | 0.53 | 0.85 | 0.51 | -0.04 | -0.01 | -0.74 |
| -0.02 | 0.08 | 0.53 | -0.07 | 0.61 | 0.58 | 0.25 | -0.14 | 0.94 | 0.60 | -0.60 | 0.92 | -0.74 | 0.70 | -0.23 | 0.41 | 0.49 | -0.01 | 0.90 | 1.09 | 1.26 | 1.28 | -0.39 | -0.98 | -0.13 | 0.63 | 0.43 | -0.21 | -0.77 | 0.84 | 1.04 | 0.21 | 0.13 | -0.15 | 0.00 | -0.60 | 0.27 | 0.30 | -0.63 | -0.16 | -0.06 | -0.06 |
| 0.44 | 0.69 | 1.07 | 0.89 | 0.20 | 0.67 | 0.32 | -0.01 | -0.98 | 0.02 | 1.17 | -0.96 | -0.73 | -1.09 | 0.14 | -0.86 | 1.08 | 0.30 | 0.42 | -0.06 | 0.16 | -0.92 | -0.78 | 0.94 | -1.25 | -0.79 | 0.08 | 0.14 | 0.40 | -0.46 | 0.54 | -0.48 | 1.12 | 0.52 | -0.60 | 0.00 | -0.58 | 0.68 | 0.67 | 0.73 | -0.07 | -0.25 |
| -1.07 | -0.05 | -0.15 | 0.54 | -0.28 | 0.09 | 0.54 | -0.08 | 0.10 | 0.90 | 0.03 | -0.62 | -0.07 | 0.15 | -1.18 | -0.37 | 0.28 | 1.05 | -0.56 | 0.32 | 0.29 | 0.02 | -0.76 | 1.06 | -0.05 | -0.52 | 0.69 | -0.95 | -0.29 | 0.53 | -0.75 | 0.74 | 0.91 | 0.53 | 0.27 | -0.58 | 0.00 | 0.93 | 1.49 | 0.20 | 0.70 | 0.15 |
| -0.56 | 1.14 | 0.07 | 0.27 | -0.56 | -0.18 | 0.71 | -0.17 | -0.74 | -0.84 | 0.95 | 0.90 | -0.33 | -0.45 | -0.41 | 0.67 | 0.38 | 1.38 | -0.52 | -0.47 | 0.30 | -0.76 | 0.34 | -0.30 | -0.20 | -0.14 | 0.24 | 0.51 | 0.02 | 0.67 | 0.89 | 0.23 | -0.38 | 0.85 | 0.30 | 0.68 | 0.93 | 0.00 | -0.12 | 1.26 | 0.31 | 0.17 |
| 0.24 | -0.47 | 0.60 | 0.57 | 0.62 | 0.04 | -0.39 | 0.42 | 0.74 | 0.77 | -0.21 | -0.57 | 0.84 | 0.11 | 0.53 | -0.09 | 0.36 | 0.04 | -0.95 | -0.57 | 0.19 | -0.26 | -0.07 | 1.27 | 0.08 | 0.52 | -0.35 | 0.09 | -0.26 | 0.36 | 0.56 | -0.63 | -0.75 | 0.51 | -0.63 | 0.67 | 1.49 | -0.12 | 0.00 | 0.29 | 1.25 | 0.26 |
| 0.33 | -0.36 | -0.01 | 0.46 | 0.09 | 0.34 | 0.26 | 0.02 | 0.22 | 0.60 | -0.33 | -0.74 | 1.04 | -0.70 | 0.74 | 0.70 | 0.66 | 0.93 | 0.83 | 0.37 | -0.27 | 0.53 | 0.22 | -0.24 | 0.66 | 0.24 | -0.38 | 0.93 | 1.00 | -0.50 | -0.83 | 0.31 | -0.13 | -0.04 | -0.16 | 0.73 | 0.20 | 1.26 | 0.29 | 0.00 | 0.13 | -1.14 |
| -0.37 | 1.44 | -0.37 | -0.01 | -0.51 | -0.65 | 0.46 | 0.18 | 0.20 | 0.06 | 0.03 | -1.65 | -0.84 | 0.15 | -0.00 | -1.22 | 0.59 | -0.32 | 0.41 | -0.02 | -0.65 | -0.41 | 0.01 | 0.21 | -0.71 | -1.42 | -0.46 | 0.08 | 0.31 | -1.41 | -0.49 | -0.28 | -0.75 | -0.01 | -0.06 | -0.07 | 0.70 | 0.31 | 1.25 | 0.13 | 0.00 | 0.34 |
| -0.17 | 0.80 | -0.57 | 1.10 | 0.32 | 0.41 | 0.17 | 0.08 | 0.82 | 0.82 | 0.41 | -0.53 | -0.68 | 0.37 | 0.60 | 1.02 | 0.21 | -0.16 | -1.05 | -0.18 | 0.44 | -0.86 | 0.10 | -0.88 | -0.42 | 0.95 | 0.1 | -0.57 | 0.95 | -0.02 | -0.90 | -0.28 | -0.15 | -0.74 | -0.06 | -0.25 | 0.15 | 0.17 | 0.26 | -1.14 | 0.34 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.83 | -0.46 | -0.36 | -0.13 | -0.03 | 1.14 | -0.30 | 0.37 | 0.90 | 0.92 | -0.52 | 0.57 | 0.70 | -0.65 | 0.67 | 0.81 | -0.48 | 0.50 | 0.38 | 0.08 | 0.30 | 0.11 | 0.04 | -0.12 | -0.73 | 0.76 | 0.17 | 0.74 | -0.67 | -0.21 | 0.90 | 0.06 | -0.75 | 0.09 | -0.17 | 0.87 | 0.34 | 0.24 | -0.74 | -0.96 | -0.75 | -0.15 |
| 0.84 | -0.48 | -1.05 | -0.87 | -0.13 | 0.75 | 0.42 | -0.16 | 0.81 | -0.98 | -0.79 | -0.51 | -0.08 | -0.30 | 0.59 | 0.70 | 0.16 | 0.99 | 0.69 | 0.21 | 0.51 | -0.24 | 0.24 | 0.38 | 0.19 | -0.03 | 0.33 | -0.47 | -0.48 | 0.50 | 1.76 | 0.79 | -0.14 | 0.15 | -0.36 | -1.07 | 0.33 | 0.83 | 0.41 | -0.58 | 0.39 | 0.50 |
| 0.43 | 0.43 | 0.07 | -1.13 | -0.89 | 0.48 | -0.99 | -0.75 | 0.74 | 0.13 | -0.42 | -0.02 | 0.45 | 0.64 | 0.18 | 0.12 | 0.99 | 0.52 | -0.76 | -0.08 | 0.82 | 0.70 | -0.55 | 1.0 | -0.72 | -0.66 | 0.14 | 0.65 | 1.01 | -0.40 | -0.29 | 0.71 | 0.35 | 0.67 | 0.41 | -0.42 | 0.41 | -0.46 | -0.02 | 1.13 | 0.59 | -0.69 |
| 0.68 | 0.78 | -0.99 | 0.72 | 0.56 | -0.34 | 0.16 | 0.01 | 0.35 | 0.40 | 0.87 | 0.66 | 0.97 | 0.58 | 0.49 | -0.76 | -0.51 | 0.71 | 1.04 | -0.54 | 0.41 | 0.86 | -0.49 | 0.46 | -0.11 | 0.43 | -0.02 | 0.91 | 0.16 | -0.25 | 0.52 | 0.17 | 0.28 | 0.52 | 0.55 | 0.00 | -0.06 | 0.80 | 1.07 | 0.37 | -0.60 | 0.64 |
| 0.28 | 0.33 | 0.17 | 0.33 | -0.00 | 0.86 | -0.63 | 0.66 | 0.18 | -0.20 | 0.05 | 0.55 | -0.29 | -0.61 | 0.07 | 0.38 | 0.35 | 0.41 | 0.47 | 0.86 | -0.45 | -0.28 | 0.84 | -0.11 | 0.13 | -0.05 | 1.01 | 0.78 | 1.03 | 1.41 | 0.66 | 0.21 | -0.36 | 1.01 | -0.05 | -0.03 | 0.03 | -0.36 | 0.63 | 0.02 | 0.32 | 0.08 |
| 1.02 | -0.61 | 0.59 | 0.78 | 0.44 | 0.50 | 0.06 | 0.55 | 0.49 | -0.64 | 0.73 | -0.36 | 0.44 | 0.03 | 1.38 | -0.28 | -0.70 | -0.06 | 0.44 | 0.55 | -0.03 | 0.09 | 0.54 | -1.12 | 0.76 | -0.38 | -0.20 | 0.39 | -0.47 | 0.67 | 0.33 | -0.67 | -1.05 | 0.09 | -0.38 | 0.89 | -0.53 | 0.79 | 0.10 | -0.78 | 0.15 | 0.18 |
| 0.56 | -0.62 | 0.89 | 0.95 | 0.69 | -0.27 | 0.12 | 0.40 | 0.53 | 0.11 | 0.79 | 0.48 | 0.46 | -0.33 | -0.05 | 0.03 | 0.87 | -0.98 | 0.1 | -0.55 | 0.11 | 0.96 | 0.47 | -0.98 | 0.34 | 0.27 | -0.74 | 0.76 | -0.39 | -0.35 | -0.43 | 0.26 | 0.36 | 0.17 | -0.19 | 0.50 | 0.30 | 0.18 | -0.07 | 0.06 | 0.1 | 0.26 |
| 0.00 | 0.81 | 0.58 | -0.18 | 0.37 | 0.1 | -0.26 | 0.37 | 0.33 | -1.00 | 0.24 | -0.26 | 1.18 | -0.42 | 0.87 | 0.09 | 0.19 | 0.13 | -0.28 | -0.84 | -0.22 | -0.45 | 0.35 | -0.37 | -0.54 | 0.47 | 0.21 | -0.05 | 1.26 | 0.60 | 0.08 | -1.20 | 0.67 | 0.73 | -0.02 | 0.27 | -1.07 | -0.56 | 0.32 | 0.33 | -0.44 | -0.17 |
| 0.81 | 0.00 | 0.63 | 0.64 | 0.10 | 0.95 | 0.45 | -0.41 | 0.73 | -0.17 | -0.46 | 0.73 | -0.15 | -0.61 | -0.13 | 0.49 | 0.06 | 0.37 | -0.56 | -0.23 | -0.52 | 0.44 | 0.79 | -0.81 | 0.38 | 0.60 | 0.32 | 0.57 | -0.64 | -0.49 | -0.37 | -0.20 | 0.19 | -0.83 | 0.08 | 0.51 | -0.05 | 1.14 | -0.40 | -0.36 | 1.37 | 0.80 |
| 0.58 | 0.63 | 0.00 | 0.93 | -0.19 | 0.01 | -0.51 | -0.29 | -0.23 | 0.06 | 0.49 | -1.46 | -0.73 | -0.27 | -0.95 | 0.78 | -0.40 | -0.50 | -1.19 | 0.52 | -1.23 | 0.35 | 0.34 | -0.14 | 0.47 | 0.92 | 0.15 | -0.52 | -1.17 | 0.46 | 1.12 | 0.44 | -0.66 | 0.15 | 0.53 | 1.25 | -0.15 | 0.07 | 0.53 | -0.01 | -0.29 | 0.57 |
| -0.18 | 0.64 | 0.93 | 0.00 | -0.26 | 0.47 | 0.71 | -0.72 | 0.70 | -0.26 | 1.25 | -0.76 | -0.09 | -0.61 | 0.49 | -0.26 | 0.86 | 0.69 | -0.31 | 0.28 | 0.54 | 0.13 | 0.51 | -0.25 | 0.83 | 0.25 | 0.15 | -0.11 | -1.06 | 0.24 | 0.59 | 0.42 | 0.37 | 0.33 | -0.07 | 1.07 | 0.54 | 0.27 | 0.50 | 0.46 | 0.06 | 1.10 |
| 0.37 | 0.10 | -0.19 | -0.26 | 0.00 | -0.46 | 0.66 | -0.89 | 0.31 | 0.33 | -0.36 | 0.19 | -0.49 | -0.63 | -0.69 | 0.12 | -0.39 | -0.74 | 0.12 | -0.97 | 0.67 | -0.44 | 0.45 | -0.24 | -1.07 | 0.93 | -0.42 | -0.20 | 0.71 | 0.43 | -0.44 | 0.28 | 1.34 | 0.33 | 0.61 | 0.02 | -0.28 | -0.56 | 0.70 | 0.09 | -0.58 | 0.32 |
| 0.1 | 0.95 | 0.01 | 0.47 | -0.46 | 0.00 | 0.21 | 0.75 | 0.08 | -0.56 | -1.13 | 1.39 | 0.77 | 0.33 | -0.42 | -0.09 | -0.39 | -0.60 | 0.96 | 0.14 | 0.28 | 0.87 | 1.07 | -0.10 | -0.41 | -0.51 | -0.22 | 0.40 | 0.66 | 0.39 | -1.41 | -0.1 | 1.15 | 0.84 | 0.58 | 0.50 | 0.09 | -0.18 | 0.12 | 0.34 | -0.72 | 0.41 |
| -0.26 | 0.45 | -0.51 | 0.71 | 0.66 | 0.21 | 0.00 | 0.89 | -0.57 | -0.98 | 0.42 | -0.45 | 0.80 | 0.87 | 0.07 | 0.17 | -0.22 | 0.80 | -0.59 | 1.01 | 1.13 | 0.78 | -0.29 | 0.61 | -0.54 | 0.67 | -0.71 | 0.91 | 0.24 | 0.1 | 0.30 | -0.86 | -1.27 | 0.07 | 0.25 | 0.50 | 0.54 | 0.71 | -0.47 | 0.26 | 0.53 | 0.17 |
| 0.37 | -0.41 | -0.29 | -0.72 | -0.89 | 0.75 | 0.89 | 0.00 | 0.41 | 0.03 | 0.60 | 0.36 | -0.09 | 0.60 | -0.58 | 0.89 | -0.57 | -0.15 | -0.75 | -0.08 | 0.54 | 0.29 | 0.59 | 0.19 | -0.43 | -0.18 | -0.50 | 0.68 | -0.11 | -0.46 | 1.04 | 0.56 | 0.42 | -0.37 | -0.14 | 0.16 | -0.08 | -0.17 | 0.34 | 0.02 | 0.25 | 0.08 |
| 0.33 | 0.73 | -0.23 | 0.70 | -0.31 | 0.08 | -0.57 | 0.41 | 0.00 | -0.99 | 0.71 | 0.68 | 0.32 | 0.54 | 0.86 | -0.11 | -0.73 | -0.97 | -0.59 | 0.69 | 1.00 | -0.29 | 0.12 | -0.29 | 0.85 | 0.31 | 0.25 | 1.04 | -0.09 | 0.12 | 0.94 | 0.81 | -0.57 | -0.79 | 0.94 | -0.81 | 0.10 | -0.74 | 0.67 | -0.22 | 0.28 | 0.82 |
| -1.00 | -0.17 | 0.06 | -0.26 | 0.33 | -0.56 | -0.98 | 0.03 | -0.99 | 0.00 | -0.19 | -0.28 | -0.19 | 0.43 | -0.55 | -0.06 | -0.42 | -0.19 | -0.79 | 0.35 | 0.64 | -0.81 | -0.02 | -1.23 | 0.63 | -0.69 | -0.27 | 0.53 | 0.32 | -1.31 | 0.82 | 0.97 | 0.02 | 0.42 | 0.60 | 0.20 | 0.90 | -0.84 | 0.69 | 0.60 | 0.13 | 0.82 |
| 0.24 | -0.46 | 0.49 | 1.25 | -0.36 | -1.13 | 0.42 | 0.60 | 0.71 | -0.19 | 0.00 | -1.50 | -1.20 | 0.73 | 0.23 | -0.12 | 0.46 | -0.12 | 0.30 | -0.44 | 0.74 | 0.22 | -1.18 | 0.40 | -0.45 | 0.33 | -0.39 | -0.06 | 0.39 | -0.53 | 0.09 | 1.29 | 0.38 | -1.14 | -0.60 | 1.35 | 0.03 | 0.95 | -0.28 | -0.33 | 0.10 | 0.41 |
| -0.26 | 0.73 | -1.46 | 0.76 | 0.19 | 1.39 | -0.45 | 0.36 | 0.68 | -0.28 | -1.50 | 0.00 | 0.15 | 0.82 | -0.16 | 0.40 | 0.41 | 0.53 | -0.42 | -0.33 | -0.55 | 0.63 | -0.26 | 0.65 | -0.66 | -0.64 | -0.02 | 0.61 | -0.28 | 0.21 | -0.41 | -1.12 | -0.04 | 0.80 | 0.92 | -1.14 | -0.62 | 0.90 | -0.49 | -0.74 | -1.72 | -0.53 |
| 1.18 | -0.15 | -0.73 | -0.09 | -0.49 | 0.77 | 0.80 | -0.09 | 0.32 | -0.19 | -1.20 | 0.15 | 0.00 | -0.13 | 0.51 | -0.48 | -0.17 | 0.78 | 0.32 | 0.62 | -0.88 | -0.81 | -0.18 | 0.39 | 0.04 | 0.45 | 0.91 | -0.74 | -0.48 | 0.48 | -0.30 | 0.43 | 1.37 | 0.51 | -0.74 | -0.91 | -0.07 | -0.33 | 0.92 | 1.04 | -0.92 | -0.68 |
| -0.42 | -0.61 | -0.27 | -0.61 | -0.63 | 0.33 | 0.87 | 0.60 | 0.54 | 0.43 | 0.73 | 0.82 | -0.13 | 0.00 | -0.39 | 0.18 | 0.81 | 0.63 | -0.01 | 0.98 | 0.62 | 0.04 | 0.31 | 0.48 | 0.57 | -0.10 | 0.25 | 0.75 | 0.67 | 0.26 | 1.02 | 0.33 | -0.34 | 0.98 | 0.70 | -0.91 | 0.15 | -0.45 | 0.04 | -0.70 | 0.22 | 0.37 |
| 0.87 | -0.13 | -0.95 | 0.49 | -0.69 | -0.42 | 0.07 | -0.58 | 0.86 | -0.55 | 0.23 | -0.16 | 0.51 | -0.39 | 0.00 | 0.90 | -0.08 | 1.0 | -0.56 | 0.36 | 1.24 | -0.39 | 0.69 | -0.18 | 0.24 | 0.59 | -0.43 | 0.37 | 0.03 | -0.1 | 0.46 | 0.38 | -0.98 | -0.39 | -0.23 | 0.32 | -1.18 | -0.41 | 0.45 | 0.74 | 0.07 | 0.60 |
| 0.09 | 0.49 | 0.78 | -0.26 | 0.12 | -0.09 | 0.17 | 0.89 | -0.11 | -0.06 | -0.12 | 0.40 | -0.48 | 0.18 | 0.90 | 0.00 | -0.31 | -0.56 | 0.72 | 1.35 | 0.02 | -0.32 | 0.93 | 0.03 | -0.32 | 0.63 | 0.37 | 0.18 | -0.13 | -0.30 | 0.96 | 0.97 | 0.01 | 0.59 | 0.41 | -0.68 | -0.37 | 0.67 | -0.17 | 0.70 | -1.14 | 1.02 |
| 0.19 | 0.06 | -0.40 | 0.86 | -0.39 | -0.39 | -0.22 | -0.57 | -0.73 | -0.42 | 0.46 | 0.41 | -0.17 | 0.81 | -0.08 | -0.31 | 0.00 | 0.25 | 0.73 | 0.56 | -0.12 | -0.51 | 0.20 | -0.93 | -0.80 | 0.86 | -0.87 | -0.21 | -0.83 | 0.02 | 0.33 | 1.15 | 0.76 | 0.14 | 0.49 | 0.90 | 0.28 | 0.38 | 0.44 | 0.66 | 0.52 | 0.21 |
| 0.13 | 0.37 | -0.50 | 0.69 | -0.74 | -0.60 | 0.80 | -0.15 | -0.97 | -0.19 | -0.12 | 0.53 | 0.78 | 0.63 | 1.0 | -0.56 | 0.25 | 0.00 | 0.11 | -0.61 | 0.54 | 0.02 | 0.32 | -0.70 | 0.12 | 1.00 | -0.36 | -0.58 | 0.56 | -0.14 | 0.72 | 0.38 | -0.40 | 0.10 | -0.01 | 0.12 | 1.05 | 1.38 | 0.12 | 0.93 | -0.39 | -0.16 |
| -0.28 | -0.56 | -1.19 | -0.31 | 0.12 | 0.96 | -0.59 | -0.75 | -0.59 | -0.79 | 0.30 | -0.42 | 0.32 | -0.01 | -0.56 | 0.72 | 0.73 | 0.11 | 0.00 | 0.06 | -0.62 | -0.45 | 0.92 | -0.81 | -1.05 | 0.54 | 0.49 | 0.43 | 1.14 | 0.34 | -0.34 | 0.74 | -0.54 | 0.61 | 0.90 | 0.25 | -0.56 | -0.52 | -0.87 | 0.83 | 0.34 | -1.05 |
| -0.84 | -0.23 | 0.52 | 0.28 | -0.97 | 0.14 | 1.01 | -0.08 | 0.69 | 0.35 | -0.44 | -0.33 | 0.62 | 0.98 | 0.36 | 1.35 | 0.56 | -0.61 | 0.06 | 0.00 | -0.41 | 0.96 | -0.67 | 0.82 | -0.76 | 0.02 | 1.19 | 0.77 | -0.77 | -0.58 | 0.22 | 0.12 | 0.15 | 0.51 | 1.09 | 0.11 | 0.32 | -0.47 | -0.64 | 0.37 | 0.05 | -0.18 |
| -0.22 | -0.52 | -1.23 | 0.54 | 0.67 | 0.28 | 1.13 | 0.54 | 1.00 | 0.64 | 0.74 | -0.55 | -0.88 | 0.62 | 1.24 | 0.02 | -0.12 | 0.54 | -0.62 | -0.41 | 0.00 | 0.83 | 0.81 | -0.85 | 0.64 | -0.21 | -0.26 | 1.06 | -0.31 | -0.22 | -0.33 | 0.76 | -0.66 | 0.92 | 1.26 | 0.34 | 0.29 | 0.30 | 0.11 | -0.27 | -0.57 | 0.44 |
| -0.45 | 0.44 | 0.35 | 0.13 | -0.44 | 0.87 | 0.78 | 0.29 | -0.29 | -0.81 | 0.22 | 0.63 | -0.81 | 0.04 | -0.39 | -0.32 | -0.51 | 0.02 | -0.45 | 0.96 | 0.83 | 0.00 | 0.71 | 0.28 | 0.33 | 0.21 | 1.18 | -0.72 | 0.01 | 0.71 | 0.94 | -0.89 | 0.24 | -0.60 | 1.28 | -0.74 | 0.02 | -0.76 | -0.33 | 0.53 | -0.33 | -0.86 |
| 0.35 | 0.79 | 0.34 | 0.51 | 0.45 | 1.07 | -0.29 | 0.59 | 0.12 | -0.02 | -1.18 | -0.26 | -0.18 | 0.31 | 0.69 | 0.93 | 0.20 | 0.32 | 0.92 | -0.67 | 0.81 | 0.71 | 0.00 | 1.39 | -0.50 | -0.42 | -0.53 | 0.09 | 0.33 | 0.17 | 0.21 | 0.08 | 0.83 | -0.28 | -0.32 | -0.54 | -0.83 | 0.27 | -0.21 | 0.16 | 0.15 | 0.17 |
| -0.37 | -0.81 | -0.14 | -0.25 | -0.24 | -0.10 | 0.61 | 0.19 | -0.29 | -1.23 | 0.40 | 0.65 | -0.39 | 0.48 | -0.18 | 0.03 | -0.93 | -0.70 | -0.81 | 0.82 | -0.85 | 0.28 | 1.39 | 0.00 | 0.30 | 0.11 | -0.07 | 0.77 | -0.69 | 0.16 | 0.10 | -0.09 | -0.38 | -0.89 | -0.93 | 1.17 | 1.00 | -0.36 | 1.15 | -0.29 | 0.34 | -0.82 |
| -0.54 | 0.38 | 0.47 | 0.83 | -1.07 | -0.41 | -0.54 | -0.43 | 0.85 | 0.63 | -0.45 | -0.66 | 0.04 | 0.57 | 0.24 | -0.32 | -0.80 | 0.12 | -1.05 | -0.76 | 0.64 | 0.33 | -0.50 | 0.30 | 0.00 | -0.82 | 1.17 | -0.06 | 0.58 | 0.41 | 0.59 | -0.09 | -0.62 | 0.65 | -0.13 | -1.07 | -0.05 | -0.20 | 0.00 | 0.66 | -0.64 | -0.42 |
| 0.47 | 0.60 | 0.92 | 0.25 | 0.93 | -0.51 | 0.67 | -0.18 | 0.31 | -0.69 | 0.33 | -0.64 | 0.45 | -0.10 | 0.59 | 0.63 | 0.86 | 1.00 | 0.54 | 0.02 | -0.21 | 0.21 | -0.42 | 0.11 | -0.82 | 0.00 | 0.79 | -0.57 | 0.67 | -0.74 | -0.51 | -0.42 | -0.37 | -0.04 | 0.51 | -1.08 | -0.40 | -0.02 | -0.32 | 0.36 | -1.62 | 0.82 |
| 0.21 | 0.32 | 0.15 | 0.15 | -0.42 | -0.22 | -0.71 | -0.50 | 0.25 | -0.27 | -0.39 | -0.02 | 0.91 | 0.25 | -0.43 | 0.37 | -0.87 | -0.36 | 0.49 | 1.19 | -0.26 | 1.18 | -0.53 | -0.07 | 1.17 | 0.79 | 0.00 | 0.50 | 0.80 | 0.40 | -0.28 | 0.56 | -0.61 | 0.45 | 0.36 | -0.16 | 0.76 | 0.30 | -0.21 | -0.31 | -0.60 | 0.03 |
| -0.05 | 0.57 | -0.52 | -0.11 | -0.20 | 0.40 | 0.91 | 0.68 | 1.04 | 0.53 | -0.06 | 0.61 | -0.74 | 0.75 | 0.37 | 0.18 | -0.21 | -0.58 | 0.43 | 0.77 | 1.06 | -0.72 | 0.09 | 0.77 | -0.06 | -0.57 | 0.50 | 0.00 | -0.29 | -0.32 | 0.30 | -0.20 | 0.12 | 0.76 | -0.21 | 0.31 | -0.95 | 0.51 | 0.02 | 0.93 | 0.16 | -0.57 |
| 1.26 | -0.64 | -1.17 | -1.06 | 0.71 | 0.66 | 0.24 | -0.11 | -0.09 | 0.32 | 0.39 | -0.28 | -0.48 | 0.67 | 0.03 | -0.13 | -0.83 | 0.56 | 1.14 | -0.77 | -0.31 | 0.01 | 0.33 | -0.69 | 0.58 | 0.67 | 0.80 | -0.29 | 0.00 | 0.26 | -0.17 | -0.61 | -0.21 | 0.24 | -0.77 | 0.22 | -0.29 | 0.02 | -0.18 | 1.00 | 0.24 | 0.95 |
| 0.60 | -0.49 | 0.46 | 0.24 | 0.43 | 0.39 | 0.1 | -0.46 | 0.12 | -1.31 | -0.53 | 0.21 | 0.48 | 0.26 | -0.1 | -0.30 | 0.02 | -0.14 | 0.34 | -0.58 | -0.22 | 0.71 | 0.17 | 0.16 | 0.41 | -0.74 | 0.40 | -0.32 | 0.26 | 0.00 | -0.34 | -0.44 | -0.02 | -0.54 | 0.84 | -0.63 | 0.53 | 0.67 | 0.43 | -0.50 | -1.49 | -0.02 |
| 0.08 | -0.37 | 1.12 | 0.59 | -0.44 | -1.41 | 0.30 | 1.04 | 0.94 | 0.82 | 0.09 | -0.41 | -0.30 | 1.02 | 0.46 | 0.96 | 0.33 | 0.72 | 0.34 | 0.22 | -0.33 | 0.94 | 0.21 | 0.10 | 0.59 | -0.51 | -0.28 | 0.30 | -0.17 | -0.34 | 0.00 | 0.19 | -0.71 | 0.00 | 1.04 | 0.72 | -0.75 | 0.89 | 0.48 | -0.83 | -0.42 | -0.90 |
| -1.20 | -0.20 | 0.44 | 0.42 | 0.28 | -0.1 | -0.86 | 0.56 | 0.81 | 0.97 | 1.29 | -1.12 | 0.43 | -0.33 | 0.38 | 0.97 | 1.15 | 0.38 | 0.74 | 0.12 | 0.76 | -0.89 | 0.08 | -0.09 | -0.09 | -0.42 | 0.56 | -0.20 | -0.61 | 0.44 | 0.19 | 0.00 | 0.60 | -0.61 | 0.21 | -0.30 | 0.74 | 0.23 | -0.70 | 0.31 | -0.21 | -0.28 |
| 0.67 | 0.19 | -0.66 | 0.37 | 1.34 | 1.15 | -1.27 | 0.42 | -0.57 | 0.02 | 0.38 | -0.04 | 1.37 | -0.34 | -0.98 | 0.01 | 0.76 | -0.40 | -0.54 | 0.15 | -0.66 | 0.24 | 0.83 | -0.38 | -0.62 | -0.37 | -0.61 | 0.12 | -0.21 | -0.02 | -0.71 | 0.60 | 0.00 | 1.20 | 0.13 | 0.94 | 0.91 | -0.38 | -0.68 | -0.13 | -0.83 | -0.15 |
| 0.73 | -0.83 | 0.15 | 0.33 | 0.33 | 0.84 | 0.07 | -0.37 | -0.79 | 0.42 | -1.14 | 0.80 | 0.51 | 0.98 | -0.39 | 0.59 | 0.14 | 0.10 | 0.61 | 0.51 | 0.92 | -0.60 | -0.28 | -0.89 | 0.65 | -0.04 | 0.45 | 0.76 | 0.24 | -0.54 | 0.00 | -0.61 | 1.20 | 0.00 | -0.15 | 0.34 | 0.53 | 0.85 | 0.59 | -0.04 | -0.08 | -0.74 |
| -0.02 | 0.08 | 0.53 | -0.07 | 0.61 | 0.58 | 0.25 | -0.14 | 0.94 | 0.60 | -0.60 | 0.92 | -0.74 | 0.70 | -0.23 | 0.41 | 0.49 | -0.01 | 0.90 | 1.09 | 1.26 | 1.28 | -0.32 | -0.93 | -0.13 | 0.51 | 0.36 | -0.21 | -0.77 | 0.84 | 1.04 | 0.21 | 0.13 | -0.15 | 0.00 | -0.42 | 0.27 | 0.30 | -0.70 | -0.16 | 0.01 | -0.06 |
| 0.27 | 0.51 | 1.25 | 1.07 | 0.02 | 0.50 | 0.50 | 0.16 | -0.81 | 0.20 | 1.35 | -1.14 | -0.91 | -0.91 | 0.32 | -0.68 | 0.90 | 0.12 | 0.25 | 0.11 | 0.34 | -0.74 | -0.54 | 1.17 | -1.07 | -1.08 | -0.16 | 0.31 | 0.22 | -0.63 | 0.72 | -0.30 | 0.94 | 0.34 | -0.47 | 0.00 | -0.76 | 0.50 | 0.42 | 0.56 | 0.18 | -0.07 |
| -1.07 | -0.05 | -0.15 | 0.54 | -0.28 | 0.09 | 0.54 | -0.08 | 0.10 | 0.90 | 0.03 | -0.62 | -0.07 | 0.15 | -1.18 | -0.37 | 0.28 | 1.05 | -0.56 | 0.32 | 0.29 | 0.02 | -0.83 | 1.00 | -0.05 | -0.40 | 0.76 | -0.95 | -0.29 | 0.53 | -0.75 | 0.74 | 0.91 | 0.53 | 0.27 | -0.76 | 0.00 | 0.93 | 1.57 | 0.20 | 0.62 | 0.15 |
| -0.56 | 1.14 | 0.07 | 0.27 | -0.56 | -0.18 | 0.71 | -0.17 | -0.74 | -0.84 | 0.95 | 0.90 | -0.33 | 0.45 | -0.41 | 0.67 | 0.38 | 1.38 | -0.52 | -0.47 | 0.30 | -0.76 | 0.27 | -0.36 | -0.20 | -0.02 | 0.30 | 0.51 | 0.02 | 0.67 | 0.89 | 0.23 | -0.38 | 0.85 | 0.30 | 0.50 | 0.93 | 0.00 | -0.04 | 1.26 | 0.23 | 0.17 |
| 0.32 | -0.40 | 0.53 | 0.50 | 0.70 | 0.12 | -0.47 | 0.34 | 0.67 | 0.69 | -0.28 | -0.49 | 0.92 | 0.04 | 0.45 | -0.17 | 0.44 | 0.12 | -0.87 | -0.64 | 0.11 | -0.33 | -0.21 | 1.15 | 0.00 | -0.32 | -0.21 | 0.02 | -0.18 | 0.43 | 0.40 | -0.70 | -0.68 | 0.59 | -0.70 | 0.42 | 1.57 | -0.04 | 0.00 | 0.37 | 1.10 | 0.18 |
| 0.33 | -0.36 | -0.01 | 0.46 | 0.09 | 0.34 | 0.26 | 0.02 | -0.22 | 0.60 | -0.33 | -0.74 | 1.04 | -0.70 | 0.74 | 0.70 | 0.66 | 0.93 | 0.83 | 0.37 | -0.27 | 0.53 | 0.16 | -0.29 | 0.66 | 0.36 | -0.31 | 0.93 | 1.00 | -0.50 | -0.83 | 0.31 | -0.13 | -0.04 | -0.16 | 0.56 | 0.20 | 1.26 | 0.37 | 0.00 | 0.06 | -1.14 |
| -0.44 | 1.37 | -0.29 | 0.06 | -0.58 | -0.72 | 0.53 | 0.25 | 0.28 | 0.13 | 0.10 | -1.72 | -0.92 | 0.22 | 0.07 | -1.14 | 0.52 | -0.39 | 0.34 | 0.05 | -0.57 | -0.33 | 0.15 | 0.34 | -0.64 | -1.62 | -0.60 | 0.16 | 0.24 | -1.49 | -0.42 | -0.21 | -0.83 | -0.08 | 0.01 | 0.18 | 0.62 | 0.23 | 1.10 | 0.06 | 0.00 | 0.42 |
| -0.17 | 0.80 | -0.57 | 1.10 | 0.32 | 0.41 | 0.17 | 0.08 | 0.82 | 0.82 | 0.41 | -0.53 | -0.68 | 0.37 | 0.60 | 1.02 | 0.21 | -0.16 | -1.05 | -0.18 | 0.44 | -0.86 | 0.17 | -0.82 | -0.42 | 0.82 | 0.03 | -0.57 | 0.95 | -0.02 | -0.90 | -0.28 | -0.15 | -0.74 | -0.06 | -0.07 | 0.15 | 0.17 | 0.18 | -1.14 | 0.42 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.54 | 0.05 | -0.61 | -0.29 | -0.18 | 0.98 | -0.14 | 0.53 | 0.73 | 0.66 | -0.36 | 0.38 | 0.54 | -0.46 | 0.49 | 0.65 | -0.32 | 0.65 | 0.16 | -0.08 | -0.14 | 0.16 | -0.12 | -0.28 | -0.88 | 0.54 | 0.01 | 0.57 | -0.30 | -0.04 | 1.06 | 0.22 | -0.98 | 0.73 | 0.03 | 1.02 | 0.50 | 0.39 | -0.90 | -1.12 | -1.17 | -0.43 |
| 1.00 | -0.09 | -1.18 | -0.90 | -0.16 | 0.72 | 0.45 | -0.13 | 0.71 | -1.11 | -0.76 | -0.57 | -0.11 | -0.23 | 0.54 | 0.67 | 0.19 | 1.02 | 0.59 | 0.18 | 0.54 | 0.38 | 0.21 | 0.35 | 0.15 | -0.11 | 0.30 | -0.51 | 0.24 | 0.54 | -1.72 | 0.82 | -0.25 | 0.12 | -0.29 | 1.04 | 0.36 | 0.86 | 0.38 | -0.61 | 0.08 | 0.14 |
| -0.14 | 0.94 | 0.18 | -1.28 | 1.04 | 0.33 | -0.83 | -0.60 | 0.52 | -0.12 | 0.27 | -0.21 | -0.60 | 0.83 | 0.01 | -0.03 | 1.14 | 0.67 | -0.47 | -0.23 | 0.97 | 0.52 | 0.71 | 0.85 | -0.87 | -0.87 | -0.01 | 0.49 | -0.65 | -0.23 | -0.14 | 0.86 | 0.11 | 0.52 | 0.60 | -0.27 | 0.56 | -0.31 | 0.18 | 0.98 | 0.17 | -0.97 |
| 0.55 | 0.43 | -0.89 | 0.72 | 0.56 | -0.34 | 0.16 | 0.01 | -0.29 | 0.50 | 0.87 | 0.69 | 0.97 | 0.54 | 0.50 | -0.76 | -0.51 | 0.71 | 1.10 | -0.54 | 0.41 | 0.97 | -0.49 | 0.46 | -0.11 | 0.48 | -0.02 | 0.91 | -0.05 | -0.27 | 0.52 | 0.17 | 0.36 | 0.52 | 0.59 | 0.00 | -0.06 | 0.80 | 1.07 | 0.37 | -0.33 | 0.77 |
| 0.14 | -0.02 | 0.27 | 0.33 | -0.00 | 0.86 | -0.63 | 0.66 | 0.25 | -0.1 | 0.05 | 0.58 | -0.29 | -0.65 | 0.08 | 0.38 | 0.35 | -0.41 | 0.53 | -0.86 | -0.45 | -0.18 | 0.84 | -0.11 | 0.13 | 0.00 | 1.01 | -0.77 | 0.81 | 1.40 | -0.66 | 0.21 | -0.28 | 1.01 | -0.09 | -0.03 | 0.03 | -0.36 | 0.63 | -0.02 | -0.05 | 0.21 |
| 0.89 | -0.96 | 0.69 | 0.78 | 0.44 | 0.50 | 0.06 | 0.55 | 0.55 | -0.54 | 0.73 | -0.32 | 0.44 | -0.01 | 1.40 | -0.28 | -0.70 | -0.06 | 0.50 | 0.55 | -0.03 | 0.19 | 0.54 | -1.12 | 0.76 | -0.33 | -0.20 | 0.40 | -0.68 | 0.66 | 0.33 | -0.67 | -0.97 | 0.09 | -0.43 | 0.89 | -0.53 | 0.79 | 0.10 | -0.78 | 0.42 | 0.31 |
| 0.91 | -0.06 | 0.57 | 0.73 | 0.47 | -0.49 | 0.34 | 0.62 | 0.25 | -0.21 | 1.00 | 0.24 | 0.24 | -0.08 | -0.28 | -0.18 | 1.09 | -0.76 | -0.18 | -0.76 | 0.32 | 0.64 | 0.26 | -1.19 | 0.13 | 0.00 | -0.96 | 0.54 | 0.04 | -0.12 | -0.21 | 0.47 | 0.06 | -0.04 | 0.07 | 0.71 | 0.51 | 0.40 | 0.28 | -0.16 | -0.39 | -0.09 |
| 0.00 | 1.30 | 0.35 | -0.32 | 0.24 | -0.04 | -0.13 | 0.50 | 0.13 | -1.24 | 0.38 | -0.43 | 1.05 | -0.24 | 0.72 | -0.04 | 0.32 | 0.26 | 0.48 | -0.98 | -0.08 | -0.68 | 0.22 | -0.51 | -0.68 | 0.28 | 0.07 | 0.19 | 1.60 | 0.75 | 0.22 | -1.07 | 0.46 | 0.59 | 0.15 | 0.40 | -0.94 | 0.42 | 0.19 | 0.20 | 0.85 | -0.43 |
| 1.30 | 0.00 | 0.19 | 0.28 | -0.25 | 0.60 | 0.80 | -0.06 | 0.31 | -0.62 | 0.11 | 0.35 | 0.50 | -0.22 | 0.50 | 0.14 | 0.41 | 0.73 | -0.97 | -0.50 | -0.17 | -0.01 | 0.44 | 1.16 | 0.03 | 0.19 | 0.04 | 0.21 | -0.08 | -0.12 | -0.02 | 0.16 | -0.24 | -1.18 | 0.48 | 0.86 | 0.30 | 1.50 | -0.75 | -0.71 | 0.75 | 0.32 |
| 0.35 | 0.19 | 0.00 | 1.02 | -0.09 | 0.11 | -0.61 | 0.39 | 0.07 | 0.25 | 0.40 | -1.33 | -0.63 | -0.40 | -0.84 | 0.88 | -0.50 | -0.59 | -1.03 | 0.62 | 1.33 | 0.56 | 0.44 | -0.04 | 0.57 | 1.07 | 0.25 | -0.41 | -1.49 | 0.35 | 1.02 | 0.34 | -0.48 | 0.25 | 0.39 | 1.15 | -0.24 | -0.03 | 0.62 | 0.09 | 0.08 | -0.35 |
| -0.32 | 0.28 | 1.02 | 0.00 | -0.26 | 0.47 | 0.71 | -0.72 | 0.76 | -0.16 | 1.25 | -0.73 | -0.09 | -0.65 | 0.51 | 0.26 | 0.86 | 0.69 | -0.25 | 0.28 | 0.54 | 0.23 | 0.51 | -0.25 | 0.83 | 0.31 | 0.15 | -0.10 | -1.28 | 0.23 | 0.59 | 0.42 | 0.45 | 0.33 | -0.11 | 1.07 | 0.54 | 0.27 | 0.50 | 0.46 | 0.33 | 1.23 |
| 0.24 | -0.25 | -0.09 | -0.26 | 0.00 | -0.46 | 0.66 | -0.89 | -0.25 | 0.43 | -0.36 | 0.22 | -0.49 | -0.67 | -0.67 | 0.12 | -0.39 | -0.74 | 0.19 | -0.97 | 0.67 | -0.34 | 0.45 | -0.74 | -1.07 | 0.98 | -0.42 | -0.20 | 0.49 | 0.42 | -0.44 | 0.28 | 1.42 | 0.33 | 0.57 | 0.02 | -0.28 | -0.56 | 0.70 | 0.09 | -0.31 | 0.45 |
| -0.04 | 0.60 | 0.11 | 0.47 | -0.46 | 0.00 | 0.21 | 0.75 | 0.15 | -0.46 | -1.13 | 1.42 | 0.77 | 0.30 | -0.40 | -0.09 | -0.39 | -0.60 | 1.02 | 0.14 | 0.28 | 0.97 | 1.07 | -0.10 | -0.41 | -0.46 | -0.22 | 0.41 | 0.45 | 0.38 | -1.41 | -0.1 | 1.23 | 0.84 | 0.54 | 0.50 | 0.09 | -0.18 | 0.12 | 0.34 | -0.45 | 0.53 |
| -0.13 | 0.80 | -0.61 | 0.71 | 0.66 | 0.21 | 0.00 | 0.89 | -0.64 | -1.07 | 0.42 | -0.48 | 0.80 | 0.90 | 0.05 | 0.17 | -0.22 | 0.80 | -0.66 | 1.01 | 1.13 | 0.68 | -0.29 | 0.61 | -0.54 | 0.61 | -0.71 | 0.90 | 0.45 | 0.12 | 0.30 | -0.86 | -1.34 | 0.07 | 0.29 | 0.50 | 0.54 | 0.71 | -0.47 | 0.26 | 0.26 | 0.04 |
| 0.50 | -0.06 | -0.39 | -0.72 | -0.89 | 0.75 | 0.89 | 0.00 | 0.34 | -0.07 | 0.60 | 0.33 | -0.09 | 0.64 | -0.60 | 0.89 | -0.57 | -0.15 | -0.81 | -0.08 | 0.54 | 0.19 | 0.59 | 0.19 | -0.43 | -0.23 | -0.50 | 0.67 | 0.11 | -0.44 | 1.04 | 0.56 | 0.35 | -0.37 | -0.1 | 0.16 | -0.08 | -0.17 | 0.34 | 0.02 | -0.02 | -0.04 |
| 0.13 | 0.31 | -0.07 | 0.76 | -0.25 | 0.15 | -0.64 | 0.34 | 0.00 | -0.83 | 0.65 | 0.78 | 0.38 | 0.43 | 0.94 | -0.05 | -0.79 | -1.03 | -0.45 | 0.76 | 0.94 | -0.12 | 0.18 | -0.23 | 0.91 | 0.43 | 0.32 | 1.11 | -0.37 | 0.04 | 0.87 | 0.74 | -0.42 | -0.72 | 0.84 | -0.87 | 0.04 | -0.81 | 0.73 | -0.15 | 0.61 | 1.02 |
| -1.24 | -0.62 | 0.25 | -0.16 | 0.43 | -0.46 | -1.07 | -0.07 | -0.83 | 0.00 | -0.29 | -0.14 | -0.09 | 0.29 | -0.44 | 0.04 | -0.52 | -0.29 | -0.63 | 0.45 | 0.54 | -0.61 | 0.08 | -1.14 | 0.73 | -0.53 | -0.17 | 0.63 | 0.01 | -1.42 | 0.72 | 0.87 | 0.20 | 0.52 | 0.46 | 0.10 | 0.80 | -0.94 | 0.79 | 0.69 | 0.50 | 1.04 |
| 0.38 | -0.11 | 0.40 | 1.25 | -0.36 | -1.13 | 0.42 | 0.60 | 0.65 | -0.29 | 0.00 | -1.53 | -1.20 | 0.76 | 0.21 | -0.12 | 0.46 | -0.12 | 0.23 | -0.44 | 0.74 | 0.11 | -1.18 | 0.40 | -0.45 | 0.27 | -0.39 | -0.07 | 0.60 | -0.51 | 0.09 | 1.29 | 0.30 | -1.14 | -0.56 | 1.35 | 0.03 | 0.95 | -0.28 | -0.33 | -0.17 | 0.28 |
| -0.43 | 0.35 | -1.33 | -0.73 | 0.22 | 1.42 | -0.48 | 0.33 | 0.78 | -0.14 | -1.53 | 0.00 | 0.18 | 0.75 | -0.11 | 0.43 | 0.38 | 0.49 | -0.32 | -0.30 | -0.58 | 0.77 | -0.23 | 0.68 | -0.62 | -0.55 | 0.01 | 0.65 | -0.53 | 0.16 | -0.44 | -1.16 | 0.07 | 0.83 | 0.84 | -1.17 | -0.65 | 0.87 | -0.46 | -0.71 | -1.42 | -0.37 |
| 1.05 | -0.50 | -0.63 | -0.09 | -0.49 | 0.77 | 0.80 | -0.09 | 0.38 | -0.09 | -1.20 | 0.18 | 0.00 | -0.17 | 0.53 | -0.48 | -0.17 | 0.78 | 0.38 | 0.62 | -0.88 | -0.71 | -0.18 | -0.39 | 0.04 | 0.51 | 0.91 | -0.73 | -0.69 | 0.46 | -0.30 | 0.43 | 1.45 | 0.51 | -0.78 | -0.91 | -0.07 | -0.33 | 0.92 | 1.04 | -0.65 | -0.55 |
| -0.24 | -0.22 | -0.40 | -0.65 | -0.67 | 0.30 | 0.90 | 0.64 | 0.43 | 0.29 | 0.76 | 0.75 | -0.17 | 0.00 | -0.45 | 0.14 | 0.85 | 0.67 | -0.12 | 0.94 | 0.66 | -0.10 | 0.27 | 0.44 | 0.53 | -0.19 | 0.21 | 0.70 | 0.92 | 0.31 | 1.06 | -0.29 | -0.46 | 0.94 | 0.78 | -0.87 | 0.19 | -0.41 | -0.00 | -0.74 | -0.09 | 0.20 |
| 0.72 | -0.50 | -0.84 | 0.51 | -0.67 | -0.40 | 0.05 | -0.80 | 0.94 | -0.44 | 0.21 | -0.11 | 0.53 | -0.45 | 0.00 | 0.91 | -0.10 | 0.98 | -0.47 | 0.38 | 1.23 | -0.27 | 0.71 | -0.16 | 0.26 | 0.66 | -0.41 | 0.39 | -0.20 | -0.13 | 0.44 | 0.36 | -0.89 | -0.37 | -0.29 | 0.30 | -1.20 | -0.43 | 0.47 | 0.76 | 0.36 | 0.75 |
| -0.04 | 0.14 | 0.88 | -0.26 | 0.12 | -0.09 | 0.17 | 0.89 | -0.05 | 0.04 | -0.12 | 0.43 | -0.48 | 0.14 | 0.91 | 0.00 | -0.31 | -0.56 | 0.79 | 1.35 | 0.02 | -0.21 | 0.93 | 0.03 | -0.32 | 0.69 | 0.37 | 0.18 | -0.34 | -0.31 | 0.96 | 0.97 | 0.09 | 0.59 | 0.37 | -0.68 | -0.37 | 0.67 | -0.17 | 0.70 | -0.87 | 1.15 |
| 0.32 | 0.41 | -0.50 | 0.86 | -0.39 | -0.39 | -0.22 | -0.57 | -0.79 | -0.52 | 0.46 | 0.38 | -0.17 | 0.85 | -0.10 | -0.31 | 0.00 | 0.25 | 0.67 | 0.56 | -0.12 | -0.61 | 0.20 | -0.93 | -0.80 | 0.81 | -0.87 | -0.22 | -0.61 | 0.04 | 0.33 | 1.15 | 0.68 | 0.14 | 0.53 | 0.90 | 0.28 | 0.38 | 0.44 | 0.66 | 0.24 | 0.08 |
| 0.26 | 0.73 | -0.59 | 0.69 | -0.74 | -0.60 | 0.80 | -0.15 | -1.03 | -0.29 | -0.12 | 0.49 | 0.78 | 0.67 | 0.98 | -0.56 | 0.25 | 0.00 | 0.04 | -0.61 | 0.54 | -0.08 | 0.32 | -0.70 | 0.12 | 0.95 | -0.36 | -0.59 | 0.77 | -0.12 | 0.72 | 0.38 | -0.48 | 0.10 | 0.03 | 0.12 | 1.05 | 1.38 | 0.12 | 0.93 | -0.66 | -0.29 |
| -0.48 | -0.97 | -1.03 | -0.25 | 0.19 | 1.02 | -0.66 | -0.81 | -0.45 | -0.63 | 0.23 | -0.32 | 0.38 | -0.12 | -0.47 | 0.79 | 0.67 | 0.04 | 0.00 | 0.13 | -0.69 | -0.28 | 0.98 | -0.74 | -0.99 | 0.66 | 0.56 | 0.50 | 0.86 | 0.26 | -0.40 | 0.67 | -0.39 | 0.67 | 0.80 | 0.18 | -0.63 | -0.59 | -0.81 | 0.90 | 0.67 | -0.85 |
| -0.98 | -0.58 | 0.62 | 0.28 | -0.97 | 0.14 | 1.01 | -0.08 | 0.76 | 0.45 | -0.44 | -0.30 | 0.62 | 0.94 | 0.38 | 1.35 | 0.56 | 0.61 | 0.13 | 0.00 | -0.41 | 1.07 | -0.67 | 0.82 | -0.76 | 0.08 | 1.19 | 0.77 | -0.98 | -0.59 | 0.22 | 0.12 | 0.23 | 0.51 | 1.04 | 0.11 | 0.32 | -0.47 | -0.64 | 0.37 | 0.32 | -0.05 |
| -0.08 | -0.17 | -1.33 | 0.54 | 0.67 | 0.28 | 1.13 | 0.54 | 0.94 | 0.54 | 0.74 | -0.58 | -0.88 | 0.66 | 1.23 | 0.02 | -0.12 | 0.54 | -0.69 | -0.41 | 0.00 | 0.73 | 0.81 | -0.85 | 0.64 | -0.26 | -0.26 | 1.05 | -0.10 | -0.21 | -0.33 | 0.76 | -0.74 | 0.92 | 1.30 | 0.34 | 0.29 | 0.30 | 0.11 | -0.27 | -0.84 | 0.31 |
| -0.68 | -0.01 | 0.56 | 0.23 | -0.34 | 0.97 | 0.68 | 0.19 | -0.12 | -0.61 | 0.11 | 0.77 | -0.71 | -0.10 | -0.27 | -0.21 | -0.61 | -0.08 | -0.28 | 1.07 | 0.73 | 0.00 | 0.82 | 0.38 | 0.44 | 0.37 | 1.29 | -0.61 | -0.30 | 0.59 | 0.84 | -0.99 | 0.42 | -0.50 | 1.13 | -0.85 | -0.09 | -0.86 | -0.23 | 0.64 | 0.04 | -0.63 |
| 0.22 | 0.44 | 0.44 | 0.51 | 0.45 | 1.07 | -0.29 | 0.59 | 0.18 | 0.08 | -1.18 | -0.23 | -0.18 | 0.27 | 0.71 | 0.93 | 0.20 | 0.32 | 0.98 | -0.67 | 0.81 | 0.82 | 0.00 | 1.39 | -0.50 | -0.36 | -0.53 | 0.09 | 0.11 | 0.15 | 0.21 | 0.08 | 0.91 | -0.28 | -0.36 | -0.54 | -0.83 | 0.27 | -0.71 | 0.16 | 0.42 | 0.30 |
| -0.51 | -1.16 | -0.04 | -0.25 | -0.24 | -0.10 | 0.61 | 0.19 | -0.23 | -1.14 | 0.40 | 0.68 | -0.39 | 0.44 | -0.16 | 0.03 | -0.93 | -0.70 | -0.74 | 0.82 | -0.85 | 0.38 | 1.39 | 0.00 | 0.30 | 0.16 | -0.07 | 0.77 | -0.91 | 0.15 | 0.10 | -0.09 | -0.30 | -0.89 | -0.97 | 1.17 | 1.00 | -0.36 | 1.15 | -0.29 | 0.61 | -0.70 |
| -0.68 | 0.03 | 0.57 | 0.83 | -1.07 | -0.41 | -0.54 | -0.43 | 0.91 | 0.73 | -0.45 | -0.62 | 0.04 | 0.53 | 0.26 | -0.32 | -0.80 | 0.12 | -0.99 | -0.76 | 0.64 | 0.44 | -0.50 | 0.30 | 0.00 | -0.76 | 1.17 | -0.05 | 0.36 | 0.40 | 0.59 | -0.09 | -0.54 | 0.65 | -0.17 | -1.07 | -0.05 | -0.20 | 0.00 | 0.46 | -0.37 | -0.30 |
| 0.28 | 0.19 | 1.07 | 0.31 | 0.98 | -0.46 | 0.61 | -0.23 | 0.43 | -0.53 | 0.27 | -0.55 | 0.51 | -0.19 | 0.66 | 0.69 | 0.81 | 0.95 | 0.66 | 0.08 | -0.26 | 0.37 | -0.36 | 0.16 | -0.76 | 0.00 | 0.84 | -0.51 | 0.41 | -0.81 | -0.56 | -0.47 | -0.24 | 0.01 | 0.42 | -1.14 | -0.45 | -0.07 | 0.26 | 0.42 | -1.30 | 1.00 |
| 0.07 | -0.04 | 0.25 | 0.15 | -0.42 | -0.22 | -0.71 | -0.50 | 0.32 | -0.17 | -0.39 | 0.01 | 0.91 | 0.21 | -0.41 | 0.37 | -0.87 | -0.36 | 0.56 | 1.19 | -0.26 | 1.29 | -0.53 | -0.07 | 1.17 | 0.84 | 0.00 | 0.51 | 0.59 | 0.39 | -0.28 | 0.56 | -0.53 | 0.45 | 0.32 | -0.16 | 0.76 | 0.30 | -0.21 | -0.31 | -0.33 | 0.16 |
| -0.19 | 0.21 | -0.41 | -0.10 | -0.20 | 0.41 | 0.90 | 0.67 | 1.11 | 0.63 | -0.07 | 0.65 | -0.73 | 0.70 | 0.39 | 0.18 | -0.22 | -0.59 | 0.50 | 0.77 | 1.05 | -0.61 | 0.09 | 0.77 | -0.05 | -0.51 | 0.51 | 0.00 | -0.51 | -0.34 | 0.29 | -0.20 | 0.20 | 0.76 | -0.26 | 0.31 | -0.96 | 0.50 | 0.03 | 0.94 | 0.43 | -0.44 |
| 1.60 | -0.08 | -1.48 | -1.28 | 0.49 | 0.45 | 0.45 | 0.11 | -0.37 | 0.01 | 0.60 | -0.53 | -0.69 | 0.92 | -0.70 | -0.34 | -0.61 | 0.77 | 0.86 | -0.98 | -0.10 | -0.30 | 0.11 | -0.91 | 0.36 | 0.41 | 0.59 | -0.51 | 0.00 | 0.49 | 0.04 | -0.40 | -0.50 | 0.02 | -0.52 | 0.43 | -0.08 | 0.23 | -0.40 | 0.79 | -0.24 | 0.61 |
| 0.75 | -0.12 | 0.35 | 0.23 | 0.42 | 0.38 | 0.12 | -0.44 | 0.04 | -1.42 | -0.51 | 0.16 | 0.46 | 0.31 | -0.13 | -0.31 | 0.04 | -0.12 | 0.26 | -0.59 | -0.21 | 0.59 | 0.15 | 0.15 | 0.40 | -0.81 | 0.39 | -0.34 | 0.49 | 0.00 | -0.32 | -0.42 | -0.12 | -0.56 | 0.89 | -0.62 | 0.54 | 0.68 | 0.42 | -0.52 | -1.77 | -0.17 |
| 0.22 | -0.02 | 1.02 | 0.59 | -0.44 | -1.41 | 0.30 | 1.04 | 0.87 | 0.72 | 0.09 | -0.44 | -0.30 | 1.06 | 0.44 | 0.96 | 0.33 | 0.72 | -0.40 | 0.22 | -0.33 | 0.84 | 0.21 | 0.10 | 0.59 | -0.56 | -0.28 | 0.29 | 0.04 | -0.32 | 0.00 | 0.19 | -0.78 | 0.00 | 1.08 | 0.72 | -0.75 | 0.89 | 0.48 | -0.83 | -0.69 | -1.03 |
| -1.07 | 0.16 | 0.34 | 0.42 | 0.28 | -0.1 | -0.86 | 0.56 | 0.74 | 0.87 | 1.29 | -1.16 | 0.43 | -0.29 | 0.36 | 0.97 | 1.15 | 0.38 | 0.67 | 0.12 | 0.76 | -0.99 | 0.08 | -0.09 | -0.09 | -0.47 | 0.56 | -0.20 | -0.40 | -0.42 | 0.19 | 0.00 | 0.52 | -0.61 | 0.25 | -0.30 | 0.74 | 0.23 | -0.70 | 0.31 | -0.48 | -0.41 |
| 0.46 | -0.24 | 0.48 | 0.45 | 1.42 | 1.23 | -1.34 | 0.35 | -0.42 | 0.20 | 0.30 | 0.07 | 1.45 | -0.46 | -0.89 | 0.09 | 0.68 | -0.48 | -0.39 | 0.23 | -0.74 | 0.42 | 0.91 | -0.30 | -0.54 | -0.24 | -0.53 | 0.20 | -0.50 | -0.12 | -0.78 | 0.52 | 0.00 | 1.28 | 0.01 | 0.86 | 0.83 | -0.46 | -0.60 | -0.05 | -0.48 | 0.05 |
| 0.59 | -1.18 | 0.25 | 0.33 | 0.33 | 0.84 | 0.07 | -0.37 | -0.72 | 0.52 | -1.14 | 0.83 | 0.51 | 0.94 | -0.37 | 0.59 | 0.14 | 0.10 | 0.67 | 0.51 | 0.92 | -0.50 | -0.28 | -0.89 | 0.65 | 0.01 | 0.45 | 0.76 | 0.02 | -0.56 | 0.00 | 0.61 | 1.28 | 0.00 | -0.19 | 0.34 | 0.53 | 0.85 | 0.59 | -0.04 | 0.19 | -0.62 |
| 0.15 | 0.48 | 0.39 | -0.11 | 0.57 | 0.54 | 0.29 | -0.1 | 0.84 | 0.46 | -0.56 | 0.84 | -0.78 | 0.78 | -0.29 | 0.37 | 0.53 | 0.03 | 0.80 | 1.04 | 1.30 | 1.13 | -0.36 | -0.97 | -0.17 | 0.42 | 0.32 | -0.26 | -0.52 | 0.89 | 1.08 | 0.25 | 0.01 | -0.19 | 0.00 | -0.38 | 0.31 | 0.34 | -0.74 | -0.20 | -0.30 | -0.23 |
| 0.40 | 0.86 | 1.15 | 1.07 | 0.02 | 0.50 | 0.50 | 0.16 | -0.87 | 0.10 | 1.35 | -1.17 | -0.91 | -0.87 | 0.30 | -0.68 | 0.90 | 0.12 | 0.18 | 0.11 | 0.34 | -0.85 | -0.54 | 1.17 | -1.07 | -1.14 | -0.16 | 0.31 | 0.43 | -0.62 | 0.72 | -0.30 | 0.86 | 0.34 | -0.38 | 0.00 | -0.76 | 0.50 | 0.42 | 0.56 | -0.09 | -0.20 |
| -0.94 | 0.30 | -0.24 | 0.54 | -0.28 | 0.09 | 0.54 | -0.08 | 0.04 | 0.80 | 0.03 | -0.65 | -0.07 | 0.19 | -1.20 | -0.37 | 0.28 | 1.05 | -0.63 | 0.32 | 0.29 | -0.09 | -0.83 | 1.00 | -0.05 | -0.45 | 0.76 | -0.96 | -0.08 | 0.54 | -0.75 | 0.74 | 0.83 | 0.53 | 0.31 | -0.76 | 0.00 | 0.93 | 1.57 | 0.20 | 0.35 | 0.02 |
| -0.42 | 1.50 | -0.03 | 0.27 | -0.56 | -0.18 | 0.71 | -0.17 | -0.81 | -0.94 | 0.95 | 0.87 | -0.33 | -0.41 | -0.43 | 0.67 | 0.38 | 1.38 | -0.59 | -0.47 | 0.30 | -0.86 | 0.27 | -0.36 | -0.20 | -0.07 | 0.30 | 0.50 | 0.23 | 0.68 | 0.89 | 0.23 | -0.46 | 0.85 | 0.34 | 0.50 | 0.93 | 0.00 | -0.04 | 1.26 | -0.04 | 0.04 |
| 0.19 | -0.75 | 0.62 | 0.50 | 0.70 | 0.12 | -0.47 | 0.34 | 0.73 | 0.79 | -0.28 | -0.46 | 0.92 | -0.00 | 0.47 | -0.17 | 0.44 | 0.12 | -0.81 | -0.64 | 0.11 | -0.23 | -0.21 | 1.15 | 0.00 | -0.26 | -0.21 | 0.03 | -0.40 | 0.42 | 0.48 | -0.70 | -0.60 | 0.59 | -0.74 | 0.42 | 1.57 | -0.04 | 0.00 | 0.37 | 1.37 | 0.31 |
| 0.20 | -0.71 | 0.09 | 0.46 | 0.09 | 0.34 | 0.26 | 0.02 | -0.15 | 0.69 | -0.33 | -0.71 | 1.04 | -0.74 | 0.76 | 0.70 | 0.66 | 0.93 | 0.90 | 0.37 | 0.27 | 0.64 | 0.16 | -0.29 | 0.66 | 0.42 | -0.31 | 0.94 | 0.79 | -0.52 | -0.83 | 0.31 | -0.05 | -0.04 | -0.20 | 0.56 | 0.20 | 1.26 | 0.37 | 0.00 | 0.33 | -1.02 |
| -0.85 | 0.75 | 0.08 | 0.33 | -0.31 | -0.45 | 0.26 | -0.02 | 0.61 | 0.50 | -0.17 | -1.42 | -0.65 | -0.09 | 0.36 | -0.87 | 0.24 | -0.66 | 0.67 | 0.32 | -0.84 | 0.04 | 0.42 | 0.61 | -0.37 | -1.30 | -0.33 | 0.43 | -0.24 | -1.77 | -0.69 | -0.48 | -0.48 | 0.19 | -0.30 | -0.09 | 0.35 | -0.04 | 1.37 | 0.33 | 0.00 | 0.81 |
| -0.43 | 0.32 | 0.35 | 1.23 | 0.45 | 0.53 | 0.04 | -0.04 | 1.02 | 1.04 | 0.28 | -0.37 | -0.55 | 0.20 | 0.75 | 1.15 | 0.08 | -0.29 | -0.85 | -0.05 | 0.31 | -0.63 | 0.30 | -0.70 | -0.30 | 1.00 | 0.16 | -0.44 | 0.61 | -0.17 | -1.03 | -0.41 | 0.05 | -0.62 | -0.23 | -0.20 | 0.02 | 0.04 | 0.31 | -1.02 | 0.81 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.40 | 0.34 | -0.74 | -0.42 | -0.48 | 0.61 | -0.27 | 0.76 | 0.95 | 1.01 | 0.07 | 0.51 | -0.05 | -0.62 | 0.36 | 0.44 | -0.54 | 0.33 | 0.29 | 0.35 | -0.28 | 0.34 | -0.25 | -0.41 | 1.04 | 0.79 | 0.14 | 0.32 | -0.17 | 0.11 | 0.93 | 0.07 | -0.70 | 0.86 | 0.12 | 0.86 | 0.63 | 0.53 | -0.65 | -0.83 | -1.30 | -0.57 |
| 1.00 | 0.07 | -1.18 | -0.90 | -0.32 | 0.48 | 0.45 | -0.03 | 0.80 | -0.89 | -0.61 | -0.57 | -0.56 | -0.26 | 0.54 | 0.58 | 0.11 | 0.83 | 0.59 | 0.48 | 0.54 | -0.43 | 0.21 | 0.35 | 0.13 | 0.00 | 0.30 | -0.63 | -0.24 | 0.56 | -1.72 | 0.79 | -0.1 | 0.12 | -0.30 | -1.07 | 0.36 | 0.86 | 0.49 | -0.45 | 0.01 | 0.34 |
| -0.13 | 1.11 | 0.19 | 1.29 | 1.21 | 0.08 | -0.84 | -0.50 | 0.62 | 0.11 | -0.10 | -0.20 | -1.07 | 0.78 | 0.00 | 0.12 | 1.05 | 0.46 | -0.46 | 0.07 | 0.96 | 0.46 | -0.72 | 0.84 | -0.91 | -0.75 | 0.00 | 0.37 | -0.64 | -0.20 | -0.15 | 0.82 | 0.28 | 0.53 | 0.58 | -0.31 | 0.57 | -0.30 | -0.05 | 1.15 | 0.09 | -0.98 |
| 0.60 | 0.64 | -0.94 | 0.67 | 0.35 | -0.62 | 0.11 | 0.15 | -0.15 | 0.77 | 1.08 | 0.74 | 0.46 | 0.46 | 0.46 | -0.89 | -0.63 | 0.46 | 1.15 | -0.20 | 0.36 | 0.86 | -0.54 | 0.41 | -0.18 | 0.64 | 0.03 | 0.75 | 0.00 | -0.20 | 0.47 | 0.10 | 0.56 | 0.57 | -0.65 | -0.08 | -0.01 | 0.85 | 1.23 | 0.58 | -0.45 | 0.72 |
| 0.14 | 0.14 | 0.27 | 0.33 | -0.16 | 0.62 | -0.63 | 0.76 | 0.34 | 0.12 | 0.20 | 0.58 | -0.74 | -0.68 | 0.08 | 0.29 | 0.27 | -0.60 | 0.53 | -0.57 | -0.45 | -0.24 | 0.84 | -0.11 | 0.11 | 0.11 | 1.01 | 0.89 | 0.81 | 1.41 | -0.66 | 0.19 | -0.13 | 1.01 | -0.11 | -0.06 | 0.03 | -0.36 | 0.75 | 0.14 | -0.13 | 0.21 |
| 1.14 | -0.54 | 0.43 | 0.52 | 0.02 | -0.00 | -0.19 | 0.90 | 0.90 | -0.06 | 1.14 | -0.07 | -0.27 | 0.30 | 1.14 | 0.62 | -1.04 | -0.51 | 0.76 | 1.10 | -0.29 | -0.12 | 0.29 | 1.38 | 0.47 | 0.04 | 0.05 | 0.03 | -0.43 | 0.93 | 0.07 | -0.95 | -0.56 | 0.35 | 0.70 | 0.61 | -0.28 | 1.05 | 0.48 | -0.36 | 0.09 | 0.05 |
| 0.91 | -0.22 | 0.57 | 0.73 | 0.63 | -0.25 | 0.34 | 0.52 | 0.16 | -0.43 | 0.85 | 0.24 | 0.70 | -0.04 | -0.28 | -0.1 | 1.17 | -0.57 | -0.18 | -1.05 | 0.32 | 0.69 | 0.26 | -1.19 | 0.15 | -0.11 | -0.96 | 0.65 | 0.04 | -0.14 | 0.21 | 0.50 | -0.09 | 0.04 | 0.08 | 0.74 | 0.51 | 0.40 | -0.40 | -0.32 | -0.31 | -0.09 |
| 0.00 | 1.46 | 0.35 | -0.32 | 0.08 | -0.28 | -0.13 | 0.60 | 0.22 | -1.01 | 0.53 | -0.43 | 0.59 | -0.28 | 0.72 | 0.12 | 0.24 | 0.07 | 0.48 | -0.68 | -0.08 | -0.74 | 0.22 | -0.51 | -0.70 | 0.39 | 0.07 | -0.31 | 1.60 | 0.77 | 0.22 | -1.09 | 0.61 | 0.59 | 0.14 | 0.37 | -0.94 | -0.42 | 0.30 | 0.36 | -0.92 | -0.43 |
| 1.46 | 0.00 | 0.02 | 0.12 | -0.57 | 0.20 | 0.64 | 0.20 | 0.57 | -0.24 | 0.21 | 0.51 | 1.12 | -0.42 | 0.66 | -0.11 | 0.17 | 0.37 | -0.81 | -0.12 | -0.33 | -0.23 | 0.28 | -1.33 | -0.16 | 0.47 | 0.13 | -0.07 | 0.08 | 0.06 | -0.18 | -0.03 | 0.08 | -1.02 | 0.30 | 0.67 | 0.47 | 1.66 | -0.47 | -0.39 | 0.51 | 0.16 |
| 0.35 | 0.02 | 0.00 | 1.02 | 0.07 | 0.34 | -0.61 | -0.48 | -0.16 | 0.03 | 0.24 | -1.33 | -0.17 | -0.37 | -0.84 | 0.96 | -0.42 | -0.40 | -1.03 | 0.33 | -1.33 | 0.61 | 0.44 | -0.04 | 0.59 | 0.96 | 0.25 | -0.30 | -1.48 | 0.33 | 1.02 | 0.37 | 0.64 | 0.25 | 0.41 | 1.18 | -0.24 | -0.03 | 0.51 | -0.07 | 0.15 | -0.35 |
| -0.32 | 0.12 | 1.02 | 0.00 | -0.1 | 0.70 | 0.71 | -0.81 | 0.67 | -0.38 | 1.10 | -0.73 | 0.36 | -0.62 | 0.51 | -0.18 | 0.94 | 0.88 | -0.25 | -0.01 | 0.54 | 0.29 | 0.51 | -0.25 | 0.85 | 0.20 | 0.15 | 0.01 | -1.28 | 0.21 | 0.59 | 0.44 | 0.30 | 0.33 | -0.1 | 1.10 | 0.54 | 0.27 | 0.38 | 0.30 | 0.40 | 1.23 |
| 0.08 | -0.57 | 0.07 | -0.1 | 0.00 | -0.06 | 0.82 | -1.15 | -0.49 | 0.05 | -0.68 | 0.06 | 0.12 | -0.47 | -0.51 | 0.36 | -0.15 | -0.39 | 0.03 | -1.42 | 0.82 | -0.13 | 0.61 | -0.09 | -0.88 | 0.71 | -0.58 | 0.08 | 0.33 | 0.24 | -0.28 | 0.47 | 1.11 | 0.17 | 0.74 | 0.21 | -0.44 | -0.72 | 0.42 | -0.23 | -0.07 | 0.61 |
| -0.28 | 0.20 | 0.34 | 0.70 | -0.06 | 0.00 | 0.45 | 0.42 | -0.18 | -0.92 | -1.53 | 1.18 | 1.46 | 0.57 | -0.16 | 0.24 | -0.07 | -0.17 | 0.78 | -0.39 | 0.52 | 1.26 | 1.31 | 0.13 | -0.15 | -0.81 | -0.46 | 0.76 | 0.21 | 0.12 | -1.17 | 0.16 | 0.84 | 0.60 | 0.79 | 0.76 | -0.15 | -0.42 | -0.24 | -0.06 | -0.14 | 0.77 |
| -0.13 | 0.64 | -0.61 | 0.71 | 0.82 | 0.45 | 0.00 | 0.80 | -0.73 | -1.30 | 0.26 | -0.48 | 1.25 | 0.94 | 0.05 | 0.25 | -0.14 | 0.99 | -0.66 | 0.72 | 1.13 | 0.73 | -0.29 | 0.61 | -0.51 | 0.50 | -0.71 | 1.01 | 0.45 | 0.10 | 0.30 | -0.84 | -1.50 | 0.07 | 0.30 | 0.52 | 0.54 | 0.71 | -0.58 | 0.10 | 0.33 | 0.04 |
| 0.60 | 0.20 | -0.48 | -0.81 | -1.15 | 0.42 | 0.80 | 0.00 | 0.52 | 0.25 | 0.85 | 0.42 | -0.64 | 0.52 | -0.69 | 0.71 | -0.74 | -0.44 | -0.72 | 0.30 | 0.44 | 0.04 | 0.50 | 0.1 | -0.55 | -0.03 | -0.41 | 0.47 | 0.20 | -0.33 | 0.94 | 0.44 | 0.59 | -0.28 | -0.20 | 0.04 | 0.01 | -0.08 | 0.55 | 0.28 | -0.19 | -0.14 |
| 0.22 | 0.57 | -0.16 | 0.67 | -0.49 | -0.18 | -0.73 | 0.52 | 0.00 | -0.51 | 0.89 | 0.87 | -0.16 | 0.31 | 0.85 | -0.22 | -0.96 | -1.32 | -0.36 | 1.14 | 0.85 | -0.27 | 0.09 | -0.32 | 0.80 | 0.63 | 0.41 | 0.90 | -0.28 | 0.15 | 0.78 | 0.63 | -0.18 | -0.63 | 0.73 | -0.99 | 0.13 | -0.72 | 0.94 | 0.1 | 0.45 | 0.93 |
| -1.01 | -0.24 | 0.03 | -0.38 | 0.05 | -0.92 | -1.30 | 0.25 | -0.51 | 0.00 | 0.09 | 0.08 | -0.77 | 0.03 | -0.66 | -0.26 | -0.82 | -0.71 | -0.41 | 0.96 | 0.32 | -0.88 | -0.14 | -1.36 | 0.49 | -0.20 | 0.05 | 0.30 | 0.23 | -1.19 | 0.50 | 0.62 | 0.57 | 0.74 | 0.22 | -0.15 | 1.03 | -0.72 | 1.13 | 1.08 | 0.20 | 0.82 |
| 0.53 | 0.21 | 0.24 | 1.10 | -0.68 | -1.53 | 0.26 | 0.85 | 0.89 | 0.09 | 0.00 | -1.38 | -1.81 | 0.57 | 0.06 | -0.36 | 0.23 | -0.47 | 0.38 | 0.01 | 0.58 | -0.1 | -1.34 | 0.25 | -0.63 | 0.54 | -0.23 | -0.34 | 0.76 | -0.34 | -0.06 | 1.12 | 0.61 | -0.98 | -0.73 | 1.16 | 0.19 | 1.11 | -0.01 | -0.01 | -0.40 | 0.13 |
| -0.43 | 0.51 | -1.33 | -0.73 | 0.06 | 1.18 | -0.48 | 0.42 | 0.87 | 0.08 | -1.38 | 0.00 | -0.27 | 0.72 | -0.11 | 0.35 | 0.30 | 0.30 | -0.32 | -0.01 | -0.58 | 0.71 | -0.23 | 0.68 | -0.65 | -0.44 | 0.01 | 0.54 | -0.53 | 0.17 | -0.44 | -1.18 | 0.22 | 0.83 | 0.83 | -1.20 | -0.65 | 0.87 | -0.34 | -0.55 | -1.49 | -0.37 |
| 0.59 | 1.12 | -0.17 | 0.36 | 0.12 | 1.46 | 1.25 | -0.64 | -0.16 | -0.77 | -1.81 | -0.27 | 0.00 | 0.32 | 0.99 | 0.05 | 0.36 | 1.43 | -0.07 | -0.12 | -0.43 | -0.20 | 0.28 | 0.06 | 0.52 | -0.06 | 0.45 | -0.16 | -1.14 | -0.00 | 0.16 | 0.90 | 0.84 | 0.06 | -0.31 | -0.43 | -0.52 | -0.78 | 0.35 | 0.42 | -0.12 | -0.10 |
| -0.28 | -0.42 | -0.37 | -0.62 | -0.47 | 0.57 | 0.94 | 0.52 | 0.31 | 0.03 | 0.57 | 0.72 | 0.32 | 0.00 | -0.42 | 0.26 | 0.97 | 0.90 | -0.15 | 0.62 | 0.70 | -0.01 | 0.31 | 0.47 | 0.59 | -0.34 | 0.18 | 0.85 | 0.89 | 0.26 | 1.09 | -0.23 | -0.65 | 0.90 | 0.83 | -0.81 | 0.16 | -0.44 | -0.15 | -0.93 | 0.02 | 0.24 |
| 0.72 | -0.66 | -0.84 | 0.51 | -0.51 | -0.16 | 0.05 | -0.69 | 0.85 | -0.66 | 0.06 | -0.11 | 0.99 | -0.42 | 0.00 | 1.0 | -0.02 | 1.17 | -0.47 | 0.08 | 1.23 | -0.21 | 0.71 | -0.16 | 0.29 | 0.55 | -0.41 | 0.51 | -0.20 | -0.15 | 0.44 | 0.38 | -1.04 | -0.37 | -0.28 | 0.33 | -1.20 | -0.43 | 0.36 | 0.60 | 0.43 | 0.75 |
| -0.12 | -0.11 | 0.96 | -0.18 | 0.36 | 0.24 | 0.25 | 0.71 | -0.22 | -0.26 | -0.36 | 0.35 | 0.05 | 0.26 | 1.0 | 0.00 | -0.15 | -0.29 | 0.70 | 0.98 | 0.10 | -0.08 | 1.01 | 0.11 | -0.21 | 0.49 | 0.29 | 0.38 | -0.42 | -0.41 | 1.05 | 1.08 | -0.15 | 0.51 | 0.47 | -0.57 | -0.45 | 0.58 | -0.37 | 0.45 | -0.72 | 1.23 |
| 0.24 | 0.17 | -0.42 | 0.94 | -0.15 | -0.07 | -0.14 | -0.74 | -0.96 | -0.82 | 0.23 | 0.30 | 0.36 | 0.97 | -0.02 | -0.15 | 0.00 | 0.52 | 0.59 | 0.19 | -0.04 | -0.48 | 0.28 | -0.85 | -0.69 | 0.62 | -0.95 | -0.03 | -0.69 | 0.06 | 0.41 | 1.25 | 0.45 | 0.06 | 0.63 | 1.01 | 0.20 | 0.30 | 0.24 | 0.42 | 0.40 | 0.16 |
| 0.07 | 0.37 | -0.40 | 0.88 | -0.39 | -0.17 | 0.99 | -0.44 | -1.32 | -0.71 | -0.47 | 0.30 | 1.43 | 0.90 | 1.17 | 0.29 | 0.52 | 0.00 | -0.15 | -1.10 | 0.73 | 0.17 | 0.52 | -0.51 | 0.34 | 0.64 | 0.55 | -0.28 | 0.57 | -0.34 | 0.92 | 0.60 | -0.83 | -0.09 | 0.24 | 0.35 | 0.85 | 1.18 | -0.19 | 0.57 | -0.39 | -0.09 |
| -0.48 | -0.81 | -1.03 | -0.25 | 0.03 | 0.78 | -0.66 | -0.72 | -0.36 | -0.41 | 0.38 | -0.32 | -0.07 | -0.15 | -0.47 | 0.70 | 0.59 | -0.15 | 0.00 | 0.42 | -0.69 | -0.34 | 0.98 | -0.74 | -1.01 | 0.77 | 0.56 | 0.38 | 0.86 | 0.27 | -0.40 | 0.65 | -0.24 | 0.67 | 0.78 | 0.15 | -0.63 | -0.59 | -0.69 | 1.06 | 0.60 | -0.85 |
| -0.68 | -0.12 | 0.33 | -0.01 | -1.42 | -0.39 | 0.72 | 0.30 | 1.14 | 0.96 | 0.01 | -0.01 | -0.12 | 0.62 | 0.08 | 0.98 | 0.19 | -1.10 | 0.42 | 0.00 | -0.70 | 0.72 | -0.96 | 0.52 | -1.08 | 0.48 | 1.48 | 0.37 | -0.69 | -0.29 | -0.07 | -0.19 | 0.68 | 0.81 | 0.74 | -0.21 | 0.61 | -0.17 | -0.23 | 0.83 | -0.05 | -0.34 |
| -0.08 | -0.33 | -1.33 | 0.54 | 0.82 | 0.52 | 1.13 | 0.44 | 0.85 | 0.32 | 0.58 | -0.58 | -0.43 | 0.70 | 1.23 | 0.10 | -0.04 | 0.73 | -0.69 | -0.70 | 0.00 | 0.78 | 0.81 | -0.85 | 0.67 | -0.37 | -0.26 | 1.17 | -0.10 | -0.22 | -0.33 | 0.79 | -0.89 | 0.92 | 1.31 | 0.37 | 0.29 | 0.30 | -0.00 | -0.43 | -0.77 | 0.31 |
| -0.74 | -0.23 | 0.61 | 0.29 | -0.13 | 1.26 | 0.73 | 0.04 | -0.27 | -0.88 | -0.1 | 0.71 | -0.20 | -0.01 | -0.21 | -0.08 | -0.48 | 0.17 | -0.34 | 0.72 | 0.78 | 0.00 | 0.87 | 0.44 | 0.52 | 0.21 | 1.23 | -0.44 | -0.36 | 0.52 | 0.89 | -0.92 | 0.21 | -0.55 | 1.20 | -0.76 | -0.14 | -0.91 | -0.40 | 0.42 | 0.17 | -0.57 |
| 0.22 | 0.28 | 0.44 | 0.51 | 0.61 | 1.31 | -0.29 | 0.50 | 0.09 | -0.14 | -1.34 | -0.23 | 0.28 | 0.31 | 0.71 | 1.01 | 0.28 | 0.52 | 0.98 | -0.96 | 0.81 | 0.87 | 0.00 | 1.39 | -0.47 | -0.47 | -0.53 | 0.21 | 0.11 | 0.14 | 0.21 | 0.10 | 0.76 | -0.28 | -0.35 | -0.51 | -0.83 | 0.27 | -0.33 | -0.00 | 0.49 | 0.30 |
| -0.51 | -1.33 | -0.04 | -0.25 | -0.09 | 0.13 | 0.61 | 0.1 | -0.32 | -1.36 | 0.25 | 0.68 | 0.06 | 0.47 | -0.16 | 0.11 | -0.85 | -0.51 | -0.74 | 0.52 | -0.85 | 0.44 | 1.39 | 0.00 | 0.33 | 0.05 | -0.07 | 0.89 | -0.91 | 0.13 | 0.10 | -0.07 | -0.45 | -0.89 | -0.96 | 1.20 | 1.00 | -0.36 | 1.03 | -0.45 | 0.68 | -0.70 |
| -0.70 | -0.16 | 0.59 | 0.85 | -0.88 | -0.15 | -0.51 | -0.55 | 0.80 | 0.49 | -0.63 | -0.65 | 0.52 | 0.59 | 0.29 | -0.21 | -0.69 | 0.34 | -1.01 | -1.08 | 0.67 | 0.52 | -0.47 | 0.33 | 0.00 | -0.90 | 1.15 | 0.09 | 0.34 | 0.35 | 0.62 | -0.04 | -0.72 | 0.63 | -0.13 | -1.02 | -0.07 | -0.22 | -0.14 | 0.48 | -0.27 | -0.27 |
| 0.39 | 0.47 | 0.96 | 0.20 | 0.71 | -0.81 | 0.50 | -0.03 | 0.63 | -0.20 | 0.54 | -0.44 | -0.06 | -0.34 | 0.55 | 0.49 | 0.62 | 0.64 | 0.77 | 0.48 | -0.37 | 0.21 | -0.47 | 0.05 | -0.90 | 0.00 | 0.95 | -0.74 | 0.52 | -0.68 | -0.67 | -0.61 | 0.02 | 0.12 | 0.29 | -1.28 | -0.34 | 0.04 | -0.04 | 0.69 | -1.48 | 0.89 |
| 0.07 | 0.13 | 0.25 | 0.15 | -0.58 | -0.46 | -0.71 | -0.41 | 0.41 | 0.05 | -0.23 | 0.01 | 0.45 | 0.18 | -0.41 | 0.29 | -0.95 | -0.55 | 0.56 | 1.48 | -0.26 | 1.23 | -0.53 | -0.07 | 1.15 | 0.95 | 0.00 | 0.39 | 0.59 | 0.40 | -0.20 | 0.54 | -0.37 | 0.45 | 0.30 | -0.19 | 0.76 | 0.30 | -0.09 | -0.15 | -0.40 | 0.16 |
| -0.31 | -0.07 | -0.30 | 0.01 | 0.08 | 0.76 | 1.01 | 0.47 | 0.90 | 0.30 | -0.34 | 0.54 | -0.16 | 0.85 | 0.51 | 0.38 | -0.03 | -0.28 | 0.38 | 0.37 | 1.17 | -0.44 | 0.21 | 0.89 | 0.09 | -0.74 | 0.39 | 0.00 | -0.62 | -0.47 | 0.41 | -0.06 | 0.07 | 0.65 | -0.13 | 0.45 | -1.07 | 0.38 | -0.21 | 0.66 | 0.62 | -0.32 |
| 1.60 | 0.08 | -1.48 | -1.28 | 0.33 | 0.21 | 0.45 | 0.20 | -0.28 | 0.23 | 0.76 | -0.53 | -1.14 | 0.89 | -0.20 | -0.42 | -0.69 | 0.57 | 0.86 | -0.69 | -0.10 | -0.36 | 0.11 | -0.91 | 0.34 | 0.52 | 0.59 | 0.62 | 0.00 | 0.50 | 0.04 | -0.42 | -0.35 | 0.02 | -0.53 | 0.40 | -0.08 | 0.23 | -0.28 | 0.95 | -0.32 | 0.61 |
| 0.77 | 0.06 | 0.33 | 0.21 | 0.24 | 0.12 | 0.10 | -0.33 | 0.15 | -1.19 | -0.34 | 0.17 | -0.00 | 0.26 | -0.15 | -0.41 | -0.06 | -0.34 | 0.27 | -0.29 | -0.22 | 0.52 | 0.14 | 0.13 | 0.35 | -0.68 | 0.40 | -0.47 | 0.50 | 0.00 | -0.34 | -0.46 | 0.05 | -0.54 | 0.87 | -0.66 | 0.56 | 0.70 | 0.55 | -0.34 | -1.86 | -0.18 |
| 0.22 | -0.18 | 1.02 | 0.59 | -0.28 | -1.17 | 0.30 | 0.94 | 0.78 | 0.50 | -0.06 | -0.44 | 0.16 | 1.09 | 0.44 | 1.05 | 0.41 | 0.92 | -0.40 | -0.07 | -0.33 | 0.89 | 0.21 | 0.10 | 0.62 | -0.67 | -0.28 | 0.41 | 0.04 | -0.34 | 0.00 | 0.21 | -0.94 | 0.00 | 1.10 | 0.75 | -0.75 | 0.89 | 0.37 | -0.99 | -0.62 | -1.03 |
| -1.09 | -0.03 | 0.37 | 0.44 | 0.47 | 0.16 | -0.84 | 0.44 | 0.63 | 0.62 | 1.12 | -1.18 | 0.90 | -0.23 | 0.38 | 1.08 | 1.25 | 0.60 | 0.65 | -0.19 | 0.79 | -0.92 | 0.10 | -0.07 | -0.04 | -0.61 | 0.54 | -0.06 | -0.42 | -0.46 | 0.21 | 0.00 | 0.34 | -0.63 | 0.28 | -0.25 | 0.72 | 0.21 | -0.84 | 0.13 | -0.38 | -0.38 |
| 0.61 | 0.08 | -0.64 | 0.30 | 1.11 | 0.84 | -1.50 | 0.59 | -0.18 | 0.57 | 0.61 | 0.22 | 0.84 | -0.65 | -1.04 | -0.15 | 0.45 | -0.83 | -0.24 | 0.68 | -0.89 | 0.21 | 0.76 | -0.45 | -0.72 | 0.02 | -0.37 | -0.07 | -0.35 | 0.05 | -0.94 | 0.34 | 0.00 | 1.43 | -0.16 | 0.68 | 0.98 | -0.30 | -0.33 | 0.27 | -0.70 | -0.1 |
| 0.59 | -1.02 | 0.25 | 0.33 | 0.17 | 0.60 | 0.07 | -0.28 | -0.63 | 0.74 | -0.98 | 0.83 | 0.06 | 0.90 | -0.37 | 0.51 | 0.06 | -0.09 | 0.67 | 0.81 | 0.92 | -0.55 | -0.28 | -0.89 | 0.63 | 0.12 | 0.45 | 0.65 | 0.02 | -0.54 | 0.00 | -0.61 | 1.43 | 0.00 | -0.20 | 0.31 | 0.53 | 0.85 | 0.70 | 0.12 | 0.12 | -0.62 |
| 0.14 | 0.30 | 0.41 | -0.1 | 0.74 | 0.79 | 0.30 | -0.20 | 0.73 | 0.22 | -0.73 | 0.83 | -0.31 | 0.83 | -0.28 | 0.47 | 0.63 | 0.24 | 0.78 | 0.74 | 1.31 | 1.20 | -0.35 | -0.96 | -0.13 | 0.29 | 0.30 | -0.13 | -0.53 | 0.87 | 1.10 | 0.28 | -0.16 | -0.20 | 0.00 | -0.34 | 0.29 | 0.33 | -0.87 | -0.37 | -0.21 | -0.22 |
| 0.37 | 0.67 | 1.18 | 1.10 | 0.21 | 0.76 | 0.52 | 0.04 | -0.99 | -0.15 | 1.16 | -1.20 | -0.43 | -0.81 | 0.33 | -0.57 | 1.01 | 0.35 | 0.15 | -0.21 | 0.37 | -0.76 | -0.51 | 1.20 | -1.02 | -1.28 | -0.19 | 0.45 | 0.40 | -0.66 | 0.75 | -0.25 | 0.68 | 0.31 | -0.34 | 0.00 | -0.78 | 0.47 | 0.28 | 0.37 | 0.01 | -0.17 |
| -0.94 | 0.47 | -0.24 | 0.54 | -0.44 | -0.15 | 0.54 | 0.01 | 0.13 | 1.03 | 0.19 | -0.65 | -0.52 | 0.16 | -1.20 | -0.45 | 0.20 | 0.85 | -0.63 | 0.61 | 0.29 | -0.14 | -0.83 | 1.00 | -0.07 | -0.34 | 0.76 | -1.07 | -0.08 | 0.56 | -0.75 | 0.72 | 0.98 | 0.53 | 0.29 | -0.78 | 0.00 | 0.93 | 1.68 | 0.36 | 0.28 | 0.02 |
| -0.42 | 1.66 | -0.03 | 0.27 | 0.72 | -0.42 | 0.71 | -0.08 | -0.72 | -0.72 | 1.11 | 0.87 | -0.78 | -0.44 | -0.43 | 0.58 | 0.30 | 1.18 | -0.59 | -0.17 | 0.30 | -0.91 | 0.27 | -0.36 | -0.22 | 0.04 | 0.30 | 0.38 | 0.23 | 0.70 | 0.89 | 0.21 | -0.30 | 0.85 | 0.33 | 0.47 | 0.93 | 0.00 | 0.08 | 1.43 | -0.11 | 0.04 |
| 0.30 | -0.47 | 0.51 | 0.38 | 0.42 | -0.24 | -0.58 | 0.55 | 0.94 | 1.13 | -0.01 | -0.34 | 0.35 | -0.15 | 0.36 | -0.37 | 0.24 | -0.19 | -0.69 | -0.23 | -0.00 | -0.40 | -0.33 | 1.03 | -0.14 | -0.04 | -0.09 | -0.21 | -0.20 | 0.55 | 0.37 | -0.84 | -0.33 | 0.70 | -0.87 | 0.28 | 1.68 | 0.08 | 0.00 | 0.65 | 1.18 | 0.19 |
| 0.36 | -0.39 | -0.07 | 0.30 | -0.23 | -0.06 | 0.10 | 0.28 | 0.1 | 1.08 | -0.01 | -0.55 | 0.42 | -0.93 | 0.60 | 0.45 | 0.42 | 0.57 | 1.06 | 0.83 | -0.43 | 0.42 | -0.00 | -0.45 | 0.48 | 0.69 | -0.15 | 0.66 | 0.95 | -0.34 | -0.99 | 0.13 | 0.27 | 0.12 | -0.37 | 0.37 | 0.36 | 1.43 | 0.65 | 0.00 | 0.09 | -1.18 |
| -0.92 | 0.51 | 0.15 | 0.40 | -0.07 | -0.14 | 0.33 | -0.19 | 0.45 | 0.20 | -0.40 | -1.49 | -0.12 | 0.02 | 0.43 | -0.72 | 0.40 | -0.39 | 0.60 | -0.05 | -0.77 | 0.17 | 0.49 | 0.60 | -0.27 | -1.48 | -0.40 | 0.62 | -0.32 | -1.86 | -0.62 | -0.38 | -0.70 | 0.12 | -0.21 | 0.01 | 0.28 | -0.11 | 1.18 | 0.09 | 0.00 | 0.89 |
| -0.43 | 0.16 | -0.35 | 1.23 | 0.61 | 0.77 | 0.04 | -0.14 | 0.93 | 0.82 | 0.13 | -0.37 | -0.10 | 0.24 | 0.75 | 1.23 | 0.16 | -0.09 | -0.85 | -0.34 | 0.31 | -0.57 | 0.30 | -0.70 | -0.27 | 0.89 | 0.16 | -0.32 | 0.61 | -0.18 | -1.03 | 0.30 | -0.1 | -0.62 | -0.22 | -0.17 | 0.02 | 0.04 | 0.19 | -1.18 | 0.89 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.00 | 0.28 | -0.92 | -0.36 | -0.41 | 0.68 | -0.21 | 0.51 | 0.55 | 1.13 | 0.16 | 0.88 | 0.02 | 0.56 | -0.01 | 0.27 | -0.73 | 0.18 | 0.23 | 0.66 | -0.21 | -0.44 | -0.32 | 0.35 | 0.88 | 0.72 | 0.08 | 0.39 | -0.23 | 0.04 | 1.08 | 0.25 | -0.76 | 0.73 | -0.03 | 0.93 | 0.57 | 0.46 | -0.71 | -0.89 | -1.17 | -0.50 |
| 1.55 | -0.14 | -1.50 | -0.69 | -0.11 | 0.69 | 0.66 | 0.43 | 0.24 | -0.62 | -0.23 | -0.06 | 0.35 | -0.05 | 0.03 | 0.27 | -0.23 | 0.53 | 0.38 | 0.94 | 0.75 | -0.68 | -0.01 | 0.56 | 0.44 | -0.21 | 0.09 | -0.42 | -0.15 | 0.35 | 1.42 | 1.13 | -0.31 | -0.16 | -0.06 | -0.86 | 0.15 | 0.65 | 0.28 | -0.66 | 0.37 | 0.55 |
| -0.47 | 1.11 | -0.08 | -1.29 | -1.21 | 0.08 | -0.84 | -0.32 | 0.97 | 0.06 | -0.27 | -0.50 | -1.07 | 0.78 | 0.31 | -0.02 | 1.18 | 0.55 | -0.46 | -0.18 | 0.96 | 0.49 | -0.72 | 0.81 | -1.01 | -0.75 | 0.00 | 0.37 | -0.64 | -0.20 | -0.24 | -0.70 | 0.28 | 0.60 | 0.56 | -0.31 | 0.57 | -0.30 | -0.05 | 1.15 | -0.06 | 0.98 |
| 0.26 | 0.64 | -0.83 | 0.67 | 0.35 | -0.62 | 0.11 | 0.33 | 0.20 | 0.71 | 0.91 | 0.44 | 0.46 | 0.46 | 0.76 | -0.79 | -0.50 | 0.55 | 1.15 | -0.45 | 0.36 | 0.90 | -0.54 | 0.41 | -0.28 | 0.64 | 0.03 | 0.75 | 0.00 | -0.20 | 0.38 | -0.02 | 0.56 | 0.64 | -0.68 | -0.08 | -0.01 | 0.85 | 1.23 | 0.58 | -0.60 | 0.72 |
| -0.20 | 0.14 | 0.38 | 0.33 | -0.16 | 0.62 | -0.63 | 0.94 | 0.68 | 0.07 | 0.04 | 0.28 | -0.74 | -0.68 | 0.39 | 0.40 | 0.40 | -0.52 | 0.53 | -0.82 | -0.45 | -0.20 | 0.84 | -0.11 | 0.01 | 0.11 | 1.01 | -0.89 | 0.81 | 1.41 | -0.75 | 0.06 | -0.13 | 1.08 | -0.13 | -0.06 | 0.03 | -0.36 | 0.75 | 0.14 | -0.27 | 0.21 |
| 1.51 | -0.57 | 0.28 | 0.55 | 0.06 | 0.03 | -0.16 | 0.69 | 0.52 | 0.03 | 1.34 | 0.27 | -0.24 | -0.27 | 0.81 | -0.75 | -1.21 | -0.63 | 0.73 | 1.38 | -0.25 | -0.19 | 0.25 | 1.35 | 0.60 | 0.01 | 0.02 | 0.06 | -0.36 | 0.90 | 0.20 | -0.79 | 0.59 | 0.75 | -0.64 | -0.64 | -0.31 | 1.02 | 0.44 | -0.39 | 0.26 | 0.08 |
| 1.25 | -0.22 | 0.46 | 0.73 | 0.63 | -0.25 | 0.34 | 0.35 | -0.18 | -0.37 | 1.01 | 0.51 | 0.70 | -0.04 | -0.59 | -0.20 | 1.03 | -0.65 | -0.18 | -0.81 | 0.32 | 0.66 | 0.26 | -1.19 | 0.25 | -0.11 | -0.96 | 0.65 | 0.04 | 0.14 | -0.12 | 0.62 | -0.09 | -0.11 | 0.11 | 0.74 | 0.51 | 0.40 | -0.40 | -0.32 | -0.17 | -0.09 |
| 0.00 | 1.12 | -0.10 | 0.02 | 0.42 | 0.06 | 0.21 | 0.08 | -0.47 | 0.67 | 1.04 | 0.22 | 0.93 | 0.06 | 0.07 | -0.57 | -0.23 | -0.36 | -0.82 | -0.1 | 0.26 | -1.11 | -0.12 | -0.17 | -0.26 | 0.05 | -0.27 | 0.03 | 1.26 | 0.43 | 0.64 | -0.63 | 0.27 | 0.19 | 0.50 | 0.71 | -1.28 | -0.76 | -0.04 | 0.02 | -0.44 | -0.09 |
| 1.12 | 0.00 | 0.13 | 0.12 | 0.57 | 0.20 | 0.64 | 0.37 | 0.91 | -0.29 | 0.04 | 0.21 | -1.12 | -0.42 | -0.36 | -0.01 | 0.30 | 0.45 | -0.81 | -0.37 | -0.33 | -0.20 | 0.28 | -1.33 | -0.26 | 0.47 | 0.13 | -0.07 | 0.08 | 0.06 | -0.27 | -0.15 | 0.08 | -0.95 | 0.28 | 0.67 | 0.47 | 1.66 | -0.47 | -0.39 | 0.37 | 0.16 |
| -0.10 | 0.13 | 0.00 | 0.91 | -0.04 | 0.23 | -0.72 | -0.19 | 0.30 | -0.14 | -0.04 | -1.74 | 0.29 | -0.48 | -0.42 | 1.18 | -0.18 | -0.20 | -0.92 | -0.03 | -1.44 | 0.76 | 0.55 | -0.15 | 0.38 | 1.07 | 0.36 | -0.41 | -1.37 | 0.44 | 0.82 | 0.13 | -0.52 | 0.43 | 0.27 | 1.07 | -0.13 | 0.08 | 0.62 | 0.04 | -0.11 | -0.46 |
| 0.02 | 0.12 | 0.91 | 0.00 | -0.1 | 0.70 | 0.71 | -0.99 | 0.33 | -0.33 | 1.27 | -0.42 | 0.36 | -0.62 | 0.21 | -0.29 | 0.80 | 0.79 | -0.25 | 0.23 | 0.54 | 0.25 | 0.51 | -0.25 | 0.95 | 0.20 | 0.15 | 0.01 | -1.28 | 0.21 | 0.60 | 0.57 | 0.30 | 0.26 | -0.07 | 1.10 | 0.54 | 0.27 | 0.38 | 0.30 | 0.55 | 1.23 |
| 0.42 | -0.57 | -0.04 | -0.1 | 0.00 | -0.06 | 0.82 | -1.33 | -0.84 | 0.10 | -0.51 | 0.36 | 0.12 | -0.47 | -0.81 | 0.26 | -0.28 | -0.47 | 0.03 | -1.17 | 0.82 | -0.16 | 0.61 | -0.09 | -0.78 | 0.71 | -0.58 | 0.08 | 0.33 | 0.24 | -0.19 | 0.59 | 1.11 | 0.10 | 0.76 | 0.21 | -0.44 | -0.72 | 0.42 | -0.23 | 0.07 | 0.61 |
| 0.06 | 0.20 | 0.23 | 0.70 | -0.06 | 0.00 | 0.45 | 0.24 | -0.52 | -0.87 | -1.36 | 1.49 | 1.46 | 0.57 | -0.46 | 0.13 | -0.20 | -0.26 | 0.78 | -0.14 | 0.52 | 1.23 | 1.31 | 0.13 | -0.05 | -0.81 | -0.46 | 0.76 | 0.21 | 0.12 | -1.08 | 0.29 | 0.84 | 0.53 | 0.81 | 0.76 | -0.15 | -0.42 | -0.24 | -0.06 | 0.00 | 0.77 |
| 0.21 | 0.64 | -0.72 | 0.71 | 0.82 | 0.45 | 0.00 | 0.62 | -1.07 | -1.24 | 0.43 | -0.18 | 1.25 | 0.94 | -0.25 | 0.15 | -0.27 | 0.91 | -0.66 | 0.97 | 1.13 | 0.70 | -0.29 | 0.61 | -0.41 | 0.50 | -0.71 | 1.01 | 0.45 | 0.10 | 0.39 | -0.71 | -1.50 | 0.00 | 0.32 | 0.52 | 0.54 | 0.71 | -0.58 | 0.10 | 0.48 | 0.01 |
| 0.08 | 0.37 | -0.19 | -0.99 | -1.33 | 0.24 | 0.62 | 0.00 | 1.05 | 0.01 | 0.50 | -0.06 | -0.82 | 0.34 | -0.21 | 1.0 | -0.43 | -0.17 | -0.54 | -0.12 | 0.26 | 0.25 | 0.68 | -0.08 | -0.83 | 0.15 | -0.23 | 0.29 | 0.38 | -0.16 | 0.67 | 0.14 | 0.77 | -0.03 | -0.41 | -0.14 | 0.19 | 0.10 | 0.73 | 0.46 | -0.51 | -0.32 |
| -0.47 | 0.91 | 0.30 | 0.33 | -0.84 | -0.52 | -1.07 | 1.05 | 0.00 | -0.92 | 0.38 | 0.22 | -0.50 | -0.03 | 1.50 | 0.23 | -0.48 | -0.89 | -0.02 | 0.55 | 0.50 | 0.11 | 0.44 | -0.66 | 0.35 | 0.98 | 0.75 | 0.56 | 0.06 | 0.49 | 0.35 | 0.16 | 0.16 | -0.22 | 0.37 | -1.34 | 0.47 | -0.38 | 1.28 | 0.44 | -0.04 | 0.58 |
| -0.62 | -0.29 | -0.14 | -0.33 | 0.10 | -0.87 | -1.24 | 0.01 | -0.92 | 0.00 | 0.32 | 0.44 | -0.71 | 0.09 | -1.02 | -0.42 | -1.01 | -0.85 | -0.46 | 1.26 | 0.38 | -0.98 | -0.20 | -1.30 | 0.64 | -0.26 | -0.01 | 0.35 | 0.17 | -1.24 | 0.65 | 0.81 | 0.52 | 0.62 | 0.30 | -0.09 | 0.97 | -0.77 | 1.07 | 1.02 | 0.40 | 0.88 |
| 1.04 | 0.04 | -0.04 | 1.27 | -0.51 | -1.36 | 0.43 | 0.50 | 0.38 | 0.32 | 0.00 | -0.91 | -1.64 | 0.74 | -0.41 | -0.63 | -0.07 | -0.73 | 0.22 | 0.42 | 0.75 | -0.30 | -1.50 | 0.42 | -0.36 | 0.37 | -0.40 | -0.17 | 0.59 | -0.51 | 0.20 | 1.41 | 0.44 | -1.22 | -0.54 | 1.33 | 0.02 | 0.94 | -0.18 | -0.18 | -0.09 | 0.30 |
| 0.22 | 0.21 | -1.74 | -0.42 | 0.36 | 1.49 | -0.18 | -0.06 | 0.22 | 0.44 | -0.91 | 0.00 | 0.03 | 1.02 | -0.72 | -0.06 | -0.14 | -0.09 | -0.62 | 0.54 | -0.28 | 0.37 | -0.53 | 0.98 | -0.25 | -0.75 | -0.29 | 0.84 | -0.83 | -0.13 | -0.05 | -0.75 | -0.08 | 0.46 | 1.16 | -0.90 | -0.95 | 0.57 | -0.65 | -0.85 | -1.05 | -0.07 |
| 0.93 | -1.12 | -0.29 | 0.36 | 0.12 | 1.46 | 1.25 | -0.82 | -0.50 | -0.71 | -1.64 | 0.03 | 0.00 | 0.32 | 0.68 | -0.05 | 0.23 | 1.34 | -0.07 | 0.13 | -0.43 | -0.24 | 0.28 | 0.06 | 0.62 | -0.06 | 0.45 | -0.16 | -1.14 | -0.00 | 0.25 | 1.03 | 0.84 | -0.01 | -0.29 | -0.43 | -0.52 | -0.78 | 0.35 | 0.42 | 0.03 | -0.10 |
| 0.06 | -0.42 | -0.48 | -0.62 | -0.47 | 0.57 | 0.94 | 0.34 | -0.03 | 0.09 | 0.74 | 1.02 | 0.32 | 0.00 | -0.72 | 0.15 | 0.83 | 0.81 | -0.15 | 0.86 | 0.70 | -0.05 | 0.31 | 0.47 | 0.69 | -0.34 | 0.18 | 0.85 | 0.89 | 0.26 | 1.18 | -0.11 | -0.65 | 0.84 | 0.85 | -0.81 | 0.16 | -0.44 | -0.15 | -0.93 | 0.16 | 0.24 |
| 0.07 | -0.36 | -0.42 | 0.21 | -0.81 | -0.46 | -0.25 | -0.21 | 1.50 | -1.02 | -0.41 | -0.72 | 0.68 | -0.72 | 0.00 | 1.40 | 0.41 | 1.56 | -0.17 | -0.47 | 0.92 | 0.12 | 1.01 | -0.47 | -0.12 | 0.85 | -0.11 | 0.20 | 0.1 | 0.16 | 0.04 | -0.05 | -0.74 | 0.01 | -0.60 | 0.03 | -0.90 | -0.13 | 0.66 | 0.90 | -0.01 | 0.45 |
| -0.57 | -0.01 | 1.18 | -0.29 | 0.26 | 0.13 | 0.15 | 1.0 | 0.23 | -0.42 | -0.63 | -0.06 | -0.05 | 0.15 | 1.40 | 0.00 | 0.09 | -0.1 | 0.81 | 0.62 | -0.00 | 0.06 | 1.12 | 0.01 | -0.41 | 0.60 | 0.39 | 0.28 | -0.32 | -0.31 | 0.85 | 0.85 | -0.04 | 0.68 | 0.34 | -0.67 | -0.34 | 0.69 | -0.26 | 0.55 | -0.96 | 1.13 |
| -0.23 | 0.30 | -0.18 | 0.80 | -0.28 | -0.20 | -0.27 | -0.43 | -0.48 | -1.01 | -0.07 | -0.14 | 0.23 | 0.83 | 0.41 | 0.09 | 0.00 | 0.74 | 0.72 | -0.20 | -0.18 | -0.31 | 0.41 | -0.98 | -0.93 | 0.75 | -0.81 | -0.16 | -0.56 | 0.07 | 0.18 | 0.99 | 0.58 | 0.26 | 0.47 | 0.88 | 0.33 | 0.44 | 0.38 | 0.55 | 0.12 | 0.03 |
| -0.36 | 0.45 | -0.20 | 0.79 | -0.47 | -0.26 | 0.91 | -0.17 | -0.89 | -0.85 | -0.73 | -0.09 | 1.34 | 0.81 | 1.56 | -0.1 | 0.74 | 0.00 | -0.07 | -1.43 | 0.65 | 0.29 | 0.60 | -0.59 | 0.16 | 0.73 | -0.47 | -0.36 | 0.66 | -0.25 | 0.74 | 0.39 | -0.74 | 0.06 | 0.13 | 0.26 | 0.94 | 1.27 | -0.11 | 0.66 | -0.62 | -0.18 |
| -0.82 | -0.81 | -0.92 | -0.25 | 0.03 | 0.78 | -0.66 | -0.54 | -0.02 | -0.46 | 0.22 | -0.62 | -0.07 | -0.15 | -0.17 | 0.81 | 0.72 | -0.07 | 0.00 | 0.17 | -0.69 | -0.30 | 0.98 | -0.74 | -1.11 | 0.77 | 0.56 | 0.38 | 0.86 | 0.27 | -0.50 | 0.52 | -0.24 | 0.74 | 0.76 | 0.15 | -0.63 | -0.59 | -0.69 | 1.06 | 0.46 | -0.85 |
| -0.1 | -0.37 | -0.03 | 0.23 | -1.17 | -0.14 | 0.97 | -0.12 | 0.55 | 1.26 | 0.42 | 0.54 | 0.13 | 0.86 | -0.47 | 0.62 | -0.20 | -1.43 | 0.17 | 0.00 | -0.46 | 0.44 | -1.21 | 0.77 | -0.73 | 0.23 | 1.24 | 0.61 | -0.94 | -0.53 | 0.27 | 0.18 | 0.43 | 0.49 | 1.01 | 0.04 | 0.36 | -0.42 | -0.48 | 0.58 | 0.34 | -0.1 |
| 0.26 | -0.33 | -1.44 | 0.54 | 0.82 | 0.52 | 1.13 | 0.26 | 0.50 | 0.38 | 0.75 | -0.28 | -0.43 | 0.70 | 0.92 | -0.00 | -0.18 | 0.65 | -0.69 | -0.46 | 0.00 | 0.75 | 0.81 | -0.85 | 0.77 | -0.37 | -0.26 | 1.17 | -0.10 | -0.22 | -0.24 | 0.91 | -0.89 | 0.85 | 1.34 | 0.37 | 0.29 | 0.30 | -0.00 | -0.43 | -0.63 | 0.31 |
| -1.11 | -0.20 | 0.76 | 0.25 | -0.16 | 1.23 | 0.70 | 0.25 | 0.11 | -0.98 | -0.30 | 0.37 | -0.24 | -0.05 | 0.12 | 0.06 | -0.31 | 0.29 | -0.30 | 0.44 | 0.75 | 0.00 | 0.91 | 0.40 | 0.38 | 0.24 | 1.27 | -0.47 | -0.32 | 0.56 | 0.77 | -1.07 | 0.25 | -0.45 | 1.15 | -0.80 | -0.11 | -0.88 | -0.36 | 0.45 | -0.01 | -0.61 |
| -0.12 | 0.28 | 0.55 | 0.51 | 0.61 | 1.31 | -0.29 | 0.68 | 0.44 | -0.20 | -1.50 | -0.53 | 0.28 | 0.31 | 1.01 | 1.12 | 0.41 | 0.60 | 0.98 | -1.21 | 0.81 | 0.91 | 0.00 | 1.39 | -0.57 | -0.47 | -0.53 | 0.21 | 0.11 | 0.14 | 0.12 | -0.02 | 0.76 | -0.21 | -0.37 | -0.51 | -0.83 | 0.27 | -0.33 | -0.00 | 0.35 | 0.30 |
| -0.17 | -1.33 | -0.15 | -0.25 | -0.09 | 0.13 | 0.61 | -0.08 | -0.66 | -1.30 | 0.42 | 0.98 | 0.06 | 0.47 | -0.47 | 0.01 | -0.98 | -0.59 | -0.74 | 0.77 | -0.85 | 0.40 | 1.39 | 0.00 | 0.43 | 0.05 | -0.07 | 0.89 | -0.91 | 0.13 | 0.19 | 0.06 | -0.45 | -0.96 | -0.93 | 1.20 | [illegible] | -0.36 | 1.03 | -0.45 | 0.83 | -0.70 |
| -0.26 | -0.26 | 0.38 | 0.95 | -0.78 | -0.05 | -0.41 | -0.83 | 0.35 | 0.64 | -0.36 | -0.25 | 0.62 | 0.69 | -0.12 | -0.41 | -0.93 | 0.16 | -1.11 | -0.73 | 0.77 | 0.38 | -0.57 | 0.43 | 0.00 | -1.00 | 1.05 | 0.19 | 0.24 | 0.25 | 0.19 | 0.18 | -0.82 | 0.46 | -0.01 | -0.92 | -0.17 | -0.32 | -0.24 | 0.38 | -0.02 | -0.17 |
| 0.05 | 0.47 | 1.07 | 0.20 | 0.71 | -0.81 | 0.50 | 0.15 | 0.98 | -0.26 | 0.37 | -0.75 | -0.06 | -0.34 | 0.85 | 0.60 | 0.75 | 0.73 | 0.77 | 0.23 | -0.37 | 0.24 | -0.47 | 0.05 | -1.00 | 0.00 | 0.95 | -0.74 | 0.52 | -0.68 | -0.76 | -0.73 | 0.19 | 0.27 | -1.28 | -0.34 | [illegible] | 0.04 | -0.04 | -0.69 | -1.62 | 0.89 |
| -0.27 | 0.13 | 0.36 | 0.15 | -0.58 | -0.46 | -0.71 | -0.23 | 0.75 | -0.01 | -0.40 | -0.29 | 0.45 | 0.18 | -0.11 | 0.39 | -0.81 | -0.47 | 0.56 | 1.24 | -0.26 | 1.27 | -0.53 | -0.07 | 1.05 | 0.95 | 0.00 | 0.39 | -0.62 | 0.59 | 0.40 | -0.38 | 0.41 | 0.52 | 0.19 | 0.09 | [illegible] | 0.30 | -0.09 | -0.15 | -0.55 | 0.16 |
| 0.03 | -0.07 | -0.41 | 0.01 | 0.08 | 0.76 | 1.01 | 0.29 | 0.56 | 0.35 | -0.17 | 0.84 | -0.16 | 0.85 | 0.20 | 0.28 | -0.16 | -0.36 | 0.38 | 0.61 | 1.17 | -0.47 | 0.21 | 0.89 | 0.19 | -0.74 | 0.39 | 0.00 | -0.62 | -0.47 | 0.50 | 0.06 | -0.07 | 0.58 | -0.11 | 0.45 | -1.07 | 0.38 | -0.21 | 0.66 | 0.76 | -0.32 |
| 1.26 | 0.08 | -1.37 | -1.28 | 0.33 | 0.21 | 0.45 | 0.38 | 0.06 | 0.17 | 0.59 | -0.83 | -1.14 | 0.89 | 0.1 | -0.32 | -0.56 | 0.66 | 0.86 | -0.94 | -0.10 | -0.32 | 0.11 | -0.91 | 0.24 | 0.52 | -0.62 | -0.62 | 0.00 | -0.05 | -0.55 | -0.07 | 0.09 | -0.55 | 0.40 | -0.08 | [illegible] | 0.23 | -0.28 | 0.95 | -0.46 | 0.61 |
| 0.43 | 0.06 | 0.44 | 0.21 | 0.24 | 0.12 | 0.10 | -0.16 | 0.49 | -1.24 | -0.51 | -0.13 | -0.00 | 0.26 | 0.16 | -0.31 | 0.07 | -0.25 | 0.27 | -0.53 | -0.22 | 0.56 | 0.14 | 0.13 | 0.25 | -0.68 | 0.50 | -0.47 | -0.05 | 0.00 | -0.43 | -0.58 | -0.55 | 0.05 | -0.47 | -0.66 | [illegible] | 0.70 | 0.55 | -0.34 | -2.01 | -0.18 |
| 0.64 | -0.27 | 0.82 | 0.60 | -0.19 | -1.08 | 0.39 | 0.67 | 0.35 | 0.65 | 0.20 | -0.05 | 0.25 | 1.18 | 0.04 | 0.85 | 0.18 | 0.74 | -0.50 | 0.27 | -0.24 | 0.77 | 0.12 | 0.19 | 0.19 | -0.76 | 0.40 | 0.50 | -0.55 | -0.43 | 0.00 | [illegible] | [illegible] | [illegible] | [illegible] | 0.84 | [illegible] | 0.80 | 0.28 | -1.08 | -0.38 | -0.94 |
| -0.63 | -0.15 | 0.13 | 0.57 | 0.59 | 0.29 | -0.71 | 0.14 | 0.16 | 0.81 | 1.41 | -0.75 | 1.03 | -0.11 | -0.05 | 0.85 | 0.99 | 0.39 | 0.52 | 0.18 | 0.91 | -1.07 | -0.02 | 0.06 | 0.18 | -0.73 | -0.38 | 0.06 | -0.07 | -0.58 | [illegible] | 0.00 | [illegible] | [illegible] | [illegible] | -0.13 | [illegible] | -0.30 | -0.97 | 0.00 | -0.11 | -0.26 |
| 0.27 | 0.08 | -0.52 | 0.30 | 1.11 | 0.84 | -1.50 | 0.77 | 0.16 | 0.52 | 0.44 | -0.08 | 0.84 | -0.65 | -0.74 | -0.04 | 0.58 | -0.74 | -0.24 | 0.43 | -0.89 | 0.25 | 0.76 | -0.45 | -0.82 | 0.19 | 0.41 | -0.07 | 0.09 | -0.55 | [illegible] | [illegible] | 0.00 | [illegible] | [illegible] | [illegible] | [illegible] | [illegible] | -0.33 | 0.27 | -0.85 | -0.1 |
| 0.19 | -0.95 | 0.43 | 0.26 | 0.10 | 0.53 | 0.00 | -0.03 | -0.22 | 0.62 | -1.22 | 0.46 | -0.01 | 0.84 | 0.01 | 0.68 | 0.26 | 0.06 | 0.74 | 0.49 | 0.85 | -0.45 | -0.21 | -0.96 | 0.46 | 0.27 | 0.52 | 0.58 | -0.55 | 0.05 | [illegible] | [illegible] | [illegible] | 0.00 | [illegible] | 0.68 | [illegible] | 0.28 | 0.77 | 0.19 | -0.09 | -0.69 |
| 0.50 | 0.28 | 0.27 | -0.07 | 0.76 | 0.81 | 0.32 | -0.41 | 0.37 | 0.30 | -0.54 | 1.16 | -0.29 | 0.85 | -0.60 | 0.34 | 0.47 | 0.13 | 0.76 | 1.01 | 1.34 | 1.15 | -0.37 | -0.93 | -0.01 | -1.28 | 0.19 | -0.11 | 0.40 | -0.47 | [illegible] | [illegible] | [illegible] | [illegible] | 0.00 | 0.24 | [illegible] | 0.31 | -0.89 | -0.40 | -0.04 | -0.19 |
| 0.71 | 0.67 | 1.07 | 1.10 | 0.21 | 0.76 | 0.52 | -0.14 | -1.34 | -0.09 | 1.33 | -0.90 | -0.43 | -0.81 | 0.03 | -0.67 | 0.88 | 0.26 | 0.15 | 0.04 | 0.37 | -0.80 | -0.51 | 1.20 | -0.92 | -0.34 | 0.09 | 0.45 | -0.08 | -0.66 | 0.84 | -0.13 | [illegible] | 0.68 | 0.24 | 0.00 | 0.78 | 0.47 | 0.28 | 0.37 | 0.15 | -0.17 |
| -1.28 | 0.47 | -0.13 | 0.54 | -0.44 | -0.15 | 0.54 | 0.19 | 0.47 | 0.97 | 0.02 | -0.95 | -0.52 | 0.16 | -0.90 | -0.34 | 0.33 | 0.94 | -0.63 | 0.36 | 0.29 | -0.11 | -0.83 | [illegible] | -0.17 | [illegible] | [illegible] | -1.07 | [illegible] | [illegible] | [illegible] | [illegible] | [illegible] | [illegible] | [illegible] | 0.78 | 0.00 | 0.93 | 1.68 | 0.15 | 0.13 | 0.02 |
| -0.76 | 1.66 | 0.08 | 0.27 | -0.72 | -0.42 | 0.71 | 0.10 | -0.38 | -0.77 | 0.94 | 0.57 | -0.78 | -0.44 | -0.13 | 0.69 | 0.44 | 1.27 | -0.59 | -0.42 | 0.30 | -0.88 | 0.27 | -0.36 | -0.32 | 0.04 | 0.30 | 0.38 | 0.23 | 0.70 | 0.80 | -0.30 | [illegible] | 0.28 | 0.31 | 0.47 | 0.93 | 0.00 | 0.08 | 0.13 | -0.26 | 0.04 |
| -0.04 | -0.47 | 0.62 | 0.38 | 0.42 | -0.24 | -0.58 | 0.73 | 1.28 | 1.07 | -0.18 | -0.65 | 0.35 | -0.15 | 0.66 | -0.26 | 0.38 | -0.11 | -0.69 | -0.48 | -0.00 | -0.36 | -0.33 | 1.03 | -0.24 | -0.04 | -0.09 | -0.21 | -0.28 | 0.55 | 0.28 | -0.97 | -0.33 | 0.77 | -0.89 | 0.28 | 1.68 | 0.08 | 0.00 | 0.65 | 1.04 | 0.19 |
| 0.02 | -0.39 | 0.04 | 0.30 | -0.23 | -0.06 | 0.10 | 0.46 | 0.44 | 1.02 | -0.18 | -0.85 | 0.42 | -0.93 | 0.90 | 0.55 | 0.55 | 0.66 | 1.06 | 0.58 | -0.43 | 0.45 | -0.00 | -0.45 | 0.38 | -0.69 | -0.15 | 0.66 | 0.95 | -0.34 | -1.08 | 0.00 | 0.27 | 0.19 | -0.40 | 0.37 | 0.15 | 0.13 | 0.65 | 0.00 | -0.05 | -1.18 |
| -0.44 | 0.37 | -0.11 | 0.55 | 0.07 | 0.00 | 0.48 | -0.51 | -0.04 | 0.40 | -0.09 | -1.05 | 0.03 | 0.16 | -0.01 | -0.96 | 0.12 | -0.62 | 0.46 | 0.34 | -0.63 | -0.01 | 0.35 | 0.83 | -0.02 | -1.62 | -0.55 | 0.76 | -0.46 | -2.01 | -0.38 | -0.11 | -0.85 | -0.09 | -0.04 | 0.15 | 0.13 | -0.26 | 1.04 | -0.05 | 0.00 | 1.03 |
| -0.09 | 0.16 | -0.46 | 1.23 | 0.61 | 0.77 | 0.01 | -0.32 | 0.58 | 0.88 | 0.30 | -0.07 | -0.10 | 0.24 | 0.45 | 1.13 | 0.03 | -0.18 | -0.85 | -0.1 | 0.31 | -0.61 | 0.30 | -0.70 | -0.17 | 0.89 | 0.16 | -0.32 | 0.61 | -0.18 | -0.94 | -0.26 | -0.1 | -0.69 | -0.19 | -0.17 | 0.02 | 0.04 | 0.19 | -1.18 | 1.03 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.00 | 0.33 | -0.92 | -0.36 | -0.30 | 0.76 | -0.21 | 0.51 | 0.55 | 1.11 | 0.16 | 0.88 | 0.02 | -0.56 | -0.01 | 0.27 | -0.73 | 0.10 | 0.43 | 0.66 | 0.21 | -0.44 | -0.33 | 0.35 | -0.83 | 0.72 | 0.08 | 0.39 | -0.23 | -0.10 | 1.16 | 0.33 | -0.76 | 0.73 | 0.03 | 0.80 | 0.57 | 0.62 | -0.53 | 0.89 | -1.31 | -0.50 |
| 1.55 | -0.09 | -1.50 | -0.69 | 0.01 | 0.78 | 0.66 | -0.43 | 0.24 | -0.64 | -0.23 | -0.06 | -0.35 | -0.05 | 0.03 | 0.27 | 0.23 | 0.53 | 0.58 | 0.94 | 0.75 | -0.68 | -0.02 | 0.56 | 0.49 | -0.21 | 0.09 | -0.42 | -0.45 | 0.12 | -1.35 | 1.21 | -0.31 | -0.16 | -0.06 | -0.99 | 0.15 | 0.81 | 0.46 | -0.66 | 0.23 | 0.55 |
| -0.37 | 1.25 | 0.18 | 1.39 | -1.0 | 0.27 | -0.94 | -0.42 | 0.87 | -0.06 | -0.37 | -0.40 | -0.97 | 0.68 | 0.21 | -0.12 | 1.08 | 0.65 | -0.17 | -0.28 | 0.86 | 0.39 | -0.83 | 0.94 | -0.86 | -0.85 | -0.1 | 0.27 | -0.74 | -0.53 | -0.07 | 0.88 | 0.18 | 0.50 | 0.46 | -0.54 | 0.47 | 0.04 | 0.21 | 1.05 | -0.30 | 1.08 |
| 0.33 | 0.76 | -0.90 | 0.60 | 0.54 | -0.46 | 0.04 | 0.26 | 0.12 | 0.62 | 0.84 | 0.51 | 0.54 | 0.38 | 0.69 | -0.86 | -0.57 | 0.62 | 1.42 | -0.52 | 0.29 | 0.83 | -0.67 | 0.48 | -0.16 | 0.57 | -0.04 | 0.68 | -0.07 | -0.50 | 0.53 | 0.13 | 0.49 | 0.57 | 0.75 | 0.28 | -0.09 | 1.00 | 1.49 | 0.51 | -0.81 | 0.65 |
| 0.01 | 0.40 | 0.17 | 0.11 | 0.17 | 0.92 | -0.84 | 0.72 | 0.47 | -0.17 | -0.18 | 0.49 | -0.53 | -0.89 | 0.18 | 0.19 | 0.19 | -0.31 | 0.94 | -1.03 | -0.66 | -0.41 | 0.61 | 0.10 | 0.27 | -0.1 | 0.80 | -1.10 | 0.60 | 0.97 | 0.46 | 0.35 | -0.34 | 0.87 | -0.34 | -0.40 | -0.18 | 0.01 | 1.13 | 0.07 | -0.62 | 0.00 |
| 1.56 | -0.47 | 0.24 | 0.50 | 0.22 | 0.17 | -0.21 | 0.64 | 0.47 | 0.04 | 1.29 | 0.32 | -0.19 | -0.32 | 0.76 | -0.80 | -1.26 | -0.58 | 0.90 | 1.33 | -0.30 | -0.24 | 0.19 | 1.30 | 0.70 | -0.04 | 0.03 | 0.01 | -0.51 | 0.62 | 0.32 | -0.67 | -0.64 | 0.20 | 0.69 | 0.46 | 0.36 | 1.23 | 0.67 | -0.44 | 0.07 | 0.04 |
| 1.25 | -0.27 | 0.46 | 0.73 | 0.52 | -0.34 | 0.34 | 0.35 | 0.18 | -0.35 | 1.01 | 0.54 | 0.70 | -0.04 | -0.59 | -0.20 | 1.03 | -0.65 | 0.38 | 0.81 | 0.32 | 0.66 | 0.27 | -1.19 | 0.21 | -0.11 | -0.96 | 0.65 | 0.04 | 0.09 | 0.20 | 0.54 | 0.09 | 0.11 | 0.11 | 0.87 | 0.51 | 0.24 | -0.58 | -0.32 | -0.03 | -0.09 |
| 0.00 | 1.17 | 0.10 | 0.02 | 0.54 | 0.15 | 0.21 | 0.08 | -0.47 | -0.64 | 1.04 | 0.22 | 0.93 | 0.06 | 0.07 | -0.57 | -0.23 | 0.36 | -0.62 | -0.1 | 0.26 | -1.11 | -0.14 | -0.17 | -0.22 | 0.05 | -0.27 | 0.03 | 1.26 | 0.20 | 0.72 | -0.55 | 0.27 | 0.19 | 0.50 | 0.58 | -1.28 | -0.60 | 0.14 | 0.02 | -0.58 | -0.09 |
| 1.17 | 0.00 | 0.09 | 0.07 | -0.41 | 0.33 | 0.59 | 0.33 | 0.86 | -0.36 | -0.01 | 0.25 | -1.07 | 0.47 | -0.41 | -0.05 | 0.25 | 0.50 | -0.57 | -0.42 | -0.38 | -0.24 | 0.21 | -1.28 | -0.17 | 0.42 | 0.08 | -0.11 | 0.04 | -0.22 | -0.15 | 0.03 | 0.03 | -1.0 | 0.23 | 0.49 | 0.42 | 1.86 | -0.24 | -0.43 | 0.18 | 0.11 |
| -0.10 | 0.09 | 0.00 | 0.91 | -0.16 | 0.14 | -0.72 | -0.19 | 0.30 | -0.11 | -0.04 | -1.74 | -0.29 | -0.48 | -0.42 | 1.18 | -0.18 | -0.20 | -1.11 | -0.03 | -1.44 | 0.76 | 0.57 | -0.15 | 0.33 | 1.07 | 0.36 | -0.41 | -1.37 | 0.67 | 0.75 | 0.05 | -0.52 | 0.43 | 0.27 | 1.19 | -0.13 | -0.08 | 0.44 | 0.04 | 0.03 | 0.46 |
| 0.02 | 0.07 | 0.91 | 0.00 | -0.21 | 0.62 | 0.71 | -0.99 | 0.33 | -0.30 | 1.27 | -0.42 | 0.36 | -0.67 | 0.21 | -0.29 | 0.80 | 0.79 | -0.44 | 0.23 | 0.54 | 0.25 | 0.53 | -0.25 | 0.91 | 0.20 | 0.15 | 0.01 | -1.28 | 0.44 | 0.61 | 0.49 | 0.30 | 0.26 | -0.07 | 1.23 | 0.54 | 0.11 | 0.21 | 0.30 | 0.69 | 1.23 |
| 0.54 | -0.41 | -0.16 | -0.21 | 0.00 | 0.14 | 0.70 | -1.44 | -0.95 | -0.04 | -0.63 | 0.48 | 0.24 | -0.59 | -0.93 | 0.15 | -0.40 | -0.36 | 0.34 | -1.29 | 0.71 | -0.78 | 0.48 | 0.03 | -0.62 | 0.60 | -0.69 | -0.04 | 0.22 | -0.10 | 0.00 | 0.78 | 0.99 | 0.01 | 0.64 | -0.04 | -0.56 | -0.45 | 0.72 | -0.34 | -0.19 | 0.49 |
| 0.15 | 0.33 | 0.14 | 0.62 | 0.14 | 0.00 | 0.36 | 0.15 | -0.61 | -0.98 | -1.45 | 1.58 | 1.55 | 0.48 | -0.55 | 0.04 | -0.29 | -0.17 | 1.07 | -0.23 | 0.43 | 1.14 | 1.21 | 0.22 | 0.09 | -0.90 | -0.54 | 0.68 | 0.13 | -0.19 | -0.92 | 0.45 | 0.75 | 0.45 | 0.72 | 0.55 | -0.23 | -0.17 | 0.03 | -0.15 | -0.22 | 0.69 |
| 0.21 | 0.59 | -0.72 | 0.71 | 0.70 | 0.36 | 0.00 | 0.62 | -1.07 | -1.22 | 0.43 | -0.18 | 1.25 | 0.94 | -0.25 | 0.15 | -0.27 | 0.91 | -0.85 | 0.97 | 1.13 | 0.70 | -0.28 | 0.61 | -0.46 | 0.50 | -0.71 | 1.01 | 0.45 | 0.33 | 0.32 | -0.79 | -1.50 | 0.00 | 0.32 | 0.65 | 0.54 | 0.55 | -0.76 | 0.10 | 0.62 | 0.04 |
| 0.08 | 0.33 | -0.19 | -0.99 | -1.44 | 0.15 | 0.62 | 0.00 | 1.05 | 0.04 | 0.50 | -0.06 | -0.82 | 0.34 | -1.21 | 1.0 | -0.43 | -0.17 | -0.74 | -0.12 | 0.26 | 0.25 | 0.69 | -0.08 | -0.88 | 0.15 | -0.23 | 0.29 | 0.38 | 0.07 | 0.60 | 0.06 | 0.77 | -0.03 | -0.41 | -0.01 | 0.19 | -0.06 | 0.55 | 0.46 | -0.37 | -0.32 |
| -0.47 | 0.86 | 0.30 | 0.33 | -0.95 | -0.61 | -1.07 | 1.05 | 0.00 | -0.89 | 0.38 | 0.22 | -0.50 | -0.03 | 1.50 | 0.23 | -0.48 | -0.89 | -0.22 | 0.55 | 0.50 | 0.11 | 0.45 | -0.66 | 0.30 | 0.98 | 0.75 | 0.56 | 0.06 | 0.72 | 0.28 | 0.08 | 0.16 | -0.22 | 0.37 | -1.21 | 0.47 | -0.53 | 1.10 | 0.44 | 0.10 | 0.58 |
| -0.64 | -0.36 | -0.11 | -0.30 | -0.04 | -0.98 | -1.22 | 0.04 | -0.89 | 0.00 | 0.34 | 0.42 | -0.73 | 0.12 | -0.99 | -0.40 | -0.99 | -0.88 | -0.68 | 1.29 | 0.40 | -0.95 | -0.16 | -1.32 | 0.57 | -0.24 | 0.02 | 0.38 | 0.19 | -0.99 | 0.55 | 0.71 | 0.54 | 0.64 | 0.33 | 0.06 | 0.99 | -0.96 | 0.87 | 1.04 | 0.57 | 0.90 |
| 1.04 | -0.01 | -0.04 | 1.27 | -0.63 | -1.45 | 0.43 | 0.50 | 0.38 | 0.34 | 0.00 | -0.91 | -1.64 | 0.74 | -0.41 | -0.63 | -0.07 | -0.73 | 0.02 | 0.42 | -0.75 | -0.30 | -1.49 | 0.42 | -0.41 | 0.37 | -0.40 | -0.17 | 0.59 | -0.29 | 0.12 | 1.33 | 0.44 | -1.22 | -0.54 | 1.46 | 0.02 | 0.78 | -0.36 | -0.18 | 0.05 | 0.30 |
| 0.22 | 0.25 | -1.74 | -0.42 | 0.48 | 1.58 | -0.18 | -0.06 | 0.22 | 0.42 | -0.91 | 0.00 | 0.03 | 1.02 | -0.72 | 0.06 | 0.14 | -0.09 | -0.43 | 0.54 | -0.28 | -0.37 | -0.55 | 0.98 | -0.20 | -0.75 | -0.29 | 0.84 | 0.83 | -0.36 | 0.03 | -0.67 | -0.08 | 0.46 | 1.16 | -1.02 | -0.95 | 0.72 | -0.47 | -0.85 | -1.19 | -0.07 |
| 0.93 | -1.07 | -0.29 | 0.36 | 0.24 | 1.55 | 1.25 | -0.82 | -0.50 | -0.73 | -1.64 | 0.03 | 0.00 | 0.32 | 0.68 | -0.05 | 0.23 | 0.83 | 0.13 | 0.13 | -0.43 | -0.24 | 0.26 | 0.06 | 0.67 | -0.06 | 0.45 | -0.16 | -1.14 | -0.23 | 0.32 | 1.11 | 0.84 | -0.01 | -0.29 | -0.55 | -0.52 | -0.63 | 0.53 | 0.42 | -0.11 | -0.10 |
| 0.06 | 0.47 | -0.48 | -0.67 | -0.59 | 0.48 | 0.94 | 0.34 | -0.03 | 0.12 | 0.74 | 1.02 | 0.32 | 0.00 | [illegible] | [illegible] | [illegible] | [illegible] | [illegible] | [illegible] | [illegible] | [illegible] | [illegible] | [illegible] | -0.64 | -0.34 | 0.18 | 0.85 | 0.89 | 0.49 | 1.11 | -0.19 | -0.65 | 0.84 | 0.85 | -0.68 | 0.16 | -0.60 | -0.33 | -0.93 | 0.30 | 0.24 |
| 0.07 | -0.41 | -0.42 | 0.21 | -0.93 | -0.55 | -0.25 | -1.21 | 1.50 | -0.99 | -0.41 | -0.72 | 0.68 | [illegible] | 0.00 | [illegible] | [illegible] | [illegible] | [illegible] | [illegible] | [illegible] | [illegible] | [illegible] | [illegible] | -0.16 | 0.85 | 0.11 | 0.20 | 0.1 | 0.38 | -0.03 | -0.12 | -0.74 | 0.01 | -0.60 | 0.15 | -0.90 | -0.28 | 0.48 | 0.90 | 0.13 | 0.45 |
| -0.57 | -0.05 | 1.18 | -0.29 | 0.15 | 0.04 | 0.15 | 1.0 | 0.23 | -0.40 | -0.63 | 0.06 | -0.05 | [illegible] | [illegible] | 0.00 | [illegible] | [illegible] | [illegible] | [illegible] | [illegible] | [illegible] | [illegible] | [illegible] | 0.46 | 0.60 | 0.39 | 0.28 | -0.32 | -0.08 | 0.78 | 0.77 | -0.04 | 0.68 | 0.34 | -0.54 | -0.34 | 0.53 | -0.44 | 0.55 | -0.82 | 1.13 |
| -0.23 | 0.25 | -0.18 | 0.80 | -0.40 | -0.29 | -0.27 | -0.43 | -0.48 | -0.99 | -0.07 | 0.14 | 0.23 | [illegible] | [illegible] | [illegible] | 0.00 | [illegible] | [illegible] | [illegible] | [illegible] | [illegible] | [illegible] | [illegible] | 0.98 | 0.75 | -0.81 | -0.16 | -0.56 | 0.30 | 0.11 | 0.92 | 0.58 | 0.26 | 0.47 | 1.00 | 0.33 | 0.28 | 0.20 | 0.55 | 0.26 | 0.03 |
| 0.36 | 0.50 | -0.20 | 0.79 | -0.36 | -0.17 | 0.91 | -0.17 | -0.89 | -0.88 | -0.73 | -0.09 | 0.83 | [illegible] | [illegible] | [illegible] | [illegible] | 0.00 | [illegible] | [illegible] | [illegible] | [illegible] | [illegible] | [illegible] | 0.20 | 0.73 | -0.47 | -0.36 | 0.66 | -0.48 | 0.81 | 0.46 | -0.74 | 0.06 | 0.13 | 0.13 | 0.94 | 1.42 | 0.07 | 0.66 | -0.76 | -0.18 |
| -0.62 | -0.57 | -1.11 | -0.44 | 0.34 | 1.07 | -0.85 | -0.74 | -0.22 | -0.68 | 0.02 | -0.43 | 0.13 | [illegible] | [illegible] | [illegible] | [illegible] | [illegible] | 0.00 | [illegible] | [illegible] | [illegible] | [illegible] | [illegible] | 0.87 | 0.57 | 0.36 | 0.19 | 0.67 | -0.15 | -0.22 | 0.80 | -0.44 | 0.55 | 0.56 | -0.17 | -0.82 | -0.23 | -0.32 | 0.86 | 0.12 | -1.05 |
| -0.1 | -0.42 | -0.03 | 0.23 | -1.29 | -0.23 | 0.97 | -0.12 | 0.55 | 1.29 | 0.42 | 0.54 | 0.13 | [illegible] | [illegible] | [illegible] | [illegible] | [illegible] | [illegible] | 0.00 | [illegible] | [illegible] | [illegible] | [illegible] | 0.78 | 0.23 | 1.24 | 0.61 | -0.94 | -0.31 | 0.19 | 0.10 | 0.43 | 0.49 | 1.01 | 0.17 | 0.36 | -0.58 | -0.66 | 0.58 | 0.48 | -0.1 |
| 0.26 | -0.38 | -1.44 | 0.54 | 0.71 | 0.43 | 1.13 | 0.26 | 0.50 | 0.40 | -0.75 | -0.28 | -0.43 | [illegible] | [illegible] | [illegible] | [illegible] | [illegible] | [illegible] | [illegible] | 0.00 | [illegible] | [illegible] | [illegible] | 0.72 | -0.37 | -0.26 | 1.17 | -0.10 | 0.00 | -0.31 | 0.83 | -0.89 | 0.85 | 1.34 | 0.50 | 0.29 | 0.14 | -0.18 | -0.43 | -0.49 | 0.31 |
| -1.11 | -0.24 | 0.76 | 0.25 | -0.78 | 1.14 | 0.70 | 0.25 | 0.11 | -0.95 | -0.30 | -0.37 | -0.24 | [illegible] | [illegible] | [illegible] | [illegible] | [illegible] | [illegible] | [illegible] | [illegible] | 0.00 | [illegible] | [illegible] | 0.34 | 0.24 | 1.27 | -0.47 | -0.32 | 0.79 | 0.69 | -1.15 | 0.25 | -0.45 | 1.15 | -0.67 | -0.11 | -1.04 | -0.54 | 0.45 | 0.13 | -0.61 |
| -0.14 | 0.21 | 0.57 | 0.53 | 0.48 | 1.21 | -0.28 | 0.69 | 0.45 | -0.16 | -1.49 | -0.55 | 0.26 | [illegible] | [illegible] | [illegible] | [illegible] | [illegible] | [illegible] | [illegible] | [illegible] | [illegible] | 0.00 | [illegible] | 0.64 | -0.46 | -0.52 | 0.22 | 0.13 | 0.38 | 0.03 | -0.12 | 0.77 | -0.20 | -0.35 | -0.37 | -0.82 | 0.10 | -0.52 | 0.01 | 0.50 | 0.31 |
| -0.17 | -1.28 | -0.15 | -0.25 | 0.03 | 0.22 | 0.61 | -0.08 | -0.66 | -1.32 | 0.42 | 0.98 | 0.06 | [illegible] | [illegible] | [illegible] | [illegible] | [illegible] | [illegible] | [illegible] | [illegible] | [illegible] | [illegible] | 0.00 | 0.47 | 0.05 | -0.07 | 0.89 | -0.91 | -0.09 | 0.27 | 0.13 | -0.45 | -0.96 | -0.93 | 1.07 | 1.00 | -0.20 | 1.21 | -0.45 | 0.69 | -0.70 |
| -0.22 | -0.17 | 0.33 | 0.91 | -0.62 | 0.09 | -0.46 | -0.88 | 0.30 | 0.57 | -0.41 | -0.20 | 0.67 | -0.64 | -0.16 | 0.46 | 0.98 | 0.20 | 0.87 | 0.78 | 0.72 | 0.34 | 0.64 | 0.47 | 0.00 | -1.05 | 1.0 | 0.14 | 0.19 | -0.02 | 0.93 | 0.31 | -0.87 | 0.41 | -0.06 | -1.09 | -0.22 | -0.12 | -0.02 | 0.33 | -0.21 | -0.22 |
| 0.05 | 0.42 | 1.07 | 0.20 | 0.60 | -0.90 | 0.50 | 0.15 | 0.98 | -0.24 | 0.37 | -0.75 | -0.06 | -0.34 | 0.85 | 0.60 | 0.75 | 0.73 | 0.57 | 0.23 | -0.37 | 0.24 | -0.46 | 0.05 | -1.05 | 0.00 | 0.95 | -0.74 | 0.52 | -0.45 | -0.84 | -0.81 | 0.02 | 0.19 | 0.27 | -1.15 | -0.34 | -0.12 | -0.22 | 0.69 | -1.48 | 0.89 |
| -0.27 | 0.08 | 0.36 | 0.15 | -0.69 | -0.54 | -0.71 | -0.23 | 0.75 | 0.02 | -0.40 | -0.29 | 0.45 | 0.18 | 0.11 | 0.39 | -0.81 | -0.47 | 0.36 | 1.24 | -0.26 | 1.27 | -0.52 | -0.07 | 1.0 | 0.95 | 0.00 | 0.39 | 0.59 | 0.63 | -0.45 | 0.34 | -0.37 | 0.52 | 0.28 | -0.06 | 0.76 | 0.15 | -0.27 | -0.15 | -0.41 | 0.16 |
| 0.03 | -0.11 | -0.41 | 0.01 | -0.04 | 0.68 | 1.01 | 0.29 | 0.56 | 0.38 | -0.17 | 0.84 | -0.16 | 0.85 | 0.20 | 0.28 | -0.16 | -0.36 | 0.19 | 0.61 | 1.17 | -0.47 | 0.22 | 0.89 | 0.14 | -0.74 | 0.39 | 0.00 | -0.62 | -0.25 | 0.42 | -0.02 | -0.07 | 0.58 | -0.11 | 0.58 | -1.07 | 0.23 | -0.38 | 0.66 | 0.91 | -0.32 |
| 1.26 | 0.04 | -1.37 | -1.28 | 0.22 | 0.13 | 0.45 | 0.38 | 0.06 | 0.19 | 0.59 | 0.83 | -1.14 | 0.89 | 0.1 | -0.32 | -0.56 | 0.66 | 0.67 | -0.94 | -0.10 | -0.32 | 0.13 | -0.91 | 0.19 | 0.52 | 0.59 | -0.62 | 0.00 | 0.73 | -0.13 | -0.62 | -0.35 | 0.09 | -0.55 | 0.53 | -0.08 | 0.07 | -0.46 | 0.95 | -0.32 | 0.61 |
| 0.20 | -0.22 | 0.67 | 0.44 | -0.10 | -0.19 | 0.33 | 0.07 | 0.72 | -0.99 | -0.29 | -0.36 | -0.23 | 0.49 | 0.38 | -0.08 | 0.30 | -0.48 | -0.15 | -0.31 | 0.00 | 0.79 | 0.38 | -0.09 | -0.02 | -0.45 | 0.63 | -0.25 | 0.73 | 0.00 | -0.73 | -0.89 | 0.28 | -0.25 | 1.07 | -0.31 | 0.79 | 0.31 | 0.14 | -0.11 | -1.64 | 0.05 |
| 0.72 | -0.15 | 0.75 | 0.61 | 0.00 | -0.92 | 0.32 | 0.60 | 0.28 | 0.55 | 0.12 | 0.03 | 0.32 | 1.11 | -0.03 | 0.78 | 0.11 | 0.81 | -0.22 | 0.19 | -0.31 | 0.69 | 0.03 | 0.27 | 0.93 | -0.84 | -0.45 | 0.42 | -0.13 | -0.73 | 0.00 | 0.58 | -1.10 | -0.23 | 1.14 | 0.64 | -0.91 | 1.03 | 0.53 | -1.16 | -0.60 | -1.01 |
| -0.55 | 0.03 | 0.05 | 0.49 | 0.78 | 0.45 | -0.79 | 0.06 | 0.08 | 0.71 | 1.33 | -0.67 | 1.11 | -0.19 | -0.12 | 0.77 | 0.92 | 0.46 | 0.80 | 0.10 | 0.83 | -1.15 | -0.12 | 0.13 | 0.31 | -0.81 | 0.34 | -0.02 | -0.62 | -0.89 | 0.58 | 0.00 | 0.14 | -0.90 | 0.35 | -0.33 | 0.52 | 0.32 | -0.71 | -0.08 | -0.33 | -0.34 |
| 0.27 | 0.03 | -0.52 | 0.30 | 0.99 | 0.75 | -1.50 | 0.77 | 0.16 | 0.54 | 0.44 | -0.08 | 0.84 | -0.65 | -0.74 | -0.04 | 0.58 | -0.74 | -0.44 | 0.43 | -0.89 | 0.25 | 0.77 | -0.45 | -0.87 | 0.02 | -0.37 | -0.07 | -0.35 | 0.28 | -1.10 | 0.14 | 0.00 | 1.50 | -0.18 | 0.81 | 0.98 | -0.46 | -0.51 | 0.27 | -0.71 | -0.1 |
| 0.19 | -1.0 | 0.43 | 0.26 | 0.01 | 0.45 | 0.00 | -0.03 | -0.22 | 0.64 | -1.22 | 0.46 | -0.01 | 0.84 | 0.01 | 0.68 | 0.26 | 0.06 | 0.55 | 0.49 | 0.85 | -0.45 | -0.20 | -0.96 | 0.41 | 0.19 | 0.52 | 0.58 | 0.09 | -0.25 | 0.23 | -0.90 | 1.50 | 0.00 | -0.29 | 0.37 | 0.60 | 0.76 | 0.59 | 0.19 | 0.05 | -0.69 |
| 0.50 | 0.23 | 0.27 | -0.07 | 0.64 | 0.72 | 0.32 | -0.41 | 0.37 | 0.33 | -0.54 | 1.16 | -0.29 | 0.85 | -0.60 | 0.34 | 0.47 | 0.13 | 0.56 | 1.01 | 1.34 | 1.15 | -0.35 | -0.93 | -0.06 | 0.27 | 0.28 | -0.11 | -0.55 | 1.07 | 1.14 | 0.35 | -0.18 | -0.29 | 0.00 | -0.19 | 0.27 | 0.15 | -1.07 | -0.40 | 0.1 | -0.19 |
| 0.58 | 0.49 | 1.19 | 1.23 | -0.04 | 0.55 | 0.65 | -0.01 | -1.21 | 0.06 | 1.46 | -1.02 | -0.55 | -0.68 | 0.15 | -0.54 | 1.00 | 0.13 | -0.17 | 0.17 | 0.50 | -0.67 | -0.37 | 1.07 | -1.09 | -1.15 | -0.06 | 0.58 | 0.53 | -0.31 | 0.64 | -0.33 | 0.81 | 0.37 | -0.19 | 0.00 | -0.66 | 0.19 | -0.03 | 0.49 | 0.42 | -0.04 |
| -1.28 | 0.42 | -0.13 | 0.54 | -0.56 | -0.23 | 0.54 | 0.19 | 0.47 | 0.99 | 0.02 | -0.95 | -0.52 | 0.16 | -0.90 | -0.34 | 0.33 | 0.94 | -0.82 | 0.36 | 0.29 | -0.11 | -0.82 | 1.00 | -0.22 | -0.34 | 0.76 | -1.07 | -0.08 | 0.79 | -0.91 | 0.52 | 0.98 | 0.60 | 0.27 | -0.66 | 0.00 | 0.78 | 1.51 | 0.36 | 0.27 | 0.02 |
| -0.60 | 1.86 | -0.08 | 0.11 | -0.45 | -0.17 | 0.55 | -0.06 | -0.53 | -0.96 | 0.78 | 0.72 | -0.63 | -0.60 | -0.28 | 0.53 | 0.28 | 1.42 | -0.23 | -0.58 | 0.14 | -1.04 | 0.10 | -0.20 | -0.12 | -0.12 | 0.15 | 0.23 | 0.07 | 0.31 | 1.03 | 0.32 | -0.46 | 0.76 | 0.15 | 0.19 | 0.78 | 0.00 | 0.41 | 1.27 | -0.55 | -0.12 |
| 0.14 | -0.24 | 0.44 | 0.21 | 0.72 | 0.03 | -0.76 | 0.55 | 1.10 | 0.87 | -0.36 | -0.47 | 0.53 | -0.33 | 0.48 | -0.44 | 0.20 | 0.07 | -0.32 | -0.66 | -0.18 | -0.54 | -0.52 | 1.21 | -0.02 | -0.22 | -0.27 | -0.38 | -0.46 | 0.14 | 0.53 | -0.71 | -0.51 | 0.59 | -1.07 | -0.03 | 1.51 | 0.41 | 0.00 | 0.47 | 0.72 | 0.01 |
| 0.02 | -0.43 | 0.04 | 0.30 | -0.34 | -0.15 | 0.10 | 0.46 | 0.44 | 1.04 | -0.18 | -0.85 | 0.42 | -0.93 | 0.90 | 0.55 | 0.55 | 0.66 | 0.86 | 0.58 | -0.43 | 0.45 | 0.01 | -0.45 | 0.33 | 0.69 | -0.15 | 0.66 | 0.95 | -0.11 | 1.16 | -0.08 | 0.27 | 0.19 | -0.40 | 0.49 | 0.36 | 1.27 | 0.47 | 0.00 | 0.09 | -1.18 |
| -0.58 | 0.18 | 0.03 | 0.69 | -0.19 | -0.22 | 0.62 | -0.37 | 0.10 | 0.57 | 0.05 | -1.19 | -0.11 | 0.30 | 0.13 | -0.82 | 0.26 | -0.76 | 0.12 | 0.48 | -0.49 | 0.13 | 0.50 | 0.69 | -0.21 | -1.48 | 0.41 | 0.91 | -0.32 | -1.64 | -0.60 | -0.33 | -0.71 | 0.05 | 0.1 | 0.42 | 0.27 | -0.55 | 0.72 | 0.09 | 0.00 | 1.17 |
| -0.09 | 0.11 | -0.46 | 1.23 | 0.49 | 0.69 | 0.04 | -0.32 | 0.58 | 0.90 | 0.30 | -0.07 | -0.10 | 0.24 | 0.45 | 1.13 | 0.03 | -0.18 | -1.05 | -0.1 | 0.31 | -0.61 | 0.31 | -0.70 | -0.22 | 0.89 | 0.16 | -0.32 | 0.61 | 0.05 | -1.01 | -0.34 | -0.1 | -0.69 | -0.19 | -0.04 | 0.02 | -0.12 | 0.01 | -1.18 | 1.17 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.24 | 0.23 | -0.82 | -0.27 | -0.41 | 0.67 | -0.11 | 0.42 | 0.45 | 1.21 | 0.26 | 0.77 | -0.10 | -0.46 | 0.38 | 0.15 | -0.83 | 0.08 | 0.33 | 0.75 | -0.12 | -0.54 | -0.43 | -0.17 | -0.74 | 0.63 | -0.02 | 0.48 | -0.33 | -0.28 | 1.25 | 0.43 | -0.86 | 0.64 | 0.13 | 0.89 | 0.47 | 0.52 | -0.63 | -0.98 | -1.22 | -0.41 |
| 1.72 | -0.06 | -1.53 | -0.72 | 0.06 | 0.81 | 0.63 | -0.40 | 0.27 | -0.67 | -0.26 | -0.02 | -0.30 | -0.08 | -0.30 | 0.32 | -0.20 | 0.56 | 0.61 | 0.90 | 0.72 | -0.65 | 0.01 | 0.46 | 0.46 | -0.18 | 0.12 | -0.45 | -0.47 | 0.15 | -1.38 | 1.18 | -0.28 | -0.13 | -0.16 | -1.02 | 0.18 | 0.84 | 0.49 | -0.63 | 0.19 | 0.57 |
| -0.23 | 1.25 | 0.18 | 1.39 | -0.98 | 0.27 | -0.94 | -0.42 | 0.87 | -0.06 | -0.37 | 0.39 | -0.94 | 0.68 | -0.09 | -0.1 | 1.08 | 0.65 | -0.17 | -0.28 | 0.86 | 0.39 | -0.83 | 0.86 | -0.86 | -0.85 | 0.1 | 0.27 | 0.74 | -0.53 | -0.07 | 0.88 | 0.18 | 0.50 | 0.39 | -0.54 | 0.47 | 0.04 | 0.23 | 1.05 | 0.30 | -1.08 |
| 0.47 | 0.76 | -0.90 | 0.60 | 0.55 | -0.46 | 0.04 | 0.26 | 0.12 | 0.62 | 0.84 | 0.52 | 0.56 | 0.38 | 0.39 | -0.84 | -0.57 | 0.62 | 1.42 | 0.52 | 0.29 | 0.83 | -0.62 | 0.41 | -0.16 | 0.57 | -0.04 | 0.68 | -0.07 | -0.50 | 0.53 | 0.13 | 0.49 | 0.57 | 0.81 | 0.28 | -0.09 | 1.08 | 1.49 | 0.51 | -0.81 | 0.65 |
| 0.15 | 0.10 | 0.17 | 0.11 | 0.18 | 0.92 | -0.84 | 0.72 | 0.47 | -0.17 | -0.18 | 0.50 | -0.51 | -0.89 | -0.12 | 0.21 | 0.19 | -0.31 | 0.94 | -1.03 | -0.66 | -0.41 | 0.61 | 0.03 | 0.27 | -0.1 | 0.00 | -1.10 | 0.60 | 0.97 | 0.46 | 0.35 | -0.34 | 0.87 | 0.41 | -0.40 | -0.10 | 0.01 | 1.13 | -0.07 | 0.62 | 0.00 |
| 1.38 | -0.51 | 0.28 | 0.54 | 0.16 | 0.13 | -0.17 | 0.60 | 0.43 | -0.00 | 1.33 | 0.27 | 0.25 | 0.28 | 1.10 | -0.87 | -1.30 | -0.62 | 0.93 | 1.37 | -0.26 | -0.20 | 0.15 | -1.18 | 0.74 | -0.08 | -0.07 | 0.05 | -0.55 | 0.58 | 0.36 | 0.62 | -0.68 | 0.16 | -0.58 | 0.50 | -0.40 | 1.18 | 0.63 | -0.48 | 0.12 | 0.08 |
| 1.11 | -0.27 | 0.46 | 0.73 | 0.50 | 0.34 | 0.34 | 0.35 | 0.18 | -0.35 | 1.01 | 0.53 | 0.67 | 0.04 | -0.29 | -0.23 | 1.03 | -0.65 | -0.38 | -0.81 | 0.32 | 0.66 | 0.27 | -1.11 | 0.21 | -0.11 | -0.96 | 0.65 | 0.04 | 0.09 | -0.20 | 0.54 | -0.09 | -0.11 | 0.17 | 0.87 | 0.51 | 0.24 | -0.58 | -0.32 | -0.03 | -0.09 |
| 0.00 | 1.31 | -0.24 | -0.12 | 0.69 | 0.29 | 0.07 | 0.22 | -0.33 | -0.78 | 0.90 | 0.36 | 1.10 | -0.08 | -0.36 | -0.40 | -0.09 | -0.22 | -0.49 | -0.24 | 0.12 | -0.97 | 0.00 | -0.39 | -0.35 | 0.19 | 0.13 | 0.11 | 1.40 | 0.34 | 0.58 | 0.69 | 0.41 | 0.32 | 0.30 | 0.44 | -1.14 | -0.46 | 0.28 | 0.16 | 0.72 | 0.23 |
| 1.31 | 0.00 | 0.09 | 0.07 | -0.39 | 0.33 | 0.59 | 0.33 | 0.86 | -0.36 | -0.01 | 0.26 | -1.05 | -0.47 | -0.71 | -0.03 | 0.25 | 0.50 | -0.57 | -0.42 | -0.30 | -0.24 | 0.21 | 1.36 | 0.17 | 0.42 | 0.08 | -0.11 | 0.04 | -0.22 | -0.15 | -0.03 | 0.03 | -1.0 | 0.17 | 0.49 | 0.42 | 1.86 | -0.24 | -0.43 | 0.18 | 0.11 |
| -0.24 | 0.09 | 0.00 | 0.91 | -0.18 | 0.14 | -0.72 | -0.19 | 0.30 | -0.11 | -0.04 | -1.75 | -0.31 | -0.48 | -0.12 | 1.15 | -0.18 | -0.20 | 1.11 | 0.03 | -1.44 | 0.76 | 0.57 | -0.08 | 0.33 | 1.07 | 0.36 | -0.41 | -1.37 | 0.67 | 0.75 | 0.05 | 0.52 | 0.43 | 0.34 | 1.19 | -0.13 | -0.08 | 0.44 | 0.04 | 0.03 | -0.46 |
| 0.12 | 0.07 | 0.91 | 0.00 | -0.23 | 0.62 | 0.71 | -0.99 | 0.33 | -0.30 | 1.27 | -0.43 | 0.34 | 0.62 | 0.51 | 0.31 | 0.80 | 0.79 | -0.44 | 0.23 | 0.54 | 0.25 | 0.53 | -0.17 | 0.91 | 0.20 | 0.15 | 0.01 | 1.28 | 0.44 | 0.61 | 0.49 | 0.30 | 0.26 | -0.01 | 1.23 | 0.54 | 0.11 | 0.21 | 0.30 | 0.69 | 1.23 |
| 0.69 | -0.39 | -0.18 | -0.23 | 0.00 | 0.16 | 0.69 | -1.43 | -0.94 | -0.05 | -0.64 | 0.51 | 0.28 | -0.61 | -1.24 | 0.18 | -0.38 | -0.34 | 0.36 | -1.30 | 0.69 | -0.26 | 0.49 | -0.06 | -0.64 | 0.61 | -0.68 | -0.05 | 0.23 | -0.08 | -0.01 | 0.77 | 1.01 | 0.00 | 0.56 | -0.05 | -0.54 | -0.43 | 0.73 | -0.33 | -0.20 | 0.48 |
| 0.29 | 0.33 | 0.14 | 0.62 | 0.16 | 0.00 | 0.36 | 0.15 | -0.61 | -0.98 | -1.45 | 1.59 | 1.57 | 0.48 | -0.85 | 0.07 | -0.29 | -0.17 | 1.07 | -0.23 | 0.43 | 1.14 | 1.21 | 0.14 | 0.09 | -0.90 | -0.54 | 0.68 | 0.13 | -0.19 | -0.92 | 0.45 | 0.75 | 0.45 | 0.66 | 0.55 | -0.23 | -0.17 | 0.03 | -0.15 | -0.22 | 0.69 |
| 0.07 | 0.59 | -0.72 | 0.71 | 0.69 | 0.36 | 0.00 | 0.62 | -1.07 | -1.22 | 0.43 | -0.19 | 1.23 | 0.94 | 0.04 | 0.13 | -0.27 | 0.91 | -0.85 | 0.97 | 1.13 | 0.70 | -0.28 | 0.68 | -0.46 | 0.50 | -0.71 | 1.01 | 0.45 | 0.33 | 0.32 | -0.79 | -1.50 | 0.00 | 0.39 | 0.65 | 0.54 | 0.55 | -0.76 | 0.10 | 0.62 | 0.04 |
| 0.22 | 0.33 | -0.19 | -0.99 | -1.43 | 0.15 | 0.62 | 0.00 | 1.05 | 0.04 | 0.50 | -0.05 | -0.80 | 0.34 | -0.50 | 1.02 | -0.43 | -0.17 | -0.74 | -0.12 | 0.26 | 0.25 | 0.69 | -0.16 | -0.88 | 0.15 | -0.23 | 0.29 | 0.38 | 0.07 | 0.60 | 0.06 | 0.77 | -0.03 | -0.47 | -0.01 | 0.19 | -0.06 | 0.55 | 0.46 | -0.37 | -0.32 |
| -0.33 | 0.86 | 0.30 | 0.33 | -0.94 | -0.61 | -1.07 | 1.05 | 0.00 | -0.89 | 0.38 | 0.23 | -0.48 | -0.03 | 1.20 | 0.25 | -0.48 | -0.89 | -0.22 | 0.55 | 0.50 | 0.11 | 0.45 | -0.74 | 0.30 | 0.98 | 0.75 | 0.56 | 0.06 | 0.72 | 0.28 | 0.08 | 0.16 | -0.22 | 0.30 | -1.21 | 0.47 | -0.53 | 1.10 | 0.44 | 0.10 | 0.58 |
| -0.78 | -0.36 | -0.11 | -0.30 | -0.05 | -0.98 | -1.22 | 0.04 | -0.89 | 0.00 | 0.34 | 0.41 | -0.76 | 0.12 | -0.70 | -0.42 | -0.99 | -0.88 | -0.68 | 1.29 | 0.40 | -0.95 | -0.16 | -1.25 | 0.57 | -0.24 | 0.02 | 0.38 | 0.19 | -0.99 | 0.55 | 0.71 | 0.54 | 0.64 | 0.39 | 0.06 | 0.99 | -0.96 | 0.87 | 1.04 | 0.57 | 0.90 |
| 0.90 | -0.01 | -0.04 | 1.27 | -0.64 | -1.45 | 0.43 | 0.50 | 0.38 | 0.34 | 0.00 | -0.92 | -1.66 | 0.74 | -0.12 | -0.65 | -0.07 | -0.73 | 0.02 | 0.42 | 0.75 | -0.30 | -1.49 | 0.49 | -0.41 | 0.37 | -0.40 | -0.17 | 0.59 | -0.29 | 0.12 | 1.33 | 0.44 | -1.22 | -0.48 | 1.46 | 0.02 | 0.78 | -0.36 | -0.18 | 0.05 | 0.30 |
| 0.36 | 0.26 | -1.75 | -0.43 | 0.51 | 1.59 | -0.19 | -0.05 | 0.23 | 0.41 | -0.92 | 0.00 | 0.07 | 1.01 | -1.02 | -0.03 | -0.13 | -0.08 | -0.42 | 0.53 | -0.29 | 0.38 | -0.54 | 0.90 | -0.21 | -0.74 | -0.28 | 0.83 | -0.82 | -0.35 | 0.02 | -0.68 | -0.07 | 0.47 | 1.08 | -1.03 | -0.94 | 0.74 | -0.46 | -0.84 | -1.20 | -0.08 |
| 1.10 | -1.05 | -0.31 | 0.34 | 0.28 | 1.57 | 1.23 | -0.80 | -0.48 | -0.76 | -1.66 | 0.07 | 0.00 | 0.30 | 0.36 | -0.00 | 0.25 | 1.37 | 0.15 | 0.10 | -0.45 | -0.21 | 0.29 | -0.04 | 0.65 | -0.04 | 0.48 | -0.18 | -1.12 | -0.21 | 0.30 | 1.08 | 0.86 | 0.01 | -0.38 | -0.58 | -0.50 | -0.60 | 0.55 | 0.44 | -0.14 | -0.12 |
| -0.08 | -0.47 | -0.48 | -0.62 | -0.61 | 0.48 | 0.94 | 0.34 | -0.03 | 0.12 | 0.74 | 1.01 | 0.30 | 0.00 | -0.42 | 0.13 | 0.83 | 0.81 | -0.35 | 0.86 | 0.70 | -0.05 | 0.32 | 0.55 | 0.64 | -0.34 | 0.18 | 0.85 | 0.89 | 0.49 | 1.11 | -0.19 | -0.65 | 0.84 | 0.92 | -0.68 | 0.16 | -0.60 | -0.33 | -0.93 | 0.30 | 0.24 |
| -0.36 | -0.71 | -0.12 | 0.51 | -1.24 | -0.85 | 0.04 | -0.50 | 1.20 | -0.70 | -0.12 | -1.02 | 0.36 | -0.42 | 0.00 | 1.08 | 0.12 | 1.26 | -0.66 | -0.17 | 1.22 | -0.17 | 0.73 | -0.09 | 0.13 | 0.56 | -0.40 | 0.50 | -0.20 | 0.09 | 0.27 | 0.17 | -1.03 | -0.29 | -0.24 | 0.45 | -1.19 | -0.58 | 0.19 | 0.60 | 0.42 | 0.74 |
| -0.40 | -0.03 | 1.15 | -0.31 | 0.18 | 0.07 | 0.13 | 1.02 | 0.25 | -0.42 | -0.65 | -0.03 | -0.00 | 0.13 | 1.08 | 0.00 | 0.11 | -0.07 | 0.63 | 0.60 | -0.02 | 0.08 | 1.16 | -0.09 | -0.48 | 0.62 | 0.41 | 0.25 | -0.30 | -0.06 | 0.76 | 0.75 | -0.02 | 0.71 | 0.25 | -0.57 | -0.32 | 0.55 | -0.42 | 0.58 | -0.85 | 1.11 |
| -0.09 | 0.25 | -0.18 | 0.80 | -0.38 | -0.29 | -0.27 | -0.43 | -0.48 | -0.99 | -0.07 | -0.13 | 0.25 | 0.83 | 0.12 | 0.11 | 0.00 | 0.74 | 0.52 | -0.20 | -0.18 | -0.31 | 0.43 | -1.06 | -0.98 | 0.75 | -0.81 | -0.16 | -0.56 | 0.30 | 0.11 | 0.92 | 0.58 | 0.26 | 0.41 | 1.00 | 0.33 | 0.28 | 0.20 | 0.55 | 0.26 | 0.03 |
| -0.22 | 0.50 | -0.20 | 0.79 | -0.34 | -0.17 | 0.91 | -0.17 | -0.89 | -0.88 | -0.73 | -0.08 | 1.37 | 0.81 | 1.26 | -0.07 | 0.74 | 0.00 | 0.13 | -1.43 | 0.65 | 0.29 | 0.59 | -0.67 | 0.20 | 0.73 | -0.47 | -0.36 | 0.66 | -0.48 | 0.81 | 0.46 | -0.74 | 0.06 | 0.07 | 0.13 | 0.94 | 1.42 | 0.07 | 0.66 | -0.76 | -0.18 |
| -0.49 | -0.57 | -1.11 | -0.44 | 0.36 | 1.07 | -0.85 | -0.74 | -0.22 | -0.58 | 0.02 | -0.42 | 0.25 | -0.35 | -0.66 | 0.63 | 0.52 | 0.13 | 0.00 | -0.02 | -0.88 | -0.50 | 0.77 | -0.62 | -0.87 | 0.57 | 0.36 | 0.19 | 0.67 | -0.15 | -0.22 | 0.80 | -0.44 | 0.55 | 0.50 | -0.17 | -0.82 | -0.23 | -0.32 | 0.86 | 0.12 | -1.05 |
| -0.24 | -0.42 | -0.03 | 0.23 | -1.30 | -0.23 | 0.97 | -0.12 | 0.55 | 1.29 | 0.42 | 0.53 | 0.10 | 0.86 | -0.17 | 0.60 | -0.20 | -1.43 | -0.02 | 0.00 | -0.46 | 0.44 | -1.19 | 0.85 | -0.78 | 0.23 | 1.24 | 0.61 | -0.94 | -0.31 | 0.19 | 0.10 | 0.43 | 0.49 | 1.07 | 0.17 | 0.36 | -0.58 | -0.66 | 0.58 | 0.48 | -0.1 |
| 0.12 | -0.38 | -1.44 | 0.54 | 0.69 | 0.43 | 1.13 | 0.26 | 0.50 | 0.40 | 0.75 | -0.29 | -0.45 | 0.70 | 1.22 | -0.02 | -0.18 | 0.65 | -0.88 | -0.46 | 0.00 | 0.75 | 0.82 | -0.78 | 0.72 | -0.37 | -0.26 | 1.17 | -0.10 | 0.00 | -0.31 | 0.83 | -0.89 | 0.85 | 1.40 | 0.50 | 0.29 | 0.14 | -0.38 | -0.43 | -0.49 | 0.31 |
| -0.97 | -0.24 | 0.76 | 0.25 | -0.26 | 1.14 | 0.70 | 0.25 | 0.11 | -0.95 | -0.30 | 0.38 | -0.21 | -0.05 | -0.17 | 0.08 | -0.31 | 0.29 | -0.50 | 0.44 | 0.75 | 0.00 | 0.92 | 0.33 | 0.34 | 0.24 | 1.27 | -0.47 | -0.32 | 0.79 | 0.69 | -1.15 | 0.25 | -0.45 | 1.08 | -0.67 | -0.11 | -1.04 | -0.54 | 0.45 | 0.13 | -0.61 |
| 0.00 | 0.21 | 0.57 | 0.53 | 0.49 | 1.21 | -0.28 | 0.69 | 0.45 | -0.16 | -1.49 | -0.54 | 0.29 | 0.32 | 0.73 | 1.16 | 0.43 | 0.59 | 0.77 | -1.19 | 0.82 | 0.92 | 0.00 | 1.30 | -0.64 | -0.46 | -0.52 | 0.22 | 0.13 | 0.38 | 0.03 | -0.12 | 0.77 | -0.20 | -0.42 | -0.37 | -0.82 | 0.10 | -0.52 | 0.01 | 0.50 | 0.31 |
| -0.39 | -1.36 | -0.08 | -0.17 | -0.06 | 0.14 | 0.60 | -0.16 | -0.74 | -1.25 | 0.49 | 0.90 | -0.04 | 0.55 | -0.09 | -0.09 | -1.06 | -0.67 | -0.62 | 0.85 | -0.78 | 0.33 | 1.30 | 0.00 | 0.55 | -0.02 | -0.15 | 0.97 | -0.98 | -0.17 | 0.34 | 0.21 | -0.53 | -1.03 | -0.79 | 1.15 | 0.93 | -0.28 | 1.13 | -0.53 | 0.76 | -0.62 |
| -0.35 | -0.17 | 0.33 | 0.91 | -0.64 | 0.09 | -0.46 | -0.08 | 0.30 | 0.57 | -0.41 | -0.21 | 0.65 | 0.64 | 0.13 | -0.48 | -0.98 | 0.20 | -0.87 | -0.78 | 0.72 | 0.34 | -0.64 | 0.55 | 0.00 | -1.05 | 1.0 | 0.14 | 0.19 | -0.02 | 0.93 | 0.31 | -0.87 | 0.41 | 0.01 | -1.09 | -0.22 | -0.12 | -0.02 | 0.33 | -0.21 | -0.22 |
| 0.19 | 0.42 | 1.07 | 0.20 | 0.61 | -0.90 | 0.50 | 0.15 | 0.98 | -0.24 | 0.37 | -0.74 | -0.04 | -0.34 | 0.56 | 0.62 | 0.75 | 0.73 | 0.57 | 0.23 | -0.37 | 0.24 | -0.46 | -0.02 | -1.05 | 0.00 | 0.95 | -0.74 | 0.52 | 0.45 | -0.84 | -0.81 | 0.02 | 0.19 | 0.20 | -1.15 | -0.34 | -0.12 | -0.22 | 0.69 | -1.48 | 0.89 |
| -0.13 | 0.08 | 0.36 | 0.15 | -0.68 | -0.54 | -0.71 | -0.23 | 0.75 | 0.02 | -0.40 | 0.28 | 0.48 | 0.18 | -0.40 | 0.41 | -0.81 | -0.47 | 0.36 | 1.24 | -0.26 | 1.27 | -0.52 | -0.15 | 1.0 | 0.95 | 0.00 | 0.39 | 0.59 | 0.63 | -0.45 | 0.34 | -0.37 | 0.52 | 0.22 | -0.06 | 0.76 | 0.15 | -0.27 | -0.15 | -0.41 | 0.16 |
| -0.11 | -0.11 | -0.41 | 0.01 | -0.05 | 0.68 | 1.01 | 0.29 | 0.56 | 0.38 | -0.17 | 0.83 | -0.18 | 0.85 | 0.50 | 0.25 | -0.16 | -0.36 | 0.19 | 0.61 | 1.17 | -0.47 | 0.22 | 0.97 | 0.14 | -0.74 | 0.39 | 0.00 | -0.62 | -0.25 | 0.42 | -0.02 | -0.07 | 0.58 | -0.04 | 0.58 | -1.07 | 0.23 | -0.38 | 0.66 | 0.91 | -0.32 |
| 1.40 | 0.04 | -1.37 | -1.28 | 0.23 | 0.13 | 0.45 | 0.38 | 0.06 | 0.19 | 0.59 | -0.82 | -1.12 | 0.89 | -0.20 | -0.30 | -0.56 | 0.66 | 0.67 | -0.94 | -0.10 | -0.32 | 0.13 | -0.98 | 0.19 | 0.52 | 0.59 | -0.62 | 0.00 | 0.73 | -0.13 | -0.62 | -0.35 | 0.09 | -0.62 | 0.53 | -0.08 | 0.07 | -0.46 | 0.95 | -0.32 | 0.61 |
| 0.34 | -0.22 | 0.67 | 0.44 | -0.08 | -0.19 | 0.33 | 0.07 | 0.72 | -0.99 | -0.29 | -0.35 | -0.21 | 0.49 | 0.09 | -0.06 | 0.30 | -0.48 | -0.15 | -0.31 | 0.00 | 0.79 | 0.38 | -0.17 | -0.02 | 0.45 | 0.63 | -0.25 | 0.73 | 0.00 | -0.73 | -0.89 | 0.28 | -0.25 | 1.01 | -0.31 | 0.79 | 0.31 | 0.14 | -0.11 | -1.64 | 0.05 |
| 0.58 | -0.15 | 0.75 | 0.61 | -0.01 | -0.92 | 0.32 | 0.60 | 0.28 | 0.55 | 0.12 | 0.02 | 0.30 | 1.11 | 0.27 | 0.76 | 0.11 | 0.81 | -0.22 | 0.19 | -0.31 | 0.69 | 0.03 | 0.34 | 0.93 | -0.84 | -0.45 | 0.42 | -0.13 | -0.73 | 0.00 | 0.58 | -1.10 | -0.23 | 1.20 | 0.64 | -0.91 | 1.03 | 0.53 | -1.16 | -0.60 | -1.01 |
| -0.69 | -0.03 | 0.05 | 0.49 | 0.77 | 0.45 | -0.79 | 0.06 | 0.08 | 0.71 | 1.33 | -0.68 | 1.08 | -0.19 | 0.17 | 0.75 | 0.92 | 0.46 | 0.80 | 0.10 | 0.83 | -1.15 | -0.12 | 0.21 | 0.31 | -0.81 | 0.34 | -0.02 | -0.62 | 0.89 | 0.58 | 0.00 | 0.14 | -0.90 | 0.42 | -0.33 | 0.52 | 0.32 | -0.71 | -0.08 | -0.33 | -0.34 |
| 0.41 | 0.03 | -0.52 | 0.30 | 1.01 | 0.75 | -1.50 | 0.77 | 0.16 | 0.54 | 0.44 | -0.07 | 0.86 | -0.65 | -1.03 | -0.02 | 0.58 | -0.74 | -0.44 | 0.43 | -0.89 | 0.25 | 0.77 | -0.53 | -0.87 | 0.02 | -0.37 | -0.07 | -0.35 | 0.28 | -1.10 | 0.14 | 0.00 | 1.50 | -0.25 | 0.81 | 0.98 | -0.46 | -0.51 | 0.27 | -0.71 | -0.1 |
| 0.32 | -1.0 | 0.43 | 0.26 | 0.00 | 0.45 | 0.00 | -0.03 | -0.22 | 0.64 | -1.22 | 0.47 | 0.01 | 0.84 | -0.29 | 0.71 | 0.26 | 0.06 | 0.55 | 0.49 | 0.85 | -0.45 | -0.20 | -1.03 | 0.41 | 0.19 | 0.52 | 0.58 | 0.09 | -0.25 | -0.23 | -0.90 | 1.50 | 0.00 | -0.36 | 0.37 | 0.60 | 0.76 | 0.59 | 0.19 | 0.05 | -0.69 |
| 0.30 | 0.17 | 0.34 | -0.01 | 0.56 | 0.66 | 0.39 | -0.47 | 0.30 | 0.39 | -0.48 | 1.08 | -0.38 | 0.92 | -0.24 | 0.25 | 0.41 | 0.07 | 0.50 | 1.07 | 1.40 | 1.00 | -0.42 | -0.79 | 0.01 | 0.20 | 0.22 | -0.04 | -0.62 | 1.01 | 1.20 | 0.42 | -0.25 | -0.36 | 0.00 | -0.12 | 0.21 | 0.09 | -1.14 | -0.46 | 0.16 | -0.13 |
| 0.44 | 0.49 | 1.19 | 1.23 | -0.05 | 0.55 | 0.65 | -0.01 | -1.21 | 0.06 | 1.46 | -1.03 | -0.58 | -0.68 | 0.45 | -0.57 | 1.00 | 0.13 | -0.17 | 0.17 | 0.50 | -0.67 | -0.37 | 1.15 | -1.09 | -1.15 | -0.06 | 0.58 | 0.53 | -0.31 | 0.64 | -0.33 | 0.81 | 0.37 | -0.12 | 0.00 | -0.66 | 0.19 | -0.03 | 0.49 | 0.42 | -0.04 |
| -1.14 | 0.42 | -0.13 | 0.54 | -0.54 | -0.23 | 0.54 | 0.19 | 0.47 | 0.99 | 0.02 | -0.94 | -0.50 | 0.16 | -1.19 | -0.32 | 0.33 | 0.94 | -0.82 | 0.36 | 0.29 | -0.11 | -0.82 | 0.93 | -0.22 | -0.34 | 0.76 | -1.07 | -0.08 | 0.79 | -0.91 | 0.52 | 0.98 | 0.60 | 0.21 | -0.66 | 0.00 | 0.78 | 1.51 | 0.36 | 0.27 | 0.02 |
| 0.46 | 1.86 | -0.08 | 0.11 | -0.43 | -0.17 | 0.55 | -0.06 | -0.53 | -0.96 | 0.78 | 0.74 | -0.60 | -0.60 | -0.58 | 0.55 | 0.28 | 1.42 | -0.23 | -0.58 | 0.14 | -1.04 | 0.10 | -0.28 | -0.12 | -0.12 | 0.15 | 0.23 | 0.07 | 0.31 | 1.03 | 0.32 | -0.46 | 0.76 | 0.09 | 0.19 | 0.78 | 0.00 | 0.41 | 1.27 | -0.55 | -0.12 |
| 0.28 | -0.24 | 0.44 | 0.21 | 0.73 | 0.03 | -0.76 | 0.55 | 1.10 | 0.87 | -0.36 | -0.46 | 0.55 | -0.33 | 0.19 | -0.42 | 0.20 | 0.07 | -0.32 | -0.66 | -0.18 | -0.54 | -0.52 | 1.13 | 0.02 | -0.22 | -0.27 | -0.38 | -0.46 | 0.14 | 0.53 | -0.71 | -0.51 | 0.59 | -1.14 | -0.03 | 1.51 | 0.41 | 0.00 | 0.47 | 0.72 | 0.01 |
| 0.16 | -0.43 | 0.04 | 0.30 | -0.33 | -0.15 | 0.10 | 0.46 | 0.44 | 1.04 | -0.18 | -0.84 | 0.44 | -0.93 | 0.60 | 0.58 | 0.55 | 0.66 | 0.86 | 0.58 | -0.43 | 0.45 | 0.01 | -0.53 | 0.33 | 0.69 | -0.15 | 0.66 | 0.95 | -0.11 | 1.16 | -0.08 | 0.27 | 0.19 | -0.46 | 0.49 | 0.36 | 1.27 | 0.47 | 0.00 | 0.09 | -1.10 |
| -0.72 | 0.18 | 0.03 | 0.69 | -0.20 | -0.22 | 0.62 | -0.37 | 0.10 | 0.57 | 0.05 | -1.20 | -0.14 | 0.30 | 0.42 | -0.85 | 0.26 | 0.76 | 0.12 | 0.48 | -0.49 | 0.13 | 0.50 | 0.76 | -0.21 | -1.48 | -0.41 | 0.91 | -0.32 | 1.64 | -0.60 | -0.33 | -0.71 | 0.05 | 0.16 | 0.42 | 0.27 | -0.55 | 0.72 | 0.09 | 0.00 | 1.17 |
| -0.23 | 0.11 | -0.46 | 1.23 | 0.48 | 0.69 | 0.04 | -0.32 | 0.58 | 0.90 | 0.30 | 0.08 | -0.12 | 0.24 | 0.74 | 1.11 | 0.03 | -0.10 | -1.05 | -0.1 | 0.31 | -0.61 | 0.31 | -0.62 | -0.22 | 0.89 | 0.16 | -0.32 | 0.61 | 0.05 | -1.01 | -0.34 | -0.1 | -0.69 | -0.13 | -0.04 | 0.02 | -0.12 | 0.01 | -1.18 | 1.17 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.01 | 0.27 | 0.33 | 1.33 | 0.38 | 0.65 | -0.23 | -0.34 | 0.51 | 0.01 | -0.95 | -0.05 | 0.20 | 0.34 | 0.01 | -0.41 | 0.30 | 0.02 | 0.61 | 0.50 | -0.14 | 0.61 | -0.20 | -0.15 | 1.38 | 0.30 | -0.98 | 1.02 | 0.26 | 1.02 | 0.35 | 0.40 | -0.76 | -0.53 | 1.09 | -0.26 |
| 1.74 | -0.06 | -1.53 | -0.72 | 0.06 | 0.81 | 0.63 | -0.38 | 0.27 | -0.67 | -0.26 | -0.02 | -0.30 | -0.08 | -0.30 | 0.33 | -0.20 | 0.56 | 0.61 | 1.19 | 0.72 | -0.65 | 0.01 | 0.39 | 0.46 | -0.18 | 0.12 | -0.45 | -0.42 | 0.15 | -1.38 | 1.18 | -0.28 | -0.38 | -0.17 | -1.02 | 0.18 | 0.84 | 0.49 | -0.96 | 0.19 | 0.50 |
| -0.21 | 1.25 | -0.18 | -1.39 | -0.98 | 0.27 | -0.94 | -0.40 | 0.87 | -0.06 | -0.37 | -0.39 | -0.94 | 0.68 | -0.09 | -0.08 | 1.08 | 0.65 | -0.17 | 0.01 | 0.86 | 0.39 | -0.83 | 0.79 | -0.86 | -0.85 | -0.1 | 0.27 | -0.74 | -0.53 | -0.07 | 0.88 | 0.18 | 0.24 | -0.38 | -0.54 | 0.47 | -0.04 | 0.23 | 0.72 | -0.30 | -1.10 |
| 0.49 | 0.76 | 0.90 | 0.60 | 0.55 | -0.46 | 0.04 | 0.28 | 0.12 | 0.62 | 0.84 | 0.52 | 0.56 | 0.38 | 0.39 | -0.82 | -0.57 | 0.62 | 1.42 | 0.24 | 0.29 | 0.83 | -0.62 | 0.34 | -0.16 | 0.57 | -0.04 | 0.68 | -0.07 | -0.50 | 0.53 | 0.13 | 0.49 | 0.31 | -0.82 | -0.28 | -0.09 | 1.08 | 1.49 | 0.18 | -0.81 | 0.63 |
| 0.17 | 0.40 | 0.17 | 0.11 | 0.18 | 0.92 | -0.84 | 0.74 | 0.47 | -0.17 | -0.18 | 0.50 | -0.51 | -0.89 | -0.12 | 0.22 | 0.19 | -0.31 | 0.94 | -0.74 | -0.66 | -0.41 | 0.61 | -0.04 | 0.27 | -0.1 | 0.80 | -1.10 | 0.60 | 0.97 | -0.46 | 0.35 | -0.34 | 0.61 | -0.42 | -0.40 | -0.18 | 0.01 | 1.13 | -0.40 | -0.62 | -0.02 |
| 1.34 | -0.54 | 0.30 | 0.57 | 0.14 | 0.10 | -0.15 | 0.56 | 0.41 | 0.02 | 1.36 | 0.24 | -0.28 | -0.25 | 1.12 | -0.90 | -1.32 | -0.65 | 0.91 | 1.06 | -0.24 | -0.26 | 0.17 | -1.09 | 0.77 | -0.11 | -0.09 | 0.08 | -0.53 | 0.60 | 0.39 | -0.65 | -0.71 | 0.44 | -0.55 | 0.53 | -0.42 | 1.16 | 0.61 | -0.13 | 0.14 | 0.12 |
| 1.09 | -0.27 | 0.46 | 0.73 | 0.50 | -0.34 | 0.34 | 0.33 | -0.18 | -0.35 | 1.01 | 0.53 | 0.67 | -0.04 | -0.29 | -0.24 | 1.03 | -0.65 | -0.38 | -1.09 | 0.32 | 0.66 | 0.27 | -1.05 | 0.21 | -0.11 | -0.96 | 0.65 | 0.04 | 0.09 | -0.20 | 0.54 | -0.09 | 0.15 | 0.18 | 0.87 | 0.51 | 0.24 | -0.58 | 0.01 | -0.03 | -0.07 |
| 0.00 | 1.32 | -0.26 | -0.14 | 0.71 | 0.31 | 0.06 | 0.26 | -0.31 | -0.80 | 0.88 | 0.38 | 1.11 | -0.1 | -0.38 | -0.37 | -0.08 | -0.20 | -0.47 | 0.07 | 0.1 | -0.99 | -0.01 | -0.47 | -0.37 | 0.21 | -0.11 | -0.12 | 1.38 | 0.32 | 0.56 | -0.67 | 0.43 | 0.05 | 0.27 | 0.42 | -1.12 | -0.44 | 0.30 | -0.19 | -0.74 | -0.27 |
| 1.32 | 0.00 | 0.09 | 0.07 | -0.39 | 0.33 | 0.59 | 0.35 | 0.86 | -0.36 | -0.01 | 0.26 | -1.05 | -0.47 | -0.71 | -0.02 | 0.25 | 0.50 | -0.57 | -0.13 | -0.38 | -0.24 | 0.21 | -1.43 | -0.17 | 0.42 | 0.08 | -0.31 | 0.04 | -0.22 | -0.15 | -0.03 | 0.03 | -1.25 | 0.16 | 0.49 | 0.42 | 1.86 | -0.24 | -0.76 | 0.18 | 0.09 |
| -0.26 | 0.09 | 0.00 | 0.91 | -0.18 | 0.14 | -0.72 | -0.21 | 0.30 | -0.11 | -0.04 | -1.75 | -0.31 | -0.48 | -0.12 | 1.14 | -0.18 | -0.20 | -1.11 | -0.32 | -1.44 | 0.76 | 0.57 | -0.01 | 0.33 | 1.07 | 0.36 | -0.41 | -1.37 | 0.67 | 0.75 | 0.05 | -0.52 | 0.69 | 0.35 | 1.19 | -0.13 | -0.08 | 0.44 | 0.37 | 0.03 | -0.44 |
| -0.14 | 0.07 | 0.91 | 0.00 | -0.23 | 0.62 | 0.71 | -1.01 | 0.33 | -0.30 | 1.27 | -0.43 | 0.34 | -0.62 | 0.51 | -0.32 | 0.80 | 0.79 | -0.44 | -0.05 | 0.54 | 0.25 | 0.53 | -0.10 | 0.91 | 0.20 | 0.15 | 0.01 | -1.28 | 0.44 | 0.61 | 0.49 | 0.30 | 0.51 | 0.00 | 1.23 | 0.54 | 0.11 | 0.21 | 0.63 | 0.69 | 1.25 |
| 0.71 | -0.39 | -0.18 | -0.23 | 0.00 | 0.16 | 0.69 | -1.41 | -0.94 | -0.05 | -0.64 | 0.51 | 0.28 | -0.61 | -1.24 | 0.20 | -0.38 | -0.34 | 0.36 | -1.02 | 0.69 | -0.26 | 0.49 | -0.13 | -0.64 | 0.61 | -0.68 | -0.05 | 0.23 | -0.08 | -0.01 | 0.77 | 1.01 | -0.25 | 0.55 | -0.05 | -0.54 | -0.43 | 0.73 | -0.66 | -0.20 | 0.46 |
| 0.31 | 0.33 | 0.14 | 0.62 | 0.16 | 0.00 | 0.36 | 0.17 | -0.61 | -0.98 | -1.45 | 1.59 | 1.57 | 0.48 | -0.85 | 0.08 | -0.29 | -0.17 | 1.07 | 0.05 | 0.43 | 1.14 | 1.21 | 0.08 | 0.09 | -0.90 | -0.54 | 0.68 | 0.13 | -0.19 | -0.92 | 0.45 | 0.75 | 0.19 | 0.65 | 0.55 | -0.23 | -0.17 | 0.03 | -0.48 | -0.27 | 0.67 |
| 0.06 | 0.59 | -0.72 | 0.71 | 0.69 | 0.36 | 0.00 | 0.60 | -1.07 | -1.22 | 0.43 | -0.19 | 1.23 | 0.94 | 0.04 | 0.11 | -0.27 | 0.91 | -0.85 | 0.68 | 1.13 | 0.70 | -0.28 | 0.75 | -0.46 | 0.50 | -0.71 | 1.01 | 0.45 | 0.33 | 0.32 | -0.79 | -1.50 | 0.26 | 0.40 | 0.65 | 0.54 | 0.55 | -0.76 | 0.43 | 0.62 | 0.06 |
| 0.26 | 0.35 | -0.21 | -1.01 | -1.41 | 0.17 | 0.60 | 0.00 | 1.07 | 0.02 | 0.48 | -0.03 | -0.78 | 0.32 | -0.52 | 1.05 | -0.41 | -0.15 | -0.72 | 0.18 | 0.24 | 0.23 | 0.67 | -0.25 | -0.90 | 0.17 | -0.21 | 0.27 | 0.36 | 0.05 | 0.58 | 0.08 | 0.79 | -0.30 | -0.50 | -0.03 | 0.21 | -0.04 | 0.57 | 0.10 | -0.39 | -0.35 |
| -0.31 | 0.86 | 0.30 | 0.33 | -0.94 | -0.61 | -1.07 | 1.07 | 0.00 | -0.89 | 0.38 | 0.23 | -0.48 | -0.03 | 1.20 | 0.26 | -0.48 | -0.89 | -0.22 | 0.83 | 0.50 | 0.11 | 0.45 | -0.81 | 0.30 | 0.98 | 0.75 | 0.56 | 0.06 | 0.72 | 0.28 | 0.08 | 0.16 | -0.47 | 0.29 | -1.21 | 0.47 | -0.53 | 1.10 | 0.11 | 0.10 | 0.57 |
| -0.80 | -0.36 | -0.11 | -0.30 | -0.05 | -0.98 | -1.22 | 0.02 | -0.89 | 0.00 | 0.34 | 0.41 | -0.76 | 0.12 | -0.70 | -0.43 | -0.99 | -0.88 | -0.68 | 1.00 | 0.40 | -0.95 | -0.16 | -1.18 | 0.57 | -0.24 | 0.02 | 0.38 | 0.19 | -0.99 | 0.55 | 0.71 | 0.54 | 0.90 | 0.40 | 0.06 | 0.99 | -0.96 | 0.87 | 1.38 | 0.57 | 0.92 |
| 0.88 | -0.01 | -0.04 | 1.27 | -0.64 | -1.45 | 0.43 | 0.48 | 0.38 | 0.34 | 0.00 | -0.92 | -1.66 | 0.74 | -0.12 | -0.67 | -0.07 | -0.73 | 0.02 | 0.14 | 0.75 | -0.30 | -1.49 | 0.56 | -0.41 | 0.37 | -0.40 | -0.17 | 0.59 | -0.29 | 0.12 | 1.33 | 0.44 | -0.96 | -0.47 | 1.46 | 0.02 | 0.78 | -0.36 | 0.15 | 0.05 | 0.31 |
| 0.38 | 0.26 | -1.75 | -0.43 | 0.51 | 1.59 | -0.19 | -0.03 | 0.23 | 0.41 | -0.92 | 0.00 | 0.07 | 1.01 | -1.02 | -0.02 | -0.13 | -0.08 | -0.42 | 0.82 | -0.29 | 0.38 | -0.54 | 0.83 | -0.21 | -0.74 | -0.28 | 0.83 | -0.82 | -0.35 | 0.02 | -0.68 | -0.07 | 0.21 | 1.07 | -1.03 | -0.94 | 0.74 | -0.46 | -1.17 | -1.20 | -0.1 |
| 1.11 | -1.05 | -0.31 | 0.34 | 0.28 | 1.57 | 1.23 | -0.78 | -0.48 | -0.76 | -1.66 | 0.07 | 0.00 | 0.30 | 0.36 | 0.01 | 0.25 | 1.37 | 0.15 | 0.39 | -0.45 | -0.21 | 0.29 | -0.11 | 0.65 | -0.04 | 0.48 | -0.18 | -1.12 | -0.21 | 0.30 | 1.08 | 0.86 | -0.24 | -0.39 | -0.58 | -0.50 | -0.60 | 0.55 | 0.11 | -0.14 | -0.14 |
| -0.1 | -0.47 | -0.48 | -0.62 | -0.61 | 0.48 | 0.94 | 0.32 | -0.03 | 0.12 | 0.74 | 1.01 | 0.30 | 0.00 | -0.42 | 0.12 | 0.83 | 0.81 | -0.35 | 0.58 | 0.70 | -0.05 | 0.32 | 0.62 | 0.64 | -0.34 | 0.18 | 0.85 | 0.89 | 0.49 | 1.11 | -0.19 | -0.65 | 1.09 | 0.93 | -0.68 | 0.16 | -0.60 | -0.33 | -0.60 | 0.30 | 0.25 |
| -0.38 | -0.71 | -0.12 | 0.51 | -1.24 | -0.05 | 0.04 | -0.52 | 1.20 | -0.70 | -0.12 | -1.02 | 0.36 | -0.42 | 0.00 | 1.07 | 0.12 | 1.26 | -0.66 | -0.45 | 1.22 | -0.17 | 0.73 | -0.02 | 0.13 | 0.56 | -0.40 | 0.50 | -0.20 | 0.09 | 0.27 | 0.17 | -1.03 | -0.04 | -0.23 | 0.45 | -1.19 | -0.58 | 0.19 | 0.93 | 0.42 | 0.76 |
| -0.37 | -0.02 | 1.14 | -0.32 | 0.20 | 0.08 | 0.11 | 1.05 | 0.26 | -0.43 | -0.67 | -0.02 | 0.01 | 0.12 | 1.07 | 0.00 | 0.12 | -0.06 | 0.65 | 0.90 | -0.04 | 0.07 | 1.14 | -0.17 | -0.49 | 0.63 | 0.42 | 0.24 | -0.31 | -0.07 | 0.74 | 0.76 | -0.01 | 0.44 | 0.23 | -0.58 | -0.31 | 0.56 | -0.41 | 0.23 | -0.86 | 1.08 |
| -0.08 | 0.25 | -0.18 | 0.80 | -0.38 | -0.29 | -0.27 | -0.41 | -0.48 | -0.99 | -0.07 | -0.13 | 0.25 | 0.83 | 0.12 | 0.12 | 0.00 | 0.74 | 0.52 | 0.09 | -0.18 | -0.31 | 0.43 | -1.13 | -0.98 | 0.75 | -0.81 | -0.16 | -0.56 | 0.30 | 0.11 | 0.92 | 0.58 | 0.01 | 0.40 | 1.00 | 0.33 | 0.28 | 0.20 | 0.22 | 0.26 | 0.01 |
| -0.20 | 0.50 | -0.20 | 0.79 | -0.34 | -0.17 | 0.91 | -0.15 | -0.89 | -0.88 | -0.73 | -0.08 | 1.37 | 0.81 | 1.26 | -0.06 | 0.74 | 0.00 | 0.13 | -1.15 | 0.65 | 0.29 | 0.59 | -0.74 | 0.20 | 0.73 | -0.47 | -0.36 | 0.66 | -0.48 | 0.81 | 0.46 | -0.74 | -0.20 | 0.06 | 0.13 | 0.94 | 1.42 | 0.07 | 0.32 | -0.76 | -0.20 |
| -0.47 | -0.57 | -1.11 | -0.44 | 0.36 | 1.07 | -0.85 | -0.72 | -0.22 | -0.68 | 0.02 | -0.42 | 0.15 | -0.35 | -0.66 | 0.65 | 0.52 | 0.13 | 0.00 | 0.26 | -0.88 | -0.50 | 0.77 | -0.69 | -0.87 | 0.57 | 0.36 | 0.19 | 0.67 | -0.15 | -0.22 | 0.80 | -0.44 | 0.29 | 0.49 | -0.17 | -0.82 | -0.23 | -0.32 | 0.53 | 0.12 | -1.07 |
| 0.07 | -0.13 | -0.32 | -0.05 | -1.02 | 0.05 | 0.68 | 0.18 | 0.83 | 1.00 | 0.14 | 0.82 | 0.39 | 0.58 | -0.45 | 0.90 | 0.09 | -1.15 | 0.26 | 0.00 | -0.74 | 0.16 | -1.48 | 0.49 | -1.06 | 0.52 | 1.52 | 0.33 | -1.22 | -0.59 | -0.09 | 0.38 | 0.71 | -0.05 | 0.78 | -0.12 | 0.65 | -0.30 | -0.37 | -0.04 | 0.20 | -0.40 |
| 0.1 | -0.38 | -1.44 | 0.54 | 0.69 | 0.43 | 1.13 | 0.24 | 0.50 | 0.40 | 0.75 | -0.29 | -0.45 | 0.70 | 1.22 | -0.04 | -0.18 | 0.65 | -0.88 | -0.74 | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.49 | 0.33 |
| -0.99 | -0.24 | 0.76 | 0.25 | -0.26 | 1.14 | 0.70 | 0.23 | 0.11 | -0.95 | -0.30 | 0.38 | -0.21 | -0.05 | -0.17 | 0.07 | -0.31 | 0.29 | -0.50 | 0.16 | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.13 | -0.59 |
| -0.01 | 0.21 | 0.57 | 0.53 | 0.49 | 1.21 | -0.28 | 0.67 | 0.45 | -0.16 | -1.49 | -0.54 | 0.29 | 0.32 | 0.73 | 1.14 | 0.43 | 0.59 | 0.77 | -1.48 | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.50 | 0.33 |
| -0.47 | -1.43 | -0.01 | -0.10 | -0.13 | 0.08 | 0.75 | -0.25 | -0.81 | -1.18 | 0.56 | 0.83 | -0.11 | 0.62 | -0.02 | -0.17 | -1.13 | -0.74 | -0.69 | 0.49 | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.83 | -0.53 |
| -0.37 | -0.17 | 0.33 | 0.91 | -0.64 | 0.09 | -0.46 | -0.90 | 0.30 | 0.57 | -0.41 | -0.21 | 0.65 | 0.64 | 0.13 | -0.49 | -0.98 | 0.20 | -0.87 | -1.06 | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.21 | -0.20 |
| 0.21 | 0.42 | 1.07 | 0.20 | 0.61 | -0.90 | 0.50 | 0.17 | 0.98 | -0.24 | 0.37 | -0.74 | -0.04 | -0.34 | 0.56 | 0.63 | 0.75 | 0.73 | 0.57 | 0.52 | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | [illegible] | -1.48 | 0.88 |
| -0.11 | 0.08 | 0.36 | 0.15 | -0.68 | -0.54 | -0.71 | -0.21 | 0.75 | 0.02 | -0.40 | -0.28 | 0.48 | 0.18 | -0.40 | 0.42 | -0.81 | -0.47 | 0.36 | 1.52 | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | [illegible] | -0.41 | 0.14 |
| -0.12 | -0.31 | -0.41 | 0.01 | -0.05 | 0.68 | 1.01 | 0.27 | 0.56 | 0.38 | -0.17 | 0.83 | -0.18 | 0.85 | 0.50 | 0.24 | -0.16 | -0.36 | 0.19 | 0.33 | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | [illegible] | 0.91 | -0.31 |
| 1.38 | 0.04 | -1.37 | -1.28 | 0.23 | 0.13 | 0.45 | 0.36 | 0.06 | 0.19 | 0.59 | -0.82 | -1.12 | 0.89 | -0.20 | -0.31 | -0.56 | 0.66 | 0.67 | -1.22 | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | [illegible] | -0.32 | 0.63 |
| 0.32 | -0.22 | 0.67 | 0.44 | -0.08 | -0.19 | 0.33 | 0.05 | 0.72 | -0.99 | -0.29 | -0.35 | -0.21 | 0.49 | 0.09 | -0.07 | 0.30 | -0.48 | -0.15 | -0.59 | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | [illegible] | -1.64 | 0.07 |
| 0.56 | -0.15 | 0.75 | 0.61 | -0.01 | -0.92 | 0.32 | 0.58 | 0.28 | 0.55 | 0.12 | 0.02 | 0.30 | 1.11 | 0.27 | 0.74 | 0.11 | 0.81 | -0.22 | -0.09 | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | [illegible] | -0.60 | -1.0 |
| -0.67 | -0.03 | 0.05 | 0.49 | 0.77 | 0.45 | -0.79 | 0.08 | 0.08 | 0.71 | 1.33 | -0.68 | 1.08 | -0.19 | 0.17 | 0.76 | 0.92 | 0.46 | 0.80 | 0.38 | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | [illegible] | -0.33 | -0.35 |
| 0.43 | 0.03 | -0.52 | 0.30 | 1.01 | 0.75 | -1.50 | 0.79 | 0.16 | 0.54 | 0.44 | -0.07 | 0.86 | -0.65 | -1.03 | -0.01 | 0.58 | -0.74 | -0.44 | 0.71 | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | [illegible] | -0.71 | -0.12 |
| 0.05 | -1.25 | 0.69 | 0.51 | -0.25 | 0.19 | 0.26 | -0.30 | -0.47 | 0.90 | -0.96 | 0.21 | -0.24 | 1.09 | -0.04 | 0.44 | 0.01 | -0.20 | 0.29 | -0.05 | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | [illegible] | 0.30 | -0.41 |
| 0.27 | 0.16 | 0.35 | 0.00 | 0.55 | 0.65 | 0.40 | -0.50 | 0.29 | 0.40 | -0.47 | 1.07 | -0.39 | 0.93 | -0.23 | 0.23 | 0.40 | 0.06 | 0.49 | 0.78 | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | [illegible] | 0.17 | -0.10 |
| 0.42 | 0.49 | 1.19 | 1.23 | -0.05 | 0.55 | 0.65 | -0.03 | -1.21 | 0.06 | 1.46 | -1.03 | -0.58 | -0.68 | 0.45 | -0.58 | 1.00 | 0.13 | -0.17 | -0.12 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | [illegible] | 0.42 | -0.02 |
| -1.12 | 0.42 | -0.13 | 0.54 | -0.54 | -0.23 | 0.54 | 0.21 | 0.47 | 0.99 | 0.02 | -0.94 | -0.50 | 0.16 | -1.19 | -0.31 | 0.33 | 0.94 | -0.82 | 0.65 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | [illegible] | 0.27 | 0.00 |
| -0.44 | 1.86 | -0.08 | 0.11 | -0.43 | -0.17 | 0.55 | -0.04 | -0.53 | -0.96 | 0.78 | 0.74 | -0.60 | -0.60 | -0.58 | 0.56 | 0.28 | 1.42 | -0.23 | -0.30 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | [illegible] | -0.55 | -0.13 |
| 0.30 | -0.24 | 0.44 | 0.21 | 0.73 | 0.03 | -0.76 | 0.57 | 1.10 | 0.87 | -0.36 | -0.46 | 0.55 | -0.33 | 0.19 | -0.41 | 0.20 | 0.07 | -0.32 | -0.37 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | [illegible] | 0.72 | -0.00 |
| -0.19 | -0.76 | 0.37 | 0.63 | -0.66 | -0.48 | 0.43 | 0.10 | 0.11 | 1.38 | 0.15 | -1.17 | 0.11 | -0.60 | 0.93 | 0.23 | 0.22 | 0.32 | 0.53 | -0.04 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.00 | 0.42 | -0.83 |
| -0.74 | 0.18 | 0.03 | 0.69 | -0.20 | -0.27 | 0.62 | -0.39 | 0.10 | 0.57 | 0.05 | -1.20 | -0.14 | 0.30 | 0.42 | -0.86 | 0.26 | -0.76 | 0.12 | 0.20 | -0.49 | 0.13 | 0.50 | 0.83 | -0.21 | -1.48 | -0.41 | 0.91 | -0.32 | -1.64 | -0.60 | -0.33 | -0.71 | 0.30 | 0.17 | 0.42 | 0.27 | -0.55 | 0.72 | 0.42 | 0.00 | 1.19 |
| -0.27 | 0.09 | -0.44 | 1.25 | 0.46 | 0.67 | 0.06 | -0.35 | 0.57 | 0.92 | 0.31 | -0.1 | -0.14 | 0.25 | 0.76 | 1.08 | 0.01 | -0.20 | -1.07 | -0.40 | 0.33 | -0.59 | 0.33 | -0.53 | -0.20 | 0.88 | 0.14 | -0.31 | 0.63 | 0.07 | -1.0 | -0.35 | -0.12 | -0.41 | -0.10 | -0.02 | 0.00 | -0.13 | -0.00 | -0.83 | 1.19 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.01 | 0.27 | 0.33 | 1.33 | 0.38 | 0.65 | -0.23 | -0.34 | 0.51 | 0.01 | -0.95 | -0.05 | 0.20 | 0.34 | 0.01 | -0.41 | -0.30 | 0.02 | -0.61 | 0.50 | -0.14 | 0.61 | -0.20 | -0.15 | 1.38 | 0.30 | -0.98 | 1.02 | 0.26 | 1.02 | 0.28 | 0.40 | -0.76 | -0.53 | -1.17 | -0.26 |
| 1.74 | -0.06 | -1.53 | -0.72 | 0.06 | 0.81 | 0.63 | -0.38 | 0.27 | -0.67 | -0.26 | -0.02 | -0.30 | -0.08 | -0.30 | 0.33 | -0.20 | 0.56 | 0.61 | 1.19 | 0.72 | -0.65 | 0.01 | 0.39 | 0.46 | -0.18 | 0.12 | -0.45 | -0.42 | 0.15 | -1.38 | 1.18 | -0.28 | -0.38 | -0.17 | -1.02 | 0.25 | 0.84 | 0.49 | -0.96 | 0.27 | 0.50 |
| -0.21 | 1.25 | -0.18 | -1.39 | -0.98 | 0.27 | -0.94 | -0.40 | 0.87 | -0.06 | -0.37 | -0.39 | -0.94 | 0.68 | -0.09 | -0.08 | 1.08 | 0.65 | -0.17 | 0.01 | 0.86 | 0.39 | 0.83 | 0.79 | 0.86 | -0.85 | -0.1 | 0.27 | -0.74 | -0.53 | -0.07 | 0.88 | 0.18 | 0.24 | 0.38 | 0.54 | 0.54 | -0.04 | 0.23 | 0.72 | -0.22 | -1.10 |
| 0.49 | 0.76 | -0.90 | 0.60 | 0.55 | -0.46 | 0.04 | 0.28 | 0.12 | 0.62 | 0.84 | 0.52 | 0.56 | 0.38 | 0.39 | -0.82 | -0.57 | 0.62 | 1.42 | -0.24 | 0.29 | 0.83 | -0.62 | 0.34 | -0.16 | 0.57 | -0.04 | 0.68 | -0.07 | 0.50 | 0.53 | 0.13 | 0.49 | 0.31 | -0.82 | -0.28 | -0.02 | 1.08 | 1.49 | 0.18 | -0.73 | 0.63 |
| 0.17 | 0.40 | 0.17 | 0.11 | 0.18 | 0.92 | -0.84 | 0.74 | 0.47 | -0.17 | -0.18 | 0.50 | -0.51 | -0.89 | 0.12 | 0.22 | 0.19 | -0.31 | 0.94 | -0.74 | -0.66 | -0.41 | 0.61 | -0.04 | 0.27 | -0.1 | 0.80 | 1.10 | 0.60 | 0.97 | -0.46 | 0.35 | -0.34 | 0.61 | -0.42 | -0.40 | -0.11 | 0.01 | 1.13 | -0.40 | -0.55 | -0.02 |
| 1.34 | -0.54 | 0.30 | 0.57 | 0.14 | 0.10 | -0.15 | 0.56 | 0.41 | 0.02 | 1.36 | 0.24 | 0.28 | -0.25 | 1.12 | -0.90 | -1.32 | -0.65 | 0.91 | 1.06 | -0.24 | -0.26 | 0.17 | -1.09 | 0.77 | -0.11 | -0.09 | 0.08 | -0.53 | 0.60 | 0.39 | -0.65 | -0.71 | 0.44 | -0.55 | 0.53 | -0.36 | 1.16 | 0.61 | -0.13 | 0.71 | 0.12 |
| 1.09 | -0.27 | 0.46 | 0.73 | 0.50 | 0.34 | 0.34 | 0.33 | -0.18 | -0.35 | 1.01 | 0.53 | 0.67 | -0.04 | -0.29 | -0.24 | 1.03 | -0.65 | -0.38 | -1.09 | 0.32 | 0.66 | 0.27 | -1.05 | 0.21 | -0.11 | -0.96 | 0.65 | 0.04 | 0.09 | -0.20 | 0.54 | -0.09 | 0.15 | 0.18 | 0.87 | 0.44 | 0.24 | -0.58 | 0.01 | -0.10 | -0.07 |
| 0.00 | 1.32 | -0.26 | -0.14 | 0.71 | 0.31 | 0.06 | 0.26 | -0.31 | -0.80 | 0.88 | 0.38 | 1.11 | -0.1 | -0.38 | -0.37 | -0.08 | -0.20 | -0.47 | 0.07 | 0.1 | -0.99 | -0.01 | -0.47 | 0.37 | 0.21 | -0.11 | -0.12 | 1.38 | 0.32 | 0.56 | -0.67 | 0.43 | 0.05 | 0.27 | 0.42 | 1.05 | -0.44 | 0.30 | -0.19 | -0.66 | -0.27 |
| 1.32 | 0.00 | 0.09 | 0.07 | -0.39 | 0.33 | 0.59 | 0.35 | 0.86 | -0.36 | -0.01 | 0.26 | -1.05 | -0.47 | -0.71 | -0.02 | 0.25 | 0.50 | -0.57 | -0.13 | 0.38 | 0.24 | 0.21 | -1.43 | -0.17 | 0.42 | 0.08 | -0.11 | 0.04 | -0.22 | -0.15 | 0.03 | 0.03 | 1.25 | 0.16 | 0.49 | 0.49 | 1.86 | -0.24 | -0.76 | 0.26 | 0.09 |
| -0.26 | 0.09 | 0.00 | 0.91 | -0.18 | 0.14 | -0.72 | -0.21 | 0.30 | -0.11 | -0.04 | -1.75 | -0.31 | -0.48 | -0.12 | 1.14 | -0.18 | -0.20 | -1.11 | -0.32 | -1.44 | 0.76 | 0.57 | -0.01 | 0.33 | 1.07 | 0.36 | -0.41 | 1.37 | 0.67 | 0.75 | 0.05 | -0.52 | 0.69 | 0.35 | 1.19 | -0.20 | -0.08 | 0.44 | 0.37 | -0.04 | -0.44 |
| -0.14 | 0.07 | 0.91 | 0.00 | -0.23 | 0.62 | 0.71 | -1.01 | 0.33 | -0.30 | 1.27 | -0.43 | 0.34 | -0.62 | 0.51 | -0.32 | 0.80 | 0.79 | -0.44 | -0.05 | 0.54 | 0.25 | 0.53 | -0.10 | 0.91 | 0.20 | 0.15 | 0.01 | -1.28 | 0.44 | 0.61 | 0.49 | 0.30 | 0.51 | 0.00 | 1.23 | 0.47 | 0.11 | 0.21 | 0.63 | 0.61 | 1.25 |
| 0.71 | -0.39 | -0.18 | -0.23 | 0.00 | 0.16 | 0.69 | -1.41 | -0.94 | -0.05 | -0.64 | 0.51 | 0.28 | -0.61 | -1.24 | 0.20 | -0.38 | -0.34 | 0.36 | -1.02 | 0.69 | -0.26 | 0.49 | -0.13 | -0.64 | 0.61 | -0.68 | -0.05 | 0.23 | -0.08 | -0.01 | 0.77 | 1.01 | -0.25 | 0.55 | -0.05 | -0.61 | -0.43 | 0.73 | -0.66 | -0.28 | 0.46 |
| 0.31 | 0.33 | 0.14 | 0.62 | 0.16 | 0.00 | 0.36 | 0.17 | -0.61 | -0.98 | -1.45 | 1.59 | 1.57 | 0.48 | -0.85 | 0.08 | -0.29 | -0.17 | 1.07 | 0.05 | 0.43 | 1.14 | 1.21 | 0.08 | 0.09 | -0.90 | -0.54 | 0.68 | 0.13 | -0.19 | -0.92 | 0.45 | 0.75 | 0.19 | 0.65 | 0.55 | -0.16 | -0.17 | 0.03 | -0.48 | -0.15 | 0.67 |
| 0.06 | 0.59 | -0.72 | 0.71 | 0.69 | 0.36 | 0.00 | 0.60 | -1.07 | -1.22 | 0.43 | -0.19 | 1.23 | 0.94 | 0.04 | 0.11 | -0.27 | 0.91 | -0.85 | 0.68 | 1.13 | 0.70 | -0.28 | 0.75 | -0.46 | 0.50 | -0.71 | 1.01 | 0.45 | 0.33 | 0.32 | -0.79 | -1.50 | 0.26 | 0.40 | 0.65 | 0.61 | 0.55 | -0.76 | 0.43 | 0.69 | 0.06 |
| 0.26 | 0.35 | -0.21 | -1.01 | -1.41 | 0.17 | 0.60 | 0.00 | 1.07 | 0.02 | 0.48 | -0.03 | -0.78 | 0.32 | -0.52 | 1.05 | -0.41 | -0.15 | -0.72 | 0.18 | 0.24 | 0.23 | 0.67 | -0.25 | -0.90 | 0.17 | -0.21 | 0.27 | 0.36 | 0.05 | 0.58 | 0.08 | 0.79 | -0.30 | -0.50 | -0.03 | 0.28 | -0.04 | 0.57 | 0.10 | -0.31 | -0.35 |
| -0.31 | 0.86 | 0.30 | 0.33 | -0.94 | -0.61 | -1.07 | 1.07 | 0.00 | -0.89 | 0.38 | 0.23 | -0.48 | -0.03 | 1.20 | 0.26 | -0.48 | -0.89 | -0.22 | 0.83 | 0.50 | 0.11 | 0.45 | -0.81 | 0.30 | 0.98 | 0.75 | 0.56 | 0.06 | 0.72 | 0.28 | 0.08 | 0.16 | -0.47 | 0.29 | -1.21 | 0.54 | -0.53 | 1.10 | 0.11 | 0.18 | 0.57 |
| -0.80 | -0.36 | -0.11 | -0.30 | -0.05 | -0.98 | -1.22 | 0.02 | -0.89 | 0.00 | 0.34 | 0.41 | -0.76 | 0.12 | -0.70 | -0.43 | -0.99 | -0.88 | -0.68 | 1.00 | 0.40 | -0.95 | -0.16 | -1.18 | 0.57 | -0.24 | 0.02 | 0.38 | 0.19 | -0.99 | 0.55 | 0.71 | 0.54 | 0.90 | 0.40 | 0.06 | 0.92 | -0.96 | 0.87 | 1.38 | 0.49 | 0.92 |
| 0.88 | -0.01 | -0.04 | 1.27 | -0.64 | -1.45 | 0.43 | 0.48 | 0.38 | 0.34 | 0.00 | -0.92 | -1.66 | 0.74 | -0.12 | -0.67 | -0.07 | -0.73 | 0.02 | 0.14 | 0.75 | -0.30 | -1.49 | 0.56 | -0.41 | 0.37 | -0.40 | -0.17 | 0.59 | -0.29 | 0.12 | 1.33 | 0.44 | -0.96 | -0.47 | 1.46 | -0.05 | 0.78 | -0.36 | 0.15 | -0.02 | 0.31 |
| 0.38 | 0.26 | -1.75 | -0.43 | 0.51 | 1.59 | -0.19 | -0.03 | 0.23 | 0.41 | -0.92 | 0.00 | 0.07 | 1.01 | -1.02 | -0.02 | -0.13 | -0.08 | -0.42 | 0.82 | -0.29 | 0.38 | -0.54 | 0.83 | -0.21 | -0.74 | -0.28 | 0.83 | -0.82 | -0.35 | 0.02 | -0.68 | -0.07 | 0.21 | 1.07 | -1.03 | -0.87 | 0.74 | -0.46 | -1.17 | -1.12 | -0.1 |
| 1.11 | -1.05 | -0.31 | 0.34 | 0.28 | 1.57 | 1.23 | -0.78 | -0.48 | -0.76 | -1.66 | 0.07 | 0.00 | 0.30 | 0.36 | 0.01 | 0.25 | 1.37 | 0.15 | 0.39 | -0.45 | -0.21 | 0.29 | -0.11 | 0.65 | -0.04 | 0.48 | -0.18 | -1.12 | -0.21 | 0.30 | 1.08 | 0.86 | -0.24 | -0.39 | -0.58 | -0.43 | -0.60 | 0.55 | 0.11 | -0.06 | 0.14 |
| -0.1 | -0.47 | -0.48 | -0.62 | -0.61 | 0.48 | 0.94 | 0.32 | -0.03 | 0.12 | 0.74 | 1.01 | 0.30 | 0.00 | -0.42 | 0.12 | 0.83 | 0.81 | -0.35 | 0.58 | 0.70 | -0.05 | 0.32 | 0.62 | 0.64 | -0.34 | 0.18 | 0.85 | 0.89 | 0.49 | 1.11 | -0.19 | -0.65 | 1.09 | 0.93 | -0.68 | 0.23 | -0.60 | -0.33 | -0.60 | 0.38 | 0.25 |
| 0.38 | 0.71 | -0.12 | 0.51 | -1.24 | -0.85 | 0.04 | -0.52 | 1.20 | -0.70 | -0.12 | -1.02 | 0.36 | -0.42 | 0.00 | 1.07 | 0.12 | 1.26 | -0.66 | -0.45 | 1.22 | -0.17 | 0.73 | -0.02 | 0.13 | 0.56 | -0.40 | 0.50 | -0.20 | 0.09 | 0.27 | 0.17 | -1.03 | -0.04 | 0.23 | 0.45 | -1.12 | -0.58 | 0.19 | 0.93 | 0.50 | 0.76 |
| -0.37 | -0.02 | 1.14 | -0.32 | 0.20 | 0.08 | 0.11 | 1.05 | 0.76 | -0.43 | -0.67 | -0.02 | 0.01 | 0.12 | 1.07 | 0.00 | 0.12 | -0.06 | 0.65 | 0.90 | 0.04 | 0.07 | 1.14 | -0.17 | -0.49 | 0.63 | 0.42 | 0.24 | -0.31 | -0.07 | 0.74 | 0.76 | -0.01 | 0.44 | 0.23 | -0.58 | -0.24 | 0.56 | -0.41 | 0.23 | -0.78 | 1.08 |
| -0.08 | 0.25 | -0.18 | 0.80 | -0.38 | -0.29 | -0.27 | -0.41 | -0.48 | -0.99 | -0.07 | -0.13 | 0.25 | 0.83 | 0.12 | 0.12 | 0.00 | 0.74 | 0.52 | 0.09 | -0.18 | -0.31 | 0.43 | -1.13 | -0.98 | 0.75 | -0.81 | 0.16 | -0.56 | 0.30 | 0.11 | 0.92 | 0.58 | 0.01 | 0.40 | 1.00 | 0.26 | 0.28 | 0.20 | 0.22 | 0.19 | 0.01 |
| 0.20 | 0.50 | -0.20 | 0.79 | -0.34 | -0.17 | 0.91 | -0.15 | -0.89 | -0.88 | -0.73 | -0.08 | 1.37 | 0.81 | 1.26 | -0.06 | 0.74 | 0.00 | 0.13 | -1.15 | 0.65 | 0.29 | 0.59 | -0.74 | 0.20 | 0.73 | -0.47 | -0.36 | 0.66 | -0.48 | 0.81 | 0.46 | -0.74 | -0.20 | 0.06 | 0.13 | 1.01 | 1.42 | 0.07 | 0.32 | -0.69 | -0.20 |
| -0.47 | -0.57 | -1.11 | -0.44 | 0.36 | 1.07 | -0.85 | -0.72 | -0.22 | -0.68 | 0.02 | -0.42 | 0.15 | -0.35 | -0.66 | 0.65 | 0.52 | 0.13 | 0.00 | 0.26 | -0.88 | -0.50 | 0.77 | -0.69 | -0.87 | 0.57 | 0.36 | 0.19 | 0.67 | -0.15 | -0.22 | 0.80 | -0.44 | 0.29 | 0.49 | -0.17 | -0.75 | -0.23 | -0.32 | 0.53 | 0.19 | -1.07 |
| 0.07 | -0.13 | -0.32 | -0.05 | -1.02 | 0.05 | 0.68 | 0.18 | 0.83 | 1.00 | 0.14 | 0.82 | 0.39 | 0.58 | -0.45 | 0.90 | 0.09 | -1.15 | 0.26 | 0.00 | -0.74 | 0.16 | -1.48 | 0.49 | -1.06 | 0.52 | 1.52 | 0.33 | -1.22 | -0.59 | -0.09 | 0.38 | 0.71 | -0.05 | 0.78 | -0.12 | 0.72 | -0.30 | -0.37 | -0.04 | 0.28 | -0.40 |
| 0.1 | -0.38 | -1.44 | 0.54 | 0.69 | 0.43 | 1.13 | 0.24 | 0.50 | 0.40 | 0.75 | -0.29 | -0.45 | 0.70 | 1.22 | -0.04 | -0.18 | 0.65 | -0.88 | -0.74 | 0.00 | 0.75 | 0.82 | -0.71 | 0.72 | -0.37 | -0.26 | 1.17 | -0.10 | 0.00 | -0.31 | 0.83 | -0.89 | 1.10 | 1.41 | 0.50 | 0.35 | 0.14 | -0.18 | -0.10 | -0.41 | 0.33 |
| -0.99 | -0.24 | 0.76 | 0.25 | -0.26 | 1.14 | 0.70 | 0.23 | 0.11 | -0.95 | -0.30 | 0.38 | -0.21 | -0.05 | -0.17 | 0.07 | -0.31 | 0.29 | -0.50 | 0.16 | 0.75 | 0.00 | 0.92 | 0.40 | 0.34 | 0.24 | 1.27 | -0.47 | -0.32 | 0.79 | 0.69 | -1.15 | 0.25 | -0.20 | 1.09 | -0.67 | -0.04 | -1.04 | -0.54 | 0.79 | 0.21 | -0.59 |
| -0.01 | 0.21 | 0.57 | 0.53 | 0.49 | 1.21 | -0.28 | 0.67 | 0.45 | -0.16 | -1.49 | -0.54 | 0.29 | 0.32 | 0.73 | 1.14 | 0.43 | 0.59 | 0.77 | -1.48 | 0.82 | 0.92 | 0.00 | 1.36 | -0.64 | -0.46 | -0.52 | 0.22 | 0.13 | 0.38 | 0.03 | -0.12 | 0.77 | 0.06 | -0.41 | -0.37 | -0.75 | 0.10 | -0.52 | 0.34 | 0.58 | 0.33 |
| -0.47 | -1.43 | -0.01 | -0.10 | -0.13 | 0.08 | 0.75 | -0.25 | -0.81 | -1.18 | 0.56 | 0.83 | -0.11 | 0.62 | -0.02 | -0.17 | -1.13 | -0.74 | -0.69 | 0.49 | -0.71 | 0.40 | 1.36 | 0.00 | 0.62 | -0.09 | -0.22 | 1.03 | -0.91 | -0.10 | 0.41 | 0.14 | -0.60 | -0.71 | -0.71 | 1.22 | 0.93 | -0.35 | 1.06 | -0.13 | 0.91 | -0.53 |
| -0.37 | -0.17 | 0.33 | 0.91 | -0.64 | 0.09 | -0.46 | -0.90 | 0.30 | 0.57 | -0.41 | -0.21 | 0.65 | 0.64 | 0.13 | -0.49 | -0.98 | 0.20 | -0.87 | -1.06 | 0.72 | 0.34 | -0.64 | 0.62 | 0.00 | -1.05 | 1.0 | 0.14 | 0.19 | -0.02 | 0.93 | 0.31 | -0.87 | 0.67 | 0.02 | -1.09 | -0.15 | -0.12 | -0.02 | 0.66 | -0.14 | -0.20 |
| 0.21 | 0.42 | 1.07 | 0.20 | 0.61 | -0.90 | 0.50 | 0.17 | 0.98 | -0.24 | 0.37 | -0.74 | -0.04 | -0.34 | 0.56 | 0.63 | 0.75 | 0.73 | 0.57 | 0.52 | -0.37 | 0.24 | -0.46 | -0.09 | -1.05 | 0.00 | 0.95 | -0.74 | 0.52 | -0.45 | -0.84 | -0.81 | 0.02 | -0.06 | 0.19 | -1.15 | -0.41 | -0.12 | -0.22 | 0.36 | -1.56 | 0.88 |
| -0.11 | 0.08 | 0.36 | 0.15 | -0.68 | -0.54 | -0.71 | -0.21 | 0.75 | 0.02 | -0.40 | -0.28 | 0.48 | 0.18 | -0.40 | 0.42 | -0.81 | -0.47 | 0.36 | 1.52 | -0.26 | 1.27 | -0.52 | -0.22 | 1.0 | 0.95 | 0.00 | 0.39 | 0.59 | 0.63 | -0.45 | 0.34 | -0.37 | 0.26 | 0.21 | -0.06 | 0.83 | 0.15 | -0.27 | -0.48 | -0.33 | 0.14 |
| -0.12 | -0.11 | -0.41 | 0.01 | -0.05 | 0.68 | 1.01 | 0.27 | 0.56 | 0.38 | -0.17 | 0.83 | -0.18 | 0.85 | 0.50 | 0.24 | -0.16 | -0.36 | 0.19 | 0.33 | 1.17 | -0.47 | 0.22 | 1.03 | 0.14 | -0.74 | 0.39 | 0.00 | -0.62 | -0.25 | 0.42 | -0.02 | -0.07 | 0.84 | -0.03 | 0.58 | -1.01 | 0.23 | -0.38 | 0.99 | 0.98 | -0.31 |
| 1.38 | 0.04 | -1.37 | -1.28 | 0.23 | 0.13 | 0.45 | 0.36 | 0.06 | 0.19 | 0.59 | -0.82 | -1.12 | 0.89 | -0.20 | -0.31 | -0.56 | 0.66 | 0.67 | -1.22 | -0.10 | -0.32 | 0.13 | -0.91 | 0.19 | 0.52 | 0.59 | -0.62 | 0.00 | 0.73 | -0.13 | -0.62 | -0.35 | 0.35 | -0.61 | 0.53 | 0.01 | 0.07 | -0.46 | 1.29 | -0.24 | 0.63 |
| 0.32 | -0.22 | 0.67 | 0.44 | -0.08 | -0.19 | 0.33 | 0.05 | 0.72 | -0.99 | -0.29 | -0.35 | -0.21 | 0.49 | 0.09 | -0.07 | 0.30 | -0.48 | -0.15 | -0.59 | 0.00 | 0.79 | 0.38 | -0.10 | -0.02 | -0.45 | 0.63 | -0.25 | 0.73 | 0.00 | -0.73 | -0.89 | 0.78 | 0.01 | 1.02 | -0.31 | 0.86 | 0.31 | 0.14 | 0.22 | -1.56 | 0.07 |
| 0.56 | -0.15 | 0.75 | 0.61 | -0.01 | -0.92 | 0.32 | 0.58 | 0.28 | 0.55 | 0.12 | 0.02 | 0.30 | 1.11 | 0.27 | 0.74 | 0.11 | 0.81 | -0.22 | -0.09 | -0.31 | 0.69 | 0.03 | 0.41 | 0.93 | -0.84 | -0.45 | 0.42 | -0.13 | -0.73 | 0.00 | 0.58 | -1.10 | 0.03 | 1.21 | 0.64 | -0.84 | 1.03 | 0.53 | -0.83 | -0.52 | -1.0 |
| 0.67 | -0.03 | 0.05 | 0.49 | 0.77 | 0.45 | -0.79 | 0.08 | 0.08 | 0.71 | 1.33 | -0.68 | 1.08 | -0.19 | 0.17 | 0.76 | 0.92 | 0.46 | 0.80 | 0.38 | 0.83 | -1.15 | -0.12 | 0.14 | 0.31 | -0.81 | 0.34 | -0.02 | -0.62 | -0.89 | 0.58 | 0.00 | 0.14 | -1.16 | 0.41 | -0.33 | 0.45 | 0.32 | -0.71 | -0.41 | -0.40 | -0.35 |
| 0.43 | 0.03 | -0.52 | 0.30 | 1.01 | 0.75 | -1.50 | 0.79 | 0.16 | 0.54 | 0.44 | -0.07 | 0.86 | -0.65 | -1.03 | -0.01 | 0.58 | -0.74 | -0.44 | 0.71 | -0.89 | 0.25 | 0.77 | -0.60 | -0.87 | 0.02 | -0.37 | -0.07 | -0.35 | 0.28 | -1.10 | 0.14 | 0.00 | 1.25 | -0.26 | 0.81 | 0.91 | -0.46 | -0.51 | -0.06 | -0.78 | -0.12 |
| 0.05 | -1.25 | 0.69 | 0.51 | -0.25 | 0.19 | 0.26 | -0.30 | -0.47 | 0.90 | -0.96 | 0.21 | -0.24 | 1.09 | -0.04 | 0.44 | 0.01 | -0.20 | 0.29 | -0.05 | 1.10 | -0.20 | 0.06 | -0.71 | 0.67 | -0.06 | 0.26 | 0.84 | 0.35 | 0.01 | 0.03 | -1.16 | 1.25 | 0.00 | -0.09 | 0.63 | 0.41 | 0.51 | 0.34 | 0.78 | 0.38 | -0.41 |
| 0.27 | 0.16 | 0.35 | 0.00 | 0.55 | 0.65 | 0.40 | -0.50 | 0.29 | 0.40 | -0.47 | 1.07 | -0.39 | 0.93 | -0.23 | 0.23 | 0.40 | 0.06 | 0.49 | 0.78 | 1.41 | 1.09 | -0.41 | -0.71 | 0.02 | 0.19 | 0.21 | -0.03 | -0.61 | 1.02 | 1.21 | 0.41 | -0.26 | -0.09 | 0.00 | -0.11 | 0.27 | 0.08 | -1.15 | -0.12 | 0.25 | -0.10 |
| 0.42 | 0.49 | 1.19 | 1.23 | -0.05 | 0.55 | 0.65 | -0.03 | -1.21 | 0.06 | 1.46 | -1.03 | -0.58 | -0.68 | 0.45 | -0.58 | 1.00 | 0.13 | -0.17 | -0.12 | 0.50 | -0.67 | -0.37 | 1.22 | -1.09 | -1.15 | -0.06 | 0.58 | 0.53 | -0.31 | 0.64 | -0.33 | 0.81 | 0.63 | -0.11 | 0.00 | -0.73 | 0.19 | -0.03 | 0.83 | 0.35 | -0.02 |
| -1.05 | 0.49 | -0.20 | 0.47 | -0.61 | -0.16 | 0.61 | 0.28 | 0.54 | 0.92 | -0.05 | -0.87 | -0.43 | 0.23 | -1.12 | -0.24 | 0.26 | 1.01 | -0.75 | 0.72 | 0.35 | -0.04 | -0.75 | 0.93 | -0.15 | -0.41 | 0.83 | -1.01 | -0.01 | 0.86 | -0.84 | 0.45 | 0.91 | 0.41 | 0.27 | -0.73 | 0.00 | 0.85 | 1.57 | 0.1 | 0.42 | -0.07 |
| 0.44 | 1.86 | -0.08 | 0.11 | -0.43 | -0.17 | 0.55 | -0.04 | -0.53 | -0.96 | 0.78 | 0.74 | -0.60 | -0.60 | -0.58 | 0.56 | 0.28 | 1.42 | -0.23 | -0.30 | 0.14 | -1.04 | 0.10 | -0.35 | -0.12 | -0.12 | 0.15 | 0.23 | 0.07 | 0.31 | 1.03 | 0.32 | -0.46 | 0.51 | 0.08 | 0.19 | 0.85 | 0.00 | 0.41 | 0.94 | -0.48 | -0.13 |
| 0.30 | -0.24 | 0.44 | 0.21 | 0.73 | 0.03 | -0.76 | 0.57 | 1.10 | 0.87 | -0.36 | -0.46 | 0.55 | -0.33 | 0.19 | -0.41 | 0.20 | 0.07 | -0.32 | -0.37 | -0.18 | -0.54 | -0.52 | 1.06 | -0.02 | -0.22 | -0.27 | -0.38 | -0.46 | 0.14 | 0.53 | -0.71 | -0.51 | 0.34 | -1.15 | -0.03 | 1.57 | 0.41 | 0.00 | 0.14 | 0.80 | -0.00 |
| -0.19 | -0.76 | 0.37 | 0.63 | -0.66 | -0.48 | 0.43 | 0.10 | 0.11 | 1.38 | 0.15 | -1.17 | 0.11 | -0.60 | 0.93 | 0.23 | 0.22 | 0.32 | 0.53 | -0.04 | -0.10 | 0.79 | 0.34 | -0.13 | 0.66 | 0.36 | -0.48 | 0.99 | 1.29 | 0.22 | -0.83 | -0.41 | -0.06 | 0.78 | -0.12 | 0.83 | 0.1 | 0.94 | 0.14 | 0.00 | 0.50 | -0.83 |
| -0.66 | 0.26 | -0.04 | 0.61 | -0.28 | -0.15 | 0.69 | -0.31 | 0.10 | 0.49 | -0.02 | -1.12 | -0.06 | 0.38 | 0.50 | -0.78 | 0.19 | -0.69 | 0.19 | 0.28 | -0.41 | 0.21 | 0.58 | 0.91 | 0.14 | -1.56 | -0.33 | 0.98 | -0.24 | -1.56 | -0.52 | -0.40 | -0.78 | 0.38 | 0.25 | 0.35 | 0.42 | -0.48 | 0.80 | 0.50 | 0.00 | 1.12 |
| -0.27 | 0.09 | -0.44 | 1.25 | 0.46 | 0.67 | 0.06 | 0.35 | 0.57 | 0.92 | 0.31 | -0.1 | -0.14 | 0.25 | 0.76 | 1.08 | 0.01 | -0.20 | -1.07 | -0.40 | 0.33 | -0.59 | 0.33 | -0.53 | -0.20 | 0.88 | 0.14 | -0.31 | 0.63 | 0.07 | -1.0 | -0.35 | -0.12 | -0.41 | -0.10 | -0.02 | -0.07 | -0.13 | -0.00 | -0.83 | 1.12 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.01 | 0.27 | 0.33 | 1.33 | 0.38 | 0.65 | -0.23 | -0.34 | 0.55 | 0.01 | -0.95 | -0.05 | 0.20 | 0.34 | 0.01 | -0.41 | -0.30 | 0.02 | -0.61 | 0.50 | -0.14 | 0.61 | -0.20 | -0.15 | 1.38 | 0.30 | -0.98 | 1.02 | 0.26 | 1.02 | 0.28 | 0.40 | -0.76 | -0.53 | -1.17 | -0.26 |
| 1.74 | -0.06 | -1.53 | -0.72 | 0.06 | 0.81 | 0.63 | -0.38 | 0.27 | -0.67 | -0.26 | -0.02 | -0.30 | -0.08 | -0.26 | 0.33 | -0.20 | 0.56 | 0.61 | 1.19 | 0.72 | -0.65 | 0.01 | 0.39 | 0.46 | -0.18 | 0.12 | -0.45 | -0.42 | 0.15 | -1.38 | 1.18 | -0.28 | -0.38 | -0.17 | -1.02 | 0.25 | 0.84 | 0.49 | -0.96 | 0.27 | 0.50 |
| -0.21 | 1.25 | 0.18 | -1.39 | -0.98 | 0.27 | -0.94 | -0.40 | 0.87 | -0.06 | -0.37 | -0.39 | -0.94 | 0.68 | -0.14 | -0.08 | 1.08 | 0.65 | -0.17 | 0.01 | 0.86 | 0.39 | -0.83 | 0.79 | -0.86 | -0.85 | -0.1 | 0.27 | -0.74 | -0.53 | -0.07 | 0.88 | 0.18 | 0.24 | 0.38 | -0.54 | 0.59 | -0.04 | 0.23 | 0.72 | -0.22 | -1.10 |
| 0.49 | 0.76 | -0.90 | 0.60 | 0.55 | -0.46 | 0.04 | 0.28 | 0.12 | 0.62 | 0.84 | 0.52 | 0.56 | 0.38 | 0.34 | -0.82 | -0.57 | 0.62 | 1.42 | -0.24 | 0.29 | 0.83 | 0.62 | 0.34 | -0.16 | 0.57 | -0.04 | 0.68 | -0.07 | -0.50 | 0.53 | 0.13 | 0.49 | 0.31 | -0.82 | -0.28 | -0.02 | 1.08 | 1.49 | 0.18 | -0.73 | 0.63 |
| 0.17 | 0.40 | 0.17 | 0.11 | 0.18 | 0.92 | -0.84 | 0.74 | 0.47 | -0.17 | -0.18 | 0.50 | -0.51 | -0.89 | -0.08 | 0.22 | 0.19 | -0.31 | 0.94 | -0.74 | -0.66 | -0.41 | 0.61 | -0.04 | 0.27 | -0.1 | 0.80 | -1.10 | 0.60 | 0.97 | 0.46 | 0.35 | -0.34 | 0.61 | -0.42 | -0.40 | -0.11 | 0.01 | 1.13 | -0.40 | -0.55 | -0.02 |
| 1.34 | -0.54 | 0.30 | 0.57 | 0.14 | 0.10 | -0.15 | 0.56 | 0.41 | 0.02 | 1.36 | 0.24 | -0.28 | -0.25 | 1.17 | -0.90 | -1.32 | -0.65 | 0.91 | 1.06 | -0.24 | -0.26 | 0.17 | -1.09 | 0.77 | -0.11 | -0.09 | 0.08 | -0.53 | 0.60 | 0.39 | -0.65 | -0.71 | 0.44 | -0.55 | 0.53 | -0.36 | 1.16 | 0.61 | -0.13 | 0.21 | 0.12 |
| 1.09 | -0.27 | 0.46 | 0.73 | 0.50 | -0.34 | 0.34 | 0.33 | -0.18 | -0.35 | 1.01 | 0.53 | 0.67 | -0.04 | -0.24 | -0.24 | 1.03 | -0.65 | -0.38 | -1.09 | 0.32 | 0.66 | 0.27 | -1.05 | 0.21 | -0.11 | -0.96 | 0.65 | 0.04 | 0.09 | -0.20 | 0.54 | -0.09 | 0.15 | 0.18 | 0.87 | 0.44 | 0.24 | -0.58 | 0.01 | -0.10 | -0.07 |
| 0.00 | 1.32 | -0.26 | -0.14 | 0.71 | 0.31 | 0.06 | 0.26 | -0.31 | -0.80 | 0.88 | 0.38 | 1.11 | -0.1 | -0.34 | -0.37 | -0.08 | -0.20 | -0.47 | 0.07 | 0.1 | -0.99 | -0.01 | -0.47 | -0.37 | 0.21 | -0.11 | -0.12 | 1.38 | 0.32 | 0.56 | -0.67 | 0.43 | 0.05 | 0.27 | 0.42 | -1.05 | -0.44 | 0.30 | -0.19 | -0.66 | -0.77 |
| 1.32 | 0.00 | 0.09 | 0.07 | -0.39 | 0.33 | 0.59 | 0.35 | 0.86 | -0.36 | -0.01 | 0.26 | -1.05 | -0.47 | -0.75 | -0.02 | 0.25 | 0.50 | -0.57 | -0.13 | -0.38 | -0.24 | 0.21 | -1.43 | -0.17 | 0.42 | 0.08 | -0.11 | 0.04 | -0.22 | -0.15 | -0.03 | 0.03 | -1.25 | 0.16 | 0.49 | 0.49 | 1.86 | -0.24 | -0.76 | 0.26 | 0.09 |
| -0.26 | 0.09 | 0.00 | 0.91 | -0.18 | 0.14 | -0.72 | -0.21 | 0.30 | -0.11 | -0.04 | -1.75 | -0.31 | -0.48 | -0.17 | 1.14 | -0.18 | -0.20 | -1.11 | -0.32 | -1.44 | 0.76 | 0.57 | -0.01 | 0.33 | 1.07 | 0.36 | -0.41 | -1.37 | 0.67 | 0.75 | 0.05 | -0.52 | 0.69 | 0.35 | 1.19 | -0.20 | -0.08 | 0.44 | 0.37 | -0.04 | -0.44 |
| -0.14 | 0.07 | 0.91 | 0.00 | -0.23 | 0.62 | 0.71 | -1.01 | 0.33 | -0.30 | 1.27 | -0.43 | 0.34 | -0.62 | 0.46 | -0.32 | 0.80 | 0.79 | -0.44 | -0.05 | 0.54 | 0.25 | 0.53 | -0.10 | 0.91 | 0.20 | 0.15 | 0.01 | -1.28 | 0.44 | 0.61 | 0.49 | 0.30 | 0.51 | 0.00 | 1.23 | 0.47 | 0.11 | 0.21 | 0.63 | 0.61 | 1.25 |
| 0.71 | -0.39 | -0.18 | -0.23 | 0.00 | 0.16 | 0.69 | -1.41 | -0.94 | -0.05 | -0.64 | 0.51 | 0.28 | -0.61 | -1.20 | 0.20 | -0.38 | -0.34 | 0.36 | -1.02 | 0.69 | -0.26 | 0.49 | -0.13 | -0.64 | 0.61 | -0.68 | -0.05 | 0.23 | -0.08 | -0.01 | 0.77 | 1.01 | -0.25 | 0.55 | -0.05 | -0.61 | -0.43 | 0.73 | -0.66 | -0.28 | 0.46 |
| 0.31 | 0.33 | 0.14 | 0.62 | 0.16 | 0.00 | 0.36 | 0.17 | -0.61 | -0.98 | -1.45 | 1.59 | 1.57 | 0.48 | -0.80 | 0.08 | -0.29 | -0.17 | 1.07 | 0.05 | 0.43 | 1.14 | 1.21 | 0.08 | 0.09 | -0.90 | -0.54 | 0.68 | 0.13 | -0.19 | -0.92 | 0.45 | 0.75 | 0.19 | 0.65 | 0.55 | -0.16 | -0.17 | 0.03 | -0.48 | -0.15 | 0.67 |
| 0.06 | 0.59 | -0.72 | 0.71 | 0.69 | 0.36 | 0.00 | 0.60 | -1.07 | -1.22 | 0.43 | -0.19 | 1.23 | 0.94 | 0.09 | 0.11 | -0.27 | 0.91 | -0.85 | 0.68 | 1.13 | 0.70 | -0.28 | 0.75 | -0.46 | 0.50 | -0.71 | 1.01 | 0.45 | 0.33 | 0.32 | -0.79 | -1.50 | 0.26 | 0.40 | 0.65 | 0.61 | 0.55 | -0.76 | 0.43 | 0.69 | 0.06 |
| 0.26 | 0.35 | -0.21 | -1.01 | -1.41 | 0.17 | 0.60 | 0.00 | 1.07 | 0.02 | 0.48 | -0.03 | -0.78 | 0.32 | -0.48 | 1.05 | -0.41 | -0.15 | -0.72 | 0.18 | 0.24 | 0.23 | 0.67 | -0.25 | -0.90 | 0.17 | -0.21 | 0.27 | 0.36 | 0.05 | 0.58 | 0.08 | 0.79 | -0.30 | -0.50 | -0.03 | 0.28 | -0.04 | 0.57 | 0.10 | -0.31 | -0.35 |
| -0.31 | 0.86 | 0.30 | 0.33 | -0.94 | -0.61 | -1.07 | 1.07 | 0.00 | -0.89 | 0.38 | 0.23 | -0.48 | -0.03 | 1.25 | 0.26 | -0.48 | -0.89 | -0.22 | 0.83 | 0.50 | 0.11 | 0.45 | -0.81 | 0.30 | 0.98 | 0.75 | 0.56 | 0.06 | 0.72 | 0.28 | 0.08 | 0.16 | -0.47 | 0.29 | -1.21 | 0.54 | -0.53 | 1.10 | 0.11 | 0.18 | 0.57 |
| -0.80 | -0.36 | -0.11 | -0.30 | -0.05 | -0.98 | -1.22 | 0.02 | -0.89 | 0.00 | 0.34 | 0.41 | -0.76 | 0.12 | -0.74 | -0.43 | -0.99 | -0.88 | -0.68 | 1.00 | 0.40 | -0.95 | -0.16 | -1.18 | 0.57 | -0.24 | 0.02 | 0.38 | 0.19 | -0.99 | 0.55 | 0.71 | 0.54 | 0.90 | 0.40 | 0.06 | 0.92 | -0.96 | 0.87 | 1.38 | 0.49 | 0.92 |
| 0.88 | -0.01 | -0.04 | 1.27 | -0.64 | -1.45 | 0.43 | 0.48 | 0.38 | 0.34 | 0.00 | -0.92 | -1.66 | 0.74 | -0.16 | -0.67 | -0.07 | -0.73 | 0.02 | 0.14 | 0.75 | -0.30 | -1.49 | 0.56 | -0.41 | 0.37 | -0.40 | -0.17 | 0.59 | -0.29 | 0.12 | 1.33 | 0.44 | -0.96 | -0.47 | 1.46 | -0.05 | 0.78 | -0.36 | 0.15 | -0.02 | 0.31 |
| 0.38 | 0.26 | -1.75 | -0.43 | 0.51 | 1.59 | -0.19 | -0.03 | 0.23 | 0.41 | -0.92 | 0.00 | 0.07 | 1.01 | -0.98 | -0.02 | -0.13 | -0.08 | -0.42 | 0.82 | -0.29 | 0.38 | -0.54 | 0.83 | -0.21 | -0.74 | -0.28 | 0.83 | -0.82 | -0.35 | 0.02 | -0.68 | -0.07 | 0.21 | 1.07 | -1.03 | -0.87 | 0.74 | -0.46 | -1.17 | -1.12 | -0.1 |
| 1.11 | -1.05 | -0.31 | 0.34 | 0.28 | 1.57 | 1.23 | -0.78 | -0.48 | -0.76 | -1.66 | 0.07 | 0.00 | 0.30 | 0.41 | 0.01 | 0.25 | 1.37 | 0.15 | 0.39 | -0.45 | -0.21 | 0.29 | -0.11 | 0.65 | -0.04 | 0.48 | -0.18 | -1.12 | -0.21 | 0.30 | 1.08 | 0.86 | -0.24 | -0.39 | -0.58 | -0.43 | -0.60 | 0.55 | 0.11 | -0.06 | -0.14 |
| -0.1 | -0.47 | -0.48 | -0.62 | -0.61 | 0.48 | 0.94 | 0.32 | -0.03 | 0.12 | 0.74 | 1.01 | 0.30 | 0.00 | -0.38 | 0.12 | 0.83 | 0.81 | -0.35 | 0.58 | 0.70 | -0.05 | 0.32 | 0.62 | 0.64 | -0.34 | 0.18 | 0.85 | 0.89 | 0.49 | 1.11 | -0.19 | -0.65 | 1.09 | 0.93 | -0.68 | 0.23 | -0.60 | -0.33 | -0.60 | 0.38 | 0.25 |
| -0.34 | -0.75 | -0.17 | 0.46 | -1.20 | -0.80 | 0.09 | -0.48 | 1.25 | -0.74 | -0.16 | -0.98 | 0.41 | -0.38 | 0.00 | 1.12 | 0.07 | 1.22 | -0.62 | -0.41 | 1.26 | -0.13 | 0.77 | -0.07 | 0.09 | 0.60 | -0.36 | 0.54 | -0.15 | 0.13 | 0.22 | 0.13 | -0.99 | 0.01 | -0.19 | 0.41 | -1.17 | -0.63 | 0.14 | 0.89 | 0.45 | 0.81 |
| -0.37 | -0.02 | 1.14 | -0.32 | 0.20 | 0.08 | 0.11 | 1.05 | 0.26 | -0.43 | -0.67 | -0.02 | 0.01 | 0.12 | 1.12 | 0.00 | 0.12 | -0.06 | 0.65 | 0.90 | -0.04 | 0.07 | 1.14 | -0.17 | -0.49 | 0.63 | 0.42 | 0.24 | -0.31 | -0.07 | 0.74 | 0.76 | -0.01 | 0.44 | 0.23 | -0.58 | -0.24 | 0.56 | -0.41 | 0.23 | -0.78 | 1.08 |
| -0.08 | 0.25 | -0.18 | 0.80 | -0.38 | -0.29 | -0.27 | -0.41 | -0.48 | -0.99 | -0.07 | -0.13 | 0.25 | 0.83 | 0.07 | 0.12 | 0.00 | 0.74 | 0.52 | 0.09 | -0.18 | -0.31 | 0.43 | -1.13 | -0.98 | 0.75 | -0.81 | -0.16 | -0.56 | 0.30 | 0.11 | 0.92 | 0.58 | 0.01 | 0.40 | 1.00 | 0.26 | 0.28 | 0.20 | 0.22 | 0.19 | 0.01 |
| -0.20 | 0.50 | -0.20 | 0.79 | -0.34 | -0.17 | 0.91 | -0.15 | -0.89 | -0.88 | -0.73 | -0.08 | 1.37 | 0.81 | 1.22 | -0.06 | 0.74 | 0.00 | 0.13 | -1.15 | 0.65 | 0.29 | 0.59 | -0.74 | 0.20 | 0.73 | -0.47 | -0.36 | 0.66 | -0.48 | 0.81 | 0.46 | -0.74 | -0.20 | 0.06 | 0.13 | 1.01 | 1.42 | 0.07 | 0.32 | -0.69 | -0.20 |
| -0.47 | -0.57 | -1.11 | -0.44 | 0.36 | 1.07 | -0.85 | -0.72 | -0.22 | -0.68 | 0.02 | -0.42 | 0.15 | -0.35 | -0.62 | 0.65 | 0.52 | 0.13 | 0.00 | 0.26 | -0.88 | -0.50 | 0.77 | -0.69 | -0.87 | 0.57 | 0.36 | 0.19 | 0.67 | -0.15 | -0.22 | 0.80 | -0.44 | 0.29 | 0.49 | -0.17 | -0.75 | -0.23 | -0.32 | 0.53 | 0.19 | -1.07 |
| 0.07 | -0.13 | -0.32 | -0.05 | -1.02 | 0.05 | 0.68 | 0.18 | 0.83 | 1.00 | 0.14 | 0.82 | 0.39 | 0.58 | -0.41 | 0.90 | 0.09 | -1.15 | 0.26 | 0.00 | -0.74 | 0.16 | -1.48 | 0.49 | -1.06 | 0.52 | 1.52 | 0.33 | -1.22 | -0.59 | -0.09 | 0.38 | 0.71 | -0.05 | 0.78 | -0.12 | 0.72 | -0.30 | -0.37 | -0.04 | 0.28 | -0.40 |
| 0.1 | -0.38 | -1.44 | 0.54 | 0.69 | 0.43 | 1.13 | 0.24 | 0.50 | 0.40 | 0.75 | -0.29 | -0.45 | 0.70 | 1.26 | -0.04 | -0.18 | 0.65 | -0.88 | -0.74 | 0.00 | 0.75 | 0.82 | -0.71 | 0.72 | -0.37 | -0.26 | 1.17 | -0.10 | 0.00 | -0.31 | 0.83 | -0.89 | 1.10 | 1.41 | 0.50 | 0.35 | 0.14 | -0.18 | -0.10 | -0.41 | 0.33 |
| -0.99 | -0.24 | 0.76 | 0.25 | -0.26 | 1.14 | 0.70 | 0.23 | 0.11 | -0.95 | -0.30 | 0.38 | -0.21 | -0.05 | -0.13 | 0.07 | -0.31 | 0.29 | -0.50 | 0.16 | 0.75 | 0.00 | 0.92 | 0.40 | 0.34 | 0.24 | 1.27 | -0.47 | -0.32 | 0.79 | 0.69 | -1.15 | 0.25 | -0.20 | 1.09 | -0.67 | -0.04 | -1.04 | -0.54 | 0.79 | 0.21 | -0.59 |
| -0.01 | 0.21 | 0.57 | 0.53 | 0.49 | 1.21 | -0.28 | 0.67 | 0.45 | -0.16 | -1.49 | -0.54 | 0.29 | 0.32 | 0.77 | 1.14 | 0.43 | 0.59 | 0.77 | -1.48 | 0.82 | 0.92 | 0.00 | 1.36 | -0.64 | -0.46 | -0.52 | 0.22 | 0.13 | 0.38 | 0.03 | -0.12 | 0.77 | 0.06 | -0.41 | -0.37 | -0.75 | 0.10 | -0.52 | 0.34 | 0.58 | 0.33 |
| -0.47 | -1.43 | -0.01 | -0.10 | -0.13 | 0.08 | 0.75 | -0.25 | -0.81 | -1.18 | 0.56 | 0.83 | -0.11 | 0.62 | -0.07 | -0.17 | -1.13 | -0.74 | -0.69 | 0.49 | -0.71 | 0.40 | 1.36 | 0.00 | 0.62 | -0.09 | -0.22 | 1.03 | -0.91 | -0.10 | 0.41 | 0.14 | -0.60 | -0.71 | -0.71 | 1.22 | 0.93 | -0.35 | 1.06 | -0.13 | 0.91 | -0.53 |
| -0.37 | -0.17 | 0.33 | 0.91 | -0.64 | 0.09 | -0.46 | -0.90 | 0.30 | 0.57 | -0.41 | -0.21 | 0.65 | 0.64 | 0.09 | -0.49 | -0.98 | 0.20 | -0.87 | -1.06 | 0.72 | 0.34 | -0.64 | 0.62 | 0.00 | -1.05 | 1.0 | 0.14 | 0.19 | -0.02 | 0.93 | 0.31 | -0.87 | 0.67 | 0.02 | -1.09 | -0.15 | -0.12 | -0.02 | 0.66 | -0.14 | -0.20 |
| 0.21 | 0.42 | 1.07 | 0.20 | 0.61 | -0.90 | 0.50 | 0.17 | 0.98 | -0.24 | 0.37 | -0.74 | -0.04 | -0.34 | 0.60 | 0.63 | 0.75 | 0.73 | 0.57 | 0.52 | -0.37 | 0.24 | -0.46 | -0.09 | -1.05 | 0.00 | 0.95 | -0.74 | 0.52 | -0.45 | -0.84 | -0.81 | 0.02 | -0.06 | 0.19 | -1.15 | -0.41 | -0.12 | -0.22 | 0.36 | -1.56 | 0.88 |
| -0.11 | 0.08 | 0.36 | 0.15 | -0.68 | -0.54 | -0.71 | -0.21 | 0.75 | 0.02 | -0.40 | -0.28 | 0.48 | 0.18 | -0.36 | 0.42 | -0.81 | -0.47 | 0.36 | 1.52 | -0.26 | 1.27 | -0.52 | -0.22 | 1.0 | 0.95 | 0.00 | 0.39 | 0.59 | 0.63 | -0.45 | 0.34 | -0.37 | 0.26 | 0.21 | -0.06 | 0.83 | 0.15 | -0.27 | -0.48 | -0.33 | 0.14 |
| -0.12 | -0.11 | -0.41 | 0.01 | -0.05 | 0.68 | 1.01 | 0.27 | 0.56 | 0.38 | -0.17 | 0.83 | -0.18 | 0.85 | 0.54 | 0.24 | -0.16 | -0.36 | 0.19 | 0.33 | 1.17 | -0.47 | 0.22 | 1.03 | 0.14 | -0.74 | 0.39 | 0.00 | -0.62 | -0.25 | 0.42 | -0.02 | -0.07 | 0.84 | -0.03 | 0.59 | -1.01 | 0.23 | -0.38 | 0.99 | 0.98 | -0.31 |
| 1.38 | 0.04 | -1.37 | -1.28 | 0.23 | 0.13 | 0.45 | 0.36 | 0.06 | 0.19 | 0.59 | -0.82 | -1.12 | 0.89 | -0.15 | -0.31 | -0.56 | 0.66 | 0.67 | -1.22 | -0.10 | -0.32 | 0.13 | -0.91 | 0.19 | 0.52 | 0.59 | -0.62 | 0.00 | 0.73 | -0.13 | -0.62 | -0.35 | 0.35 | -0.61 | 0.53 | -0.01 | 0.07 | -0.46 | 1.29 | -0.24 | 0.63 |
| 0.32 | -0.22 | 0.67 | 0.44 | -0.08 | -0.19 | 0.33 | 0.05 | 0.72 | -0.99 | -0.29 | -0.35 | -0.21 | 0.49 | 0.13 | -0.07 | 0.30 | -0.48 | -0.15 | -0.59 | 0.00 | 0.79 | 0.38 | -0.10 | -0.02 | -0.45 | 0.63 | -0.25 | 0.73 | 0.00 | -0.73 | -0.89 | 0.28 | 0.01 | 1.02 | -0.31 | 0.86 | 0.31 | 0.14 | 0.22 | -1.56 | 0.07 |
| 0.56 | -0.15 | 0.75 | 0.61 | -0.01 | -0.92 | 0.32 | 0.58 | 0.28 | 0.55 | 0.12 | 0.02 | 0.30 | 1.11 | 0.22 | 0.74 | 0.11 | 0.81 | -0.22 | -0.09 | -0.31 | 0.69 | 0.03 | 0.41 | 0.93 | -0.84 | -0.45 | 0.42 | -0.13 | -0.73 | 0.00 | 0.58 | -1.10 | 0.03 | 1.21 | 0.64 | -0.84 | 1.03 | 0.53 | -0.83 | -0.52 | -1.0 |
| -0.67 | -0.03 | 0.05 | 0.49 | 0.77 | 0.45 | -0.79 | 0.08 | 0.08 | 0.71 | 1.33 | -0.68 | 1.08 | -0.19 | 0.13 | 0.76 | 0.92 | 0.46 | 0.80 | 0.38 | 0.83 | -1.15 | -0.12 | 0.14 | 0.31 | -0.81 | 0.34 | -0.02 | -0.62 | -0.89 | 0.58 | 0.00 | 0.14 | -1.16 | 0.41 | -0.33 | 0.45 | 0.32 | -0.71 | -0.41 | -0.40 | -0.35 |
| 0.43 | 0.03 | -0.52 | 0.30 | 1.01 | 0.75 | -1.50 | 0.79 | 0.16 | 0.54 | 0.44 | -0.07 | 0.86 | -0.65 | -0.99 | -0.01 | 0.58 | -0.74 | -0.44 | 0.71 | -0.89 | 0.25 | 0.77 | -0.60 | -0.87 | 0.02 | -0.37 | -0.07 | -0.35 | 0.28 | -1.10 | 0.14 | 0.00 | 1.25 | -0.26 | 0.81 | 0.91 | -0.46 | -0.51 | -0.06 | -0.78 | -0.12 |
| 0.05 | -1.25 | 0.69 | 0.51 | -0.25 | 0.19 | 0.26 | -0.30 | -0.47 | 0.90 | -0.96 | 0.21 | -0.24 | 1.09 | 0.01 | 0.44 | 0.01 | -0.20 | 0.29 | -0.05 | 1.10 | -0.20 | 0.06 | -0.71 | 0.67 | -0.06 | 0.26 | 0.84 | 0.35 | 0.01 | 0.03 | -1.16 | 1.25 | 0.00 | -0.09 | 0.63 | 0.41 | 0.51 | 0.34 | 0.78 | 0.38 | -0.41 |
| 0.27 | 0.16 | 0.35 | 0.00 | 0.55 | 0.65 | 0.40 | -0.50 | 0.29 | 0.40 | -0.47 | 1.07 | -0.39 | 0.93 | -0.19 | 0.23 | 0.40 | 0.06 | 0.49 | 0.78 | 1.41 | 1.09 | -0.41 | -0.71 | 0.02 | 0.19 | 0.21 | -0.03 | -0.61 | 1.02 | 1.21 | 0.41 | -0.26 | -0.09 | 0.00 | -0.11 | 0.27 | 0.08 | -1.15 | -0.12 | 0.25 | -0.10 |
| 0.42 | 0.49 | 1.19 | 1.23 | -0.05 | 0.55 | 0.65 | -0.03 | -1.21 | 0.06 | 1.46 | -1.03 | -0.58 | -0.68 | 0.41 | -0.58 | 1.00 | 0.13 | -0.17 | -0.12 | 0.50 | -0.67 | -0.37 | 1.22 | -1.09 | -1.15 | -0.06 | 0.58 | 0.53 | -0.31 | 0.64 | -0.33 | 0.81 | 0.63 | -0.11 | 0.00 | -0.73 | 0.19 | -0.03 | 0.83 | 0.35 | -0.02 |
| -1.05 | 0.49 | -0.20 | 0.47 | -0.61 | -0.16 | 0.61 | 0.28 | 0.54 | 0.92 | -0.05 | -0.87 | -0.43 | 0.23 | -1.17 | -0.24 | 0.26 | 1.01 | -0.75 | 0.72 | 0.35 | -0.04 | -0.75 | 0.93 | -0.15 | -0.41 | 0.83 | -1.01 | -0.01 | 0.86 | -0.84 | 0.45 | 0.91 | 0.41 | 0.27 | -0.73 | 0.00 | 0.85 | 1.57 | 0.1 | 0.42 | -0.07 |
| -0.44 | 1.86 | -0.08 | 0.11 | -0.43 | -0.17 | 0.55 | -0.04 | -0.53 | -0.96 | 0.78 | 0.74 | -0.60 | -0.60 | -0.63 | 0.56 | 0.28 | 1.42 | -0.23 | -0.30 | 0.14 | -1.04 | 0.10 | -0.35 | -0.12 | -0.12 | 0.15 | 0.23 | 0.07 | 0.31 | 1.03 | 0.32 | -0.46 | 0.51 | 0.08 | 0.19 | 0.85 | 0.00 | 0.41 | 0.94 | -0.48 | -0.13 |
| 0.30 | -0.24 | 0.44 | 0.21 | 0.73 | 0.03 | -0.76 | 0.57 | 1.10 | 0.87 | -0.36 | -0.46 | 0.55 | -0.33 | 0.14 | -0.41 | 0.20 | 0.07 | -0.32 | -0.37 | -0.18 | -0.54 | -0.52 | 1.06 | -0.02 | -0.22 | -0.27 | -0.38 | -0.46 | 0.14 | 0.53 | -0.71 | -0.51 | 0.34 | -1.15 | -0.03 | 1.57 | 0.41 | 0.00 | 0.14 | 0.80 | -0.00 |
| -0.19 | -0.76 | 0.37 | 0.63 | -0.66 | -0.48 | 0.43 | 0.10 | 0.11 | 1.38 | 0.15 | -1.17 | 0.11 | -0.60 | 0.89 | 0.23 | 0.22 | 0.32 | 0.53 | -0.04 | -0.10 | 0.79 | 0.34 | -0.13 | 0.66 | 0.36 | -0.48 | 0.99 | 1.29 | 0.22 | -0.83 | -0.41 | -0.06 | 0.78 | -0.12 | 0.83 | 0.1 | 0.94 | 0.14 | 0.00 | 0.50 | -0.83 |
| -0.66 | 0.26 | -0.04 | 0.61 | -0.28 | -0.15 | 0.69 | -0.31 | 0.18 | 0.49 | -0.02 | -1.12 | -0.06 | 0.38 | 0.45 | -0.78 | 0.19 | -0.69 | 0.19 | 0.28 | -0.41 | 0.21 | 0.58 | 0.91 | -0.14 | -1.56 | -0.33 | 0.90 | -0.24 | -1.56 | -0.52 | -0.40 | -0.78 | 0.38 | 0.25 | 0.35 | 0.42 | -0.48 | 0.80 | 0.50 | 0.00 | 1.12 |
| -0.27 | 0.09 | -0.44 | 1.25 | 0.46 | 0.67 | 0.06 | -0.35 | 0.57 | 0.92 | 0.31 | -0.1 | -0.14 | 0.25 | 0.81 | 1.08 | 0.01 | -0.20 | -1.07 | -0.40 | 0.33 | -0.59 | 0.33 | -0.53 | -0.20 | 0.88 | 0.14 | -0.31 | 0.63 | 0.07 | -1.0 | -0.35 | -0.12 | -0.41 | -0.10 | -0.02 | -0.07 | -0.13 | -0.00 | -0.83 | 1.12 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.02 | 0.27 | 0.33 | 1.33 | 0.38 | 0.60 | -0.23 | -0.34 | 0.55 | 0.01 | -0.95 | -0.05 | 0.20 | 0.34 | 0.01 | -0.41 | -0.30 | 0.02 | -0.61 | 0.50 | -0.14 | 0.61 | -0.20 | -0.27 | 1.38 | 0.30 | -0.98 | 0.96 | 0.26 | 0.97 | 0.28 | 0.40 | -0.76 | -0.56 | -1.23 | -0.26 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.26 | 0.33 | -0.20 | 0.56 | 0.61 | 1.19 | 0.72 | -0.65 | 0.01 | 0.39 | 0.46 | 0.18 | 0.12 | -0.45 | -0.42 | 0.26 | -1.38 | 1.18 | -0.78 | -0.33 | -0.17 | -0.97 | 0.25 | 0.84 | 0.49 | -0.93 | 0.33 | 0.50 |
| -0.21 | 1.25 | -0.18 | -1.39 | -0.98 | 0.27 | -0.95 | -0.40 | 0.87 | -0.06 | -0.37 | -0.34 | -0.94 | 0.68 | -0.14 | -0.08 | 1.08 | 0.65 | -0.17 | 0.01 | 0.86 | 0.39 | -0.83 | 0.79 | -0.86 | -0.85 | -0.1 | 0.27 | -0.74 | -0.42 | -0.07 | 0.88 | 0.18 | 0.30 | 0.38 | -0.49 | 0.54 | -0.04 | 0.23 | 0.75 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.34 | -0.82 | -0.57 | 0.62 | 1.42 | -0.24 | 0.29 | 0.83 | -0.62 | 0.34 | 0.16 | 0.57 | -0.04 | 0.68 | -0.07 | -0.39 | 0.53 | 0.13 | 0.49 | 0.37 | -0.82 | -0.23 | -0.02 | 1.08 | 1.49 | 0.21 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.08 | 0.22 | 0.19 | -0.31 | 0.94 | -0.74 | -0.66 | -0.41 | 0.61 | -0.04 | 0.27 | -0.1 | 0.80 | -1.10 | 0.60 | 1.09 | -0.46 | 0.35 | -0.34 | 0.67 | -0.42 | -0.35 | -0.11 | 0.01 | 1.13 | -0.37 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.17 | -0.90 | -1.32 | -0.65 | 0.91 | 1.06 | -0.24 | -0.26 | 0.17 | -1.09 | 0.77 | -0.11 | -0.09 | 0.08 | 0.53 | 0.49 | 0.39 | -0.65 | -0.71 | 0.38 | -0.55 | 0.48 | -0.36 | 1.16 | 0.61 | -0.16 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.24 | -0.24 | 1.03 | -0.65 | -0.38 | 1.09 | 0.32 | 0.66 | 0.27 | -1.05 | 0.21 | -0.11 | -0.96 | 0.65 | 0.04 | -0.03 | -0.20 | 0.54 | -0.09 | 0.09 | 0.18 | 0.82 | 0.44 | 0.24 | -0.58 | -0.02 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.34 | -0.37 | -0.08 | -0.20 | -0.47 | 0.07 | 0.1 | -0.99 | -0.01 | -0.47 | -0.37 | 0.21 | -0.11 | -0.12 | 1.38 | 0.44 | 0.56 | -0.67 | 0.43 | 0.11 | 0.27 | 0.47 | -1.05 | -0.44 | 0.30 | -0.16 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.75 | -0.02 | 0.25 | 0.50 | -0.57 | -0.13 | -0.38 | -0.24 | 0.21 | -1.43 | -0.17 | 0.42 | 0.08 | -0.11 | 0.04 | -0.10 | -0.15 | -0.03 | 0.03 | -1.20 | 0.16 | 0.54 | 0.49 | 1.86 | -0.24 | -0.73 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.17 | 1.14 | -0.18 | -0.20 | -1.11 | -0.32 | -1.44 | 0.76 | 0.57 | -0.01 | 0.33 | 1.07 | 0.36 | -0.41 | -1.37 | 0.56 | 0.75 | 0.05 | -0.52 | 0.63 | 0.35 | 1.15 | -0.20 | -0.08 | 0.44 | 0.34 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.46 | -0.32 | 0.80 | 0.79 | -0.44 | -0.05 | 0.54 | 0.25 | 0.53 | -0.10 | 0.91 | 0.20 | 0.15 | 0.01 | -1.28 | 0.32 | 0.61 | 0.49 | 0.30 | 0.46 | 0.00 | 1.18 | 0.47 | 0.11 | 0.21 | 0.60 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.20 | 0.20 | -0.38 | -0.34 | 0.36 | -1.02 | 0.69 | -0.26 | 0.49 | -0.13 | -0.64 | 0.61 | -0.68 | -0.05 | 0.23 | 0.03 | -0.01 | 0.77 | 1.01 | -0.20 | 0.55 | -0.00 | -0.61 | -0.43 | 0.73 | -0.63 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.80 | 0.08 | -0.29 | -0.17 | 1.07 | 0.05 | 0.43 | 1.14 | 1.21 | 0.08 | 0.09 | -0.90 | -0.54 | 0.68 | 0.13 | -0.08 | -0.92 | 0.45 | 0.75 | 0.25 | 0.65 | 0.60 | -0.16 | -0.17 | 0.03 | -0.45 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.1 | 0.12 | -0.28 | 0.90 | -0.87 | 0.69 | 1.14 | 0.71 | -0.29 | 0.74 | -0.45 | 0.51 | -0.70 | 1.03 | 0.44 | 0.20 | 0.33 | -0.78 | -1.51 | 0.19 | 0.41 | 0.59 | 0.60 | 0.54 | -0.77 | 0.39 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.48 | 1.05 | -0.41 | -0.15 | -0.72 | 0.18 | 0.24 | 0.23 | 0.67 | -0.25 | -0.90 | 0.17 | -0.21 | 0.27 | 0.36 | -0.06 | 0.58 | 0.08 | 0.79 | -0.36 | -0.50 | -0.08 | 0.28 | -0.04 | 0.57 | 0.07 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.25 | 0.26 | -0.48 | -0.89 | -0.22 | 0.83 | 0.50 | 0.11 | 0.45 | -0.81 | 0.30 | 0.98 | 0.75 | 0.56 | 0.06 | 0.60 | 0.28 | 0.08 | 0.16 | -0.53 | 0.29 | -1.26 | 0.54 | -0.53 | 1.10 | 0.08 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.74 | -0.43 | -0.99 | -0.88 | -0.68 | 1.00 | 0.40 | -0.95 | -0.16 | -1.18 | 0.57 | -0.24 | 0.02 | 0.38 | 0.19 | -1.11 | 0.55 | 0.71 | 0.54 | 0.84 | 0.40 | 0.01 | 0.92 | -0.96 | 0.87 | 1.34 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.16 | -0.67 | -0.07 | -0.73 | 0.02 | 0.14 | 0.75 | -0.30 | -1.49 | 0.56 | -0.41 | 0.37 | -0.40 | -0.17 | 0.59 | -0.40 | 0.12 | 1.33 | 0.44 | -1.02 | -0.47 | 1.41 | -0.05 | 0.78 | -0.36 | 0.12 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.03 | -0.07 | -0.08 | -0.03 | -0.36 | 0.77 | -0.34 | 0.33 | -0.49 | 0.88 | -0.26 | -0.79 | -0.33 | 0.78 | -0.77 | -0.18 | -0.03 | -0.73 | -0.02 | 0.32 | 1.02 | -0.93 | -0.82 | 0.79 | -0.41 | -1.09 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.41 | 0.01 | 0.25 | 1.37 | 0.15 | 0.39 | -0.45 | -0.21 | 0.29 | -0.11 | 0.65 | -0.04 | 0.48 | -0.18 | -1.12 | -0.09 | 0.30 | 1.08 | 0.86 | -0.19 | -0.39 | -0.53 | -0.43 | -0.60 | 0.55 | 0.15 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.38 | 0.12 | 0.83 | 0.81 | -0.35 | 0.58 | 0.70 | -0.05 | 0.32 | 0.62 | 0.64 | -0.34 | 0.18 | 0.85 | 0.89 | 0.37 | 1.11 | -0.19 | -0.65 | 1.04 | 0.93 | -0.73 | 0.23 | -0.60 | -0.33 | -0.63 | 0.32 | 0.25 |
| -0.34 | -0.75 | -0.17 | 0.46 | -1.20 | -0.80 | 0.1 | -0.48 | 1.25 | -0.74 | -0.16 | -1.03 | 0.41 | -0.38 | 0.00 | 1.12 | 0.07 | 1.22 | -0.62 | -0.41 | 1.26 | -0.13 | 0.77 | -0.07 | 0.09 | 0.60 | -0.36 | 0.54 | -0.15 | 0.02 | 0.22 | 0.13 | -0.99 | -0.05 | -0.19 | 0.36 | -1.17 | -0.63 | 0.14 | 0.86 | 0.39 | 0.81 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.12 | 0.00 | 0.12 | -0.06 | 0.65 | 0.90 | -0.04 | 0.07 | 1.14 | -0.17 | -0.49 | 0.63 | 0.42 | 0.24 | -0.31 | -0.19 | 0.74 | 0.76 | -0.01 | 0.38 | 0.23 | -0.63 | -0.24 | 0.56 | -0.41 | 0.20 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.07 | 0.12 | 0.00 | 0.74 | 0.52 | 0.09 | -0.18 | -0.31 | 0.43 | -1.13 | -0.98 | 0.75 | -0.81 | -0.16 | -0.56 | 0.42 | 0.11 | 0.92 | 0.58 | 0.06 | 0.40 | 1.05 | 0.26 | 0.28 | 0.20 | 0.25 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.22 | -0.06 | 0.74 | 0.00 | 0.13 | -1.15 | 0.65 | 0.29 | 0.59 | -0.74 | 0.20 | 0.73 | -0.47 | -0.36 | 0.66 | -0.36 | 0.81 | 0.46 | -0.74 | -0.14 | 0.06 | 0.18 | 1.01 | 1.42 | 0.07 | 0.36 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.62 | 0.65 | 0.52 | 0.13 | 0.00 | 0.26 | -0.88 | -0.50 | 0.77 | -0.69 | -0.87 | 0.57 | 0.36 | 0.19 | 0.67 | -0.04 | -0.22 | 0.80 | -0.44 | 0.35 | 0.49 | -0.12 | -0.75 | -0.23 | -0.32 | 0.56 | 0.25 | -1.07 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.41 | 0.90 | 0.09 | -1.15 | 0.26 | 0.00 | -0.74 | 0.16 | -1.48 | 0.49 | -1.06 | 0.52 | 1.52 | 0.33 | -1.22 | -0.70 | -0.09 | 0.38 | 0.71 | -0.10 | 0.78 | -0.17 | 0.72 | -0.30 | -0.37 | -0.07 | 0.22 | -0.40 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.26 | -0.04 | -0.18 | 0.65 | -0.88 | -0.74 | 0.00 | 0.75 | 0.82 | -0.71 | 0.72 | -0.37 | -0.26 | 1.17 | -0.10 | -0.11 | -0.31 | 0.83 | -0.89 | 1.05 | 1.41 | 0.45 | 0.35 | 0.14 | -0.18 | -0.13 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.13 | 0.07 | -0.31 | 0.29 | -0.50 | 0.16 | 0.75 | 0.00 | 0.92 | 0.40 | 0.34 | 0.24 | 1.27 | -0.47 | -0.32 | 0.67 | 0.69 | -1.15 | 0.25 | -0.25 | 1.09 | -0.72 | -0.04 | -1.04 | -0.54 | 0.75 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.77 | 1.14 | 0.43 | 0.59 | 0.77 | -1.48 | 0.82 | 0.92 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.07 | -0.17 | -1.13 | -0.74 | -0.69 | 0.49 | -0.71 | 0.40 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.09 | -0.49 | -0.98 | 0.20 | -0.87 | -1.06 | 0.72 | 0.34 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.60 | 0.63 | 0.75 | 0.73 | 0.57 | 0.52 | -0.37 | 0.24 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.11 | 0.08 | 0.36 | 0.15 | -0.68 | -0.54 | -0.70 | -0.21 | 0.75 | 0.02 | -0.40 | -0.33 | 0.48 | 0.18 | -0.36 | 0.42 | -0.81 | -0.47 | 0.36 | 1.52 | -0.26 | 1.27 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.54 | 0.24 | -0.16 | -0.36 | 0.19 | 0.33 | 1.17 | -0.47 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.15 | -0.31 | -0.56 | 0.66 | 0.67 | -1.22 | -0.10 | -0.32 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.02 | -0.19 | 0.42 | -0.36 | -0.04 | -0.70 | -0.11 | 0.67 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.22 | 0.74 | 0.11 | 0.81 | -0.22 | -0.09 | -0.31 | 0.69 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.13 | 0.76 | 0.92 | 0.46 | 0.80 | 0.38 | 0.83 | -1.15 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.99 | -0.01 | 0.58 | -0.74 | -0.44 | 0.71 | -0.89 | 0.25 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.05 | 0.38 | 0.06 | -0.14 | 0.35 | -0.10 | 1.05 | -0.25 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.19 | 0.23 | 0.40 | 0.06 | 0.49 | 0.78 | 1.41 | 1.09 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.36 | -0.63 | 1.05 | 0.18 | -0.12 | -0.17 | 0.45 | -0.72 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.17 | -0.24 | 0.26 | 1.01 | -0.75 | 0.72 | 0.35 | -0.04 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.63 | 0.56 | 0.28 | 1.42 | -0.23 | -0.30 | 0.14 | -1.04 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.14 | -0.41 | 0.20 | 0.07 | -0.32 | -0.37 | -0.18 | -0.54 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.16 | -0.73 | 0.34 | 0.60 | -0.63 | -0.45 | 0.39 | 0.07 | 0.08 | 1.34 | 0.12 | -1.09 | 0.15 | -0.63 | 0.86 | 0.20 | 0.25 | 0.36 | 0.56 | -0.07 | -0.13 | 0.75 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.39 | -0.84 | 0.25 | -0.63 | 0.25 | 0.22 | -0.47 | 0.15 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.81 | 1.08 | 0.01 | -0.20 | -1.07 | -0.40 | 0.33 | -0.59 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.02 | 0.27 | 0.33 | 1.33 | 0.38 | 0.60 | -0.23 | -0.34 | 0.55 | 0.01 | -0.95 | -0.05 | 0.20 | 0.34 | 0.01 | -0.41 | -0.30 | 0.02 | -0.61 | 0.50 | -0.21 | 0.61 | -0.20 | -0.27 | 1.38 | 0.30 | -0.98 | 0.96 | 0.26 | 0.97 | 0.28 | 0.40 | -0.76 | -0.67 | -1.23 | -0.26 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.26 | 0.33 | -0.20 | 0.56 | 0.61 | 1.19 | 0.72 | -0.65 | 0.01 | 0.39 | 0.46 | -0.18 | 0.18 | -0.45 | -0.42 | 0.26 | -1.38 | 1.18 | -0.28 | -0.33 | -0.17 | -0.97 | 0.25 | 0.84 | 0.49 | -0.82 | 0.33 | 0.50 |
| -0.21 | 1.25 | -0.18 | -1.39 | -0.98 | 0.27 | -0.95 | -0.40 | 0.87 | -0.06 | -0.37 | -0.34 | -0.94 | 0.68 | -0.14 | -0.08 | 1.08 | 0.65 | -0.17 | 0.01 | 0.86 | 0.39 | -0.83 | 0.79 | -0.86 | -0.85 | -0.03 | 0.27 | -0.74 | -0.42 | -0.07 | 0.88 | 0.18 | 0.30 | 0.38 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.34 | -0.82 | -0.57 | 0.62 | 1.42 | -0.24 | 0.29 | 0.83 | -0.62 | 0.34 | -0.16 | 0.57 | 0.02 | 0.68 | 0.07 | -0.39 | 0.53 | 0.13 | 0.49 | 0.37 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.08 | 0.22 | 0.19 | -0.31 | 0.94 | -0.74 | -0.66 | -0.41 | 0.61 | -0.04 | 0.27 | -0.1 | 0.87 | -1.10 | 0.60 | 1.09 | -0.46 | 0.35 | -0.34 | 0.67 | 0.42 | -0.35 | -0.11 | 0.01 | 1.13 | -0.26 | -0.49 | -0.02 |
| 1.34 | -0.54 | 0.30 | 0.57 | 0.14 | 0.10 | 0.14 | 0.56 | 0.41 | 0.02 | 1.36 | 0.19 | -0.28 | -0.25 | 1.17 | -0.90 | -1.32 | -0.65 | 0.91 | 1.06 | -0.24 | -0.26 | 0.17 | -1.09 | 0.77 | -0.11 | -0.16 | 0.08 | -0.53 | 0.49 | 0.39 | 0.65 | -0.71 | 0.38 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.24 | 0.24 | 1.03 | -0.65 | -0.38 | -1.09 | 0.32 | 0.66 | 0.27 | 1.05 | 0.21 | -0.11 | -1.02 | 0.65 | 0.04 | -0.03 | -0.20 | 0.54 | -0.09 | 0.09 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.34 | -0.37 | -0.08 | -0.20 | -0.47 | 0.07 | 0.1 | -0.99 | -0.01 | -0.47 | -0.37 | 0.21 | -0.04 | -0.12 | 1.38 | 0.44 | 0.56 | -0.67 | 0.43 | 0.11 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.75 | 0.02 | 0.25 | 0.50 | -0.57 | -0.13 | -0.38 | -0.24 | 0.21 | -1.43 | -0.17 | 0.42 | 0.15 | -0.11 | 0.04 | -0.10 | 0.15 | -0.03 | 0.03 | -1.20 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.17 | 1.14 | -0.18 | -0.20 | -1.11 | -0.32 | -1.44 | 0.76 | 0.57 | -0.01 | 0.33 | 1.07 | 0.29 | -0.41 | -1.37 | 0.56 | 0.75 | 0.05 | -0.52 | 0.63 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.46 | -0.32 | 0.80 | 0.79 | -0.44 | -0.05 | 0.54 | 0.25 | 0.53 | -0.10 | 0.91 | 0.20 | 0.08 | 0.01 | -1.28 | 0.32 | 0.61 | 0.49 | 0.30 | 0.46 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.20 | 0.20 | -0.38 | -0.34 | 0.36 | -1.02 | 0.69 | -0.26 | 0.49 | -0.13 | -0.64 | 0.61 | -0.61 | -0.05 | 0.23 | 0.03 | -0.01 | 0.77 | 1.01 | -0.20 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.80 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.25 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.1 | 0.12 | -0.28 | 0.90 | -0.87 | 0.69 | 1.14 | 0.71 | -0.29 | 0.74 | -0.45 | 0.51 | -0.77 | 1.03 | 0.44 | 0.20 | 0.33 | -0.78 | -1.51 | 0.19 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.48 | 1.05 | -0.41 | -0.15 | -0.72 | 0.18 | 0.24 | 0.23 | 0.67 | -0.25 | -0.90 | 0.17 | -0.28 | 0.27 | 0.36 | -0.06 | 0.58 | 0.08 | 0.79 | -0.36 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.25 | 0.26 | -0.48 | -0.89 | -0.22 | 0.83 | 0.50 | 0.11 | 0.45 | -0.81 | 0.30 | 0.98 | 0.69 | 0.56 | 0.06 | 0.60 | 0.28 | 0.08 | 0.16 | -0.53 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.74 | -0.43 | -0.99 | -0.88 | -0.68 | 1.00 | 0.40 | -0.95 | -0.16 | -1.18 | 0.57 | -0.24 | -0.05 | 0.38 | 0.19 | -1.11 | 0.55 | 0.71 | 0.54 | 0.84 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.16 | -0.67 | -0.07 | -0.73 | 0.02 | 0.14 | 0.75 | -0.30 | -1.49 | 0.56 | -0.41 | 0.37 | -0.47 | -0.17 | 0.59 | -0.40 | 0.12 | 1.33 | 0.44 | -1.02 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.03 | -0.07 | -0.08 | -0.03 | -0.36 | 0.77 | -0.34 | 0.33 | -0.49 | 0.88 | -0.26 | -0.79 | -0.27 | 0.78 | -0.77 | -0.18 | -0.03 | -0.73 | -0.02 | 0.32 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.41 | 0.01 | 0.25 | 1.37 | 0.15 | 0.39 | -0.45 | -0.21 | 0.29 | -0.11 | 0.65 | -0.04 | 0.54 | -0.18 | -1.12 | -0.09 | 0.30 | 1.08 | 0.86 | -0.19 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.38 | 0.12 | 0.83 | 0.81 | -0.35 | 0.58 | 0.70 | -0.05 | 0.32 | 0.62 | 0.64 | -0.34 | 0.11 | 0.85 | 0.89 | 0.37 | 1.11 | -0.19 | -0.65 | 1.04 | 0.93 | -0.73 | 0.23 | -0.60 | -0.33 | -0.74 | 0.32 | 0.25 |
| -0.34 | -0.75 | -0.17 | 0.46 | -1.20 | -0.80 | 0.1 | -0.48 | 1.25 | -0.74 | -0.16 | -1.03 | 0.41 | -0.38 | 0.00 | 1.12 | 0.07 | 1.22 | -0.62 | -0.41 | 1.26 | -0.13 | 0.77 | -0.07 | 0.09 | 0.60 | -0.43 | 0.54 | -0.15 | 0.02 | 0.22 | 0.13 | -0.99 | -0.05 | -0.19 | 0.36 | -1.17 | -0.63 | 0.14 | 0.75 | 0.39 | 0.81 |
| -0.37 | 0.02 | 1.14 | -0.32 | 0.20 | 0.08 | 0.12 | 1.05 | 0.26 | -0.43 | -0.67 | -0.07 | 0.01 | 0.12 | 1.12 | 0.00 | 0.12 | -0.06 | 0.65 | 0.90 | -0.04 | 0.07 | 1.14 | -0.17 | -0.49 | 0.63 | 0.36 | 0.24 | -0.31 | -0.19 | 0.74 | 0.76 | -0.01 | 0.38 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.07 | 0.12 | 0.00 | 0.74 | 0.52 | 0.09 | -0.18 | -0.31 | 0.43 | -1.13 | -0.98 | 0.75 | -0.75 | -0.16 | -0.56 | 0.42 | 0.11 | 0.92 | 0.58 | 0.06 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.22 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.14 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.62 | 0.65 | 0.52 | 0.13 | 0.00 | 0.26 | -0.88 | -0.50 | 0.77 | -0.69 | -0.87 | 0.57 | 0.42 | 0.19 | 0.67 | -0.04 | -0.22 | 0.80 | -0.44 | 0.35 | 0.49 | -0.12 | -0.75 | -0.23 | -0.32 | 0.67 | 0.25 | -1.07 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.41 | 0.90 | 0.09 | -1.15 | 0.26 | 0.00 | -0.74 | 0.16 | -1.48 | 0.49 | -1.06 | 0.52 | 1.45 | 0.33 | -1.22 | -0.70 | -0.09 | 0.38 | 0.71 | -0.10 | 0.78 | -0.17 | 0.72 | -0.30 | -0.37 | -0.18 | 0.22 | -0.40 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.26 | -0.04 | -0.18 | 0.65 | -0.88 | -0.74 | 0.00 | 0.75 | 0.82 | -0.71 | 0.72 | -0.37 | -0.33 | 1.17 | -0.10 | -0.11 | -0.31 | 0.83 | -0.89 | 1.05 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.13 | 0.07 | -0.31 | 0.29 | -0.50 | 0.16 | 0.75 | 0.00 | 0.92 | 0.40 | 0.34 | 0.24 | 1.20 | -0.47 | -0.32 | 0.67 | 0.69 | -1.15 | 0.25 | -0.25 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.77 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.11 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.07 | -0.17 | -1.13 | -0.74 | -0.69 | 0.49 | -0.71 | 0.40 | 1.36 | 0.00 | 0.62 | -0.09 | -0.28 | 1.03 | -0.91 | 0.01 | 0.41 | 0.14 | -0.60 | -0.65 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.09 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.61 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.60 | 0.63 | 0.75 | 0.73 | 0.57 | 0.52 | -0.37 | 0.24 | -0.46 | -0.09 | -1.05 | 0.00 | 1.02 | -0.74 | 0.52 | -0.57 | -0.84 | -0.81 | 0.02 | -0.12 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.43 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.27 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.54 | 0.24 | -0.16 | -0.36 | 0.19 | 0.33 | 1.17 | -0.47 | 0.22 | 1.03 | 0.14 | -0.74 | 0.33 | 0.00 | -0.62 | -0.36 | 0.42 | -0.02 | -0.07 | 0.78 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.15 | -0.31 | -0.56 | 0.66 | 0.67 | -1.22 | -0.10 | -0.32 | 0.13 | -0.91 | 0.19 | 0.52 | 0.65 | -0.62 | 0.00 | 0.84 | -0.13 | -0.62 | -0.35 | 0.40 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.02 | -0.19 | 0.42 | -0.36 | -0.04 | -0.70 | -0.11 | 0.67 | 0.50 | 0.01 | -0.14 | -0.57 | 0.58 | -0.36 | 0.84 | 0.00 | -0.85 | -1.00 | 0.39 | 0.18 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.22 | 0.74 | 0.11 | 0.81 | -0.22 | -0.09 | -0.31 | 0.69 | 0.03 | 0.41 | 0.93 | -0.84 | -0.52 | 0.42 | -0.13 | -0.85 | 0.00 | 0.58 | -1.10 | -0.03 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.13 | 0.76 | 0.92 | 0.46 | 0.80 | 0.38 | 0.83 | -1.15 | -0.12 | 0.14 | 0.31 | -0.81 | 0.27 | -0.02 | -0.62 | -1.00 | 0.58 | 0.00 | 0.14 | -1.21 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.99 | -0.01 | 0.58 | -0.74 | -0.44 | 0.71 | -0.89 | 0.25 | 0.77 | -0.60 | -0.87 | 0.02 | -0.31 | -0.07 | -0.35 | 0.39 | -1.10 | 0.14 | 0.00 | 1.30 | -0.26 | 0.86 | 0.91 | -0.46 | -0.51 | 0.08 | -0.72 | -0.12 |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.05 | 0.38 | 0.06 | -0.14 | 0.35 | -0.10 | 1.05 | -0.25 | 0.11 | -0.65 | 0.61 | -0.12 | 0.27 | 0.78 | 0.40 | 0.18 | -0.03 | -1.21 | 1.30 | 0.00 | -0.15 | 0.73 | 0.46 | 0.56 | 0.39 | 0.97 | 0.49 | -0.47 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.19 | 0.23 | 0.40 | 0.06 | 0.49 | 0.78 | 1.41 | 1.09 | -0.41 | -0.71 | 0.02 | 0.19 | 0.14 | -0.03 | -0.61 | 0.90 | 1.21 | 0.41 | -0.26 | -0.15 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.36 | -0.63 | 1.05 | 0.18 | -0.12 | -0.17 | 0.45 | -0.72 | -0.32 | 1.27 | -1.14 | -1.20 | -0.18 | 0.53 | 0.58 | -0.14 | 0.59 | -0.38 | 0.86 | 0.73 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.17 | -0.24 | 0.26 | 1.01 | -0.75 | 0.72 | 0.35 | -0.04 | -0.75 | 0.93 | -0.15 | -0.41 | 0.89 | -1.01 | -0.01 | 0.97 | -0.84 | 0.45 | 0.91 | 0.46 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.63 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.56 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.14 | -0.41 | 0.20 | 0.07 | -0.32 | -0.37 | -0.18 | -0.54 | -0.52 | 1.06 | -0.02 | -0.22 | -0.20 | -0.38 | -0.46 | 0.26 | 0.53 | -0.71 | -0.51 | 0.39 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.75 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 0.97 | -0.26 | 0.00 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.39 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.49 | 0.19 | 0.46 | 0.40 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.81 | 1.08 | 0.01 | -0.20 | -1.07 | -0.40 | 0.33 | -0.59 | 0.33 | -0.53 | -0.20 | 0.88 | 0.07 | -0.31 | 0.63 | -0.05 | -1.0 | -0.35 | -0.12 | -0.47 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.02 | 0.27 | 0.33 | 1.33 | 0.38 | 0.60 | -0.23 | -0.34 | 0.55 | 0.01 | -0.95 | -0.05 | 0.20 | 0.34 | 0.01 | -0.41 | -0.30 | 0.02 | -0.61 | 0.50 | -0.21 | 0.61 | -0.20 | -0.27 | 1.38 | 0.30 | -0.98 | 0.96 | 0.26 | 0.97 | 0.28 | 0.40 | -0.76 | -0.67 | -1.23 | -0.26 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.26 | 0.33 | -0.20 | 0.56 | 0.61 | 1.19 | 0.72 | -0.65 | 0.01 | 0.39 | 0.46 | -0.18 | 0.18 | -0.45 | -0.47 | 0.26 | -1.38 | 1.18 | -0.28 | -0.33 | -0.17 | -0.97 | 0.25 | 0.84 | 0.49 | -0.82 | 0.33 | 0.50 |
| -0.21 | 1.25 | -0.18 | -1.39 | -0.98 | 0.27 | -0.95 | -0.40 | 0.87 | -0.06 | -0.37 | -0.34 | -0.94 | 0.68 | -0.14 | -0.08 | 1.08 | 0.65 | -0.17 | 0.01 | 0.86 | 0.39 | -0.83 | 0.79 | -0.86 | 0.85 | 0.03 | 0.27 | -0.74 | -0.42 | -0.07 | 0.88 | 0.18 | 0.30 | 0.38 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.34 | -0.82 | 0.57 | 0.62 | 1.42 | -0.24 | 0.29 | 0.83 | -0.62 | 0.34 | -0.16 | 0.57 | 0.02 | 0.68 | -0.07 | 0.39 | 0.53 | 0.13 | 0.49 | 0.37 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | 0.17 | 0.18 | 0.55 | -0.51 | -0.89 | -0.08 | 0.22 | 0.19 | -0.31 | 0.94 | -0.74 | -0.66 | -0.41 | 0.61 | -0.04 | 0.27 | -0.1 | 0.87 | -1.10 | 0.60 | 1.09 | -0.46 | 0.35 | -0.34 | 0.67 | -0.42 | -0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.17 | -0.90 | -1.32 | -0.65 | 0.91 | 1.06 | -0.24 | -0.26 | 0.17 | -1.09 | 0.77 | -0.11 | -0.16 | 0.08 | -0.51 | 0.49 | 0.39 | -0.65 | -0.71 | 0.38 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.24 | -0.24 | 1.03 | -0.65 | -0.38 | -1.09 | 0.32 | 0.66 | 0.27 | -1.05 | 0.21 | -0.11 | -1.02 | 0.65 | 0.04 | -0.03 | -0.20 | 0.54 | -0.09 | 0.09 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.34 | -0.37 | -0.08 | -0.20 | -0.47 | 0.07 | 0.1 | -0.99 | -0.01 | -0.47 | 0.37 | 0.21 | -0.04 | 0.17 | 1.38 | 0.44 | 0.56 | -0.67 | 0.43 | 0.11 | 0.27 | 0.47 | -1.05 | -0.44 | 0.30 | 0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.75 | -0.02 | 0.25 | 0.50 | -0.57 | -0.13 | -0.38 | -0.24 | 0.21 | 1.43 | -0.17 | 0.42 | 0.15 | -0.11 | 0.04 | -0.10 | -0.15 | -0.03 | 0.03 | 1.20 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.17 | 1.14 | -0.18 | -0.20 | -1.11 | -0.32 | -1.44 | 0.76 | 0.57 | -0.01 | 0.33 | 1.07 | 0.29 | -0.41 | -1.37 | 0.56 | 0.75 | 0.05 | -0.52 | 0.63 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.46 | -0.32 | 0.80 | 0.79 | -0.44 | -0.05 | 0.54 | 0.25 | 0.53 | -0.10 | 0.91 | 0.20 | 0.08 | 0.01 | -1.28 | 0.32 | 0.61 | 0.49 | 0.30 | 0.46 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.69 | -1.41 | -0.94 | -0.05 | -0.64 | 0.56 | 0.28 | -0.61 | -1.20 | 0.20 | -0.38 | -0.34 | 0.36 | -1.02 | 0.69 | -0.26 | 0.49 | -0.13 | -0.64 | 0.61 | -0.61 | -0.05 | 0.23 | 0.03 | -0.01 | 0.77 | 1.01 | -0.20 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.80 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.25 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.1 | 0.12 | -0.28 | 0.90 | -0.87 | 0.69 | 1.14 | 0.71 | -0.29 | 0.74 | -0.45 | 0.51 | -0.77 | 1.03 | 0.44 | 0.20 | 0.33 | -0.78 | -1.51 | 0.19 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.48 | 1.05 | -0.41 | -0.15 | -0.72 | 0.18 | 0.24 | 0.23 | 0.67 | -0.25 | -0.90 | 0.17 | -0.28 | 0.27 | 0.36 | -0.06 | 0.58 | 0.08 | 0.79 | -0.36 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.25 | 0.26 | -0.48 | -0.89 | -0.22 | 0.83 | 0.50 | 0.11 | 0.45 | -0.81 | 0.30 | 0.98 | 0.69 | 0.56 | 0.06 | 0.60 | 0.28 | 0.08 | 0.16 | -0.53 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.74 | -0.43 | -0.99 | -0.88 | -0.68 | 1.00 | 0.40 | -0.95 | -0.16 | -1.18 | 0.57 | -0.24 | -0.05 | 0.38 | 0.19 | -1.11 | 0.55 | 0.71 | 0.54 | 0.84 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.16 | -0.67 | 0.07 | -0.73 | 0.02 | 0.14 | 0.75 | -0.30 | -1.49 | 0.56 | -0.41 | 0.37 | -0.47 | -0.17 | 0.59 | -0.40 | 0.12 | 1.33 | 0.44 | -1.02 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | 0.97 | 0.00 | 0.12 | 0.96 | -1.03 | -0.07 | -0.08 | -0.03 | -0.36 | 0.77 | -0.34 | 0.33 | -0.49 | 0.88 | -0.26 | -0.79 | -0.27 | 0.78 | -0.77 | -0.18 | -0.03 | -0.73 | -0.02 | 0.32 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.41 | 0.01 | 0.25 | 1.37 | 0.15 | 0.39 | -0.45 | -0.21 | 0.29 | -0.11 | 0.65 | -0.04 | 0.54 | -0.18 | -1.12 | -0.09 | 0.30 | 1.08 | 0.86 | -0.19 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.38 | 0.12 | 0.83 | 0.81 | -0.35 | 0.58 | 0.70 | -0.05 | 0.32 | 0.62 | 0.64 | -0.34 | 0.11 | 0.85 | 0.89 | 0.37 | 1.11 | -0.19 | -0.65 | 1.04 | 0.93 | -0.73 | 0.23 | -0.60 | -0.33 | -0.74 | 0.32 | 0.25 |
| -0.34 | -0.75 | -0.17 | 0.46 | -1.20 | -0.80 | 0.1 | -0.48 | 1.25 | -0.74 | -0.16 | -1.03 | 0.41 | -0.38 | 0.00 | 1.12 | 0.07 | 1.22 | -0.62 | -0.41 | 1.26 | -0.13 | 0.77 | -0.07 | 0.09 | 0.60 | -0.43 | 0.54 | -0.15 | 0.02 | 0.22 | 0.13 | -0.99 | -0.05 | -0.19 | 0.36 | -1.17 | -0.63 | 0.14 | 0.75 | 0.39 | 0.81 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.12 | 0.00 | 0.12 | -0.06 | 0.65 | 0.90 | -0.04 | 0.07 | 1.14 | -0.17 | -0.49 | 0.63 | 0.36 | 0.24 | -0.31 | -0.19 | 0.74 | 0.76 | -0.01 | 0.38 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.07 | 0.12 | 0.00 | 0.74 | 0.52 | 0.09 | -0.18 | -0.31 | 0.43 | -1.13 | -0.98 | 0.75 | -0.75 | -0.16 | -0.56 | 0.42 | 0.11 | 0.92 | 0.58 | 0.06 | 0.40 | 1.05 | 0.24 | 0.28 | 0.20 | 0.36 | 0.25 | 0.01 |
| -0.20 | 0.50 | -0.20 | 0.79 | -0.34 | -0.17 | 0.90 | -0.15 | 0.89 | -0.88 | -0.73 | -0.03 | 1.37 | 0.81 | 1.22 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.14 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.62 | 0.65 | 0.52 | 0.13 | 0.00 | 0.26 | -0.88 | -0.50 | 0.77 | -0.69 | -0.87 | 0.57 | 0.42 | 0.19 | 0.67 | -0.04 | -0.22 | 0.80 | -0.44 | 0.35 | 0.49 | -0.12 | -0.75 | -0.23 | -0.32 | 0.67 | 0.25 | -1.07 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.41 | 0.90 | 0.09 | -1.15 | 0.26 | 0.00 | -0.74 | 0.16 | -1.48 | 0.49 | -1.06 | 0.52 | 1.45 | 0.33 | -1.22 | -0.70 | -0.09 | 0.38 | 0.71 | -0.10 | 0.78 | -0.17 | 0.72 | -0.30 | -0.37 | -0.18 | 0.22 | -0.40 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.26 | -0.04 | -0.18 | 0.65 | -0.88 | -0.74 | 0.00 | 0.75 | 0.82 | -0.71 | 0.72 | -0.37 | -0.33 | 1.17 | -0.10 | -0.11 | -0.31 | 0.83 | -0.89 | 1.05 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.13 | 0.07 | -0.31 | 0.29 | -0.50 | 0.16 | 0.75 | 0.00 | 0.92 | 0.40 | 0.34 | 0.24 | 1.20 | -0.47 | -0.32 | 0.67 | 0.69 | -1.15 | 0.25 | -0.25 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.77 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.11 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.07 | -0.17 | -1.13 | -0.74 | -0.69 | 0.49 | -0.71 | 0.40 | 1.36 | 0.00 | 0.62 | -0.09 | -0.28 | 1.03 | -0.91 | 0.01 | 0.41 | 0.18 | -0.60 | -0.65 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.09 | -0.49 | 0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.61 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | 0.04 | -0.34 | 0.60 | 0.63 | 0.75 | 0.73 | 0.57 | 0.52 | -0.37 | 0.24 | -0.46 | -0.09 | -1.05 | 0.00 | 1.02 | 0.74 | 0.52 | -0.57 | -0.84 | -0.81 | 0.02 | -0.12 | 0.19 | -1.20 | -0.41 | -0.12 | -0.22 | 0.44 | -1.62 | 0.88 |
| -0.04 | 0.15 | 0.29 | 0.08 | -0.61 | 0.48 | -0.77 | -0.28 | 0.69 | -0.05 | -0.47 | -0.27 | 0.54 | 0.11 | -0.43 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.27 | 0.14 | -0.18 | 0.89 | 0.21 | -0.20 | -0.34 | -0.46 | 0.07 |
| 0.12 | -0.11 | 0.41 | 0.01 | -0.05 | 0.68 | 1.03 | 0.27 | 0.56 | 0.38 | -0.17 | 0.78 | -0.18 | 0.85 | 0.54 | 0.24 | -0.16 | -0.36 | 0.19 | 0.33 | 1.17 | -0.47 | 0.22 | 1.03 | 0.14 | -0.74 | 0.33 | 0.00 | -0.62 | -0.36 | 0.42 | -0.02 | -0.07 | 0.78 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.15 | -0.31 | -0.56 | 0.66 | 0.67 | -1.22 | -0.10 | -0.32 | 0.13 | -0.91 | 0.19 | 0.52 | 0.65 | -0.62 | 0.00 | 0.84 | -0.13 | -0.62 | -0.35 | 0.40 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.02 | -0.19 | 0.42 | -0.36 | -0.04 | -0.70 | -0.11 | 0.67 | 0.50 | 0.01 | -0.14 | -0.57 | 0.58 | -0.36 | 0.84 | 0.00 | -0.85 | -1.00 | 0.39 | 0.18 | 0.90 | 0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.22 | 0.74 | 0.11 | 0.81 | -0.22 | -0.09 | -0.31 | 0.69 | 0.03 | 0.41 | 0.93 | -0.84 | -0.52 | 0.42 | -0.13 | -0.85 | 0.00 | 0.58 | -1.10 | -0.03 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.13 | 0.76 | 0.92 | 0.46 | 0.80 | 0.38 | 0.83 | -1.15 | -0.12 | 0.14 | 0.31 | -0.81 | 0.27 | -0.02 | -0.62 | -1.00 | 0.58 | 0.00 | 0.14 | -1.21 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.99 | -0.01 | 0.58 | -0.74 | -0.44 | 0.71 | -0.89 | 0.25 | 0.77 | -0.60 | -0.87 | 0.02 | -0.31 | -0.07 | -0.35 | 0.39 | -1.10 | 0.14 | 0.00 | 1.30 | -0.26 | 0.86 | 0.91 | -0.46 | -0.51 | 0.08 | -0.72 | -0.12 |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.05 | 0.38 | 0.06 | -0.14 | 0.35 | -0.10 | 1.05 | -0.25 | 0.11 | -0.65 | 0.61 | -0.12 | 0.27 | 0.78 | 0.40 | 0.18 | -0.03 | -1.21 | 1.30 | 0.00 | -0.15 | 0.73 | 0.46 | 0.56 | 0.39 | 0.97 | 0.49 | -0.47 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.19 | 0.23 | 0.40 | 0.06 | 0.49 | 0.78 | 1.41 | 1.09 | -0.41 | -0.71 | 0.02 | 0.19 | 0.14 | -0.03 | -0.61 | 0.90 | 1.21 | 0.41 | -0.26 | -0.15 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.25 | 0.01 | 1.41 | -0.93 | -0.53 | -0.73 | 0.36 | -0.63 | 1.05 | 0.18 | -0.12 | -0.17 | 0.45 | -0.72 | -0.32 | 1.27 | -1.14 | -1.20 | -0.18 | 0.53 | 0.58 | -0.14 | 0.59 | -0.38 | 0.86 | 0.73 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.17 | -0.24 | 0.26 | 1.01 | -0.75 | 0.72 | 0.35 | -0.04 | -0.75 | 0.93 | -0.15 | -0.41 | 0.89 | -1.01 | -0.01 | 0.97 | -0.84 | 0.45 | 0.91 | 0.46 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.63 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.56 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.14 | -0.41 | 0.20 | 0.07 | 0.32 | -0.37 | 0.18 | 0.54 | -0.52 | 1.06 | -0.02 | -0.22 | -0.20 | -0.38 | -0.46 | 0.26 | 0.53 | -0.71 | 0.51 | 0.39 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | 0.74 | 0.75 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | 0.97 | -0.55 | 0.08 | 0.97 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.17 | 0.43 | 0.08 | -1.01 | -0.00 | 0.32 | 0.39 | -0.84 | 0.25 | -0.63 | 0.25 | 0.22 | -0.47 | 0.15 | 0.64 | 0.97 | 0.20 | 1.62 | 0.46 | 0.92 | -0.19 | -1.39 | -0.58 | -0.46 | -0.72 | 0.49 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | 0.35 | 0.57 | 0.92 | 0.31 | -0.15 | -0.14 | 0.25 | 0.81 | 1.08 | 0.01 | -0.20 | -1.07 | -0.40 | 0.33 | -0.59 | 0.33 | -0.53 | -0.20 | 0.88 | 0.07 | -0.31 | 0.63 | -0.05 | -1.0 | -0.35 | -0.12 | -0.47 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.38 | 0.11 | -0.70 | -0.14 | -0.53 | 0.54 | 0.02 | 0.27 | 0.33 | 1.33 | 0.38 | 0.60 | -0.23 | -0.34 | 0.55 | 0.01 | -0.95 | -0.05 | 0.20 | 0.34 | 0.01 | -0.41 | -0.30 | 0.02 | -0.61 | 0.50 | -0.21 | 0.61 | -0.20 | -0.27 | 1.38 | 0.30 | -0.98 | 0.96 | 0.26 | 0.97 | 0.28 | 0.40 | -0.76 | -0.67 | -1.23 | -0.26 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.26 | 0.33 | -0.20 | 0.56 | 0.61 | 1.19 | 0.72 | -0.65 | 0.01 | 0.39 | 0.46 | -0.18 | 0.18 | -0.45 | -0.42 | 0.26 | -1.38 | 1.18 | -0.78 | -0.33 | -0.17 | -0.97 | 0.25 | 0.84 | 0.49 | -0.82 | 0.33 | 0.50 |
| -0.21 | 1.25 | -0.10 | -1.39 | -0.90 | 0.27 | -0.95 | -0.40 | 0.87 | -0.06 | -0.37 | -0.34 | -0.94 | 0.68 | -0.14 | -0.08 | 1.08 | 0.65 | -0.17 | 0.01 | 0.86 | 0.39 | -0.83 | 0.79 | -0.86 | -0.85 | -0.03 | 0.27 | 0.74 | 0.42 | -0.07 | 0.88 | 0.18 | 0.30 | 0.38 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.34 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.37 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.08 | 0.22 | 0.19 | -0.31 | 0.94 | -0.74 | -0.66 | -0.41 | 0.61 | -0.04 | 0.27 | -0.1 | 0.87 | -1.10 | 0.60 | 1.09 | -0.46 | 0.35 | -0.34 | 0.67 | -0.42 | -0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.17 | -0.90 | -1.32 | -0.65 | 0.91 | 1.06 | -0.24 | -0.26 | 0.17 | -1.09 | 0.77 | -0.11 | -0.16 | 0.08 | -0.53 | 0.49 | 0.39 | -0.65 | -0.71 | 0.38 | -0.55 | 0.48 | 0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | 0.35 | 1.01 | 0.48 | 0.67 | -0.04 | -0.24 | -0.24 | 1.03 | -0.65 | -0.38 | -1.09 | 0.32 | 0.66 | 0.27 | -1.05 | 0.21 | -0.11 | -1.02 | 0.65 | 0.04 | -0.03 | -0.20 | 0.54 | -0.09 | 0.09 | 0.18 | 0.82 | 0.44 | 0.24 | -0.58 | -0.13 | 0.16 | 0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.34 | -0.37 | -0.08 | -0.20 | -0.47 | 0.07 | 0.1 | -0.99 | 0.01 | -0.47 | -0.37 | 0.21 | -0.04 | -0.12 | 1.38 | 0.44 | 0.56 | -0.67 | 0.43 | 0.11 | 0.27 | 0.47 | 1.05 | 0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.75 | -0.02 | 0.25 | 0.50 | -0.57 | -0.13 | -0.38 | 0.24 | 0.21 | -1.43 | -0.17 | 0.42 | 0.15 | -0.11 | 0.04 | -0.10 | -0.15 | -0.03 | 0.03 | -1.20 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.17 | 1.14 | -0.18 | -0.20 | 1.11 | -0.32 | -1.44 | 0.76 | 0.57 | -0.01 | 0.33 | 1.07 | 0.29 | -0.41 | -1.37 | 0.56 | 0.75 | 0.05 | -0.52 | 0.63 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | 1.01 | 0.33 | -0.30 | 1.27 | -0.48 | 0.34 | -0.62 | 0.46 | -0.32 | 0.80 | 0.79 | -0.44 | -0.05 | 0.54 | 0.25 | 0.53 | -0.10 | 0.91 | 0.20 | 0.08 | 0.01 | -1.28 | 0.32 | 0.61 | 0.49 | 0.30 | 0.46 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.20 | 0.20 | -0.38 | -0.34 | 0.36 | -1.02 | 0.69 | -0.26 | 0.49 | -0.13 | -0.64 | 0.61 | -0.61 | -0.05 | 0.23 | 0.03 | -0.01 | 0.77 | 1.01 | -0.20 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.80 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.25 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.1 | 0.12 | -0.28 | 0.90 | -0.87 | 0.69 | 1.14 | 0.71 | -0.29 | 0.74 | -0.45 | 0.51 | -0.77 | 1.03 | 0.44 | 0.20 | 0.33 | -0.78 | -1.51 | 0.19 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.48 | 1.05 | -0.41 | -0.15 | -0.72 | 0.18 | 0.24 | 0.23 | 0.67 | -0.25 | -0.90 | 0.17 | -0.28 | 0.27 | 0.36 | -0.06 | 0.58 | 0.08 | 0.79 | -0.36 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.25 | 0.26 | -0.48 | -0.89 | -0.22 | 0.83 | 0.50 | 0.11 | 0.45 | -0.81 | 0.30 | 0.98 | 0.69 | 0.56 | 0.06 | 0.60 | 0.28 | 0.08 | 0.16 | -0.53 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.74 | -0.43 | -0.99 | -0.88 | -0.68 | 1.00 | 0.40 | -0.95 | -0.16 | -1.18 | 0.57 | -0.24 | -0.05 | 0.38 | 0.19 | -1.11 | 0.55 | 0.71 | 0.54 | 0.84 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.16 | -0.67 | -0.07 | -0.73 | 0.02 | 0.14 | 0.75 | -0.30 | -1.49 | 0.56 | -0.41 | 0.37 | -0.47 | -0.17 | 0.59 | -0.40 | 0.12 | 1.33 | 0.44 | -1.02 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.03 | -0.07 | -0.08 | -0.03 | -0.36 | 0.77 | -0.34 | 0.33 | -0.49 | 0.88 | -0.26 | -0.79 | -0.27 | 0.78 | -0.77 | -0.18 | -0.03 | -0.73 | -0.02 | 0.32 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.41 | 0.01 | 0.25 | 1.37 | 0.15 | 0.39 | -0.45 | -0.21 | 0.29 | -0.11 | 0.65 | -0.04 | 0.54 | -0.18 | -1.12 | -0.09 | 0.30 | 1.08 | 0.86 | -0.19 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.38 | 0.12 | 0.83 | 0.81 | -0.35 | 0.58 | 0.70 | -0.05 | 0.32 | 0.62 | 0.64 | -0.34 | 0.11 | 0.85 | 0.89 | 0.37 | 1.11 | -0.19 | -0.65 | 1.04 | 0.93 | -0.73 | 0.23 | -0.60 | -0.33 | -0.74 | 0.32 | 0.25 |
| -0.34 | -0.75 | -0.17 | 0.46 | -1.20 | -0.80 | 0.1 | -0.48 | 1.25 | -0.74 | -0.16 | -1.03 | 0.41 | -0.38 | 0.00 | 1.12 | 0.07 | 1.22 | -0.62 | -0.41 | 1.26 | -0.13 | 0.77 | -0.07 | 0.09 | 0.60 | -0.43 | 0.54 | -0.15 | 0.02 | 0.22 | 0.13 | -0.99 | -0.05 | -0.19 | 0.36 | 1.17 | -0.63 | 0.14 | 0.75 | 0.39 | 0.81 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.12 | 0.00 | 0.12 | -0.06 | 0.65 | 0.90 | -0.04 | 0.07 | 1.14 | -0.17 | -0.49 | 0.63 | 0.36 | 0.24 | -0.31 | -0.19 | 0.74 | 0.76 | -0.01 | 0.38 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.07 | 0.12 | 0.00 | 0.74 | 0.52 | 0.09 | -0.18 | -0.31 | 0.43 | -1.13 | -0.98 | 0.75 | -0.75 | -0.16 | -0.56 | 0.42 | 0.11 | 0.92 | 0.58 | 0.06 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.22 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.14 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.62 | 0.65 | 0.52 | 0.13 | 0.00 | 0.26 | -0.88 | -0.50 | 0.77 | -0.69 | -0.87 | 0.57 | 0.42 | 0.19 | 0.67 | -0.04 | -0.22 | 0.80 | -0.44 | 0.35 | 0.49 | -0.12 | -0.75 | -0.23 | -0.32 | 0.67 | 0.25 | -1.07 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.41 | 0.90 | 0.09 | -1.15 | 0.26 | 0.00 | -0.74 | 0.16 | -1.48 | 0.49 | -1.06 | 0.52 | 1.45 | 0.33 | -1.22 | -0.70 | -0.09 | 0.38 | 0.71 | -0.10 | 0.78 | -0.17 | 0.72 | -0.30 | -0.37 | -0.18 | 0.22 | -0.40 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.26 | -0.04 | -0.18 | 0.65 | -0.88 | -0.74 | 0.00 | 0.75 | 0.82 | -0.71 | 0.72 | -0.37 | -0.33 | 1.17 | -0.10 | -0.11 | -0.31 | 0.83 | -0.89 | 1.05 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.13 | 0.07 | -0.31 | 0.29 | -0.50 | 0.16 | 0.75 | 0.00 | 0.92 | 0.40 | 0.34 | 0.24 | 1.20 | -0.47 | -0.32 | 0.67 | 0.69 | -1.15 | 0.25 | -0.25 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.77 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.11 | -0.41 | -0.32 | -0.75 | 0.10 | 0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.07 | -0.17 | -1.13 | -0.74 | -0.69 | 0.49 | -0.71 | 0.40 | 1.36 | 0.00 | 0.62 | -0.09 | -0.28 | 1.03 | -0.91 | 0.01 | 0.41 | 0.14 | -0.60 | -0.65 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.09 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.61 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.60 | 0.63 | 0.75 | 0.73 | 0.57 | 0.52 | -0.37 | 0.24 | -0.46 | -0.09 | -1.05 | 0.00 | 1.02 | -0.74 | 0.52 | -0.57 | -0.84 | -0.81 | 0.02 | -0.12 | 0.19 | -1.20 | -0.41 | -0.12 | -0.22 | 0.44 | -1.62 | 0.88 |
| -0.04 | 0.15 | 0.29 | 0.08 | 0.61 | 0.48 | -0.77 | -0.28 | 0.69 | -0.05 | -0.47 | -0.27 | 0.54 | 0.11 | -0.43 | 0.36 | -0.75 | -0.40 | 0.42 | 1.45 | -0.33 | 1.20 | -0.68 | -0.28 | 0.93 | 1.02 | 0.00 | 0.33 | 0.65 | 0.58 | -0.52 | 0.27 | -0.31 | 0.27 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.54 | 0.24 | -0.16 | -0.36 | 0.19 | 0.33 | 1.17 | -0.47 | 0.22 | 1.03 | 0.14 | -0.74 | 0.33 | 0.00 | -0.62 | -0.36 | 0.42 | -0.02 | -0.07 | 0.78 | -0.03 | 0.53 | -1.01 | 0.23 | -0.38 | 0.85 | 0.92 | 0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.15 | -0.31 | -0.56 | 0.66 | 0.67 | -1.22 | -0.10 | -0.32 | 0.13 | -0.91 | 0.19 | 0.52 | 0.65 | -0.62 | 0.00 | 0.84 | -0.13 | -0.62 | -0.35 | 0.40 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.02 | -0.19 | 0.42 | -0.36 | -0.04 | -0.70 | -0.11 | 0.67 | 0.50 | 0.01 | -0.14 | -0.57 | 0.58 | -0.36 | 0.84 | 0.00 | -0.85 | -1.00 | 0.39 | 0.18 | 0.90 | 0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.22 | 0.74 | 0.11 | 0.81 | -0.22 | -0.09 | -0.31 | 0.69 | 0.03 | 0.41 | 0.93 | -0.84 | -0.52 | 0.42 | -0.13 | -0.85 | 0.00 | 0.58 | -1.10 | -0.03 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.13 | 0.76 | 0.92 | 0.46 | 0.80 | 0.38 | 0.83 | -1.15 | -0.12 | 0.14 | 0.31 | -0.81 | 0.27 | -0.02 | -0.62 | -1.00 | 0.58 | 0.00 | 0.14 | -1.21 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.99 | -0.01 | 0.58 | -0.74 | -0.44 | 0.71 | -0.89 | 0.25 | 0.77 | -0.60 | -0.87 | 0.02 | -0.31 | -0.07 | -0.35 | 0.39 | -1.10 | 0.14 | 0.00 | 1.30 | -0.26 | 0.86 | 0.91 | -0.46 | -0.51 | 0.08 | -0.72 | -0.12 |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.05 | 0.38 | 0.06 | -0.14 | 0.35 | -0.10 | 1.05 | -0.25 | 0.11 | -0.65 | 0.61 | -0.12 | 0.27 | 0.78 | 0.40 | 0.18 | -0.03 | -1.21 | 1.30 | 0.00 | -0.15 | 0.73 | 0.46 | 0.56 | 0.39 | 0.97 | 0.49 | -0.47 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.19 | 0.23 | 0.40 | 0.06 | 0.49 | 0.78 | 1.41 | 1.09 | -0.41 | -0.71 | 0.02 | 0.19 | 0.14 | -0.03 | -0.61 | 0.90 | 1.21 | 0.41 | -0.26 | -0.15 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.36 | -0.63 | 1.05 | 0.18 | -0.12 | -0.17 | 0.45 | -0.72 | -0.32 | 1.27 | -1.14 | -1.20 | -0.18 | 0.53 | 0.58 | -0.14 | 0.59 | -0.38 | 0.86 | 0.73 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.17 | -0.24 | 0.26 | 1.01 | -0.75 | 0.72 | 0.35 | -0.04 | -0.75 | 0.93 | -0.15 | -0.41 | 0.89 | -1.01 | -0.01 | 0.97 | -0.84 | 0.45 | 0.91 | 0.46 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | 0.04 | -0.53 | 0.96 | 0.78 | 0.79 | -0.60 | -0.60 | -0.63 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.56 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.14 | -0.41 | 0.20 | 0.07 | -0.32 | 0.37 | -0.18 | -0.54 | -0.52 | 1.06 | -0.02 | -0.22 | -0.20 | -0.38 | -0.46 | 0.26 | 0.53 | -0.71 | -0.51 | 0.39 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.75 | 0.09 | 0.36 | -0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 0.97 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.39 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.49 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.81 | 1.08 | 0.01 | -0.20 | -1.07 | -0.40 | 0.33 | -0.59 | 0.33 | -0.53 | -0.20 | 0.88 | 0.07 | -0.31 | 0.63 | -0.05 | -1.0 | -0.35 | -0.12 | -0.47 | -0.10 | -0.07 | -0.07 | -0.13 | -0.00 | -0.97 | 1.06 | 0.00 |

| | | | | | | | | | | | | | | | | | | | |
|---|---|---|---|---|---|---|---|---|---|---|---|---|---|---|---|---|---|---|---|
| -0.38 | 0.11 | -0.70 | -0.14 | -0.53 | 0.54 | 0.02 | 0.27 | 0.33 | 1.33 | 0.38 | 0.60 | -0.23 | -0.34 | 0.52 | 0.01 | -0.95 | -0.05 | 0.20 | 0.34 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.19 |
| -0.21 | 1.25 | -0.18 | -1.39 | -0.98 | 0.27 | -0.95 | -0.40 | 0.87 | -0.06 | -0.37 | -0.34 | -0.94 | 0.68 | -0.10 | -0.08 | 1.08 | 0.65 | -0.17 | 0.01 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.74 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.06 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | -0.38 | -1.09 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.07 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.13 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.32 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.05 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.02 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.69 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.18 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.09 | -0.22 | 0.83 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.00 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.14 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.77 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.39 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.58 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.90 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.09 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.26 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.44 | 0.90 | 0.09 | -1.15 | 0.26 | 0.00 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.74 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.16 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.49 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.52 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.33 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.22 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.70 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.09 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.38 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.71 |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.01 | 0.38 | 0.06 | -0.14 | 0.35 | -0.10 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.78 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.17 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.72 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.37 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.40 |

| | | | | | | | | | | | | | | | | | | | | | |
|---|---|---|---|---|---|---|---|---|---|---|---|---|---|---|---|---|---|---|---|---|---|
| 0.01 | -0.41 | -0.30 | 0.02 | -0.61 | 0.50 | -0.21 | 0.61 | -0.20 | -0.27 | 1.38 | 0.30 | -0.98 | 0.96 | 0.26 | 0.97 | 0.28 | 0.40 | -0.76 | -0.67 | -1.23 | -0.26 |
| 0.72 | -0.65 | 0.01 | 0.39 | 0.46 | -0.18 | 0.18 | -0.45 | -0.42 | 0.26 | 1.38 | 1.18 | -0.28 | -0.33 | -0.17 | -0.97 | 0.25 | 0.84 | 0.49 | -0.82 | 0.33 | 0.50 |
| 0.86 | 0.39 | -0.83 | 0.79 | -0.86 | -0.85 | -0.03 | 0.27 | -0.74 | -0.42 | -0.07 | 0.88 | 0.18 | 0.30 | 0.38 | -0.49 | 0.54 | -0.04 | 0.23 | 0.86 | -0.16 | -1.10 |
| 0.29 | 0.83 | -0.62 | 0.34 | -0.16 | 0.57 | 0.02 | 0.68 | -0.07 | -0.39 | 0.53 | 0.13 | 0.49 | 0.37 | -0.82 | -0.23 | -0.02 | 1.08 | 1.49 | 0.32 | -0.68 | 0.63 |
| -0.66 | -0.41 | 0.61 | -0.04 | 0.27 | -0.1 | 0.87 | -1.10 | 0.60 | 1.09 | -0.46 | 0.35 | -0.34 | 0.67 | -0.42 | -0.35 | -0.11 | 0.01 | 1.13 | -0.26 | -0.49 | -0.02 |
| -0.24 | -0.26 | 0.17 | -1.09 | 0.77 | -0.11 | -0.16 | 0.08 | -0.53 | 0.49 | 0.39 | -0.65 | -0.71 | 0.38 | -0.55 | 0.48 | -0.36 | 1.16 | 0.61 | -0.27 | 0.16 | 0.12 |
| 0.32 | 0.66 | 0.27 | -1.05 | 0.21 | -0.11 | -1.02 | 0.65 | 0.04 | -0.03 | -0.20 | 0.54 | -0.09 | 0.09 | 0.18 | 0.82 | 0.44 | 0.24 | -0.58 | -0.13 | -0.16 | -0.07 |
| 0.1 | -0.99 | -0.01 | -0.47 | -0.37 | 0.21 | -0.04 | -0.12 | 1.38 | 0.44 | 0.56 | -0.67 | 0.43 | 0.11 | 0.27 | 0.47 | -1.05 | -0.44 | 0.30 | -0.05 | -0.60 | -0.27 |
| -0.38 | -0.24 | 0.21 | -1.43 | -0.17 | 0.42 | 0.15 | -0.11 | 0.04 | -0.10 | -0.15 | -0.03 | 0.03 | -1.20 | 0.16 | 0.54 | 0.49 | 1.86 | -0.24 | -0.62 | 0.32 | 0.09 |
| -1.44 | 0.76 | 0.57 | -0.01 | 0.33 | 1.07 | 0.29 | -0.41 | -1.37 | 0.56 | 0.75 | 0.05 | -0.52 | 0.63 | 0.35 | 1.15 | -0.20 | -0.08 | 0.44 | 0.23 | -0.10 | -0.44 |
| 0.54 | 0.25 | 0.53 | -0.10 | 0.91 | 0.20 | 0.08 | 0.01 | -1.28 | 0.32 | 0.61 | 0.49 | 0.30 | 0.46 | 0.00 | 1.18 | 0.47 | 0.11 | 0.21 | 0.49 | 0.55 | 1.25 |
| 0.69 | -0.26 | 0.49 | -0.13 | -0.64 | 0.61 | -0.61 | -0.05 | 0.23 | 0.03 | -0.01 | 0.77 | 1.01 | -0.20 | 0.55 | -0.00 | -0.61 | -0.43 | 0.73 | -0.52 | -0.22 | 0.46 |
| 0.43 | 1.14 | 1.21 | 0.08 | 0.09 | -0.90 | -0.48 | 0.68 | 0.13 | -0.08 | -0.92 | 0.45 | 0.75 | 0.25 | 0.65 | 0.60 | -0.16 | -0.17 | 0.03 | -0.34 | -0.09 | 0.67 |
| 1.14 | 0.71 | -0.29 | 0.74 | -0.45 | 0.51 | -0.77 | 1.03 | 0.44 | 0.20 | 0.33 | -0.78 | -1.51 | 0.19 | 0.41 | 0.59 | 0.60 | 0.54 | -0.77 | 0.28 | 0.62 | 0.07 |
| 0.24 | 0.23 | 0.67 | -0.25 | -0.90 | 0.17 | -0.28 | 0.27 | 0.36 | -0.06 | 0.58 | 0.08 | 0.79 | -0.36 | -0.50 | -0.08 | 0.28 | -0.04 | 0.57 | -0.04 | -0.37 | -0.35 |
| 0.50 | 0.11 | 0.45 | -0.81 | 0.30 | 0.98 | 0.69 | 0.56 | 0.06 | 0.60 | 0.28 | 0.08 | 0.16 | -0.53 | 0.29 | -1.26 | 0.54 | -0.53 | 1.10 | -0.03 | 0.12 | 0.57 |
| 0.40 | -0.95 | -0.16 | -1.18 | 0.57 | -0.24 | -0.05 | 0.38 | 0.19 | -1.13 | 0.55 | 0.71 | 0.54 | 0.84 | 0.40 | 0.01 | 0.92 | -0.96 | 0.87 | 1.23 | 0.43 | 0.92 |
| 0.75 | -0.30 | -1.49 | 0.56 | -0.41 | 0.37 | -0.47 | -0.17 | 0.59 | -0.40 | 0.12 | 1.33 | 0.44 | -1.02 | -0.47 | 1.41 | -0.05 | 0.78 | -0.36 | 0.01 | -0.08 | 0.31 |
| -0.34 | 0.33 | -0.49 | 0.88 | -0.26 | -0.79 | -0.27 | 0.78 | -0.77 | -0.18 | -0.03 | -0.73 | -0.02 | 0.32 | 1.02 | -0.93 | -0.82 | 0.79 | -0.41 | -0.98 | -1.01 | -0.15 |
| -0.45 | -0.21 | 0.29 | -0.11 | 0.65 | -0.04 | 0.54 | -0.18 | -1.12 | -0.09 | 0.30 | 1.08 | 0.86 | -0.19 | -0.39 | -0.53 | -0.43 | -0.60 | 0.55 | 0.26 | -0.00 | -0.14 |
| 0.70 | -0.05 | 0.32 | 0.62 | 0.64 | -0.34 | 0.11 | 0.85 | 0.89 | 0.37 | 1.11 | -0.19 | -0.65 | 1.04 | 0.93 | -0.73 | 0.23 | -0.60 | -0.33 | -0.74 | 0.32 | 0.25 |
| 1.23 | -0.09 | 0.81 | -0.10 | 0.05 | 0.64 | -0.39 | 0.51 | -0.12 | 0.05 | 0.19 | 0.09 | -0.95 | -0.01 | -0.22 | 0.32 | -1.13 | -0.59 | 0.18 | 0.78 | 0.36 | 0.77 |
| -0.04 | 0.07 | 1.14 | -0.17 | -0.49 | 0.63 | 0.36 | 0.24 | -0.31 | -0.19 | 0.74 | 0.76 | -0.01 | 0.38 | 0.23 | -0.63 | -0.24 | 0.56 | -0.41 | 0.09 | -0.84 | 1.08 |
| -0.18 | -0.31 | 0.43 | -1.13 | -0.90 | 0.75 | -0.75 | -0.16 | -0.56 | 0.42 | 0.11 | 0.92 | 0.58 | 0.06 | 0.40 | 1.05 | 0.26 | 0.28 | 0.20 | 0.36 | 0.25 | 0.01 |
| 0.65 | 0.29 | 0.59 | -0.74 | 0.20 | 0.73 | -0.40 | -0.36 | 0.66 | -0.36 | 0.81 | 0.46 | -0.74 | -0.14 | 0.06 | 0.18 | 1.01 | 1.42 | 0.07 | 0.47 | -0.63 | -0.20 |
| -0.88 | -0.50 | 0.77 | -0.69 | -0.87 | 0.57 | 0.42 | 0.19 | 0.67 | -0.04 | -0.22 | 0.80 | -0.44 | 0.35 | 0.49 | -0.12 | -0.75 | -0.23 | -0.32 | 0.67 | 0.25 | -1.07 |
| -0.74 | 0.16 | -1.48 | 0.49 | -1.06 | 0.52 | 1.45 | 0.33 | -1.22 | -0.70 | -0.09 | 0.38 | 0.71 | -0.10 | 0.78 | -0.17 | 0.72 | -0.30 | -0.37 | -0.18 | 0.22 | -0.40 |
| 0.00 | 0.75 | 0.82 | -0.71 | 0.72 | -0.37 | -0.33 | 1.17 | -0.10 | -0.21 | -0.31 | 0.83 | -0.89 | 1.05 | 1.41 | 0.45 | 0.35 | 0.14 | -0.18 | -0.24 | -0.47 | 0.33 |
| -0.75 | 0.00 | 0.92 | 0.40 | 0.34 | 0.24 | 1.20 | -0.47 | -0.32 | 0.67 | 0.69 | -1.15 | 0.25 | -0.25 | 1.09 | -0.72 | -0.04 | -1.04 | -0.54 | 0.64 | 0.15 | -0.59 |
| 0.82 | 0.92 | 0.00 | 1.36 | -0.64 | -0.46 | -0.58 | 0.22 | 0.13 | 0.50 | 0.03 | -0.12 | 0.77 | 0.11 | -0.41 | -0.32 | -0.75 | 0.10 | -0.52 | 0.26 | 0.64 | 0.33 |
| -0.71 | 0.40 | 1.36 | 0.00 | 0.62 | -0.09 | -0.28 | 1.03 | -0.91 | 0.01 | 0.41 | 0.14 | -0.60 | -0.65 | -0.71 | 1.27 | 0.93 | -0.35 | 1.06 | -0.21 | 0.97 | -0.53 |
| 0.72 | 0.34 | -0.64 | 0.62 | 0.00 | -1.05 | 0.93 | 0.14 | 0.19 | -0.14 | 0.93 | 0.31 | -0.87 | 0.61 | 0.02 | -1.14 | -0.15 | -0.12 | -0.02 | 0.52 | -0.20 | -0.20 |
| -0.37 | 0.24 | -0.46 | -0.09 | -1.05 | 0.00 | 1.02 | -0.74 | 0.52 | -0.57 | -0.84 | -0.81 | 0.02 | -0.12 | 0.39 | -1.20 | -0.41 | -0.12 | -0.22 | 0.44 | -1.62 | 0.88 |
| -0.33 | 1.20 | -0.58 | -0.28 | 0.93 | 1.02 | 0.00 | 0.33 | 0.65 | 0.58 | -0.52 | 0.27 | -0.31 | 0.27 | 0.14 | -0.18 | 0.89 | 0.21 | -0.20 | -0.34 | -0.46 | 0.07 |
| 1.17 | -0.47 | 0.22 | 1.03 | 0.14 | -0.74 | 0.33 | 0.00 | -0.62 | -0.36 | 0.42 | -0.02 | -0.07 | 0.78 | -0.03 | 0.53 | -1.01 | 0.23 | -0.38 | 0.85 | 0.92 | -0.31 |
| -0.10 | -0.32 | 0.13 | -0.91 | 0.19 | 0.52 | 0.65 | -0.62 | 0.00 | 0.84 | -0.13 | -0.62 | -0.35 | 0.40 | -0.61 | 0.58 | -0.01 | 0.07 | -0.46 | 1.43 | -0.19 | 0.63 |
| -0.11 | 0.67 | 0.50 | 0.01 | -0.14 | -0.57 | 0.58 | -0.36 | 0.84 | 0.00 | -0.85 | -1.00 | 0.39 | 0.18 | 0.90 | -0.14 | 0.97 | 0.43 | 0.26 | 0.47 | -1.39 | -0.05 |
| -0.31 | 0.69 | 0.03 | 0.41 | 0.93 | -0.84 | -0.52 | 0.42 | -0.13 | -0.85 | 0.00 | 0.58 | -1.10 | -0.03 | 1.21 | 0.59 | -0.84 | 1.03 | 0.53 | -0.97 | -0.58 | -1.0 |
| 0.83 | -1.15 | -0.12 | 0.14 | 0.31 | -0.81 | 0.27 | -0.02 | -0.62 | -1.00 | 0.58 | 0.00 | 0.14 | -1.21 | 0.41 | -0.38 | 0.45 | 0.32 | -0.71 | -0.55 | -0.46 | -0.35 |
| -0.89 | 0.25 | 0.77 | -0.60 | -0.87 | 0.02 | -0.31 | -0.07 | -0.35 | 0.39 | -1.10 | 0.14 | 0.00 | 1.30 | -0.26 | 0.86 | 0.91 | -0.46 | -0.51 | 0.08 | -0.72 | -0.12 |
| 1.05 | -0.25 | 0.11 | -0.65 | 0.61 | -0.12 | 0.27 | 0.78 | 0.40 | 0.18 | -0.03 | -1.21 | 1.30 | 0.00 | -0.15 | 0.73 | 0.46 | 0.56 | 0.39 | 0.97 | 0.49 | -0.47 |
| 1.41 | 1.09 | -0.41 | -0.71 | 0.02 | 0.19 | 0.14 | -0.03 | -0.61 | 0.90 | 1.21 | 0.41 | -0.26 | -0.15 | 0.00 | -0.16 | 0.27 | 0.08 | -1.15 | -0.26 | 0.19 | -0.10 |
| 0.45 | -0.72 | -0.32 | 1.27 | -1.14 | -1.20 | -0.18 | 0.53 | 0.58 | -0.14 | 0.59 | -0.38 | 0.86 | 0.73 | -0.16 | 0.00 | -0.68 | 0.24 | 0.02 | 0.80 | 0.46 | -0.07 |
| 0.35 | -0.04 | -0.75 | 0.93 | -0.15 | -0.41 | 0.89 | -1.01 | -0.01 | 0.97 | -0.84 | 0.45 | 0.91 | 0.46 | 0.27 | -0.68 | 0.00 | 0.85 | 1.57 | 0.24 | 0.48 | -0.07 |
| 0.14 | -1.04 | 0.10 | -0.35 | -0.12 | -0.12 | 0.21 | 0.23 | 0.07 | 0.43 | 1.03 | 0.32 | -0.46 | 0.56 | 0.08 | 0.24 | 0.85 | 0.00 | 0.41 | 1.08 | -0.42 | -0.13 |
| -0.18 | -0.54 | -0.52 | 1.06 | -0.02 | -0.22 | -0.20 | -0.38 | -0.46 | 0.26 | 0.53 | -0.71 | -0.51 | 0.39 | -1.15 | 0.02 | 1.57 | 0.41 | 0.00 | 0.28 | 0.86 | -0.00 |
| -0.24 | 0.64 | 0.26 | -0.21 | 0.52 | 0.44 | -0.34 | 0.85 | 1.43 | 0.47 | -0.97 | -0.55 | 0.08 | 0.97 | -0.26 | 0.80 | 0.24 | 1.08 | 0.28 | 0.00 | 0.48 | -0.97 |
| -0.47 | 0.15 | 0.64 | 0.97 | -0.20 | -1.62 | -0.46 | 0.92 | -0.19 | -1.39 | -0.58 | -0.46 | -0.72 | 0.49 | 0.19 | 0.46 | 0.48 | -0.42 | 0.86 | 0.48 | 0.00 | 1.06 |
| 0.33 | -0.59 | 0.33 | -0.53 | -0.20 | 0.88 | 0.07 | -0.31 | 0.63 | -0.05 | -1.0 | -0.35 | -0.12 | -0.47 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.29 | -0.04 | -0.46 | -0.35 | 0.07 | -0.56 | 0.45 | -0.26 | 0.56 | -0.25 | -0.32 | 1.43 | 0.35 | -1.03 | 0.92 | 0.21 | 0.92 | 0.23 | 0.45 | -0.71 | -0.72 | -1.28 | -0.31 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.19 | 0.72 | -0.65 | 0.01 | 0.39 | 0.46 | -0.18 | 0.18 | -0.45 | -0.42 | 0.26 | -1.38 | 1.18 | -0.28 | -0.33 | -0.17 | -0.97 | 0.25 | 0.84 | 0.49 | -0.82 | 0.33 | 0.50 |
| -0.21 | 1.25 | -0.10 | -1.39 | -0.98 | 0.27 | -0.95 | -0.40 | 0.87 | 0.06 | 0.37 | -0.34 | -0.94 | 0.68 | -0.10 | -0.08 | 1.08 | 0.65 | -0.17 | 0.01 | 0.86 | 0.39 | -0.83 | 0.79 | -0.86 | -0.85 | -0.03 | 0.27 | -0.74 | -0.32 | -0.07 | 0.88 | 0.18 | 0.30 | 0.38 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.30 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.37 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.16 | 0.55 | -0.51 | -0.89 | -0.04 | 0.22 | 0.19 | -0.31 | 0.94 | -0.74 | -0.66 | -0.41 | 0.61 | -0.04 | 0.27 | -0.1 | 0.07 | -1.10 | 0.60 | 1.09 | -0.46 | 0.35 | -0.34 | 0.67 | -0.42 | -0.35 | -0.11 | 0.01 | 1.13 | -0.26 | -0.49 | 0.07 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.06 | -0.24 | -0.26 | 0.17 | -1.09 | 0.77 | -0.11 | -0.16 | 0.08 | -0.53 | 0.49 | 0.39 | -0.65 | -0.71 | 0.38 | 0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | 0.28 | -0.24 | 1.03 | -0.65 | -0.38 | 1.09 | 0.32 | 0.66 | 0.27 | -1.05 | 0.21 | -0.11 | -1.02 | 0.65 | 0.04 | -0.03 | 0.20 | 0.54 | 0.09 | 0.09 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | 0.80 | 0.88 | 0.43 | 1.11 | -0.1 | -0.37 | -0.37 | -0.08 | -0.20 | -0.47 | 0.07 | 0.1 | -0.99 | -0.01 | -0.47 | -0.37 | 0.21 | -0.04 | -0.12 | 1.38 | 0.44 | 0.56 | -0.67 | 0.43 | 0.11 | 0.27 | 0.47 | -1.05 | -0.44 | 0.30 | -0.05 | -0.60 | -0.27 |
| 1.32 | 0.00 | 0.09 | 0.07 | 0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.13 | -0.38 | -0.24 | 0.21 | -1.43 | -0.17 | 0.42 | 0.15 | -0.11 | 0.04 | -0.10 | -0.15 | -0.03 | 0.03 | -1.20 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.32 | -1.44 | 0.76 | 0.57 | -0.01 | 0.33 | 1.07 | 0.29 | -0.41 | -1.37 | 0.56 | 0.75 | 0.05 | -0.52 | 0.63 | 0.35 | 1.15 | -0.20 | -0.08 | 0.44 | 0.23 | -0.10 | 0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.05 | 0.54 | 0.25 | 0.53 | -0.10 | 0.91 | 0.20 | 0.08 | 0.01 | -1.28 | 0.32 | 0.61 | 0.49 | 0.30 | 0.46 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.02 | 0.69 | -0.26 | 0.49 | -0.13 | -0.64 | 0.61 | -0.61 | -0.05 | 0.23 | 0.03 | -0.01 | 0.77 | 1.01 | -0.20 | 0.55 | -0.00 | -0.81 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.25 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.69 | 1.14 | 0.71 | -0.29 | 0.74 | -0.45 | 0.51 | -0.77 | 1.03 | 0.44 | 0.20 | 0.33 | -0.78 | -1.51 | 0.19 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.18 | 0.24 | 0.23 | 0.67 | -0.25 | -0.90 | 0.17 | -0.28 | 0.27 | 0.36 | -0.06 | 0.58 | 0.08 | 0.79 | -0.36 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.83 | 0.50 | 0.11 | 0.45 | -0.81 | 0.30 | 0.98 | 0.69 | 0.56 | 0.06 | 0.60 | 0.28 | 0.08 | 0.16 | -0.53 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.00 | 0.40 | -0.95 | -0.16 | -1.18 | 0.57 | -0.24 | -0.05 | 0.38 | 0.19 | -1.11 | 0.55 | 0.71 | 0.54 | 0.84 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.14 | 0.75 | -0.30 | -1.49 | 0.56 | -0.41 | 0.37 | -0.47 | -0.17 | 0.59 | -0.40 | 0.12 | 1.33 | 0.44 | -1.02 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.77 | -0.34 | 0.33 | -0.49 | 0.88 | -0.26 | -0.79 | -0.27 | 0.78 | -0.77 | -0.18 | -0.03 | -0.73 | -0.02 | 0.32 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.39 | -0.45 | -0.21 | 0.29 | -0.11 | 0.65 | -0.04 | 0.54 | -0.18 | -1.12 | -0.09 | 0.30 | 1.08 | 0.86 | 0.19 | 0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.58 | 0.70 | -0.05 | 0.32 | 0.62 | 0.64 | -0.34 | 0.11 | 0.85 | 0.89 | 0.37 | 1.11 | -0.19 | -0.65 | 1.04 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.01 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.90 | -0.04 | 0.07 | 1.14 | -0.17 | -0.49 | 0.63 | 0.36 | 0.24 | -0.31 | -0.19 | 0.74 | 0.76 | -0.01 | 0.38 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.09 | -0.18 | -0.31 | 0.43 | -1.13 | -0.98 | 0.75 | -0.75 | -0.16 | -0.56 | 0.42 | 0.11 | 0.92 | 0.58 | 0.06 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.14 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.26 | -0.88 | -0.50 | 0.77 | -0.69 | -0.87 | 0.57 | 0.42 | 0.19 | 0.67 | -0.04 | -0.22 | 0.80 | -0.44 | 0.35 | 0.49 | -0.12 | -0.75 | -0.23 | -0.32 | 0.67 | 0.25 | -1.07 |
| 0.07 | -0.13 | -0.32 | -0.05 | -1.02 | 0.05 | 0.69 | 0.18 | 0.83 | 1.00 | 0.14 | 0.77 | 0.39 | 0.58 | -0.44 | 0.90 | 0.09 | -1.15 | 0.26 | 0.00 | -0.74 | 0.16 | -1.48 | 0.49 | -1.06 | 0.52 | 1.45 | 0.33 | -1.22 | -0.70 | -0.09 | 0.38 | 0.71 | -0.10 | 0.78 | -0.17 | 0.72 | -0.30 | -0.37 | -0.18 | 0.22 | -0.40 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.74 | 0.00 | 0.75 | 0.82 | -0.71 | 0.72 | -0.37 | -0.33 | 1.17 | -0.10 | -0.11 | -0.31 | 0.83 | -0.89 | 1.05 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.16 | 0.75 | 0.00 | 0.92 | 0.40 | 0.34 | 0.24 | 1.20 | -0.47 | -0.32 | 0.67 | 0.69 | -1.15 | 0.25 | -0.25 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.11 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.49 | -0.71 | 0.40 | 1.36 | 0.00 | 0.62 | -0.09 | -0.28 | 1.03 | -0.91 | 0.01 | 0.41 | 0.14 | -0.60 | -0.65 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.61 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.52 | -0.37 | 0.24 | -0.46 | -0.09 | -1.05 | 0.00 | 1.02 | -0.74 | 0.52 | -0.57 | -0.84 | -0.81 | 0.02 | -0.12 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.27 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.33 | 1.17 | -0.47 | 0.22 | 1.03 | 0.14 | -0.74 | 0.33 | 0.00 | -0.62 | -0.36 | 0.42 | -0.02 | -0.07 | 0.78 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | 0.77 | -1.12 | 0.89 | -0.12 | -0.31 | -0.56 | 0.66 | 0.67 | -1.22 | -0.10 | -0.32 | 0.13 | -0.91 | 0.19 | 0.52 | 0.65 | -0.62 | 0.00 | 0.84 | -0.13 | -0.62 | -0.35 | 0.40 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.70 | -0.11 | 0.67 | 0.50 | 0.01 | -0.14 | -0.57 | 0.58 | -0.36 | 0.84 | 0.00 | -0.85 | -1.00 | 0.39 | 0.18 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.09 | -0.31 | 0.69 | 0.03 | 0.41 | 0.93 | -0.84 | -0.52 | 0.42 | -0.13 | -0.85 | 0.00 | 0.58 | -1.10 | -0.03 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.38 | 0.83 | -1.15 | -0.12 | 0.14 | 0.31 | -0.81 | 0.27 | -0.02 | -0.62 | -1.00 | 0.58 | 0.00 | 0.14 | -1.21 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.71 | -0.89 | 0.25 | 0.77 | -0.60 | -0.87 | 0.02 | -0.31 | -0.07 | -0.35 | 0.39 | -1.10 | 0.14 | 0.00 | 1.30 | 0.26 | 0.86 | 0.91 | -0.46 | -0.51 | 0.08 | -0.72 | -0.12 |
| 0.11 | -1.20 | 0.63 | 0.46 | -0.20 | 0.25 | 0.19 | -0.36 | -0.53 | 0.84 | -1.02 | 0.32 | -0.19 | 1.04 | -0.01 | 0.38 | 0.06 | 0.14 | 0.35 | -0.10 | 1.05 | -0.25 | 0.11 | -0.65 | 0.61 | -0.12 | 0.27 | 0.78 | 0.40 | 0.18 | -0.03 | -1.21 | 1.30 | 0.00 | -0.15 | 0.73 | 0.46 | 0.56 | 0.39 | 0.97 | 0.49 | -0.47 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.78 | 1.41 | 1.09 | -0.41 | -0.71 | 0.02 | 0.19 | 0.14 | -0.03 | -0.61 | 0.90 | 1.21 | 0.41 | -0.26 | -0.15 | 0.00 | -0.16 | 0.27 | 0.08 | -1.15 | -0.26 | 0.19 | -0.10 |
| 0.47 | 0.54 | 1.15 | 1.18 | 0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.17 | 0.45 | -0.72 | -0.32 | 1.27 | -1.14 | -1.20 | -0.18 | 0.53 | 0.58 | -0.14 | 0.59 | -0.38 | 0.86 | 0.73 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.72 | 0.35 | -0.04 | -0.75 | 0.93 | -0.15 | -0.41 | 0.89 | -1.01 | -0.01 | 0.97 | -0.84 | 0.45 | 0.91 | 0.46 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.56 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.37 | -0.18 | -0.54 | -0.52 | 1.06 | -0.02 | -0.22 | -0.20 | -0.38 | -0.46 | 0.26 | 0.53 | -0.71 | -0.51 | 0.39 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 0.97 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.49 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.40 | 0.33 | -0.59 | 0.33 | -0.53 | -0.20 | 0.88 | 0.07 | -0.31 | 0.63 | -0.05 | -1.0 | -0.35 | -0.12 | 0.47 | 0.10 | 0.07 | 0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | -0.71 | -0.72 | -1.28 | -0.31 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | 1.38 | 1.18 | -0.28 | 0.30 | -0.17 | -0.97 | 0.25 | 0.84 | 0.49 | -0.82 | 0.33 | 0.50 |
| -0.21 | 1.25 | -0.18 | -1.39 | 0.98 | 0.27 | -0.95 | 0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | 0.86 | -0.85 | 0.03 | 0.27 | 0.74 | -0.42 | -0.07 | 0.88 | 0.18 | 0.33 | 0.38 | -0.49 | 0.54 | -0.04 | 0.23 | 0.86 | -0.16 | 1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | 0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | 0.04 | 0.27 | -0.1 | 0.87 | -1.10 | 0.60 | 1.09 | -0.46 | 0.35 | -0.34 | 0.70 | -0.42 | -0.35 | -0.11 | 0.01 | 1.13 | -0.26 | -0.49 | -0.02 |
| 1.34 | 0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | 0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.74 | 1.03 | -0.65 | -0.38 | 1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | 0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | 0.03 | 0.03 | -1.17 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | 0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.43 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| -0.47 | -1.43 | -0.01 | 0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.67 | -0.09 | -0.28 | 1.03 | -0.91 | 0.01 | 0.41 | 0.14 | -0.60 | -0.68 | -0.71 | 1.27 | 0.93 | -0.35 | 1.06 | 0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.08 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | 0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | 1.13 | 0.24 | 0.26 | 1.01 | 0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | 0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.97 | -0.19 | -1.39 | -0.58 | -0.46 | -0.72 | 0.47 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.00 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | 0.07 | 0.13 | 0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | -0.71 | -0.72 | -1.28 | -0.31 |
| 1.74 | -0.06 | -1.53 | -0.72 | 0.06 | 0.81 | 0.62 | -0.38 | 0.27 | 0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| -0.21 | 1.25 | -0.18 | -1.39 | -0.98 | 0.27 | -0.95 | -0.40 | 0.87 | -0.06 | -0.37 | -0.34 | -0.94 | 0.60 | -0.10 | -0.08 | 1.08 | 0.65 | 0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | 1.10 |
| 0.49 | 0.76 | -0.90 | 0.60 | 0.55 | 0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | 1.10 | 0.60 | 1.09 | -0.46 | 0.35 | -0.34 | 0.70 | -0.42 | -0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.74 | 1.03 | -0.65 | 0.38 | -1.08 | 0.32 | 0.66 | 0.27 | -1.05 | 0.21 | -0.11 | -1.02 | 0.65 | 0.04 | -0.03 | -0.20 | 0.54 | 0.09 | 0.06 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | 0.67 | 0.43 | 0.13 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | 0.03 | 0.03 | -1.17 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | 0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | 0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | 1.03 | 0.89 | 0.21 | 0.92 | 0.23 | 0.45 | -0.71 | -0.72 | -1.28 | -0.31 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | 1.38 | 1.18 | -0.28 | -0.30 | -0.17 | -0.97 | 0.25 | 0.84 | 0.49 | -0.82 | 0.33 | 0.50 |
| 0.21 | 1.25 | -0.18 | -1.39 | -0.98 | 0.27 | -0.95 | -0.40 | 0.87 | 0.06 | -0.37 | 0.34 | 0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | 0.74 | -0.42 | -0.07 | 0.88 | 0.18 | 0.33 | 0.30 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | -0.35 | 0.11 | 0.01 | 1.11 | 0.26 | -0.49 | -0.02 |
| 1.34 | -0.54 | 0.30 | 0.57 | 0.14 | 0.10 | -0.14 | 0.56 | 0.41 | 0.07 | 1.36 | 0.19 | -0.28 | -0.25 | 1.13 | -0.90 | -1.32 | -0.65 | 0.91 | 1.07 | -0.24 | 0.26 | 0.17 | -1.09 | 0.77 | 0.11 | -0.16 | 0.08 | -0.53 | 0.49 | 0.39 | -0.65 | 0.71 | 0.35 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | 0.38 | -1.08 | 0.32 | 0.66 | 0.27 | -1.05 | 0.21 | -0.11 | -1.02 | 0.65 | 0.04 | 0.03 | 0.20 | 0.54 | -0.09 | 0.06 | 0.18 | 0.82 | 0.44 | 0.24 | -0.58 | -0.13 | -0.16 | -0.07 |
| 0.00 | 1.32 | 0.26 | -0.14 | 0.71 | 0.31 | 0.04 | 0.26 | -0.31 | -0.80 | 0.88 | 0.43 | 1.11 | -0.1 | -0.37 | -0.37 | 0.08 | -0.20 | -0.47 | 0.06 | 0.1 | -0.99 | -0.01 | -0.47 | -0.37 | 0.21 | -0.04 | 0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | 0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | 0.03 | 0.03 | -1.17 | 0.16 | 0.54 | 0.49 | 1.86 | -0.24 | -0.62 | 0.32 | 0.09 |
| -0.26 | 0.09 | 0.00 | 0.91 | -0.18 | 0.14 | 0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | 1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | 0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| -0.08 | 0.25 | 0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.26 | 0.88 | -0.50 | 0.77 | -0.69 | -0.87 | 0.57 | 0.42 | 0.19 | 0.67 | -0.04 | -0.27 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | 1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.89 | -1.15 | 0.25 | -0.22 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | 0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.67 | -0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | 0.12 | 0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | 1.11 | 0.40 | 0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | 0.01 | 0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | 0.02 | 0.86 | -0.65 | -0.95 | -0.01 | 0.58 | -0.74 | -0.44 | 0.70 | -0.89 | 0.25 | 0.77 | 0.60 | -0.87 | 0.02 | -0.31 | -0.07 | -0.35 | 0.39 | -1.10 | 0.14 | 0.00 | 1.33 | 0.26 | 0.86 | 0.91 | -0.46 | -0.51 | 0.08 | -0.72 | -0.12 |
| 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | 1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | 0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | 0.59 | 0.33 | -0.53 | -0.20 | 0.88 | 0.07 | -0.31 | 0.63 | -0.05 | -1.0 | -0.35 | -0.17 | 0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1.14 | -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | 0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | -0.71 | -0.72 | -1.28 | -0.31 |
| 0.22 | 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| 0.36 | -0.21 | 1.25 | -0.18 | -1.39 | -0.98 | 0.77 | -0.95 | -0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | -1.10 |
| 0.21 | 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.68 | 0.63 |
| 0.75 | 0.17 | 0.40 | 0.17 | 0.11 | 0.18 | 0.92 | -0.85 | 0.74 | 0.47 | -0.17 | -0.18 | 0.55 | 0.51 | -0.89 | -0.04 | 0.22 | 0.19 | -0.31 | 0.94 | 0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.32 | -0.35 | 0.11 | 0.01 | 1.13 | -0.26 | -0.49 | -0.02 |
| 0.29 | 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | 0.11 | -0.16 | 0.08 | -0.53 | 0.49 | 0.39 | 0.65 | -0.71 | 0.35 | -0.55 | 0.48 | -0.36 | 1.16 | 0.61 | -0.27 | 0.16 | 0.12 |
| 0.00 | 1.09 | -0.27 | 0.46 | 0.73 | 0.50 | 0.34 | 0.35 | 0.33 | -0.18 | -0.35 | 1.01 | 0.48 | 0.67 | 0.04 | -0.28 | -0.24 | 1.03 | -0.65 | -0.38 | -1.08 | 0.32 | 0.66 | 0.27 | -1.05 | 0.71 | -0.11 | 1.02 | 0.65 | 0.04 | 0.03 | 0.20 | 0.54 | 0.09 | 0.06 | 0.18 | 0.82 | 0.44 | 0.24 | 0.58 | -0.13 | -0.16 | -0.07 |
| 1.09 | 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| 0.27 | 1.32 | 0.00 | 0.09 | 0.07 | -0.79 | 0.33 | 0.58 | 0.35 | 0.86 | -0.36 | -0.01 | 0.31 | -1.05 | -0.47 | -0.72 | -0.07 | 0.25 | 0.50 | -0.57 | -0.14 | -0.38 | 0.24 | 0.21 | -1.43 | -0.17 | 0.42 | 0.15 | 0.11 | 0.04 | -0.10 | -0.15 | -0.03 | 0.03 | -1.17 | 0.16 | 0.54 | 0.49 | 1.86 | -0.24 | -0.62 | 0.32 | 0.09 |
| 0.46 | 0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| 0.73 | -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.50 | 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | 0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | 0.52 | -0.22 | 0.46 |
| 0.34 | 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.35 | 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | 0.29 | 0.74 | -0.45 | 0.51 | -0.77 | 1.03 | 0.44 | 0.20 | 0.33 | -0.70 | -1.51 | 0.17 | 0.41 | 0.59 | 0.60 | 0.54 | -0.77 | 0.28 | 0.62 | 0.07 |
| 0.33 | 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| 0.18 | -0.31 | 0.86 | 0.30 | 0.33 | -0.94 | -0.61 | -1.06 | 1.07 | 0.00 | -0.09 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 0.35 | -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 1.01 | 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.48 | 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 0.67 | 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| 0.04 | -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| 0.28 | -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| 0.24 | -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| 1.03 | -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| 0.65 | -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| 0.38 | -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 1.08 | 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.09 | 0.39 | 0.70 | -0.14 | 0.79 | -0.16 | 0.71 | -0.30 | -0.38 | -0.18 | 0.22 | -0.39 |
| 0.32 | 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| 0.66 | 0.99 | 0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| 0.27 | -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | 0.32 | -0.75 | 0.10 | -0.52 | 0.26 | 0.64 | 0.33 |
| 1.05 | -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| 0.21 | -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.11 | 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| 1.02 | -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | 0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| 0.65 | -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 0.04 | 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.03 | 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.20 | 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.09 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| 0.54 | -0.67 | -0.03 | 0.05 | 0.49 | 0.77 | 0.45 | -0.70 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.09 | 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | 0.46 | -0.51 | 0.08 | -0.72 | -0.12 |
| 0.06 | 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.18 | 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.82 | 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | 0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| 0.44 | -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 0.24 | -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | 0.46 | 0.59 | 0.08 | 0.24 | 0.85 | 0.00 | 0.41 | 1.08 | -0.42 | -0.13 |
| 0.58 | 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| 0.13 | -0.05 | -0.62 | 0.23 | 0.49 | 0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| 0.16 | -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| 0.07 | -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 14 | 0.33 | 0.15 | 0.75 | -0.19 | -0.49 | 0.59 | -0.02 | 0.22 | 0.28 | 1.28 | 0.33 | 0.64 | -0.18 | -0.39 | 0.47 | 0.03 | 1.00 | 0.00 | 0.25 | 0.30 | -0.04 | -0.46 | -0.35 | 0.07 | -0.56 | 0.45 | 0.26 | 0.56 | -0.25 | -0.32 | 1.13 | 0.35 | -1.03 | 0.89 | 0.21 | 0.92 | 0.23 | 0.45 | -0.71 | -0.72 | -1.28 | 0.31 |
| 22 | 1.74 | -0.06 | -1.53 | 0.72 | 0.06 | 0.81 | 0.62 | -0.38 | 0.27 | -0.67 | -0.26 | 0.03 | -0.30 | -0.08 | -0.29 | 0.33 | 0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| 36 | -0.21 | 1.25 | -0.18 | -1.39 | -0.98 | 0.27 | -0.95 | -0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | -1.10 |
| 21 | 0.49 | 0.76 | -0.90 | 0.60 | 0.55 | 0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | 0.62 | 0.34 | -0.16 | 0.57 | 0.02 | 0.68 | -0.07 | -0.39 | 0.53 | 0.13 | 0.49 | 0.39 | -0.87 | -0.23 | -0.02 | 1.08 | 1.49 | 0.32 | -0.68 | 0.63 |
| 75 | 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | 0.46 | 0.35 | -0.34 | 0.70 | -0.42 | -0.35 | -0.11 | 0.01 | 1.13 | -0.26 | -0.49 | -0.02 |
| 29 | 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | -0.55 | 0.48 | -0.36 | 1.16 | 0.61 | -0.27 | 0.16 | 0.12 |
| 00 | 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | -0.38 | -1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | 0.16 | -0.07 |
| 09 | 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | 1.05 | -0.44 | 0.30 | -0.05 | -0.60 | -0.27 |
| 27 | 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | 1.43 | 0.17 | 0.42 | 0.15 | -0.11 | 0.04 | -0.10 | 0.15 | 0.03 | 0.03 | -1.17 | 0.16 | 0.54 | 0.49 | 1.06 | -0.24 | -0.62 | 0.32 | 0.09 |
| 46 | -0.26 | 0.09 | 0.00 | 0.91 | -0.18 | 0.14 | -0.71 | -0.21 | 0.30 | -0.11 | -0.04 | -1.80 | -0.31 | -0.48 | 0.14 | 1.14 | 0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| 73 | -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 50 | 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 34 | 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 35 | 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 33 | 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| 18 | -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 35 | -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 01 | 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 48 | 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 67 | 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| 04 | -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| 28 | -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| 24 | 0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| 03 | -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| 65 | -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| 38 | -0.47 | -0.57 | -1.11 | -0.44 | 0.36 | 1.07 | -0.87 | -0.72 | -0.22 | 0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 08 | 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 32 | 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| 66 | -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| 27 | -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| 05 | -0.47 | -1.43 | -0.01 | -0.10 | -0.13 | 0.08 | 0.74 | 0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.77 | 0.93 | -0.35 | 1.06 | -0.21 | 0.97 | -0.53 |
| 21 | -0.37 | -0.17 | 0.33 | 0.91 | -0.64 | 0.09 | -0.45 | -0.90 | 0.30 | 0.57 | 0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 11 | 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| 02 | -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| 65 | -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 04 | 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 03 | 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 20 | 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| 54 | -0.67 | -0.03 | 0.05 | 0.49 | 0.77 | 0.45 | -0.78 | 0.08 | 0.08 | 0.71 | 1.33 | -0.73 | 1.08 | 0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | 0.55 | -0.46 | -0.35 |
| 09 | 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | 0.87 | 0.02 | -0.31 | 0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 06 | 0.13 | -1.17 | 0.60 | 0.43 | -0.17 | 0.27 | 0.17 | -0.33 | -0.50 | 0.82 | 1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 18 | 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 82 | 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | 0.38 | 0.86 | 0.70 | -0.16 | 0.00 | -0.68 | 0.24 | 0.02 | 0.80 | 0.46 | -0.07 |
| 44 | -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 24 | -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 58 | 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | 0.52 | 1.06 | -0.02 | 0.22 | 0.20 | 0.38 | -0.86 | 0.26 | 0.53 | -0.71 | -0.51 | 0.42 | -1.15 | 0.02 | 1.57 | 0.41 | 0.00 | 0.28 | 0.86 | -0.00 |
| 13 | -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| 16 | -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| 07 | -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 14 | -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | 0.32 | 1.43 | 0.35 | -1.03 | 0.89 | 0.21 | 0.92 | 0.23 | 0.45 | -0.71 | 0.72 | 1.28 | 0.41 |
| 22 | 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | 0.10 | 0.18 | 0.45 | 0.42 | 0.26 | -1.30 | 1.18 | -0.28 | -0.30 | 0.17 | 0.97 | 0.25 | 0.84 | 0.49 | 0.02 | 0.33 | 0.50 |
| 36 | -0.21 | 1.25 | -0.18 | -1.39 | -0.98 | 0.27 | -0.95 | -0.40 | 0.87 | -0.06 | -0.37 | -0.34 | -0.94 | 0.68 | -0.10 | 0.08 | 1.08 | 0.65 | -0.17 | 0.00 | 0.86 | 0.39 | -0.83 | 0.79 | 0.86 | -0.85 | -0.04 | 0.27 | 0.74 | -0.42 | -0.07 | 0.88 | 0.18 | 0.33 | 0.38 | -0.49 | 0.54 | -0.04 | 0.23 | 0.86 | -0.16 | 1.10 |
| 21 | 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | 0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.58 | 0.61 |
| 75 | 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | 1.10 | 0.60 | 1.09 | 0.46 | 0.35 | -0.34 | 0.70 | -0.42 | -0.35 | -0.11 | 0.01 | 1.13 | -0.26 | -0.49 | 0.02 |
| 29 | 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | 0.71 | 0.35 | -0.55 | 0.48 | -0.36 | 1.16 | 0.61 | -0.27 | 0.16 | 0.12 |
| 00 | 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | -0.38 | -1.08 | 0.32 | 0.66 | 0.27 | -1.05 | 0.21 | 0.11 | -1.02 | 0.65 | 0.04 | -0.03 | -0.20 | 0.54 | -0.09 | 0.06 | 0.18 | 0.82 | 0.44 | 0.24 | 0.58 | -0.13 | -0.16 | 0.07 |
| 09 | 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | 0.01 | -0.47 | -0.37 | 0.21 | -0.04 | -0.12 | 1.38 | 0.44 | 0.56 | 0.67 | 0.43 | 0.13 | 0.27 | 0.47 | -1.05 | -0.44 | 0.30 | -0.05 | -0.60 | -0.27 |
| 27 | 1.32 | 0.00 | 0.09 | 0.07 | -0.39 | 0.33 | 0.58 | 0.35 | 0.86 | -0.36 | -0.01 | 0.31 | -1.05 | -0.47 | 0.72 | 0.02 | 0.25 | 0.50 | -0.57 | -0.14 | -0.38 | 0.24 | 0.21 | -1.43 | -0.17 | 0.42 | 0.15 | -0.11 | 0.04 | -0.10 | -0.15 | 0.03 | 0.03 | 1.17 | 0.16 | 0.54 | 0.49 | 1.86 | -0.24 | -0.62 | 0.32 | 0.09 |
| 46 | -0.26 | 0.09 | 0.00 | 0.91 | -0.18 | 0.14 | -0.71 | -0.21 | 0.30 | 0.11 | 0.04 | -1.80 | 0.31 | -0.48 | -0.14 | 1.14 | -0.18 | -0.20 | -1.11 | -0.31 | -1.44 | 0.76 | 0.57 | -0.01 | 0.33 | 1.07 | 0.29 | 0.41 | -1.37 | 0.56 | 0.75 | 0.05 | 0.52 | 0.60 | 0.35 | 1.15 | -0.20 | -0.08 | 0.44 | 0.23 | -0.10 | -0.44 |
| 73 | -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 50 | 0.71 | -0.39 | -0.18 | -0.23 | 0.00 | 0.16 | 0.68 | -1.41 | -0.94 | -0.05 | -0.64 | 0.56 | 0.28 | 0.61 | -1.23 | 0.20 | -0.38 | -0.34 | 0.36 | -1.03 | 0.69 | -0.26 | 0.49 | -0.13 | 0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 34 | 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 35 | 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 33 | 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | 0.35 |
| 18 | -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 35 | -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 01 | 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 48 | 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 67 | 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| 04 | -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| 28 | -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| 24 | -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| 03 | -0.08 | 0.25 | -0.18 | 0.80 | -0.38 | -0.29 | -0.28 | -0.41 | 0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| 65 | -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| 38 | -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 08 | 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 32 | 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| 66 | -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| 27 | -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.27 | 0.13 | 0.50 | 0.03 | -0.12 | 0.77 | 0.14 | -0.41 | -0.32 | -0.75 | 0.10 | -0.52 | 0.26 | 0.64 | 0.33 |
| 05 | -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | 1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| 21 | -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 11 | 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| 02 | -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| 65 | -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 04 | 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 03 | 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 20 | 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | 1.10 | -0.06 | 1.21 | 0.59 | -0.84 | 1.03 | 0.53 | -0.97 | -0.58 | 1.0 |
| 54 | -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 09 | 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 06 | 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | 0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 18 | 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 82 | 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.50 | -0.14 | 0.59 | -0.38 | 0.86 | 0.70 | -0.16 | 0.00 | -0.68 | 0.24 | 0.02 | 0.00 | 0.46 | -0.07 |
| 44 | -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 24 | -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | 0.42 | -0.13 |
| 58 | 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| 13 | -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | 0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| 16 | -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.97 | -0.19 | -1.39 | -0.58 | -0.46 | -0.72 | 0.47 | 0.19 | 0.46 | 0.48 | -0.42 | 0.86 | 0.48 | 0.00 | 1.06 |
| 07 | -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1.14 | -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | 0.71 | -0.72 | -1.28 | -0.31 |
| 1.22 | 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| 1.36 | -0.21 | 1.25 | -0.18 | 1.39 | -0.98 | 0.27 | -0.95 | -0.40 | 0.87 | -0.06 | 0.37 | -0.34 | -0.94 | 0.68 | -0.10 | -0.08 | 1.08 | 0.65 | 0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | 0.16 | 1.10 |
| 1.21 | 0.49 | 0.76 | -0.90 | 0.60 | 0.55 | 0.46 | 0.03 | 0.28 | 0.12 | 0.62 | 0.84 | 0.57 | 0.56 | 0.38 | 0.38 | -0.82 | 0.57 | 0.62 | 1.42 | -0.24 | 0.29 | 0.83 | -0.62 | 0.34 | -0.16 | 0.57 | 0.02 | 0.68 | -0.07 | 0.39 | 0.53 | 0.13 | 0.49 | 0.39 | -0.82 | -0.23 | 0.02 | 1.08 | 1.49 | 0.32 | -0.68 | 0.63 |
| 1.75 | 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.47 | -0.35 | -0.11 | 0.01 | 1.13 | -0.26 | -0.49 | -0.02 |
| 1.29 | 1.34 | 0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | -0.55 | 0.48 | -0.36 | 1.16 | 0.61 | -0.27 | 0.16 | 0.12 |
| 1.00 | 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | -0.38 | -1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| .09 | 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | 0.99 | -0.01 | -0.47 | 0.37 | 0.21 | -0.04 | -0.12 | 1.38 | 0.44 | 0.56 | -0.67 | 0.43 | 0.13 | 0.27 | 0.47 | -1.05 | -0.44 | 0.30 | 0.05 | -0.60 | 0.27 |
| 1.27 | 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | 0.38 | -0.24 | 0.21 | -1.43 | -0.17 | 0.42 | 0.15 | -0.11 | 0.04 | -0.10 | -0.15 | -0.03 | 0.03 | -1.17 | 0.16 | 0.54 | 0.49 | 1.86 | -0.24 | -0.62 | 0.32 | 0.09 |
| 1.46 | -0.26 | 0.09 | 0.00 | 0.91 | -0.18 | 0.14 | -0.71 | -0.21 | 0.30 | -0.11 | -0.04 | -1.80 | -0.31 | 0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| 1.73 | -0.14 | 0.07 | 0.91 | 0.00 | -0.23 | 0.62 | 0.72 | -1.01 | 0.33 | -0.30 | 1.27 | -0.48 | 0.34 | -0.52 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 1.50 | 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 1.34 | 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 1.35 | 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 1.33 | 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.78 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| 1.18 | -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 1.35 | -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| .01 | 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | 0.56 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| .48 | 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| .67 | 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| .04 | -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| .28 | -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| .24 | -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| .03 | -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| .65 | -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| .38 | -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| .08 | 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| .32 | 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| .66 | -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| .27 | -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| .05 | -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| .21 | -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| .11 | 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.08 |
| .02 | -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| .65 | -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | 0.38 | 0.85 | 0.92 | -0.31 |
| .04 | 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| .03 | 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| .20 | 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| .54 | -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| .09 | 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| .06 | 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| .18 | 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | 0.26 | -0.17 | 0.00 | -0.16 | 0.27 | 0.08 | -1.15 | -0.26 | 0.19 | -0.10 |
| .82 | 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.06 | 0.70 | -0.16 | 0.00 | -0.68 | 0.24 | 0.02 | 0.80 | 0.46 | -0.07 |
| .44 | -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| .24 | -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | 0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| .58 | 0.30 | 0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | 0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| .13 | -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| .16 | -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | 0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| .07 | -0.27 | 0.09 | -0.44 | 1.25 | 0.46 | 0.67 | 0.07 | 0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.08 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| .14 | -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | -0.71 | -0.72 | -1.28 | 0.31 |
| .22 | 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| .36 | -0.21 | 1.25 | -0.18 | -1.39 | -0.98 | 0.27 | -0.95 | -0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.18 | -0.49 | 0.54 | -0.04 | 0.23 | 0.86 | -0.16 | -1.10 |
| .21 | 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | 0.16 | 0.57 | 0.02 | 0.68 | -0.07 | -0.39 | 0.53 | 0.13 | 0.49 | 0.39 | 0.82 | -0.23 | 0.02 | 1.08 | 1.49 | 0.32 | -0.68 | 0.63 |
| .75 | 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | 0.35 | -0.11 | 0.01 | 1.13 | -0.26 | -0.49 | -0.02 |
| .29 | 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | 1.32 | -0.65 | 0.91 | 1.07 | -0.24 | -0.26 | 0.17 | -1.09 | 0.77 | -0.11 | -0.16 | 0.08 | 0.53 | 0.49 | 0.39 | -0.65 | -0.71 | 0.35 | -0.55 | 0.48 | -0.36 | 1.16 | 0.61 | -0.27 | 0.16 | 0.17 |
| .00 | 1.09 | -0.27 | 0.46 | 0.73 | 0.50 | 0.34 | 0.35 | 0.33 | -0.18 | -0.35 | 1.01 | 0.48 | 0.67 | -0.04 | -0.28 | -0.24 | 1.03 | 0.65 | -0.38 | -1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| .09 | 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | 0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| .27 | 1.32 | 0.00 | 0.09 | 0.07 | -0.39 | 0.33 | 0.58 | 0.35 | 0.86 | -0.35 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | -0.03 | 0.03 | -1.17 | 0.16 | 0.54 | 0.49 | 1.86 | -0.24 | -0.62 | 0.32 | 0.09 |
| 46 | -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| 73 | -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 50 | 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 34 | 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 35 | 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 33 | 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| 18 | -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 35 | -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 01 | 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 48 | 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 67 | 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| 04 | -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| 28 | -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| 24 | -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| 03 | -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| 65 | -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| 38 | -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 08 | 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 32 | 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| 66 | -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| 27 | -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| 05 | -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| 21 | -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 11 | 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| 02 | -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| 65 | -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 04 | 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 03 | 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 20 | 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| 54 | -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 09 | 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 06 | 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 18 | 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 82 | 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| 44 | -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 24 | -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 58 | 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.70 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| 13 | -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| 16 | -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| 07 | -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| .33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | 0.56 | 0.45 | -0.26 | 0.56 | -0.25 | -0.32 | 1.43 | 0.35 | -1.03 | 0.89 | 0.21 | 0.92 | 0.23 | 0.45 | -0.71 | -0.72 | 1.28 | -0.31 |
| .74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | 0.28 | 0.30 | -0.17 | -0.97 | 0.25 | 0.84 | 0.49 | -0.82 | 0.11 | 0.50 |
| .21 | 1.25 | -0.18 | -1.39 | -0.98 | 0.27 | -0.95 | -0.40 | 0.87 | -0.06 | -0.37 | 0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | -1.10 |
| .49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | 0.39 | 0.53 | 0.13 | 0.49 | 0.39 | -0.82 | -0.23 | -0.02 | 1.08 | 1.49 | 0.32 | -0.68 | 0.63 |
| .17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | -0.35 | -0.11 | 0.01 | 1.13 | -0.26 | -0.49 | 0.02 |
| .34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | -0.55 | 0.44 | -0.36 | 1.16 | 0.61 | -0.27 | 0.16 | 0.12 |
| .09 | -0.27 | 0.46 | 0.73 | 0.50 | -0.34 | 0.35 | 0.33 | -0.18 | -0.35 | 1.01 | 0.48 | 0.67 | -0.04 | -0.28 | 0.24 | 1.03 | -0.65 | -0.38 | 1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| .00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | 0.20 | -0.47 | 0.06 | 0.1 | 0.99 | -0.01 | -0.47 | -0.37 | 0.21 | -0.04 | -0.17 | 1.38 | 0.44 | 0.56 | -0.67 | 0.43 | 0.13 | 0.27 | 0.47 | 1.05 | -0.44 | 0.30 | -0.05 | -0.60 | 0.27 |
| .32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | -0.03 | 0.03 | -1.17 | 0.16 | 0.54 | 0.49 | 1.86 | -0.24 | 0.62 | 0.32 | 0.09 |
| .26 | 0.09 | 0.00 | 0.91 | -0.18 | 0.14 | -0.71 | 0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | 0.20 | -0.08 | 0.44 | 0.23 | -0.10 | -0.44 |
| .14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| .71 | -0.39 | 0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | 0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| .31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| .04 | 0.58 | -0.71 | 0.72 | 0.68 | 0.35 | 0.00 | 0.61 | -1.06 | 1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| .26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| .31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.63 | 1.10 | -0.03 | 0.12 | 0.57 |
| .80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | 0.16 | -1.18 | 0.57 | -0.21 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| .88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| .43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| .11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| .37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| .37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| .08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.21 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| .20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| .47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| .06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| .99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.59 |
| .01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.33 |
| .47 | 1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.53 |
| .37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.20 |
| .21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.88 |
| .04 | 0.15 | 0.29 | 0.08 | -0.61 | -0.48 | -0.77 | -0.28 | 0.59 | -0.05 | -0.47 | -0.27 | 0.54 | 0.11 | -0.39 | 0.36 | -0.75 | -0.40 | 0.42 | 1.45 | -0.33 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.07 |
| .12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 0.63 |
| .44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.05 |
| .56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 1.0 |
| .67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.35 |
| .43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.12 |
| .13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.49 |
| .27 | 0.16 | 0.35 | 0.00 | 0.55 | 0.65 | 0.41 | -0.60 | 0.29 | 0.40 | -0.47 | 1.02 | -0.39 | 0.93 | -0.22 | 0.23 | 0.40 | 0.06 | 0.49 | 0.79 | 1.41 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.10 |
| .47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.07 |
| 1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.07 |
| .44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.13 |
| .30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.00 |
| .05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | -0.97 |
| .60 | 0.32 | -0.10 | 0.55 | -0.22 | 0.09 | 0.62 | -0.37 | 0.12 | 0.43 | -0.08 | -1.01 | -0.00 | 0.32 | 0.36 | -0.84 | 0.75 | -0.63 | 0.25 | 0.22 | -0.47 | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | 1.06 |
| .27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | 0.31 | 0.63 | -0.05 | 1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | -0.46 | -0.35 | 0.07 | -0.56 | 0.45 | -0.26 | 0.56 | -0.25 | -0.32 | 1.43 | 0.35 | -1.03 | 0.89 | 0.21 | 0.92 | 0.23 | 0.45 | 0.71 | -0.72 | -1.28 | -0.31 |
| 1.74 | 0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| -0.21 | 1.25 | -0.18 | -1.39 | -0.98 | 0.27 | -0.95 | -0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.73 | 0.86 | 0.16 | 1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | -0.38 | -0.82 | -0.57 | 0.62 | 1.42 | -0.24 | 0.29 | 0.83 | -0.62 | 0.34 | -0.16 | 0.57 | 0.02 | 0.68 | 0.07 | -0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | 0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | -0.24 | -0.26 | 0.17 | -1.09 | 0.77 | -0.11 | -0.16 | 0.08 | -0.53 | 0.49 | 0.39 | -0.65 | -0.71 | 0.35 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | -0.28 | -0.24 | 1.03 | -0.65 | -0.38 | -1.08 | 0.32 | 0.66 | 0.27 | -1.05 | 0.21 | -0.11 | 1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | -0.03 | 0.03 | 1.17 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | 1.11 | -0.31 | -1.44 | 0.76 | 0.57 | -0.01 | 0.33 | 1.07 | 0.29 | -0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| -0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| -0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| -0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 0.13 | 1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| -1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| -0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 0.33 | 0.15 | 0.75 | -0.19 | -0.49 | 0.59 | -0.02 | 0.22 | 0.28 | 1.28 | 0.33 | 0.64 | -0.18 | -0.39 | 0.47 | 0.03 | -1.00 | 0.00 | 0.25 | 0.30 | 0.04 | 0.46 | 0.35 | 0.07 | -0.56 | 0.45 | -0.26 | 0.56 | 0.25 | -0.32 | 1.43 | 0.35 | -1.03 | 0.89 | 0.21 | 0.92 | 0.23 | 0.45 | -0.71 | -0.72 | -1.28 | -0.31 |
| 1.74 | -0.06 | -1.53 | -0.72 | 0.06 | 0.81 | 0.62 | -0.38 | 0.27 | -0.67 | 0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | 0.30 | -0.17 | 0.97 | 0.25 | 0.84 | 0.49 | -0.82 | 0.33 | 0.50 |
| 0.21 | 1.25 | -0.18 | -1.39 | -0.98 | 0.27 | 0.95 | 0.40 | 0.87 | -0.06 | -0.37 | -0.34 | -0.94 | 0.68 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | -1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | -0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | 0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | -0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | -1.32 | -0.65 | 0.91 | 1.07 | 0.24 | -0.26 | 0.17 | -1.09 | 0.77 | 0.11 | -0.16 | 0.08 | -0.53 | 0.49 | -0.39 | -0.65 | -0.71 | 0.35 | -0.55 | 0.48 | -0.36 | 1.16 | 0.61 | -0.27 | 0.16 | 0.12 |
| 1.09 | -0.27 | 0.46 | 0.73 | 0.50 | -0.34 | 0.35 | 0.33 | -0.18 | 0.35 | 1.01 | 0.40 | 0.67 | -0.04 | -0.28 | -0.24 | 1.03 | -0.65 | -0.38 | -1.08 | 0.32 | 0.66 | 0.27 | -1.05 | 0.21 | -0.11 | -1.02 | 0.65 | 0.04 | -0.03 | -0.20 | 0.54 | -0.09 | 0.06 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | -0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | 0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | -0.72 | -0.02 | 0.25 | 0.50 | -0.57 | -0.14 | -0.38 | -0.24 | 0.21 | -1.43 | -0.17 | 0.42 | 0.15 | -0.11 | 0.04 | -0.10 | -0.15 | -0.03 | 0.03 | -1.17 | 0.16 | 0.54 | 0.49 | 1.86 | -0.24 | -0.62 | 0.32 | 0.09 |
| 0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | -0.41 | 1.37 | 0.56 | 0.75 | 0.05 | -0.52 | 0.60 | 0.35 | 1.15 | -0.20 | -0.08 | 0.44 | 0.23 | -0.10 | -0.44 |
| 0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.37 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.71 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | -0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| 0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| 0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | 0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | 0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | 0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| 0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | 0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| 0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | 0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| 0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| 0.20 | 0.50 | -0.20 | 0.79 | -0.34 | -0.17 | 0.90 | -0.15 | -0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| 0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| 0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| 0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| 0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| 0.37 | -0.17 | 0.33 | 0.91 | -0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | -0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| 0.04 | 0.15 | 0.29 | 0.08 | -0.61 | -0.48 | -0.77 | 0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| 0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | -0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | -1.23 | -0.10 | -0.32 | 0.13 | -0.91 | 0.19 | 0.52 | 0.65 | -0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | -0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | -0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | -0.01 | -0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| 0.67 | -0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | -0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 0.13 | -1.17 | 0.60 | 0.43 | -0.17 | 0.27 | 0.17 | -0.33 | -0.50 | 0.82 | 1.05 | 0.35 | -0.16 | 1.01 | -0.04 | 0.41 | 0.09 | -0.11 | 0.37 | -0.14 | 1.02 | -0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | -0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | 1.20 | -0.18 | 0.53 | 0.58 | -0.14 | 0.59 | -0.38 | 0.06 | 0.70 | -0.16 | 0.00 | -0.68 | 0.24 | 0.02 | 0.80 | 0.46 | -0.07 |
| 1.05 | 0.49 | -0.20 | 0.47 | -0.61 | -0.16 | 0.60 | 0.28 | 0.54 | 0.92 | -0.05 | -0.82 | -0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 0.44 | 1.86 | -0.08 | 0.11 | -0.43 | -0.17 | 0.54 | -0.04 | -0.53 | -0.96 | 0.78 | 0.79 | -0.60 | -0.60 | -0.59 | 0.56 | 0.28 | 1.42 | -0.23 | -0.30 | 0.14 | -1.04 | 0.10 | -0.35 | -0.12 | -0.12 | 0.21 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.74 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | -0.52 | 1.06 | -0.02 | -0.22 | -0.20 | -0.38 | -0.46 | 0.26 | 0.53 | -0.71 | -0.51 | 0.42 | -1.15 | 0.02 | 1.57 | 0.41 | 0.00 | 0.28 | 0.86 | -0.00 |
| 0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | -0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| 0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | -1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| 0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | -0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| -0.33 | 0.15 | -0.75 | -0.19 | -0.49 | 0.59 | -0.02 | 0.22 | 0.28 | 1.28 | 0.33 | 0.64 | -0.18 | -0.39 | 0.47 | -0.03 | -1.00 | 0.00 | 0.25 | 0.30 | -0.04 | 0.46 | -0.35 | 0.07 | -0.56 | 0.45 | -0.26 | 0.56 | -0.25 | 0.32 | 1.43 | 0.35 | -1.03 | 0.89 | 0.21 | 0.92 | 0.23 | 0.45 | 0.71 | 0.72 | -1.28 | -0.31 |
| 1.74 | -0.06 | -1.53 | -0.72 | 0.06 | 0.81 | 0.62 | -0.38 | 0.27 | -0.67 | -0.26 | 0.03 | -0.30 | -0.08 | -0.29 | 0.33 | -0.20 | 0.56 | 0.61 | 1.18 | 0.72 | -0.65 | 0.01 | 0.39 | 0.46 | -0.18 | 0.18 | -0.45 | -0.42 | 0.26 | -1.38 | 1.18 | -0.28 | -0.30 | -0.17 | -0.97 | 0.25 | 0.84 | 0.49 | -0.82 | 0.33 | 0.50 |
| -0.21 | 1.25 | -0.18 | -1.39 | -0.90 | 0.27 | -0.95 | -0.40 | 0.87 | 0.06 | -0.37 | -0.34 | -0.94 | 0.60 | -0.10 | -0.08 | 1.08 | 0.65 | -0.17 | 0.00 | 0.86 | 0.39 | -0.83 | 0.79 | -0.86 | -0.85 | -0.03 | 0.27 | -0.74 | -0.42 | -0.07 | 0.88 | 0.18 | 0.33 | 0.38 | -0.49 | 0.54 | -0.04 | 0.23 | 0.86 | -0.16 | 1.10 |
| 0.49 | 0.76 | -0.90 | 0.60 | 0.55 | -0.46 | 0.03 | 0.28 | 0.12 | 0.62 | 0.84 | 0.57 | 0.56 | 0.38 | 0.38 | -0.82 | -0.57 | 0.62 | 1.42 | -0.24 | 0.29 | 0.83 | -0.62 | 0.34 | -0.16 | 0.57 | 0.02 | 0.68 | -0.07 | 0.39 | 0.53 | 0.13 | 0.49 | 0.39 | -0.82 | -0.23 | -0.02 | 1.08 | 1.49 | 0.32 | -0.68 | 0.63 |
| 0.17 | 0.40 | 0.17 | 0.11 | 0.18 | 0.92 | -0.85 | 0.74 | 0.47 | -0.17 | -0.18 | 0.55 | -0.51 | -0.89 | -0.04 | 0.22 | 0.19 | -0.31 | 0.94 | -0.75 | -0.66 | -0.41 | 0.61 | -0.04 | 0.27 | -0.1 | 0.87 | -1.10 | 0.60 | 1.09 | -0.46 | 0.35 | -0.34 | 0.70 | -0.42 | 0.35 | -0.11 | 0.01 | 1.13 | -0.26 | -0.49 | -0.02 |
| 1.34 | -0.54 | 0.30 | 0.57 | 0.14 | 0.10 | -0.14 | 0.56 | 0.41 | 0.02 | 1.36 | 0.19 | -0.28 | -0.25 | 1.13 | -0.90 | 1.32 | -0.65 | 0.91 | 1.07 | -0.24 | -0.26 | 0.17 | 1.09 | 0.77 | -0.11 | 0.16 | 0.08 | -0.53 | 0.49 | 0.39 | -0.65 | 0.71 | 0.35 | -0.55 | 0.48 | -0.36 | 1.16 | 0.61 | 0.27 | 0.16 | 0.12 |
| 1.09 | -0.27 | 0.46 | 0.73 | 0.50 | -0.34 | 0.35 | 0.33 | -0.18 | -0.35 | 1.01 | 0.48 | 0.67 | -0.04 | 0.28 | -0.24 | 1.03 | -0.65 | -0.30 | -1.08 | 0.32 | 0.56 | 0.27 | -1.05 | 0.21 | -0.11 | -1.02 | 0.65 | 0.04 | -0.03 | 0.20 | 0.54 | -0.09 | 0.06 | 0.18 | 0.82 | 0.44 | 0.24 | -0.58 | -0.13 | -0.16 | -0.07 |
| 0.00 | 1.32 | -0.26 | -0.14 | 0.71 | 0.31 | 0.04 | 0.26 | 0.31 | -0.80 | 0.88 | 0.43 | 1.11 | -0.1 | -0.37 | -0.37 | -0.08 | -0.20 | -0.47 | 0.06 | 0.1 | -0.99 | -0.01 | -0.47 | -0.37 | 0.21 | -0.04 | -0.12 | 1.38 | 0.44 | 0.56 | -0.67 | 0.43 | 0.13 | 0.27 | 0.47 | -1.05 | -0.44 | 0.30 | -0.05 | -0.60 | -0.27 |
| 1.32 | 0.00 | 0.09 | 0.07 | -0.39 | 0.33 | 0.58 | 0.35 | 0.86 | -0.36 | -0.01 | 0.31 | -1.05 | -0.47 | 0.72 | -0.02 | 0.25 | 0.50 | -0.57 | -0.14 | -0.30 | -0.24 | 0.21 | -1.43 | -0.17 | 0.42 | 0.15 | -0.11 | 0.04 | -0.10 | -0.15 | -0.03 | 0.03 | -1.17 | 0.16 | 0.54 | 0.49 | 1.86 | -0.24 | -0.62 | 0.32 | 0.09 |
| -0.26 | 0.09 | 0.00 | 0.91 | -0.18 | 0.14 | -0.71 | -0.21 | 0.30 | -0.11 | -0.04 | -1.80 | -0.31 | -0.48 | -0.14 | 1.14 | -0.18 | -0.20 | -1.11 | -0.31 | -1.44 | 0.76 | 0.57 | -0.01 | 0.33 | 1.07 | 0.29 | 0.41 | -1.37 | 0.56 | 0.75 | 0.05 | -0.52 | 0.60 | 0.35 | 1.15 | -0.20 | -0.08 | 0.44 | 0.23 | -0.10 | -0.44 |
| 0.14 | 0.07 | 0.91 | 0.00 | -0.23 | 0.62 | 0.72 | -1.01 | 0.33 | -0.30 | 1.27 | -0.48 | 0.34 | -0.62 | 0.43 | -0.32 | 0.80 | 0.79 | -0.44 | -0.04 | 0.54 | 0.25 | 0.53 | -0.10 | 0.91 | 0.20 | 0.08 | 0.01 | -1.28 | 0.32 | 0.61 | 0.49 | 0.30 | 0.43 | 0.00 | 1.18 | 0.47 | 0.11 | 0.21 | 0.49 | 0.55 | 1.25 |
| 0.71 | -0.39 | -0.18 | -0.23 | 0.00 | 0.16 | 0.68 | -1.41 | -0.94 | -0.05 | -0.64 | 0.56 | 0.28 | -0.61 | -1.23 | 0.20 | -0.38 | -0.34 | 0.36 | -1.03 | 0.69 | -0.26 | 0.49 | -0.13 | -0.64 | 0.61 | -0.61 | -0.05 | 0.23 | 0.03 | -0.01 | 0.77 | 1.01 | -0.17 | 0.55 | -0.00 | -0.61 | -0.43 | 0.73 | -0.52 | -0.22 | 0.46 |
| 0.31 | 0.33 | 0.14 | 0.62 | 0.16 | 0.00 | 0.35 | 0.17 | -0.61 | -0.98 | -1.45 | 1.64 | 1.57 | 0.48 | -0.84 | 0.08 | -0.29 | -0.17 | 1.07 | 0.05 | 0.43 | 1.14 | 1.21 | 0.08 | 0.09 | -0.90 | -0.48 | 0.68 | 0.13 | -0.08 | -0.92 | 0.45 | 0.75 | 0.27 | 0.65 | 0.60 | -0.16 | -0.17 | 0.03 | -0.34 | -0.09 | 0.67 |
| 0.04 | 0.58 | -0.71 | 0.72 | 0.68 | 0.35 | 0.00 | 0.61 | -1.06 | -1.20 | 0.44 | -0.25 | 1.22 | 0.95 | 0.06 | 0.12 | -0.28 | 0.90 | -0.87 | 0.70 | 1.14 | 0.71 | -0.29 | 0.74 | -0.45 | 0.51 | -0.77 | 1.03 | 0.44 | 0.20 | 0.33 | -0.78 | -1.51 | 0.17 | 0.41 | 0.59 | 0.60 | 0.54 | -0.77 | 0.28 | 0.62 | 0.07 |
| 0.26 | 0.35 | -0.21 | -1.01 | -1.41 | 0.17 | 0.61 | 0.00 | 1.07 | 0.02 | 0.48 | -0.08 | -0.78 | 0.32 | -0.44 | 1.05 | -0.41 | -0.15 | -0.72 | 0.17 | 0.24 | 0.23 | 0.67 | -0.25 | -0.90 | 0.17 | -0.28 | 0.27 | 0.36 | -0.06 | 0.58 | 0.08 | 0.79 | -0.33 | -0.50 | -0.08 | 0.28 | -0.04 | 0.57 | -0.04 | -0.37 | -0.35 |
| -0.31 | 0.86 | 0.30 | 0.33 | -0.94 | -0.61 | -1.06 | 1.07 | 0.00 | -0.89 | 0.38 | 0.18 | -0.48 | -0.03 | 1.28 | 0.26 | -0.48 | -0.89 | -0.22 | 0.82 | 0.50 | 0.11 | 0.45 | -0.81 | 0.30 | 0.98 | 0.69 | 0.56 | 0.06 | 0.60 | 0.28 | 0.08 | 0.16 | -0.50 | 0.29 | -1.26 | 0.54 | -0.53 | 1.10 | -0.03 | 0.12 | 0.57 |
| -0.80 | -0.36 | -0.11 | -0.30 | -0.05 | -0.98 | -1.20 | 0.02 | -0.89 | 0.00 | 0.34 | 0.36 | -0.76 | 0.12 | -0.78 | -0.43 | -0.99 | -0.88 | -0.68 | 1.01 | 0.40 | -0.95 | -0.16 | -1.18 | 0.57 | -0.24 | -0.05 | 0.38 | 0.19 | -1.11 | 0.55 | 0.71 | 0.54 | 0.82 | 0.40 | 0.01 | 0.92 | -0.96 | 0.87 | 1.23 | 0.43 | 0.92 |
| 0.88 | -0.01 | -0.04 | 1.27 | -0.64 | -1.45 | 0.44 | 0.48 | 0.38 | 0.34 | 0.00 | -0.97 | -1.66 | 0.74 | -0.19 | -0.67 | -0.07 | -0.73 | 0.02 | 0.15 | 0.75 | -0.30 | -1.49 | 0.56 | -0.41 | 0.37 | -0.47 | -0.17 | 0.59 | -0.40 | 0.12 | 1.33 | 0.44 | -1.05 | -0.47 | 1.41 | -0.05 | 0.78 | -0.36 | 0.01 | -0.08 | 0.31 |
| 0.43 | 0.31 | -1.80 | -0.48 | 0.56 | 1.64 | -0.25 | -0.08 | 0.18 | 0.36 | -0.97 | 0.00 | 0.12 | 0.96 | -1.06 | -0.07 | -0.08 | -0.03 | -0.36 | 0.76 | -0.34 | 0.33 | -0.49 | 0.88 | -0.26 | -0.79 | -0.27 | 0.78 | -0.77 | -0.18 | -0.03 | -0.73 | -0.02 | 0.35 | 1.02 | -0.93 | -0.82 | 0.79 | -0.41 | -0.98 | -1.01 | -0.15 |
| 1.11 | -1.05 | -0.31 | 0.34 | 0.28 | 1.57 | 1.22 | -0.78 | -0.48 | -0.76 | -1.66 | 0.12 | 0.00 | 0.30 | 0.37 | 0.01 | 0.25 | 1.37 | 0.15 | 0.38 | -0.45 | -0.21 | 0.29 | -0.11 | 0.65 | -0.04 | 0.54 | -0.18 | -1.12 | -0.09 | 0.30 | 1.08 | 0.86 | -0.16 | -0.39 | -0.53 | -0.43 | -0.60 | 0.55 | 0.26 | -0.00 | -0.14 |
| -0.1 | -0.47 | -0.48 | -0.62 | -0.61 | 0.48 | 0.95 | 0.32 | -0.03 | 0.12 | 0.74 | 0.96 | 0.30 | 0.00 | -0.41 | 0.12 | 0.83 | 0.81 | -0.35 | 0.59 | 0.70 | -0.05 | 0.32 | 0.62 | 0.64 | -0.34 | 0.11 | 0.85 | 0.89 | 0.37 | 1.11 | -0.19 | -0.65 | 1.01 | 0.93 | -0.73 | 0.23 | -0.60 | -0.33 | -0.74 | 0.32 | 0.25 |
| -0.37 | -0.72 | -0.14 | 0.43 | -1.23 | -0.84 | 0.06 | -0.44 | 1.28 | -0.78 | -0.19 | -1.06 | 0.37 | -0.41 | 0.00 | 1.15 | 0.11 | 1.25 | -0.58 | -0.44 | 1.23 | -0.09 | 0.81 | -0.10 | 0.05 | 0.64 | -0.39 | 0.51 | -0.12 | 0.05 | 0.19 | 0.09 | -0.95 | -0.04 | -0.22 | 0.32 | -1.13 | -0.59 | 0.18 | 0.78 | 0.36 | 0.77 |
| -0.37 | -0.02 | 1.14 | -0.32 | 0.20 | 0.08 | 0.12 | 1.05 | 0.26 | -0.43 | -0.67 | -0.07 | 0.01 | 0.12 | 1.15 | 0.00 | 0.12 | -0.06 | 0.65 | 0.89 | -0.04 | 0.07 | 1.14 | -0.17 | -0.49 | 0.63 | 0.36 | 0.24 | -0.31 | -0.19 | 0.74 | 0.76 | -0.01 | 0.41 | 0.23 | -0.63 | -0.24 | 0.56 | -0.41 | 0.09 | -0.84 | 1.08 |
| -0.08 | 0.25 | -0.18 | 0.80 | -0.38 | -0.29 | -0.28 | -0.41 | -0.48 | -0.99 | -0.07 | -0.08 | 0.25 | 0.83 | 0.11 | 0.12 | 0.00 | 0.74 | 0.52 | 0.08 | -0.18 | -0.31 | 0.43 | -1.13 | -0.98 | 0.75 | -0.75 | -0.16 | -0.56 | 0.42 | 0.11 | 0.92 | 0.58 | 0.09 | 0.40 | 1.05 | 0.26 | 0.28 | 0.20 | 0.36 | 0.25 | 0.01 |
| -0.20 | 0.50 | -0.20 | 0.79 | -0.34 | -0.17 | 0.90 | -0.15 | 0.89 | -0.88 | -0.73 | -0.03 | 1.37 | 0.81 | 1.25 | -0.06 | 0.74 | 0.00 | 0.13 | -1.15 | 0.65 | 0.29 | 0.59 | -0.74 | 0.20 | 0.73 | -0.40 | -0.36 | 0.66 | -0.36 | 0.81 | 0.46 | -0.74 | -0.11 | 0.06 | 0.18 | 1.01 | 1.42 | 0.07 | 0.47 | -0.63 | -0.20 |
| -0.47 | -0.57 | -1.11 | -0.44 | 0.36 | 1.07 | -0.87 | -0.72 | -0.22 | -0.68 | 0.02 | -0.36 | 0.15 | -0.35 | -0.58 | 0.65 | 0.52 | 0.13 | 0.00 | 0.25 | -0.88 | -0.50 | 0.77 | -0.69 | -0.87 | 0.57 | 0.42 | 0.19 | 0.67 | -0.04 | -0.22 | 0.80 | -0.44 | 0.37 | 0.49 | -0.12 | -0.75 | -0.23 | -0.32 | 0.67 | 0.25 | -1.07 |
| 0.06 | -0.14 | -0.31 | -0.04 | -1.03 | 0.05 | 0.70 | 0.17 | 0.82 | 1.01 | 0.15 | 0.76 | 0.38 | 0.59 | -0.44 | 0.89 | 0.08 | -1.15 | 0.25 | 0.00 | -0.73 | 0.15 | -1.48 | 0.50 | -1.06 | 0.51 | 1.45 | 0.34 | -1.23 | -0.71 | -0.08 | 0.39 | 0.70 | -0.14 | 0.79 | -0.16 | 0.71 | -0.30 | -0.38 | -0.18 | 0.22 | -0.39 |
| 0.1 | -0.38 | -1.44 | 0.54 | 0.69 | 0.43 | 1.14 | 0.24 | 0.50 | 0.40 | 0.75 | -0.34 | -0.45 | 0.70 | 1.23 | -0.04 | -0.18 | 0.65 | -0.88 | -0.73 | 0.00 | 0.75 | 0.82 | -0.71 | 0.72 | -0.37 | -0.33 | 1.17 | -0.10 | -0.11 | -0.31 | 0.83 | -0.89 | 1.02 | 1.41 | 0.45 | 0.35 | 0.14 | -0.18 | -0.24 | -0.47 | 0.33 |
| -0.99 | -0.24 | 0.76 | 0.25 | -0.26 | 1.14 | 0.71 | 0.23 | 0.11 | -0.95 | -0.30 | 0.33 | -0.21 | -0.05 | -0.09 | 0.07 | -0.31 | 0.29 | -0.50 | 0.15 | 0.75 | 0.00 | 0.92 | 0.40 | 0.34 | 0.24 | 1.20 | -0.47 | -0.32 | 0.67 | 0.69 | -1.15 | 0.25 | -0.22 | 1.09 | -0.72 | -0.04 | -1.04 | -0.54 | 0.64 | 0.15 | -0.59 |
| -0.01 | 0.21 | 0.57 | 0.53 | 0.49 | 1.21 | -0.29 | 0.67 | 0.45 | -0.16 | -1.49 | -0.49 | 0.29 | 0.32 | 0.81 | 1.14 | 0.43 | 0.59 | 0.77 | -1.48 | 0.82 | 0.92 | 0.00 | 1.36 | -0.64 | -0.46 | -0.58 | 0.22 | 0.13 | 0.50 | 0.03 | -0.12 | 0.77 | 0.14 | -0.41 | -0.32 | -0.75 | 0.10 | -0.52 | 0.26 | 0.64 | 0.33 |
| -0.47 | -1.43 | -0.01 | -0.10 | -0.13 | 0.08 | 0.74 | -0.25 | -0.81 | -1.18 | 0.56 | 0.88 | -0.11 | 0.62 | -0.10 | -0.17 | -1.13 | -0.74 | -0.69 | 0.50 | -0.71 | 0.40 | 1.36 | 0.00 | 0.62 | -0.09 | -0.28 | 1.03 | -0.91 | 0.01 | 0.41 | 0.14 | -0.60 | -0.68 | -0.71 | 1.27 | 0.93 | -0.35 | 1.06 | -0.21 | 0.97 | -0.53 |
| -0.37 | -0.17 | 0.33 | 0.91 | 0.64 | 0.09 | -0.45 | -0.90 | 0.30 | 0.57 | -0.41 | -0.26 | 0.65 | 0.64 | 0.05 | -0.49 | -0.98 | 0.20 | -0.87 | -1.06 | 0.72 | 0.34 | -0.64 | 0.62 | 0.00 | -1.05 | 0.93 | 0.14 | 0.19 | -0.14 | 0.93 | 0.31 | -0.87 | 0.59 | 0.02 | -1.14 | -0.15 | -0.12 | -0.02 | 0.52 | -0.20 | -0.20 |
| 0.21 | 0.42 | 1.07 | 0.20 | 0.61 | -0.90 | 0.51 | 0.17 | 0.98 | 0.24 | 0.37 | -0.79 | -0.04 | -0.34 | 0.64 | 0.63 | 0.75 | 0.73 | 0.57 | 0.51 | -0.37 | 0.24 | -0.46 | -0.09 | -1.05 | 0.00 | 1.02 | -0.74 | 0.52 | -0.57 | -0.84 | -0.81 | 0.02 | -0.09 | 0.19 | -1.20 | -0.41 | -0.12 | -0.22 | 0.44 | -1.62 | 0.88 |
| -0.04 | 0.15 | 0.29 | 0.08 | -0.61 | -0.48 | -0.77 | -0.28 | 0.69 | -0.05 | -0.47 | -0.27 | 0.54 | 0.11 | -0.39 | 0.36 | -0.75 | -0.40 | 0.42 | 1.45 | -0.33 | 1.20 | -0.58 | -0.28 | 0.93 | 1.02 | 0.00 | 0.33 | 0.65 | 0.58 | -0.52 | 0.27 | -0.31 | 0.30 | 0.14 | -0.18 | 0.89 | 0.21 | -0.20 | -0.34 | -0.46 | 0.07 |
| -0.12 | -0.11 | -0.41 | 0.01 | -0.05 | 0.68 | 1.03 | 0.27 | 0.56 | 0.38 | -0.17 | 0.78 | -0.18 | 0.85 | 0.51 | 0.24 | -0.16 | -0.36 | 0.19 | 0.34 | 1.17 | -0.47 | 0.22 | 1.03 | 0.14 | -0.74 | 0.33 | 0.00 | -0.62 | 0.36 | 0.42 | -0.02 | -0.07 | 0.75 | -0.03 | 0.53 | -1.01 | 0.23 | -0.38 | 0.85 | 0.92 | -0.31 |
| 1.38 | 0.04 | -1.37 | -1.28 | 0.23 | 0.13 | 0.44 | 0.36 | 0.06 | 0.19 | 0.59 | -0.77 | -1.12 | 0.89 | -0.12 | -0.31 | -0.56 | 0.66 | 0.67 | 1.23 | -0.10 | -0.32 | 0.13 | -0.91 | 0.19 | 0.52 | 0.65 | 0.62 | 0.00 | 0.84 | -0.13 | -0.62 | -0.35 | 0.43 | -0.61 | 0.58 | -0.01 | 0.07 | -0.46 | 1.43 | -0.19 | 0.63 |
| 0.44 | -0.10 | 0.56 | 0.32 | 0.03 | -0.08 | 0.20 | 0.06 | 0.60 | -1.11 | -0.40 | -0.18 | -0.09 | 0.37 | 0.05 | -0.19 | 0.42 | -0.36 | -0.04 | -0.71 | -0.11 | 0.67 | 0.50 | 0.01 | 0.14 | -0.57 | 0.58 | -0.36 | 0.84 | 0.00 | -0.85 | -1.00 | 0.39 | 0.20 | 0.90 | -0.14 | 0.97 | 0.43 | 0.26 | 0.47 | -1.39 | -0.05 |
| 0.56 | -0.15 | 0.75 | 0.61 | 0.01 | 0.92 | 0.33 | 0.58 | 0.28 | 0.55 | 0.12 | -0.03 | 0.30 | 1.11 | 0.19 | 0.74 | 0.11 | 0.81 | -0.22 | -0.08 | -0.31 | 0.69 | 0.03 | 0.41 | 0.93 | -0.84 | -0.52 | 0.42 | -0.13 | -0.85 | 0.00 | 0.58 | -1.10 | -0.06 | 1.21 | 0.59 | -0.84 | 1.03 | 0.53 | -0.97 | -0.58 | -1.0 |
| -0.67 | 0.03 | 0.05 | 0.49 | 0.77 | 0.45 | -0.78 | 0.08 | 0.08 | 0.71 | 1.33 | -0.73 | 1.08 | -0.19 | 0.09 | 0.76 | 0.92 | 0.46 | 0.80 | 0.39 | 0.83 | -1.15 | -0.12 | 0.14 | 0.31 | -0.81 | 0.27 | -0.02 | -0.62 | -1.00 | 0.58 | 0.00 | 0.14 | -1.24 | 0.41 | -0.38 | 0.45 | 0.32 | -0.71 | -0.55 | -0.46 | -0.35 |
| 0.43 | 0.03 | -0.52 | 0.30 | 1.01 | 0.75 | -1.51 | 0.79 | 0.16 | 0.54 | 0.44 | -0.02 | 0.86 | -0.65 | -0.95 | -0.01 | 0.58 | -0.74 | -0.44 | 0.70 | -0.89 | 0.25 | 0.77 | -0.60 | 0.87 | 0.02 | -0.31 | -0.07 | -0.35 | 0.39 | -1.10 | 0.14 | 0.00 | 1.33 | -0.26 | 0.86 | 0.91 | -0.46 | -0.51 | 0.08 | -0.72 | -0.12 |
| 0.13 | -1.17 | 0.60 | 0.43 | -0.17 | 0.27 | 0.17 | -0.33 | -0.50 | 0.82 | -1.05 | 0.35 | -0.16 | 1.01 | -0.04 | 0.41 | 0.09 | -0.11 | 0.37 | -0.14 | 1.02 | 0.22 | 0.14 | -0.68 | 0.59 | -0.09 | 0.30 | 0.75 | 0.43 | 0.20 | -0.06 | -1.24 | 1.33 | 0.00 | -0.17 | 0.70 | 0.49 | 0.59 | 0.42 | 1.00 | 0.47 | -0.49 |
| 0.27 | 0.16 | 0.35 | 0.00 | 0.55 | 0.65 | 0.41 | -0.50 | 0.29 | 0.40 | -0.47 | 1.02 | -0.39 | 0.93 | -0.22 | 0.23 | 0.40 | 0.06 | 0.49 | 0.79 | 1.41 | 1.09 | -0.41 | -0.71 | 0.02 | 0.19 | 0.14 | -0.03 | -0.61 | 0.90 | 1.21 | 0.41 | -0.26 | -0.17 | 0.00 | -0.16 | 0.27 | 0.08 | -1.15 | -0.26 | 0.19 | -0.10 |
| 0.47 | 0.54 | 1.15 | 1.18 | 0.00 | 0.60 | 0.59 | -0.08 | -1.26 | 0.01 | 1.41 | -0.93 | -0.53 | -0.73 | 0.32 | -0.63 | 1.05 | 0.18 | -0.12 | -0.16 | 0.45 | -0.72 | -0.32 | 1.27 | -1.14 | -1.20 | -0.18 | 0.53 | 0.58 | -0.14 | 0.59 | -0.38 | 0.86 | 0.70 | -0.16 | 0.00 | -0.68 | 0.24 | 0.02 | 0.80 | 0.46 | -0.07 |
| -1.05 | 0.49 | -0.70 | 0.47 | -0.61 | -0.16 | 0.60 | 0.28 | 0.54 | 0.92 | -0.05 | 0.82 | 0.43 | 0.23 | -1.13 | -0.24 | 0.26 | 1.01 | -0.75 | 0.71 | 0.35 | -0.04 | -0.75 | 0.93 | -0.15 | -0.41 | 0.89 | -1.01 | -0.01 | 0.97 | -0.84 | 0.45 | 0.91 | 0.49 | 0.27 | -0.68 | 0.00 | 0.85 | 1.57 | 0.24 | 0.48 | -0.07 |
| 0.44 | 1.86 | -0.08 | 0.11 | -0.43 | -0.17 | 0.54 | -0.04 | -0.53 | -0.96 | 0.78 | 0.79 | -0.60 | -0.50 | -0.59 | 0.56 | 0.28 | 1.42 | -0.23 | -0.30 | 0.14 | -1.04 | 0.10 | -0.35 | -0.12 | -0.12 | 0.71 | 0.23 | 0.07 | 0.43 | 1.03 | 0.32 | -0.46 | 0.59 | 0.08 | 0.24 | 0.85 | 0.00 | 0.41 | 1.08 | -0.42 | -0.13 |
| 0.30 | -0.24 | 0.44 | 0.21 | 0.73 | 0.03 | -0.77 | 0.57 | 1.10 | 0.87 | -0.36 | -0.41 | 0.55 | -0.33 | 0.18 | -0.41 | 0.20 | 0.07 | -0.32 | -0.38 | -0.18 | -0.54 | 0.52 | 1.06 | -0.02 | -0.22 | -0.20 | -0.38 | -0.46 | 0.26 | 0.53 | -0.71 | 0.51 | 0.42 | -1.15 | 0.02 | 1.57 | 0.41 | 0.00 | 0.28 | 0.86 | -0.00 |
| -0.05 | -0.62 | 0.23 | 0.49 | -0.52 | -0.34 | 0.28 | -0.04 | -0.03 | 1.23 | 0.01 | -0.98 | 0.26 | -0.74 | 0.78 | 0.09 | 0.36 | 0.47 | 0.67 | -0.18 | 0.24 | 0.64 | 0.26 | -0.21 | 0.52 | 0.44 | -0.34 | 0.85 | 1.43 | 0.47 | -0.97 | -0.55 | 0.08 | 1.00 | -0.26 | 0.80 | 0.24 | 1.08 | 0.28 | 0.00 | 0.48 | -0.97 |
| -0.60 | 0.32 | -0.10 | 0.55 | -0.22 | -0.09 | 0.62 | -0.37 | 0.12 | 0.43 | -0.08 | -1.01 | -0.00 | 0.32 | 0.36 | -0.84 | 0.25 | -0.63 | 0.25 | 0.22 | -0.47 | 0.15 | 0.64 | 0.97 | -0.20 | 1.62 | -0.46 | 0.92 | -0.19 | -1.39 | -0.58 | -0.46 | -0.72 | 0.47 | 0.19 | 0.46 | 0.48 | -0.42 | 0.86 | 0.48 | 0.00 | 1.06 |
| -0.27 | 0.09 | -0.44 | 1.25 | 0.46 | 0.67 | 0.07 | -0.35 | 0.57 | 0.92 | 0.31 | -0.15 | -0.14 | 0.25 | 0.77 | 1.08 | 0.01 | -0.20 | -1.07 | -0.39 | 0.33 | -0.59 | 0.33 | -0.53 | 0.20 | 0.88 | 0.07 | -0.31 | 0.63 | -0.05 | -1.0 | -0.35 | -0.12 | -0.49 | -0.10 | -0.07 | -0.07 | -0.13 | -0.00 | -0.97 | 1.06 | 0.00 |

EXHIBIT E

I. Examplar Patterns

```
<examplar 1>
.XXXXX.
XX...XX
XX..XXX
XX.XXXX
XXXX.XX
XXX..XX
.XXXXX.

<examplar 2>
..XX...
.XXX...
..XX...
..XX...
..XX...
..XX...
XXXXXX.

<examplar 3>
.XXXX..
XX..XX.
....XX.
..XXX..
.XX....
XX..XX.
XXXXXX.

<examplar 4>
.XXXX..
XX..XX.
....XX.
..XXX..
....XX.
XX..XX.
.XXXX..

<examplar 5>
...XXX.
..XXXX.
.XX.XX.
XX..XX.
XXXXXXX
....XX.
...XXXX

<examplar 6>
XXXXXX.
XX.....
XXXXX..
....XX.
....XX.
XX..XX.
.XXXX..

<examplar 7>
..XXX..
.XX....
XX.....
XXXXX..
XX..XX.
XX..XX.
.XXXX..

<examplar 8>
XXXXXX.
XX..XX.
....XX.
...XX..
..XX...
..XX...
..XX...
```

```
<examplar 9>
.XXXX..
XX..XX.
XX..XX.
.XXXX..
XX..XX.
XX..XX.
.XXXX..

<examplar 10>
.XXXX..
XX..XX.
XX..XX.
.XXXXX.
....XX.
...XX..
.XXX...

<examplar 11>
..XX...
.XXXX..
XX..XX.
XX..XX.
XXXXXX.
XX..XX.
XX..XX.

<examplar 12>
XXXXXX.
.XX..XX
.XX..XX
.XXXXX.
.XX..XX
.XX..XX
XXXXXX.

<examplar 13>
..XXXX.
.XX..XX
XX.....
XX.....
XX.....
.XX..XX
..XXXX.

<examplar 14>
XXXXX..
.XX.XX.
.XX..XX
.XX..XX
.XX..XX
.XX.XX.
XXXXX..

<examplar 15>
XXXXXXX
.XX...X
.XX.X..
.XXXX..
.XX.X..
.XX...X
XXXXXXX

<examplar 16>
XXXXXXX
.XX...X
.XX.X..
.XXXX..
.XX.X..
.XX....
XXXX...
```

```
<examplar 17>
..XXXX.
.XX..XX
XX.....
XX.....
XX..XXX
.XX..XX
..XXXXX

<examplar 18>
XX..XX.
XX..XX.
XX..XX.
XXXXXX.
XX..XX.
XX..XX.
XX..XX.

<examplar 19>
.XXXX..
..XX...
..XX...
..XX...
..XX...
..XX...
.XXXX..

<examplar 20>
...XXXX
....XX.
....XX.
....XX.
XX..XX.
XX..XX.
.XXXX..

<examplar 21>
XXX..XX
.XX..XX
.XX.XX.
.XXXX..
.XX.XX.
.XX..XX
XXX..XX

<examplar 22>
XXXX...
.XX....
.XX....
.XX....
.XX...X
.XX..XX
XXXXXXX

<examplar 23>
XX...XX
XXX.XXX
XXXXXXX
XXXXXXX
XX.X.XX
XX...XX
XX...XX

<examplar 24>
XX...XX
XXX..XX
XXXX.XX
XX.XXXX
XX..XXX
XX...XX
XX...XX
```

```
<examplar 25>
..XXX..
.XX.XX.
XX...XX
XX...XX
XX...XX
.XX.XX.
..XXX..

<examplar 26>
XXXXXX.
.XX..XX
.XX..XX
.XXXXX.
.XX....
.XX....
XXXX...

<examplar 27>
.XXXX..
XX..XX.
XX..XX.
XX..XX.
XX.XXX.
.XXXX..
...XXX.

<examplar 28>
XXXXXX.
.XX..XX
.XX..XX
.XXXXX.
.XX.XX.
.XX..XX
XXX..XX

<examplar 29>
.XXXX..
XX..XX.
XXX....
.XXX...
...XXX.
XX..XX.
.XXXX..

<examplar 30>
XXXXXX.
X.XX.X.
..XX...
..XX...
..XX...
..XX...
.XXXX..

<examplar 31>
XX..XX.
XX..XX.
XX..XX.
XX..XX.
XX..XX.
XX..XX.
XXXXXX.

<examplar 32>
XX..XX.
XX..XX.
XX..XX.
XX..XX.
XX..XX.
.XXXX..
..XX...
```

```
<examplar 33>
XX...XX
XX...XX
XX...XX
XX.X.XX
XXXXXXX
XXX.XXX
XX...XX

<examplar 34>
XX...XX
XX...XX
.XX.XX.
..XXX..
..XXX..
.XX.XX.
XX...XX

<examplar 35>
XX..XX.
XX..XX.
XX..XX.
.XXXX..
..XX...
..XX...
.XXXX..

<examplar 36>
XXXXXXX
XX...XX
X...XX.
...XX..
..XX..X
.XX..XX
XXXXXXX

<examplar 37>
.......
.......
.XXXX..
....XX.
.XXXXX.
XX..XX.
.XXX.XX

<examplar 38>
XXX....
.XX....
.XX....
.XXXXX.
.XX..XX
.XX..XX
XX.XXX.

<examplar 39>
.......
.......
.XXXX..
XX..XX.
XX.....
XX..XX.
.XXXX..

<examplar 40>
...XXX.
....XX.
....XX.
.XXXXX.
XX..XX.
XX..XX.
.XXX.XX
```

```
<examplar 41>
.......
.......
.XXXX..
XX..XX.
XXXXXX.
XX.....
.XXXX..

<examplar 42>
..XXX..
.XX.XX.
.XX....
XXXX...
.XX....
.XX....
XXXX...

<examplar 43>
.......
.XXX.XX
XX..XX.
XX..XX.
.XXXXX.
....XX.
XXXXX..

<examplar 44>
XXX....
.XX....
.XX.XX.
.XXX.XX
.XX..XX
.XX..XX
XXX..XX

<examplar 45>
..XX...
.......
.XXX...
..XX...
..XX...
..XX...
.XXXX..

<examplar 46>
....XX.
.......
....XX.
....XX.
XX..XX.
XX..XX.
.XXXX..

<examplar 47>
XXX....
.XX....
.XX..XX
.XX.XX.
.XXXX..
.XX.XX.
XXX..XX

<examplar 48>
.XXX...
..XX...
..XX...
..XX...
..XX...
..XX...
..XX...
```

```
<exemplar 49>
.......
.......
XX..XX.
XXXXXXX
XXXXXXX
XX.X.XX
XX...XX

<exemplar 50>
.......
.......
XXXXX..
XX..XX.
XX..XX.
XX..XX.
XX..XX.

<exemplar 51>
.......
.......
.XXXX..
XX..XX.
XX..XX.
XX..XX.
.XXXX..

<exemplar 52>
.......
XX.XXX.
.XX..XX
.XX..XX
.XXXXX.
.XX....
XXXX...

<exemplar 53>
.......
.XXX.XX
XX..XX.
XX..XX.
.XXXXX.
....XX.
...XXXX

<exemplar 54>
.......
.......
XX.XXX.
.XXX.XX
.XX..XX
.XX....
XXXX...

<exemplar 55>
.......
.......
.XXXXX.
XX.....
.XXXX..
....XX.
XXXXX..

<exemplar 56>
...X...
..XX...
.XXXXX.
..XX...
..XX...
..XX.X.
...XX..
```

```
<examplar 57>
.......
.......
XX..XX.
XX..XX.
XX..XX.
XX..XX.
.XXX.XX

<examplar 58>
.......
.......
XX..XX.
XX..XX.
XX..XX.
.XXXX..
..XX...

<examplar 59>
.......
.......
XX...XX
XX.X.XX
XXXXXXX
XXXXXXX
.XX.XX.

<examplar 60>
.......
.......
XX...XX
.XX.XX.
..XXX..
.XX.XX.
XX...XX

<examplar 61>
.......
XX..XX.
XX..XX.
XX..XX.
.XXXXX.
....XX.
XXXXX..

<examplar 62>
.......
.......
XXXXXX.
X..XX..
..XX...
.XX..X.
XXXXXX.

<examplar 63>
..XX...
.XXXX..
.XXXX..
..XX...
..XX...
.......
..XX...

<examplar 64>
.XX.XX.
.XX.XX.
.XX.XX.
.......
.......
.......
.......
```

```
<examplar 65>
.XX.XX.
.XX.XX.
XXXXXXX
.XX.XX.
XXXXXXX
.XX.XX.
.XX.XX.

<examplar 66>
..XX...
.XXXXX.
XX.....
.XXXX..
....XX.
XXXXX..
..XX...

<examplar 67>
.......
XX...XX
XX..XX.
...XX..
..XX...
.XX..XX
XX...XX

<examplar 68>
..XXX..
.XX.XX.
..XXX..
.XXX.XX
XX.XXX.
XX..XX.
.XXX.XX

<examplar 69>
.XX....
.XX....
XX.....
.......
.......
.......
.......

<examplar 70>
...XX..
..XX...
.XX....
.XX....
.XX....
..XX...
...XX..

<examplar 71>
.XX....
..XX...
...XX..
...XX..
...XX..
..XX...
.XX....

<examplar 72>
.......
.XX..XX
..XXXX.
XXXXXXX
..XXXX.
.XX..XX
.......
```

```
<examplar 73>
.......
..XX...
..XX...
XXXXXX.
..XX...
..XX...
.......

<examplar 74>
.......
.......
.......
.......
..XX...
..XX...
.XX....

<examplar 75>
.......
.......
.......
XXXXXX.
.......
.......
.......

<examplar 76>
.......
.......
.......
.......
.......
..XX...
..XX...

<examplar 77>
.....XX
....XX.
...XX..
..XX...
.XX....
XX.....
X......

<examplar 78>
.......
..XX...
..XX...
.......
.......
..XX...
..XX...

<examplar 79>
..XX...
..XX...
.......
.......
..XX...
..XX...
.XX....

<examplar 80>
...XX..
..XX...
.XX....
XX.....
.XX....
..XX...
...XX..
```

```
<examplar 81>
.......
.......
XXXXXX.
.......
.......
XXXXXX.
.......

<examplar 82>
.XX....
..XX...
...XX..
....XX.
...XX..
..XX...
.XX....

<examplar 83>
.XXXX..
XX..XX.
....XX.
...XX..
..XX...
.......
..XX...

<examplar 84>
.XXXXX.
XX...XX
XX.XXXX
XX.XXXX
XX.XXXX
XX.....
.XXXX..

<examplar 85>
.XXXX..
.XX....
.XX....
.XX....
.XX....
.XX....
.XXXX..

<examplar 86>
XX.....
.XX....
..XX...
...XX..
....XX.
.....XX
......X

<examplar 87>
.XXXX..
...XX..
...XX..
...XX..
...XX..
...XX..
.XXXX..

<examplar 88>
...X...
..XXX..
.XX.XX.
XX...XX
.......
.......
.......
```

```
<examplar 89>
.......
.......
.......
.......
.......
.......
XXXXXXX

<examplar 90>
..XX...
..XX...
...XX..
.......
.......
.......
.......

<examplar 91>
...XXX.
..XX...
..XX...
XXX....
..XX...
..XX...
...XXX.

<examplar 92>
...XX..
...XX..
...XX..
.......
...XX..
...XX..
...XX..

<examplar 93>
XXX....
..XX...
..XX...
...XXX.
..XX...
..XX...
XXX....
```

II. Memory Capacity

```
<examplar 1> ( O : Hebb; X : Iter )
.OOOOO.  OOOOOOO  OOOOOOO  OO..OOO  OO..OOO  OO..OOO
OO...OO  OO..OOO  OO..OOO  OO..OOO  OO..OOO  OO..OOO
OO..OOO  OO..OOO  OO..OOO  OO..OOO  OO..OOO  OO..OOO
OO.OOOO  OOOOOOO  OOOOOOO  OOOOOOO  OO.OOOO  OO.OOOO
OOOO.OO  OO..OOO  OO..OOO  OO..OOO  OO..OOO  OO..OOO
OOO..OO  OO..OOO  OO..OOO  OO..OOO  OO..OOO  OO..OOO
.OOOOO.  OOOOOOO  OO..OOO  OO..OOO  OO..OOO  OO..OOO

.XXXXX.  .XXXXX.
XX...XX  XX...XX
XX..XXX  XX..XXX
XX.XXXX  XX.XXXX
XXXX.XX  XXXX.XX
XXX..XX  XXX..XX
.XXXXX.  .XXXXX.
```

```
<examplar 2> ( O : Hebb; X : Iter )
..OO...  ..OO...  ..OO...  ..OO...
.OOO...  ..OO...  ..OO...  ..OO...
..OO...  ..OO...  ..OO...  ..OO...
..OO...  ..OO...  ..O....  ..O....
..OO...  ..OO...  ..OO...  ..OO...
..OO...  ..OO...  ..OO...  ..OO...
OOOOOO.  ..OO...  ..OO...  ..OO...

..XX...  ..XX...
.XXX...  .XXX...
..XX...  ..XX...
..XX...  ..XX...
..XX...  ..XX...
..XX...  ..XX...
XXXXXX.  XXXXXX.

<examplar 3> ( O : Hebb; X : Iter )
.OOOO..  .OOOO..  .OOOO..  .OOOO..  ..OOO..  ...OO..  ....O..  ....O..
OO..OO.  .O..OO.  .O..OO.  .O..OO.  .O..OO.  .O..OO.  .O..OO.  .O..OO.
....OO.  .O..OO.  .O..OO.  OO..OO.  OO..OO.  OO..OO.  OO..OO.  OO..OO.
..OOO..  .OOOO..  .OOOOO.  .OO.OO.  OO..OO.  OO..OO.  OO..OO.  OO..OO.
.OO....  .OO.OO.  .O..OO.  .O..OO.  OO..OO.  OO..OO.  OO..OO.  OO..OO.
OO..OO.  .O..OO.  .O..OO.  OO..OO.  OO..OO.  OO..OO.  OO..OO.  OO..OO.
OOOOOO.  .OOOO..  .OOOO..  .OOOO..  .OOOO..  .OOOO..  .OOOO..  .OOOO..

.XXXX..  .XXXX..
XX..XX.  XX..XX.
....XX.  ....XX.
..XXX..  ..XXX..
.XX....  .XX....
XX..XX.  XX..XX.
XXXXXX.  XXXXXX.

<examplar 4> ( O : Hebb; X : Iter )
.OOOO..  .OOOO..  .OOOO..  .OOOO..  ...OOO.  ....OO.  ....O..  ....O..  ....O..  ....O..
OO..OO.  .O..OO.  OO..OO.  OO..OO.  OO..OO.  OO..OO.  OO..OO.  .O..OO.  .O..OO.  .O..OO.
....OO.  OO..OO.  OO..OO.  OO..OO.  OO..OO.  OO..OO.  OO..OO.  OO..OO.  OO..OO.  OO..OO.
..OOO..  .O.OO..  .O..OO.  OO..OO.  OO..OO.  OO..OO.  OO..OO.  OO..OO.  OO..OO.  OO..OO.
....OO.  .O..OO.  OO..OO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.  OO..OO.  OO..OO.
.OOOO..  .OOOO..  .OOOO..  .OOOO..  .OOOOO.  .OOOOO.  .OOOOO.  .OOOOO.  .OOOO..  .OOOO..

.XXXX..  .XXXX..
XX..XX.  XX..XX.
....XX.  ....XX.
..XXX..  ..XXX..
....XX.  ....XX.
XX..XX.  XX..XX.
.XXXX..  .XXXX..

<examplar 5> ( O : Hebb; X : Iter )
...OOO.  ....O..  ....O..  ....O..
..OOOO.  .O..OO.  .O..OO.  .O..OO.
.OO.OO.  OO..OO.  OO..OO.  OO..OO.
OO..OO.  OO..OO.  OO..OO.  OO..OO.
OOOOOOO  OO..OO.  OO..OO.  OO..OO.
....OO.  OO..OO.  OO..OO.  OO..OO.
...OOOO  .OOOOO.  .OOOO..  .OOOO..

...XXX.  ...XXX.
..XXXX.  ..XXXX.
.XX.XX.  .XX.XX.
XX..XX.  XX..XX.
XXXXXXX  XXXXXXX
....XX.  ....XX.
...XXXX  ...XXXX
```

```
<examplar 6> ( O : Hebb; X : Iter )
OOOOOO.  .OOOO..  ..OOO..  ...OO..  ....O..  ....O..
OO.....  .O..OO.  .O..OO.  .O..OO.  .O..OO.  .O..OO.
OOOOO..  .O..OO.  OO..OO.  OO..OO.  OO..OO.  OO..OO.
....OO.  .O..OO.  OO..OO.  OO..OO.  OO..OO.  OO..OO.
....OO.  OO..OO.  OO..OO.  OO..OO.  OO..OO.  OO..OO.
OO..OO.  OO..OO.  OO..OO.  OO..OO.  OO..OO.  OO..OO.
.OOOO..  .OOOO..  .OOOO..  .OOOO..  .OOOO..  .OOOO..

XXXXXX.  XXXXXX.
XX.....  XX.....
XXXXX..  XXXXX..
....XX.  ....XX.
....XX.  ....XX.
XX..XX.  XX..XX.
.XXXX..  .XXXX..

<examplar 7> ( O : Hebb; X : Iter )
..OOO..  ..OOO..  ...OO..  ....O..  ....O..
.OO....  .O...O.  .O..OO.  .O..OO.  .O..OO.
OO.....  OO..OO.  OO..OO.  OO..OO.  OO..OO.
OOOOO..  .O..OO.  OO..OO.  OO..OO.  OO..OO.
OO..OO.  OO..OO.  OO..OO.  OO..OO.  OO..OO.
OO..OO.  OO..OO.  OO..OO.  OO..OO.  OO..OO.
.OOOO..  .OOOO..  .OOOO..  .OOOO..  .OOOO..

..XXX..  ..XXX..
.XX....  .XX....
XX.....  XX.....
XXXXX..  XXXXX..
XX..XX.  XX..XX.
XX..XX.  XX..XX.
.XXXX..  .XXXX..

<examplar 8> ( O : Hebb; X : Iter )
OOOOOO.  .OOOO..  ..OOO..  ..OO...  ..OO...  ..OO...
OO..OO.  .OOOOO.  ..OO...  ..OO...  ..OO...  ..OO...
....OO.  ....O..  ..OO...  ..OO...  ..OO...  ..OO...
...OO..  ..OO...  ..OO...  ..OO...  ..O....  ..O....
..OO...  ..OO...  ..OO...  ..OO...  ..OO...  ..OO...
..OO...  ..OO...  ..OO...  ..OO...  ..OO...  ..OO...
..OO...  .OOO...  ..OO...  ..OO...  ..OO...  ..OO...

XXXXXX.  XXXXXX.
XX..XX.  XX..XX.
....XX.  ....XX.
...XX..  ...XX..
..XX...  ..XX...
..XX...  ..XX...
..XX...  ..XX...

<examplar 9> ( O : Hebb; X : Iter )
.OOOO..  .OOOOO.  .OOOOO.  .O.OOO.  ....OO.  ....O..  ....O..  ....O..  ....O..
OO..OO.  OO..OO.  OO..OO.  OO..OO.  OO..OO.  OO..OO.  .O..OO.  .O..OO.  .O..OO.
OO..OO.  OO..OO.  OO..OO.  OO..OO.  OO..OO.  OO..OO.  OO..OO.  OO..OO.  OO..OO.
.OOOO..  OO.OOO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.  OO..OO.
.OOOO..  .OOOO..  .OOOOO.  .OOOOO.  .OOOOO.  .OOOOO.  .OOOOO.  .OOOO..  .OOOO..

.XXXX..  .XXXX..
XX..XX.  XX..XX.
XX..XX.  XX..XX.
.XXXX..  .XXXX..
XX..XX.  XX..XX.
XX..XX.  XX..XX.
.XXXX..  .XXXX..
```

```
<examplar 10> ( O : Hebb; X : Iter )
.OOOO..  .OOOO..  .OOOO..  ..OOO..  ...OO..  ....O..  ....O..
OO..OO.  .O..OO.  .O..OO.  .O..OO.  .O..OO.  .O..OO.  .O..OO.
OO..OO.  .O..OO.  .O..OO.  OO..OO.  OO..OO.  OO..OO.  OO..OO.
.OOOOO.  .O.OO..  .OO.OO.  .O..OO.  OO..OO.  OO..OO.  OO..OO.
....OO.  .O..OO.  .O..OO.  OO..OO.  OO..OO.  OO..OO.  OO..OO.
...OO..  .O..O..  .O..OO.  OO..OO.  OO..OO.  OO..OO.  OO..OO.
.OOO...  .OOOO..  .OOOO..  .OOOO..  .OOOO..  .OOOO..  .OOOO..

.XXXX..  .XXXX..
XX..XX.  XX..XX.
XX..XX.  XX..XX.
.XXXXX.  .XXXXX.
....XX.  ....XX.
...XX..  ...XX..
.XXX...  .XXX...

<examplar 11> ( O : Hebb; X : Iter )
..OO...  .......  ....O..  ....O..  ....O..
.OOOO..  .O...O.  .O..OO.  .O..OO.  .O..OO.
OO..OO.  OO..OO.  OO..OO.  OO..OO.  OO..OO.
OO..OO.  OO..OO.  OO..OO.  OO..OO.  OO..OO.
OOOOOO.  OO..OO.  OO..OO.  OO..OO.  OO..OO.
OO..OO.  OO..OO.  OO..OO.  OO..OO.  OO..OO.
OO..OO.  .OOOOO.  .OOOOO.  .OOOO..  .OOOO..

..XX...  ..XX...
.XXXX..  .XXXX..
XX..XX.  XX..XX.
XX..XX.  XX..XX.
XXXXXX.  XXXXXX.
XX..XX.  XX..XX.
XX..XX.  XX..XX.

<examplar 12> ( O : Hebb; X : Iter )
OOOOOO.  OOOOOO.  OOOOOOO  OOOOOOO  OO..OOO  OO..OOO  OO..OOO
.OO..OO  OOO..OO  OOO.OOO  OO..OOO  OO..OOO  OO..OOO  OO..OOO
.OO..OO  OOO..OO  OOO..OO  OO..OOO  OO..OOO  OO..OOO  OO..OOO
.OOOOO.  .OOOOO.  OOOOOOO  OOOOOOO  OOOOOOO  OO.OOOO  OO.OOOO
.OO..OO  .OO.OOO  OOO.OOO  OOO.OOO  OO..OOO  OO..OOO  OO..OOO
.OO..OO  .OO..OO  OOO.OOO  OO..OOO  OO..OOO  OO..OOO  OO..OOO
OOOOOO.  OOOOOOO  OOOOOOO  OO..OOO  OO..OOO  OO..OOO  OO..OOO

XXXXXX.  XXXXXX.
.XX..XX  .XX..XX
.XX..XX  .XX..XX
.XXXXX.  .XXXXX.
.XX..XX  .XX..XX
.XX..XX  .XX..XX
XXXXXX.  XXXXXX.

<examplar 13> ( O : Hebb; X : Iter )
..OOOO.  ..OOO..  ..OOO..  ..OO...  ..OO...  ..OO...  ..OO...
.OO..OO  .OO..O.  .OO....  ..O....  ..OO...  ..OO...  ..OO...
OO.....  .O.....  .OO....  .OO....  ..OO...  ..OO...  ..OO...
OO.....  OO.....  .OO....  .OO....  ..O....  ..O....  ..O....
OO.....  .OO..O.  .OO....  ..O....  ..O....  ..OO...  ..OO...
.OO..OO  .OO..O.  .OO....  ..O....  ..OO...  ..OO...  ..OO...
..OOOO.  .OOOO..  .OOOO..  .OOOO..  ..OO...  ..OO...  ..OO...

..XXXX.  ..XXXX.
.XX..XX  .XX..XX
XX.....  XX.....
XX.....  XX.....
XX.....  XX.....
.XX..XX  .XX..XX
..XXXX.  ..XXXX.
```

```
<examplar 14> ( O : Hebb; X : Iter )
00000..  000000.  00000..  .0000..  .0000..  .0000..
.00.00.  .00.00.  .00..0.  .00..0.  .00..0.  .00..0.
.00..00  .00..0.  .00.00.  .00.00.  .00.00.  .00.00.
.00..00  .00000.  .00000.  .00000.  .00000.  .00000.
.00..00  .00.00.  .00.00.  .00.00.  .00.00.  .00.00.
.00.00.  .00..0.  .00.00.  .00.00.  .00.00.  .00.00.
00000..  000000.  000000.  000000.  .0000..  .0000..

XXXXX..  XXXXX..
.XX.XX.  .XX.XX.
.XX..XX  .XX..XX
.XX..XX  .XX..XX
.XX..XX  .XX..XX
.XX.XX.  .XX.XX.
XXXXX..  XXXXX..

<examplar 15> ( O : Hebb; X : Iter )
0000000  000000.  000000.  .0000..  .0000..  .0000..  ..000..  ..00...  ..00...
.00...0  .00..00  .00..0.  .00..0.  .00....  .00....  ..0....  ..00...  ..00...
.00.0..  .00..0.  .00..0.  .00.00.  .00....  .00....  .00....  ..00...  ..00...
.0000..  .0000..  .0000..  .0000..  .0000..  .000...  ..00...  ..0....  ..0....
.00.0..  .00....  .00..0.  .00....  .00....  ..0....  ..0....  ..00...  ..00...
.00...0  .00..00  .00..0.  .00..0.  .00....  ..0....  ..00...  ..00...  ..00...
0000000  000000.  000000.  00000..  .0000..  .0000..  .0000..  ..00...  ..00...

XXXXXXX  XXXXXXX
.XX...X  .XX...X
.XX.X..  .XX.X..
.XXXX..  .XXXX..
.XX.X..  .XX.X..
.XX...X  .XX...X
XXXXXXX  XXXXXXX

<examplar 16> ( O : Hebb; X : Iter )
0000000  00000..  .0000..  ..000..  ..00...  ..00...  ..00...
.00...0  .00..0.  .00....  .00....  ..0....  ..00...  ..00...
.00.0..  .00....  .00....  .00....  .00....  ..00...  ..00...
.0000..  .0000..  .000...  .000...  ..00...  ..0....  ..0....
.00.0..  .00....  .00....  ..0....  ..0....  ..00...  ..00...
.00....  .00....  .00....  ..0....  ..00...  ..00...  ..00...
0000...  00000..  .0000..  .0000..  .0000..  ..00...  ..00...

XXXXXXX  XXXXXXX
.XX...X  .XX...X
.XX.X..  .XX.X..
.XXXX..  .XXXX..
.XX.X..  .XX.X..
.XX....  .XX....
XXXX...  XXXX...

<examplar 17> ( O : Hebb; X : Iter )
..0000.  .00000.  000000.  00..000  00..000  00..000
.00..00  .00..00  00..000  00..000  00..000  00..000
00.....  00...00  00..000  00..000  00..000  00..000
00.....  00..00.  00..000  00.0000  00.0000  00.0000
00..000  00..000  00..000  00..000  00..000  00..000
.00..00  000.000  00..000  00..000  00..000  00..000
..00000  .00000.  0000000  0000000  00..000  00..000

..XXXX.  ..XXXX.
.XX..XX  .XX..XX
XX.....  XX.....
XX.....  XX.....
XX..XXX  XX..XXX
.XX..XX  .XX..XX
..XXXXX  ..XXXXX
```

```
<examplar 18> ( O : Hebb; X : Iter )
OO..OO.  OO..OOO  OO..OOO  OO..OOO
OO..OO.  OO..OOO  OO..OOO  OO..OOO
OO..OO.  OO..OOO  OO..OOO  OO..OOO
OOOOOO.  OO..OOO  OO.OOOO  OO.OOOO
OO..OO.  OO..OOO  OO..OOO  OO..OOO
OO..OO.  OO..OOO  OO..OOO  OO..OOO
OO..OO.  OOOOOOO  OO..OOO  OO..OOO

XX..XX.  XX..XX.
XX..XX.  XX..XX.
XX..XX.  XX..XX.
XXXXXX.  XXXXXX.
XX..XX.  XX..XX.
XX..XX.  XX..XX.
XX..XX.  XX..XX.

<examplar 19> ( O : Hebb; X : Iter )
.OOOO..  ..OO...  ..OO...  ..OO...
..OO...  ..OO...  ..OO...  ..OO...
..OO...  ..OO...  ..OO...  ..OO...
..OO...  ..OO...  ..O....  ..O....
..OO...  ..OO...  ..OO...  ..OO...
..OO...  ..OO...  ..OO...  ..OO...
.OOOO..  ..OO...  ..OO...  ..OO...

.XXXX..  .XXXX..
..XX...  ..XX...
..XX...  ..XX...
..XX...  ..XX...
..XX...  ..XX...
..XX...  ..XX...
.XXXX..  .XXXX..

<examplar 20> ( O : Hebb; X : Iter )
...OOOO  ....O..  ....O..  ....O..  ....O..
....OO.  OO..OO.  .O..OO.  .O..OO.  .O..OO.
....OO.  OO..OO.  OO..OO.  OO..OO.  OO..OO.
....OO.  OO..OO.  OO..OO.  OO..OO.  OO..OO.
OO..OO.  OO..OO.  OO..OO.  OO..OO.  OO..OO.
OO..OO.  OO..OO.  OO..OO.  OO..OO.  OO..OO.
.OOOO..  .OOOO..  .OOOOO.  .OOOO..  .OOOO..

...XXXX  ...XXXX
....XX.  ....XX.
....XX.  ....XX.
....XX.  ....XX.
XX..XX.  XX..XX.
XX..XX.  XX..XX.
.XXXX..  .XXXX..

<examplar 21> ( O : Hebb; X : Iter )
OOO..OO  OOO.OO.  OOO.OOO  OOOOOOO  OO..OOO  OO..OOO  OO..OOO
.OO..OO  OOO..OO  OOO.OOO  OO..OOO  OO..OOO  OO..OOO  OO..OOO
.OO.OO.  OOO.OOO  OOO.OOO  OO..OOO  OO..OOO  OO..OOO  OO..OOO
.OOOO..  .OOOOO.  OOOOOOO  OOOOOOO  OOOOOOO  OO.OOOO  OO.OOOO
.OO.OO.  .OO.OOO  OOO.OOO  OO..OOO  OO..OOO  OO..OOO  OO..OOO
.OO..OO  .OO..OO  OOO.OOO  OO..OOO  OO..OOO  OO..OOO  OO..OOO
OOO..OO  OOO..OO  OOO.OOO  OO..OOO  OO..OOO  OO..OOO  OO..OOO

XXX..XX  XXX..XX
.XX..XX  .XX..XX
.XX.XX.  .XX.XX.
.XXXX..  .XXXX..
.XX.XX.  .XX.XX.
.XX..XX  .XX..XX
XXX..XX  XXX..XX
```

```
<examplar 22> ( O : Hebb; X : Iter )
OOOO...  .OOOO..  .OOOO..  ..OOO..  ..OO...  ..OO...  ..OO...
.OO....  .OO....  .OO....  .OO....  ..O....  ..OO...  ..OO...
.OO....  .OO....  .OO....  .OO....  .OO....  ..OO...  ..OO...
.OO....  .OOO...  .OOO...  .OOO...  ..OO...  ..O....  ..O....
.OO...O  .OO....  .OO....  ..O....  ..O....  ..OO...  ..OO...
.OO..OO  .OO..O.  .OO....  ..O....  ..OO...  ..OO...  ..OO...
OOOOOOO  OOOOOO.  .OOOO..  .OOOO..  .OOOO..  ..OO...  ..OO...

XXXX...  XXXX...
.XX....  .XX....
.XX....  .XX....
.XX....  .XX....
.XX...X  .XX...X
.XX..XX  .XX..XX
XXXXXXX  XXXXXXX

<examplar 23> ( O : Hebb; X : Iter )
OO...OO  OO..OOO  OO..OOO  OO..OOO  OO..OOO
OOO.OOO  OO..OOO  OO..OOO  OO..OOO  OO..OOO
OOOOOOO  OO..OOO  OO..OOO  OO..OOO  OO..OOO
OOOOOOO  OOOOOOO  OOOOOOO  OO.OOOO  OO.OOOO
OO.O.OO  OOO.OOO  OO..OOO  OO..OOO  OO..OOO
OO...OO  OO..OOO  OO..OOO  OO..OOO  OO..OOO
OO...OO  OO...OO  OO..OOO  OO..OOO  OO..OOO

XX...XX  XX...XX
XXX.XXX  XXX.XXX
XXXXXXX  XXXXXXX
XXXXXXX  XXXXXXX
XX.X.XX  XX.X.XX
XX...XX  XX...XX
XX...XX  XX...XX

<examplar 24> ( O : Hebb; X : Iter )
OO...OO  OO..OOO  OO..OOO  OO..OOO  OO..OOO
OOO..OO  OO..OOO  OO..OOO  OO..OOO  OO..OOO
OOOO.OO  OO..OOO  OO..OOO  OO..OOO  OO..OOO
OO.OOOO  OOOOOOO  OOOOOOO  OO.OOOO  OO.OOOO
OO..OOO  OO..OOO  OO..OOO  OO..OOO  OO..OOO
OO...OO  OO..OOO  OO..OOO  OO..OOO  OO..OOO
OO...OO  OO...OO  OO..OOO  OO..OOO  OO..OOO

XX...XX  XX...XX
XXX..XX  XXX..XX
XXXX.XX  XXXX.XX
XX.XXXX  XX.XXXX
XX..XXX  XX..XXX
XX...XX  XX...XX
XX...XX  XX...XX

<examplar 25> ( O : Hebb; X : Iter )
..OOO..  ..OOO..  ....O..  ....O..  ....O..  ....O..
.OO.OO.  .O..OO.  OO..OO.  .O..OO.  .O..OO.  .O..OO.
OO...OO  OO..OO.  OO..OO.  OO..OO.  OO..OO.  OO..OO.
OO...OO  OO..OO.  OO..OO.  OO..OO.  OO..OO.  OO..OO.
OO...OO  OO..OO.  OO..OO.  OO..OO.  OO..OO.  OO..OO.
.OO.OO.  OO..OO.  OO..OO.  OO..OO.  OO..OO.  OO..OO.
..OOO..  .OOOOO.  .OOOO..  .OOOOO.  .OOOO..  .OOOO..

..XXX..  ..XXX..
.XX.XX.  .XX.XX.
XX...XX  XX...XX
XX...XX  XX...XX
XX...XX  XX...XX
.XX.XX.  .XX.XX.
..XXX..  ..XXX..
```

```
<examplar 26> ( O : Hebb; X : Iter )
OOOOOO.  OOOOO..  .OOOO..  .OOOO..  ..OOO..  ..OO...  ..OO...
.OO..OO  .OO..O.  .OO....  .OO....  ..O....  ..OO...  ..OO...
.OO..OO  .OO..O.  .OO....  .OO....  .OO....  ..OO...  ..OO...
.OOOOO.  .OOOO..  .OOOO..  .OOO...  ..OO...  ..O....  ..O....
.OO....  .OO....  .OO....  ..O....  ..O....  ..OO...  ..OO...
.OO....  .OO..O.  .OO....  ..O....  ..OO...  ..OO...  ..OO...
OOOO...  OOOOO..  .OOOO..  .OOOO..  .OOOO..  ..OO...  ..OO...

XXXXXX.  XXXXXX.
.XX..XX  .XX..XX
.XX..XX  .XX..XX
.XXXXX.  .XXXXX.
.XX....  .XX....
.XX....  .XX....
XXXX...  XXXX...

<examplar 27> ( O : Hebb; X : Iter )
.OOOO..  ...OOO.  ....O..  ....O..  ....O..  ....O..
OO..OO.  OO..OO.  OO..OO.  .O..OO.  .O..OO.  .O..OO.
OO..OO.  OO..OO.  OO..OO.  OO..OO.  OO..OO.  OO..OO.
OO..OO.  OO..OO.  OO..OO.  OO..OO.  OO..OO.  OO..OO.
OO.OOO.  OO..OO.  OO..OO.  OO..OO.  OO..OO.  OO..OO.
.OOOO..  OO..OO.  OO..OO.  OO..OO.  OO..OO.  OO..OO.
...OOO.  .OOOO..  .OOOOO.  .OOOOO.  .OOOO..  .OOOO..

.XXXX..  .XXXX..
XX..XX.  XX..XX.
XX..XX.  XX..XX.
XX..XX.  XX..XX.
XX.XXX.  XX.XXX.
.XXXX..  .XXXX..
...XXX.  ...XXX.

<examplar 28> ( O : Hebb; X : Iter )
OOOOOO.  OOOOOOO  OOOOOOO  OOOOOOO  OO..OOO  OO..OOO  OO..OOO
.OO..OO  OOO..OO  OOO.OOO  OO..OOO  OO..OOO  OO..OOO  OO..OOO
.OO..OO  OOO..OO  OOO..OO  OO..OOO  OO..OOO  OO..OOO  OO..OOO
.OOOOO.  .OOOOOO  OOOOOOO  OOOOOOO  OOOOOOO  OO.OOOO  OO.OOOO
.OO.OO.  .OO.OOO  OOO.OOO  OO..OOO  OO..OOO  OO..OOO  OO..OOO
.OO..OO  .OO..OO  OOO.OOO  OO..OOO  OO..OOO  OO..OOO  OO..OOO
OOO..OO  OOOOOOO  OOO.OOO  OO..OOO  OO..OOO  OO..OOO  OO..OOO

XXXXXX.  XXXXXX.
.XX..XX  .XX..XX
.XX..XX  .XX..XX
.XXXXX.  .XXXXX.
.XX.XX.  .XX.XX.
.XX..XX  .XX..XX
XXX..XX  XXX..XX

<examplar 29> ( O : Hebb; X : Iter )
.OOOO..  .OOOO..  .OOOO..  .OOOO..  ..OOO..  ...OO..  ....O..  ....O..
OO..OO.  .O..OO.  .O..OO.  .O..OO.  OO..OO.  .O..OO.  .O..OO.  .O..OO.
OOO....  .O..OO.  OO..OO.  OO..OO.  OO..OO.  OO..OO.  OO..OO.  OO..OO.
.OOO...  .OOOO..  .OOOOO.  .O..OO.  OO..OO.  OO..OO.  OO..OO.  OO..OO.
...OOO.  .O..OO.  .O..OO.  OO..OO.  OO..OO.  OO..OO.  OO..OO.  OO..OO.
OO..OO.  .O..OO.  .O..OO.  OO..OO.  OO..OO.  OO..OO.  OO..OO.  OO..OO.
.OOOO..  .OOOO..  .OOOO..  .OOOO..  .OOOO..  .OOOOO.  .OOOO..  .OOOO..

.XXXX..  .XXXX..
XX..XX.  XX..XX.
XXX....  XXX....
.XXX...  .XXX...
...XXX.  ...XXX.
XX..XX.  XX..XX.
.XXXX..  .XXXX..
```

```
<examplar 30> ( O : Hebb; X : Iter )
000000.  .0000..  ..00...  ..00...  ..00...
0.00.0.  ..00...  ..00...  ..00...  ..00...
..00...  ..00...  ..00...  ..00...  ..00...
..00...  ..00...  ..00...  ..0....  ..0....
..00...  ..00...  ..00...  ..00...  ..00...
..00...  ..00...  ..00...  ..00...  ..00...
.0000..  ..00...  ..00...  ..00...  ..00...

XXXXXX.  XXXXXX.
X.XX.X.  X.XX.X.
..XX...  ..XX...
..XX...  ..XX...
..XX...  ..XX...
..XX...  ..XX...
.XXXX..  .XXXX..

<examplar 31> ( O : Hebb; X : Iter )
00..00.  .0..00.  00..00.  00..000  00..000  00..000
00..00.  00..00.  00..000  00..000  00..000  00..000
00..00.  00..00.  00..000  00..000  00..000  00..000
00..00.  00..00.  00..000  00..000  00.0000  00.0000
00..00.  00..000  00..000  00..000  00..000  00..000
00..00.  00..00.  00..000  00..000  00..000  00..000
000000.  0000000  0000000  00..000  00..000  00..000

XX..XX.  XX..XX.
XX..XX.  XX..XX.
XX..XX.  XX..XX.
XX..XX.  XX..XX.
XX..XX.  XX..XX.
XX..XX.  XX..XX.
XXXXXX.  XXXXXX.

<examplar 32> ( O : Hebb; X : Iter )
00..00.  .0..00.  ....0..  ....0..  ....0..  ....0..
00..00.  00..00.  00..00.  .0..00.  .0..00.  .0..00.
00..00.  00..00.  00..00.  00..00.  00..00.  00..00.
00..00.  00..00.  00..00.  00..00.  00..00.  00..00.
00..00.  00..00.  00..00.  00..00.  00..00.  00..00.
.0000..  00..00.  00..00.  00..00.  00..00.  00..00.
..00...  .0000..  .00000.  .00000.  .0000..  .0000..

XX..XX.  XX..XX.
XX..XX.  XX..XX.
XX..XX.  XX..XX.
XX..XX.  XX..XX.
XX..XX.  XX..XX.
.XXXX..  .XXXX..
..XX...  ..XX...

<examplar 33> ( O : Hebb; X : Iter )
00...00  00..000  00..000  00..000
00...00  00..000  00..000  00..000
00...00  00..000  00..000  00..000
00.0.00  0000000  00.0000  00.0000
0000000  00..000  00..000  00..000
000.000  00..000  00..000  00..000
00...00  00..000  00..000  00..000

XX...XX  XX...XX
XX...XX  XX...XX
XX...XX  XX...XX
XX.X.XX  XX.X.XX
XXXXXXX  XXXXXXX
XXX.XXX  XXX.XXX
XX...XX  XX...XX
```

```
<examplar 34> ( O : Hebb; X : Iter )
OO...OO  OOO..OO  OOO.OOO  OOO.OOO  OO..OOO  OO..OOO  OO..OOO
OO...OO  OO...OO  OOO..OO  OO..OOO  OO..OOO  OO..OOO  OO..OOO
.OO.OO.  OOO.OOO  OOO.OOO  OO..OOO  OO..OOO  OO..OOO  OO..OOO
..OOO..  .OOOOO.  OOOOOOO  OOOOOOO  OOOOOOO  OO.OOOO  OO.OOOO
..OOO..  .OOOOO.  OOO.OOO  OOO.OOO  OO..OOO  OO..OOO  OO..OOO
.OO.OO.  .OO..OO  OOO.OOO  OO..OOO  OO..OOO  OO..OOO  OO..OOO
OO...OO  OOO..OO  OOO..OO  OO..OOO  OO..OOO  OO..OOO  OO..OOO

XX...XX  XX...XX
XX...XX  XX...XX
.XX.XX.  .XX.XX.
..XXX..  ..XXX..
..XXX..  ..XXX..
.XX.XX.  .XX.XX.
XX...XX  XX...XX

<examplar 35> ( O : Hebb; X : Iter )
OO..OO.  .OOOO..  .OOOO..  ..OO...  ..OO...  ..OO...
OO..OO.  OO...O.  .OO....  ..OO...  ..OO...  ..OO...
OO..OO.  .O..OO.  ..O.O..  ..OO...  ..OO...  ..OO...
.OOOO..  ..OOO..  ..OO...  ..OO...  ..O....  ..O....
..OO...  ..OO...  ..OO...  ..OO...  ..OO...  ..OO...
..OO...  ..O....  ..OO...  ..OO...  ..OO...  ..OO...
.OOOO..  .OOOO..  .OOOO..  ..OO...  ..OO...  ..OO...

XX..XX.  XX..XX.
XX..XX.  XX..XX.
XX..XX.  XX..XX.
.XXXX..  .XXXX..
..XX...  ..XX...
..XX...  ..XX...
.XXXX..  .XXXX..

<examplar 36> ( O : Hebb; X : Iter )
OOOOOOO  OOOOOOO  OOOOOOO  OOO.OOO  OO..OOO  OO..OOO  OO..OOO
OO...OO  OO..OOO  OO..OOO  OO..OOO  OO..OOO  OO..OOO  OO..OOO
O...OO.  OO..OOO  OOO.OOO  OO..OOO  OO..OOO  OO..OOO  OO..OOO
...OO..  ..OOO.O  OOOOOOO  OOOOOOO  OOOOOOO  OO.OOOO  OO.OOOO
..OO..O  .OOO.OO  OOO.OOO  OO..OOO  OO..OOO  OO..OOO  OO..OOO
.OO..OO  .OO..OO  OOO.OOO  OO..OOO  OO..OOO  OO..OOO  OO..OOO
OOOOOOO  OOOOOOO  OOO.OOO  OO..OOO  OO..OOO  OO..OOO  OO..OOO

XXXXXXX  XXXXXXX
XX...XX  XX...XX
X...XX.  X...XX.
...XX..  ...XX..
..XX..X  ..XX..X
.XX..XX  .XX..XX
XXXXXXX  XXXXXXX

<examplar 37> ( O : Hebb; X : Iter )
.......  .......  .......  .......  .......
.......  .......  .......  .......  .......
.OOOO..  .O..OO.  OO..OO.  OO..OO.  OO..OO.
....OO.  .O..OO.  OO..OO.  OO..OO.  OO..OO.
.OOOOO.  .O..OO.  .O..OO.  OO..OO.  OO..OO.
OO..OO.  .O..OO.  OO..OO.  OO..OO.  OO..OO.
.OOO.OO  .OOOO..  .OOOO..  .OOOO..  .OOOO..

.......  .......
.......  .......
.XXXX..  .XXXX..
....XX.  ....XX.
.XXXXX.  .XXXXX.
XX..XX.  XX..XX.
.XXX.XX  .XXX.XX
```

```
<examplar 38> ( O : Hebb; X : Iter )
OOO....  OOOO...  .OOOO..  .OOOO..  ..OOO..  ..OO...  ..OO...  ..OO...
.OO....  .OO....  .OO....  .OO....  .OO....  ..O....  ..OO...  ..OO...
.OO....  .OO..O.  .OO....  .OO....  .OO....  .OO....  ..OO...  ..OO...
.OOOOO.  .OOOOO.  .OOOO..  .OOO...  .OOO...  ..OO...  ..O....  ..O....
.OO..OO  .OO....  .OO....  .OO....  ..O....  ..O....  ..OO...  ..OO...
.OO..OO  .OO..O.  .OO..O.  .OO....  ..O....  ..OO...  ..OO...  ..OO...
OO.OOO.  OOOOOO.  OOOOO..  .OOOO..  .OOOO..  .OOOO..  ..OO...  ..OO...

XXX....  XXX....
.XX....  .XX....
.XX....  .XX....
.XXXXX.  .XXXXX.
.XX..XX  .XX..XX
.XX..XX  .XX..XX
XX.XXX.  XX.XXX.

<examplar 39> ( O : Hebb; X : Iter )
.......  .......  .......  .......
.......  .......  .......  .......
.OOOO..  .O..O..  OO..OO.  OO..OO.
OO..OO.  OO..OO.  OO..OO.  OO..OO.
OO.....  .O..OO.  OO..OO.  OO..OO.
OO..OO.  OO..OO.  OO..OO.  OO..OO.
.OOOO..  .OOOO..  .OOOO..  .OOOO..

.......  .......
.......  .......
.XXXX..  .XXXX..
XX..XX.  XX..XX.
XX.....  XX.....
XX..XX.  XX..XX.
.XXXX..  .XXXX..

<examplar 40> ( O : Hebb; X : Iter )
...OOO.  ....O..  ....O..  ....O..
....OO.  .O..OO.  .O..OO.  .O..OO.
....OO.  OO..OO.  OO..OO.  OO..OO.
.OOOOO.  OO..OO.  OO..OO.  OO..OO.
OO..OO.  OO..OO.  OO..OO.  OO..OO.
OO..OO.  OO..OO.  OO..OO.  OO..OO.
.OOO.OO  .OOOOO.  .OOOO..  .OOOO..

...XXX.  ...XXX.
....XX.  ....XX.
....XX.  ....XX.
.XXXXX.  .XXXXX.
XX..XX.  XX..XX.
XX..XX.  XX..XX.
.XXX.XX  .XXX.XX

<examplar 41> ( O : Hebb; X : Iter )
.......  .......  .......  .......
.......  .......  .......  .......
.OOOO..  .O..O..  OO..OO.  OO..OO.
OO..OO.  OO..OO.  OO..OO.  OO..OO.
OOOOOO.  .O..OO.  OO..OO.  OO..OO.
OO.....  .O..OO.  OO..OO.  OO..OO.
.OOOO..  .OOOO..  .OOOO..  .OOOO..

.......  .......
.......  .......
.XXXX..  .XXXX..
XX..XX.  XX..XX.
XXXXXX.  XXXXXX.
XX.....  XX.....
.XXXX..  .XXXX..
```

```
<examplar 42> ( O : Hebb; X : Iter )
..OOO..  .OOOO..  ..OOO..  ..OO...  ..OO...  ..OO...
.OO.OO.  .OO....  .OO....  ..OO...  ..OO...  ..OO...
.OO....  .OO....  .OO....  ..O....  ..OO...  ..OO...
OOOO...  .OOO...  ..OO...  ..OO...  ..O....  ..O....
.OO....  .OO....  ..O....  ..O....  ..OO...  ..OO...
.OO....  ..O....  ..O....  ..OO...  ..OO...  ..OO...
OOOO...  .OOOO..  .OOOO..  .OOOO..  ..OO...  ..OO...

..XXX..  ..XXX..
.XX.XX.  .XX.XX.
.XX....  .XX....
XXXX...  XXXX...
.XX....  .XX....
.XX....  .XX....
XXXX...  XXXX...

<examplar 43> ( O : Hebb; X : Iter )
.......  .......  .......  .......  ....O..  .......
.OOO.OO  .O.....  .....O.  .O..O..  .....O.  .O..O..
OO..OO.  OO..OO.  OO..OO.  OO..OO.  OO..OO.  OO..OO.
OO..OO.  OO..OO.  OO..OO.  OO..OO.  OO..OO.  OO..OO.
.OOOOO.  OOO.OO.  OO..OO.  OO..OO.  OO..OO.  OO..OO.
....OO.  .O..OO.  OO..OO.  OO..OO.  OO..OO.  OO..OO.
OOOOO..  .OOOOO.  .OOOO..  .OOOO..  .OOOO..  .OOOO..

.......  .......
.XXX.XX  .XXX.XX
XX..XX.  XX..XX.
XX..XX.  XX..XX.
.XXXXX.  .XXXXX.
....XX.  ....XX.
XXXXX..  XXXXX..

<examplar 44> ( O : Hebb; X : Iter )
OOO....  OOO....  OOO..OO  OOO.OOO  OOO.OOO  OOO.OOO  OO..OOO  OO..OOO  OO..OOO
.OO....  .OO..OO  .OO..OO  OOO..OO  OOO.OOO  OO..OOO  OO..OOO  OO..OOO  OO..OOO
.OO.OO.  .OO..OO  OOO..OO  OOO..OO  OOO.OOO  OO..OOO  OO..OOO  OO..OOO  OO..OOO
.OOO.OO  .OOOOO.  .OOOOOO  OOOOOOO  OOOOOOO  OOOOOOO  OOOOOOO  OO.OOOO  OO.OOOO
.OO..OO  .OO..OO  .OO.OOO  OOO.OOO  OOO.OOO  OO..OOO  OO..OOO  OO..OOO  OO..OOO
.OO..OO  .OO..OO  .OO..OO  OOO..OO  OOO.OOO  OO..OOO  OO..OOO  OO..OOO  OO..OOO
OOO..OO  OOO..OO  OOO..OO  OO...OO  OO..OOO  OO..OOO  OO..OOO  OO..OOO  OO..OOO

XXX....  XXX....
.XX....  .XX....
.XX.XX.  .XX.XX.
.XXX.XX  .XXX.XX
.XX..XX  .XX..XX
.XX..XX  .XX..XX
XXX..XX  XXX..XX

<examplar 45> ( O : Hebb; X : Iter )
..OO...  ..OO...  ..OO...
.......  ..OO...  ..OO...
.OOO...  ..OO...  ..OO...
..OO...  ..O....  ..O....
..OO...  ..OO...  ..OO...
..OO...  ..OO...  ..OO...
.OOOO..  ..OO...  ..OO...

..XX...  ..XX...
.......  .......
.XXX...  .XXX...
..XX...  ..XX...
..XX...  ..XX...
..XX...  ..XX...
.XXXX..  .XXXX..
```

```
<examplar 46> ( O : Hebb; X : Iter )
....OO.  .......  .......  .......  ....O..  .......
.......  ....O..  .....O.  .O..O..  .....O.  .O..O..
....OO.  OO..OO.  OO..OO.  OO..OO.  OO..OO.  OO..OO.
....OO.  OO..OO.  OO..OO.  OO..OO.  OO..OO.  OO..OO.
OO..OO.  OO..OO.  OO..OO.  OO..OO.  OO..OO.  OO..OO.
OO..OO.  OO..OO.  OO..OO.  OO..OO.  OO..OO.  OO..OO.
.OOOO..  .OOOO..  .OOOO..  .OOOO..  .OOOO..  .OOOO..

....XX.  ....XX.
.......  .......
....XX.  ....XX.
....XX.  ....XX.
XX..XX.  XX..XX.
XX..XX.  XX..XX.
.XXXX..  .XXXX..

<examplar 47> ( O : Hebb; X : Iter )
OOO....  .OO....  .OO....  ..OO...  ..OOO..  ..OOO..  .OOOO..  ..OOO..  ..OO...  ..OO...
.OO....  .OO....  .OO....  .OO....  .OO....  .OO....  .OO....  ..O....  ..OO...  ..OO...
.OO..OO  .OO.OO.  .OO.OO.  .OO.OO.  .OO.O..  .OO....  .OO....  .OO....  ..OO...  ..OO...
.OO.OO.  .OOOOO.  .OOOOO.  .OOOOO.  .OO.O..  .OOOO..  .OOO...  ..OO...  ..O....  ..O....
.OOOO..  .OO.OO.  .OO.OO.  .OO.OO.  .OO.OO.  .OO....  ..O....  ..O....  ..OO...  ..OO...
.OO.OO.  .OO..O.  .OO..O.  .OO..O.  .OO..O.  .OO....  ..O....  ..OO...  ..OO...  ..OO...
OOO..OO  OOOO.O.  OOOOO..  .OOOO..  .OOOO..  .OOOO..  .OOOO..  .OOOO..  ..OO...  ..OO...

XXX....  XXX....
.XX....  .XX....
.XX..XX  .XX..XX
.XX.XX.  .XX.XX.
.XXXX..  .XXXX..
.XX.XX.  .XX.XX.
XXX..XX  XXX..XX

<examplar 48> ( O : Hebb; X : Iter )
.OOO...  ..OO...  ..OO...  ..OO...
..OO...  ..OO...  ..OO...  ..OO...
..OO...  ..OO...  ..OO...  ..OO...
..OO...  ..OO...  ..O....  ..O....
..OO...  ..OO...  ..OO...  ..OO...
..OO...  ..OO...  ..OO...  ..OO...
..OO...  ..OO...  ..OO...  ..OO...

.XXX...  .XXX...
..XX...  ..XX...
..XX...  ..XX...
..XX...  ..XX...
..XX...  ..XX...
..XX...  ..XX...
..XX...  ..XX...

<examplar 49> ( O : Hebb; X : Iter )
.......  ......O  OO..OOO  OO..OOO  OO..OOO
.......  OO...OO  OO..OOO  OO..OOO  OO..OOO
OO..OO.  OO..OOO  OO..OOO  OO..OOO  OO..OOO
OOOOOOO  OO..OOO  OO..OOO  OO.OOOO  OO.OOOO
OOOOOOO  OO..OOO  OO..OOO  OO..OOO  OO..OOO
OO.O.OO  OO..OOO  OO..OOO  OO..OOO  OO..OOO
OO...OO  OO..OOO  OO..OOO  OO..OOO  OO..OOO

.......  .......
.......  .......
XX..XX.  XX..XX.
XXXXXXX  XXXXXXX
XXXXXXX  XXXXXXX
XX.X.XX  XX.X.XX
XX...XX  XX...XX
```

```
<examplar 50> ( O : Hebb; X : Iter )
.......  .......  .......  .......
.......  .......  .......  .......
OOOOO..  OO..OO.  OO..OO.  OO..OO.
OO..OO.  OO..OO.  OO..OO.  OO..OO.
OO..OO.  OO..OO.  OO..OO.  OO..OO.
OO..OO.  OO..OO.  OO..OO.  OO..OO.
OO..OO.  .OOOOO.  .OOOO..  .OOOO..

.......  .......
.......  .......
XXXXX..  XXXXX..
XX..XX.  XX..XX.
XX..XX.  XX..XX.
XX..XX.  XX..XX.
XX..XX.  XX..XX.

<examplar 51> ( O : Hebb; X : Iter )
.......  .......  .......
.......  .......  .......
.OOOO..  OO..OO.  OO..OO.
OO..OO.  OO..OO.  OO..OO.
OO..OO.  OO..OO.  OO..OO.
OO..OO.  OO..OO.  OO..OO.
.OOOO..  .OOOO..  .OOOO..

.......  .......
.......  .......
.XXXX..  .XXXX..
XX..XX.  XX..XX.
XX..XX.  XX..XX.
XX..XX.  XX..XX.
.XXXX..  .XXXX..

<examplar 52> ( O : Hebb; X : Iter )
.......  ..O....  ..OO...  ..OOO..  ..OOO..  ..OOO..  .OOOO..  ..OOO..  ..OO...  ..OO...  ..OO...
OO.OOO.  .OO....  .OO....  .OO....  .OO....  .OO....  .OO....  .OO....  ..O....  ..OO...  ..OO...
.OO..OO  .OO.OO.  .OO.OO.  .OO.O..  .OO.OO.  .OO.O..  .OO....  .OO....  .OO....  ..OO...  ..OO...
.OO..OO  .OOOOO.  .OO.OO.  .OO.OO.  .OO.O..  .OOOO..  .OOO...  .OOO...  ..OO...  ..O....  ..O....
.OOOOO.  .OO..O.  .OO.OO.  .OO.OO.  .OO.OO.  .OO....  .OO....  ..O....  ..O....  ..OO...  ..OO...
.OO....  .OO.OO.  .OO..O.  .OO.OO.  .OO..O.  .OO..O.  .OO....  ..O....  ..OO...  ..OO...  ..OO...
OOOO...  .OOOO..  .OOOO..  .OOOO..  .OOOO..  .OOOO..  .OOOO..  .OOOO..  .OOOO..  ..OO...  ..OO...

.......  .......
XX.XXX.  XX.XXX.
.XX..XX  .XX..XX
.XX..XX  .XX..XX
.XXXXX.  .XXXXX.
.XX....  .XX....
XXXX...  XXXX...

<examplar 53> ( O : Hebb; X : Iter )
.......  .......  .......  .......  ....O..  .......
.OOO.OO  .O.....  .....O.  .O..O..  .....O.  .O..O..
OO..OO.  OO..OO.  OO..OO.  OO..OO.  OO..OO.  OO..OO.
OO..OO.  OO..OO.  OO..OO.  OO..OO.  OO..OO.  OO..OO.
.OOOOO.  OO.OOO.  OO..OO.  OO..OO.  OO..OO.  OO..OO.
....OO.  OO..OO.  OO..OO.  OO..OO.  OO..OO.  OO..OO.
...OOOO  .OOOOO.  .OOOO..  .OOOO..  .OOOO..  .OOOO..

.......  .......
.XXX.XX  .XXX.XX
XX..XX.  XX..XX.
XX..XX.  XX..XX.
.XXXXX.  .XXXXX.
....XX.  ....XX.
...XXXX  ...XXXX
```

```
<examplar 54> ( O : Hebb; X : Iter )
.......  .......  .......  .......  ..OO...  ..OO...  ..OO...
.......  .......  .......  ..O....  ..OO...  ..OO...  ..OO...
OO.OOO.  .OO.OO.  .OO.O..  .OO.O..  ..OO...  ..OO...  ..OO...
.OOO.OO  .O..OO.  .O..O..  .......  .......  ..O....  ..O....
.OO..OO  .OO....  .OO....  ..O....  ..OO...  ..OO...  ..OO...
.OO....  .OO..O.  .OO....  ..O....  ..OO...  ..OO...  ..OO...
OOOO...  .OOO...  .OOOO..  .OOOO..  ..OO...  ..OO...  ..OO...

.......  .......
.......  .......
XX.XXX.  XX.XXX.
.XXX.XX  .XXX.XX
.XX..XX  .XX..XX
.XX....  .XX....
XXXX...  XXXX...
```

```
<examplar 55> ( O : Hebb; X : Iter )
.......  .......  .......  .......  ..OO...  ..OO...  ..OO...
.......  .......  .......  ..O....  ..OO...  ..OO...  ..OO...
.OOOOO.  .OO.O..  .OO.O..  .OOO...  ..OO...  ..OO...  ..OO...
OO.....  .O..OO.  .O..O..  .......  .......  ..O....  ..O....
.OOOO..  .OOO...  ..O....  ..OO...  ..OO...  ..OO...  ..OO...
....OO.  .O.....  ..O....  ..OO...  ..OO...  ..OO...  ..OO...
OOOOO..  .OOOO..  .OOOO..  .OOO...  ..OO...  ..OO...  ..OO...

.......  .......
.......  .......
.XXXXX.  .XXXXX.
XX.....  XX.....
.XXXX..  .XXXX..
....XX.  ....XX.
XXXXX..  XXXXX..
```

```
<examplar 56> ( O : Hebb; X : Iter )
...O...  ..OO...  ..OO...  ..OO...
..OO...  ..OO...  ..OO...  ..OO...
.OOOOO.  ..OO...  ..OO...  ..OO...
..OO...  .......  ..O....  ..O....
..OO...  ..OO...  ..OO...  ..OO...
..OO.O.  ..OO...  ..OO...  ..OO...
...OO..  ..OO...  ..OO...  ..OO...

...X...  ...X...
..XX...  ..XX...
.XXXXX.  .XXXXX.
..XX...  ..XX...
..XX...  ..XX...
..XX.X.  ..XX.X.
...XX..  ...XX..
```

```
<examplar 57> ( O : Hebb; X : Iter )
.......  .......  .......  .......
.......  .......  .......  .......
OO..OO.  OO..OO.  OO..OO.  OO..OO.
OO..OO.  OO..OO.  OO..OO.  OO..OO.
OO..OO.  OO..OO.  OO..OO.  OO..OO.
OO..OO.  OO..OO.  OO..OO.  OO..OO.
.OOO.OO  .OOOOO.  .OOOO..  .OOOO..

.......  .......
.......  .......
XX..XX.  XX..XX.
XX..XX.  XX..XX.
XX..XX.  XX..XX.
XX..XX.  XX..XX.
.XXX.XX  .XXX.XX
```

```
<examplar 58> ( O : Hebb; X : Iter )
.......  .......  .......
.......  .......  .......
OO..OO.  OO..OO.  OO..OO.
OO..OO.  OO..OO.  OO..OO.
OO..OO.  OO..OO.  OO..OO.
.OOOO..  OO..OO.  OO..OO.
..OO...  .OOOO..  .OOOO..

.......  .......
.......  .......
XX..XX.  XX..XX.
XX..XX.  XX..XX.
XX..XX.  XX..XX.
.XXXX..  .XXXX..
..XX...  ..XX...

<examplar 59> ( O : Hebb; X : Iter )
.......  .......  O....OO  OO..OOO  OO..OOO  OO..OOO
.......  .....OO  OO..OOO  OO..OOO  OO..OOO  OO..OOO
OO...OO  OO..OOO  OO..OOO  OO..OOO  OO..OOO  OO..OOO
OO.O.OO  OO..OOO  OO..OOO  OO..OOO  OO.OOOO  OO.OOOO
OOOOOOO  OO.OOOO  OO..OOO  OO..OOO  OO..OOO  OO..OOO
OOOOOOO  OO..OOO  OO..OOO  OO..OOO  OO..OOO  OO..OOO
.OO.OO.  OO.OOOO  OO..OOO  OO..OOO  OO..OOO  OO..OOO

.......  .......
.......  .......
XX...XX  XX...XX
XX.X.XX  XX.X.XX
XXXXXXX  XXXXXXX
XXXXXXX  XXXXXXX
.XX.XX.  .XX.XX.

<examplar 60> ( O : Hebb; X : Iter )
.......  .......  .......  .......  .......
.......  .......  .......  .......  .......
OO...OO  .OO.OO.  OO..OO.  OO..OO.  OO..OO.
.OO.OO.  OO..OO.  OO..OO.  OO..OO.  OO..OO.
..OOO..  .OOOOO.  .OO.OO.  OO..OO.  OO..OO.
.OO.OO.  .OO.OO.  .O..OO.  OO..OO.  OO..OO.
OO...OO  OOO..O.  .OOOO..  .OOOO..  .OOOO..

.......  .......
.......  .......
XX...XX  XX...XX
.XX.XX.  .XX.XX.
..XXX..  ..XXX..
.XX.XX.  .XX.XX.
XX...XX  XX...XX

<examplar 61> ( O : Hebb; X : Iter )
.......  ....O..  ....O..
OO..OO.  .O..OO.  .O..OO.
OO..OO.  OO..OO.  OO..OO.
OO..OO.  OO..OO.  OO..OO.
.OOOOO.  OO..OO.  OO..OO.
....OO.  OO..OO.  OO..OO.
OOOOO..  .OOOO..  .OOOO..

.......  .......
XX..XX.  XX..XX.
XX..XX.  XX..XX.
XX..XX.  XX..XX.
.XXXXX.  .XXXXX.
....XX.  ....XX.
XXXXX..  XXXXX..
```

```
<examplar 62> ( O : Hebb; X : Iter )
.......  .......  .......  ..OO...  ..OO...  ..OO...
.......  .......  ..O....  ..OO...  ..OO...  ..OO...
OOOOOO.  .OO.O..  .OOO...  ..OO...  ..OO...  ..OO...
O..OO..  .O..O..  .......  .......  ..O....  ..O....
..OO...  ..OO...  ..OO...  ..OO...  ..OO...  ..OO...
.OO..O.  ..O....  ..OO...  ..OO...  ..OO...  ..OO...
OOOOOO.  .OOOO..  .OOO...  ..OO...  ..OO...  ..OO...

.......  .......
.......  .......
XXXXXX.  XXXXXX.
X..XX..  X..XX..
..XX...  ..XX...
.XX..X.  .XX..X.
XXXXXX.  XXXXXX.
```

```
<examplar 63> ( O : Hebb; X : Iter )
..OO...  ..OO...  ..OO...
.OOOO..  ..OO...  ..OO...
.OOOO..  ..OO...  ..OO...
..OO...  ..O....  ..O....
..OO...  ..OO...  ..OO...
.......  ..OO...  ..OO...
..OO...  ..OO...  ..OO...

..XX...  ..XX...
.XXXX..  .XXXX..
.XXXX..  .XXXX..
..XX...  ..XX...
..XX...  ..XX...
.......  .......
..XX...  ..XX...
```

```
<examplar 64> ( O : Hebb; X : Iter )
.OO.OO.  ..OO...  ..OO...  ..OO...  ..OO...
.OO.OO.  ..OO...  ..OO...  ..OO...  ..OO...
.OO.OO.  .......  ..OO...  ..OO...  ..OO...
.......  .......  .......  ..O....  ..O....
.......  ..O....  ..OO...  ..OO...  ..OO...
.......  ..OO...  ..OO...  ..OO...  ..OO...
.......  ..OO...  ..OO...  ..OO...  ..OO...

.XX.XX.  .XX.XX.
.XX.XX.  .XX.XX.
.XX.XX.  .XX.XX.
.......  .......
.......  .......
.......  .......
.......  .......
```

```
<examplar 65> ( O : Hebb; X : Iter )
.OO.OO.  OOOOOO.  OOOOOO.  OOOOOOO  OOOOOOO  OO..OOO  OO..OOO  OO..OOO
.OO.OO.  OO..OOO  OO..OOO  OO..OOO  OO..OOO  OO..OOO  OO..OOO  OO..OOO
OOOOOOO  OO..OO.  OO..OOO  OO..OOO  OO..OOO  OO..OOO  OO..OOO  OO..OOO
.OO.OO.  OOOOOO.  OOOOOO.  OOOOOOO  OOOOOOO  OOOOOOO  OO.OOOO  OO.OOOO
OOOOOOO  OOO.OO.  OO..OOO  OO..OOO  OO..OOO  OO..OOO  OO..OOO  OO..OOO
.OO.OO.  OO..OO.  OO..OOO  OO..OOO  OO..OOO  OO..OOO  OO..OOO  OO..OOO
.OO.OO.  OOOOOO.  OOOOOOO  OOOOOOO  OO..OOO  OO..OOO  OO..OOO  OO..OOO

.XX.XX.  .XX.XX.
.XX.XX.  .XX.XX.
XXXXXXX  XXXXXXX
.XX.XX.  .XX.XX.
XXXXXXX  XXXXXXX
.XX.XX.  .XX.XX.
.XX.XX.  .XX.XX.
```

```
<examplar 66> ( O : Hebb; X : Iter )
..OO...  ..OOO..  ..OO...  ..OO...  ..OO...
.OOOOO.  .OO....  ..O....  ..OO...  ..OO...
OO.....  .O..O..  ..O....  ..OO...  ..OO...
.OOOO..  .OO....  .......  ..O....  ..O....
....OO.  .......  ..O....  ..OO...  ..OO...
OOOOO..  ..O....  ..OO...  ..OO...  ..OO...
..OO...  .OOOO..  ..OOO..  ..OO...  ..OO...

..XX...  ..XX...
.XXXXX.  .XXXXX.
XX.....  XX.....
.XXXX..  .XXXX..
....XX.  ....XX.
XXXXX..  XXXXX..
..XX...  ..XX...

<examplar 67> ( O : Hebb; X : Iter )
.......  OO.....  .OO....  ..O....  ..OO...  ..O.O..  ..OO...  ..O.O..  ...O...  ....O..  .......  .......  .......  ....O..  .......
OO...OO  .O.....  .O.....  .OO....  .O.....  .OO....  .O.....  .OO....  .O.....  .......  .O.....  .....O.  .O..O..  .....O.  .O..O..  OO..OO.  OO..OO.  .OO.OO.  .OO.OO.  .OO.OO.  .OO.OO.  .OO.OO.  .OO.OO.  .O..OO.  OO..OO.  OO
OO..OO.  OO..OO.  OO..OO.  OO..OO.  ...OO..  .OOOO..  .OOOOO.  .OOOOO.  .OO.OO.  .OO.OO.  .OO.OO.  .O..OO.  .O..OO.  OO..OO.  OO..OO.  OO..OO.  OO..OO.  OO..OO.  OO..OO.  ..OO...  ..OOO..  .OO.OO.  .OO.OO.  .OO.OO.  .OO.OO.  .(
.OO.OO.  .O..OO.  .O..OO.  OO..OO.  OO..OO.  OO..OO.  OO..OO.  OO..OO.  .OO..OO  .OO..O.  .OO..O.  .OO.OO.  .OO..O.  .OO.OO.  .OO.OO.  .O..OO.  .O..OO.  .O..OO.  OO..OO.  OO..OO.  OO..OO.  OO..OO.  OO..OO.  OO...OO  OOO..OO  OO.
OOOOO..  .OOOO..  .OOOO..  .OOOO..  .OOOO..  .OOOO..  .OOOO..  .OOOO..  .OOOO..  .OOOO..  .OOOO..  .OOOO..  .OOOO..
.......  .......
XX...XX  XX...XX
XX..XX.  XX..XX.
...XX..  ...XX..
..XX...  ..XX...
.XX..XX  .XX..XX
XX...XX  XX...XX

<examplar 68> ( O : Hebb; X : Iter )
..OOO..  .OOOO..  ..OOO..  ...OOO.  ....OO.  ....O..  ....O..  ....O..  ....O..
.OO.OO.  .O..OO.  OO..OO.  OO..OO.  OO..OO.  OO..OO.  .O..OO.  .O..OO.  .O..OO.
..OOO..  OO..OO.  OO..OO.  OO..OO.  OO..OO.  OO..OO.  OO..OO.  OO..OO.  OO..OO.
.OOO.OO  OOO.OO.  OO..OO.  OO..OO.  OO..OO.  OO..OO.  OO..OO.  OO..OO.  OO..OO.
OO.OOO.  OO..OO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.  OO..OO.
.OOO.OO  .OOOO..  .OOOOO.  .OOOOO.  .OOOOO.  .OOOOO.  .OOOOO.  .OOOO..  .OOOO..

..XXX..  ..XXX..
.XX.XX.  .XX.XX.
..XXX..  ..XXX..
.XXX.XX  .XXX.XX
XX.XXX.  XX.XXX.
XX..XX.  XX..XX.
.XXX.XX  .XXX.XX

<examplar 69> ( O : Hebb; X : Iter )
.OO....  ..OO...  ..OO...  ..OO...  ..OO...
.OO....  ..OO...  ..OO...  ..OO...  ..OO...
OO.....  ..OO...  ..OO...  ..OO...  ..OO...
.......  .......  .......  ..O....  ..O....
.......  .......  ..OO...  ..OO...  ..OO...
.......  ..OO...  ..OO...  ..OO...  ..OO...
.......  ..OO...  ..OO...  ..OO...  ..OO...

.XX....  .XX....
.XX....  .XX....
XX.....  XX.....
.......  .......
.......  .......
.......  .......
.......  .......
```

```
<examplar 70> ( O : Hebb; X : Iter )
...OO..  ..OO...  ..OO...  ..OO...
..OO...  ..OO...  ..OO...  ..OO...
.OO....  ..OO...  ..OO...  ..OO...
.OO....  ..O....  ..O....  ..O....
.OO....  ..O....  ..OO...  ..OO...
..OO...  ..OO...  ..OO...  ..OO...
...OO..  ..OOO..  ..OO...  ..OO...

...XX..  ...XX..
..XX...  ..XX...
.XX....  .XX....
.XX....  .XX....
.XX....  .XX....
..XX...  ..XX...
...XX..  ...XX..

<examplar 71> ( O : Hebb; X : Iter )
.OO....  ..OO...  ..OO...  ..OO...
..OO...  ..OO...  ..OO...  ..OO...
...OO..  ..OO...  ..OO...  ..OO...
...OO..  .......  ..O....  ..O....
...OO..  ..OO...  ..OO...  ..OO...
..OO...  ..OO...  ..OO...  ..OO...
.OO....  ..OO...  ..OO...  ..OO...

.XX....  .XX....
..XX...  ..XX...
...XX..  ...XX..
...XX..  ...XX..
...XX..  ...XX..
..XX...  ..XX...
.XX....  .XX....

<examplar 72> ( O : Hebb; X : Iter )
.......  .......  .......  .......  .......  .......  .......  .......  .......
.OO..OO  ..O....  .OO....  .......  .......  .......  .......  .......  .......
..OOOO.  .OO.OO.  .OO.OO.  .OO.OO.  .OO.O..  .OO.OO.  .O..OO.  OO..OO.  OO..OO.
OOOOOOO  .OOOOO.  .OO.OO.  .OO.OO.  .O..OO.  .O..OO.  OO..OO.  OO..OO.  OO..OO.
..OOOO.  .OOO.O.  .OO.O..  .OO..O.  .OO.O..  .OO.OO.  .O..OO.  OO..OO.  OO..OO.
.OO..OO  .OO..O.  .OO..O.  .OO..O.  .OO.OO.  .O..OO.  .O..OO.  OO..OO.  OO..OO.
.......  OO...O.  OOOO...  .OOOO..  .OOOO..  .OOOO..  .OOOO..  .OOOO..  .OOOO..

.......  .......
.XX..XX  .XX..XX
..XXXX.  ..XXXX.
XXXXXXX  XXXXXXX
..XXXX.  ..XXXX.
.XX..XX  .XX..XX
.......  .......

<examplar 73> ( O : Hebb; X : Iter )
.......  .......  ...O...  ..OO...  ..OO...  ..OO...
..OO...  ..OO...  ..OO...  ..OO...  ..OO...  ..OO...
..OO...  ..OO...  ..OO...  ..OO...  ..OO...  ..OO...
OOOOOO.  .......  .......  .......  ..O....  ..O....
..OO...  ..OO...  ..OO...  ..OO...  ..OO...  ..OO...
..OO...  ..OO...  ..OO...  ..OO...  ..OO...  ..OO...
.......  ...O...  ..OO...  ..OO...  ..OO...  ..OO...

.......  .......
..XX...  ..XX...
..XX...  ..XX...
XXXXXX.  XXXXXX.
..XX...  ..XX...
..XX...  ..XX...
.......  .......
```

```
<examplar 74> ( O : Hebb; X : Iter )
.......  .......  ..OO...  ..OO...  ..OO...
.......  ..OO...  ..OO...  ..OO...  ..OO...
.......  ..OO...  ..OO...  ..OO...  ..OO...
.......  .......  .......  ..O....  ..O....
..OO...  ..OO...  ..OO...  ..OO...  ..OO...
..OO...  ..OO...  ..OO...  ..OO...  ..OO...
.OO....  ..OO...  ..OO...  ..OO...  ..OO...

.......  .......
.......  .......
.......  .......
.......  .......
..XX...  ..XX...
..XX...  ..XX...
.XX....  .XX....

<examplar 75> ( O : Hebb; X : Iter )
.......  .......  ...O...  ..OO...  ..OO...  ..OO...
.......  ..OO...  ..OO...  ..OO...  ..OO...  ..OO...
.......  ..OOO..  ..OO...  ..OO...  ..OO...  ..OO...
OOOOOO.  .......  .......  .......  ..O....  ..O....
.......  ..O....  ..OO...  ..OO...  ..OO...  ..OO...
.......  ..OO...  ..OO...  ..OO...  ..OO...  ..OO...
.......  ..OO...  ..OO...  ..OO...  ..OO...  ..OO...

.......  .......
.......  .......
.......  .......
XXXXXX.  XXXXXX.
.......  .......
.......  .......
.......  .......

<examplar 76> ( O : Hebb; X : Iter )
.......  ...O...  ..OO...  ..OO...  ..OO...
.......  ..OO...  ..OO...  ..OO...  ..OO...
.......  ..OO...  ..OO...  ..OO...  ..OO...
.......  .......  .......  ..O....  ..O....
.......  ..OO...  ..OO...  ..OO...  ..OO...
..OO...  ..OO...  ..OO...  ..OO...  ..OO...
..OO...  ..OO...  ..OO...  ..OO...  ..OO...

.......  .......
.......  .......
.......  .......
.......  .......
.......  .......
..XX...  ..XX...
..XX...  ..XX...

<examplar 77> ( O : Hebb; X : Iter )
.....OO  .......  ...O...  ..OO...  ..OO...  ..OO...
....OO.  ...O...  ..OO...  ..OO...  ..OO...  ..OO...
...OO..  ..OOO..  ..OO...  ..OO...  ..OO...  ..OO...
..OO...  .......  .......  .......  ..O....  ..O....
.OO....  .......  ...O...  ..OO...  ..OO...  ..OO...
OO.....  ...O...  ..OO...  ..OO...  ..OO...  ..OO...
O......  ..OO...  ..OO...  ..OO...  ..OO...  ..OO...

.....XX  .....XX
....XX.  ....XX.
...XX..  ...XX..
..XX...  ..XX...
.XX....  .XX....
XX.....  XX.....
X......  X......
```

```
<examplar 78> ( O : Hebb; X : Iter )
.......  ..OO...  ..OO...  ..OO...
..OO...  ..OO...  ..OO...  ..OO...
..OO...  ..OO...  ..OO...  ..OO...
.......  .......  ..O....  ..O....
.......  ..OO...  ..OO...  ..OO...
..OO...  ..OO...  ..OO...  ..OO...
..OO...  ..OO...  ..OO...  ..OO...

.......  .......
..XX...  ..XX...
..XX...  ..XX...
.......  .......
.......  .......
..XX...  ..XX...
..XX...  ..XX...

<examplar 79> ( O : Hebb; X : Iter )
..OO...  ..OO...  ..OO...  ..OO...
..OO...  ..OO...  ..OO...  ..OO...
.......  ..OO...  ..OO...  ..OO...
.......  .......  ..O....  ..O....
..OO...  ..OO...  ..OO...  ..OO...
..OO...  ..OO...  ..OO...  ..OO...
.OO....  ..OO...  ..OO...  ..OO...

..XX...  ..XX...
..XX...  ..XX...
.......  .......
.......  .......
..XX...  ..XX...
..XX...  ..XX...
.XX....  .XX....

<examplar 80> ( O : Hebb; X : Iter )
...OO..  ..OO...  ..OO...  ..OO...  ..OO...
..OO...  ..OO...  ..OO...  ..OO...  ..OO...
.OO....  ..OO...  ..OO...  ..OO...  ..OO...
OO.....  .......  .......  ..O....  ..O....
.OO....  ..OO...  ..OO...  ..OO...  ..OO...
..OO...  ..OO...  ..OO...  ..OO...  ..OO...
...OO..  ..OOO..  ..OO...  ..OO...  ..OO...

...XX..  ...XX..
..XX...  ..XX...
.XX....  .XX....
XX.....  XX.....
.XX....  .XX....
..XX...  ..XX...
...XX..  ...XX..

<examplar 81> ( O : Hebb; X : Iter )
.......  .......  ...O...  ..OO...  ..OO...  ..OO...
.......  ...O...  ..OO...  ..OO...  ..OO...  ..OO...
OOOOOO.  ...OO..  ..OO...  ..OO...  ..OO...  ..OO...
.......  .......  .......  .......  ..O....  ..O....
.......  ...O...  ..OO...  ..OO...  ..OO...  ..OO...
OOOOOO.  ...O...  ..OO...  ..OO...  ..OO...  ..OO...
.......  ..OO...  ..OO...  ..OO...  ..OO...  ..OO...

.......  .......
.......  .......
XXXXXX.  XXXXXX.
.......  .......
.......  .......
XXXXXX.  XXXXXX.
.......  .......
```

```
<examplar 82> ( O : Hebb; X : Iter )
.OO....  .......  ..OO...  ..OO...  ..OO...
..OO...  ..OO...  ..OO...  ..OO...  ..OO...
...OO..  ..OO...  ..OO...  ..OO...  ..OO...
....OO.  .......  .......  ..O....  ..O....
...OO..  ..OO...  ..OO...  ..OO...  ..OO...
..OO...  ..OO...  ..OO...  ..OO...  ..OO...
.OO....  ..OO...  ..OO...  ..OO...  ..OO...

.XX....  .XX....
..XX...  ..XX...
...XX..  ...XX..
....XX.  ....XX.
...XX..  ...XX..
..XX...  ..XX...
.XX....  .XX....

<examplar 83> ( O : Hebb; X : Iter )
.OOOO..  .OOOO..  ..OOO..  ..OO...  ..OO...  ..OO...
OO..OO.  .O..O..  ..OO...  ..OO...  ..OO...  ..OO...
....OO.  ....O..  ..OO...  ..OO...  ..OO...  ..OO...
...OO..  ..OO...  ..OO...  ..OO...  ..O....  ..O....
..OO...  ..OO...  ..OO...  ..OO...  ..OO...  ..OO...
.......  ..OO...  ..OO...  ..OO...  ..OO...  ..OO...
..OO...  .OOOO..  ..OO...  ..OO...  ..OO...  ..OO...

.XXXX..  .XXXX..
XX..XX.  XX..XX.
....XX.  ....XX.
...XX..  ...XX..
..XX...  ..XX...
.......  .......
..XX...  ..XX...

<examplar 84> ( O : Hebb; X : Iter )
.OOOOO.  OOOOOOO  OOOOOOO  OOOOOOO  OO..OOO  OO..OOO  OO..OOO
OO...OO  OO..OOO  OO..OOO  OO..OOO  OO..OOO  OO..OOO  OO..OOO
OO.OOOO  OO..OOO  OO..OOO  OO..OOO  OO..OOO  OO..OOO  OO..OOO
OO.OOOO  OO.OOOO  OOOOOOO  OOOOOOO  OOOOOOO  OO.OOOO  OO.OOOO
OO.OOOO  OO..OOO  OO..OOO  OO..OOO  OO..OOO  OO..OOO  OO..OOO
OO.....  OO..OOO  OO..OOO  OO..OOO  OO..OOO  OO..OOO  OO..OOO
.OOOO..  OOOOOO.  OOOOOOO  OO..OOO  OO..OOO  OO..OOO  OO..OOO

.XXXXX.  .XXXXX.
XX...XX  XX...XX
XX.XXXX  XX.XXXX
XX.XXXX  XX.XXXX
XX.XXXX  XX.XXXX
XX.....  XX.....
.XXXX..  .XXXX..

<examplar 85> ( O : Hebb; X : Iter )
.OOOO..  ..OOO..  ..OO...  ..OO...  ..OO...
.OO....  .OO....  ..O....  ..OO...  ..OO...
.OO....  .OO....  .OO....  ..OO...  ..OO...
.OO....  .OOO...  ..OO...  ..O....  ..O....
.OO....  ..O....  ..O....  ..OO...  ..OO...
.OO....  ..O....  ..OO...  ..OO...  ..OO...
.OOOO..  .OOOO..  .OOOO..  ..OO...  ..OO...

.XXXX..  .XXXX..
.XX....  .XX....
.XX....  .XX....
.XX....  .XX....
.XX....  .XX....
.XX....  .XX....
.XXXX..  .XXXX..
```

```
<examplar 86> ( O : Hebb; X : Iter )
OO.....  ..O....  ..OO...  ..OO...  ..OO...
.OO....  ..OO...  ..OO...  ..OO...  ..OO...
..OO...  ..OO...  ..OO...  ..OO...  ..OO...
...OO..  ..O....  .......  ..O....  ..O....
....OO.  ..O....  ..OO...  ..OO...  ..OO...
.....OO  ..OO...  ..OO...  ..OO...  ..OO...
......O  ..O....  ..OO...  ..OO...  ..OO...

XX.....  XX.....
.XX....  .XX....
..XX...  ..XX...
...XX..  ...XX..
....XX.  ....XX.
.....XX  .....XX
......X  ......X

<examplar 87> ( O : Hebb; X : Iter )
.OOOO..  ..OOO..  ..OO...  ..OO...  ..OO...  ..OO...
...OO..  ...O...  ..OO...  ..OO...  ..OO...  ..OO...
...OO..  ...OO..  ..OO...  ..OO...  ..OO...  ..OO...
...OO..  .......  .......  .......  ..O....  ..O....
...OO..  ...O...  ..OO...  ..OO...  ..OO...  ..OO...
...OO..  ...O...  ..OO...  ..OO...  ..OO...  ..OO...
.OOOO..  ..OOO..  ..OOO..  ..OO...  ..OO...  ..OO...

.XXXX..  .XXXX..
...XX..  ...XX..
...XX..  ...XX..
...XX..  ...XX..
...XX..  ...XX..
...XX..  ...XX..
.XXXX..  .XXXX..

<examplar 88> ( O : Hebb; X : Iter )
...O...  .......  ...O...  ..OO...  ..OO...  ..OO...
..OOO..  ..OO...  ..OO...  ..OO...  ..OO...  ..OO...
.OO.OO.  ..OO...  ..OO...  ..OO...  ..OO...  ..OO...
OO...OO  .......  .......  .......  ..O....  ..O....
.......  ...O...  ..OO...  ..OO...  ..OO...  ..OO...
.......  ..OO...  ..OO...  ..OO...  ..OO...  ..OO...
.......  ...O...  ..OO...  ..OO...  ..OO...  ..OO...

...X...  ...X...
..XXX..  ..XXX..
.XX.XX.  .XX.XX.
XX...XX  XX...XX
.......  .......
.......  .......
.......  .......

<examplar 89> ( O : Hebb; X : Iter )
.......  .......  ...O...  ..OO...  ..OO...  ..OO...
.......  ...O...  ..OO...  ..OO...  ..OO...  ..OO...
.......  ..OO...  ..OO...  ..OO...  ..OO...  ..OO...
.......  .......  .......  .......  ..O....  ..O....
.......  ..O....  ..OO...  ..OO...  ..OO...  ..OO...
.......  ..OO...  ..OO...  ..OO...  ..OO...  ..OO...
OOOOOOO  ..OO...  ..OO...  ..OO...  ..OO...  ..OO...

.......  .......
.......  .......
.......  .......
.......  .......
.......  .......
.......  .......
XXXXXXX  XXXXXXX
```

```
<examplar 90> ( O : Hebb; X : Iter )
..OO...  ...O...  ..OO...  ..OO...  ..OO...
..OO...  ..OO...  ..OO...  ..OO...  ..OO...
...OO..  ..OO...  ..OO...  ..OO...  ..OO...
.......  .......  .......  ..O....  ..O....
.......  ...O...  ..OO...  ..OO...  ..OO...
.......  ..OO...  ..OO...  ..OO...  ..OO...
.......  ..OO...  ..OO...  ..OO...  ..OO...

..XX...  ..XX...
..XX...  ..XX...
...XX..  ...XX..
.......  .......
.......  .......
.......  .......
.......  .......

<examplar 91> ( O : Hebb; X : Iter )
...OOO.  ..OO...  ..OO...  ..OO...  ..OO...
..OO...  ..OO...  ..OO...  ..OO...  ..OO...
..OO...  ..OO...  ..OO...  ..OO...  ..OO...
OOO....  .......  .......  ..O....  ..O....
..OO...  ..OO...  ..OO...  ..OO...  ..OO...
..OO...  ..OO...  ..OO...  ..OO...  ..OO...
...OOO.  ..OOO..  ..OO...  ..OO...  ..OO...

...XXX.  ...XXX.
..XX...  ..XX...
..XX...  ..XX...
XXX....  XXX....
..XX...  ..XX...
..XX...  ..XX...
...XXX.  ...XXX.

<examplar 92> ( O : Hebb; X : Iter )
...OO..  ...O...  ...O...  ..OO...  ..OO...  ..OO...
...OO..  ...O...  ..OO...  ..OO...  ..OO...  ..OO...
...OO..  ...OO..  ..OO...  ..OO...  ..OO...  ..OO...
.......  .......  .......  .......  ..O....  ..O....
...OO..  ...O...  ..OO...  ..OO...  ..OO...  ..OO...
...OO..  ...O...  ..OO...  ..OO...  ..OO...  ..OO...
...OO..  ..OOO..  ..OO...  ..OO...  ..OO...  ..OO...

...XX..  ...XX..
...XX..  ...XX..
...XX..  ...XX..
.......  .......
...XX..  ...XX..
...XX..  ...XX..
...XX..  ...XX..

<examplar 93> ( O : Hebb; X : Iter )
OOO....  ..OO...  ..OO...  ..OO...
..OO...  ..OO...  ..OO...  ..OO...
..OO...  ..OO...  ..OO...  ..OO...
...OOO.  ..OO...  ..O....  ..O....
..OO...  ..OO...  ..OO...  ..OO...
..OO...  ..OO...  ..OO...  ..OO...
OOO....  ..OO...  ..OO...  ..OO...

XXX....  XXX....
..XX...  ..XX...
..XX...  ..XX...
...XXX.  ...XXX.
..XX...  ..XX...
..XX...  ..XX...
XXX....  XXX....
```

III. Noise Robustness

```
<examplar 1> ( O : Hebb; X : Iter )
.OO.O..  OOOOOOO  OOO.OOO  OO..OOO  OO..OOO  OO..OOO
OO...OO  OO..OOO  OO..OOO  OO..OOO  OO..OOO  OO..OOO
OO..OOO  OO..OOO  OO..OOO  OO..OOO  OO..OOO  OO..OOO
OOOOOOO  OO.OOOO  OOOOOOO  OOOOOOO  OO.OOOO  OO.OOOO
OOOO..O  OO..OOO  OO..OOO  OO..OOO  OO..OOO  OO..OOO
OO...OO  OO..OOO  OO..OOO  OO..OOO  OO..OOO  OO..OOO
.OOOO.O  OOOOOOO  OO..OOO  OO..OOO  OO..OOO  OO..OOO

.XX.X..  ..XXX..  .XXX...  ..XXX..  .XXX...  ..XXX..  .XXX...  ..XXX..  .XXX...  ..XXX..  .XXXX..  ..XXX..  .XXXX..  ..XXX..
XX...XX  X...X.X  .X.X.X.  X.X.X.X  .X.X.X.  X.X.X.X  .X.X.X.  X.X.X.X  .X.X.X.  X.X.X.X  .X.X.X.  X.X.X.X  .X.X.X.  X.X.X.X
XX..XXX  XX...XX  XX..XXX  XX...XX  XXX.XXX  XX.X.XX  XXX.XXX  XX.X.XX  XXX.XXX  XX.X.XX  XXX.XXX  XX.X.XX  XXX.XXX  XX.X.XX
XXXXXXX  .X.XXXX  XXX..XX  .X.X.XX  XXX..XX  .X.X.XX  XXX..XX  .X.X.XX  XXX..XX  .X.X.XX  XXX.XXX  .X.X.XX  XXX.XXX  .X.X.XX
XXXX..X  XXXX.XX  XXXX.XX  XXXX.XX  XXXX.XX  XXXX.XX  XXXX.XX  XXXX.XX  XX.X.XX  XXXXXXX  XX.X.XX  XXXXXXX  XX.XXXX  XXXXXXX
XX...XX  .XX.XXX  XXX..XX  .XXX.X.  X.X.XXX  .XXX.X.  X.X.XXX  .X.X.X.  X.X.XXX  .X.X.X.  X.X.XXX  .X.XXX.  X.X.XXX  .X.XXX.
.XXXX.X  XXXXXX.  .XXXXX.  XXXXXX.  .XXXXX.  XXXXXX.  .XXXX..  .XXXXX.  .XXXX..  .XXXXX.  .XXXX.X  .XXXXX.  .XXXX.X  .XXXXX.

<examplar 2> ( O : Hebb; X ; Iter )
..OOO..  ..OO...  ..OO...  ..OO...
.O.O.O.  ..OO...  ..OO...  ..OO...
..OO...  ..OO...  ..OO...  ..OO...
..OO...  ..OO...  ..O....  ..O....
.O.....  ..OO...  ..OO...  ..OO...
..OO...  ..OO...  ..OO...  ..OO...
OO.OO..  ..OO...  ..OO...  ..OO...

..XXX..  .X.XX..  .XXX.X.  ...XX..  .XXX.X.  ...XX.X  .XXX.X.  .X.XX.X  XXX..X.  .X.XX.X  XXX..X.
.X.X.X.  X.X.X..  .X.X.X.  X.X....  ...XX..  X.X....  ...XX..  X.X....  ...XX..  X.X....  ...XX..
..XX...  .X.....  ..X.X..  .X.X...  X.X.X..  .X.X...  X.X.X..  .X.X...  X.X.X..  .X.X...  X.X.X..
..XX...  ..XX...  .XXX...  ..X.X..  .X.X...  ..X.X..  ...X...  ..X.X..  ...X...  ..X.X..  ...X...
.X.....  ..X....  .X.....  ..X....  .X.....  ...X...  ....X..  ...X...  ....X..  ...X...  ....X..
..XX...  ...X...  ..XX...  ...X...  ..X....  ...X...  ..X....  ...XX..  ..XX...  ...XX.X  ..XX...
XX.XX..  ..XX.X.  .X.XX.X  ..XX.X.  .X.XX.X  ..XX.X.  .X.XX.X  ..X..X.  .X.XX.X  ..X..X.  .X.XX.X

<examplar 3> ( O : Hebb; X : Iter )
.OO....  ...OO..  ..O.O..  ...OO..  ....O..  ....O..
O...OO.  .O...O.  .O..OO.  .O..OO.  .O..OO.  .O..OO.
.O..OO.  OO..OO.  .O..OO.  OO..OO.  OO..OO.  OO..OO.
..OOO..  .OOOOO.  .O..OO.  OO..OO.  OO..OO.  OO..OO.
OOO....  .OO.OO.  .O..OO.  OO..OO.  OO..OO.  OO..OO.
OO...O.  .O..OO.  OO..OO.  OO..OO.  OO..OO.  OO..OO.
OO.OOO.  .OOOO..  .OOOO..  .OOOO..  .OOOO..  .OOOO..

.XX....  ...XX..  ..XX...  ...XX..  ..XX...  ...XXXX  X.X....  ...X.XX  X.X....
X...XX.  .X..X..  ....XX.  .X.....  ....XX.  .X.....  ....XXX  .X.....  ....XXX
.X..XX.  ..X.XX.  .X..XX.  ..X.X..  .X.XXX.  X.X.X..  .X.XXX.  X.X.X..  .X.XXX.
..XXX..  .XXXX..  X.XX...  .XXXX..  X.X....  .X.XX..  X.X....  .X.XX..  X.X....
XXX....  .X.X...  X.X.X..  .X.X...  X.X.X..  .X.X...  X.X.X..  .X.X...  X.X.X..
XX...X.  XX..XX.  XX...X.  XX..XX.  XX...X.  XX..XX.  XX...X.  XX..XX.  XX...X.
XX.XXX.  XXX.XX.  .X.XXX.  X.X.X..  .X.X.X.  X.X.X..  .X.X.X.  X.X.X.X  .X.X.X.

<examplar 4> ( O : Hebb; X : Iter )
.OOOO..  .OOOO..  .OOOO..  ...OOO.  ....OO.  ....O..  ....O..  ....O..  ....O..
OO....O  .O..OO.  OO..OO.  OO..OO.  OO..OO.  OO..OO.  .O..OO.  .O..OO.  .O..OO.
....OO.  OO..OO.  OO..OO.  OO..OO.  OO..OO.  OO..OO.  OO..OO.  OO..OO.  OO..OO.
.OOOO.O  .OOOOO.  OO..OO.  OO..OO.  OO..OO.  OO..OO.  OO..OO.  OO..OO.  OO..OO.
....OOO  OO..OO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.  OO..OO.
.OOO...  .OOOO..  .OOOO..  .OOOOO.  .OOOOO.  .OOOOO.  .OOOOO.  .OOOO..  .OOOO..

.XXXX..  .XXXX..  ..XXX.X  .XXX...  ...XX.X  XXX....  ...XX.X  XXXX...  ...XX.X
XX....X  .X..XXX  XXX....  .X.XXXX  XXX..X.  .X.XXXX  XXX...X  .X.XXXX  XXX...X
....XX.  X...XX.  ....XXX  X...XX.  .X...X.  X.X.XXX  .X...X.  X.X.XXX  .X...X.
.XXXX.X  ..XXXXX  .X.XX.X  X.XX.XX  .X.XX.X  X.XX..X  .X.XXXX  X.XX..X  .X.XXXX
....XXX  X...XX.  ...XXXX  XXX.XX.  ...X.XX  XXX.XX.  ...X.XX  XXX.XX.  ...X.XX
XX..XX.  XX...XX  XX..XXX  XXX..XX  XX.XXXX  X.X..XX  .X.XXXX  X.X..XX  .X.XXXX
.XXX...  .XXXX.X  ..XX.X.  .X.XX.X  X.X..X.  .X.XX.X  X.X..X.  .X.XX.X  X.X..X.
```

```
<examplar 5> ( O : Hebb; X : Iter )
...OOO. ....O.. ....O.. ....O.. ....O.. ....O..
..OOOO. .O..OO. OO..OO. .O..OO. .O..OO. .O..OO.
OOO.OO. OO..OO. OO..OO. OO..OO. OO..OO. OO..OO.
OO...O. OO..OOO OO..OO. OO..OO. OO..OO. OO..OO.
OOOOOOO OO..OO. OO..OO. OO..OO. OO..OO. OO..OO.
....OO. OO..OO. OO..OO. OO..OO. OO..OO. OO..OO.
..O.OOO .O.OOO. .OOOOO. .OOOOO. .OOOO.. .OOOO..

...XXX. ...XXX. ...XXX. ...XXX. ...XX.. ...XXX. ...XX.. ...XXX. ...XX.. ...XXX. ...XX.. ...XXX.
..XXXX. ..XXXX. ..XXXX. ..XXXX. ..XXXX. ..XXXX. ..XXXX. ..XX.X. ..XXXX. ..XX.X. ..XXXX. ..XX.X.
XXX.XX. .X.XXX. X.X.XXX .X.X.X. X.X.XXX .X.X.X. X.X.XXX .X.X.X. X.X.XXX .X.X.X. X.X.XXX .X.X.X.
XX...X. XX...XX XX...X. XX..XXX XX...X. XX..XXX XX...X. .XX.XXX XX.X.X. .XX.XXX XXXX.X. .XX.XXX
XXXXXXX XXXXXXX XXXXXXX XXXXXXX XXXXXXX XXXX.XX XXXXXXX XXXX.XX XXX.XXX XXXX.XX XXX.XXX XXXX.XX
....XX. ....XX. ....XX. ....XX. ....XX. ...XXX. ..X..X. ...XXXX ..X..X. .X.XXXX X.X..X. .X.XXXX
..X.XXX .X.XXXX ..X.XXX .X.XXXX ..XXXXX ...XXXX ...XXXX ...XXX. ...XXXX ...XXX. ...XXXX ...XXX.

<examplar 6> ( O : Hebb; X : Iter )
OO.OOO. ..O.O.. ...OO.. ....O.. ....O..
.O....O .....O. .O..O.. .O..OO. .O..OO.
OOOOO.. .O..OO. OO..OO. OO..OO. OO..OO.
OO..OO. .O..OO. OO..OO. OO..OO. OO..OO.
...OO.. OO..OO. OO..OO. OO..OO. OO..OO.
O...OO. .O..OO. OO..OO. OO..OO. OO..OO.
.OOOO.. .OOOO.. .OOOO.. .OOOO.. .OOOO..

XX.XXX. X.X.XX. .X.X... ..X.XX. .X.X... ..X.XX. .X.X... ..X.XXX XX.X... ..X.XXX XX.X... ..X.XXX XX.X... ..X.XXX XX.X... .X....X X.X.... .X...X. X.X.... .X...X. X.X.... .X..XX. X.X.... .X..XXX X.X.... .X..XXX
X.XX... .X.XXXX X.XX... .X.XXXX XXXXX.. XXXX.X. XXXXX.. XX.X.X. XXX.X.. .X.X.X. X.X.X.X .X.X.X. X.X.X.X .X.X.X. X.X.X.X .X.X.X. X.X.X.X .X.X.X. X.X.X.X XX..XX. XX.XX.. XX..XX. .X.XX.. X....X. .X..X.X X....X.
.X..X.X X....X. .X..X.X X....X. .X..XXX X....X. .X..XXX X....X. ...XX.. X..XXX. X...X.. .X.X.X. X.X.X.X .X.X.X. X.X.X.X .X.X.X. X.X.X.X .X.X.X. X.X.X.X .X.X.X. X.X.X.X ...X.X. X.X.X.X X...XX. .X..XX. X.X.XX.
.X..XX. X.X..X. .X..X.. X.X..X. .X..X.. X.X..X. .X..X.. X.X..X. .X..X.. X.X..X. .X.XX.X X.X..X. .XXXX.. .XXXX.. .XXXX.. .XXXX.. .XXXX.. .XXXX.. .XXXX.. ..XXX.. .XXX... X.X.X.. .X.X... X.X.X.. .X.X... X.X.X..
.X.X...

<examplar 7> ( O : Hebb; X : Iter )
..OOO.O ..OOO.. ...OO.. ....O.. ....O..
.OO.O.. .O..OO. .O..OO. .O..OO. .O..OO.
O..O... OO..O.. OO..OO. OO..OO. OO..OO.
OOOOO.. .O..OO. OO..OO. OO..OO. OO..OO.
OO..OO. OO..OO. OO..OO. OO..OO. OO..OO.
OO..OO. OO..OO. OO..OO. OO..OO. OO..OO.
.OOOO.. .OOOO.. .OOOO.. .OOOO.. .OOOO..

..XXX.X ..XXX.. ..XXX.. .XXXX.. ..XXXX. .XXXX.. ..XXXX. .XXXX.. ..XXXX. .XXXX.. ..XXXX. XXXXX.. .XXXXX. XXXXX..
.XX.X.. .XX..X. .XX.X.X .XX..X. .XX.X.X .XX..X. .XX.X.X .XX..X. .XX.X.X .XX..X. .XX.X.X .XX..X. .XX.X.X .XX..X.
X..X... .X..X.. XXX..X. .X..X.X XXX..X. .X..X.X X.X..X. .X..X.X X.X..X. .X..XXX X.X..X. .X..XXX X.X..X. .X..XXX
XXXXX.. XXXXX.. .XXXX.. XXXXX.. .XXXXX. XXX.X.. .X.XXX. XXX.X.. .X.XXX. XXX.X.. .X.XXX. XXX.X.. .X.XXX. XXX.X..
XX..XX. XX..XX. XX..XX. XX..XX. XX..XX. XX..XX. XX..XX. X...XX. XX..X.. X...XX. .X..X.. X...XX. .X..X.. X...XX.
XX..XX. XX..XX. XX..XX. XX..XX. XX..XX. XX..XX. XX..XX. X...XX. .X..XX. X...XX. .X..XX. ....XX. .X..XX. ....XX.
.XXXX.. .XXXX.. .XXXX.. .XXXX.. .XXXX.. .XXX.X. .XX.X.X .XXX.X. ..X.X.X .X.X.X. ..X.X.X .X.X.X. ..X.X.X .X.X.X.

<examplar 8> ( O : Hebb; X : Iter )
OOOOOO. .OOOO.. .OOOO.. ..OOO.. ..OO... ..OO... ..OO...
OO..OO. OO..OO. .OO.... ..OO... ..OO... ..OO... ..OO...
....OO. .O..OO. ....O.. ..OO... ..OO... ..OO... ..OO...
...OOO. ..OOO.. ..OO... ..OO... ..OO... ..O.... ..O....
..OO..O ..O.... ..OO... ..OO... ..OO... ..OO... ..OO...
.O...O. ..O.... ..O.... ..OO... ..OO... ..OO... ..OO...
..OO... .OOOO.. .OOOO.. .OOO... ..OO... ..OO... ..OO...

XXXXXX. XXXXXX. .X..XXX XXXXX.. .X..XXX XXXXX.. .XX.XXX XXXXX.. .XX.XXX XXXX... ..X.XXX XXXX...
XX..XX. X...XX. XX.XXX. X...XX. XX.XX.. ..X.XX. XX.XX.. ..X.XX. XXXXX.. ..X.XXX XXXX... ..X.XXX
....XX. ...XXX. ..X.X.. ...XXX. ..X.X.. .X.XXXX ..X.... .X.XXXX X.X.... .X.XXXX X.X.... .X.XXXX
...XXX. ....X.. ...XXX. ..X.X.. ...XXX. ..X.X.. .X.XXX. X.X.X.. .X.XXX. X.X.... .X.XXXX X.X....
..XX..X ..X..X. ...X..X X.X.XX. .X.X..X X.X.XX. .X.X..X X.X.XX. .X.X..X X.X.XX. .X.X..X X.X.XX.
.X...X. X.X.... .X.XXX. X.X.... .X.XXX. X.X.... .X.XXX. X.X...X .X.XXX. X.X...X .X.XXX. X.X...X
..XX... .X.XX.. ..XXX.. .X.XXX. ..XXX.X .X.X.X. ..X.X.X .X.X.X. X.X.X.X .X.X.X. X.X.X.X .X.X.X.
```

```
<examplar 9> ( O : Hebb; X : Iter )
.OOOO..  .OOOO..  .OOOO..  .OOOO..  ...OOO.  ....OO.  ....O..  ....O..  ....O..  ....O..
OO..O..  .O..OO.  OO..OO.  OO..OO.  OO..OO.  OO..OO.  OO..OO.  .O..OO.  .O..OO.  .O..OO.
OO..OO.  OO..OO.  OO..OO.  OO..OO.  OO..OO.  OO..OO.  OO..OO.  OO..OO.  OO..OO.  OO..OO.
.OOOO..  .OOOOO.  .O..OO.  OO..OO.  OO..OO.  OO..OO.  OO..OO.  OO..OO.  OO..OO.  OO..OO.
OO..OO.  .O..OO.  OO..OO.  OO..OO.  OO..OO.  OO..OO.  OO..OO.  OO..OO.  OO..OO.  OO..OO.
.OOOO..  OO..OO.  OO..OO.  OO..OO.  OO..OO.  OO..OO.  OO..OO.  OO..OO.  OO..OO.  OO..OO.
OOO.O..  .OOOO..  .OOOO..  .OOOO..  .OOOOO.  .OOOOO.  .OOOOO.  .OOOOO.  .OOOO..  .OOOO..

.XXXX..  .XX.X..  .XXXXX.  .XX.X..  ..XXXX.  .XXXX..  ..XXXX.  XXXXX..  ..XXXXX  XXXXX..  ..XXXXX  XX.X...  ..X.XXX  XX.X...
XX..X..  .X..XX.  X...X..  .X..XX.  X...X..  .X..XX.  XX.....  ....XXX  XX.....  ....XXX  XX.X...  ..X.XXX  .X.X...  ..X.XXX
XX..XX.  XX..XX.  XX..XX.  XX..XX.  XX...X.  XX..X.X  .....X.  XX..X.X  ..X..X.  .X.XX.X  ..X..X.  .X.XX.X  ..X..X.  .X.XX.X
.XXXX..  XXXXXX.  XXXXX..  XXXXXX.  .X.XX..  X.X..X.  .X.XX.X  X.X..X.  .X.XX.X  X.X..X.  .X.XX.X  X.X..X.  .X.XX.X  X.X..X.
XX..XX.  X...X..  XX.X.X.  X.X.X..  .X.X.X.  X.X.X..  .X.X.X.  X.X.X..  .X.X.X.  X.X.X..  .X.X.X.  X.X.X..  .X.X.X.  X.X.X..
.XXXX..  XX.XX..  .XXXX..  X.XXXX.  .X.XX..  X.X..X.  .X.XX..  X.X..X.  .X.XX..  X.X..X.  .X.XX..  X.X..X.  .X..X..  X.X..X.
XXX.X..  .XXX.X.  .XX.X..  .XXX.X.  .XX.X..  .XXX.X.  .XX.X.X  .XXX.X.  XXX.X.X  .XXX.X.  X.X.X.X  .XXX.X.  X.X.X.X  .XXX.X.

<examplar 10> ( O : Hebb; X : Iter )
.OOOO..  .OOOO..  ..OOO..  ...OO..  ....O..  ....O..
OO..OO.  .O..OO.  .O..OO.  .O..OO.  .O..OO.  .O..OO.
OO..OO.  OO..OO.  OO..OO.  OO..OO.  OO..OO.  OO..OO.
.OOOOO.  .O..O..  .O..OO.  OO..OO.  OO..OO.  OO..OO.
....OO.  .O..OO.  OO..OO.  OO..OO.  OO..OO.  OO..OO.
...OO..  .O..O..  .O..OO.  OO..OO.  OO..OO.  OO..OO.
...O...  .OOOO..  .OOOO..  .OOOO..  .OOOO..  .OOOO..

.XXXX..  .XXXX..  .XXXX..
XX..XX.  XX..XX.  XX..XX.
XX..XX.  XX..XX.  XX..XX.
.XXXXX.  .XXXXX.  .XXXXX.
....XX.  ....XX.  ....XX.
...XX..  ...XX..  ...XX..
...X...  .......  .......

<examplar 11> ( O : Hebb; X : Iter )
..OO.OO  ....O..  O...OOO  OO..OOO  OO..OOO  OO..OOO
..OOO..  .O...OO  OO..OOO  OO..OOO  OO..OOO  OO..OOO
OOO.OO.  OO..OOO  OO..OOO  OO..OOO  OO..OOO  OO..OOO
OO..OO.  OO..OOO  OO..OOO  OO..OOO  OO.OOOO  OO.OOOO
OOOO.O.  OO..OOO  OO..OOO  OO..OOO  OO..OOO  OO..OOO
OO..OOO  OO..OO.  OO..OOO  OO..OOO  OO..OOO  OO..OOO
O...OO.  OO.OOOO  OOO.OOO  OO..OOO  OO..OOO  OO..OOO

..XX.XX  ...XX..  ..XX.XX  ...XX..  ..XX.XX  ...XX..  ..XX.XX  ...XX..  ..XX.XX
..XXX..  .XXXXXX  ..XX...  .XX.X.X  ...X.X.  XXX.X.X  ...X.X.  XXX.X.X  ...X.X.
XXX.XX.  .X.XXX.  XXX.XXX  .X.XXX.  XXX.XX.  .X.XX..  X.X.XX.  .X.XX..  X.X.XX.
XX..XX.  XX...X.  XXX.X.X  XX.X.X.  .XX.X.X  XX.X.X.  .XX.X.X  XXXX.X.  .XX.X.X
XXXX.X.  XXX.X.X  XXXX.X.  .XX.X.X  XXXX.X.  .XX.X.X  XXXX.X.  .X..X.X  XXXX.X.
XX..XXX  XXX..X.  .X..XXX  XXX..X.  .X..X.X  XXX..X.  .X..X.X  XXXX.X.  .X..X.X
X...XX.  XX..XX.  X..XXX.  ..X.XXX  .X.X...  ..X.XXX  .X.X.X.  X.X.XXX  .X.X.X.

<examplar 12> ( O : Hebb; X : Iter )
OOOOOOO  OOOOOO.  OOOOOOO  OOOOOOO  OO..OOO  OO..OOO  OO..OOO
.OO..OO  OOO.OOO  OOO.OOO  OO..OOO  OO..OOO  OO..OOO  OO..OOO
.OO.O.O  OOO..OO  OOO.OOO  OO..OOO  OO..OOO  OO..OOO  OO..OOO
.OOOOO.  .OOOOOO  OOOOOOO  OOOOOOO  OOOOOOO  OO.OOOO  OO.OOOO
.O...OO  OOO.OOO  OOO.OOO  OO..OOO  OO..OOO  OO..OOO  OO..OOO
....OOO  OOO..OO  OOO.OOO  OO..OOO  OO..OOO  OO..OOO  OO..OOO
OOOOO..  OOOOOOO  OOO.OOO  OO..OOO  OO..OOO  OO..OOO  OO..OOO

XXXXXXX  XXXXXX.  XXXXXX.  XXXXX..  .XXXXX.  XXXXX..  .XXXXX.  XXXXX..  .XXXXX.  XXXXX..
.XX..XX  .XX.X.X  .XX..X.  .XX.XXX  .XXX.X.  .XX.XXX  .XXX.X.  .XX.XXX  .XXX.X.  .XX.XXX
.XX.X.X  .XXX.X.  .XX.X.X  .XXX.X.  .XX.X.X  .XXX.X.  .XX.X.X  .XXX.X.  .XX.X.X  .XXX.X.
.XXXXX.  .XXXXX.  .XXXXX.  .XX.XX.  .XXXXX.  .XX.XX.  .XXXXX.  .XX..X.  .XXXXX.  .XX..X.
.X...XX  .XX.XX.  .X.XXX.  .XX.XX.  .X.XXX.  .XX.XX.  .X.XXX.  .XX.XX.  .X.XXXX  .XX.XX.
....XXX  XX...X.  .X..XX.  XX...X.  .X..XX.  XX.....  .X..XX.  XX.....  .X..XX.  XX.....
XXXXX..  .XXXX..  XXXX...  .XX.X..  XXXX...  .XXXXX.  X.XX...  .X.XXX.  X.XX...  .X.XXX.
```

```
<examplar 13> ( O : Hebb; X : Iter )
..OO.O.  ..OOO..  ..OO...  ..OO...  ..OO...  ..OO...  ..OO...
.O...OO  .OO....  ..O....  ..O....  ..OO...  ..OO...  ..OO...
OOO....  .O.....  .OO....  .OO....  ..OO...  ..OO...  ..OO...
OO.....  OO.....  .OO....  ..O....  ..O....  ..O....  ..O....
OO.....  .OO..O.  .OO....  ..O....  ..O....  ..OO...  ..OO...
.OO..OO  .OO..O.  .OO....  ..O....  ..OO...  ..OO...  ..OO...
..OOOO.  .OOOO..  .OOOO..  .OOOO..  ..OO...  ..OO...  ..OO...

..XX.X.  ...XX..  ..XX.X.  ....X..  ..XX.X.  ....X..  ..XX.X.  ....X..  ..XX.X.  ...XX..  ..XX.X.
.X...XX  .XX...X  .X...X.  XXX...X  .X...X.  X.X...X  .X...X.  XXX.X.X  .X.X.X.  XXX.X.X  .X.X.X.
XXX....  XX.....  XXX....  .X.....  X.X....  .X.....  X.X..X.  .X..X..  X.X..X.  .X..X..  X.X..X.
XX.....  XX.....  XX.....  XX.....  XX.....  XXXX.X.  XXX.X..  XX.X.X.  XXX.X.X  XX.X.X.  XXX.X.X
XX.....  .X.....  XXX....  .X..X..  XXX....  .X..X..  XXX..X.  ....X..  XX...X.  ....X..  XX...X.
.XX..XX  XXX..X.  .X..X.X  XXX..X.  .X..X.X  XXX..X.  .X..X.X  XXX..X.  .X..X.X  XXX..X.  .X..X.X
..XXXX.  ..XXXX.  .X.XX..  X.X.XX.  .X.X...  X.X.XX.  .X.X...  X.X.XX.  .X.X...  X.X.XX.  .X.X...

<examplar 14> ( O : Hebb; X : Iter )
OOOOO.O  OOOOOOO  OOOOOOO  OOO.OOO  OO..OOO  OO..OOO  OO..OOO
OOO.OO.  OOO.OOO  OO..OOO  OO..OOO  OO..OOO  OO..OOO  OO..OOO
.OO..OO  OOO..OO  OOO.OOO  OO..OOO  OO..OOO  OO..OOO  OO..OOO
.OOO.OO  .OOOOOO  OOOOOOO  OOOOOOO  OOOOOOO  OO.OOOO  OO.OOOO
OOO..OO  .OO.OOO  OOO.OOO  OO..OOO  OO..OOO  OO..OOO  OO..OOO
..O.OO.  OOO.OOO  OO..OOO  OO..OOO  OO..OOO  OO..OOO  OO..OOO
OOOOO.O  OOOOOOO  OOO.OOO  OO..OOO  OO..OOO  OO..OOO  OO..OOO

XXXXX.X  XXXXXX.  XXXXX..  .XXXXX.  XX.XX..  .XXXXX.  XX.XX..  .XXXXX.  .X.XX..  .XXXXX.  .X.XX..  .XX.XX.  .X.XX..  .XXXXX.  .X.XX..  .XX.XX.  .X.XX..  XXX.XX.  .X.XX..
XXX.XX.  XXXXXX.  XXX.XX.  XX.XXX.  X.X.XX.  XX.X.X.  X.X.X.X  .X.X.X.  X.X.X.X  .X.X.X.  X.X.X.X  .X.X.X.  X.X.X.X  ...X.X.  X.X.X..  ...X.X.  X.X.X..  ...X.X.  X.X.X..
.XX..XX  .XX..XX  XXX.XXX  .XXX.X.  X.X.X.X  .X.X.X.  X.X.X.X  .X.X.X.  X.X.X.X  .X.X.X.  X.X.X.X  .X.X.X.  X.X.X.X  .X.X.X.  X.X.X.X  .X.X.X.  X.X.X.X  .X.X.X.  X.X.X.X
.XXX.XX  .XX..XX  .XXX.XX  .XX.XXX  .XXX.X.  .XX.X.X  .X.X.X.  XXX.X.X  .X.X.X.  XXX.X.X  .X.X.X.  XXX.X.X  .X.X.X.  ..X.X.X  .X.X.X.  ..X.X.X  .X.X.X.  ..X.X.X  .X.X.X.
XXX..XX  XXXX.XX  XXXXXXX  XXXX.XX  XXXXXXX  XXXX.XX  XXXXX.X  XXXX.XX  XXXXX.X  X.XX.XX  XX.XX.X  X.XX.X.  .X.XX.X  X.XX.X.  .X..X.X  X..X.X.  .X..X.X  X.XX.X.  .X..X.X
..X.XX.  .X..XXX  X.X..X.  .X.XXXX  X.X..X.  .X.XX.X  X.X..X.  .X.XX.X  ..X..X.  .X.XX.X  ..X..X.  .X.XX.X  X.XX.X.  .X.XX.X  X.XX.X.  .X.XX.X  X.XX.X.  .X.XX.X  X.XX.X.
XXXXX.X  .XXXXX.  XXXXXXX  .XXXXXX  ..XXXXX  .X.XXXX  ..XXXXX  .X.XXXX  ..XXXXX  .X.XXXX  ..X.XXX  .X.X.XX  ..X.XXX  .X.X.XX  ..X.XXX  .X.X.X.  ..X.X.X  .X.X.X.  ..X.X.X

<examplar 15> ( O : Hebb; X : Iter )
OOO.OOO  OOOOOO.  OOOOOO.  OOOOOO.  OOOOOOO  OOOOOOO  OO..OOO  OO..OOO  OO..OOO
.OO..OO  OOO..OO  .OO..OO  OOO..OO  OOO.OOO  OO..OOO  OO..OOO  OO..OOO  OO..OOO
.O..O..  .OO..O.  .OO..O.  OOO..OO  OOO..OO  OO..OOO  OO..OOO  OO..OOO  OO..OOO
.OOOO..  .OOOO..  .OOOOO.  .OOOOO.  OOOOOOO  OOOOOOO  OOOOOOO  OO.OOOO  OO.OOOO
.OO.O..  .OO..O.  .OO..OO  .OO.OOO  OOO.OOO  OOO.OOO  OO..OOO  OO..OOO  OO..OOO
.OOO..O  .OO..OO  .OO..OO  .OO..OO  OOO.OOO  OO..OOO  OO..OOO  OO..OOO  OO..OOO
OOOOOOO  OOOO.O.  OOOOOOO  OOOOOOO  OOOOOOO  OO..OOO  OO..OOO  OO..OOO  OO..OOO

XXX.XXX  XXXXXXX  XXXXXXX  XXXXXXX  XXXXXXX
.XX..XX  .XX...X  .XX..XX  .XX...X  .XX..XX
.X..X..  ..X.XX.  .X..X..  ..X.XX.  .X..X..
.XXXX..  .XXXX..  ..XXX..  .XXXX..  ..XXX..
.XX.X..  .XX.X..  .XX.X..  .XX.X..  .XX.X..
.XXX..X  .XX...X  .XX..X.  .XX.X.X  .XX..X.
XXXXXXX  XXXX.XX  XXXX.XX  XXXXXXX  XXXX.XX

<examplar 16> ( O : Hebb; X : Iter )
O.....O  ..OO...  ..OO...  ..OO...  ..OO...
.OO...O  ..O....  ..OO...  ..OO...  ..OO...
..O.O..  .OOO...  ..OO...  ..OO...  ..OO...
.O.O...  ..OO...  ..OO...  ..O....  ..O....
..O....  ..O....  ..OO...  ..OO...  ..OO...
.OO....  ..O....  ..OO...  ..OO...  ..OO...
OOOO...  .OOO...  ..OO...  ..OO...  ..OO...

X.....X  ..X..X.  X......  .XX..X.  X.X....  .XX..X.  X.X....  .XXX...  X.X....  .X.X...  X.X....  .X.X...
.XX...X  .X.....  ..X...X  .X.....  ..X...X  .X.....  ..X.X.X  .X.....  X.X.X.X  .X...X.  X..XX..  .X...X.
..X.X..  .X.X.X.  X.X.X..  .X.X.X.  X.X.X..  .X.X.X.  X.X.X..  .X.X.X.  X.X.X.X  .X.X.X.  X.X.X.X  .X.X.X.
.X.X...  X.X.X..  .X.X.X.  X.X.X..  .X.X.X.  X.X.X..  .X.X.X.  X.X.X.X  .X.X.X.  ..X.X.X  .X.X.X.  ..X.X.X
..X....  .XX....  ..X....  ...X...  ..X.X..  ...X.X.  ..X.X..  .X.X.X.  ..X.X..  ...X.X.  ..X.X..  ...X.X.
.XX....  ..X...X  .XX....  ..X...X  .XXX...  ..X...X  .X.X...  X.X.X.X  .X.X.X.  X.X.X.X  .X.X.X.  X.X.X.X
XXXX...  XXX....  XXX....  XXX....  XXX....  XXX....  XXX....  XXX....  .XXX...  XXX....  .XXX...  XXX....
```

```
<examplar 17> ( O : Hebb; X : Iter )
..O.O..  ...O...  ....O..  ....O..
.OO....  .O...O.  .O..OO.  .O..OO.
OO.....  OO..OO.  OO..OO.  OO..OO.
OO.....  OO..OO.  OO..OO.  OO..OO.
OO..OOO  OO..OO.  OO..OO.  OO..OO.
.O...OO  OO..OO.  OO..OO.  OO..OO.
..OOOOO  .OOOOO.  .OOOO..  .OOOO..

..X.X..  .X.X...  ..X.X..  .X.X...  ..X.XXX  .X.X...  ..X.XXX
.XX....  .XX...X  XXXX...  .XX..XX  XXXX..X  .XX..XX  XXXX..X
XX.....  XX.....  XX.....  XX.....  XX.....  X...X..  XX.....
XX.....  XX..X..  XX.X.X.  XX..X.X  XX.X.X.  XX..X.X  XX.X.X.
XX..XXX  XX..XXX  XX..XXX  XX..XXX  XX..XXX  XX..XXX  XX..XXX
.X...XX  ..X.X.X  .X.X.XX  X.X.X.X  .X.X.XX  X.X.X.X  .X.X.XX
..XXXXX  .X.XXXX  ..XXXXX  .X.XXXX  ..XXXXX  .X.XXXX  ..XXXXX

<examplar 18> ( O : Hebb; X : Iter )
OO..OO.  OO..OOO  OO..OOO  OO..OOO
OO.OOO.  OO..OOO  OO..OOO  OO..OOO
OO..OO.  OO..OOO  OO..OOO  OO..OOO
OOOOOO.  OO.OOOO  OO.OOOO  OO.OOOO
OO..OO.  OO..OOO  OO..OOO  OO..OOO
OO..OOO  OO..OOO  OO..OOO  OO..OOO
OO...O.  OOO.OOO  OO..OOO  OO..OOO

XX..XX.  XX..XXX  XXX.XX.  .X..X.X  XXX..X.  .X..X.X  XXXX.X.  .X..XXX  XXXX.X.  .X..XXX  XXXX...  ..X.XXX  XXXX...
XX.XXX.  XXX.XXX  XX.XXX.  XXX.XXX  XX.X.X.  XXX.X.X  .X...X.  XXX.X.X  .X...X.  XXX.X.X  .X...X.  XXX.X.X  .X...X.
XX..XX.  XX..XX.  XX..XX.  XX...X.  XX..XXX  XX...X.  XX..XXX  XX.....  XX..XXX  XX.....  XX..XXX  XX.....  XX..XXX
XXXXXX.  XX.XXX.  XXXXX..  .X.XXX.  XXX.X..  .X.XXX.  X.X.X..  .X.XXX.  X.X.X..  .X.XXX.  X.X.X..  .X.XXX.  X.X.X..
XX..XX.  XX..XX.  XX..XX.  XX..XX.  XX..XX.  XX..X..  X...XX.  .X..X..  X...XX.  .X..X..  X...XX.  .X..X..  X...XX.
XX..XXX  XX.XX..  X...XXX  XX.XXX.  X...XXX  XX.XXX.  X...X.X  .X.X.X.  X.X.X.X  .X.XXX.  X.X.X.X  .X.XXX.  X.X.X.X
XX...X.  XX..XX.  XX...X.  XX..XXX  .X...X.  X.X.X.X  .X.X.X.  X.X.X.X  .X.X.X.  X.X.X.X  .X.X.X.  X.X.X.X  .X.X.X.

<examplar 19> ( O : Hebb; X : Iter )
.OOOO..  ..OO...  ..OO...  ..OO...
O.OO...  ..OO...  ..OO...  ..OO...
..OO.O.  ..OO...  ..OO...  ..OO...
..OO...  ..OO...  ..O....  ..O....
..OO...  ..OO...  ..OO...  ..OO...
..O....  ..OO...  ..OO...  ..OO...
.OOO...  ..OO...  ..OO...  ..OO...

.XXXX..  .XXX.X.  .XXXX..  .XXX.X.  .XXXX..  .XXX.X.  .X.XX.X  XXX..X.  .X.XX.X  XXX..X.
X.XX...  ...X.X.  X.X....  .X.X...  X.X....  .X.XX..  X.X....  ...XX..  XXX....  ...XX..
..XX.X.  ..XXX..  .X.X...  X.X.X..  .X.X...  X.X.X..  .X.X...  X.X.X..  .X.X...  X.X.X..
..XX...  ...X...  ..XX...  ...X...  ..X.X..  ...X...  ..X.X..  ...X...  ..X.X..  ...X...
..XX...  ..XX...  ..XX...  ..XX...  ..XX...  ..X....  ...X...  ..X.X..  ...X...  ..X.X..
..X....  ..XX...  ..XX...  ..XX...  ..XX...  .XXX...  X.XX...  .XXX...  X.XXX.X  .XXX...
.XXX...  .XXXX..  ..XXXX.  .X.XX.X  ..X..X.  .X.XX.X  X.XX.X.  .X.XX.X  X.X..X.  .X.XX.X

<examplar 20> ( O : Hebb; X : Iter )
...OOOO  ....OO.  ....O..  ....O..  ....O..  ....O..
....OO.  OO..OO.  OO..OO.  .O..OO.  .O..OO.  .O..OO.
O...OOO  OO..OO.  OO..OO.  OO..OO.  OO..OO.  OO..OO.
....OO.  OO..OO.  OO..OO.  OO..OO.  OO..OO.  OO..OO.
OO..OO.  OO..OO.  OO..OO.  OO..OO.  OO..OO.  OO..OO.
OO..OO.  OO..OO.  OO..OO.  OO..OO.  OO..OO.  OO..OO.
..O.O..  .OOOOO.  .OOOOO.  .OOOOO.  .OOOO..  .OOOO..

...XXXX  ....XXX  ...XXX.  ....X..  ...X.X.  ....X..  ...X.X.
....XX.  ....XX.  ....XX.  ..X..X.  ....X..  ..X..X.  ....X..
X...XXX  .X.XXX.  X.X.XX.  .X.XXX.  X.X.XX.  .X.XXX.  X.X.XX.
....XX.  XX..XXX  XX.XXX.  XXX.XXX  XX.XXX.  XXX.XXX  XX.XXX.
XX..XX.  XX..XX.  XX..XX.  X...XX.  XX..XX.  X...XX.  XX..XX.
XX..XX.  XX..XX.  XX..XX.  XX..XX.  .X..XX.  X...XX.  .X..XX.
..X.X..  .X.X...  ..X.X..  .X.X.X.  ..X.X.X  .X.X.X.  ..X.X.X
```

```
<examplar 21> ( O : Hebb; X : Iter )
0000.00  000.00.  0000000  000.000  00..000  00..000  00..000
.00..00  000..00  000..00  00..000  00..000  00..000  00..000
.0..0..  000..00  000.000  00..000  00..000  00..000  00..000
.0000..  .00000.  0000000  0000000  0000000  00.0000  00.0000
000.00.  .00.000  000.000  000.000  00..000  00..000  00..000
.00..00  .00..00  000.000  00..000  00..000  00..000  00..000
.0....0  0000.00  000.000  00..000  00..000  00..000  00..000

XXXX.XX  .XX.XXX  XXXX.X.  .XX.XXX  XXXX.X.  .XX.XX.  XXXX.XX  .XX.XX.  XXXX.XX
.XX..XX  .XX...X  .XX..XX  XXX...X  .XX..XX  XXX...X  .XX..XX  XXXXX.X  .XX..XX
.X..X..  .X...X.  X.X.XXX  .X.....  X.X.XXX  .X.....  X.X.XXX  .X.....  X.X.XXX
.XXXX..  .XXXXX.  .XX.X..  XXXXXX.  .X..X..  X.XXXX.  .X..X..  X.XXXX.  .X..X..
XXX.XX.  .X..XX.  XXX.XX.  .X..X.X  XXX..X.  .X..X.X  X.X..X.  .X..X.X  X.X..X.
.XX..XX  XXX..X.  .X..X.X  XXX..X.  .X..X.X  XXX..X.  .X..X.X  XXX..X.  .X..X.X
.X....X  X.X..XX  .X.X.X.  X.X.XXX  .X.X.X.  X.X.X.X  .X.X.X.  X.X.X.X  .X.X.X.

<examplar 22> ( O : Hebb; X : Iter )
0000...  .0000..  .0000..  ..000..  ..00...  ..00...  ..00...
.0.....  .00....  .00....  .00....  ..0....  ..00...  ..00...
.00..0.  .00....  .00....  .00....  .00....  ..00...  ..00...
.0.....  .000...  .000...  .000...  ..00...  ..0....  ..0....
.0....0  .00....  .00....  ..0....  ..0....  ..00...  ..00...
..0..00  .00..0.  .00....  ..0....  ..00...  ..00...  ..00...
00.0000  000000.  .0000..  .0000..  .0000..  ..00...  ..00...

XXXX...  X.X.X..  XXXX...  X.X.X..  XXXX...  XXX.X..  XXXX.X.  XXX.X.X  XXXX.X.  XXX.X.X  XXXX.X.  XXX.X.X
.X.....  XXX....  .X.....  XXX....  .X.....  XXX....  .X.....  XXX....  .X.....  XXX....  .X.X...  XXX....
.XX..X.  XXX....  XXX....  .X.....  X.X....  .X.X...  X.X....  .X.X...  X.X.X..  .X.X...  X.X.X..  .X.X...
.X.....  .......  .......  .......  .......  .......  ....X..  .......  ...X...  ....X..  ...X...  ....X..
.X....X  ..X...X  .X....X  ..X...X  .X.....  ..X...X  .X.....  ..X....  .X..X..  ..X....  .X..X..  ..X....
..X..XX  .X...XX  ..X..XX  .X.X.XX  ..X...X  .X.X.X.  ..X...X  .X.X...  X.X....  .X.X..X  X.X....  .X.X..X
XX.XXXX  X.XXXXX  XX.XXXX  XXXXXXX  XXXXXXX  XXXXXX.  XXXXX.X  XXXX.X.  XXX.X.X  XXXX.X.  XXX.X.X  XXXX.X.

<examplar 23> ( O : Hebb; X : Iter )
00...00  00..000  00..000  00..000  00..000
00..000  00..000  00..000  00..000  00..000
0000.00  00..000  00..000  00..000  00..000
0000000  0000000  0000000  00.0000  00.0000
00.0.00  000.000  00..000  00..000  00..000
000..0.  00..000  00..000  00..000  00..000
00..000  00...00  00..000  00..000  00..000

XX...XX  XX...X.  XX...X.  XX...X.  XX...X.  XX...X.
XX..XXX  XXX..X.  XX..X.X  XXX..X.  XX..X.X  XXX..X.
XXXX.XX  XXXXXXX  XXXX.X.  XXXXX.X  XXXX.X.  XXXXX.X
XXXXXXX  XXXXXXX  XXXXXXX  XXXXXX.  XXXXXX.  XXXXXX.
XX.X.XX  X.XXXXX  XX.X.XX  X.XX.XX  .X.X.XX  X.XX.XX
XXX..X.  XX..XXX  XXX..X.  .X..XXX  XXX..X.  .X..XXX
XX..XXX  XX...X.  XX..XXX  XX.X.X.  XX..XXX  XX.X.X.

<examplar 24> ( O : Hebb; X : Iter )
00...00  00..000  00..000  00..000  00..000
000..0.  00..000  00..000  00..000  00..000
0000000  00..000  00..000  00..000  00..000
.0.0000  0000000  0000000  00.0000  00.0000
00...00  000.000  00..000  00..000  00..000
.0...0.  00..000  00..000  00..000  00..000
00...00  00...00  00..000  00..000  00..000

XX...XX  XX...X.  XX...XX  XX...X.  XX...XX  XX...X.  X....XX  XX.....  .....XX  XX.....  ....XXX  XX.X...  ..X.XXX  XXXX...  ..X.XXX  XXXX...
XXX..X.  XXX..XX  XXX...X  XXX..XX  XXX...X  XXX..XX  XXXX..X  .XX..XX  XXXX...  ..X.XXX  XXXX...  ..X.XXX  XXXX...  ..X.XXX  XXXX...  ..X.XXX
XXXXXXX  XXXXXX.  X.XXXXX  XX.XXX.  X.X.XX.  .X.XXX.  X.X.XX.  .X.XXX.  X.X.XX.  .X.XXX.  X.X.XX.  .X.XXX.  X.X.X..  .X.XXX.  X.X.X..  .X.XXX.
.X.XXXX  X.X.XXX  .X.XXXX  X.X.XXX  .X.XXXX  X.X.XXX  .X.XXX.  X.X.XXX  .X.XXX.  X.X.X.X  .X.XXX.  X.X.X.X  .X.XXX.  X.X.X..  .X.XXX.  X.X.X..
XX...XX  XX..XXX  XX...XX  X...XXX  XX...XX  X...XXX  .X.X.XX  X.X.XXX  .X.X.XX  X.X.XX.  .X.X.XX  X.X.XX.  .X.X.XX  X.X.XX.  .X.X..X  X.X.XX.
.X...X.  XXX..XX  .X...XX  XXX..XX  .X...XX  X.X..XX  .X...XX  X.X..XX  .X...XX  X.X..XX  .X.XXX.  X.X..XX  .X.XXX.  X.X...X  .X.XXX.  X.X...X
XX...XX  XXX..XX  XX...XX  XXX..XX  XX...XX  XX...XX  X...XXX  XX.X.XX  X.X.X.X  .X.X.X.  X.X.X.X  .X.X.X.  X.X.X.X  .X.X.X.  X.X.X.X  .X.X.X.
```

```
<examplar 25> ( O : Hebb; X : Iter )
..OO.O.  ..OOO..  ....O..  ....O..
.O..O..  .O...O.  .O..OO.  .O..OO.
OO....O  OO..OO.  OO..OO.  OO..OO.
.O....O  OO..OO.  OO..OO.  OO..OO.
OO...O.  OO..OO.  OO..OO.  OO..OO.
.OO.OO.  OO..OO.  OO..OO.  OO..OO.
..OOOO.  .OOOO..  .OOOO..  .OOOO..

..XX.X.  ..XXX..  ..XXXX.  .XXXX..  ..XXXX.  .XXXX..  ..XXXX.  .XXXX..  ..XXXX.  .XXXX..  ..XXXX.
.X..X..  .XX..X.  ..X....  .XX..X.  ..X....  .XX.XXX  .XXX...  .XX.XXX  .XXX...  .XX.XXX  .XXX...
XX....X  XX...X.  XXX...X  .X.X.X.  X.X.X.X  .X.X.X.  X.X.X.X  .X.X.X.  X.X.X.X  .X.X.X.  X.X.X.X
.X....X  XXX..X.  .X.XX..  XXX..X.  .X.XX..  XXX..X.  .X.XX.X  XXX..X.  .X.XX..  X.X..X.  .X.XX..
XX...X.  XX..X.X  XX...X.  XXX.X.X  XX.X.X.  X.X.X.X  .X.X.X.  X.X.X..  .X.X.X.  X.X.X..  .X.X.X.
.XX.XX.  XXX.XX.  .XX.XX.  XXX.XX.  .XX.XX.  XXX..X.  .XX.X..  X.XX.X.  .XX.X..  X.XX.X.  .XX.X..
..XXXX.  .XXXXX.  .XXXX..  .XXXXX.  XXXXX..  .XXXXX.  X.XXX..  .XXX.X.  ..X.X..  .XXX.X.  ..X.X..

<examplar 26> ( O : Hebb; X : Iter )
.OOOOO.  OOOOO..  .OOOO..  ..OOO..  ..OO...  ..OO...  ..OO...
.OO..OO  .OO..O.  .OO....  .OO....  ..OO...  ..OO...  ..OO...
.OO..OO  .OO....  .OO....  .OO....  ..O....  ..OO...  ..OO...
.OOOO..  .OOO...  .OOO...  ..OO...  ..OO...  ..O....  ..O....
.OO....  .OO....  ..O....  ..O....  ..O....  ..OO...  ..OO...
.OO....  .OO....  .OO....  ..O....  ..OO...  ..OO...  ..OO...
OOOO...  OOOOO..  .OOOO..  .OOOO..  .OOOO..  ..OO...  ..OO...

.XXXXX.  XXXXXX.  XXXXXX.  XXX.XX.  XX.XXX.  XXX.X..  XXXXXX.  XXX.X..  XXXX.X.  XXX.X..  XXXX.X.  XXX.X..  XXXX.X.  XXX.X..
.XX..XX  .XX..XX  .XX..XX  XXXXXXX  .XX..X.  XXX.XXX  .XX..X.  XXX.X.X  .XX..X.  XXX.X.X  .XX..X.  XXX.X.X  .XX..X.  XXX.X.X
.XX..XX  .XX..XX  .XX..XX  .XX...X  .XX..XX  .XX..XX  .XX..XX  .XX...X  .XX..XX  .XX...X  .XX..XX  .XX...X  .XX..XX  .XX...X
.XXXX..  XXXX.X.  .XX.X..  XXXX.X.  .XX.X..  .XXX.X.  .XX.X.X  .XXX.X.  .XX.X.X  XXXX.X.  .XX.X.X  XXXX.X.  .XX.X.X  XXXX.X.
.XX....  .XX.X..  .XXX.X.  .XX.X..  .XXX.X.  .XX.X..  .XXX.X.  .XX.X.X  XXXX.X.  .XX.X.X  XXXX.X.  .XX.X.X  XXXX.X.  .XX.X.X
.XX....  .XX..X.  .XX.X..  .XX..X.  .XX.X.X  .XX..X.  .XX.X.X  .XX..X.  .XX.X.X  .XX..X.  .X..X.X  XXX..X.  .X..X.X  XXX..X.
XXXX...  .XXXX..  XXXXX..  .XXXX..  XXXX...  .XXXX.X  XXXX...  ..X.X..  XX.X...  ..X.XXX  XX.X...  X.X.XXX  XX.X.X.  X.X.XXX

<examplar 27> ( O : Hebb; X : Iter )
.O.OO..  ..OOOO.  ...OO..  ....OO.  ....O..  ....O..  ....O..  ....O..
OOOOOO.  .O..OO.  OO..OO.  .O..OO.  OO..OO.  .O..OO.  .O..OO.  .O..OO.
OO..OO.  OO..OO.  OO..OO.  OO..OO.  OO..OO.  OO..OO.  OO..OO.  OO..OO.
OO..OO.  OO..OO.  OO..OO.  OO..OO.  OO..OO.  OO..OO.  OO..OO.  OO..OO.
OO.OOO.  OO..OO.  OO..OO.  OO..OO.  OO..OO.  OO..OO.  OO..OO.  OO..OO.
.OOOO..  OO..OO.  OO..OO.  OO..OO.  OO..OO.  OO..OO.  OO..OO.  OO..OO.
...OOO.  .OOOO..  .OOOOO.  .OOOOO.  .OOOOO.  .OOOOO.  .OOOO..  .OOOO..

.X.XX..  ..X.XX.  .X.XX..  ..X.XX.  ...XX..  ..X.XX.  ...XX..  .XX.XX.  ...XX..  .XX.XX.  X..XX..  .XX.XX.
XXXXXX.  XX.XXX.  XXX.XX.  .X.XXX.  X.X.XX.  .X.XXX.  X.X.XX.  .X.XXX.  X.X.XX.  .X.XXX.  X.X.XX.  .X.XXX.
XX..XX.  XX..XX.  XX..XX.  XX..XX.  XX..XX.  X...XX.  .X..XX.  X.X.XX.  .X..XX.  X.X.XX.  .X..XX.  X.X.XX.
XX..XX.  XX..XX.  XX..XX.  XX..XX.  XX..XX.  XX..XX.  XX..XX.  XX..XX.  .X..XX.  XX..XX.  .X..XX.  XX..XX.
XX.XXX.  XX..XX.  XX.XXX.  XX..XX.  XX.XXX.  XX..XX.  X..XXX.  XX..XX.  X..XXX.  .X..XX.  X..XXX.  .X..XX.
.XXXX..  ..XXX..  ...XX..  ...XXX.  ....X..  ...XXX.  ....X..  ...XXX.  ....X..  ...XXX.  ....X..  ...XXX.
...XXX.  ...XXX.  ..XXXX.  .X.XX.X  ..X..X.  .X.XX.X  ..X..X.  .X.XX.X  ..X..X.  .X.XX.X  ..XX.X.  .X.XX.X

<examplar 28> ( O : Hebb; X : Iter )
OOOOOO.  OOOOOOO  OOOOOOO  OOOOOOO  OO..OOO  OO..OOO  OO..OOO
.OO.OOO  OOO..OO  OOO.OOO  OO..OOO  OO..OOO  OO..OOO  OO..OOO
.OOO.OO  OOO.OOO  OOO..OO  OO..OOO  OO..OOO  OO..OOO  OO..OOO
OOOOOO.  .OOOOOO  OOOOOOO  OOOOOOO  OOOOOOO  OO.OOOO  OO.OOOO
.OO.OO.  OOO.OOO  OOO.OOO  OO..OOO  OO..OOO  OO..OOO  OO..OOO
..O..OO  .OO..OO  OOO.OOO  OO..OOO  OO..OOO  OO..OOO  OO..OOO
.OO..OO  OOOOOOO  OOO.OOO  OO..OOO  OO..OOO  OO..OOO  OO..OOO

XXXXXX.  XXX.XX.  XXXXXX.  XXX.XXX  XXXX...  ..X.XXX  XXXX...  ....XXX  XXXX...  ....XXX  XXXX...  ....XXX  XXXX...  ....XXX  XXXX...
.XX.XXX  .XXX.XX  .XX.XXX  .XXX.X.  .XX.XXX  XXXX...  .X..XXX  XXXX...  ....XXX  XXXX...  ....XXX  XXX....  ....XXX  XXXX...  ....XXX
.XXX.XX  .XX..XX  .XXX.XX  .XX...X  .XXX.XX  .XX...X  .XXXXXX  .XX....  X.XXXXX  .X.....  X.XXXXX  .X.....  X.XXXXX  .X.....  X.XXXXX
XXXXXX.  .XXXXX.  XXX.XX.  .X.XXX.  XXX..X.  .X.XXXX  XXX..X.  .X.XXXX  X.X..X.  .X.XXXX  X.X....  .X.XXXX  X.X....  .X.XXXX  X.X....
.XX.XX.  XXXXXXX  .XX.XX.  XXXXXX.  .XX.XX.  .XXXXX.  XXX.XX.  .X.X.XX  X.X.XX.  .X.X.XX  XXX.XX.  ...X..X  XXX.XX.  ...X..X  XXX.XX.
..X..XX  .X..XX.  X.X..X.  .X..XX.  X.X.X..  .X..XX.  X.X....  .X..X..  X.X....  .X.XXX.  X.X...X  .X.XXX.  X.X...X  .X.XXX.  X.X...X
.XX..XX  X.X....  .X....X  X.X....  .X....X  X.X....  .X.X..X  X.X....  .X.X...  X.X....  .X.X..X  X.X..X.  .X.XX.X  X.X..X.  .X.XX.X
```

```
<examplar 29> ( O : Hebb; X : Iter )
.O.OO.O .OOOOO. .OOOOO. .OOOOO. .O.OOO. ....OO. ....O.. ....O.. ....O.. ....O..
OO..OOO OO..OO. OO..OO. OO..OO. OO..OO. OO..OO. OO..OO. .O..OO. .O..OO. .O..OO.
.OO...O OO..OO. OO..OO. OO..OO. OO..OO. OO..OO. OO..OO. OO..OO. OO..OO. OO..OO.
.OO.... .OOOOO. OO.OOO. OO..OO. OO..OO. OO..OO. OO..OO. OO..OO. OO..OO. OO..OO.
...OOO. OO..OO. OO..OO. OO..OO. OO..OO. OO..OO. OO..OO. OO..OO. OO..OO. OO..OO.
OO..OO. OO..OO. OO..OO. OO..OO. OO..OO. OO..OO. OO..OO. OO..OO. OO..OO. OO..OO.
.OOO... .OOOO.. .OOOOO. .OOOOO. .OOOOO. .OOOOO. .OOOOO. .OOOOO. .OOOO.. .OOOO..

.X.XX.X ..XXXX. .X.XX.X ..X.XX. .X.XX.X X.X.XX. .X.XXXX XXX.XX. .X.XXXX XXX.XX. .X.XXXX XXX.XX. .X.XXXX XXX.XX. .X.XXXX XXX.XX. .X.XXXX
XX..XXX XX..XX. XX..XX. XX..XX. X.X.XX. .X.XXX. X.X..XX .X.XXXX X.X..XX .X.XXXX X.X..XX .X.XXXX X.X..XX .X.XXXX X.X..XX XX.XXXX X.X..XX
.XX...X X.X..XX .X...XX X.X.XXX .X...XX X.X.XXX .X.X.XX X.X.XXX .X.X.XX X.X.XXX .X.X.XX X.X.XXX .X.X.X. X.X.X.X .X.X.X. X.X.X.X .X.X.X.
.XX.... ..XX..X .XX.... .XXX.XX .XX.X.. XXXX.X. .XX.X.X XXXX.X. .XX.X.X XXXX.X. .X..X.X X.XX.X. .X..X.X X.XX.X. .X..X.X X.XX.X. .X..X.X
...XXX. .XX.X.. X..X.X. .XX.X.. X..X.X. .XX.X.X X.XX.X. .X..X.X X.XX.X. .X..X.X X.XX.X. .X..X.X X.XX.X. .X..X.X X.XX.X. .X..X.X X.XX.X.
XX..XX. XX..XX. XX..XX. XXX.XX. .X..XXX XXX.XX. .X.XXXX XXX..X. .X.XX.X X.X..X. .X.XX.X X.X..X. .X.XX.X X.X..X. .X.XX.X X.X..X. .X.XX.X
.XXX... .XXXX.X XXXX.X. .X..X.X XXXX.X. .X..X.X X.XX.X. .X..X.X X.XX.X. .X..X.X X.XX.X. ....X.X X..X.X. ....X.X XX.X.X. ..X.X.X XX.X.X.

<examplar 30> ( O : Hebb; X : Iter )
O.OOOOO .OOO... ..OO... ..OO... ..OO...
O.OO... ..OO... ..OO... ..OO... ..OO...
..OO... ..OO... ..OO... ..OO... ..OO...
..OO... ..OO... ..OO... ..O.... ..O....
..OO... ..OO... ..OO... ..OO... ..OO...
....... ..OO... ..OO... ..OO... ..OO...
.OOOOO. ..OO... ..OO... ..OO... ..OO...

X.XXXXX .X.X.X. X.X.XXX .X.X.X. X.X.XXX .X.X.X. X.X.XXX .X.X.X. X.X.X.X .X.X.X. X.X.X.X .XXX.X. X.X.X.X
X.XX... .X.XXX. X.XXX.. .X..XX. X.X.X.. .X...X. X.X.X.. .X...X. X.X.X.. .X...X. X.X.X.X .X.X.X. X.X.X.X
..XX... ..XXX.. ..XXX.. ..XXX.. .X.XX.. ..X.X.. .X.XX.. ..X.XX. .X.XX.. ..X.XX. .X.XX.. X.X.XX. .X.XX..
..XX... ..X.... ..XX... ..X.X.. ..XX... ..X.X.. ...X... ..X.X.. ...X... ..X.X.. .X.X... ..X.X.. .X.X...
..XX... ..XX... ..XX... .X.X... ..X.... .X.X... ..X.X.. .X.X... ..X.X.. .X.X... ..X.X.. .X.X... ..X.X..
....... X.X.... .X..... X.X.... .X..... X.X.... .X...X. X.X.X.. .X...X. X.X.X.X .X.X.X. X.X.X.X .X.X.X.
.XXXXX. XXXXX.X .XXX.X. XXX.X.X .XXX.X. XXX.X.X .XXX.X. XXX.X.X .XXX.X. XXX.X.X .XXX.X. XXX.X.X .XXX.X.

<examplar 31> ( O : Hebb; X : Iter )
OO.O.O. .O..OO. ....OO. ....O.. ....O.. ....O.. ....O..
OO..OO. OO..OO. OO..OO. OO..OO. .O..OO. .O..OO. .O..OO.
OOO.OO. OO..OO. OO..OO. OO..OO. OO..OO. OO..OO. OO..OO.
OO..OO. OO..OO. OO..OO. OO..OO. OO..OO. OO..OO. OO..OO.
OO..O.. OO..OO. OO..OO. OO..OO. OO..OO. OO..OO. OO..OO.
OO...O. OO..OO. OO..OO. OO..OO. OO..OO. OO..OO. OO..OO.
OOOOOO. OOOOOO. .OOOOO. .OOOOO. .OOOOO. .OOOO.. .OOOO..

XX.X.X. X...XX. XX...X. X...XXX XX...X. X...XXX XX...X. X...XXX XX...X.
XX..XX. XX..... .X..XX. XXX.... .X..XX. X.X.... .X.XXX. X.X.... .X.XXX.
XXX.XX. .X..XX. XXX.X.. .X.X.X. X.X.X.. .X.X.X. X.X.X.X .X.X.X. X.X.X.X
XX..XX. XX..XX. XX..XX. .X..X.. X....X. .X..X.. X....X. .X..X.. X....X.
XX..X.. XX...X. XX..X.. XX...X. XX..X.. ...X.X. .XX.X.. ...X.X. .XX.X..
XX...X. .X..X.. X.X..X. .X..X.. X.X..X. .X..X.. X.X..X. .X..X.. X.X..X.
XXXXXX. XXXXXX. XXXXX.X XXXX.X. XXXXX.X XXX..X. .X.XX.X X.X..X. .X.XX.X

<examplar 32> ( O : Hebb; X : Iter )
O...OO. .O..OO. ....O.. ....O.. ....O.. ....O..
OO..OO. OO..OO. OO..OO. .O..OO. .O..OO. .O..OO.
OO..OOO OO..OO. OO..OO. OO..OO. OO..OO. OO..OO.
OO..OO. OO..OO. OO..OO. OO..OO. OO..OO. OO..OO.
OO..OO. OO..OO. OO..OO. OO..OO. OO..OO. OO..OO.
.OOO... OO..OO. OO..OO. OO..OO. OO..OO. OO..OO.
..OO... .OOOO.. .OOOOO. .OOOOO. .OOOO.. .OOOO..

X...XX. .X..XX. X...X.. .X..XX. XX..X.. .X..XX. XXX.X.. .X.XXX. XXX.X.. .X.XXX. XXX.X.. .X.XXX.
XX..XX. XX..XX. XX..XX. XX..XX. X...XX. XX...X. X...XXX XX...X. X...XXX XX...X. X...XXX XX...X.
XX..XXX XX...X. XX..XXX XX...X. XX..XXX XX...X. XX..XXX XX...X. XX..XXX XX...X. X...XXX XX...X.
XX..XX. XX..XXX XX...X. .X..XXX XX...X. .X..XXX XX...X. .X.XXXX XX.X.X. .XXXXXX XX.X.X. .XXXXXX
XX..XX. XX...X. XX..XX. XX...X. X...XX. .X.X.X. X.X.XX. .X.X.XX X.X.XX. .X.X.XX X.X.XX. .X.X.XX
.XXX... .XX.X.. .XXX... ..X.X.. .X.X... X.X.X.. .X.X.X. X.X.X.X .X.X.X. X.X.X.X .X.X.X. X.X.X.X
..XX... ..XX... ..XX... ..X.... .XXX... ..X.X.. .X.X... X.X.X.. .X.X.X. X.X.X.X .X.X.X. X.X.X.X
```

```
<examplar 33> ( O : Hebb; X : Iter )
OO...OO OO...OO OO..OOO OO..OOO OO..OOO
.OO..OO OO..OOO OO..OOO OO..OOO OO..OOO
OO...O. OOO.OOO OO..OOO OO..OOO OO..OOO
...O.OO OOOOOOO OOOOOOO OO.OOOO OO.OOOO
OOOOOOO OOO.OOO OO..OOO OO..OOO OO..OOO
.OO.OOO OOO.OOO OO..OOO OO..OOO OO..OOO
O....OO OO...OO OO..OOO OO..OOO OO..OOO

XX...XX XXX..XX .X..XXX XXX..X. .X..XXX XXX..X. ....XXX XXX.... ....XXX XXXX... ....XXX XXXX... ....XXX XXXX... ....XXX
.XX..XX XXX..XX XXX..XX .XX.XXX XXX..XX .XXXXXX XXX..XX ...XXXX XXX.... ....XXX XXX.... ....XXX XXXX... ....XXX XXXX...
XX...X. X.X.XXX .X...X. X.X.XXX .X...X. X.X.XXX .X...X. X.X.XXX .X...X. X.X.XXX .X..... X.XXXXX .X..... X.XXXXX .X.....
...X.XX XX..... ....XXX XX..... .X..XXX XX..... .X..XXX XX..... .X.XXXX X.X.... .X.XXXX X.X.... .X.XXXX X.X.... .X.XXXX
XXXXXXX .XX.XXX XX.X.XX XXX.XXX .X.X.XX XXX.XXX .X.X.XX XXX.XX. .X.X.XX XXX.XX. .X.X.XX XXX.XX. .X.X..X X.X.XX. .X.X..X
.XX.XXX XXX..XX .XX.XXX .XX..XX .XX.XXX ..X..XX .XXXXXX ..X..XX .X.XXXX X.X..XX .X.XXX. X.X...X .X.XXX. X.X...X .X.XXX.
X....XX .X...XX X.X..XX .X.X.XX X.X.XXX .X.X.XX X.X.XXX .X.X.XX X.X.XXX .X.X.XX X.X.XXX .X.X.XX X.X.XXX .X.X.XX X.X.XXX

<examplar 34> ( O : Hebb; X : Iter )
.O...OO OOO.... .OO.... ..OO... ..OO... ..OO... ..OO...
OO....O .O...O. .OO.... .OO.... ..OO... ..OO... ..OO...
.OO.O.. .OOOOO. .OO.O.. .OO.... ..OO... ..OO... ..OO...
..OOO.. ..OOO.. .OOOO.. ..OO... ..OO... ..O.... ..O....
...OO.. ..O.O.. ..OO... ..O.... ..O.... ..OO... ..OO...
.OO.OO. .O...O. .OO.... ..O.... ..OO... ..OO... ..OO...
OO...O. OOO...O OOOO... .OOO... ..OO... ..OO... ..OO...

.X...XX XXX..XX .X...XX XXX.... .X...XX XXX.... .X..XXX XXX.... ....XXX XXX.... ...XXXX XXX.... ...XXXX
XX....X .X...XX XXX.... .X...XX XXX.... ....X.X XXX.... ...XXXX XXX.... ...XXXX XXX.... ...XXXX XXX....
.XX.X.. X.XXXX. .X.X... X.XXX.. .X.X... X.X.X.. .X.X... X.X.X.. .X.X... X.X.X.. .X.X... X.X.X.. .X.X...
..XXX.. ..XX... ..XXX.. ...X... ....X.. ...X... ....X.. X..X... ....X.. X...... ....X.. X..X... ....X..
...XX.. ..X.X.. ...X... ..X.X.. ...X... ....X.. ...X... ....X.. ...X... ....X.. ...X... ..X.X.. ...X...
.XX.XX. XXX.... .X...XX X.X.... .X.XXXX X.X.... .X.XX.X X.X.... .X.XX.X X.X.... .X.XX.X X.X.... .X.XX.X
XX...X. XX..XXX XXX..X. XX..X.X XXX..X. .X..X.X X.X..X. .X..X.X X.X..X. .X.XX.X X.X..X. .X.XX.X X.X..X.

<examplar 35> ( O : Hebb; X : Iter )
OOOOOO. .OOOO.. .OOOO.. ..OO... ..OO... ..OO...
OO.OOO. .OO.OO. ..OO... ..OO... ..OO... ..OO...
OO..O.. ..O.... ..OO... ..OO... ..OO... ..OO...
.OOOO.. ..OO... ..OO... ..OO... ..O.... ..O....
..OO... ..OO... ..OO... ..OO... ..OO... ..OO...
..OO... ..OO... ..OO... ..OO... ..OO... ..OO...
.OOOO.. .OOOO.. ..OO... ..OO... ..OO... ..OO...

XXXXXX. .XXXX.. .XXXX.. .XXXX.. .XXXXX. .XXXX.. .XXXXX. .XXXX.. .XXXXX. .XXXX.. ..XXXX. .X.XX.. ..XXXX.
XX.XXX. XXX.XX. .X.XXX. XXX.XX. .X.XXX. XXX.XX. .X.XXX. XXX.XX. .X.XXX. X.X.XXX .X.X.X. X.X.XXX .X.X.X.
XX..X.. XX...X. XXX.XX. .X...X. X.X.XX. .X.XXX. X.X.XX. .X.XXX. X.X.XX. .X.XXX. X.X.XX. .X.XXX. X.X.XX.
.XXXX.. .XXXX.. .XXX... .XXXX.. .XXX... .XX.XX. .X.XX.. ..X.XX. .X.XX.. X.X..X. .X.XX.X X.X..X. .X.XX.X
..XX... ..XX... ...X... ..XXX.. .XXX.X. ..XXX.. .X.X.X. X.X.X.. .X.X.X. X.X.X.. .X.X.X. X.X.X.. .X.X.X.
..XX... ..XX... .XXXX.. ..XX.X. .XX.X.. ..XX.X. .XX.X.. ...X.X. .XX.X.. ...X.X. .XX.X.. ...X.X. .XX.X..
.XXXX.. .XXXXX. .XXXX.. .XXXXX. .XXXX.X ..XX.X. .X.XX.X ..XX.X. ....X.X ..XX.X. ....X.X ..XX.X. ....X.X

<examplar 36> ( O : Hebb; X : Iter )
OO.OOOO OOOOOOO OOOOOOO OOOOOOO OO..OOO OO..OOO OO..OOO
OO...OO OO..OOO OOO.OOO OO..OOO OO..OOO OO..OOO OO..OOO
O...OO. OO..OOO OOO..OO OO..OOO OO..OOO OO..OOO OO..OOO
...OOO. ..OOO.O .OOOO.O OOOOOOO OOOOOOO OO.OOOO OO.OOOO
..OO..O ..OO..O OOOOOOO OOO.OOO OO..OOO OO..OOO OO..OOO
..O..OO .OO..OO OOO.OOO OO..OOO OO..OOO OO..OOO OO..OOO
O.OOOO. OOOOOOO OOO.OOO OO..OOO OO..OOO OO..OOO OO..OOO

XX.XXXX XXX.XX. .X.XXXX XXX..X. .X..XXX XXX..X. .X..XXX XXX..X. .X..XXX XXX..X. .X..XXX XXX..X. .X..XXX XXX..X.
XX...XX XX.X.XX XXX..XX .X.X.XX XXX...X ...X.XX XXX...X ...X.X. X.X...X ...X.X. X.X...X ...X.X. X.X...X ...X.X.
X...XX. X..XXX. X....X. X..XXX. .X..... X.XXXXX .X.X... X.XXXXX .X.X... X.XXXXX .X.X... X.XXXXX .X.X... X.XXXXX
...XXX. X..XX.. ...XXX. X..X... ...XXX. X...... ...XXX. X...... ...XXX. X...... ...XXX. X...... ...XXX. X......
..XX..X ..X..X. ...XX.X ..X..X. ...XX.X ..X..X. ...XX.X X.X..X. ...X..X X.X.... ...X..X X.X.X.. ...X..X X.X.X..
..X..XX .XX..XX ..X..XX .XX...X ..XX.XX ..X...X ..XX.X. ..X...X ..XX.X. ..X...X .XXX... ..X...X .XXXX.. ..X...X
X.XXXX. .X.XX.X X.XX.X. .X.XX.X X.X..X. .X.XX.X X.X..X. .X.XX.X X.X.XX. .X.X..X X.X.XX. .X.X..X X.X.XX. .X.X..X
```

```
<examplar 37> ( O : Hebb; X : Iter )
....... ....... ....... ....... ....... ....... ..OO... ..OO... ..OO...
...O... ....... ....... ....... ....... ..OO... ..OO... ..OO... ..OO...
.OOOO.. .OOOO.. .OO.O.. .O.OO.. ..OOO.. ..OO... ..OO... ..OO... ..OO...
..O..O. .O..OO. .O..O.. ....O.. ....... ....... ....... ..O.... ..O....
.O.OOO. ..O.O.. .O.OO.. ..O.O.. ...O... ..OO... ..OO... ..OO... ..OO...
O...OO. .O..OO. ....O.. ....... ..OO... ..OO... ..OO... ..OO... ..OO...
.OOO.OO .OOOO.. .OOOO.. .OOOO.. .OOO... ..OO... ..OO... ..OO... ..OO...

....... ...X... ..X..X. ...X... ..X..X. ...X... ..X..X. ...X... ..X..XX ...X... ..X..XX ...X...
...X... ..X.... ...X... ..X.... ...X... ..X.... ...X... ..X.X.. ...X... ..X.X.X .X.X... ..X.X.X
.XXXX.. ..XXX.. .XXXX.. ..XXX.. .XXXX.. ..XXX.. .XXXX.. ..XXX.. .XXXX.. ..XXX.. .XXXX.. ..XXX..
..X..X. .X...X. ..X.XXX .X.X.X. ..X.XXX .X.X.X. X.X...X .X.X.X. X.X.X.X .X.X.X. X.X.X.X .X.X.X.
.X.XXX. .XXXXX. XXXXXX. .XXXXXX XXXX.X. .XXXXXX XXXX.X. .XXXX.X XXXX.X. .XXXX.X XXXX.X. .XXXX.X
X...XX. XX..XX. XX..XX. XXX..X. .X...XX XXX.... .X...XX XXX.... .X...XX XXX.... .X...XX XXX....
.XXX.XX .XXX.XX .XXX.XX .XX..XX .X.X.XX X.X.XXX .X.X.X. X.X.XXX .X.X.X. X.X.XXX .X.X.X. X.X.XXX

<examplar 38> ( O : Hebb; X : Iter )
.OO..O. OOO.... OOO.... .OOO... ..OO... ..OO... ..OO... ..OO...
..O.... .OO...O .OO.... .OO.... .OO.... ..OO... ..OO... ..OO...
.OO...O .OO..O. .OO.... .OO.... .OO.... .OO.... ..OO... ..OO...
.OOOO.. .OOO.O. .OOOO.. .OOO... .OOO... ..O.... ..O.... ..O....
.OO..OO .OO.... .OO.... .OO.... ..O.... ..O.... ..OO... ..OO...
.OO..OO .OO..OO .OO..OO .OO.... ..O.... ..OO... ..OO... ..OO...
OO..OOO OOO..OO OOOO.OO OOOO... .OOOO.. .OOO... ..OO... ..OO...

.XX..X. XX..... X....X. XX..... X....X. XX..... X....X. XX..... .....X. XX..... ....XX. XXX.... ....XX. XXX.... ....XX. XXX....
..X.... .XX...X .XX.... .XX...X .XX.... .XX..XX .XX.... .XX..XX .XX.... .XX.XXX XXX.... .XX.XXX XXXX... .XX.XXX XXXX... .XX.XXX
.XX...X .XX..X. .XX...X .XX..X. XXX...X .XXX.X. XXX...X XXXX.X. XXX..XX XX.X.X. XXX..XX XX.X.XX XXX...X XXXX.X. XXX...X XXXX.X.
.XXXX.. .XX..X. XX.XX.. XXX..X. XX.XX.. XXX..X. XX.XX.. XXX..X. XX.XX.. XXX..X. .X.XX.. XXX..X. .X.XX.. XXX..X. .X.XX.. XXX..X.
.XX..XX XXX.X.X .XXX.X. X.X.X.X .XXX.X. X.X.X.X .X.X.X. X.X.X.X .X.X.XX X.X.X.X .X.X.XX X.X.X.. .X.X.XX X.X.X.. .X.X.XX X.X.X..
.XX..XX .XX..XX .XX..XX .XX..XX .XX..XX .XX..XX .XX..XX .XX..XX .XX.XXX .XX..XX .XX.XXX X.X..XX .X..XX. X.X..XX .X.XXX. X.X..XX
XX..XXX XX..XX. XX..XXX XX..XX. XX..XX. XX..XX. X...XX. XX..XX. X...XX. .X.XXX. X...X.. .X.XXX. X.X.X.. .X.XXX. X.X.X.. .X.XXX.

<examplar 39> ( O : Hebb; X : Iter )
.....O. ....... ....... ....... .......
....... ....... ....... ....... .......
.OOOO.. .O..O.. OO..OO. OO..OO. OO..OO.
O.O.OO. .O..OO. OO..OO. OO..OO. OO..OO.
OO..... .O..OO. OO..OO. OO..OO. OO..OO.
OO..OO. OO..OO. .O..OO. OO..OO. OO..OO.
.OOOO.. .OOOO.. .OOOO.. .OOOO.. .OOOO..

.....X. ....X.. ...X.X. ....XX. .X.X.X. ....XX.
....... ....... ....... ....... ....... .......
.XXXX.. .XXXX.. .XXXX.. .XXXX.. .XXXX.. .XXXX..
X.X.XX. .X.XX.. X.X.X.. .X.X.X. X.X.X.. .X.X.X.
XX..... XX..... XX..... XX..... XX..... XX.....
XX..XX. XX...X. XX..... XX..... XX..... XX.....
.XXXX.. .XXXXX. .XXXX.. .XXXXX. .XXXX.. .XXXXX.

<examplar 40> ( O : Hebb; X : Iter )
O..OOO. .OOOO.. ...OO.. ....O.. ....O.. ....O..
O.O.O.. .O..OO. OO..OO. .O..OO. .O..OO. .O..OO.
....O.. OO..OO. OO..OO. OO..OO. OO..OO. OO..OO.
.OOOOO. OO..OO. OO..OO. OO..OO. OO..OO. OO..OO.
.O..OOO OO..OO. OO..OO. OO..OO. OO..OO. OO..OO.
OO..OO. OO..OO. OO..OO. OO..OO. OO..OO. OO..OO.
.O.O... .OOOO.. .OOOO.. .OOOOO. .OOOO.. .OOOO..

X..XXX. .X.XXXX ...XXX. .XXXXX. ...XXX. .XXXXX. ...XXX. .XXXXX. ...XXX.
X.X.X.. .....X. ..X.XX. ....... ..X.X.. ....... ..X.X.. ....... ..X.X..
....X.. ...XXX. ..X.X.. ...XXX. ..X.X.. .X.XXX. X.X.X.. .X.XXX. X.X.X..
.XXXXX. .XX.XX. ...XXX. XXX.XX. .X.XXX. X.X.X.. .X.XXX. XXX.X.. .X.XXX.
.X..XXX XX...X. XX..XXX XX...X. XX..X.X XX...X. XX..X.X XX...X. XX..X.X
XX..XX. XX..XX. XX..XX. XX..XX. XX..XX. XX..XX. XX..XX. XX..XX. XX..XX.
.X.X... ..XXX.X .XXX.X. .XXXX.X .XXX.X. .XXXX.X .XXXXX. .XXXXXX .XXXXX.
```

```
<examplar 41> ( O : Hebb; X : Iter )
....O.. ....... ....... ....... .......
....... ....... ....... ....... .......
.OOOO.. .O.OO.. .O..OO. OO..OO. OO..OO.
O..OOO. .O..OO. OO..OO. OO..OO. OO..OO.
OOOOOO. .O..OO. .O..OO. OO..OO. OO..OO.
OO..... .O..OO. OO..OO. OO..OO. OO..OO.
.OOOO.. .OOOO.. .OOOO.. .OOOO.. .OOOO..

....X.. ...X.X. ....X.. ...X.X. ....X.. ...X.X. ....X..
....... ....... ....... ....... ....X.. ....... ....X..
.XXXX.. .XXXX.. .XXXX.. .XX.XX. .XXXX.. .XX.XX. .XXXX..
X..XXX. XX..XX. XX.XXX. XXX.X.. XX.X.X. XXX.X.X XX.X.X.
XXXXXX. XXXXXX. XXX.X.. XX.X.X. XXX.X.. XX.X.X. XXX.X..
XX..... XX..... XX...X. XX..X.. XX...X. XX..X.. XX...X.
.XXXX.. .XXXX.. .XXXXX. XXXXX.. .XXXXX. XXXXX.. .XXXXX.

<examplar 42> ( O : Hebb; X : Iter )
..OOO.. .OOOO.. ..OOO.. ..OOO.. ..OO... ..OO... ..OO...
.OO.OO. .OO.... .OO.... ..O.... ..OO... ..OO... ..OO...
OOO.O.O .OO..O. .OO.... .OO.... ..O.... ..OO... ..OO...
OOOO... .OOO... .OOO... .OO.... ..O.... ..O.... ..O....
.OO.... .OO.... .OO.... ..O.... ..O.... ..OO... ..OO...
.OO...O .OO..O. .OO.... ..O.... ..OO... ..OO... ..OO...
OOOOOO. .OOOO.. .OOOO.. .OOOO.. ..OOO.. ..OO... ..OO...

..XXX.. ..XXX.. ..XX... ..XX... ..XX... ..XX...
.XX.XX. .XX.X.. .X.X.X. .XX.X.. .XXX.X. .XX.X..
XXX.X.X .X...X. .XX.X.. .XX..X. .XX.X.. .XX..X.
XXXX... .XX.... .XX.... .XX.... .XX.... .XX....
.XX.... .XXX... .XX.... .XXX... .XXX... .XXX...
.XX...X .XX..X. .XX.XX. .XX..X. .XX.XX. .XX..X.
XXXXXX. XXXXXX. XXXXXX. XXXXXX. XXXXXX. XXXXXX.

<examplar 43> ( O : Hebb; X : Iter )
.....O. ....... ....... ....O.. .......
.O.O.OO .....O. .O..O.. .....O. .O..O..
OO..OO. OO..OO. OO..OO. OO..OO. OO..OO.
O...OO. OO..OO. OO..OO. OO..OO. OO..OO.
.OOOOO. OO.OOO. OO..OO. OO..OO. OO..OO.
....OO. OO..OO. OO..OO. OO..OO. OO..OO.
OOO.O.. .OOOOO. .OOOO.. .OOOO.. .OOOO..

.....X. ......X .....X. ......X .....X. X.....X .....X. X...... .....X. X...... .....X. XX..... ....XX. XX.X... ..X.XXX XX.X... ..X.XXX XX.X... ..X.XXX XX.X... ..X.X.X ..X.XXX XXX.X.X .X.X.XX X.X.X.X .X.X.XX
X.X.X.. .X.X.XX X.X.X.. .X.X.XX X.X.X..
.X.X.XX X.X..XX .X.X.XX X.X..XX .X.X..X ..X..XX .X.X... ..X..XX .XXX... ..X..XX .X.X... ..X..XX .X.X... ..X.XXX XX.X... ..X.XXX XXXX... ..X.XXX XXXX... ..X.XXX .X..XX. ..X.X.X ...X.X. ..X.X.X ...X.X. ..X.X.X
...X.X. ..X.X.X XX.X.X. ..X.X.X XX.X.X.
XX..XX. XX.XXX. X.X.XX. .X.XXX. X.X.XX. .X.XXX. X.X.XX. .X.XXX. X.X..X. .X.XXXX X.X..X. .X.XXXX X.X..X. .X.XXXX X.X..X. .X.XXXX X.X..X. XX.XXXX X.X..X. .X.XXXX X.X..X. .....X. ....X.X ..XX.X. .X..X.X ..XX.X.
.X..X.X X.XX.X. .X..X.X X.XX.X. .X..X.X
X...XX. XX..XX. XX.XXX. XX..XX. XX.XXX. XX..XX. XX.XXX. XXX.XX. XX.XXX. XXX.XX. .X.XXX. X.X..X. .X.XXXX X.X..X. .X.XXXX X.X..X. .X.XXXX X.X.... .X.XXXX X.X.... .X.XX.X ...X... X.X.... ...XX.. X.XX... .X..X.X
X.XX.X. .X..X.X X.XX.X. .X..X.X X.XX.X.
.XXXXX. ..XXXX. .X.XXX. X.X.XX. .X.XXXX X.X.XX. .X.XXXX X.X.XX. .X.X.XX X.X.XX. .X.X.XX X.X.XX. .X.X.XX X.X.XX. .X.X.XX X.X.XX. .X.X.XX X.X.XX. .X.X..X X.X.XX. X.X.... .XXX.X. ..X.X.X .XXX... ..X.X.X .XXX...
..X.X.X .XXX.X. ....X.X XXXX.X. ....X.X
....XX. .....X. ....XX. .....XX ..X.XX. .....XX .XX.XX. .....XX .X..XX. X....XX .X..XX. X....XX .X..XX. X....XX .X..XX. X.X..XX .X.XXX. X.X..XX .X.XXX. X.X...X .X.XX.X .X..X.X X.X..X. .X.XX.X X.X..X. .X.y
X.X..X. .X.XX.X X.X..X. .X.XX.X X.X..X.
XXX.X.. XX.X.X. X...X.X .X.X.X. X...X.X .X.X.X. X...X.X .X.X.X. X...X.X .X.X.X. X...X.X .X.X.X. X.X.X.X .X.X.X. X.X.X.X .X.X.X. X.X.X.X .X.X.X. X.X.X.X .X.X.X. ..X...X .X..X.X ..XX.X. XX.XX.X ..X..X. XX.X.
..X..X. XX.XX.X ..X..X. XX.XX.X ..X..X.

<examplar 44> ( O : Hebb; X : [ter )
OOO...O OOO..O. OOO.OOO OOO.OOO OOO.OOO OO..OOO OO..OOO OO..OOO
.OO.... .OO..OO OOO..OO OOO.OOO OO..OOO OO..OOO OO..OOO OO..OOO
..O.O.. .OO..OO OOO..OO OOO..OO OO..OOO OO..OOO OO..OOO OO..OOO
.OOOOOO .OOOOO. .OOOOOO OOOOOOO OOOOOOO OOOOOOO OO.OOOO OO.OOOO
.O...OO .OO.OOO OOO.OOO OOO.OOO OO..OOO OO..OOO OO..OOO OO..OOO
.OO..OO .OO..OO .OO..OO OOO.OOO OO..OOO OO..OOO OO..OOO OO..OOO
OOO..OO OOO..OO OOO..OO OO..OOO OO..OOO OO..OOO OO..OOO OO..OOO

XXX...X XXX.... .XXX.XX XXX.... .XXX.XX XXX.X.. .XXX.X. XXX.X.. .XXX.X. XXX.X..
.XX.... .XX...X .XX.... .XX...X .XX.... .XX...X .XX.... .XX..XX .XX.... .XX..XX
..X.X.. .X.XXX. X.X.X.. .X.XXX. X.X.X.X .X.XXX. X.X.X.X .X.X.X. X.X.X.X .X.X.X.
.XXXXXX ..XX.XX .X.XXXX ..X..XX ...XXXX ..X..XX .X.XXXX .XX..XX .X.XXXX .XX..XX
.X...XX XXX.XXX .X...XX X.X.XXX .X.X.XX X.X.XXX .X.X.XX X.X.XXX .X.XXXX X.X.XXX
.XX..XX .X....X XXX..XX XX...XX .XX..XX XX...XX .XX..X. .X....X .XX..X. .X....X
XXX..XX XXXX.XX XXX..XX XXXX.XX XXX.X.X .XXX.X. X.X.X.X .XXX.X. X.X.X.X .XXX.X.
```

```
<examplar 45> ( O : Hebb; X : Iter )
..OO...  ..OO...  ..OO...  ..OO...  ..OO...
.O.....  ..OO...  ..OO...  ..OO...  ..OO...
.OOO...  ..OO...  ..OO...  ..OO...  ..OO...
..OO.O.  ..OO...  ..OO...  ..O....  ..O....
..OO...  ..OO...  ..OO...  ..OO...  ..OO...
..O....  ..OO...  ..OO...  ..OO...  ..OO...
.OOOO..  .OOO...  ..OO...  ..OO...  ..OO...

..XX...  ..XX...  ..XX...  ..XXX..  .XXX...  ..XXX..  .XXX...  ..XXX..  .XXX...
.X.....  .......  .X.....  .......  .X.....  ..X....  .X..X..  ..X....  .X..X..
.XXX...  .XXX...  .XXXX..  .XXX...  .XX.X..  .XXX...  .XX.X..  .XX....  .XX.X..
..XX.X.  .X.X...  X.XX.X.  .X.XX.X  X.XX.X.  .X.XX..  X.X..X.  .X.XX..  X.X..X.
..XX...  ..XX...  .XXXX..  ..XX.X.  .XX.X..  .XXX.X.  .XX.X..  .XXX.X.  .XX.X..
..X....  .X.....  X.X....  .X.....  X.X..X.  .X..X..  X.X..X.  .X..X..  X.X..X.
.XXXX..  .XXX...  .XXXX..  XXXX...  .XXXX..  XXXX...  .XXXX..  XXXX...  .XXXX..

<examplar 46> ( O : Hebb; X : Iter )
.O..OO.  ....O..  ....O..  ....O..
O......  ....OO.  .O..OO.  .O..OO.
....OO.  OO..OO.  OO..OO.  OO..OO.
.......  OO..OO.  OO..OO.  OO..OO.
OO..OO.  OO..OO.  OO..OO.  OO..OO.
OO..OO.  OO..OO.  OO..OO.  OO..OO.
.O.OOO.  .OOOO..  .OOOO..  .OOOO..

.X..XX.  .X..XX.  X...XX.  .X..XX.  X.XXXX.  .X.XXX.  X.XXXX.  .X.XXX.
X......  .....X.  .......  ..X.X..  .....X.  XXX.X..  .....X.  XXX.X..
....XX.  .X..X..  ..X.XX.  .X..X..  ..X.XX.  .X..X..  ..X.XX.  .X..X..
.......  ....XX.  .X..X..  X.X.XX.  .X..X..  X.XXXX.  .X..X..  X.XXXX.
XX..XX.  XX..X..  XX..XX.  .X..X..  XXX..X.  .X..X..  X.X..X.  .X..X..
XX..XX.  XX..XX.  .X..X..  XXX..X.  .X..X..  XXX..X.  .X..X..  XXX..X.
.X.XXX.  ..X.X.X  .X.X.X.  ..X.X.X  .X.X.X.  ..X.X.X  .X.X.X.  ..X.X.X

<examplar 47> ( O : Hebb; X : Iter )
OOO....  OOO..O.  OOO.OOO  OOO.OOO  OOO.OOO  OO..OOO  OO..OOO  OO..OOO
.OO..O.  .OO..OO  .OO..OO  OOO..OO  OO..OOO  OO..OOO  OO..OOO  OO..OOO
.OO..OO  .OO..O.  OOO..OO  OOO..OO  OO..OOO  OO..OOO  OO..OOO  OO..OOO
.OOOO.O  .OOOOO.  .OOOOOO  OOOOOOO  OOOOOOO  OOOOOOO  OO.OOOO  OO.OOOO
.OOOO..  .OO..OO  .OO.OOO  OOO.OOO  OOO.OOO  OO..OOO  OO..OOO  OO..OOO
.OO..OO  .OO..OO  .OO..OO  OOO.OOO  OO..OOO  OO..OOO  OO..OOO  OO..OOO
OOO..OO  OOO..OO  OOO..OO  OO...OO  OO..OOO  OO..OOO  OO..OOO  OO..OOO

XXX....  XXX....  XXXX.X.  XXX.X..  XXXX.X.  XXX.X..  XXXX.X.  XXX.X..
.XX..X.  .XX...X  .XX..X.  XXX.X.X  .XX..X.  XXX.X.X  .XX..X.  XXX.X.X
.XX..XX  .XX..XX  .XX..XX  .XX..XX  .XX..XX  .XX.X.X  .XX..X.  .XX.X.X
.XXXX.X  .XXX.X.  .XX.XXX  .XXX.X.  .XX.X.X  .XXX.X.  .XX.X.X  .XXX.X.
.XXXX..  .XXXXX.  .XXXXX.  .XX.XX.  .XXX.X.  .XX.X..  .XXX.X.  .XX.X..
.XX..XX  .XX..X.  .XX.XXX  .XX..X.  .X..X.X  .XX..X.  .X..X.X  .XX..X.
XXX..XX  XXX..XX  XXX..XX  XXX..XX  XXX...X  XXX..XX  XXX..XX  XXX..XX

<examplar 48> ( O : Hebb; X : Iter )
OOO.O..  .OOO...  ..OO...  ..OO...  ..OO...
.OOOO..  ..OO...  ..OO...  ..OO...  ..OO...
..OO.O.  ..OO...  ..OO...  ..OO...  ..OO...
..OO..O  ..OO...  ..OO...  ..O....  ..O....
....O..  ..OO...  ..OO...  ..OO...  ..OO...
..OO...  ..OO...  ..OO...  ..OO...  ..OO...
..O....  ..OO...  ..OO...  ..OO...  ..OO...

XXX.X..  .XXX.X.  .XX.X..  XXXX.X.  XXX.X.X  XXXX.X.  XXX.X.X  XXXX.X.  XXX.X.X  XXXX.X.  XX..X.X  XXXX.X.  XX..X.X
.XXXX..  .XX..X.  X.XXX.X  .XXX.X.  XXXXX.X  .XXX.X.  XXXXX.X  .X.X.X.  XXX.X.X  .X.X.X.  XXX.X.X  ...X.X.  XXX.X.X
..XX.X.  ..XXX.X  ..XX.X.  ..X.XXX  .X.X.X.  X.X.XXX  .X.X.X.  X.X.XXX  .X.X.X.  X.X.XXX  .X.X.X.  X.X.XXX  .X.X.X.
..XX..X  ...X...  ..XX.XX  ...XX.X  ..XX.X.  ...XX.X  ...X.X.  ....X.X  ...X.X.  ....X.X  ...X.X.  ....X.X  ...X.X.
....X..  ...X.X.  ..X.X..  ...X.X.  ..X.X..  ...X.X.  ..X.X..  .X.X.X.  ..X.X.X  .X.X.X.  ..X.X.X  .X.X.X.  ..X.X.X
..XX...  ..XXX.X  ..XX.X.  ..XXX.X  ..XX.X.  ..X.X.X  .XXX.X.  ..X.X.X  .X.X.X.  ..X.X.X  .X.X.X.  ..X.X.X  .X.X.X.
..X....  ..X....  ..X....  .X.....  ..X....  XX.....  ..X.XX.  XX.X...  ..X.XX.  XX.X..X  ..X.XX.  XX.X..X  ..X.XX.
```

```
<examplar 49> ( O : Hebb; X : Iter )
......O ....... O....OO OO..OOO OO..OOO OO..OOO
O....O. .O....O OO...OO OO..OOO OO..OOO OO..OOO
OO..O.. OO..OOO OO..OOO OO..OOO OO..OOO OO..OOO
.OOO.OO OOOOOO. OO..OOO OO..OOO OO.OOOO OO.OOOO
.OOO.O. OOOOOOO OOO.OOO OO..OOO OO..OOO OO..OOO
OOOO.OO OOO.OOO OO..OOO OO..OOO OO..OOO OO..OOO
.OO..OO OO...OO OO..OOO OO..OOO OO..OOO OO..OOO

......X ...X... ....X.X ...X... ....X.X ...X... ....X.X .X.X... ....X.X .X.X... ....X.X
X....X. ....XX. XX.XX.. ....XX. XX.XX.. ....XX. XX.XX.. ....XX. XX.XX.. ....XX. XX.XX..
XX..X.. X...XX. .X..X.. X.X.XX. .X.XX.. X.X.XXX .X.X.X. X.X.XXX .X.X.X. X.X.XXX .X.X.X.
.XXX.XX .XXX..X XXXX.XX .XXX..X XXXX.XX .XX...X XXXX.XX .XX...X .XXX.XX ..X...X .XXX.XX
.XXX.X. XXXXXXX XXXX.XX XXXXXXX .XXX.XX XXXXXXX .XXX.XX XXXXXXX .XXX.XX XXXXXXX .XXX.XX
XXXX.XX XXXX..X XX.X.XX X.XX..X .X.X.XX X.X...X .X.X.X. X.X...X .X.X.X. X.X...X .X.X.X.
.XX..XX XX...XX ..X..XX XX.X.XX ..X.XXX XX.X.X. ..X.XXX XX.X.X. ..X.XXX XX.X.X. ..X.XXX
```

```
<examplar 50> ( O : Hebb; X : Iter )
....... ....... ....... .......
....... ....... ....... .......
OOOOO.. OO..OO. OO..OO. OO..OO.
OO..OO. OO..OO. OO..OO. OO..OO.
OO..OO. OO..OO. OO..OO. OO..OO.
OOO.OO. OO..OO. OO..OO. OO..OO.
OO..OO. .OOOOO. .OOOO.. .OOOO..

....... .....X. ....... .....X. ....... ....... ....... ....... ....... .....X. ....X.. ...X.X. ....X.. ...X.X.
....... ..X.... ....... ..X.... ....... ..X.... ....... ..X.... ....... ..X.... ....... ....... ....X.. .......
XXXXX.. XXXX.X. XXXXX.. XX.X.X. XXX.X.. XX.X.X. XXX.X.. XX.X.X. XXX.X.. XX.X.X. XXX.X.. XX.X.X. XX..X.X XX.X.X.
XX..XX. XX..XX. XX..XX. XX..XX. XX.XXX. XX..XX. XX.XXX. XX..X.. XX.X.X. XX..X.X XX.X.X. XX..X.X XX.X.X. XX..X.X
XX..XX. XX.XXX. XX..XXX XX.XXX. XX..XXX XX.X.X. XX..X.X XX.X.X. X...X.X XX.X.X. X...X.X XX.X.X. X...X.X XX.X.X.
XXX.XX. XX..XX. XXX.XX. XX.XXX. X.X.XX. .X.XXX. X.X.XX. .X.XX.X X.X..X. .X.XX.X X.X..X. .X.XX.X X.X..X. .X.XX.X
XX..XX. .X.XXX. .XX.XX. .X.XXX. .XX.XX. .X.XXX. ..X.XX. .X.XX.. ..X.XX. .X.XX.. ..X.XX. .X.XX.. ..X.XX. .X.XX..
```

```
<examplar 51> ( O : Hebb; X : Iter )
O...... ....... .......
.O..... ....... .......
..OOO.. OO..OO. OO..OO.
OO...O. OO..OO. OO..OO.
OO..OO. OO..OO. OO..OO.
OO..OO. OO..OO. OO..OO.
OOOOO.. .OOOO.. .OOOO..

X...... ....... X...... ....... X...... ....... X...... .....X. X...... .....X. XX..... .....X. XX.....
.X..... ..X.... .X..... ..X.... .X..... ..X.... .X..... ..X.... ....... ..X.... ....... ..X.... .......
..XXX.. .XXX... XXXXX.. XXXX... XXXXX.. XXXX... XXXXX.X XXXX... XXXXX.X .XXX... XXXXX.X .XXX.X. XXXXX.X
XX...X. XX..XXX XX...X. XX..XXX XX...X. .X..XXX XXX..X. .X..XXX XXX..X. .X..XXX XXX..X. .X.XXXX XXX..X.
XX..XX. XX..XX. XX..XX. XX..XX. XX..XXX XX...X. XX..XXX XX.X.XX XXX.XXX XX.X.XX XXX.XXX XX.X.XX XXX.XXX
XX..XX. XX..XX. XX..XX. XX..XX. XX..XX. XX..XX. XX...X. XX..X.. X.X..X. .X.XX.. X.X..X. .X.XX.. X.X..X.
XXXXX.. XXXXX.. .XXXX.. XXXXX.. .XXXX.. XXXXX.. .XXXX.. XXXXX.. .XXXXX. XXXXX.X .XXX.X. XXX.X.X .XXX.X.
```

```
<examplar 52> ( O : Hebb; X : Iter )
..O.O.. .OOO... .OOOO.. .OOOO.. .OOOO.. .OOOO.. ..OOO.. ..OO... ..OO...
.O.OOOO .OO..O. .OO.... .OO..O. .OO.... .OO.... ..O.... ..OO... ..OO...
..O..OO .OO..O. .OO.OO. .OO.O.. .OO.... .OO.... .OO.... ..OO... ..OO...
.OO..OO .OOOOO. .OOOO.. .OOOO.. .OOOO.. .OOO... ..OO... ..O.... ..O....
.OOOOO. .OO..O. .OO.OO. .OO.... .OO.... ..O.... ..O.... ..OO... ..OO...
.OO.... .OO.OO. .OO..O. .OO..O. .OO.... ..O.... ..OO... ..OO... ..OO...
OOOO.O. OOOOO.. .OOOO.. .OOOO.. .OOOO.. .OOOO.. .OOOO.. ..OO... ..OO...

..X.X.. ...X... ..X.... ...X... ..X.... ...X... ..X.... ...X..X ..X.... ...X..X X.X.... ...XXXX XXX.... ...XXXX XXX.... ...XXXX XXX.... ...XXXX XXX.... ...XXXX
.X.XXXX XXXXXX. .X.XXX. XXX.XX. .X.XXX. XXX.XX. .X.XXX. XXX...X .X.XXX. XXX...X .X.XXXX XXX.... .X.XXXX XXX.... .X.XXXX XXX.... .X.XXXX XXX.... ...XXXX XXX....
..X..XX .X...XX XXX..XX .X.X.XX X.X.XXX .X.X.X. X.X.X.X .X.X.X. X.X.X.X .X.X.X. X.X.X.X .X.X.X. X.X.X.X .X.X.X. X.X.X.X .X.X.X. X.X.X.X .X.X.X. X.X.X.X .X.X.X.
.XX..XX .XX..XX .XXX.XX .XX..XX .XXX.XX .XX.XXX XXXX.X. .XX.X.X X.XX.X. .XX.X.X X.XX.X. .X..X.X X.XX.X. .X..X.X X.XX.X. .X..X.X X.XX.X. .X..X.X X.XX.X. .X..X.X
.XXXXX. .XXXXX. .XXXXX. .XXX.X. .XXXX.. ..XX.X. .XXXX.. ..XX.X. .XXX.X.. ..XX.X. .XX.X.. ..XX.X. .XX.X.. ..XX.X. .XX.X.. ...X.X. XXX.X.. ...X.XX XXX.X.. ...X.XX
.XX.... .XX.... .XX.... .XX.... .XX..X. XXX.X.. .XX..X. XX..X.. XXX..X. XX..X.X XXX..X. XX..X.X XXX..X. .X.XX.X X.X..X. .X.XX.X X.X..X. .X.XX.X X.X..X. .X.XX.X
XXXX.X. XXX.... XXXX... XXX.... XXXX... XXX..X. XX.X..X XXX..X. XX.X..X XXX..X. XX.XX.X XXX..X. .X.XX.X X.X..X. .X.XX.X X.X..X. .X.XX.X X.X..X. .X.XX.X X.X..X.
```

```
<examplar 53> ( O : Hebb; X : Iter )
.......  .......  .......  .......
.OOO.OO  .......  .......  .......
OO..O..  OO..OO.  OO..OO.  OO..OO.
OO..OO.  OO..OO.  OO..OO.  OO..OO.
OOOOOO.  OO..OO.  OO..OO.  OO..OO.
.....O.  OO..OO.  OO..OO.  OO..OO.
...OOOO  .OOOOO.  .OOOO..  .OOOO..

.......  ...X.X.  ..X.X..  ...X.X.  X.X.X..  ...X.X.  X.X.X..  .X.X.X.  X.X.X..  .X.X.X.
.XXX.XX  .XXX..X  ..XX.XX  .XX...X  ..XX.XX  .XX...X  .XXX.XX  .XX...X  ..XX.XX  .XX...X
XX..X..  XX...X.  XX..X.X  .....X.  XX..X.X  .XX..X.  XXX.X.X  .XX..X.  XXX.X.X  .XX..X.
XX..XX.  XX..XX.  XX...X.  .X..XX.  XX...X.  XX..XX.  XX...X.  XX..XX.  XX...X.  XX..XX.
XXXXXX.  .X.XXXX  X.X.XX.  .X.X.XX  X.X.X..  .X.X.X.  X.X.X..  .X.X.X.  X.X.X..  .X.X.X.
.....X.  ....X.X  .....X.  ....X.X  .....X.  ..X.X.X  .....X.  ..X.X.X  .....X.  ..X.X.X
...XXXX  ....XXX  ...X.XX  ....X.X  ...X.X.  X...X.X  ...X.X.  X...X.X  ...X.X.  X...X.X

<examplar 54> ( O : Hebb; X : Iter )
..OO...  .......  ..OO...  ..OO...  ..OO...  ..OO...  ..OO...
.......  .OO....  ..O....  ..O....  ..OO...  ..OO...  ..OO...
OO.OOOO  .OO....  .OO....  .OO....  ..OO...  ..OO...  ..OO...
.OOO.OO  .OOO...  .OO....  ..O....  ..O....  ..O....  ..O....
.OO...O  .OO..O.  .OO....  ..O....  ..O....  ..OO...  ..OO...
OOO....  .OO..O.  .OO....  ..O....  ..OO...  ..OO...  ..OO...
OOOO...  .OOOO..  .OOOO..  .OOOO..  ..OO...  ..OO...  ..OO...

..XX...  ..XX...  ..XX...  ..XX...  ..XX...  ..XX...  X.XX...  ..XX...  X.XX...  ...X...  X.XX...  ...X...  X.X....  ...X...  X.X....  ...X...  X.X....  ...X...
.......  .......  .X.....  .X....X  .X.....  .X..X.X  .X.....  .XX...X  .X.X...  .XX...X  .X.X...  .XX...X  .X.X...  .XX...X  .X.XX..  .XX....  ...XX..  .XX....
XX.XXXX  XX...X.  .X..X.X  .XX..X.  .X..X.X  .XX..X.  .X..X.X  .XX..X.  .XX.X.X  .XX..X.  .XX.X.X  .XXX.X.  .XX.X.X  .XXX.X.  .XX.X.X  .XXX.X.  .XX.X.X  .XXX.X.
.XXX.XX  .XXX.XX  XXXX.XX  .XXX.XX  XXXX...  .XXXXXX  XXXX...  .XXXXXX  XXXX...  .XX.XXX  XXXX.X.  .XX.XXX  XXXX.X.  .XX.X.X  XXXX.X.  .XX.X.X  XXXX.X.  .XX.X.X
.XX...X  .XXX..X  .XX..X.  .XX....  .XX..X.  .XX....  .XX..X.  .XX....  .XX..X.  .XXX...  .XX.XX.  .XXX...  .XX.X..  .XXX...  ..X.X..  .XXX...  ..X.X..  .XXX...
XXX....  .X.....  XXX..X.  XX.....  XX...X.  XX.....  .X...X.  XX.....  .XX..X.  XX.....  .XX..X.  XX..X..  .XX..X.  XX..X..  .XX..X.  XX..X..  .XX..X.  XX..X..
XXXX...  XXXX...  XXXX...  XXXX...  XXXX...  XXXXX..  XXXX...  XXXXX..  XXXX...  XXXXX..  XXXX...  XXXX...  XXXX...  XXX....  XXXX...  XXX....  XXXX...  XXX....

<examplar 55> ( O : Hebb; X : Iter )
.....O.  .......  .......  .......  ..OO...  ..OO...  ..OO...
O......  .......  .......  ..OO...  ..OO...  ..OO...  ..OO...
.OOOO..  .OOOO..  ..OOO..  ..OO...  ..OO...  ..OO...  ..OO...
OO.....  ....O..  .......  .......  .......  ..O....  ..O....
.O.O...  ..O.O..  ..OO...  ..OO...  ..OO...  ..OO...  ..OO...
....OO.  .......  ..OO...  ..OO...  ..OO...  ..OO...  ..OO...
OOOOO..  .OOOO..  .OOO...  ..OO...  ..OO...  ..OO...  ..OO...

.....X.  X......  .....X.  XX.....  .....X.  XX.....  ....XXX  XX.....  ....XXX  XX.....  ....XXX  XX.....  ....XXX  XX.X...  ....XXX
X......  .......  .......  .......  .......  .......  .......  ....X..  X......  ....XX.  XX.....  ....XXX  XX.X...  ....XXX  XX.X...
.XXXX..  XXXXXX.  .XXX...  .XXXXX.  .XX....  .XXXXXX  .XX....  .X.XXXX  ..X....  .X.XXXX  X.X....  .X.XXXX  X.X....  .X.XXXX  X.X....
XX.....  X......  ...XX..  X.X....  .X.XXX.  X.X....  .X.XXX.  X.X....  .X.XXX.  X.X....  .X.XXX.  X.X....  .X.XXXX  X.X....  .X.XXXX
.X.X...  X.X.X..  .X.X..X  X.X.X..  .X.X...  X.X.X..  .X.X..X  X.X.X..  .X.X..X  X.X.X..  .X.X..X  X.X.XX.  .X.X..X  X.X.XX.  .X.X..X
....XX.  X....X.  .X..XX.  X....X.  .X.XXX.  X.X....  .X.XX..  X.X....  .X.XX..  X.X...X  .X.XX..  X.X...X  .X.XXX.  X.X...X  .X.XXX.
XXXXX..  .XXXXX.  XXX.X.X  .X.X.X.  X.X.X.X  .X.X.X.  X.X.X.X  .X.X.X.  X.X.X.X  .X.X.X.  X.X.X.X  .X.X.X.  X.X.X.X  .X.X.X.  X.X.X.X

<examplar 56> ( O : Hebb; X : Iter )
...O.O.  ...O...  ..OO...  ..OO...  ..OO...
..OOO..  ..OO...  ..OO...  ..OO...  ..OO...
..OOOO.  ..OO...  ..OO...  ..OO...  ..OO...
O..O...  .......  .......  ..O....  ..O....
..OO...  ..OO...  ..OO...  ..OO...  ..OO...
O.OO.O.  ..OO...  ..OO...  ..OO...  ..OO...
...O...  ..OO...  ..OO...  ..OO...  ..OO...

...X.X.  ....X..  .X.X...  ..X.X..  .X.X...  ..X.X..  .X.X...  X.X.X..  .X.X...  X.X.X..  .X.X...  ..X.X..  .X.X...
..XXX..  ..XX.X.  ..XXX..  ..XX.X.  .XXXX..  ..XX.X.  .XXXX..  ..X..X.  XX.XX..  ..X..X.  .X.XX..  ..X....  .X.XX..
..XXXX.  ..XXXX.  ..XXXX.  .XXXXX.  ..X.XX.  .X.XXX.  X.X.X..  .X.X.X.  X.X.X..  .X.X.X.  X.X.X.X  .X.X.X.  X.X.X.X
X..X...  ..X.X.X  ...X.X.  ..X.X.X  ...X.X.  ..X.X.X  .X.X.X.  ..X.X.X  XX.X.X.  .XX.X.X  XX.X.X.  .XX.X.X  XX.X.X.
..XX...  ..XX...  ...XX..  ..XX.X.  .X.XX..  ..XX.X.  .X..X.X  X.XX.X.  .X..X.X  X.XX.X.  .X..X.X  X.XX.X.  .X..X.X
X.XX.X.  ...XX..  ..XX.X.  ...XX..  ..XX.X.  ...XX.X  ..XX.X.  ...XX.X  ..XX.X.  ...XX.X  ..XX.X.  ...XX.X  ..XX.X.
...X...  .......  ....X..  .....X.  ....X.X  ...X.X.  ..X.X.X  .X.X.X.  ..X.X.X  .X.X.X.  ..X.X.X  .X.X.X.  ..X.X.X
```

```
<examplar 57> ( O : Hebb; X : Iter )
.......  .......  .......  .......
.O.....  .......  .......  .......
OO.OOO.  OO..OO.  OO..OO.  OO..OO.
O...OO.  OO..OO.  OO..OO.  OO..OO.
OO..O..  OO..OO.  OO..OO.  OO..OO.
OO..OO.  OO..OO.  OO..OO.  OO..OO.
OOOO..O  .OOOOO.  .OOOO..  .OOOO..

.......  .......  .......  .......  .......  ...X...  ..X....  ...X...  ..X....  ...X...  ..X....  ...XX.X  ..X....  ...X..X  ..X....  ...XX.X  ..X....
.X.....  .......  .X.....  .......  .X..X..  .......  .X..X..  .X.....  .X..X..  .XX....  .X.XX..  ..X....  .X.XX..  ..X....  .X.XX..  ..X....  .X.XX..
XX.XXX.  XX..XX.  XX..XX.  XX..XX.  XX..XX.  .X..XX.  XX..X..  .X...X.  XXX.X.X  .X.X.X.  X.X.X.X  .X.X.X.  X.X.X.X  .X.X.X.  X.X.X.X  .X.X.X.  X.X.X.X
X...XX.  .X..X..  X....X.  .X..X..  X..X.X.  .X..X.X  XXXX.X.  .XX.X.X  XXXX.X.  .XX.X.X  XXXX.X.  .XX.X.X  XXXX.X.  .XX.X.X  X.XX.X.  .X..X.X  X.XX.X.
XX..X..  .X..XX.  XXX.X..  .X.X.X.  .XX.X..  XX.X.X.  .XX.X..  XX.X.X.  .XX.X..  XXXX.X.  .XX.X.X  X.XX.X.  .X..X.X  X.XX.X.  .X..X.X  X.XX.X.  .X..X.X
XX..XX.  XX..XX.  XX..XX.  XX..XX.  XX...X.  .X..X..  XXX..X.  .X..X..  XXX..X.  .X..X..  XXX..X.  .X..X.X  XXX..X.  .X.XX.X  X.X..X.  .X.XX.X  X.X..X.
XXXX..X  XXX..X.  XXXXX.X  XXXX.X.  .XXXX.X  XXXX.X.  .XXXX.X  XXXX.X.  .XXXX.X  XXXX.X.  .XXXX.X  XXXX.X.  .XX.X.X  XXXX.X.  .XX.X.X  XXXX.X.  .XX.X.X

<examplar 58> ( O : Hebb; X : Iter )
.O.O...  .......  .......  .......
...O...  .......  .......  .......
OO..OO.  OO..OO.  OO..OO.  OO..OO.
OO..OO.  OO..OO.  OO..OO.  OO..OO.
OO..OO.  .O..OO.  OO..OO.  OO..OO.
.OOOO..  .O..OO.  OO..OO.  OO..OO.
..OO...  .OOOO..  .OOOO..  .OOOO..

.X.X...  ..X.X..  .X.X...  ..X.X..  .X.X...  ..X.X..  .X.XX..  ..X.XX.  .X.XX..  ..X.XX.
...X...  ..X....  .X.....  ..X.X..  .X.....  ..X.X..  .X.....  ..X.X..  .X.....  ..X.X..
XX..XX.  XX...X.  XX..X.X  XX...X.  XX..X.X  XX...X.  XX..X.X  XX...X.  XX..X.X  XX...X.
XX..XX.  XX..XXX  XX..XX.  XX..XXX  XX..XX.  XX..XXX  XX.XXX.  XX..XXX  XX..XX.  XX..XXX
XX..XX.  XX..X..  XX...X.  XX..X..  XX...X.  XX..X..  XX...X.  XX..X..  XX...X.  XX..X..
.XXXX..  .XXX...  ..XXX..  .X.X...  ..X.X..  .X.X...  ..X.X..  .X.X...  X.X.X..  .X.X...
..XX...  ..XX...  ..XX...  ..XX...  ..X....  .X.X...  ..X....  .X.X...  ..X....  .X.X...

<examplar 59> ( O : Hebb; X : Iter )
..O....  .......  .......  .......  .......
.......  ..O....  .......  .......  .......
OO....O  OO...O.  OO..OO.  OO..OO.  OO..OO.
OO.O.OO  OO...O.  OO..OO.  OO..OO.  OO..OO.
OOO.OOO  OO.O.OO  OOO.OO.  OO..OO.  OO..OO.
..OO..O  OOO.OO.  .O..OO.  OO..OO.  OO..OO.
.OO.OO.  OOOO...  .OOOOO.  .OOOO..  .OOOO..

..X....  .X.....  X......  .....X.  X......  .....X.  X......  .....X.
.......  .......  .......  .......  X......  .......  .......  .......
XX....X  XX...X.  XX.XX.X  XX.X.X.  XX..X.X  XX.X.X.  XX..X.X  XX.X.X.
XX.X.XX  XX...XX  XX.X.XX  .X..XXX  XX.X.X.  .X..XXX  XX.X.X.  .X..XXX
XXX.XXX  XX.X.XX  XXX.X.X  XX.X.X.  X.X.X.X  .X.X.X.  X.X.X.X  .X.X.X.
..XX..X  .XXX..X  ..XX.X.  .XXXX.X  ..X..X.  .X.XX.X  X.X..X.  .X.XX.X
.XX.XX.  XXX.X..  .XX..X.  XXX.X.X  .XXX.X.  XXX.X.X  .XXX.X.  XXX.X.X

<examplar 60> ( O : Hebb; X : Iter )
.......  .......  .......  .......  .......  ....O..  .......
.O.....  .......  .O.....  .....O.  .O..O..  .....O.  .O..O..
OO...OO  OO..OO.  OO..OO.  OO..OO.  OO..OO.  OO..OO.  OO..OO.
.OO.O..  OO..OO.  OO..OO.  OO..OO.  OO..OO.  OO..OO.  OO..OO.
..OOO..  .OO.OO.  OO..OO.  OO..OO.  OO..OO.  OO..OO.  OO..OO.
OO..OO.  .O..OO.  OO..OO.  OO..OO.  OO..OO.  OO..OO.  OO..OO.
O....OO  OOO..O.  .OOOO..  .OOOO..  .OOOO..  .OOOO..  .OOOO..

.......  .......  .......  .......  X......  ..X....  ...X...  ..X....  ...X...  ..X....  .X.X...  ..X....  XX.X...  ..X..X.  XX.XX..  ..X..X.  XX.XX..  ..X..X.
.X.....  .X..X.X  .X...X.  .XX.X.X  .XX..X.  .XX.X.X  .XX..X.  .XXXX.X  .XX..X.  .XXXX.X  .XX..X.  XXXXX.X  .XX..X.  XXXXX.X  .XX..X.  XX.XX.X  ..X..X.  XX.XX.X
XX...XX  XXX..X.  .X..XXX  XXX..X.  .X..XXX  X.X..X.  .X..XXX  X.X..X.  .X..X.X  X.X..X.  .X..X.X  X.X..X.  .X..X.X  X.X..X.  .X..X.X  X.X..X.  .X..X.X  X.X..X.
.XX.X..  .XX..X.  XXX.X..  .X.X.X.  XXX.X..  .X.X.X.  X.X.X..  .X.X.X.  X.X.X..  .X.X.X.  X.X.X..  .X.X.X.  X.X.X..  .X.X.X.  X.X.X..  .X.X.X.  X.X.X..  .X.X.X.
..XXX..  ..X.X..  .X.X.X.  XXX.X..  .X.X.X.  .XX.X..  ...X.X.  .XX.X..  ...X.X.  .XX.X..  ...X.X.  .XX.X..  ...X.X.  .XX.X..  ...X.X.  .XX.X..  ...X.X.  .XX.X..
XX..XX.  .X..XX.  .X..XX.  .X...X.  ....XXX  .X...X.  ....XXX  .X...X.  ..X.XXX  .X.X.X.  ..X.X.X  .X.X.X.  X.X.X.X  .X.X.X.  X.X.X.X  .X.X.X.  X.X.X.X  .X.X.X.
X....XX  XX...XX  XX...X.  XX..X.X  XXX..X.  XX..X.X  XXX..X.  .X..X.X  X.X..X.  .X..X.X  X.X..X.  .X..X.X  X.X..X.  .X..X.X  X.X..X.  .X.XX.X  X.XX.X.  .X.XX.X
```

```
<examplar 61> ( O : Hebb; X : Iter )
...O...  ....O..  .......  .......  .......
.O..OO.  .O.....  .......  .......  .......
.O..OO.  .O..OO.  OO..OO.  OO..OO.  OO..OO.
OO..OO.  .O..OO.  OO..OO.  OO..OO.  OO..OO.
.OOO.O.  .OO.OO.  .O..OO.  OO..OO.  OO..OO.
.....O.  .O..OO.  .O..OO.  OO..OO.  OO..OO.
OOOOO..  .OOOO..  .OOOO..  .OOOO..  .OOOO..

...X...  ..X.X..  ...X...  ..X....  ...X...  ..X....  ...X...  ..X....  ...X..X  ..X....  ...X..X  ..X....  ...X..X  ..X....  ...X..X  ..X....  ...X..X  ..X....
.X..XX.  .X.XX..  .XX..X.  .X.XX.X  .XX....  .X.XX..  .XX....  .X.XX..  ..X....  .X.XX..  ..X....  .X.XX..  ..X....  .X.XX..  ..X....  .X.XX..  ..X....  .X.XX..
.X..XX.  XXX.XX.  .X..XX.  XXX.X..  .X.X.X.  X.X.X..  .X.X.X.  X.X.X..  .X.X.X.  X.X.X..  .X.X.X.  X.X.X..  .X.X.X.  X.X.X.X  .X.X.X.  X.X.X.X  .X.X.X.  X.X.X.X
XX..XX.  XX.XXX.  XXX.X..  .X.X.X.  ..X.X..  .X.X.X.  ..X.X.X  .X.X.X.  ..X.X.X  X..X.X.  ....X.X  X..X.X.  ....X.X  X..X.X.  .X..X.X  X.XX.X.  .X..X.X  X.XX.X.
.XXX.X.  .XX.X..  .XXX.X.  .XX.X..  .XXX.X.  .XX.X..  ..XX.X.  .XX.X.X  ..XX.X.  .XX.X.X  X.XX.X.  .X..X.X  X.XX.X.  .X..X.X  X.XX.X.  .X..X.X  X.XX.X.  .X..X.X
.....X.  .X...X.  X...X..  .X...X.  X...X.X  .X...X.  X...X.X  .XX..X.  ....X.X  .XX..X.  ....X.X  X.X..X.  .X.XX.X  X.X..X.  .X.XX.X  X.X..X.  .X.XX.X  X.X..X.
XXXXX..  XXXXX..  XXXX.X.  XXXXX.X  XXXX.X.  XXXXX.X  XXXX.X.  XXX.X.X  XXXX.X.  .XX.X.X  XXXX.X.  .XX.X.X  XXXX.X.  .XX.X.X  XXXX.X.  ..X.X.X  XX.X.X.  ..X.X.X
```

```
<examplar 62> ( O : Hebb; X : Iter )
.....O.  .......  .......  ...O...  ..OO...  ..OO...  ..OO...
.....O.  .......  ...O...  ..OO...  ..OO...  ..OO...  ..OO...
OOOOO..  .O.OO..  ..OOO..  ..OO...  ..OO...  ..OO...  ..OO...
O..OO..  ....O..  .......  .......  .......  ..O....  ..O....
...O...  ..OO...  ..OO...  ..OO...  ..OO...  ..OO...  ..OO...
.OO..O.  ..O....  ..OO...  ..OO...  ..OO...  ..OO...  ..OO...
OOO.O..  .OOO...  ..OO...  ..OO...  ..OO...  ..OO...  ..OO...

.....X.  .......  .......  X......  .....X.  X......  .....X.  X......
.....X.  .......  .......  .......  .......  .......  .......  .......
XXXXX..  XX.X.X.  XXX.X..  .X.XXX.  XXX.X..  .X.XXX.  XXX....  .X.XXX.
X..XX..  XX.....  ...XXX.  XX.....  ...XXX.  XX.....  X..XXX.  XX.....
...X...  ..X....  .X.X...  ..X....  .X.X...  X.X....  .X.X...  X.X....
.XX..X.  .X...X.  ..X..X.  .X.X...  ..X....  ...X...  ..X....  ...X...
XXX.X..  .X.X.X.  X.X.X..  .X.X.X.  X.X.X.X  .X.X.X.  X.X.X.X  .X.X.X.
```

```
<examplar 63> ( O : Hebb; X : Iter )
..OO...  ..OO...  ..OO...
.OOOO..  ..OO...  ..OO...
.OOOO.O  ..OO...  ..OO...
..OO...  ..O....  ..O....
..OOOO.  ..OO...  ..OO...
.......  ..OO...  ..OO...
..OO...  ..OO...  ..OO...

..XX...  ..XX...  ..XX...  ..XX...  ..XX...  ..XX...  ..XX...  ..XX...  ..XXX..  ..XX...
.XXXX..  .XXXX..  .XXX...  .XXXX.X  .XXX...  .XX.X.X  .X.X...  .XX.X.X  .X.X...  .XX.X.X
.XXXX.X  .XXX...  .XX.X.X  .XXX.X.  .XX.X.X  .XXX.X.  .XX.X.X  .XXX.X.  .XX.X.X  .XXX.X.
..XX...  .XX..XX  .XXX...  .XX...X  ..XX...  .X....X  X.XX...  .X....X  X.XX...  .X....X
..XXXX.  ..XX...  ...X...  ..X....  .X.X...  ..X....  .X.X...  ..X....  .X.X...  ..X....
.......  .......  ..X....  .X.....  ..X..X.  .X.....  ..X..X.  .X.X...  ..X..X.  .X.X...
..XX...  .XXXX..  X.XXX..  .XXXX..  X.XX...  .XXXX..  X.XX...  .XXXX..  X.XX...  .XXXX..
```

```
<examplar 64> ( O : Hebb; X : Iter )
.OO.OO.  ..OO...  ..OO...  ..OO...
.OOOOO.  ..OO...  ..OO...  ..OO...
.OO.O..  ..OO...  ..OO...  ..OO...
.......  ..OO...  ..O....  ..O....
..O....  ..OO...  ..OO...  ..OO...
.......  ..OO...  ..OO...  ..OO...
.O.....  ..OO...  ..OO...  ..OO...

.XX.XX.  .XXXXX.  XXX.X..  .XXX.X.  XXX.X..  .X.X.X.  X.X.X..  .X.X.X.  X.X.X..
.XXXXX.  XXX.X..  .XXXXX.  XXX.X..  .XXX.X.  .XX....  ..XX...  .XX....  ..XX...
.XX.X..  .XX.XX.  .XXXX..  .XX....  .XXXX..  .XX....  .XXXX..  .XX....  .XXXX..
.......  .......  .......  ....X..  .X.....  ....XX.  .X.....  ..X.XX.  .X.....
..X....  .X.X...  ..X....  .X.X...  ..X.X..  .X.X...  ..X.X..  .X.X...  ..X.X..
.......  ..X....  .......  ..X....  .......  ..X....  .X.....  ..X....  .X.....
.X.....  X.X.X..  .X.X.X.  X.X.X.X  .X.X.X.  X.X.X.X  .X.X.X.  X.X.X.X  .X.X.X.
```

```
<examplar 65> ( O : Hebb; X : Iter )
.O..OO.  ..O.O..  .O..OO.  ....OO.  ....O..  ....O..  ....O..  ....O..
..O.OO.  OO...O.  .O..OO.  OO..OO.  OO..OO.  .O..OO.  .O..OO.  .O..OO.
OO.OOOO  OOO.OO.  OO..OO.  OO..OO.  OO..OO.  OO..OO.  OO..OO.  OO..OO.
.OO..O.  OO..OOO  OO..OO.  OO..OO.  OO..OO.  OO..OO.  OO..OO.  OO..OO.
OOOO.OO  OOO.OO.  OO..OO.  OO..OO.  OO..OO.  OO..OO.  OO..OO.  OO..OO.
.OO.OO.  OO..OO.  OO..OO.  OO..OO.  OO..OO.  OO..OO.  OO..OO.  OO..OO.
.OO.OO.  OOOOOO.  OOOOOO.  .OOOOO.  .OOOOO.  .OOOOO.  .OOOO..  .OOOO..

.X..XX.  .XX.XX.  .X.XXX.  .XX.XX.  .X.XX..  ..X.XX.  .X.XX..  ..X.XX.  .X.XX..  ..X.XX.
..X.XX.  ..X.XX.  .XX.XX.  ..XXXX.  .XX.XX.  ..XXXX.  .XX.XX.  ..XXXX.  .XX.XX.  ..XXXX.
XX.XXXX  XXX.XXX  .XXXXXX  XXX.XXX  .XXX.XX  X.X.XXX  .X.X.X.  X.X.X.X  .X.X.X.  X.X.X.X
.XX..X.  .XX..XX  .XX..X.  .XX..XX  .XX..X.  .XX...X  .XX..X.  .XXX..X  XXX..X.  .XXX..X
XXXX.XX  XXXXXXX  XXXX.XX  XXXXXXX  XXXX.XX  XXXXXXX  XXXX.XX  XXXXXXX  XXXX.XX  XXXXXXX
.XX.XX.  .XX.XX.  .XXXXX.  .XX.XX.  XXXXXX.  .XX.XX.  XXXXXX.  .XX.XX.  XXXXXX.  .XX.XX.
.XX.XX.  .X..XX.  .XX.XX.  .X.XXX.  ..X.XXX  .X.X.X.  ..X.XXX  .X.X.X.  ..X.XXX  .X.X.X.

<examplar 66> ( O : Hebb; X : Iter )
..OO..O  ..OOO..  ..OO...  ..OO...  ..OO...
.OOOO..  ..OO...  ..OO...  ..OO...  ..OO...
OO.....  ..O....  ..OO...  ..OO...  ..OO...
.OO....  .......  .......  ..O....  ..O....
....OO.  .......  ..OO...  ..OO...  ..OO...
OOOOO..  ..OO...  ..OO...  ..OO...  ..OO...
..OO...  ..OOO..  ..OO...  ..OO...  ..OO...

..XX..X  ..XX...  ..XXX..  .XXXX..  ..XXXX.  .XXXX..  ..XXXX.  .XXXX..  ..XXXXX  .XXXX..  ..XXXXX  .XXXX..
.XXXX..  .XXXXX.  .XXXX..  .XX.XX.  .XXXX..  .XX.XX.  .XXXX..  ..X.XX.  .XXX...  ..X.XXX  .XXX...  ..X.XXX
XX.....  XX.....  .X....X  .XX....  .XX....  .XXXX..  ..X....  .X.XX..  ..X.XX.  .X.XX..  X.X.X..  .X.XX..
.XX....  .XX...X  .XXX...  .XX...X  .XXX...  XXX....  .X.X...  X.X...X  .X.X...  X.X...X  .X.X...  X.X...X
....XX.  .X..X..  .X...X.  XXX.X..  .X.X.X.  X.X.X..  .X.X.X.  X.X.X..  .X.X.XX  X.X.X..  .X.X.XX  X.X.X..
XXXXX..  XXXXX..  .XXXX..  X.XX...  .X.XX..  X.X....  .X.XX..  X.X..X.  .X.XX..  X.X..XX  .X.XX..  X.X..XX
..XX...  ..XX...  ..XX...  ..XX...  ..XX...  ..XX.X.  ..X.X.X  .X.X.X.  ..X.X.X  .X.X.X.  ..X.X.X  .X.X.X.

<examplar 67> ( O : Hebb; X : Iter )
......O  OOO..O.  OOO..OO  OOO.OOO  OOO.OOO  OO..OOO  OO..OOO  OO..OOO
.OO.OOO  .O...OO  OOO..OO  OOO..OO  OO..OOO  OO..OOO  OO..OOO  OO..OOO
.O..OO.  .OO.OO.  .OO..O.  OOO.OOO  OOO.OOO  OO..OOO  OO..OOO  OO..OOO
..OOO..  .OOOO..  .OOOOO.  .OOOOOO  OOOOOOO  OOOOOOO  OO.OOOO  OO.OOOO
..O...O  .OOO...  .OO.OOO  OOO.OOO  OOO.OOO  OO..OOO  OO..OOO  OO..OOO
.O...OO  .OO..OO  .OO..OO  OOO..OO  OOO.OOO  OO..OOO  OO..OOO  OO..OOO
OO...OO  OO...OO  OOO..OO  OOO..OO  OO..OOO  OO..OOO  OO..OOO  OO..OOO

......X  ..X..XX  XX.....  ..X..XX  XX.....  ..X..X.  XX.....  ..X..X.  XX.....
.XX.XXX  .X.....  .XX..XX  .X.X...  XXX.XXX  .X.X...  X.X.XXX  .X.X...  X.X.XXX
.X..XX.  X.X.XX.  .X.XX..  X.X..X.  .X.XX..  X.X..X.  .X.XX..  X.X..X.  .X.XX..
..XXX..  ..XXX..  .......  ...XX..  X....X.  ...XX..  X....X.  ...XX..  X....X.
..X...X  .X...X.  ..X.X.X  .X.X.X.  ..X.X.X  .X.X.X.  ..X.X..  .X.X.X.  ..X.X..
.X...XX  ..X..XX  .X.X.XX  ..X...X  ...X.XX  ..X.X.X  ...X.X.  ..X.X..  ...X.X.
XX...XX  X...XXX  XX.X.X.  X...X.X  .X.X.X.  X...X.X  .XXX.X.  X...X.X  .XXX.X.

<examplar 68> ( O : Hebb; X : Iter )
..OO..O  .O.OOO.  OOO.OO.  .O.OOO.  OO..OOO  OO..OOO  OO..OOO
.O..OOO  OO..OO.  OO..OO.  OO..OOO  OO..OOO  OO..OOO  OO..OOO
..O.OO.  OO..OOO  OO..OO.  OO..OOO  OO..OOO  OO..OOO  OO..OOO
.OOO.OO  OOOOOO.  OO..OO.  OO..OO.  OO..OOO  OO.OOOO  OO.OOOO
OO.OOO.  OO..OO.  OO..OOO  OO..OO.  OO..OOO  OO..OOO  OO..OOO
O...O..  OO..OO.  OO..OO.  OO..OO.  OO..OOO  OO..OOO  OO..OOO
.OOO.OO  OOOOO..  .OOOOO.  OOOOOOO  OOOOOOO  OO..OOO  OO..OOO

..XX..X  ..XXX.X  ..XX...  ...XX.X  ..XX.X.  ...XX.X  ..XX.X.  ...XX.X  ..XX.X.
.X..XXX  XXXXXX.  .X.XXXX  XXX.XX.  .X.XXX.  XXX.XXX  .X.XXX.  XXX.XXX  .X.XXX.
..X.XX.  .X.XX..  X.X.XX.  .X.XX..  X.X.XX.  .X.XX..  X.X.XX.  .X.XX..  X.X.XX.
.XXX.XX  XXXXXXX  .XXX..X  XXXX.XX  .XXX..X  .XXX.XX  XXXX..X  .XXXXXX  XXXX..X
XX.XXX.  .XXXXX.  XXXXXX.  ...XXX.  XXX.XX.  .X.XXX.  XXX.XX.  .X.XXX.  XXX.XX.
X...X..  XX..XX.  XX..X..  XX...X.  XX..X.X  XX.X.X.  XX..X.X  XX.X.X.  XX..X.X
.XXX.XX  ..X..XX  .X.X..X  X.X..X.  .X.X..X  X.X..X.  .X.X..X  X.X..X.  .X.X..X
```

```
<examplar 69> ( O : Hebb; X : Iter )
OOO....  ..OO...  ..OO...  ..OO...  ..OO...
.OO....  ..OO...  ..OO...  ..OO...  ..OO...
OO....O  ..OO...  ..OO...  ..OO...  ..OO...
.......  .......  .......  ..O....  ..O....
O......  .......  ..OO...  ..OO...  ..OO...
...O..O  ..OO...  ..OO...  ..OO...  ..OO...
.......  ..O....  ..OO...  ..OO...  ..OO...

XXX....  .XX....  XXX....  .XX....  XXX....  .XX....  XX.....  ..X..X.  XX.....  ..X..X.  XX.....  .....X.  XX.....  .....X.  XX.....  .....X.  XX.....  .....X.  XX.....  ....XX.  XXX....  .X.X...  XXX....  ....X..  XXX....  ....XX.
XXX....  ....XX.
.XX....  .XX....  .XX....  .XX....  .XX....  ..X....  .XX....  .......  ..X....  .......  ..X....  .......  ..X....  .......  ..X....  .X.....  ..X....  ..X..X.  XXX....  .XX.XXX  XXX..X.  .X..XXX  XXX....  .....XX  XXX....
.....XX  XXX....
XX....X  XX.....  XX.....  X.X....  .X.X...  X.X....  .X.X...  X.X....  .X.X...  X.X....  .X.X...  X.X....  .X.XXX.  X.X....  .X.XXX.  X.X....  .X.XXX.  X.X....  ....XXX  XX..X..  XX.X.X.  XX..X.X  XXXX.X.  XXX...X
XXXX.X.  XXX...X
.......  .X.X...  ..X....  .X.X...  X.X....  .X.X...  X.X....  .X.X...  X.X....  .X.X...  X.X....  .X.XX..  X.X....  .X.XXX.  X.X....  .X.XXX.  X.X....  .X.XXX.  ...XXX.  XX.XXX.  XX..X.X  XX.X.X.  XXX.X.X  XX.X.X.
XXX...X  XX.X.X.
X......  .......  .......  .......  .......  .......  .......  .......  .......  .X.....  X.X....  .X....X  X.X....  .X.X..X  X.X....  .X.X..X  X.X..X.  .X.X..X  X.X..X.  ...XX.X  X.X..X.  .X.XX.X  X.X..X.  .X.XX.X
X.X..X.  .X.XX.X
...X..X  ..XX...  ...X..X  ..XX...  ...X..X  ..XX...  ...X..X  ..XX...  ...X..X  ..XX...  ...X..X  ..XX...  ...X..X  ..XX.X.  ......X  .XXX.X.  ..X...X  .XXX.X.  XX.X.XX  .X.X.X.  ..X...X  .XXX.X.  ..X.X.X  .XX
..X.X.X  .XXX.X.
.......  ....X.X  .....X.  X...X.X  .X...X.  X...X.X  .X...X.  X...X.X  .XXX.X.  X...X.X  .XXX.X.  X.X.X.X  .X.X.X.  X.X.X.X  .X.X.X.  X.X.X.X  .X.X.X.  X.X.X.X  .X.X.X.  X.X.X.X  X.X.X.X  X.X....  .X.X...  X.X.X..  .X.X.X.  X.X
.X.X.X.  X.X.X.X

<examplar 70> ( O : Hebb; X : Iter )
.O.OO.O  ..OO...  ..OO...  ..OO...
.OOO...  ..OO...  ..OO...  ..OO...
.OO....  ..O....  ..OO...  ..OO...
.OOO...  ..O....  ..O....  ..O....
.OO..O.  ..O....  ..OO...  ..OO...
..OO...  ..OO...  ..OO...  ..OO...
.O.OOO.  ..OOO..  ..OO...  ..OO...

.X.XX.X  ..XXXX.  XX.XX..  ..XXXX.  XXXXX..  .XXXXX.  XXXXX..  .XX.XX.  XXXX...  ..X.XXX  XXXX...  ..X.XXX  XXXX...  ..X.XXX
.XXX...  ..XX.X.  .XXX..X  .XXX...  ..XX..X  .XXX...  ..X..XX  XXXX...  ..X..XX  XXXX...  ..X..XX  XXXX...  ..X.XXX  XXXX...
.XX....  .XX....  .X.X...  XXX....  .X.X.XX  X.X....  .X.X.XX  X.X....  .X.XXXX  X.X....  .X.XXXX  X.X....  .X.XXXX  X.X....
.XXX...  .XXX...  XXX....  .X.XXX.  XXX....  .X.XXX.  XXX....  .X.XXX.  X.X....  .X.XXXX  X.X....  .X.XXXX  X.X....  .X.XXXX
.XX..X.  .XX.X.X  .XX..X.  .XXXX.X  ..X..X.  .X.XX.X  X.X..X.  .X.X..X  X.X..X.  .X.X..X  X.X.XX.  .X.X..X  X.X.XX.  .X.X..X
..XX...  ..XX..X  ..XX...  ..XX..X  ..X....  .XXX.XX  ..X...X  .XXX.X.  ..X...X  .XXX.X.  X.X...X  .X.XXX.  X.X...X  .X.XXX.
.X.XXX.  X.XXX..  .X.XXX.  X.XXX..  .X.XXX.  X.X.X..  .X.X.X.  X.X.X.X  .X.X.X.  X.X.X.X  .X.X.X.  X.X.X.X  .X.X.X.  X.X.X.X

<examplar 71> ( O : Hebb; X : Iter )
.OO..O.  ..OO...  ..OO...  ..OO...  ..OO...
..OO...  ...O...  ..OO...  ..OO...  ..OO...
O..OO..  ..OO...  ..OO...  ..OO...  ..OO...
...OO.O  .......  .......  ..O....  ..O....
...OOO.  ...O...  ..OO...  ..OO...  ..OO...
O.OO...  ...O...  ..OO...  ..OO...  ..OO...
.OOO...  ..OO...  ..OO...  ..OO...  ..OO...

.XX..X.  .XX....  .XXX...  .XX....  .X.....  .XX....  .X.X...  ..X....  ...X...  ..X....
..XX...  ..XX...  ..X....  ...X...  ..X....  ...X...  ..X....  ...XX..  ..X....  ...XX..
X..XX..  ...XX..  ...X...  X.XXX..  .X.X.X.  X.X.X..  .X.X.X.  X.X.X..  .X.X.X.  X.X.X..
...XX.X  ...X.X.  ....X.X  ...X.X.  ....X.X  ...X.X.  ....X.X  X..X.X.  ....X.X  X..X.X.
...XXX.  ....X..  ...X.X.  ....X..  ...X.X.  ....X.X  ...X.X.  ....X.X  X..X.X.  ....X.X
X.XX...  .XXX...  ..XX...  ..XX...  ...X...  ..X..X.  ...XX.X  ..XX.X.  ...XX.X  ..XX.X.
.XXX...  .XX....  .XX....  ..X....  .X.....  ..X....  .X.X...  ..X.X.X  .X.X.X.  ..X.X.X

<examplar 72> ( O : Hebb; X : Iter )
...O...  ......O  .....O.  O....OO  OO..OOO  OO..OOO  OO..OOO
.OO.OOO  O.OO.O.  ....O.O  OO..OOO  OO..OOO  OO..OOO  OO..OOO
..O.OO.  OO.O.OO  OO..OOO  OO..OOO  OO..OOO  OO..OOO  OO..OOO
OOOOOOO  OO.OOOO  OO..OOO  OO..OOO  OO..OOO  OO.OOOO  OO.OOOO
O..OOOO  .OOO.O.  OO.OOOO  OO..OOO  OO..OOO  OO..OOO  OO..OOO
..OO.OO  OO..O..  OO.OOOO  OO..OOO  OO..OOO  OO..OOO  OO..OOO
.......  .....OO  OO...OO  OO..OOO  OO..OOO  OO..OOO  OO..OOO

...X...  ..X.X..  .X.X...  ..X.X..  .X.X...  ..X.X..
.XX.XXX  ..XX.X.  ..X.XXX  ..XX.X.  ..X.X.X  ..XX.X.
..X.XX.  X..XXX.  X.XXXX.  .X.XXX.  X.X.XX.  .X.XXX.
XXXXXXX  XXXX.XX  XXXXXXX  XXXX.XX  XX.XXXX  XXXX.XX
X..XXXX  X.XX.X.  .X.X.XX  X.XX.XX  .X.X.XX  X.XX.XX
..XX.XX  .X.X.XX  X.XX.XX  .X.X.XX  X.X..XX  .X.X.XX
.......  .....X.  ....X..  ...X.X.  ....X.X  ...X.X.
```

```
<exemplar 73> ( O : Hebb; X : Iter )
.......  .......  .......  ..OO...  ..OO...  ..OO...
..OO...  ..OO...  ..OO...  ..OO...  ..OO...  ..OO...
..OO...  ..OO...  ..OO...  ..OO...  ..OO...  ..OO...
OOOOOO.  .......  .......  .......  ..O....  ..O....
.OOO...  ..OO...  ..OO...  ..OO...  ..OO...  ..OO...
...O...  ..OO...  ..OO...  ..OO...  ..OO...  ..OO...
......O  .......  ..OO...  ..OO...  ..OO...  ..OO...

.......  X......  .....X.  X..X...  .....X.  XX.X...  ..X.XX.  XX.X...  ..X.XXX  XXXX...  ..X.XXX
..XX...  ..X....  .XXX...  ..X..X.  .XXX...  ..X..XX  .XXX...  ..X.XXX  XXXX...  ..X.XXX  XXXX...
..XX...  .XXXX..  ..XX...  .XXXX..  ..X....  .X.XX..  ..X....  .X.XX..  ..X....  .X.XX.X  ..X....
XXXXXX.  XXX..X.  XX.XXX.  XXX.X..  XX.XXX.  XXX.X..  XX.XXX.  XXX.X..  .X.XXX.  X.X....  .X.XXX.
.XXX...  X.XXXX.  .XXX...  X.X.X..  .X.X...  X.X.X..  .X.X...  X.X.X..  .X.X...  X.X.X..  .X.X...
...X...  ..X....  .X.X...  ..X....  .X.X...  ..X....  .X.X...  ..X...X  .X.XX..  X.X....  .X.XX..
......X  .....X.  ....X.X  X..X.X.  ....X.X  ...X.X.  ....X.X  .X.X.X.  X.X.X.X  .X.X.X.  X.X.X.X

<exemplar 74> ( O : Hebb; X : Iter )
O...OO.  ..OO...  ..OO...  ..OO...
.......  ..OO...  ..OO...  ..OO...
.......  ..OO...  ..OO...  ..OO...
.......  .......  ..O....  ..O....
..O....  ..OO...  ..OO...  ..OO...
..OO...  ..OO...  ..OO...  ..OO...
OOOO...  ..OO...  ..OO...  ..OO...

X...XX.  XX...X.  X...XX.  XX...X.  X...XX.  XX...X.  X...X..  .X...X.  X......  .X...X.  X......  .X...X.  X......  .X...X.
.......  .......  ..X....  .X.....  X.X....  .X.X...  X.X....  .X.X...  X.X....  .X.X...  X.X....  .X.X...  X.X....  .X.X...
.......  .......  .X.....  ..X....  .X.X...  X.X....  .X.X...  X.X....  .X.X...  X.X....  .X.X...  X.X....  .X.XX..  X.X....
.......  .......  .......  ..X....  .......  .......  .......  .......  .......  .......  .......  ....X..  .......  ....X..
..X....  .XX....  ..X....  .XX....  ..X....  .X.....  ..X....  .X.....  ..X.X..  .X.X...  ..X.X..  .X.X...  ..X.X..  .X.X...
..XX...  ..X....  .XXX...  ..X....  .XXX...  ..X....  ...X...  ..X....  ...X...  ..X....  ...X...  ..X....  ...X...  ..X....
XXXX...  .XX.X..  XXXX...  .XX.X..  XXXX...  .XX.X..  XXXX.X.  XXX.X.X  XXXX.X.  XXX.X.X  .XXX.X.  X.X.X.X  .X.X.X.  X.X.X.X

<exemplar 75> ( O : Hebb; X : Iter )
.OO...O  .......  ...O...  ..OO...  ..OO...  ..OO...
.O.O...  ..O....  ..OO...  ..OO...  ..OO...  ..OO...
.O.....  ..OOO..  ..OO...  ..OO...  ..OO...  ..OO...
OOOOOO.  .......  .......  .......  ..O....  ..O....
.......  ..O....  ..OO...  ..OO...  ..OO...  ..OO...
.....O.  ..OO...  ..OO...  ..OO...  ..OO...  ..OO...
.......  ..OO...  ..OO...  ..OO...  ..OO...  ..OO...

.XX...X  X..X...  .XX....  X.XX...  .XX....  X.XX...  .XX....  X.XX...  .XX....
.X.X...  ..X.X.X  .X.X.X.  ..X.X.X  .XXX.X.  .XX.X.X  XXXX.X.  .XX.XXX  XXXX.X.
.X.....  X.X..X.  .X.....  X.X..X.  .X.....  X.X..X.  .X.....  X.X..X.  .X.....
XXXXXX.  .X.XX..  X.XXXX.  .X.X...  X.XXXX.  .X.X...  X.XXXX.  .X.X...  X.XXXX.
.......  ....X..  .......  .....X.  .......  .....X.  .......  .....X.  .......
.....X.  .......  .....XX  .......  .....XX  .......  .....XX  .......  .....XX
.......  XX.....  X.X....  XX.....  X.X....  XX.....  X.X....  XX.....  X.X....

<exemplar 76> ( O : Hebb; X : Iter )
.......  .......  ...O...  ..OO...  ..OO...  ..OO...
..O..O.  ..OO...  ..OO...  ..OO...  ..OO...  ..OO...
..O.O..  ...O...  ..OO...  ..OO...  ..OO...  ..OO...
.O.....  .......  .......  .......  ..O....  ..O....
.....OO  ..O....  ..OO...  ..OO...  ..OO...  ..OO...
...O...  ..OO...  ..OO...  ..OO...  ..OO...  ..OO...
..O...O  ...O...  ..OO...  ..OO...  ..OO...  ..OO...

.......  .X.....  X......  .X.....  X......  .X.....  X......  .X.....
..X..X.  ..X....  .......  ..X....  ...X...  ..X....  ...X...  ..X....
..X.X..  .X.X.X.  ..X.X..  .X.X...  ..X.X..  .X.X...  X.X.X..  .X.X...
.X.....  ..X..XX  .X.X...  ..X.XXX  .X.X...  ..X.XXX  .X.X...  ..X.XXX
.....XX  .X..X..  .....XX  ..X.X..  .X...XX  X.X.X..  .X...XX  X.X.X..
...X...  .....XX  .......  ...X..X  ..X....  ...X..X  .XXX...  ...X..X
..X...X  ...X..X  ..X...X  ...X..X  ......X  ...X.X.  ....X.X  ...X.X.
```

```
<examplar 77> ( O : Hebb; X : Iter )
.....OO ....... ..OO... ..OO... ..OO...
.O..OO. ....... ..OO... ..OO... ..OO...
...OO.. ..O.O.. ..OO... ..OO... ..OO...
..OO... ..OO... ....... ..O.... ..O....
.OO.... ..O.... ..OO... ..OO... ..OO...
OO....O ..O.... ..OO... ..OO... ..OO...
OO..... ..OO... ..OO... ..OO... ..OO...

.....XX ......X ....... ......X ....... ......X ....... ....... ....... ....... ....... ....... ....... ....... ....... ....... ......X ....... ......X ....... ...X... .X.XX.X ..X..X. ...XX.X .XX.... ...XX.X
XXX.... ...XXXX XXX.... ....XXX XXX.... ....XXX XXX.... ....XXX XXXX... ....XXX
.X..XX. ....X.. ....X.. ....... ....X.. ....... ....... ....... ....... ....... ....... ....... ....... ....... ..X.... .X..X.. ..X.... .X.XX.. ..X.... .X.XX.. .XXXXXX ....... ....X.. ....... ....X.. .......
....X.. XX..... ....XXX XXX.... ....XXX XXX.... ....XXX XXXX... ....XXX XXXX...
...XX.. ....X.. ...XX.. ....X.. ...XX.. ..X.X.. .X.XX.. ..X.X.. .X.X... X.X.X.. .X.X.X. X.X.X.. .X.X.X. X.X.X.. .X.X.X. X.X.X.. .X.X.X. X.X.X.X .X.X.X. X.X.X.X X...X.X X..XX.. ...XX.. ...XX.. ...XX.. ..X.X..
.X.XXX. X.X.X.. .X.XXX. X.X.X.. .X.XXX. X.X.... .X.XXXX X.X.... .X.XXXX X.X....
..XX... ..XX... ..X...X ..XX.X. ..X.X.X ..XX.X. ..X...X ...X.X. X.X.X.X .X.X.X. X.X.X.X XX.X.X. X.X.X.X .X.X.X. ..X.X.X XX.X.X. .XX.X.X XXXX.X. .XX.X.X X.XX.X. .....X. .X.XX.. X.XX.XX .X.XX.. X.X..XX .X.XX..
X.X..XX .X.XXX. X.X...X .X.XXX. X.X.... .X.XXX. X.X.... .X.XXXX X.X.... .X.XXXX
.XX.... .X..... .XX.... .X..... ..X.... .X..... ..X.... .X..... ..X.... .X..... X.X.... .X.X..X X.X..X. .X..X.X X.X..X. .X..X.X X.XX.X. .X..X.X X.XX.X. .X..X.X XXXX.X. XX.X.X. X.X.X.. .X.X.X. X.X.X.. .X.X.XX
X.X.X.. .X.X.XX X.X.XX. .X.X..X X.X.XX. .X.X..X X.X.XX. .X.X..X X.X.XX. .X.X..X
XX....X XX..... XX....X XX..... XX..... XX..... XX..... XX..... XX..... XXX.... .X....X XXX..X. .X....X XXX..X. .X..X.X XXX..X. .X..X.X X.X..X. .X.XX.X X.X..X. X..X.X. XX.X... X.....X XX.X... X.....X .X.
X.....X .X.XX.. X.X...X .X.XXX. X.X...X .X.XXX. X.X...X .X.XXX. X.X...X .X.XXX.
XX..... X.X..X. XX.X... X.X.... XX.X... X.X.... XX.X... X.X.X.. .X.X... X.X.X.. .X.X.X. X.X.X.X .X.X.X. X.X.X.X .X.X.X. X.X.X.X .X.X.X. X.X.X.X XX.X.X. ..X.X.X XXX.X.X X.X...X .X.X.X. X.X.X.X .X.X.X. X.X
.X.X.X. X.X.X.X .X.X.X. X.X.X.X .X.X.X. X.X.X.X .X.X.X. X.X.X.X .X.X.X. X.X.X.X

<examplar 78> ( O : Hebb; X : Iter )
....... ...O... ..OO... ..OO... ..OO...
..OO... ..OO... ..OO... ..OO... ..OO...
..OO.O. ..OO... ..OO... ..OO... ..OO...
....O.. ....... ....... ..O.... ..O....
....... ..OO... ..OO... ..OO... ..OO...
...O... ..OO... ..OO... ..OO... ..OO...
..OO... ..OO... ..OO... ..OO... ..OO...

....... ....... .....X. XX..... .....XX XX..... .....XX XX..... ....XXX XX..... ....XXX XXX..X. ...XXXX XXX..X. ...XXXX XXX.... ...XXXX
..XX... ..XX... ..XX... ..XX... ..X.... ...X... X.X.... ...XXX. X.X.... ...XXX. X.X.... ...XXX. XXX.... ...XXXX XXX.... ...XXXX XXX....
..XX.X. ..XXX.. ..XX... ..XXX.. ..XX... ..XXX.. .X.X... X.XXX.. .X.X.X. X.X.X.. .X.X.X. X.X.X.X .X.X.X. X.X.X.X .X.X.X. X.X.X.X .X.X.X.
....X.. X....X. ....X.. X....X. ....X.. X...... ....X.. X...... ....X.. X...... ....X.. X...... ....X.. X...... ....X.. X..X... ....X..
....... ....... ....... ....X.. ...X... ....X.. ...X... ....X.. ...X... ..X.X.. ...X... ..X.X.. ...X... ..X.X.. ...X... ..X.X.. ...X...
...X... ..X.... ...X... ..X.... ...X... ..X.... ...XX.. ..X.... ...XX.. ..X..X. .X.XX.. X.X..X. .X.XX.. X.X..X. .X.XX.X X.X..X. .X.XX.X
..XX... ...X... ....... ....... ....... ......X ....... ......X X...... .X....X X.X..X. .X.XX.X X.X..X. .X.XX.X X.X..X. .X.XX.X X.X..X.

<examplar 79> ( O : Hebb; X : Iter )
..O.... ..OO... ..OO... ..OO...
.OOO... ..OO... ..OO... ..OO...
......O ..OO... ..OO... ..OO...
..O.... ....... ..O.... ..O....
..OO... ..OO... ..OO... ..OO...
O.OOO.. ..OO... ..OO... ..OO...
.OO...O ..OO... ..OO... ..OO...

..X.... ..XX... ..XX... ..XX... ..XXX.. .XXX... ..XXX.. .XXX... ..XXX.. .XXX...
.XXX... ..XXX.. .XXX... ..XXX.. .XXX... ..XXX.X .XXX... ..XXX.X .XXX... ..XXX.X
......X ..X.... .X.X... X.X.X.X .X.X.X. X.X.X.X .X.X.X. X.X.X.X .X.X.X. X.X.X.X
..X.... ....... ..X.... ...X... ..X.X.X .X.X... ..X.X.X .X.X... ..X.X.. .X.X...
..XX... ..XXX.. ..XX... ..XXX.. ..XX... ..XXX.. ...X... ..X.X.. ...X... ..X.X..
X.XXX.. ..XX.X. ..XXX.. ..XX.X. .XXXX.X ..XX.X. .XXXX.X ..XX.X. .XXXX.X ..XX.X.
.XX...X .XX..X. .XX.X.X .XXX.X. .XX.X.X .XXX.X. ..X.X.X .X.X.X. ..X.X.X .X.X.X.

<examplar 80> ( O : Hebb; X : Iter )
...OO.. ..OO... ..OO... ..OO... ..OO...
..OO... ..OO... ..OO... ..OO... ..OO...
.OO.... ..OO... ..OO... ..OO... ..OO...
OO.O... ..O.... ....... ..O.... ..O....
OOOO... ..OO... ..OO... ..OO... ..OO...
..OO... ..OO... ..OO... ..OO... ..OO...
.O.OO.. ..OOO.. ..OO... ..OO... ..OO...

...XX.. ...XX.. ..XXXX. ...XX.. ..XX... ...XX.. ..XX... ...XX.. ..X.... ...XX.. X.X.... ...XX..
..XX... ..XX... ..XXX.. ..XX... ..XXX.. ..XX... ..XXX.. .XXX... ..XXX.X .XXX... ..XXX.X .XXX...
.XX.... .XX.... .XX.... .XX.... .XXX... .XX.... .XXX... .XX.... .XX.... .XX.... .XX.... .XX....
XX.X... XXX.... XX..... XXX.... XX..... XXX.... XX..... XX..X.. XX..... XX..X.. XX..... XX..X..
XXXX... XXXX... XXX.... .X.X..X XXX.... .X.X..X X.X.X.. .X.X... X.X.X.. .X.X... X.X.X.. .X.X...
..XX... ..XX... ..XX... ..X.X.. ..XX.X. ..X.X.. ..XX.X. ..X.X.. ...X.X. ..X.X.. ...X.X. ..X.X..
.X.XX.. ..XXXX. .X.XX.. ..XXXX. .X.XX.X ..X.XX. .X.XX.. ..X.X.. .X.XX.. X.X.X.. .X.XX.. X.X.X..
```

```
<examplar 81> ( O : Hebb; X : Iter )
..O.... ....... ..OO... ..OO... ..OO...
......O ..OO... ..OO... ..OO... ..OO...
OOOOOO. ...O... ..OO... ..OO... ..OO...
O...... ....... ....... ..O.... ..O....
...O... ..OO... ..OO... ..OO... ..OO...
..OOOO. ..OO... ..OO... ..OO... ..OO...
....OO. ..OO... ..OO... ..OO... ..OO...

..X.... ....... ....... ....... ....... ....... ....... ....... ....... ....... ....... ....... .......
......X ..X.... ...X... ..X.... ...X... ..X.... ...X... ..X.... ...XX.. ..X.... ...XX.. ..X.... ...XX..
XXXXXX. XXXXXX. XXXXXX. XXXX.X. XXX.X.. XX.X.X. X.X.X.. .X.X.X. X.X.X.. .X.X.X. X.X.X.. .X.X.X. X.X.X..
X...... X...X.. XX.X... X...X.X XX.X.X. XX..X.X XX.X.X. XXX.X.X XX.X.X. XXX.X.X XX.X.X. .XX.X.X XX.X.X.
..X.... ..XX... ...X..X X.XX... ...X..X X.XX... .X.X..X X.XX.X. .X..X.X X.XX.X. .X..X.X X.XX.X. .X..X.X
..XXXX. ..XXXXX ..XX.X. ...X..X ..XX.X. ...X..X ..XX.X. ...X..X ..XX.X. ...XX.X ..XX.X. ...XX.X ..XX.X.
....XX. ....X.. ....XX. .X.XXX. X.X.X.X .X.X.X. X.X.X.X .X.X.X. X.X.X.X .X.X.X. ..X.X.X .X.X.X. ..X.X.X

<examplar 82> ( O : Hebb; X : Iter )
.OO.... ..OO... ..OO... ..OO...
..OO... ..OO... ..OO... ..OO...
...OO.O ..OO... ..OO... ..OO...
....OO. ....... ..O.... ..O....
...OO.. ..OO... ..OO... ..OO...
.OO.... ..OO... ..OO... ..OO...
.OOO... ..OO... ..OO... ..OO...

.XX.... .XXX.X. XXX.X.. .XXX.X. XXX.X.. .XXX.X. XXX.X.. .XXX.X. XX..X.X XXXX.X. XX..X.X
..XX... ...X... ..X.... .X..... ..X.... .X..... X.X.... .X...X. X.X.... .....X. X.X....
...XX.X ..XX.X. .X.XX.X X.XX.X. .X..X.X X.XX.X. .X..X.X X.XX.X. .X..X.X X.XX.X. .X..X.X
....XX. ....XX. ...X.X. ....X.X ...X.X. ....X.X ...X.X. ....X.X ...X.X. ....X.X ...X.X.
...XX.. ..X.... ...X... .XX.... ...XX.. .XX.... ...XX.. .XX.... ...XX.X XXX..X. ...XX.X
.XX.... .XX.... .XX.... ..XX... .XXX... ..XXX.. .XXX.X. ..XXX.X .XXX.X. ..XXX.X .XXX.X.
.XXX... .XX.... X.XX... .XX.... X.XX... .X..... ..X..X. .X....X ..X..X. .X..X.X ..X..X.

<examplar 83> ( O : Hebb; X : Iter )
.OOO... ....O.. ...O... ...O... ..OO... ..OO... ..OO...
O...OO. ...OO.. ...O... ..OO... ..OO... ..OO... ..OO...
....OOO ...OOO. ...OO.. ..OO... ..OO... ..OO... ..OO...
O...OO. ...OO.. ....... ....... ....... ..O.... ..O....
..OOO.O ...O... ...O... ..OO... ..OO... ..OO... ..OO...
....... ...OO.. ...O... ..OO... ..OO... ..OO... ..OO...
O..O... ..OO... ..OO... ..OO... ..OO... ..OO... ..OO...

.XXX... ..X.X.X XX.X... ..X.XX. XX.X... ..X.XX. XX.XX.. ..X.XXX XX.XX.. ..XXXXX XX.XX.. ..XXXXX
X...XX. XX.XX.. ....XX. X..X... ....XX. XX.X... ..X.XX. .X.X... ..X.XXX .X.X... ..X.XXX .X.X...
....XXX .....X. ....X.X ..X..X. .X..X.X ..X..X. .X..X.X ..X..X. .X..X.X ..X..X. .X.XX.X ..X..X.
X...XX. .X..XX. X...XX. .X..XX. X...XX. .X..XX. X...... .X..X.. X.X.... .X.XX.. X.X.... .X.XX..
..XXX.X ..XX.X. ..XXX.. ..XX... ..XXX.. .XXX... X.X.X.. .X.X... X.X.X.. .X.X... X.X.X.. .X.X...
....... .X..X.. ..X..X. .X.XX.. ..X..X. .X.XX.. ..X.... .X.XX.. X.X..X. .X.XX.. X.X..X. .X.XX..
X..X... ....X.X ...X.X. ....X.X ...X.X. ....X.X ...X.X. ....X.X ...X.X. ....X.X ...X.X. ....X.X

<examplar 84> ( O : Hebb; X : Iter )
.OOOOO. OOOOOOO OOO.OOO OO.OOOO OO..OOO OO..OOO OO..OOO
OO...OO OO..OOO OO..OOO OO..OOO OO..OOO OO..OOO OO..OOO
O..OOOO OO..OOO OO..OOO OO..OOO OO..OOO OO..OOO OO..OOO
OO..OOO OO.OOOO OOOOOOO OOOOOOO OOOOOOO OO.OOOO OO.OOOO
OOOO..O OO.OOOO OO..OOO OO..OOO OO..OOO OO..OOO OO..OOO
OOO.... OO..OOO OO..OOO OO..OOO OO..OOO OO..OOO OO..OOO
.OO.O.. OOOOOO. OOOOOOO OO..OOO OO..OOO OO..OOO OO..OOO

.XXXXX. .XXXXXX .XXXXX. .XXXX.X .XXXXX. .XXXX.X .XXXXX. .XXXX.X .XXXXX. ..XXX.X .XXXX.. ..XXXXX .XXXX.. ..XXXXX .XXX... ..XXXXX
XX...XX X...XXX XX.XXXX X.X.XXX .X.XXX. X.X.XXX .X.XXX. X.X.XXX .X.XXX. X.X.XXX .X.XXX. X.X.X.X .X.XXX. X.X...X .X.XXXX X.X...X
X..XXXX XX..XXX X...XXX XX.XXXX X.X.XXX .X.XXXX X.X.XXX .X.XXX. X.X.X.X .X.X.X. X.X.X.X .X.X.X. X.X.X.X .X.X.X. X.X.X.X .X.X.X.
XX..XXX XX.X.XX XXXXXXX .X.XXXX X.XXXXX .X.X.XX X.XXXXX .X...XX X.XX.XX .X....X X.XX.X. .X..X.X X.XX.X. .X..X.X X.XX.X. .X..X.X
XXXX..X X.XX.XX XX.X..X X.XX.XX .X.XXXX X.XX.XX .X.XXXX X.XX.X. .X.XXXX X.XX.X. .X.XX.X X.XX.X. .X..X.X X.XX.X. .X..X.X X.XX.X.
XXX.... .XX.... XXX...X .X.X..X X.X..XX .X.XX.X X.X..X. .X.XX.X X.X..X. .X.XX.X X.X..X. .X.XX.X X.X..X. .X.XX.X X.X..X. .X.XX.X
.XX.X.. .XXX.X. .XX.X.X .XXX.X. ..X.X.X .X.X.X. ..X.X.X .X.X.X. ..X.X.X .X.X.X. ..X.X.X .X.X.X. ..X.X.X .X.X.X. ..X.X.X .X.X.X.
```

```
<examplar 85> ( O : Hebb; X : Iter )
.0000..  ..000..  ..00...  ..00...  ..00...
.00....  ..0....  ..00...  ..00...  ..00...
.000..0  .00....  ..00...  ..00...  ..00...
.00....  ..00...  ..0....  ..0....  ..0....
0.0...0  .00....  ..0....  ..00...  ..00...
.00.0.0  ..00...  ..00...  ..00...  ..00...
.00.0..  .0000..  ..000..  ..00...  ..00...

.XXXX..  XXXXX..  .XXXX..  XXXXX..  .XXXXX.  XXXXX..
.XX....  ..X....  .XX....  ..X....  .X.....  ..X....
.XXX..X  XXX...X  .XXX.X.  XXX.X.X  .XXX.X.  XXX.X.X
.XX....  .XXX...  .XX....  ..XX...  .X.....  ..XX...
X.X...X  .X.X...  ..X...X  .XXXX..  ..XX..X  .XXXX..
.XX.X.X  .XX..X.  .XXXX..  ..X..X.  .X.XX..  ..X..X.
.XX.X..  .XXXX..  .XXXX..  ..XXX..  .XXXX..  ..XXX..

<examplar 86> ( O : Hebb; X : Iter )
.......  .......  .......  ..00...  ..00...  ..00...
000...0  ..00...  ..00...  ..00...  ..00...  ..00...
..0..0.  ...00..  ..00...  ..00...  ..00...  ..00...
...00.0  .......  .......  .......  ..0....  ..0....
.0...0.  ..0....  ..00...  ..00...  ..00...  ..00...
.....00  ..0....  ..00...  ..00...  ..00...  ..00...
......0  0......  ..00...  ..00...  ..00...  ..00...

.......  XX.....  ..X..X.  XX.....  ..X..X.  XX.....  ..X..X.  XX.....  ..X..XX  XX.....
XXX...X  .XX..XX  XXX...X  .XX..XX  .XX....  .XX..XX  ..X....  .XX..XX  ..X....  .XX..XX
..X..X.  .X..X..  X.X..X.  .X..X..  X.X..X.  .X.XX..  X.X..X.  .X.XX..  X.X..X.  .X.XX..
...XX.X  X..X.X.  .X.XX..  X.X..X.  .X.XX..  X.X..X.  .X.XX..  X.X..X.  .X.XX..  X.X..X.
.X...X.  ....XX.  .X...X.  ....X..  .X...X.  ..X.X.X  .X.X.X.  X.X.X.X  .X.X.X.  X.X.X.X
.....XX  .....XX  ......X  .....XX  .X....X  .....XX  .X.....  ..X..XX  .XX....  ..X..XX
......X  ...X.XX  X.....X  X....X.  X...X.X  ...X.X.  X...X.X  .X.X.X.  X...X.X  .X.X.X.

<examplar 87> ( O : Hebb; X : Iter )
.0000..  ..000..  ..00...  ..00...  ..00...
...00..  ..00...  ..00...  ..00...  :.00...
...00..  ...00..  ..00...  ..00...  ..00...
..000..  .......  .......  ..0....  ..0....
....00.  ...0...  ..00...  ..00...  ..00...
...00..  ...0...  ..00...  ..00...  ..00...
..000..  ..000..  ..00...  ..00...  ..00...

.XXXX..  .XXXX..  .XXXX..  .XXXX..  .XXXXX.  .XXXX..  .XXXXX.  .XXXX..  .XXXXX.  .XXXX..  .XXXXX.  .XXXX..  .XXXXX.  .XXXX..  ..XXXX.  .X.XX..  ..XXXX.  .X.XX..  ..XXXX.  .X.XX..  ..XXXX.  .X.X.XX  XX....X  XXX..XX  XXX....  XX...XX
XXX....  XX....X  XX.....  X.X..XX  XX.....
...XX..  ..X.X..  .X.X...  ..X.X..  ...X...  ..X.X..  ...X...  ..X.X..  ...X...  ..X.X..  ...X...  ..X.X..  ...X...  ..X.XX.  ...X...  ..X.XXX  ...X...  ..X.XXX  ...X...  ..X.XXX  .....X.  XX..X.X  XX.X.X.  XXX.X.X  XX.X.X.  XXX...X
XX.XX..  X.X....  .X.XX..  X.X....  .X.XX..
...XX..  ....X..  ....X..  ....X..  ....X..  ...XX..  ..X.X..  .X.XX..  ..X.X..  .X.XX..  ..X.X..  .X.XX..  ..X.X..  .X.XX..  X.X.XX.  .X.XX..  X.X.XX.  .X.XX..  X.X.XX.  .X.XX..  XX..X.X  .X.X.X.  X.X.X.X  .X.X.X.  X.X.X.X  .X.X.X.
X.X.X.X  .X.X.X.  X.X.X.X  .X.X.X.  X.X.X.X
..XXX..  ...XX..  ..XXX..  ..XXX..  ..XXX..  ..XXX..  ..XXX..  ..XX.X.  ..XXX..  ..XX.X.  ..XXX..  ..XX.X.  .XXXX..  ..X..X.  .X.XX..  X.X..X.  .X.XX..  X.X..X.  .X.XX..  X.X..X.  .X.XX..  .X...X.  X..XX..  ....X.X  X..X...  ....X.X
X..X.X.  ....X.X  X..X.X.  .X..X.X  X..X.X.
....XX.  ....X..  .......  ....X..  .......  ....X..  ...X...  ..X.X..  .X.X.X.  ..X.X..  .X.X.X.  X.X.X..  .X.X.X.  X.X.X..  .X.X.X.  X.X.X..  .X.X.X.  X.X.X..  .X.X.X.  X.X.X..  X.X..X.  ....X..  .X..X..  ..X....  .X..X.X  X.XX.X.
.X..X.X  X.XX.X.  .X..X.X  X.XX.X.  .X..X.X
...XX..  X..X...  .X.XX..  X.XX...  .X.XX..  X.XX...  .X.XX..  X.XX...  .X.XX..  X.XX...  .X.XX..  X.XX...  .X.XX..  X.XX.X.  .X.XX..  X.XX.X.  .X..X..  X..X.X.  .X..X..  X..X.X.  .X.XX.X  .X.XX.X  X.X....  .X.XX.X  X.X..X.  .X.Y
X.X..X.  .X.XX.X  X.X..X.  .X.XX.X  X.X..X.
..XXX..  .XXX...  ..XX...  .XXX...  .XXX...  .XXXX..  .XXX...  .XXXXX.  .XXX...  .XXX.X.  .XX...X  .XXX.X.  .XX.X.X  .XXX.X.  .XX.X.X  .XXX.X.  .XX.X.X  .XXX.X.  ..X.X.X  .XXX.X.  ....X.X  ..XX.X.  ..X.X.X  XX.X...  X.X...X  XX.X.X.  X.X.X.X  XX.X.
X.X.X.X  XX.X.X.  X.X.X.X  XX.X.X.  X.X.X.X

<examplar 88> ( O : Hebb; X : Iter )
...0...  .......  ...0...  ..00...  ..00...  ..00...
..000..  ..00...  ..00...  ..00...  ..00...  ..00...
0.0.00.  ...0...  ..00...  ..00...  ..00...  ..00...
00...00  .......  .......  .......  ..0....  ..0....
...0...  ..00...  ..00...  ..00...  ..00...  ..00...
.......  ...0...  ..00...  ..00...  ..00...  ..00...
.......  ...0...  ..00...  ..00...  ..00...  ..00...

...X...  .......  .......  .......  .......  .......
..XXX..  ..XXXX.  ...XX..  ..X..X.  ...XX..  ..X..X.
X.X.XX.  .X.XXX.  X.X.XX.  .X.X.X.  X.X.XXX  .X.X.X.
XX...XX  XX...XX  XX.X.X.  XXX.XXX  XX.X.X.  XXX.XXX
...X...  ...X...  ...X...  ..XX...  ...X...  ..XX...
.......  ...X...  ..X....  ...X...  ..X....  ...X...
.......  .......  .......  .......  .......  .......
```

```
<examplar 89> ( O : Hebb; X : Iter )
......O  .......  ...O...  ..OO...  ..OO...  ..OO...
.......  ...O...  ..OO...  ..OO...  ..OO...  ..OO...
......O  ..OO...  ..OO...  ..OO...  ..OO...  ..OO...
O...O..  .......  .......  .......  ..O....  ..O....
..OO...  ..OO...  ..OO...  ..OO...  ..OO...  ..OO...
.......  ..OO...  ..OO...  ..OO...  ..OO...  ..OO...
OOOOOO.  ..OO...  ..OO...  ..OO...  ..OO...  ..OO...

......X  .......  ......X  ..X....  ...X..X  ..X....  ...X..X  ..X....  ...X..X  ..X....  ...X..X  ..X....  ...X...  ..X....  ...X...  ..X....  ...XX..  ..X..X.  ...XX..
.......  ...XX..  ..XX...  ...XX.X  ..X....  .X.XX.X  ..X..X.  .X.XX.X  ..X..X.  .X.XX.X  ..X..X.  .X.XX.X  ..X..X.  .X.XX.X  ..X..X.  .X.XX.X  ..X..X.  .X.XX.X  ..X..X.
......X  ...X...  ....X.X  ...X.X.  ....X.X  ...X.X.  .X..X.X  X.XX.X.  .X..X.X  X.XX.X.  .X..X.X  X.XX.X.  .X..X.X  X.X..X.  .X..X.X  X.X..X.  .X..X.X  X.X..X.  .X..X.X
X...X..  .....X.  ....X..  .....X.  ....X..  X....X.  ....X..  X..X.X.  ....X..  ...X.X.  ..X.X..  .X.X.X.  X.X.X..  .X.X.X.  X.X.X..  .X.X.X.  X.X.X..  .X.X.X.  X.X.X..
..XX...  ..X.X..  ...X...  ..X.X..  ...X.X.  ..X.X..  ...X.X.  .XX.X..  ...X.X.  .XX.X..  ...X.X.  .XX.X..  ...X.X.  .XX.X..  ...X.X.  .XX.X..  ...X.X.  XXX.X..  ...X.X.
.......  ..X....  ....X..  ..X..X.  ....X.X  .....X.  ....X.X  .X...X.  X...X.X  .X...X.  X...X.X  .X...X.  X...X.X  .X.X.X.  X.X.X.X  .X.X.X.  X.X.X.X  .X.X.X.  X.X.X.X
XXXXXX.  XX..X.X  XXX..X.  .X..X.X  X.X..X.  .X..X.X  X.X..X.  .X..X.X  X.X..X.  .X..X.X  X.XX.X.  .X..X.X  X.XX.X.  .X..X.X  X.X..X.  .X.XX.X  X.X..X.  .X.XX.X  X.X..X.

<examplar 90> ( O : Hebb; X : Iter )
..OO...  ...O...  ..OO...  ..OO...  ..OO...
..OO...  ..OO...  ..OO...  ..OO...  ..OO...
..OOO..  ..OO...  ..OO...  ..OO...  ..OO...
....O..  .......  .......  ..O....  ..O....
O.O...O  ..OO...  ..OO...  ..OO...  ..OO...
.OO....  ..OO...  ..OO...  ..OO...  ..OO...
.......  ..OO...  ..OO...  ..OO...  ..OO...

..XX...  .XX....  ..XX...  .......  ...X...  .......  .......  .......  .......  .......  .......
..XX...  ..X....  .......  ..X....  .......  .......  .......  .......  .......  .......  .......
..XXX..  .X.XX..  X.XX...  .X.....  X.XX...  .X.X...  X.XXX..  .X.X...  X.XXX..  .X.X...  X.XXX..
....X..  X....X.  .X..X..  X.X..X.  .X.XX..  X.XX.X.  .X.XX.X  X.XX.X.  XX.X..X  X.XX.X.  XX.X..X
X.X...X  ...X...  ..X....  ...X...  .XX....  ...X...  ..X....  ...X...  ..X....  ...X...  ..X....
.XX....  .XX....  ..X....  .X.X...  ..X....  .X.X...  X.X....  .X.X...  X.X....  .X.X..X  X.X....
.......  ...XX..  .......  ..XX...  .X.....  X.XX...  .X.....  X.X....  .X.....  X.X....  .X.....

<examplar 91> ( O : Hebb; X : Iter )
...OOOO  ..OO...  ..OO...  ..OO...  ..OO...
..OO...  ..OO...  ..OO...  ..OO...  ..OO...
O.OO...  ..OO...  ..OO...  ..OO...  ..OO...
O.O.O..  .......  .......  ..O....  ..O....
..OO...  ..OO...  ..OO...  ..OO...  ..OO...
O.O....  ..OO...  ..OO...  ..OO...  ..OO...
..OOOO.  ..OOO..  ..OO...  ..OO...  ..OO...

...XXXX  ..XX.X.  .X.XX.X  ..XX.X.  .X.XX.X  ..X..X.  .X.XX..  ..X..X.  .X.XX..  ..X..X.  .X.XX..  ..X..X.  ...XX..  ..X..X.  ...XX..  ..X..X.  ...XX..  ..X..X.
..XX...  ...XX.X  ..X....  ...XX..  ..X....  ...XX..  ..X....  .X.XX..  ..X....  .X.XX..  ..X....  ...XX..  ..X....  ...XX..  ..X....  .X.XX..  ..X....  .X.XX..
X.XX...  ..XXX..  .X.XX..  X.X.X..  .X.X...  X.X.X..  .X.X...  X.X.X..  .X.X...  X.X.X..  .X.X...  X.X.X..  .X.X.X.  X.X.X..  .X.X.X.  X.X.X..  .X.X.X.  X.X.X..
X.X.X..  .X.X...  X.X.X.X  .X.X...  X.X.X.X  .X.X.X.  X.X.X.X  .X.X.X.  X.X.X..  .X.X.X.  X.X.X..  .X.X.X.  X.X.X..  XX.X.X.  XXX.X..  XX.X.X.  XXX.X..  XX.X.X.
..XX...  X.X...X  ...X...  XXX.X.X  ...X.X.  XXX.X.X  ...X.X.  XXX.X..  ...X.X.  XXX.X..  ...X.X.  XXX.X..  ...X.X.  XXX.X..  ...X.X.  XXX.X..  X..X.X.  XXX.X..
X.X....  .XXX...  X.X...X  .X.X...  X.X....  .X.X...  X.X....  .X.X...  X.X....  .X.X...  X.X.X..  .X.X.X.  X.X.X..  .X.X.X.  X.X.X..  .X.X.X.  X.X.X..  .X.X.X.
..XXXX.  .X.XX..  ..XXXX.  .X.XX.X  ..XX.X.  .X.XX.X  X.X..X.  .X.X..X  X.X..X.  .X.XX.X  X.X..X.  .X.XX.X  X.X..X.  .X.XX.X  X.X..X.  .X.XX.X  X.X..X.  .X.XX.X

<examplar 92> ( O : Hebb; X : Iter )
..OOO..  ...O...  ...O...  ..OO...  ..OO...  ..OO...
....O..  ...O...  ..OO...  ..OO...  ..OO...  ..OO...
...OO..  ...OO..  ..OO...  ..OO...  ..OO...  ..OO...
...O...  .......  .......  .......  ..O....  ..O....
.O.O...  .......  ...O...  ..OO...  ..OO...  ..OO...
O..OO.O  ...O...  ..OO...  ..OO...  ..OO...  ..OO...
...OO..  ..OOO..  ..OO...  ..OO...  ..OO...  ..OO...

..XXX..  .XXXX.X  ..XXX..  .XXXX..  ..XXXXX  XXXXX..  ..XXXXX  XXXXX..  ...XXXX  XXX.X..  ...XXXX
....X..  ...XX..  ..X.X..  ...XXX.  .XX.X..  ...XXX.  XXX.X..  ...XXX.  XXX.X..  ...XXX.  XXX.X..
...XX..  ....X..  ....XX.  .X..X..  ..X..X.  .X..X..  ..X..X.  .X..X.X  ..X..X.  .X..X.X  ..X..X.
...X...  X.X....  ...XX..  X.X.X..  .X.XX..  X.X....  .X.XX..  X.X....  .X.XX..  X.X....  .X.XX..
.X.X...  ..X....  .X.X...  X.X.X..  .X.X...  X.X.X..  .X.X...  X.X.X..  .X.X...  X.X.X..  .X.X...
X..XX.X  X..X.X.  XX.XX..  X.X..X.  .X.XX..  X.X..X.  .X.XX..  X.X..X.  .X.XX..  X.X..X.  .X.XX..
...XX..  ..XX...  ...XX..  ..XX...  ...XX..  ..XX.X.  ....X.X  ...X.X.  ....X.X  ...X.X.  ....X.X
```

```
<examplar 93> ( O : Hebb; X : Iter )
OOO....  ..O....  ..OO...  ..OO...
..OO...  ..OO...  ..OO...  ..OO...
..OOOO.  ..OO...  ..OO...  ..OO...
...OOO.  ..OO...  ..O....  ..O....
..OO...  ..OO...  ..OO...  ..OO...
..OO...  ..OO...  ..OO...  ..OO...
OOO....  ..OO...  ..OO...  ..OO...

XXX....  XXX....  XXX....
..XX...  ..XX...  ..XX...
..XXXX.  .XXXXX.  .XXXXX.
...XXX.  ...XXX.  ...XXX.
..XX...  ..XX...  ..XX...
..XX...  ..XX...  ..XX...
XXX....  XXX....  XXX....
```

We claim:

1. A method for recognizing a pattern of an item of a plurality of items, the item represented by a data pattern produced by an input sensor, using a computer configured as a Hopfield neural network, said network receiving an input vector, utilizing a weight matrix and producing an output vector, the method comprising the steps of:

(a) inputting to said network a series of training patterns representing the representative patterns of the items to be recognized, said training patterns organized as a series of vectors;

(b) developing an output vector of said network using each training pattern as an input vector of said network and utilizing said weight matrix;

(c) determining if said output vector has changed from said input vector;

(d) determining a change in the weight matrix based on successive over-relaxation utilizing said output vector and said input vector training pattern if said output vector has changed; and (e) repeating steps (b)–(d) until no changes are determined in step (b) for all of said training patterns;

(f) transmitting said data pattern received from said input sensor representing the item to be recognized to said Hopfield neural network after step (e); and (g) developing an output of said Hopfield neural network representing the recognized item based on said data pattern received from said input sensor utilizing said weight matrix present after step (e).

2. The method of claim 1, said Hopfield neural network further utilizing a threshold vector, wherein said output vector development step (b) utilizes said threshold vector and said step (d) further including determining a change in the threshold vector based on successive over-relaxation utilizing said output vector and said input vector training pattern if said output vector has changed.

3. The method of claim 2, wherein said change in the weight matrix is based on the following rule:

$$\Delta W_{ij} = -\frac{1+\lambda}{n}\,[S_i^{(k)} - \xi X_i^{(k)}]X_j^{(k)}$$

$$\text{if } S_{i^{(k)}}\, X_{i^{(k)}} < \xi$$

$$\Delta\theta_i = +\frac{1+\lambda}{n}\,[S_i^{(k)} - \xi X_i^{(k)}]$$

$$\text{if } S_{i^{(k)}}\, X_{i^{(k)}} < \xi$$

$$\text{where } S_i^{(k)} = \sum_{j=1}^{n} W_{ij}X_j^{(k)} - \theta_i,$$

$\Delta W_{ij}$ is the change in the value of the ith row and jth column of the weight matrix, $\lambda$ is an over-relaxation factor having a value between 0 and 1, $\xi$ is a normalizing constant having a positive value, and $\Delta\theta_i$ is change in the ith threshold vector.

4. A method of correlating an element with an item of a plurality of items, the item represented by a data pattern produced by an input sensor, using a computer configured as a bidirectional associative memory neural network having X and Y layers of neurons, said network receiving an input vector, utilizing a weight matrix and producing an output vector, the method comprising the steps of:

(a) inputting to said network a series of training pattern pairs, one pattern of said training pattern pairs representing the representative patterns of items to be correlated and the other pattern of said training pattern pairs representing the representative pattern of the correlated item, said training patterns organized as a series of X and Y element vectors;

(b) developing a Y output vector of said network using each X element vector of each training pattern as an input vector to said Y neurons of said network;

(c) developing an X output vector of said network using each Y element vector of each training pattern as an input vector to said X neurons of said network;

(d) determining if said X output vector has changed from said input vector to said Y neurons;

(e) determining a change in the weight matrix based on successive over-relaxation utilizing said Y output vector and said X element of said input vector training pattern and determining a change in said weight matrix based on successive over-relaxation and utilizing said X output vector and said Y element of said input vector training pattern if said X output vector has changed;

(f) repeating steps (c)–(e) until no changes are determined in step (e) for all of said training patterns;

(g) transmitting said data pattern received from said input sensor representing the item to be correlated to one layer of said bidirectional associative memory neural network after step (f); and (h) developing an output from said other layer of said bidirectional associative memory neural network representing the correlated item based on said data pattern received from said input sensor and utilizing said weight matrix present after step (f).

5. The method of claim 4, said bidirectional associative memory neural network further utilizing a threshold vector for each layer of neurons and wherein said output vector development steps (b) and (c) each utilize said threshold vector for the appropriate layer and said step (e) further including determining a change in each threshold vector based on successive over-relaxation utilizing said respective output vector and said respective element of said input vector training pattern if said X output vector has changed.

6. The method of claim 5, wherein said changes in said weight matrix and said threshold vectors are based on the following rule:

$$\Delta W_{ji} = -\frac{1+\lambda}{1+n}\,[S_{Y_j}^{(k)} - \xi Y_j^{(k)}]X_i^{(k)}$$

$$\Delta\theta_{Y_j} = +\frac{1+\lambda}{1+n}\,[S_{Y_j}^{(k)} - \xi Y_j^{(k)}]$$

$$\text{if } S^{(k)YJ}\, Y_{j^{(k)}} < \xi$$

$$\text{where } S_{Y_j}^{(k)} = \sum_{i=1}^{n} W_{ij}X_i^{(k)} - \theta_{Y_i}$$

$$\Delta W_{ji} = -\frac{1+\lambda}{1+m}\,[S_{X_i}^{(k)} - \xi X_i^{(k)}]Y_j^{(k)}$$

$$\Delta\theta_{X_i} = +\frac{1+\lambda}{1+m}\,[S_{X_i}^{(k)} - \xi X_i^{(k)}]$$

$$\text{if } S_{X_i^{(k)}}\, X_{i^{(k)}} < \xi$$

$$\text{where } S_{X_i}^{(k)} = \sum_{j=1}^{m} W_{ij}Y_j^{(k)} - \theta_{X_i}$$

$\Delta W_{ji}$ is the change in value of the jth row and ith column of the weight matrix, $\lambda$ is the over-relaxation factor having a value between 0 and 1, $\xi$ is the normalizing constant having a positive value, n and m are the number of X and Y layer neurons, respectively and $\Delta\theta_{Yi}$ and $\Delta\theta_{Xi}$ are the change in the ith threshold vector.

7. An artificial neural network comprising:

a computer configured as a Hopfield neural network, said network receiving an input vector, utilizing a weight matrix and producing an output vector; and means coupled to said computer for inputting a series of training patterns to said computer, said training patterns organized as a series of vectors, wherein said computer includes:

means coupled to said training pattern means for developing an output vector of said network using each training pattern as an input vector of said network and utilizing said weight matrix;

means coupled to said output vector developing means for determining if said output vector has changed from said input vector; and means coupled to said output vector changed means, said output vector developing means and said training pattern means for determining a change in the weight matrix based on successive over-relaxation utilizing said output vector of said network and said input vector training pattern if said output vector has changed, wherein said output vector developing means, said output vector changed means and said weight matrix change determining means operate repeatedly until no changes are determined by said output vector changed means for all of said training patterns.

8. The artificial neural network of claim 7, said Hopfield neural network further utilizing a threshold vector and wherein said output vector developing means utilizes said threshold vector and said means for weight matrix change determining means further determines a change in the threshold vector based on successive over-relaxation utilizing said output vector and said input vector training pattern if said output vector has changed.

9. The artificial neural network of claim 8, wherein said change in said weight matrix and threshold vector are based on the following rule:

$$\Delta W_{ij} = -\frac{1+\lambda}{n}\,[S_i^{(k)} - \xi X_i^{(k)}]X_j^{(k)}$$

$$\text{if } S_{i^{(k)}}\, X_{i^{(k)}} < \xi$$

$$\Delta\theta_i = +\frac{1+\lambda}{n}\,[S_i^{(k)} - \xi X_i^{(k)}]$$

$$\text{if } S_{i^{(k)}}\, X_{i^{(k)}} < \xi$$

$$\text{where } S_i^{(k)} = \sum_{j=1}^{n} W_{ij}X_j^{(k)} - \theta_i,$$

$\Delta W_{ij}$ is the change in the value of the ith row and jth column of the weight matrix, $\lambda$ is an over-relaxation factor having a value between 0 and 1, $\xi$ is a normalizing constant having a positive value, and $\Delta\theta_i$ is change in the ith threshold vector.

10. An artificial neural network comprising:

a computer configured as a bidirectional associative memory neural network having X and Y layers of neurons, said network receiving an input vector, utilizing a weight matrix and producing an output vector; and means coupled to said computer for inputting a series of X and Y training pattern pairs to said computer, said training patterns organized as a series of X and Y element vectors, wherein said computer includes:

means coupled to said training pattern pair means for developing a Y output vector of said network using each X element of each training pattern as an input vector to said Y neurons of said network;

means coupled to said training pattern pair means for developing an X output vector of said network using each Y element of each training pattern as an input vector to said X neurons of said network;

means coupled to said X output vector developing means for determining if said X output vector has changed from said input vector to said Y neurons;

means coupled to said X output vector changed means, said Y output vector developing means, said X output vector developing means and said training pattern pair means for determining a change in the weight matrix based on successive over-relaxation utilizing said Y output vector of said network and said X element of said input vector training pattern and determining a change in said weight matrix based on successive over-relaxation and utilizing said X output vector of said network and said Y element of said input vector training pattern if said X output vector has changed, wherein said X and Y output vector developing means, said X output vector changed means and said weight matrix change determining means operate repeatedly until no changes are determined in said X output vector for all of said training patterns.

11. The artificial neural network of claim 10, said bidirectional associative memory neural network further utilizing a threshold vector for each layer of neurons and wherein said X and Y output vector developing means each utilize said threshold vector for the appropriate layer and said means for weight matrix change determining means further determines a change in each threshold vector based on successive over-relaxation utilizing said respective output vector and said respective element of said input vector training pattern if said X output vector has changed.

12. The artificial neural network of claim 11, wherein said changes in said weight matrix and said threshold vectors are based on the following rule:

$$\Delta W_{ji} = -\frac{1+\lambda}{1+n}\,[S_{Y_j}^{(k)} - \xi Y_j^{(k)}]X_i^{(k)}$$

$$\Delta\theta_{Y_j} = +\frac{1+\lambda}{1+n}\,[S_{Y_j}^{(k)} - \xi Y_j^{(k)}]$$

$$\text{if } S^{(k)YJ}\, Y_{j^{(k)}} < \xi$$

$$\text{where } S_{Y_j}^{(k)} = \sum_{i=1}^{n} W_{ij}X_i^{(k)} - \theta_{Y_i}$$

$$\Delta W_{ji} = -\frac{1+\lambda}{1+m}\,[S_{X_i}^{(k)} - \xi X_i^{(k)}]Y_j^{(k)}$$

$$\Delta\theta_{X_i} = +\frac{1+\lambda}{1+m}\,[S_{X_i}^{(k)} - \xi X_i^{(k)}]$$

$$\text{if } S_{X_i^{(k)}}\, X_{i^{(k)}} < \xi$$

$$\text{where } S_{X_i}^{(k)} = \sum_{j=1}^{m} W_{ij}Y_j^{(k)} - \theta_{X_i}$$

$\Delta W_{ji}$ is the change in value of the jth row and ith column of the weight matrix, $\lambda$ is the over-relaxation factor having a value between 0 and 1, $\xi$ is the normalizing constant having a positive value, n and m are the number of X and Y layer neurons, and $\Delta\theta_{Yi}$ and $\Delta\theta_{Xi}$ are the change in the ith threshold vector.

13. A pattern recognition system comprising:

a computer configured as a Hopfield neural network, said network receiving an input vector, utilizing a weight matrix and producing an output vector;

means coupled to said computer for inputting to said computer a series of training patterns representing the representative patterns of the items to be recognized, said training patterns organized as a series of vectors;

means coupled to said computer for providing a data pattern representing the item to be recognized to said Hopfield neural network after training of said Hopfield neural network; and means coupled to said computer for developing an output of said Hopfield neural network representing the recognized item based on said data pattern received from said means for providing a data pattern, wherein said computer includes:

means coupled to said training pattern means for developing an output vector of said network using each training pattern as an input vector of said network and utilizing said weight matrix;

means coupled to said output vector developing means for determining if said output vector has changed from said input vector; and means coupled to said output vector changed means, said output vector developing means and said training pattern means for determining a change in the weight matrix based on successive over-relaxation utilizing said output vector of said network and said input vector training pattern if said output vector has changed, wherein said output vector changed means, said output vector determining means and said weight matrix change determining means operate repeatedly until no changes are determined by said output vector changed means for all of said training patterns.

14. The system of claim 13, said Hopfield neural network further utilizing a threshold vector, wherein said output vector developing means utilizes said threshold vector and said weight matrix change determining means further determines a change in the threshold vector based on successive over-relaxation utilizing said output vector and said input vector training pattern if said output vector has changed.

15. The method of claim 14, wherein said change in the weight matrix and threshold matrix are based on the following rule:

$$\Delta W_{ij} = -\frac{1+\lambda}{n}\,[S_i^{(k)} - \xi X_i^{(k)}]X_j^{(k)}$$

$$\text{if } S_{i(k)}\,X_{i(k)} < \xi$$

$$\Delta\theta_i = +\frac{1+\lambda}{n}\,[S_i^{(k)} - \xi X_i^{(k)}]$$

$$\text{if } S_{i(k)}\,X_{i(k)} < \xi$$

$$\text{where } S_i^{(k)} = \sum_{j=1}^{n} W_{ij}X_j^{(k)} - \theta_i,$$

$\Delta W_{ij}$ is the change in the value of the ith row and jth column of the weight matrix, $\lambda$ is an over-relaxation factor having a value between 0 and 1, $\xi$ is a normalizing constant having a positive value, and $\Delta\theta_i$ is change in the ith threshold vector.

16. An element correlation system comprising:

a computer configured as a bidirectional associative memory neural network having X and Y layers of neurons, said network receiving an input vector, utilizing a weight matrix and producing an output vector;

means coupled to said computer for inputting to said computer a series of training pattern pairs, one pattern of said training pattern pairs representing the representative patterns of items to be correlated and the other pattern of said training pattern pairs representing the representative pattern of the correlated item, said training patterns organized as a series of X and Y element vectors;

means coupled to said computer for transmitting a data pattern representing the item to be correlated to one layer of said bidirectional associative memory neural network; and means coupled to said computer for developing an output vector from said other layer of said bidirectional associative memory neural network representing the correlated item based on said data pattern received from said means for transmitting a data pattern, wherein said computer includes:

means coupled to said training pattern pair means for developing a Y output vector of said network using each X element of each training pattern as an input vector of said network to said Y neurons;

means coupled to said training pattern pair means for developing an X output vector of said network using each Y element of each training pattern as an input vector to said X neurons;

means coupled to said X output vector developing means determining if said X output vector has changed from said input vector to said Y neurons; and means coupled to said X output vector changed means, said X and Y output vector developing means and said training pattern pair means for determining a change in the weight matrix based on successive over-relaxation utilizing said Y output vector of said network and said X element of said input vector training pattern and determining a change in said weight matrix based on successive over-relaxation and utilizing said X output vector of said network and said Y element of said input vector training pattern if said X output vector has changed, wherein said X and Y output vector developing means, said X output vector changed means and said weight matrix change determining means repeatedly operate until no changes are determined by said X output vector changed means for all of said training patterns.

17. The system of claim 16, said bidirectional associative memory neural network further utilizing a threshold vector for each layer of neurons and wherein said X and Y output vector developing means each utilize said threshold vector for the appropriate layer and said weight matrix change determining means further determines a change in each threshold vector based on successive over-relaxation utilizing said respective output vector and said respective element of said input vector training pattern if said X output vector has changed.

18. The system of claim 17, wherein said changes in said weight matrix and said threshold vectors are based on the following rule:

$$\Delta W_{ji} = -\frac{1+\lambda}{1+n}\left[S_{Y_j}^{(k)} - \xi Y_j^{(k)}\right] X_i^{(k)}$$

$$\Delta \theta_{Y_j} = +\frac{1+\lambda}{1+n}\left[S_{Y_j}^{(k)} - \xi Y_j^{(k)}\right]$$

$$\text{if } S^{(k)YJ}\, Y_{j^{(k)}} < \xi$$

$$\text{where } S_{Y_j}^{(k)} = \sum_{i=1}^{n} W_{ij} X_i^{(k)} - \theta_{Y_i}$$

$$\Delta W_{ji} = -\frac{1+\lambda}{1+m}\left[S_{X_i}^{(k)} - \xi X_i^{(k)}\right] Y_j^{(k)}$$

$$\Delta \theta_{X_i} = +\frac{1+\lambda}{1+m}\left[S_{X_i}^{(k)} - \xi X_i^{(k)}\right]$$

-continued $$\text{if } S_{X_i^{(k)}}\, X_{i^{(k)}} < \xi$$

$$\text{where } S_{X_i}^{(k)} = \sum_{j=1}^{m} W_{ij} Y_j^{(k)} - \theta_{X_i}$$

$\Delta W_{ji}$ is the change in value of the jth row and ith column of the weight matrix, $\lambda$ is the over-relaxation factor having a value between 0 and 1, $\xi$ is the normalizing constant having a positive value, n and m are the number of X and Y layer neurons, respectively and $\Delta\theta_{Yi}$ and $\Delta\theta_{Xi}$ are the change in the ith threshold vector.

* * * * *